United States Patent
Hoffberg-Borghesani et al.

(10) Patent No.: US 10,361,802 B1
(45) Date of Patent: Jul. 23, 2019

(54) ADAPTIVE PATTERN RECOGNITION BASED CONTROL SYSTEM AND METHOD

(75) Inventors: Linda I. Hoffberg-Borghesani, Acton, MA (US); Steven M. Hoffberg, West Harrison, NY (US)

(73) Assignee: Blanding Hovenweep, LLC, Las Vegas, NV (US)

(*) Notice: Subject to any disclaimer, the term of this patent is extended or adjusted under 35 U.S.C. 154(b) by 324 days.

(21) Appl. No.: 09/497,071

(22) Filed: Feb. 2, 2000

Related U.S. Application Data

(63) Continuation-in-part of application No. 09/241,135, filed on Feb. 1, 1999, now Pat. No. 6,400,996, and a
(Continued)

(51) Int. Cl.
*H04N 5/445* (2011.01)
*G06F 3/00* (2006.01)
(Continued)

(52) U.S. Cl.
CPC ............... *H04H 60/65* (2013.01); *G06F 3/00* (2013.01); *G06F 9/453* (2018.02);
(Continued)

(58) Field of Classification Search
CPC .......... H04N 21/252; H04N 21/25891; H04N 21/42204; H04N 21/485; H04N 5/4403
(Continued)

(56) References Cited

U.S. PATENT DOCUMENTS 2,995,318 A   8/1961   Cocharo
3,161,871 A   12/1964  Staples
(Continued)

FOREIGN PATENT DOCUMENTS

CA   2009171    8/1990
CA   1298387    3/1992
(Continued)

OTHER PUBLICATIONS

Robertson, Barbara, "New CD-Rom format brings real-time video," May 1987, Lotus, v3, n5, p. 14(5).*
(Continued)

*Primary Examiner* — Jason P Salce

(57) ABSTRACT

An adaptive interface for a programmable system, for predicting a desired user function, based on user history, as well as machine internal status and context. The apparatus receives an input from the user and other data. A predicted input is presented for confirmation by the user, and the predictive mechanism is updated based on this feedback. Also provided is a pattern recognition system for a multimedia device, wherein a user input is matched to a video stream on a conceptual basis, allowing inexact programming of a multimedia device. The system analyzes a data stream for correspondence with a data pattern for processing and storage. The data stream is subjected to adaptive pattern recognition to extract features of interest to provide a highly compressed representation that may be efficiently processed to determine correspondence. Applications of the interface and system include a video cassette recorder (VCR), medical device, vehicle control system, audio device, environmental control system, securities trading terminal, and smart house. The system optionally includes an actuator for effecting the environment of operation, allowing closed-loop feedback operation and automated learning.

20 Claims, 28 Drawing Sheets

Related U.S. Application Data continuation-in-part of application No. 09/260,802, filed on Mar. 2, 1999, now Pat. No. 7,242,988, and a continuation-in-part of application No. 09/304,536, filed on May 4, 1999, now Pat. No. 6,418,424.

(60) Provisional application No. 60/157,829, filed on Oct. 5, 1999.

(51) Int. Cl.
| | |
|---|---|
| G06F 13/00 | (2006.01) |
| H04H 60/65 | (2008.01) |
| G06F 9/451 | (2018.01) |
| G11B 27/10 | (2006.01) |
| G11B 27/11 | (2006.01) |
| H04H 60/33 | (2008.01) |
| H04N 5/782 | (2006.01) |
| H04N 5/913 | (2006.01) |
| H04N 21/4147 | (2011.01) |
| H04N 21/422 | (2011.01) |
| H04N 21/433 | (2011.01) |
| H04N 21/44 | (2011.01) |
| H04N 21/442 | (2011.01) |
| H04N 21/45 | (2011.01) |
| H04N 21/454 | (2011.01) |
| H04N 21/458 | (2011.01) |
| H04N 21/466 | (2011.01) |
| G06K 9/00 | (2006.01) |
| G11B 27/32 | (2006.01) |
| H04B 1/20 | (2006.01) |

(52) U.S. Cl.
CPC ........ *G06K 9/00369* (2013.01); *G11B 27/107* (2013.01); *G11B 27/11* (2013.01); *H04H 60/33* (2013.01); *H04N 5/782* (2013.01); *H04N 5/913* (2013.01); *H04N 21/4147* (2013.01); *H04N 21/42201* (2013.01); *H04N 21/4334* (2013.01); *H04N 21/44008* (2013.01); *H04N 21/44222* (2013.01); *H04N 21/454* (2013.01); *H04N 21/4532* (2013.01); *H04N 21/4583* (2013.01); *H04N 21/4666* (2013.01); *H04N 21/4667* (2013.01); *G11B 27/328* (2013.01); *H04B 1/205* (2013.01); *H04N 2005/91328* (2013.01); *H04N 2005/91364* (2013.01)

(58) Field of Classification Search
USPC .................. 725/44–47, 34–36, 52–59, 37–39
See application file for complete search history.

(56) References Cited

U.S. PATENT DOCUMENTS

| | | |
|---|---|---|
| 3,475,755 A | 10/1969 | Bassen |
| 3,521,404 A | 7/1970 | Hager |
| 3,560,930 A | 2/1971 | Howard |
| 3,568,161 A | 3/1971 | Knickel |
| 3,609,684 A | 9/1971 | Lipp |
| 3,630,079 A | 12/1971 | Hughes |
| 3,644,686 A | 2/1972 | Kilpatrick |
| 3,660,844 A | 5/1972 | Potter |
| 3,664,701 A | 5/1972 | Kondur |
| 3,683,114 A | 8/1972 | Egan |
| 3,689,882 A | 9/1972 | Dessailly |
| 3,710,833 A | 1/1973 | Hammer |
| 3,715,400 A | 2/1973 | Kierstead |
| 3,745,462 A | 7/1973 | Trimble |
| 3,769,710 A | 11/1973 | Reister |
| 3,771,483 A | 11/1973 | Bond |
| 3,772,688 A | 11/1973 | Smit et al. |
| 3,774,215 A | 11/1973 | Reed |
| 3,793,635 A | 2/1974 | Potter |
| 3,828,306 A | 8/1974 | Angeloni |
| 3,848,254 A | 11/1974 | Drebinger et al. |
| 3,849,760 A | 11/1974 | Endou et al. |
| 3,914,692 A | 10/1975 | Seaborn, Jr. |
| 3,922,673 A | 11/1975 | Bishop |
| 3,928,719 A | 12/1975 | Sasabe et al. |
| 3,950,733 A | 4/1976 | Cooper et al. |
| 3,953,669 A | 4/1976 | Saccomani et al. |
| 3,956,797 A | 5/1976 | Brandestini et al. |
| 3,967,241 A | 6/1976 | Kawa |
| 3,980,948 A | 9/1976 | Olive |
| 3,984,638 A | 10/1976 | Carrouge |
| 3,986,119 A | 10/1976 | Hemmer, Jr. et al. |
| 3,993,955 A | 11/1976 | Belcher et al. |
| 3,993,976 A | 11/1976 | Ginsburg |
| 4,002,983 A | 1/1977 | Kavalir et al. |
| 4,008,376 A | 2/1977 | Flanagan et al. |
| 4,010,619 A | 3/1977 | Hightower et al. |
| 4,013,994 A | 3/1977 | Ragano et al. |
| 4,024,382 A | 5/1977 | Fowler |
| 4,025,851 A | 5/1977 | Haselwood et al. |
| 4,025,920 A | 5/1977 | Reitboeck et al. |
| 4,028,662 A | 6/1977 | Young |
| 4,031,543 A | 6/1977 | Holz |
| 4,044,243 A | 8/1977 | Cooper et al. |
| 4,067,411 A | 1/1978 | Conley et al. |
| 4,077,005 A | 2/1978 | Bishop |
| 4,081,792 A | 3/1978 | Schussler et al. |
| 4,084,241 A | 4/1978 | Tsumura |
| 4,084,323 A | 4/1978 | McMurtry |
| 4,100,370 A | 7/1978 | Suzuki et al. |
| 4,114,155 A | 9/1978 | Raab |
| 4,114,453 A | 9/1978 | Sandler |
| 4,117,511 A | 9/1978 | Baer et al. |
| 4,118,730 A | 10/1978 | Lemelson |
| 4,138,726 A | 2/1979 | Girault et al. |
| 4,139,889 A | 2/1979 | Ingels |
| 4,146,892 A | 3/1979 | Overman et al. |
| 4,148,061 A | 4/1979 | Lemelson |
| 4,152,693 A | 5/1979 | Ashworth, Jr. |
| 4,155,042 A | 5/1979 | Permut et al. |
| 4,162,377 A | 7/1979 | Mearns |
| 4,168,499 A | 9/1979 | Matsumura et al. |
| 4,168,576 A | 9/1979 | McMurtry |
| 4,185,265 A | 1/1980 | Griffin et al. |
| 4,187,492 A | 2/1980 | Delignieres |
| 4,200,770 A | 4/1980 | Hellman et al. |
| 4,203,076 A | 5/1980 | Yamashita |
| 4,208,652 A | 6/1980 | Marshall |
| 4,213,183 A | 7/1980 | Barron et al. |
| 4,218,582 A | 8/1980 | Hellman et al. |
| 4,221,975 A | 9/1980 | Ledniczki et al. |
| 4,225,850 A | 9/1980 | Chang et al. |
| 4,228,421 A | 10/1980 | Asada |
| 4,229,620 A | 10/1980 | Schaible |
| 4,229,737 A | 10/1980 | Heldwein et al. |
| 4,230,990 A | 10/1980 | Lert, Jr. et al. |
| 4,235,441 A | 11/1980 | Ciccarello |
| 4,239,415 A | 12/1980 | Blikken |
| 4,240,079 A | 12/1980 | Zhilin |
| 4,244,043 A | 1/1981 | Fujita et al. |
| 4,244,123 A | 1/1981 | Lazure et al. |
| 4,245,245 A | 1/1981 | Matsumoto et al. |
| 4,254,474 A | 3/1981 | Cooper et al. |
| 4,264,782 A | 4/1981 | Konheim |
| 4,264,924 A | 4/1981 | Freeman |
| 4,264,925 A | 4/1981 | Freeman et al. |
| 4,274,560 A | 6/1981 | Cater |
| 4,298,889 A | 11/1981 | Burianek et al. |
| 4,299,462 A | 11/1981 | Suzuki et al. |
| 4,301,506 A | 11/1981 | Turco |
| 4,303,978 A | 12/1981 | Shaw et al. |
| 4,305,131 A | 12/1981 | Best |
| 4,306,111 A | 12/1981 | Lu et al. |
| 4,309,569 A | 1/1982 | Merkle |
| 4,311,876 A | 1/1982 | Endo et al. |
| 4,313,263 A | 2/1982 | McMurtry |

(56) References Cited

U.S. PATENT DOCUMENTS

| | | |
|---|---|---|
| 4,323,921 A | 4/1982 | Guillou |
| 4,326,098 A | 4/1982 | Bouricius et al. |
| 4,326,259 A | 4/1982 | Cooper et al. |
| 4,331,974 A * | 5/1982 | Cogswell et al. ............... 725/34 |
| 4,333,238 A | 6/1982 | McMurtry |
| 4,337,529 A | 6/1982 | Morokawa |
| 4,338,492 A | 7/1982 | Snopko |
| 4,338,626 A | 7/1982 | Lemelson |
| 4,346,407 A | 8/1982 | Baer et al. |
| 4,349,701 A | 9/1982 | Snopko |
| 4,349,823 A | 9/1982 | Tagami et al. |
| 4,350,970 A | 9/1982 | von Tomkewitsch |
| 4,351,982 A | 9/1982 | Miller et al. |
| 4,356,509 A | 10/1982 | Skerlos et al. |
| 4,359,733 A | 11/1982 | O'Neill |
| 4,363,108 A | 12/1982 | Lange et al. |
| 4,365,110 A | 12/1982 | Lee et al. |
| 4,367,453 A | 1/1983 | Kuno et al. |
| 4,369,426 A | 1/1983 | Merkel |
| 4,376,575 A | 3/1983 | Someya et al. |
| 4,377,729 A | 3/1983 | Stacy |
| 4,384,293 A | 5/1983 | Deem et al. |
| 4,386,233 A | 5/1983 | Smid et al. |
| 4,390,904 A | 6/1983 | Johnston et al. |
| 4,393,269 A | 7/1983 | Konheim et al. |
| 4,393,270 A | 7/1983 | van den Berg |
| 4,393,819 A | 7/1983 | Tanaka et al. |
| 4,395,780 A | 7/1983 | Gohm et al. |
| 4,399,323 A | 8/1983 | Henry |
| 4,399,330 A | 8/1983 | Kuenzel |
| 4,402,049 A | 8/1983 | Gray |
| 4,403,291 A | 9/1983 | Von Tomkewitsch |
| 4,405,829 A | 9/1983 | Rivest et al. |
| 4,406,016 A | 9/1983 | Abrams et al. |
| 4,414,005 A | 11/1983 | De Bievre et al. |
| 4,414,432 A | 11/1983 | Skerlos et al. |
| 4,417,246 A | 11/1983 | Agnor et al. |
| 4,420,769 A | 12/1983 | Novak |
| 4,422,202 A | 12/1983 | Malvasio |
| 4,422,802 A | 12/1983 | Choate |
| 4,424,414 A | 1/1984 | Hellman et al. |
| 4,424,415 A | 1/1984 | Lin |
| 4,426,937 A | 1/1984 | Sietmann et al. |
| 4,427,847 A | 1/1984 | Hofmann et al. |
| 4,428,057 A | 1/1984 | Setliff et al. |
| 4,431,389 A | 2/1984 | Johnson |
| 4,437,151 A | 3/1984 | Hurt et al. |
| 4,438,824 A | 3/1984 | Mueller-Schloer |
| 4,439,788 A | 3/1984 | Frame |
| 4,441,256 A | 4/1984 | Cummings et al. |
| 4,441,526 A | 4/1984 | Taft et al. |
| 4,442,544 A | 4/1984 | Moreland et al. |
| 4,445,118 A | 4/1984 | Taylor et al. |
| 4,449,240 A | 5/1984 | Yoshida |
| 4,450,477 A | 5/1984 | Lovett |
| 4,450,531 A | 5/1984 | Kenyon et al. |
| 4,451,825 A | 5/1984 | Hall et al. |
| 4,453,074 A | 6/1984 | Weinstein |
| 4,454,529 A | 6/1984 | Philofsky et al. |
| 4,454,556 A | 6/1984 | DePuy |
| 4,456,925 A | 6/1984 | Skerlos et al. |
| 4,458,109 A | 7/1984 | Mueller-Schloer |
| 4,458,920 A | 7/1984 | Ozaki |
| 4,459,657 A | 7/1984 | Murao |
| 4,459,667 A | 7/1984 | Takeuchi |
| 4,463,357 A | 7/1984 | MacDoran |
| 4,464,625 A | 8/1984 | Lienhard et al. |
| 4,465,220 A | 8/1984 | Ledlow et al. |
| 4,465,902 A | 8/1984 | Zato |
| 4,466,125 A | 8/1984 | Kanayama |
| 4,468,704 A | 8/1984 | Stoffel et al. |
| 4,468,930 A | 9/1984 | Johnson |
| 4,471,164 A | 9/1984 | Henry |
| 4,471,273 A | 9/1984 | Melocik et al. |
| 4,471,319 A | 9/1984 | Metz |
| 4,471,518 A | 9/1984 | Gold |
| 4,471,520 A | 9/1984 | Houck et al. |
| 4,472,663 A | 9/1984 | Melocik |
| 4,476,336 A | 10/1984 | Sherwin |
| 4,476,584 A | 10/1984 | Dages |
| 4,479,373 A | 10/1984 | Montorfano et al. |
| 4,481,437 A | 11/1984 | Parker |
| 4,481,584 A | 11/1984 | Holland |
| 4,484,044 A | 11/1984 | Yoshigae |
| 4,485,383 A | 11/1984 | Maher |
| 4,486,832 A | 12/1984 | Haubner et al. |
| 4,491,694 A | 1/1985 | Harmeyer |
| 4,491,962 A | 1/1985 | Sakou et al. |
| 4,492,036 A | 1/1985 | Beckwith, Jr. |
| 4,492,170 A | 1/1985 | Solomon |
| 4,492,952 A | 1/1985 | Miller |
| 4,494,114 A | 1/1985 | Kaish |
| 4,494,121 A | 1/1985 | Walter et al. |
| 4,495,112 A | 1/1985 | Itou et al. |
| 4,495,283 A | 1/1985 | Araki et al. |
| 4,499,006 A | 2/1985 | Valone et al. |
| 4,499,009 A | 2/1985 | Yamanaka et al. |
| 4,499,022 A | 2/1985 | Battais et al. |
| 4,499,057 A | 2/1985 | Burgard et al. |
| 4,499,601 A | 2/1985 | Matthews |
| 4,501,016 A | 2/1985 | Persoon et al. |
| 4,502,313 A | 3/1985 | Phalin et al. |
| 4,504,545 A | 3/1985 | Kurita et al. |
| 4,504,546 A | 3/1985 | Sallay |
| 4,506,301 A | 3/1985 | Kingsley et al. |
| 4,508,271 A | 4/1985 | Gress |
| 4,508,845 A | 4/1985 | Dromard et al. |
| 4,508,999 A | 4/1985 | Melocik et al. |
| 4,509,986 A | 4/1985 | Hooykaas |
| 4,511,918 A | 4/1985 | Lemelson |
| 4,511,947 A | 4/1985 | Melocik et al. |
| 4,514,592 A | 4/1985 | Miyaguchi |
| 4,514,665 A | 4/1985 | Melocik et al. |
| 4,518,350 A | 5/1985 | Mueller et al. |
| 4,518,902 A | 5/1985 | Melocik et al. |
| 4,519,086 A | 5/1985 | Hull et al. |
| 4,519,462 A | 5/1985 | Kelley |
| 4,520,674 A | 6/1985 | Canada et al. |
| 4,521,644 A | 6/1985 | Bernard, Jr. |
| 4,521,885 A | 6/1985 | Melocik et al. |
| 4,523,450 A | 6/1985 | Herzog |
| 4,527,508 A | 7/1985 | Juve |
| 4,527,608 A | 7/1985 | Bak et al. |
| 4,528,335 A | 7/1985 | Selby et al. |
| 4,528,563 A | 7/1985 | Takeuchi |
| 4,528,588 A | 7/1985 | Lofberg |
| 4,529,410 A | 7/1985 | Khaladji et al. |
| 4,529,435 A | 7/1985 | Lavanish |
| 4,529,436 A | 7/1985 | Pasarela |
| 4,529,437 A | 7/1985 | Colle et al. |
| 4,529,870 A | 7/1985 | Chaum |
| 4,529,919 A | 7/1985 | Melocik et al. |
| 4,532,589 A | 7/1985 | Shintani et al. |
| 4,535,453 A | 8/1985 | Rhodes et al. |
| 4,535,866 A | 8/1985 | Shiga |
| 4,536,791 A * | 8/1985 | Campbell et al. ............... 725/28 |
| 4,539,642 A | 9/1985 | Mizuno et al. |
| 4,543,577 A | 9/1985 | Tachibana et al. |
| 4,543,660 A | 9/1985 | Maeda |
| 4,543,665 A | 9/1985 | Sotelo et al. |
| 4,544,295 A | 10/1985 | Hashimoto et al. |
| 4,546,382 A | 10/1985 | McKenna et al. |
| 4,546,387 A | 10/1985 | Glaab |
| 4,546,439 A | 10/1985 | Gene Esparza |
| 4,547,438 A | 10/1985 | McArthur et al. |
| 4,547,439 A | 10/1985 | Genies |
| 4,547,778 A | 10/1985 | Hinkle et al. |
| 4,547,811 A | 10/1985 | Ochi et al. |
| 4,547,899 A | 10/1985 | Nally et al. |
| 4,548,815 A | 10/1985 | Ponsford et al. |
| 4,549,004 A | 10/1985 | von Au et al. |
| 4,549,014 A | 10/1985 | Georgiev et al. |
| 4,550,317 A | 10/1985 | Moriyama et al. |
| 4,550,663 A | 11/1985 | DeViaris |

(56) References Cited

U.S. PATENT DOCUMENTS

| | | |
|---|---|---|
| 4,552,456 A | 11/1985 | Endo |
| 4,555,192 A | 11/1985 | Ochiai |
| 4,555,651 A | 11/1985 | Melocik et al. |
| 4,558,176 A | 12/1985 | Arnold et al. |
| 4,558,464 A | 12/1985 | O'Brien, Jr. |
| 4,561,907 A | 12/1985 | Raicu |
| 4,564,018 A | 1/1986 | Hutchison et al. |
| 4,564,085 A | 1/1986 | Melocik et al. |
| 4,567,512 A * | 1/1986 | Abraham ............ 725/93 |
| 4,567,600 A | 1/1986 | Massey et al. |
| 4,567,756 A | 2/1986 | Colborn |
| 4,567,757 A | 2/1986 | Melocik et al. |
| 4,570,227 A | 2/1986 | Tachi et al. |
| 4,571,131 A | 2/1986 | Date |
| 4,571,847 A | 2/1986 | McMurtry |
| 4,572,079 A | 2/1986 | Theurer |
| 4,573,072 A | 2/1986 | Freeman |
| 4,575,223 A | 3/1986 | Shimono et al. |
| 4,575,621 A | 3/1986 | Dreifus |
| 4,575,628 A | 3/1986 | Bankart et al. |
| 4,575,679 A | 3/1986 | Chung et al. |
| 4,575,755 A | 3/1986 | Schoeneberger et al. |
| 4,575,763 A | 3/1986 | Elabd |
| 4,575,769 A | 3/1986 | Arnoldi |
| 4,578,531 A | 3/1986 | Everhart et al. |
| 4,578,678 A | 3/1986 | Hurd |
| 4,579,482 A | 4/1986 | Gastaldi et al. |
| 4,579,550 A | 4/1986 | Walker |
| 4,579,882 A | 4/1986 | Kanbe et al. |
| 4,579,906 A | 4/1986 | Zabrocki et al. |
| 4,580,742 A | 4/1986 | Moosberg et al. |
| 4,581,762 A | 4/1986 | Lapidus et al. |
| 4,581,769 A | 4/1986 | Grimsley et al. |
| 4,582,942 A | 4/1986 | Comninellis et al. |
| 4,584,412 A | 4/1986 | Aicher et al. |
| 4,584,709 A | 4/1986 | Kneisel et al. |
| 4,588,458 A | 5/1986 | Previsani |
| 4,589,423 A | 5/1986 | Turner |
| 4,590,470 A | 5/1986 | Koenig |
| 4,591,730 A | 5/1986 | Pennoni |
| 4,591,752 A | 5/1986 | Thouret et al. |
| 4,591,823 A | 5/1986 | Horvat |
| 4,591,976 A | 5/1986 | Webber et al. |
| 4,592,004 A | 5/1986 | Bocker et al. |
| 4,592,280 A | 6/1986 | Shores |
| 4,592,282 A | 6/1986 | Niemi et al. |
| 4,593,367 A | 6/1986 | Slack et al. |
| 4,593,814 A | 6/1986 | Hagiwara et al. |
| 4,593,819 A | 6/1986 | Will |
| 4,595,560 A | 6/1986 | Buchner et al. |
| 4,595,625 A | 6/1986 | Crass et al. |
| 4,595,662 A | 6/1986 | Mochida et al. |
| 4,595,950 A | 6/1986 | Lofberg |
| 4,596,005 A | 6/1986 | Frasier |
| 4,596,010 A | 6/1986 | Beckner et al. |
| 4,596,362 A | 6/1986 | Pralle et al. |
| 4,596,988 A | 6/1986 | Wanka |
| 4,597,653 A | 7/1986 | Seely et al. |
| 4,597,772 A | 7/1986 | Coffman |
| 4,599,620 A | 7/1986 | Evans |
| 4,600,921 A | 7/1986 | Thomas |
| 4,602,279 A | 7/1986 | Freeman |
| 4,603,349 A | 7/1986 | Robbins |
| 4,603,677 A | 8/1986 | Gile et al. |
| 4,603,689 A | 8/1986 | Horner |
| 4,604,007 A | 8/1986 | Hall et al. |
| 4,606,815 A | 8/1986 | Gibson |
| 4,607,842 A | 8/1986 | Daoust |
| 4,607,867 A | 8/1986 | Jansen |
| 4,607,872 A | 8/1986 | Herner |
| 4,609,089 A | 9/1986 | Kobayashi et al. |
| 4,609,092 A | 9/1986 | Takai |
| 4,609,095 A | 9/1986 | Lenherr et al. |
| 4,609,098 A | 9/1986 | Morgan et al. |
| 4,609,104 A | 9/1986 | Kasper et al. |
| 4,612,850 A | 9/1986 | Kanazashi et al. |
| 4,613,867 A | 9/1986 | Golinsky |
| 4,614,452 A | 9/1986 | Wang |
| 4,614,474 A | 9/1986 | Sudo |
| 4,614,533 A | 9/1986 | Schallner et al. |
| 4,614,545 A | 9/1986 | Hess |
| 4,614,546 A | 9/1986 | Schroer et al. |
| 4,616,214 A | 10/1986 | Naito |
| 4,617,406 A | 10/1986 | Willging |
| 4,617,407 A | 10/1986 | Young et al. |
| 4,619,943 A | 10/1986 | Rao |
| 4,619,946 A | 10/1986 | Sapienza et al. |
| 4,619,976 A | 10/1986 | Morris et al. |
| 4,620,036 A | 10/1986 | Ono et al. |
| 4,620,225 A | 10/1986 | Wendland et al. |
| 4,620,235 A | 10/1986 | Watt |
| 4,620,247 A | 10/1986 | Papciak et al. |
| 4,620,253 A | 10/1986 | Garwin et al. |
| 4,620,259 A | 10/1986 | Oshizawa |
| 4,620,265 A | 10/1986 | Lerude et al. |
| 4,620,266 A | 10/1986 | Baumann et al. |
| 4,620,268 A | 10/1986 | Ferenc |
| 4,621,285 A | 11/1986 | Schilling et al. |
| 4,622,557 A | 11/1986 | Westerfield |
| 4,624,108 A | 11/1986 | Leiber |
| 4,625,076 A | 11/1986 | Okamoto et al. |
| 4,625,222 A | 11/1986 | Bassetti et al. |
| 4,626,634 A | 12/1986 | Brahm et al. |
| 4,626,658 A | 12/1986 | Gray et al. |
| 4,626,670 A | 12/1986 | Miller |
| 4,626,676 A | 12/1986 | Gerardin |
| 4,626,677 A | 12/1986 | Browne |
| 4,626,678 A | 12/1986 | Morita et al. |
| 4,626,788 A | 12/1986 | Ishigaki |
| 4,626,801 A | 12/1986 | Field |
| 4,626,850 A | 12/1986 | Chey |
| 4,626,891 A | 12/1986 | Achiha |
| 4,626,929 A | 12/1986 | Ichinoi et al. |
| 4,626,933 A | 12/1986 | Bucska et al. |
| 4,626,939 A | 12/1986 | Takai et al. |
| 4,628,608 A | 12/1986 | Kuhlmann et al. |
| 4,630,108 A | 12/1986 | Gomersall |
| 4,630,308 A | 12/1986 | Hongo |
| 4,630,685 A | 12/1986 | Huck, Jr. et al. |
| 4,631,542 A | 12/1986 | Grimsley |
| 4,631,735 A | 12/1986 | Qureshi |
| 4,632,058 A | 12/1986 | Dixon et al. |
| 4,632,109 A | 12/1986 | Paterson |
| 4,632,197 A | 12/1986 | Karpa |
| 4,632,198 A | 12/1986 | Uchimura |
| 4,632,199 A | 12/1986 | Ober et al. |
| 4,632,200 A | 12/1986 | Doyen et al. |
| 4,633,036 A | 12/1986 | Hellman et al. |
| 4,633,966 A | 1/1987 | Fotheringham |
| 4,634,402 A | 1/1987 | Hazebrook |
| 4,637,182 A | 1/1987 | Ellsworth et al. |
| 4,637,488 A | 1/1987 | Fotheringham et al. |
| 4,637,540 A | 1/1987 | Fujita et al. |
| 4,638,188 A | 1/1987 | Cray |
| 4,638,445 A | 1/1987 | Mattaboni |
| 4,639,978 A | 2/1987 | Boden |
| 4,640,339 A | 2/1987 | Klaren |
| 4,642,639 A | 2/1987 | Nelson |
| 4,642,775 A | 2/1987 | Cline et al. |
| 4,644,141 A | 2/1987 | Hagen et al. |
| 4,644,351 A | 2/1987 | Zabarsky et al. |
| 4,644,368 A | 2/1987 | Mutz |
| 4,644,903 A | 2/1987 | Shaver |
| 4,644,907 A | 2/1987 | Hunter |
| 4,645,049 A | 2/1987 | Matsuda et al. |
| 4,646,089 A | 2/1987 | Takanabe et al. |
| 4,646,096 A | 2/1987 | Brown |
| 4,646,145 A | 2/1987 | Percy et al. |
| 4,646,250 A | 2/1987 | Childress |
| 4,647,784 A | 3/1987 | Stephens |
| 4,648,042 A | 3/1987 | Staiger |
| 4,649,524 A | 3/1987 | Vance |
| 4,651,157 A | 3/1987 | Gray et al. |
| 4,652,884 A | 3/1987 | Starker |

(56) References Cited

U.S. PATENT DOCUMENTS

| | | |
|---|---|---|
| 4,653,109 A | 3/1987 | Lemelson et al. |
| 4,654,377 A | 3/1987 | Mohring et al. |
| 4,654,867 A | 3/1987 | Labedz et al. |
| 4,654,879 A | 3/1987 | Goldman et al. |
| 4,656,179 A | 4/1987 | Bernath et al. |
| 4,656,463 A | 4/1987 | Anders et al. |
| 4,656,476 A | 4/1987 | Tavtigian |
| 4,656,665 A | 4/1987 | Pennebaker |
| 4,656,976 A | 4/1987 | Rhoads |
| 4,657,256 A | 4/1987 | Okada |
| 4,657,258 A | 4/1987 | Melov et al. |
| 4,657,264 A | 4/1987 | Wehber |
| 4,657,799 A | 4/1987 | Nann et al. |
| 4,658,094 A | 4/1987 | Clark |
| 4,658,290 A | 4/1987 | McKenna et al. |
| 4,658,298 A | 4/1987 | Takeda et al. |
| 4,658,370 A | 4/1987 | Erman et al. |
| 4,658,429 A | 4/1987 | Orita et al. |
| 4,659,970 A | 4/1987 | Melocik |
| 4,660,166 A | 4/1987 | Hopfield |
| 4,663,630 A | 5/1987 | Numaho et al. |
| 4,666,379 A | 5/1987 | Smith |
| 4,666,384 A | 5/1987 | Kaga et al. |
| 4,666,461 A | 5/1987 | Dorer, Jr. |
| 4,666,480 A | 5/1987 | Mann |
| 4,666,490 A | 5/1987 | Drake |
| 4,666,580 A | 5/1987 | Beaver et al. |
| 4,666,757 A | 5/1987 | Helinski |
| 4,667,203 A | 5/1987 | Counselman, III |
| 4,668,515 A | 5/1987 | Bankit et al. |
| 4,668,952 A | 5/1987 | Imazeki et al. |
| 4,669,185 A | 6/1987 | Westover et al. |
| 4,669,186 A | 6/1987 | Liu |
| 4,670,688 A | 6/1987 | Sigai et al. |
| 4,671,654 A | 6/1987 | Miyahara et al. |
| 4,672,683 A | 6/1987 | Matsueda |
| 4,672,860 A | 6/1987 | Parker |
| 4,673,936 A | 6/1987 | Kotoh |
| 4,674,041 A | 6/1987 | Lemon et al. |
| 4,674,048 A | 6/1987 | Okumura |
| 4,677,466 A | 6/1987 | Lert, Jr. et al. |
| 4,677,555 A | 6/1987 | Goyet |
| 4,677,563 A | 6/1987 | Itoh et al. |
| 4,677,680 A | 6/1987 | Harima et al. |
| 4,677,686 A | 6/1987 | Hustig et al. |
| 4,677,845 A | 7/1987 | Izumi et al. |
| 4,678,329 A | 7/1987 | Lukowski, Jr. et al. |
| 4,678,792 A | 7/1987 | Nickl et al. |
| 4,678,793 A | 7/1987 | Klaus et al. |
| 4,678,814 A | 7/1987 | Rembaum |
| 4,679,137 A | 7/1987 | Lane et al. |
| 4,679,147 A | 7/1987 | Tsujii et al. |
| 4,680,715 A | 7/1987 | Pawelek |
| 4,680,787 A | 7/1987 | Marry |
| 4,680,835 A | 7/1987 | Horng |
| 4,681,576 A | 7/1987 | Colon et al. |
| 4,682,365 A | 7/1987 | Orita et al. |
| 4,682,953 A | 7/1987 | Doerfel et al. |
| 4,683,860 A | 8/1987 | Shimamura et al. |
| 4,684,247 A | 8/1987 | Hammill, III |
| 4,684,331 A | 8/1987 | LaGrange et al. |
| 4,685,145 A | 8/1987 | Schiller |
| 4,685,821 A | 8/1987 | Marsh |
| 4,686,006 A | 8/1987 | Cheshire et al. |
| 4,686,009 A | 8/1987 | McCabe |
| 4,686,356 A | 8/1987 | Ueda et al. |
| 4,686,357 A | 8/1987 | Douno et al. |
| 4,686,995 A | 8/1987 | Fournial et al. |
| 4,687,732 A | 8/1987 | Ward et al. |
| 4,688,244 A | 8/1987 | Hannon et al. |
| 4,689,867 A | 9/1987 | Tolliver |
| 4,690,610 A | 9/1987 | Fotheringham |
| 4,690,859 A | 9/1987 | Porter et al. |
| 4,691,097 A | 9/1987 | Theiss et al. |
| 4,691,104 A | 9/1987 | Murata et al. |
| 4,691,106 A | 9/1987 | Hyun et al. |
| 4,691,149 A | 9/1987 | Baumgartner et al. |
| 4,691,385 A | 9/1987 | Tupman |
| 4,694,458 A | 9/1987 | Midavaine et al. |
| 4,694,463 A | 9/1987 | Hirth et al. |
| 4,695,175 A | 9/1987 | Tsukada et al. |
| 4,695,429 A | 9/1987 | Lupoli et al. |
| 4,695,587 A | 9/1987 | Terahara et al. |
| 4,695,975 A | 9/1987 | Bedrij |
| 4,696,290 A | 9/1987 | Steffee |
| 4,696,291 A | 9/1987 | Tyo |
| 4,697,209 A * | 9/1987 | Kiewit et al. ................... 725/19 |
| 4,697,248 A | 9/1987 | Shirota |
| 4,697,251 A | 9/1987 | Birrittella et al. |
| 4,697,256 A | 9/1987 | Shinkai |
| 4,697,281 A | 9/1987 | O'Sullivan |
| 4,697,282 A | 9/1987 | Winter et al. |
| 4,697,503 A | 10/1987 | Okabe et al. |
| 4,698,632 A | 10/1987 | Baba et al. |
| 4,699,458 A | 10/1987 | Ohtsuki et al. |
| 4,699,527 A | 10/1987 | Hutzel |
| 4,699,540 A | 10/1987 | Gibbon et al. |
| 4,700,191 A | 10/1987 | Manor |
| 4,700,301 A | 10/1987 | Dyke |
| 4,701,135 A | 10/1987 | Volk et al. |
| 4,701,197 A | 10/1987 | Thornton et al. |
| 4,701,760 A | 10/1987 | Raoux |
| 4,701,934 A | 10/1987 | Jasper |
| 4,702,077 A | 10/1987 | Lilley et al. |
| 4,703,444 A | 10/1987 | Storms, Jr. et al. |
| 4,704,763 A | 11/1987 | Sacks et al. |
| 4,706,056 A | 11/1987 | McCullough |
| 4,706,074 A | 11/1987 | Muhich et al. |
| 4,706,121 A * | 11/1987 | Young ............................. 348/27 |
| 4,706,675 A | 11/1987 | Ekins |
| 4,706,688 A | 11/1987 | Don Michael et al. |
| 4,706,772 A | 11/1987 | Dawson et al. |
| 4,707,126 A | 11/1987 | Ohshima et al. |
| 4,707,926 A | 11/1987 | Decker, Jr. |
| 4,709,195 A | 11/1987 | Hellekson et al. |
| 4,709,407 A | 11/1987 | Baba |
| 4,710,822 A | 12/1987 | Matsunawa |
| 4,710,955 A | 12/1987 | Kauffman |
| 4,710,964 A | 12/1987 | Yamaguchi et al. |
| 4,713,767 A | 12/1987 | Sato et al. |
| 4,713,775 A | 12/1987 | Scott et al. |
| 4,716,404 A | 12/1987 | Tabata et al. |
| 4,718,080 A | 1/1988 | Serrano et al. |
| 4,719,591 A | 1/1988 | Hopfield et al. |
| 4,722,410 A | 2/1988 | Melocik et al. |
| 4,725,840 A | 2/1988 | Orazietti |
| 4,727,492 A | 2/1988 | Reeve et al. |
| 4,727,962 A | 3/1988 | Nelson |
| 4,728,922 A | 3/1988 | Christen et al. |
| 4,730,690 A | 3/1988 | McNutt et al. |
| 4,731,613 A | 3/1988 | Endo et al. |
| 4,731,841 A | 3/1988 | Rosen et al. |
| 4,731,863 A | 3/1988 | Sezan et al. |
| 4,733,356 A | 3/1988 | Haeussermann et al. |
| 4,734,564 A | 3/1988 | Boston et al. |
| 4,734,786 A | 3/1988 | Minakawa et al. |
| 4,734,928 A | 3/1988 | Weiner et al. |
| 4,736,203 A | 4/1988 | Sidlauskas |
| 4,736,439 A | 4/1988 | May |
| 4,737,927 A | 4/1988 | Hanabusa et al. |
| 4,737,978 A | 4/1988 | Burke et al. |
| 4,739,398 A | 4/1988 | Thomas et al. |
| 4,740,778 A | 4/1988 | Harding et al. |
| 4,741,245 A | 5/1988 | Malone |
| 4,741,412 A | 5/1988 | Sable |
| 4,742,557 A | 5/1988 | Ma |
| 4,743,913 A | 5/1988 | Takai |
| 4,744,761 A | 5/1988 | Doerfel et al. |
| 4,745,549 A * | 5/1988 | Hashimoto ....................... 705/8 |
| 4,747,148 A | 5/1988 | Watanabe et al. |
| 4,750,197 A | 6/1988 | Denekamp et al. |
| 4,750,215 A | 6/1988 | Biggs |
| 4,751,512 A | 6/1988 | Longaker |
| 4,751,983 A | 6/1988 | Leskovec et al. |

(56) References Cited

U.S. PATENT DOCUMENTS

| | | |
|---|---|---|
| 4,752,676 A | 6/1988 | Leonard et al. |
| 4,752,890 A | 6/1988 | Natarajan et al. |
| 4,754,280 A | 6/1988 | Brown et al. |
| 4,754,283 A | 6/1988 | Fowler |
| 4,754,465 A | 6/1988 | Trimble |
| 4,755,872 A | 7/1988 | Bestler et al. |
| 4,755,905 A | 7/1988 | Telecky, Jr. |
| 4,757,267 A | 7/1988 | Riskin |
| 4,757,450 A | 7/1988 | Etoh |
| 4,757,455 A | 7/1988 | Tsunoda et al. |
| 4,758,959 A | 7/1988 | Thoone et al. |
| 4,760,604 A | 7/1988 | Cooper et al. |
| 4,761,742 A | 8/1988 | Hanabusa et al. |
| 4,763,270 A | 8/1988 | Itoh et al. |
| 4,763,418 A | 8/1988 | Decker, Jr. |
| 4,764,971 A | 8/1988 | Sullivan |
| 4,764,973 A | 8/1988 | O'Hair |
| 4,769,697 A | 9/1988 | Gilley et al. |
| 4,771,467 A | 9/1988 | Catros et al. |
| 4,772,410 A | 9/1988 | Sato |
| 4,773,024 A | 9/1988 | Faggin et al. |
| 4,773,099 A | 9/1988 | Bokser |
| 4,774,672 A | 9/1988 | Tsunoda et al. |
| 4,774,677 A | 9/1988 | Buckley |
| 4,775,935 A | 10/1988 | Yourick |
| 4,776,750 A | 10/1988 | Griswold, Jr. et al. |
| 4,777,818 A | 10/1988 | McMurtry |
| 4,780,717 A | 10/1988 | Takanabe et al. |
| 4,780,759 A | 10/1988 | Matsushima et al. |
| 4,781,514 A | 11/1988 | Schneider |
| 4,782,447 A | 11/1988 | Ueno et al. |
| 4,783,741 A | 11/1988 | Mitterauer |
| 4,783,752 A | 11/1988 | Kaplan et al. |
| 4,783,754 A | 11/1988 | Bauck et al. |
| 4,783,829 A | 11/1988 | Miyakawa et al. |
| 4,785,463 A | 11/1988 | Janc et al. |
| 4,786,164 A | 11/1988 | Kawata |
| 4,789,933 A | 12/1988 | Chen et al. |
| 4,790,025 A | 12/1988 | Inoue et al. |
| 4,790,402 A | 12/1988 | Field et al. |
| 4,791,420 A | 12/1988 | Baba |
| 4,791,572 A | 12/1988 | Green, III et al. |
| 4,792,995 A | 12/1988 | Harding |
| 4,796,189 A | 1/1989 | Nakayama et al. |
| 4,796,191 A | 1/1989 | Honey et al. |
| 4,797,920 A | 1/1989 | Stein |
| 4,799,062 A | 1/1989 | Sanderford, Jr. et al. |
| 4,799,156 A | 1/1989 | Shavit et al. |
| 4,799,270 A | 1/1989 | Kim et al. |
| 4,801,938 A | 1/1989 | Holmes |
| 4,802,103 A | 1/1989 | Faggin et al. |
| 4,802,230 A | 1/1989 | Horowitz |
| 4,803,103 A | 2/1989 | Pithouse et al. |
| 4,803,736 A | 2/1989 | Grossberg et al. |
| 4,804,893 A | 2/1989 | Melocik |
| 4,804,937 A | 2/1989 | Barbiaux et al. |
| 4,805,224 A | 2/1989 | Koezuka et al. |
| 4,805,225 A | 2/1989 | Clark |
| 4,805,231 A | 2/1989 | Whidden |
| 4,805,255 A | 2/1989 | Hed |
| 4,807,131 A | 2/1989 | Clegg |
| 4,807,714 A | 2/1989 | Blau et al. |
| 4,809,005 A | 2/1989 | Counselman, III |
| 4,809,178 A | 2/1989 | Ninomiya et al. |
| 4,809,331 A | 2/1989 | Holmes |
| 4,809,341 A | 2/1989 | Matsui et al. |
| 4,812,628 A | 3/1989 | Boston et al. |
| 4,812,820 A | 3/1989 | Chatwin |
| 4,812,843 A | 3/1989 | Champion, III et al. |
| 4,812,845 A | 3/1989 | Yamada et al. |
| 4,812,991 A | 3/1989 | Hatch |
| 4,814,711 A | 3/1989 | Olsen et al. |
| 4,814,989 A | 3/1989 | Dobereiner et al. |
| 4,815,020 A | 3/1989 | Cormier |
| 4,815,213 A | 3/1989 | McCabe et al. |
| 4,817,171 A | 3/1989 | Stentiford |
| 4,817,176 A | 3/1989 | Marshall et al. |
| 4,818,171 A | 4/1989 | Burkholder |
| 4,818,997 A | 4/1989 | Holmes |
| 4,819,053 A | 4/1989 | Halavais |
| 4,819,174 A | 4/1989 | Furuno et al. |
| 4,819,195 A | 4/1989 | Bell et al. |
| 4,819,267 A | 4/1989 | Cargile et al. |
| 4,819,860 A | 4/1989 | Hargrove et al. |
| 4,821,294 A | 4/1989 | Thomas, Jr. |
| 4,821,309 A | 4/1989 | Namekawa |
| 4,821,333 A | 4/1989 | Gillies |
| 4,823,194 A | 4/1989 | Mishima et al. |
| 4,823,901 A | 4/1989 | Harding |
| 4,825,457 A | 4/1989 | Lebowitz |
| 4,827,518 A | 5/1989 | Feustel et al. |
| 4,829,372 A | 5/1989 | McCalley et al. |
| 4,829,434 A | 5/1989 | Karmel et al. |
| 4,829,442 A | 5/1989 | Kadonoff et al. |
| 4,829,453 A | 5/1989 | Katsuta et al. |
| 4,831,539 A | 5/1989 | Hagenbuch |
| 4,831,659 A | 5/1989 | Miyaoka et al. |
| 4,833,469 A | 5/1989 | David |
| 4,833,477 A | 5/1989 | Tendler |
| 4,833,637 A | 5/1989 | Casasent et al. |
| 4,837,700 A | 6/1989 | Ando et al. |
| 4,837,842 A | 6/1989 | Holt |
| 4,839,835 A | 6/1989 | Hagenbuch |
| 4,841,302 A | 6/1989 | Henry |
| 4,841,575 A | 6/1989 | Welsh et al. |
| 4,843,562 A * | 6/1989 | Kenyon et al. ................. 702/73 |
| 4,843,631 A | 6/1989 | Steinpichler et al. |
| 4,845,610 A | 7/1989 | Parvin |
| 4,846,297 A | 7/1989 | Field et al. |
| 4,847,698 A | 7/1989 | Freeman |
| 4,847,699 A | 7/1989 | Freeman |
| 4,847,700 A | 7/1989 | Freeman |
| 4,847,862 A | 7/1989 | Braisted et al. |
| 4,849,731 A | 7/1989 | Melocik |
| 4,852,146 A | 7/1989 | Hathcock et al. |
| 4,853,859 A | 8/1989 | Morita et al. |
| 4,855,713 A | 8/1989 | Brunius |
| 4,855,915 A | 8/1989 | Dallaire |
| 4,860,006 A | 8/1989 | Barall |
| 4,860,352 A | 8/1989 | Laurance et al. |
| 4,861,220 A | 8/1989 | Smith |
| 4,862,015 A | 8/1989 | Grandfield |
| 4,862,175 A | 8/1989 | Biggs et al. |
| 4,862,422 A | 8/1989 | Brac |
| 4,864,284 A | 9/1989 | Crayton et al. |
| 4,864,592 A | 9/1989 | Lee |
| 4,864,629 A | 9/1989 | Deering |
| 4,866,450 A | 9/1989 | Chisholm |
| 4,866,776 A | 9/1989 | Kasai et al. |
| 4,866,787 A | 9/1989 | Olesen |
| 4,868,376 A | 9/1989 | Lessin et al. |
| 4,868,859 A | 9/1989 | Sheffer |
| 4,868,866 A | 9/1989 | Williams, Jr. |
| 4,869,635 A | 9/1989 | Krahn |
| 4,870,422 A | 9/1989 | Counselman, III |
| 4,872,024 A | 10/1989 | Nagai et al. |
| 4,876,527 A | 10/1989 | Oka et al. |
| 4,876,659 A | 10/1989 | Devereux et al. |
| 4,876,731 A | 10/1989 | Loris et al. |
| 4,878,170 A | 10/1989 | Zeevi |
| 4,878,179 A | 10/1989 | Larsen et al. |
| 4,879,658 A | 11/1989 | Takashima et al. |
| 4,881,270 A | 11/1989 | Knecht et al. |
| 4,882,689 A | 11/1989 | Aoki |
| 4,882,696 A | 11/1989 | Nimura et al. |
| 4,884,217 A | 11/1989 | Skeirik et al. |
| 4,884,348 A | 12/1989 | Zeller et al. |
| 4,887,068 A | 12/1989 | Umehara |
| 4,887,304 A | 12/1989 | Terzian |
| 4,888,699 A | 12/1989 | Knoll et al. |
| 4,888,814 A | 12/1989 | Yamaguchi et al. |
| 4,888,890 A | 12/1989 | Studebaker et al. |
| 4,890,233 A | 12/1989 | Ando et al. |
| 4,890,323 A | 12/1989 | Beker et al. |

(56) References Cited

U.S. PATENT DOCUMENTS

| | | |
|---|---|---|
| 4,891,650 A | 1/1990 | Sheffer |
| 4,891,761 A | 1/1990 | Gray et al. |
| 4,891,762 A | 1/1990 | Chotiros |
| 4,893,199 A | 1/1990 | Okada |
| 4,893,346 A | 1/1990 | Bishop |
| 4,894,655 A | 1/1990 | Joguet et al. |
| 4,894,662 A | 1/1990 | Counselman |
| 4,894,734 A | 1/1990 | Fischler et al. |
| 4,896,363 A | 1/1990 | Taylor et al. |
| 4,896,370 A | 1/1990 | Kasparian et al. |
| 4,897,642 A | 1/1990 | DiLullo et al. |
| 4,897,811 A | 1/1990 | Scofield |
| 4,899,285 A | 2/1990 | Nakayama et al. |
| 4,901,340 A | 2/1990 | Parker et al. |
| 4,902,986 A | 2/1990 | Lesmeister |
| 4,903,211 A | 2/1990 | Ando |
| 4,903,212 A | 2/1990 | Yokouchi et al. |
| 4,904,983 A | 2/1990 | Mitchell |
| 4,905,162 A | 2/1990 | Hartzband et al. |
| 4,905,163 A | 2/1990 | Garber et al. |
| 4,905,286 A | 2/1990 | Sedgwick et al. |
| 4,905,296 A | 2/1990 | Nishihara |
| 4,906,099 A | 3/1990 | Casasent |
| 4,906,940 A | 3/1990 | Greene et al. |
| 4,907,159 A | 3/1990 | Mauge et al. |
| 4,908,629 A | 3/1990 | Apsell et al. |
| 4,908,713 A | 3/1990 | Levine |
| 4,908,758 A | 3/1990 | Sanders |
| 4,910,493 A | 3/1990 | Chambers et al. |
| 4,910,677 A | 3/1990 | Remedio et al. |
| 4,912,433 A | 3/1990 | Motegi et al. |
| 4,912,475 A | 3/1990 | Counselman, III |
| 4,912,643 A | 3/1990 | Beirne |
| 4,912,645 A | 3/1990 | Kakihara et al. |
| 4,912,648 A | 3/1990 | Tyler |
| 4,912,756 A | 3/1990 | Hop |
| 4,914,609 A | 4/1990 | Shimizu et al. |
| 4,914,708 A | 4/1990 | Carpenter et al. |
| 4,918,425 A | 4/1990 | Greenberg et al. |
| 4,918,516 A | 4/1990 | Freeman |
| 4,918,609 A | 4/1990 | Yamawaki |
| 4,920,499 A | 4/1990 | Skeirik |
| 4,924,402 A | 5/1990 | Ando et al. |
| 4,924,417 A | 5/1990 | Yuasa |
| 4,924,699 A | 5/1990 | Kuroda et al. |
| 4,926,325 A | 5/1990 | Benton et al. |
| 4,926,336 A | 5/1990 | Yamada |
| 4,926,480 A | 5/1990 | Chaum |
| 4,926,491 A | 5/1990 | Maeda et al. |
| 4,928,105 A | 5/1990 | Langner |
| 4,928,106 A | 5/1990 | Ashjaee et al. |
| 4,928,107 A | 5/1990 | Kuroda et al. |
| 4,928,246 A | 5/1990 | Crawley et al. |
| 4,930,160 A | 5/1990 | Vogel |
| 4,931,926 A | 6/1990 | Tanaka et al. |
| 4,931,985 A | 6/1990 | Glaise et al. |
| 4,932,065 A | 6/1990 | Feldgajer |
| 4,932,910 A | 6/1990 | Hayday |
| 4,933,872 A | 6/1990 | Vandenberg et al. |
| 4,937,751 A | 6/1990 | Nimura et al. |
| 4,937,752 A | 6/1990 | Nanba et al. |
| 4,939,521 A | 7/1990 | Burin |
| 4,939,678 A | 7/1990 | Beckwith, Jr. |
| 4,941,173 A | 7/1990 | Boule et al. |
| 4,941,193 A | 7/1990 | Barnsley et al. |
| 4,943,925 A | 7/1990 | Moroto et al. |
| 4,944,023 A | 7/1990 | Imao et al. |
| 4,945,501 A | 7/1990 | Bell et al. |
| 4,947,151 A | 8/1990 | Rosenberger |
| 4,949,088 A | 8/1990 | Ryan et al. |
| 4,949,187 A | 8/1990 | Cohen |
| 4,949,268 A | 8/1990 | Nishikawa et al. |
| 4,951,029 A | 8/1990 | Severson |
| 4,951,211 A | 8/1990 | De Villeroche |
| 4,951,212 A | 8/1990 | Kurihara et al. |
| 4,952,928 A | 8/1990 | Carroll et al. |
| 4,952,936 A | 8/1990 | Martinson |
| 4,952,937 A | 8/1990 | Allen |
| 4,954,824 A | 9/1990 | Yamada et al. |
| 4,954,828 A | 9/1990 | Orr |
| 4,954,837 A | 9/1990 | Baird et al. |
| 4,954,958 A | 9/1990 | Savage et al. |
| 4,954,959 A | 9/1990 | Moroto et al. |
| 4,956,870 A | 9/1990 | Hara |
| 4,958,220 A | 9/1990 | Alessi et al. |
| 4,958,375 A | 9/1990 | Reilly et al. |
| 4,961,074 A | 10/1990 | Martinson |
| 4,961,142 A | 10/1990 | Elliott et al. |
| 4,962,473 A | 10/1990 | Crain |
| 4,963,865 A | 10/1990 | Ichikawa et al. |
| 4,963,889 A | 10/1990 | Hatch |
| 4,963,994 A | 10/1990 | Levine |
| 4,964,077 A | 10/1990 | Eisen et al. |
| 4,965,725 A | 10/1990 | Rutenberg |
| 4,965,821 A | 10/1990 | Bishop et al. |
| 4,967,273 A | 10/1990 | Greenberg |
| 4,968,981 A | 11/1990 | Sekine et al. |
| 4,970,652 A | 11/1990 | Nagashima |
| 4,970,681 A | 11/1990 | Bennett |
| 4,972,431 A | 11/1990 | Keegan |
| 4,972,476 A | 11/1990 | Nathans |
| 4,972,484 A | 11/1990 | Theile et al. |
| 4,972,499 A | 11/1990 | Kurosawa |
| 4,974,170 A | 11/1990 | Bouve et al. |
| 4,975,707 A | 12/1990 | Smith |
| 4,976,619 A | 12/1990 | Carlson |
| 4,977,455 A * | 12/1990 | Young ........................... 348/460 |
| 4,977,595 A | 12/1990 | Ohta et al. |
| 4,977,679 A | 12/1990 | Saito et al. |
| 4,979,222 A | 12/1990 | Weber |
| 4,982,344 A | 1/1991 | Jordan |
| 4,982,346 A | 1/1991 | Girouard et al. |
| 4,983,980 A | 1/1991 | Ando |
| 4,984,255 A | 1/1991 | Davis et al. |
| 4,986,384 A | 1/1991 | Okamoto et al. |
| 4,986,385 A | 1/1991 | Masaki |
| 4,987,604 A | 1/1991 | Rouch |
| 4,989,090 A | 1/1991 | Campbell et al. |
| 4,989,151 A | 1/1991 | Nuimura |
| 4,989,256 A | 1/1991 | Buckley |
| 4,989,258 A | 1/1991 | Takahashi et al. |
| 4,991,304 A | 2/1991 | McMurtry |
| 4,992,940 A | 2/1991 | Dworkin |
| 4,992,947 A | 2/1991 | Nimura et al. |
| 4,992,972 A | 2/1991 | Brooks et al. |
| 4,993,068 A | 2/1991 | Piosenka et al. |
| 4,994,909 A | 2/1991 | Graves et al. |
| 4,995,078 A | 2/1991 | Monslow et al. |
| 4,996,642 A * | 2/1991 | Hey ............................... 705/27 |
| 4,996,645 A | 2/1991 | Schneyderberg Van Der Zon |
| 4,996,703 A | 2/1991 | Gray |
| 4,998,286 A | 3/1991 | Tsujiuchi et al. |
| 5,001,777 A | 3/1991 | Liautaud |
| 5,003,317 A | 3/1991 | Gray et al. |
| 5,003,384 A * | 3/1991 | Durden et al. ................. 725/104 |
| 5,003,584 A | 3/1991 | Benyacar et al. |
| 5,005,084 A | 4/1991 | Skinner |
| 5,006,855 A | 4/1991 | Braff |
| 5,008,678 A | 4/1991 | Herman |
| 5,010,491 A | 4/1991 | Biasillo et al. |
| 5,012,334 A | 4/1991 | Etra |
| 5,014,098 A | 5/1991 | Schlais et al. |
| 5,014,206 A | 5/1991 | Scribner et al. |
| 5,014,219 A | 5/1991 | White |
| 5,014,327 A | 5/1991 | Potter et al. |
| 5,017,926 A | 5/1991 | Ames et al. |
| 5,018,169 A | 5/1991 | Wong et al. |
| 5,018,218 A | 5/1991 | Peregrim et al. |
| 5,018,219 A | 5/1991 | Matsuzaki et al. |
| 5,019,899 A | 5/1991 | Boles et al. |
| 5,020,105 A | 5/1991 | Rosen et al. |
| 5,020,112 A | 5/1991 | Chou |
| 5,020,113 A | 5/1991 | Lo et al. |
| 5,021,792 A | 6/1991 | Hwang |

(56) References Cited

U.S. PATENT DOCUMENTS

| | | |
|---|---|---|
| 5,021,794 A | 6/1991 | Lawrence |
| 5,021,976 A | 6/1991 | Wexelblat et al. |
| 5,022,062 A | 6/1991 | Annis |
| 5,025,261 A | 6/1991 | Ohta et al. |
| 5,025,310 A | 6/1991 | Sekiya et al. |
| 5,025,324 A | 6/1991 | Hashimoto |
| 5,027,400 A | 6/1991 | Baji et al. |
| 5,028,888 A | 7/1991 | Ray |
| 5,030,957 A | 7/1991 | Evans |
| 5,031,104 A | 7/1991 | Ikeda et al. |
| 5,031,224 A | 7/1991 | Mengel et al. |
| 5,031,228 A | 7/1991 | Lu |
| 5,031,330 A | 7/1991 | Stuart |
| 5,033,101 A | 7/1991 | Sood |
| 5,034,916 A | 7/1991 | Ordish |
| 5,034,991 A | 7/1991 | Hagimae et al. |
| 5,036,329 A | 7/1991 | Ando |
| 5,036,461 A | 7/1991 | Elliott et al. |
| 5,036,537 A | 7/1991 | Jeffers et al. |
| 5,038,102 A | 8/1991 | Glasheen |
| 5,038,379 A | 8/1991 | Sano |
| 5,038,390 A | 8/1991 | Ravi Chandran |
| 5,039,979 A | 8/1991 | McClive |
| 5,040,134 A | 8/1991 | Park |
| 5,041,833 A | 8/1991 | Weinberg |
| 5,041,967 A | 8/1991 | Ephrath et al. |
| 5,043,736 A | 8/1991 | Darnell et al. |
| 5,043,881 A | 8/1991 | Hamazaki |
| 5,043,902 A | 8/1991 | Yokoyama et al. |
| 5,045,861 A | 9/1991 | Duffett-Smith |
| 5,045,937 A | 9/1991 | Myrick |
| 5,046,011 A | 9/1991 | Kakihara et al. |
| 5,046,113 A | 9/1991 | Hoki |
| 5,046,121 A | 9/1991 | Yonekawa et al. |
| 5,046,122 A | 9/1991 | Nakaya et al. |
| 5,046,130 A | 9/1991 | Hall et al. |
| 5,046,179 A | 9/1991 | Uomori et al. |
| 5,047,867 A * | 9/1991 | Strubbe et al. ............... 386/83 |
| 5,048,095 A | 9/1991 | Bhanu et al. |
| 5,048,100 A | 9/1991 | Kuperstein |
| 5,048,112 A | 9/1991 | Alves et al. |
| 5,049,884 A | 9/1991 | Jaeger et al. |
| 5,049,885 A | 9/1991 | On |
| 5,050,223 A | 9/1991 | Sumi |
| 5,051,817 A | 9/1991 | Takano |
| 5,051,840 A | 9/1991 | Watanabe et al. |
| 5,051,998 A | 9/1991 | Murai et al. |
| 5,052,043 A | 9/1991 | Gaborski |
| 5,052,045 A | 9/1991 | Peregrim et al. |
| 5,052,046 A | 9/1991 | Fukuda et al. |
| 5,052,799 A | 10/1991 | Sasser et al. |
| 5,053,974 A | 10/1991 | Penz |
| 5,054,093 A | 10/1991 | Cooper et al. |
| 5,054,095 A | 10/1991 | Bernsen et al. |
| 5,054,101 A | 10/1991 | Prakash |
| 5,054,103 A | 10/1991 | Yasuda et al. |
| 5,054,110 A | 10/1991 | Comroe et al. |
| 5,055,658 A | 10/1991 | Cockburn |
| 5,055,851 A | 10/1991 | Sheffer |
| 5,055,926 A | 10/1991 | Christensen et al. |
| 5,056,056 A | 10/1991 | Gustin |
| 5,056,106 A | 10/1991 | Wang et al. |
| 5,056,141 A | 10/1991 | Dyke |
| 5,056,147 A | 10/1991 | Turner et al. |
| 5,058,179 A | 10/1991 | Denker et al. |
| 5,058,180 A | 10/1991 | Khan |
| 5,058,183 A | 10/1991 | Schmidt et al. |
| 5,058,184 A | 10/1991 | Fukushima |
| 5,058,186 A | 10/1991 | Miyaoka et al. |
| 5,058,698 A | 10/1991 | Yoshida et al. |
| 5,059,126 A | 10/1991 | Kimball |
| 5,059,969 A | 10/1991 | Sakaguchi et al. |
| 5,060,276 A | 10/1991 | Morris et al. |
| 5,060,277 A | 10/1991 | Bokser |
| 5,060,278 A | 10/1991 | Fukumizu |
| 5,060,279 A | 10/1991 | Crawford et al. |
| 5,060,282 A | 10/1991 | Molley |
| 5,060,285 A | 10/1991 | Dixit et al. |
| 5,061,063 A | 10/1991 | Casasent |
| 5,061,936 A | 10/1991 | Suzuki |
| 5,063,385 A | 11/1991 | Caschera |
| 5,063,524 A | 11/1991 | Ferre et al. |
| 5,063,525 A | 11/1991 | Kurakake et al. |
| 5,063,601 A | 11/1991 | Hayduk |
| 5,063,602 A | 11/1991 | Peppers et al. |
| 5,063,603 A | 11/1991 | Burt |
| 5,063,605 A | 11/1991 | Samad |
| 5,063,608 A | 11/1991 | Siegel |
| 5,065,326 A | 11/1991 | Sahm |
| 5,065,429 A | 11/1991 | Lang |
| 5,065,439 A | 11/1991 | Takasaki et al. |
| 5,065,440 A | 11/1991 | Yoshida et al. |
| 5,065,447 A | 11/1991 | Barnsley et al. |
| 5,067,082 A | 11/1991 | Nimura et al. |
| 5,067,160 A | 11/1991 | Omata et al. |
| 5,067,161 A | 11/1991 | Mikami et al. |
| 5,067,162 A | 11/1991 | Driscoll, Jr. et al. |
| 5,067,163 A | 11/1991 | Adachi |
| 5,067,164 A | 11/1991 | Denker et al. |
| 5,067,166 A | 11/1991 | Ito |
| 5,068,656 A | 11/1991 | Sutherland |
| 5,068,663 A | 11/1991 | Valentine et al. |
| 5,068,664 A | 11/1991 | Appriou et al. |
| 5,068,723 A | 11/1991 | Dixit et al. |
| 5,068,724 A | 11/1991 | Krause et al. |
| 5,068,744 A | 11/1991 | Ito |
| 5,068,909 A | 11/1991 | Rutherford et al. |
| 5,068,911 A | 11/1991 | Resnikoff et al. |
| 5,070,404 A | 12/1991 | Bullock et al. |
| 5,072,227 A | 12/1991 | Hatch |
| 5,072,395 A | 12/1991 | Bliss et al. |
| 5,073,950 A | 12/1991 | Colbert et al. |
| 5,075,693 A | 12/1991 | McMillan et al. |
| 5,075,771 A * | 12/1991 | Hashimoto .................... 725/46 |
| 5,075,863 A | 12/1991 | Nagamune et al. |
| 5,076,662 A | 12/1991 | Shih et al. |
| 5,077,557 A | 12/1991 | Ingensand |
| 5,079,553 A | 1/1992 | On |
| 5,081,667 A | 1/1992 | Drori et al. |
| 5,081,703 A | 1/1992 | Lee |
| 5,083,129 A | 1/1992 | Valentine et al. |
| 5,083,256 A | 1/1992 | Trovato et al. |
| 5,083,860 A | 1/1992 | Miyatake et al. |
| 5,084,822 A | 1/1992 | Hayami |
| 5,086,390 A | 2/1992 | Matthews |
| 5,086,394 A | 2/1992 | Shapira |
| 5,087,919 A | 2/1992 | Odagawa et al. |
| 5,089,826 A | 2/1992 | Yano et al. |
| 5,089,978 A | 2/1992 | Lipner et al. |
| 5,095,531 A | 3/1992 | Ito |
| 5,097,269 A | 3/1992 | Takayama et al. |
| 5,099,422 A | 3/1992 | Foresman et al. |
| 5,101,356 A | 3/1992 | Timothy et al. |
| 5,101,416 A | 3/1992 | Fenton et al. |
| 5,102,360 A | 4/1992 | Eycleshimer |
| 5,103,400 A | 4/1992 | Yamada et al. |
| 5,103,459 A | 4/1992 | Gilhousen et al. |
| 5,103,498 A | 4/1992 | Lanier et al. |
| 5,108,334 A | 4/1992 | Eschenbach et al. |
| 5,109,399 A | 4/1992 | Thompson |
| 5,109,431 A | 4/1992 | Nishiya et al. |
| 5,111,400 A | 5/1992 | Yoder |
| 5,111,401 A | 5/1992 | Everett, Jr. et al. |
| 5,111,516 A | 5/1992 | Nakano et al. |
| 5,115,223 A | 5/1992 | Moody |
| 5,115,233 A | 5/1992 | Zdunek et al. |
| 5,115,245 A | 5/1992 | Wen et al. |
| 5,115,398 A | 5/1992 | De Jong |
| 5,115,501 A | 5/1992 | Kerr |
| 5,117,232 A | 5/1992 | Cantwell |
| 5,117,360 A | 5/1992 | Hotz et al. |
| 5,119,102 A | 6/1992 | Barnard |
| 5,119,301 A | 6/1992 | Shimizu et al. |
| 5,119,475 A | 6/1992 | Smith et al. |

(56) References Cited

U.S. PATENT DOCUMENTS

| | | |
|---|---|---|
| 5,119,504 A | 6/1992 | Durboraw, III |
| 5,119,507 A | 6/1992 | Mankovitz |
| 5,121,326 A | 6/1992 | Moroto et al. |
| 5,122,802 A | 6/1992 | Marin |
| 5,122,803 A | 6/1992 | Stann et al. |
| 5,122,886 A | 6/1992 | Tanaka |
| 5,122,957 A | 6/1992 | Hattori |
| 5,123,046 A | 6/1992 | Levine |
| 5,123,057 A | 6/1992 | Verly et al. |
| 5,123,087 A | 6/1992 | Newell et al. |
| 5,124,908 A | 6/1992 | Broadbent |
| 5,124,915 A | 6/1992 | Krenzel |
| 5,126,722 A | 6/1992 | Kamis |
| 5,126,748 A | 6/1992 | Ames et al. |
| 5,127,487 A | 7/1992 | Yamamoto et al. |
| 5,128,525 A | 7/1992 | Stearns et al. |
| 5,128,669 A | 7/1992 | Dadds et al. |
| 5,128,874 A | 7/1992 | Bhanu et al. |
| 5,128,979 A | 7/1992 | Reich et al. |
| 5,130,792 A | 7/1992 | Tindell et al. |
| 5,131,020 A | 7/1992 | Liebesny et al. |
| 5,131,038 A | 7/1992 | Puhl et al. |
| 5,132,992 A | 7/1992 | Yurt et al. |
| 5,133,021 A | 7/1992 | Carpenter et al. |
| 5,133,079 A | 7/1992 | Ballantyne et al. |
| 5,134,406 A | 7/1992 | Orr |
| 5,134,719 A | 7/1992 | Mankovitz |
| 5,136,659 A | 8/1992 | Kaneko et al. |
| 5,136,696 A | 8/1992 | Beckwith et al. |
| 5,144,317 A | 9/1992 | Duddek et al. |
| 5,144,318 A | 9/1992 | Kishi |
| 5,146,226 A | 9/1992 | Valentine et al. |
| 5,146,227 A | 9/1992 | Papadopoulos |
| 5,146,231 A | 9/1992 | Ghaem et al. |
| 5,148,002 A | 9/1992 | Kuo et al. |
| 5,148,179 A | 9/1992 | Allison |
| 5,148,452 A | 9/1992 | Kennedy et al. |
| 5,148,497 A | 9/1992 | Pentland et al. |
| 5,148,522 A | 9/1992 | Okazaki |
| 5,151,701 A | 9/1992 | Valentine et al. |
| 5,151,789 A | 9/1992 | Young |
| 5,153,512 A | 10/1992 | Glasheen |
| 5,153,598 A | 10/1992 | Alves, Jr. |
| 5,153,836 A | 10/1992 | Fraughton et al. |
| 5,155,490 A | 10/1992 | Spradley, Jr. et al. |
| 5,155,491 A | 10/1992 | Ando |
| 5,155,591 A * | 10/1992 | Wachob .......................... 725/35 |
| 5,155,680 A | 10/1992 | Wiedemer |
| 5,155,688 A | 10/1992 | Tanaka et al. |
| 5,155,689 A | 10/1992 | Wortham |
| 5,157,691 A | 10/1992 | Ohkubo et al. |
| 5,159,315 A | 10/1992 | Schultz et al. |
| 5,159,474 A | 10/1992 | Franke et al. |
| 5,159,556 A | 10/1992 | Schorter |
| 5,161,027 A | 11/1992 | Liu |
| 5,161,107 A | 11/1992 | Mayeaux et al. |
| 5,161,204 A | 11/1992 | Hutcheson et al. |
| 5,161,886 A | 11/1992 | De Jong et al. |
| 5,162,997 A | 11/1992 | Takahashi |
| 5,163,094 A | 11/1992 | Prokoski et al. |
| 5,164,729 A | 11/1992 | Decker et al. |
| 5,164,904 A | 11/1992 | Sumner |
| 5,168,452 A | 12/1992 | Yamada et al. |
| 5,168,529 A | 12/1992 | Peregrim et al. |
| 5,170,171 A | 12/1992 | Brown |
| 5,170,427 A | 12/1992 | Guichard et al. |
| 5,170,466 A | 12/1992 | Rogan et al. |
| 5,170,499 A | 12/1992 | Grothause |
| 5,172,321 A | 12/1992 | Ghaem et al. |
| 5,173,710 A | 12/1992 | Kelley et al. |
| 5,173,777 A | 12/1992 | Dangschat |
| 5,173,949 A | 12/1992 | Peregrim et al. |
| 5,175,557 A | 12/1992 | King et al. |
| 5,177,685 A | 1/1993 | Davis et al. |
| 5,177,796 A | 1/1993 | Feig et al. |
| 5,179,439 A * | 1/1993 | Hashimoto .................... 348/731 |
| 5,179,449 A | 1/1993 | Doi |
| 5,179,652 A | 1/1993 | Rozmanith et al. |
| 5,182,555 A | 1/1993 | Sumner |
| 5,184,123 A | 2/1993 | Bremer et al. |
| 5,184,303 A | 2/1993 | Link |
| 5,184,311 A | 2/1993 | Kraus et al. |
| 5,185,610 A | 2/1993 | Ward et al. |
| 5,185,761 A | 2/1993 | Kawasaki |
| 5,187,788 A | 2/1993 | Marmelstein |
| 5,187,797 A | 2/1993 | Nielsen et al. |
| 5,187,805 A | 2/1993 | Bertiger et al. |
| 5,189,612 A | 2/1993 | Lemercier et al. |
| 5,189,619 A | 2/1993 | Adachi et al. |
| 5,189,630 A | 2/1993 | Barstow et al. |
| 5,191,410 A | 3/1993 | McCalley et al. |
| 5,191,532 A | 3/1993 | Moroto et al. |
| 5,191,611 A | 3/1993 | Lang |
| 5,192,957 A | 3/1993 | Kennedy |
| 5,192,999 A | 3/1993 | Graczyk et al. |
| 5,193,215 A | 3/1993 | Olmer |
| 5,194,871 A | 3/1993 | Counselman, III |
| 5,196,846 A | 3/1993 | Brockelsby et al. |
| 5,200,822 A | 4/1993 | Bronfin et al. |
| 5,201,010 A | 4/1993 | Deaton et al. |
| 5,202,828 A | 4/1993 | Vertelney et al. |
| 5,202,829 A | 4/1993 | Geier |
| 5,203,199 A | 4/1993 | Henderson et al. |
| 5,204,670 A | 4/1993 | Stinton |
| 5,206,500 A | 4/1993 | Decker et al. |
| 5,206,651 A | 4/1993 | Valentine et al. |
| 5,206,806 A | 4/1993 | Gerardi et al. |
| 5,208,706 A | 5/1993 | Lemelson |
| 5,208,756 A | 5/1993 | Song |
| 5,208,858 A | 5/1993 | Vollert et al. |
| 5,210,540 A | 5/1993 | Masumoto |
| 5,210,611 A * | 5/1993 | Yee et al. ...................... 348/473 |
| 5,210,787 A | 5/1993 | Hayes et al. |
| 5,214,504 A | 5/1993 | Toriu et al. |
| 5,214,694 A * | 5/1993 | Furuya et al. .................... 380/2 |
| 5,214,793 A | 5/1993 | Conway et al. |
| 5,218,367 A | 6/1993 | Sheffer et al. |
| 5,218,620 A | 6/1993 | Mori et al. |
| 5,220,420 A | 6/1993 | Hoarty et al. |
| 5,220,507 A | 6/1993 | Kirson |
| 5,220,509 A | 6/1993 | Takemura et al. |
| 5,220,640 A | 6/1993 | Frank |
| 5,220,648 A | 6/1993 | Sato |
| 5,220,674 A | 6/1993 | Morgan et al. |
| 5,222,155 A | 6/1993 | Delanoy et al. |
| 5,223,844 A | 6/1993 | Mansell et al. |
| 5,223,914 A | 6/1993 | Auda et al. |
| 5,223,924 A * | 6/1993 | Strubbe .......................... 725/46 |
| 5,224,151 A | 6/1993 | Bowen et al. |
| 5,224,162 A | 6/1993 | Okamoto et al. |
| 5,224,173 A | 6/1993 | Kuhns et al. |
| 5,225,842 A | 7/1993 | Brown et al. |
| 5,227,874 A | 7/1993 | Von Kohorn |
| 5,228,094 A | 7/1993 | Villa |
| 5,228,695 A | 7/1993 | Meyer |
| 5,228,854 A | 7/1993 | Eldridge |
| 5,229,764 A | 7/1993 | Matchett et al. |
| 5,231,494 A | 7/1993 | Wachob |
| 5,231,584 A | 7/1993 | Nimura et al. |
| RE34,340 E | 8/1993 | Freeman ........................ 358/86 |
| 5,235,166 A | 8/1993 | Fernadez |
| 5,235,633 A | 8/1993 | Dennison et al. |
| 5,237,159 A | 8/1993 | Stephens et al. |
| 5,239,296 A | 8/1993 | Jenkins |
| 5,239,617 A | 8/1993 | Gardner et al. |
| 5,241,542 A | 8/1993 | Natarajan et al. |
| 5,241,620 A | 8/1993 | Ruggiero |
| 5,241,645 A | 8/1993 | Cimral et al. |
| 5,243,528 A | 9/1993 | Lefebvre |
| 5,245,329 A | 9/1993 | Gokcebay |
| 5,245,537 A | 9/1993 | Barber |
| 5,245,909 A | 9/1993 | Corrigan et al. |
| 5,247,306 A | 9/1993 | Hardange et al. |
| 5,247,347 A | 9/1993 | Litteral et al. |

(56) References Cited

U.S. PATENT DOCUMENTS

| | | |
|---|---|---|
| 5,247,363 A | 9/1993 | Sun et al. |
| 5,247,433 A | 9/1993 | Kitaura et al. |
| 5,247,440 A | 9/1993 | Capurka et al. |
| 5,247,564 A | 9/1993 | Zicker |
| 5,247,651 A | 9/1993 | Clarisse |
| 5,249,043 A | 9/1993 | Grandmougin |
| 5,250,951 A | 10/1993 | Valentine et al. |
| 5,253,061 A | 10/1993 | Takahama et al. |
| 5,253,066 A * | 10/1993 | Vogel .................. 725/28 |
| 5,254,843 A | 10/1993 | Hynes et al. |
| 5,255,386 A | 10/1993 | Prager |
| 5,257,195 A | 10/1993 | Hirata |
| 5,257,366 A | 10/1993 | Adair et al. |
| 5,259,038 A | 11/1993 | Sakou et al. |
| 5,260,778 A | 11/1993 | Kauffman et al. |
| 5,261,081 A | 11/1993 | White et al. |
| 5,262,775 A | 11/1993 | Tamai et al. |
| 5,262,860 A | 11/1993 | Fitzpatrick et al. |
| 5,263,167 A | 11/1993 | Conner, Jr. et al. |
| 5,263,174 A | 11/1993 | Layman |
| 5,265,025 A | 11/1993 | Hirata |
| 5,265,221 A | 11/1993 | Miller |
| 5,266,958 A | 11/1993 | Durboraw, III |
| 5,268,666 A | 12/1993 | Michel et al. |
| 5,268,689 A | 12/1993 | Ono et al. |
| 5,268,927 A | 12/1993 | Dimos et al. |
| 5,269,067 A | 12/1993 | Waeldele et al. |
| 5,270,706 A | 12/1993 | Smith |
| 5,270,936 A | 12/1993 | Fukushima et al. |
| 5,272,483 A | 12/1993 | Kato |
| 5,272,638 A | 12/1993 | Martin et al. |
| 5,272,754 A | 12/1993 | Boerbert |
| 5,274,387 A | 12/1993 | Kakihara et al. |
| 5,274,560 A | 12/1993 | LaRue |
| 5,274,667 A | 12/1993 | Olmstead |
| 5,274,714 A | 12/1993 | Hutcheson et al. |
| 5,276,451 A | 1/1994 | Odagawa |
| 5,276,737 A | 1/1994 | Micali |
| 5,278,424 A | 1/1994 | Kagawa |
| 5,278,568 A | 1/1994 | Enge et al. |
| 5,278,759 A | 1/1994 | Berra et al. |
| 5,280,527 A | 1/1994 | Gullman et al. |
| 5,280,530 A | 1/1994 | Trew et al. |
| 5,283,431 A | 2/1994 | Rhine |
| 5,283,570 A | 2/1994 | DeLuca et al. |
| 5,283,575 A | 2/1994 | Kao et al. |
| 5,283,641 A | 2/1994 | Lemelson |
| 5,283,731 A | 2/1994 | Lalonde et al. |
| 5,283,819 A | 2/1994 | Glick et al. |
| 5,283,829 A | 2/1994 | Anderson |
| 5,285,523 A | 2/1994 | Takahashi |
| 5,287,181 A | 2/1994 | Holman |
| 5,287,199 A | 2/1994 | Zoccolillo |
| 5,291,068 A | 3/1994 | Rammel et al. |
| 5,291,202 A | 3/1994 | McClintock |
| 5,291,412 A | 3/1994 | Tamai et al. |
| 5,291,413 A | 3/1994 | Tamai et al. |
| 5,291,560 A | 3/1994 | Daugman |
| 5,292,254 A | 3/1994 | Miller et al. |
| 5,293,163 A | 3/1994 | Kakihara et al. |
| 5,293,318 A | 3/1994 | Fukushima |
| 5,293,357 A * | 3/1994 | Hallenbeck .................. 725/39 |
| 5,293,484 A | 3/1994 | Dabbs, III et al. |
| 5,293,513 A | 3/1994 | Umezu et al. |
| 5,293,635 A | 3/1994 | Faulk, Jr. et al. |
| 5,295,154 A | 3/1994 | Meier et al. |
| 5,296,861 A | 3/1994 | Knight |
| 5,296,963 A | 3/1994 | Murakami et al. |
| 5,297,204 A | 3/1994 | Levine |
| 5,297,249 A | 3/1994 | Bernstein et al. |
| 5,298,674 A | 3/1994 | Yun |
| 5,299,132 A | 3/1994 | Wortham |
| 5,300,932 A | 4/1994 | Valentine et al. |
| 5,301,354 A | 4/1994 | Schwendeman et al. |
| 5,301,368 A | 4/1994 | Hirata |
| 5,303,297 A | 4/1994 | Hillis |
| 5,303,313 A | 4/1994 | Mark et al. |
| 5,303,393 A | 4/1994 | Noreen et al. |
| 5,305,007 A | 4/1994 | Orr et al. |
| 5,305,195 A | 4/1994 | Murphy |
| 5,305,197 A | 4/1994 | Axler et al. |
| 5,305,386 A | 4/1994 | Yamato |
| 5,307,421 A | 4/1994 | Darboux et al. |
| 5,309,474 A | 5/1994 | Gilhousen et al. |
| 5,311,173 A | 5/1994 | Komura et al. |
| 5,311,516 A | 5/1994 | Kuznicki et al. |
| 5,314,037 A | 5/1994 | Shaw et al. |
| 5,315,302 A | 5/1994 | Katsukura et al. |
| 5,315,670 A | 5/1994 | Shapiro |
| 5,317,320 A | 5/1994 | Grover et al. |
| 5,317,321 A | 5/1994 | Sass |
| 5,317,647 A | 5/1994 | Pagallo |
| 5,317,677 A | 5/1994 | Dolan et al. |
| 5,319,363 A | 6/1994 | Welch et al. |
| 5,319,548 A | 6/1994 | Germain |
| 5,323,321 A | 6/1994 | Smith, Jr. |
| 5,323,322 A | 6/1994 | Mueller et al. |
| 5,324,028 A | 6/1994 | Luna |
| 5,327,144 A | 7/1994 | Stilp et al. |
| 5,327,529 A | 7/1994 | Fults et al. |
| 5,329,611 A | 7/1994 | Pechanek et al. |
| 5,329,619 A | 7/1994 | Page et al. |
| 5,331,327 A | 7/1994 | Brocia et al. |
| 5,333,091 A | 7/1994 | Iggulden et al. |
| 5,334,974 A | 8/1994 | Simms et al. |
| 5,334,986 A | 8/1994 | Fernhout |
| 5,335,140 A | 8/1994 | Kamino et al. |
| 5,335,246 A | 8/1994 | Yokev et al. |
| 5,335,288 A | 8/1994 | Faulkner |
| 5,337,244 A | 8/1994 | Nobe et al. |
| 5,338,314 A | 8/1994 | Ryan |
| 5,339,086 A | 8/1994 | DeLuca et al. |
| 5,339,392 A | 8/1994 | Risberg et al. |
| 5,341,138 A | 8/1994 | Ono et al. |
| 5,341,140 A | 8/1994 | Perry |
| 5,341,301 A | 8/1994 | Shirai et al. |
| 5,341,428 A | 8/1994 | Schatz |
| 5,341,429 A | 8/1994 | Stringer et al. |
| 5,343,251 A | 8/1994 | Nafeh |
| 5,343,399 A | 8/1994 | Yokoyama et al. |
| 5,343,493 A | 8/1994 | Karimullah |
| 5,345,388 A | 9/1994 | Kashiwazaki |
| 5,345,549 A | 9/1994 | Appel et al. |
| 5,347,120 A | 9/1994 | Decker et al. |
| 5,347,285 A | 9/1994 | MacDoran et al. |
| 5,347,286 A | 9/1994 | Babitch |
| 5,347,304 A | 9/1994 | Moura et al. |
| 5,347,456 A | 9/1994 | Zhang et al. |
| 5,347,578 A | 9/1994 | Duxbury |
| 5,347,580 A | 9/1994 | Molva et al. |
| 5,347,600 A | 9/1994 | Barnsley et al. |
| 5,347,632 A | 9/1994 | Filepp et al. |
| 5,349,531 A | 9/1994 | Sato et al. |
| 5,349,670 A | 9/1994 | Agrawal et al. |
| 5,351,075 A | 9/1994 | Herz et al. |
| 5,351,078 A | 9/1994 | Lemelson |
| 5,351,194 A | 9/1994 | Ross et al. |
| 5,351,235 A | 9/1994 | Lahtinen |
| 5,353,023 A | 10/1994 | Mitsugi |
| 5,353,034 A | 10/1994 | Sato et al. |
| 5,353,121 A | 10/1994 | Young et al. |
| 5,357,276 A | 10/1994 | Banker et al. |
| 5,359,332 A | 10/1994 | Allison et al. |
| 5,359,527 A | 10/1994 | Takanabe et al. |
| 5,359,529 A | 10/1994 | Snider |
| 5,363,105 A | 11/1994 | Ono et al. |
| 5,363,453 A | 11/1994 | Gagne et al. |
| 5,364,093 A | 11/1994 | Huston et al. |
| 5,365,055 A | 11/1994 | Decker et al. |
| 5,365,282 A | 11/1994 | Levine |
| 5,365,447 A | 11/1994 | Dennis |
| 5,365,450 A | 11/1994 | Schuchman et al. |
| 5,365,451 A | 11/1994 | Wang et al. |
| 5,365,516 A | 11/1994 | Jandrell |

(56) References Cited

U.S. PATENT DOCUMENTS

| | | |
|---|---|---|
| 5,369,584 A | 11/1994 | Kajiwara |
| 5,369,588 A | 11/1994 | Hayami et al. |
| 5,371,551 A | 12/1994 | Logan et al. |
| 5,373,330 A | 12/1994 | Levine |
| 5,374,952 A | 12/1994 | Flohr |
| 5,375,059 A | 12/1994 | Kyrtsos et al. |
| 5,379,224 A | 1/1995 | Brown et al. |
| 5,381,158 A | 1/1995 | Takahara et al. |
| 5,381,338 A | 1/1995 | Wysocki et al. |
| 5,382,957 A | 1/1995 | Blume |
| 5,382,958 A | 1/1995 | FitzGerald |
| 5,383,127 A | 1/1995 | Shibata |
| 5,384,867 A | 1/1995 | Barnsley et al. |
| 5,387,927 A | 2/1995 | Look et al. |
| 5,388,147 A | 2/1995 | Grimes |
| 5,388,198 A | 2/1995 | Layman et al. |
| 5,389,824 A | 2/1995 | Moroto et al. |
| 5,389,930 A | 2/1995 | Ono |
| 5,389,934 A | 2/1995 | Kass |
| 5,389,963 A | 2/1995 | Lepley et al. |
| 5,390,125 A | 2/1995 | Sennott et al. |
| 5,390,238 A | 2/1995 | Kirk et al. |
| 5,390,281 A | 2/1995 | Luciw et al. |
| 5,392,033 A | 2/1995 | Oman et al. |
| 5,392,052 A | 2/1995 | Eberwine |
| 5,392,353 A | 2/1995 | Morales |
| 5,394,333 A | 2/1995 | Kao |
| 5,394,541 A | 2/1995 | Chesley et al. |
| 5,396,227 A | 3/1995 | Carroll et al. |
| 5,396,429 A | 3/1995 | Hanchett |
| 5,396,546 A | 3/1995 | Remillard |
| 5,398,189 A | 3/1995 | Inoue et al. |
| 5,398,190 A | 3/1995 | Wortham |
| 5,400,018 A | 3/1995 | Scholl et al. |
| 5,400,034 A | 3/1995 | Smith |
| 5,400,254 A | 3/1995 | Fujita |
| 5,401,946 A | 3/1995 | Weinblatt |
| 5,402,347 A | 3/1995 | McBurney et al. |
| 5,402,441 A | 3/1995 | Washizu et al. |
| 5,404,579 A | 4/1995 | Obayashi et al. |
| 5,404,661 A | 4/1995 | Sahm et al. |
| 5,406,491 A | 4/1995 | Lima |
| 5,406,492 A | 4/1995 | Suzuki |
| 5,408,415 A | 4/1995 | Inoue et al. |
| 5,410,343 A | 4/1995 | Coddington et al. |
| 5,410,344 A * | 4/1995 | Graves et al. .................. 725/46 |
| 5,410,480 A | 4/1995 | Koseki et al. |
| 5,410,643 A | 4/1995 | Yomdin et al. |
| 5,410,750 A | 4/1995 | Cantwell et al. |
| 5,412,573 A | 5/1995 | Barnea et al. |
| 5,412,660 A | 5/1995 | Chen et al. |
| 5,412,727 A | 5/1995 | Drexler et al. |
| 5,412,773 A | 5/1995 | Carlucci et al. |
| 5,414,432 A | 5/1995 | Penny, Jr. et al. |
| 5,414,755 A | 5/1995 | Bahler et al. |
| 5,414,756 A | 5/1995 | Levine |
| 5,416,695 A | 5/1995 | Stutman et al. |
| 5,416,712 A | 5/1995 | Geier et al. |
| 5,416,856 A | 5/1995 | Jacobs et al. |
| 5,418,526 A | 5/1995 | Crawford |
| 5,418,537 A | 5/1995 | Bird |
| 5,418,538 A | 5/1995 | Lau |
| 5,418,951 A | 5/1995 | Damashek |
| 5,420,573 A | 5/1995 | Tanaka et al. |
| 5,420,592 A | 5/1995 | Johnson |
| 5,420,593 A | 5/1995 | Niles |
| 5,420,594 A | 5/1995 | FitzGerald et al. |
| 5,420,647 A | 5/1995 | Levine |
| 5,420,794 A | 5/1995 | James |
| 5,420,825 A | 5/1995 | Fischer et al. |
| 5,420,975 A | 5/1995 | Blades et al. |
| 5,421,008 A | 5/1995 | Banning et al. |
| 5,422,624 A | 6/1995 | Smith |
| 5,422,813 A | 6/1995 | Schuchman et al. |
| 5,422,816 A | 6/1995 | Sprague et al. |
| 5,424,951 A | 6/1995 | Nobe et al. |
| 5,425,058 A | 6/1995 | Mui |
| 5,425,100 A | 6/1995 | Thomas et al. |
| 5,425,890 A | 6/1995 | Yudin et al. |
| 5,426,732 A | 6/1995 | Boies et al. |
| 5,428,559 A | 6/1995 | Kano |
| 5,428,636 A | 6/1995 | Meier |
| 5,428,683 A | 6/1995 | Indeck et al. |
| 5,428,727 A | 6/1995 | Kurosu et al. |
| 5,428,730 A | 6/1995 | Baker et al. |
| 5,428,774 A | 6/1995 | Takahashi et al. |
| 5,430,279 A | 7/1995 | Fernadez |
| 5,430,552 A | 7/1995 | O'Callaghan |
| 5,430,653 A | 7/1995 | Inoue |
| 5,430,812 A | 7/1995 | Barnsley et al. |
| 5,430,948 A | 7/1995 | Vander Wal, III |
| 5,432,520 A | 7/1995 | Schneider et al. |
| 5,432,542 A | 7/1995 | Thibadeau et al. |
| 5,432,841 A | 7/1995 | Rimer |
| 5,432,864 A | 7/1995 | Lu et al. |
| 5,432,902 A | 7/1995 | Matsumoto |
| 5,433,446 A | 7/1995 | Lindstedt, Jr. |
| 5,434,574 A | 7/1995 | Hayashi et al. |
| 5,434,777 A | 7/1995 | Luciw |
| 5,434,787 A | 7/1995 | Okamoto et al. |
| 5,434,788 A | 7/1995 | Seymour et al. |
| 5,434,789 A | 7/1995 | Fraker et al. |
| 5,434,933 A | 7/1995 | Karnin et al. |
| 5,434,966 A | 7/1995 | Nakazawa et al. |
| 5,436,653 A | 7/1995 | Ellis et al. |
| 5,436,834 A | 7/1995 | Graf et al. |
| 5,438,355 A | 8/1995 | Palmer |
| 5,438,357 A | 8/1995 | McNelley |
| 5,438,361 A | 8/1995 | Coleman |
| 5,438,687 A | 8/1995 | Suchowerskyj et al. |
| 5,440,400 A | 8/1995 | Micheron et al. |
| 5,440,554 A | 8/1995 | Stannard et al. |
| 5,441,047 A | 8/1995 | David et al. |
| 5,442,363 A | 8/1995 | Remondi |
| 5,442,553 A | 8/1995 | Parrillo |
| 5,442,557 A | 8/1995 | Kaneko |
| 5,444,450 A | 8/1995 | Olds et al. |
| 5,444,499 A | 8/1995 | Saitoh |
| 5,446,659 A | 8/1995 | Yamawaki |
| 5,446,891 A | 8/1995 | Kaplan et al. |
| 5,446,919 A | 8/1995 | Wilkins |
| 5,446,923 A | 8/1995 | Martinson et al. |
| 5,448,045 A | 9/1995 | Clark |
| 5,448,638 A | 9/1995 | Johnson et al. |
| 5,450,329 A | 9/1995 | Tanner |
| 5,450,490 A | 9/1995 | Jensen et al. |
| 5,451,964 A | 9/1995 | Babu |
| 5,452,217 A | 9/1995 | Kishi et al. |
| 5,452,291 A | 9/1995 | Eisenhandler et al. |
| 5,453,601 A | 9/1995 | Rosen |
| 5,455,407 A | 10/1995 | Rosen |
| 5,455,892 A | 10/1995 | Minot et al. |
| 5,455,953 A | 10/1995 | Russell |
| 5,457,747 A | 10/1995 | Drexler et al. |
| 5,458,123 A | 10/1995 | Unger |
| 5,459,304 A | 10/1995 | Eisenmann |
| 5,459,306 A | 10/1995 | Stein et al. |
| 5,459,517 A | 10/1995 | Kunitake et al. |
| 5,459,660 A | 10/1995 | Berra |
| 5,459,667 A | 10/1995 | Odagaki et al. |
| 5,461,365 A | 10/1995 | Schlager et al. |
| 5,461,383 A | 10/1995 | Ono et al. |
| 5,461,699 A | 10/1995 | Arbabi et al. |
| 5,465,079 A | 11/1995 | Bouchard et al. |
| 5,465,089 A | 11/1995 | Nakatani et al. |
| 5,465,204 A | 11/1995 | Sekine et al. |
| 5,465,308 A | 11/1995 | Hutcheson et al. |
| 5,465,358 A | 11/1995 | Blades et al. |
| 5,465,413 A | 11/1995 | Enge et al. |
| 5,469,206 A | 11/1995 | Strubbe et al. |
| 5,469,437 A | 11/1995 | Runaldue |
| 5,469,506 A | 11/1995 | Berson et al. |
| 5,471,214 A | 11/1995 | Faibish et al. |
| 5,471,218 A | 11/1995 | Talbot et al. |

(56) References Cited

U.S. PATENT DOCUMENTS

| | | | |
|---|---|---|---|
| H1506 H | 12/1995 | Beretta | 345/199 |
| 5,473,466 A | 12/1995 | Tanielian et al. | |
| 5,473,538 A | 12/1995 | Fujita et al. | |
| 5,473,602 A | 12/1995 | McKenna et al. | |
| 5,475,597 A | 12/1995 | Buck | |
| 5,475,651 A | 12/1995 | Bishop et al. | |
| 5,475,687 A | 12/1995 | Markkula, Jr. et al. | |
| 5,475,839 A | 12/1995 | Watson et al. | |
| 5,477,228 A | 12/1995 | Tiwari et al. | |
| 5,477,262 A | 12/1995 | Banker et al. | |
| 5,477,447 A | 12/1995 | Luciw et al. | |
| 5,478,993 A | 12/1995 | Derksen | |
| 5,479,264 A | 12/1995 | Ueda et al. | |
| 5,479,408 A | 12/1995 | Will | |
| 5,479,479 A | 12/1995 | Braitberg et al. | |
| 5,479,482 A | 12/1995 | Grimes | |
| 5,479,932 A | 1/1996 | Higgins et al. | |
| 5,481,294 A | 1/1996 | Thomas et al. | |
| 5,481,542 A | 1/1996 | Logston et al. | |
| 5,481,613 A | 1/1996 | Ford et al. | |
| 5,481,712 A | 1/1996 | Silver et al. | |
| 5,483,234 A | 1/1996 | Cancel et al. | |
| 5,483,278 A | 1/1996 | Strubbe et al. | |
| 5,483,601 A | 1/1996 | Faulkner | |
| 5,483,827 A | 1/1996 | Kulka et al. | |
| 5,485,161 A | 1/1996 | Vaughn | |
| 5,485,163 A | 1/1996 | Singer et al. | |
| 5,485,219 A | 1/1996 | Woo | |
| 5,485,312 A | 1/1996 | Horner et al. | |
| 5,485,518 A | 1/1996 | Hunter et al. | |
| 5,485,519 A | 1/1996 | Weiss | |
| 5,486,822 A | 1/1996 | Tenmoku et al. | |
| 5,487,132 A | 1/1996 | Cheng | |
| 5,488,409 A | 1/1996 | Yuen et al. | |
| 5,488,412 A | 1/1996 | Majeti et al. | |
| 5,488,425 A | 1/1996 | Grimes | |
| 5,488,484 A | 1/1996 | Miyano | |
| 5,490,208 A | 2/1996 | Remillard | |
| 5,495,292 A | 2/1996 | Zhang et al. | |
| 5,495,537 A | 2/1996 | Bedrosian et al. | |
| 5,495,561 A | 2/1996 | Holt | |
| 5,495,609 A | 2/1996 | Scott | |
| 5,496,177 A | 3/1996 | Collia et al. | |
| 5,497,314 A | 3/1996 | Novak | |
| 5,497,430 A | 3/1996 | Sadovnik et al. | |
| 5,500,671 A | 3/1996 | Andersson et al. | |
| 5,500,741 A | 3/1996 | Baik et al. | |
| 5,500,920 A | 3/1996 | Kupiec | |
| 5,502,636 A | 3/1996 | Clarke | |
| 5,502,774 A | 3/1996 | Bellegarda et al. | |
| 5,504,482 A | 4/1996 | Schreder | |
| 5,504,491 A | 4/1996 | Chapman | |
| 5,504,518 A | 4/1996 | Ellis et al. | |
| 5,504,738 A | 4/1996 | Sambamurthy et al. | |
| 5,506,584 A | 4/1996 | Boles | |
| 5,506,768 A | 4/1996 | Seem et al. | |
| 5,506,846 A | 4/1996 | Edem et al. | |
| 5,506,886 A | 4/1996 | Maine et al. | |
| 5,506,897 A | 4/1996 | Moore et al. | |
| 5,506,963 A | 4/1996 | Ducateau et al. | |
| 5,508,815 A * | 4/1996 | Levine | 386/83 |
| 5,509,009 A | 4/1996 | Laycock et al. | |
| 5,510,793 A | 4/1996 | Gregg, III et al. | |
| 5,510,798 A | 4/1996 | Bauer | |
| 5,510,838 A | 4/1996 | Yomdin et al. | |
| 5,511,121 A | 4/1996 | Yacobi | |
| 5,511,134 A | 4/1996 | Kuratomi et al. | |
| 5,511,153 A | 4/1996 | Azarbayejani et al. | |
| 5,512,908 A | 4/1996 | Herrick | |
| 5,513,110 A | 4/1996 | Fujita et al. | |
| 5,515,042 A | 5/1996 | Nelson | |
| 5,515,043 A | 5/1996 | Berard et al. | |
| 5,515,098 A | 5/1996 | Carles | |
| 5,515,099 A | 5/1996 | Cortjens et al. | |
| 5,515,173 A | 5/1996 | Mankovitz et al. | |
| 5,515,284 A | 5/1996 | Abe | |
| 5,515,285 A | 5/1996 | Garrett, Sr. et al. | |
| 5,515,419 A | 5/1996 | Sheffer | |
| 5,515,453 A | 5/1996 | Hennessey et al. | |
| 5,515,471 A | 5/1996 | Yamamoto et al. | |
| 5,515,972 A | 5/1996 | Shames | |
| 5,517,199 A | 5/1996 | DiMattei | |
| 5,517,598 A | 5/1996 | Sirat | |
| 5,519,403 A | 5/1996 | Bickley et al. | |
| 5,519,452 A | 5/1996 | Parulski | |
| 5,519,620 A | 5/1996 | Talbot et al. | |
| 5,519,718 A | 5/1996 | Yokev et al. | |
| 5,519,760 A | 5/1996 | Borkowski et al. | |
| 5,521,696 A | 5/1996 | Dunne | |
| 5,521,722 A | 5/1996 | Colvill et al. | |
| 5,521,841 A | 5/1996 | Arman et al. | |
| 5,521,984 A | 5/1996 | Denenberg et al. | |
| 5,522,155 A | 6/1996 | Jones | |
| 5,523,739 A | 6/1996 | Manneschi | |
| 5,523,796 A | 6/1996 | Marshall et al. | |
| 5,523,950 A | 6/1996 | Peterson | |
| 5,524,065 A | 6/1996 | Yagasaki | |
| 5,524,984 A | 6/1996 | Hollander et al. | |
| 5,525,989 A | 6/1996 | Holt | |
| 5,525,996 A | 6/1996 | Aker et al. | |
| 5,526,127 A | 6/1996 | Yonetani et al. | |
| 5,526,405 A | 6/1996 | Toda | |
| 5,526,427 A | 6/1996 | Thomas et al. | |
| 5,526,428 A | 6/1996 | Arnold | |
| 5,526,479 A | 6/1996 | Barstow et al. | |
| 5,526,483 A | 6/1996 | French et al. | |
| 5,528,234 A | 6/1996 | Mani et al. | |
| 5,528,245 A | 6/1996 | Aker et al. | |
| 5,528,246 A | 6/1996 | Henderson et al. | |
| 5,528,248 A | 6/1996 | Steiner et al. | |
| 5,528,391 A | 6/1996 | Elrod | |
| 5,528,516 A | 6/1996 | Yemini et al. | |
| 5,529,138 A | 6/1996 | Shaw et al. | |
| 5,529,139 A | 6/1996 | Kurahashi et al. | |
| 5,530,440 A | 6/1996 | Danzer et al. | |
| 5,530,447 A | 6/1996 | Henderson et al. | |
| 5,530,655 A | 6/1996 | Lokhoff et al. | |
| 5,530,852 A | 6/1996 | Meske, Jr. et al. | |
| 5,530,914 A | 6/1996 | McPheters | |
| 5,532,706 A | 7/1996 | Reinhardt et al. | |
| 5,533,123 A | 7/1996 | Force et al. | |
| 5,534,697 A | 7/1996 | Creekmore et al. | |
| 5,534,855 A | 7/1996 | Shockley et al. | |
| 5,534,911 A * | 7/1996 | Levitan | 725/46 |
| 5,535,302 A | 7/1996 | Tsao | |
| 5,535,321 A | 7/1996 | Massaro et al. | |
| 5,535,323 A | 7/1996 | Miller et al. | |
| 5,535,380 A | 7/1996 | Bergkvist, Jr. et al. | |
| 5,535,383 A | 7/1996 | Gower | |
| 5,537,141 A | 7/1996 | Harper et al. | |
| 5,537,472 A | 7/1996 | Estevez-Alcolado et al. | |
| 5,537,528 A | 7/1996 | Takahashi et al. | |
| 5,537,605 A | 7/1996 | Teece | |
| 5,539,395 A | 7/1996 | Buss et al. | |
| 5,539,398 A | 7/1996 | Hall et al. | |
| 5,539,645 A | 7/1996 | Mandhyan et al. | |
| 5,539,829 A | 7/1996 | Lokhoff et al. | |
| 5,541,590 A | 7/1996 | Nishio | |
| 5,541,606 A | 7/1996 | Lennen | |
| 5,541,638 A | 7/1996 | Story | |
| 5,541,662 A | 7/1996 | Adams et al. | |
| 5,541,738 A | 7/1996 | Mankovitz | |
| 5,542,102 A | 7/1996 | Smith et al. | |
| 5,543,789 A | 8/1996 | Behr et al. | |
| 5,543,929 A | 8/1996 | Mankovitz et al. | |
| 5,544,225 A | 8/1996 | Kennedy, III et al. | |
| 5,544,254 A | 8/1996 | Hartley et al. | |
| 5,544,255 A | 8/1996 | Smithies et al. | |
| 5,544,358 A | 8/1996 | Capps et al. | |
| 5,544,661 A | 8/1996 | Davis et al. | |
| 5,546,445 A | 8/1996 | Dennison et al. | |
| 5,546,462 A | 8/1996 | Indeck et al. | |
| 5,546,475 A | 8/1996 | Bolle et al. | |
| 5,546,484 A | 8/1996 | Fling et al. | |

(56) References Cited

U.S. PATENT DOCUMENTS

| | | | |
|---|---|---|---|
| 5,546,518 A | 8/1996 | Blossom et al. |
| 5,548,322 A | 8/1996 | Zhou |
| 5,548,515 A | 8/1996 | Pilley et al. |
| 5,548,667 A | 8/1996 | Tu |
| 5,550,055 A | 8/1996 | Reinherz et al. |
| 5,550,551 A | 8/1996 | Alesio |
| 5,550,575 A | 8/1996 | West et al. |
| 5,550,928 A | 8/1996 | Lu et al. |
| 5,550,965 A | 8/1996 | Gabbe et al. |
| 5,552,773 A | 9/1996 | Kuhnert |
| 5,552,833 A | 9/1996 | Henmi et al. |
| 5,553,076 A | 9/1996 | Behtash et al. |
| 5,553,155 A | 9/1996 | Kuhns et al. |
| 5,553,221 A | 9/1996 | Reimer et al. |
| 5,553,277 A | 9/1996 | Hirano et al. |
| 5,553,609 A | 9/1996 | Chen et al. |
| 5,554,983 A | 9/1996 | Kitamura et al. |
| 5,555,286 A | 9/1996 | Tendler |
| 5,555,443 A | 9/1996 | Ikehama |
| 5,555,495 A | 9/1996 | Bell et al. |
| 5,556,749 A | 9/1996 | Mitsuhashi et al. |
| 5,557,254 A | 9/1996 | Johnson et al. |
| 5,557,728 A | 9/1996 | Garrett et al. |
| 5,557,765 A | 9/1996 | Lipner et al. |
| 5,559,508 A | 9/1996 | Orr et al. |
| 5,559,548 A | 9/1996 | Davis et al. |
| 5,559,549 A | 9/1996 | Hendricks et al. |
| 5,559,707 A | 9/1996 | DeLorme et al. |
| 5,559,885 A | 9/1996 | Drexler et al. |
| 5,559,945 A | 9/1996 | Beaudet et al. |
| 5,560,011 A | 9/1996 | Uyama |
| 5,561,649 A | 10/1996 | Lee et al. |
| 5,561,704 A | 10/1996 | Salimando |
| 5,561,709 A | 10/1996 | Remillard |
| 5,561,718 A | 10/1996 | Trew et al. |
| 5,561,796 A | 10/1996 | Sakamoto et al. |
| 5,563,071 A | 10/1996 | Augurt |
| 5,563,607 A | 10/1996 | Loomis et al. |
| 5,563,786 A | 10/1996 | Torii |
| 5,563,928 A | 10/1996 | Rostoker et al. |
| 5,563,948 A | 10/1996 | Diehl et al. |
| 5,564,001 A | 10/1996 | Lewis |
| 5,565,874 A | 10/1996 | Rode |
| 5,565,909 A | 10/1996 | Thibadeau et al. |
| 5,565,910 A | 10/1996 | Rowse et al. |
| 5,566,274 A | 10/1996 | Ishida et al. |
| 5,567,988 A | 10/1996 | Rostoker et al. |
| 5,568,153 A | 10/1996 | Beliveau |
| 5,568,272 A | 10/1996 | Levine |
| 5,568,390 A | 10/1996 | Hirota et al. |
| 5,568,450 A | 10/1996 | Grande et al. |
| 5,570,085 A | 10/1996 | Bertsch |
| 5,572,201 A | 11/1996 | Graham et al. |
| 5,572,204 A | 11/1996 | Timm et al. |
| 5,572,246 A | 11/1996 | Ellis et al. |
| 5,572,401 A | 11/1996 | Carroll |
| 5,572,428 A | 11/1996 | Ishida et al. |
| 5,572,596 A | 11/1996 | Wildes et al. |
| 5,572,604 A | 11/1996 | Simard |
| 5,572,643 A | 11/1996 | Judson |
| 5,574,573 A | 11/1996 | Ray et al. |
| 5,574,845 A | 11/1996 | Benson et al. |
| 5,574,963 A | 11/1996 | Weinblatt et al. |
| 5,574,966 A | 11/1996 | Barzegar et al. |
| 5,576,642 A | 11/1996 | Nguyen et al. |
| 5,576,716 A | 11/1996 | Sadler |
| 5,576,950 A | 11/1996 | Tonomura et al. |
| 5,576,952 A | 11/1996 | Stutman et al. |
| 5,578,808 A | 11/1996 | Taylor |
| 5,579,013 A | 11/1996 | Hershey et al. |
| 5,579,285 A | 11/1996 | Hubert |
| 5,579,308 A | 11/1996 | Humpleman |
| 5,579,471 A | 11/1996 | Barber et al. |
| 5,579,535 A | 11/1996 | Orlen et al. |
| 5,581,462 A | 12/1996 | Rogers |
| 5,581,658 A | 12/1996 | O'Hagan et al. |
| 5,581,665 A | 12/1996 | Sugiura et al. |
| 5,581,800 A | 12/1996 | Fardeau et al. |
| 5,583,560 A | 12/1996 | Florin et al. |
| 5,583,774 A | 12/1996 | Diesel |
| 5,583,776 A | 12/1996 | Levi et al. |
| 5,583,933 A | 12/1996 | Mark |
| 5,583,950 A | 12/1996 | Prokoski |
| 5,583,966 A | 12/1996 | Nakajima |
| 5,584,050 A | 12/1996 | Lyons |
| 5,585,798 A | 12/1996 | Yoshioka et al. |
| 5,585,858 A | 12/1996 | Harper et al. |
| 5,585,865 A * | 12/1996 | Amano et al. ............... 725/14 |
| 5,585,958 A | 12/1996 | Giraud |
| 5,586,025 A | 12/1996 | Tsuji et al. |
| 5,586,171 A | 12/1996 | McAllister et al. |
| 5,586,218 A | 12/1996 | Allen |
| 5,586,317 A | 12/1996 | Smith |
| 5,588,059 A | 12/1996 | Chandos et al. |
| 5,588,074 A | 12/1996 | Sugiyama |
| 5,588,148 A | 12/1996 | Landis et al. |
| 5,592,408 A | 1/1997 | Keskin et al. |
| 5,592,540 A | 1/1997 | Beveridge |
| 5,592,551 A * | 1/1997 | Lett et al. ............... 380/211 |
| 5,592,560 A | 1/1997 | Deaton et al. |
| 5,594,661 A | 1/1997 | Bruner et al. |
| 5,594,780 A | 1/1997 | Wiedeman et al. |
| 5,594,806 A | 1/1997 | Colbert |
| 5,594,911 A | 1/1997 | Cruz et al. |
| 5,596,702 A | 1/1997 | Stucka et al. |
| 5,596,705 A | 1/1997 | Reimer et al. |
| 5,598,456 A | 1/1997 | Feinberg |
| 5,598,460 A | 1/1997 | Tendler |
| 5,600,561 A | 2/1997 | Okamura |
| 5,600,573 A | 2/1997 | Hendricks et al. |
| 5,600,646 A | 2/1997 | Polomski |
| 5,600,733 A | 2/1997 | MacDonald et al. |
| 5,600,775 A | 2/1997 | King et al. |
| 5,600,781 A | 2/1997 | Root et al. |
| 5,602,739 A | 2/1997 | Haagenstad et al. |
| 5,604,542 A | 2/1997 | Dedrick |
| 5,604,820 A | 2/1997 | Ono |
| 5,604,823 A | 2/1997 | Ono |
| 5,606,506 A | 2/1997 | Kyrtsos |
| 5,606,609 A | 2/1997 | Houser et al. |
| 5,606,618 A | 2/1997 | Lokhoff et al. |
| 5,606,655 A | 2/1997 | Arman et al. |
| 5,608,387 A | 3/1997 | Davies |
| 5,608,624 A | 3/1997 | Luciw |
| 5,610,815 A | 3/1997 | Gudat et al. |
| 5,610,821 A | 3/1997 | Gazis et al. |
| 5,610,984 A | 3/1997 | Lennen |
| 5,611,020 A | 3/1997 | Bigus |
| 5,611,048 A | 3/1997 | Jacobs et al. |
| 5,612,730 A | 3/1997 | Lewis |
| 5,613,004 A | 3/1997 | Cooperman et al. |
| 5,613,012 A | 3/1997 | Hoffman et al. |
| 5,613,032 A | 3/1997 | Cruz et al. |
| 5,614,940 A | 3/1997 | Cobbley et al. |
| 5,615,116 A | 3/1997 | Gudat et al. |
| 5,615,175 A | 3/1997 | Carter et al. |
| 5,615,277 A | 3/1997 | Hoffman |
| 5,615,341 A | 3/1997 | Agrawal et al. |
| 5,616,904 A | 4/1997 | Fernadez |
| 5,617,085 A | 4/1997 | Tsutsumi et al. |
| 5,617,371 A | 4/1997 | Williams |
| 5,617,483 A | 4/1997 | Osawa |
| 5,617,565 A | 4/1997 | Augenbraun et al. |
| 5,619,247 A | 4/1997 | Russo |
| 5,621,201 A | 4/1997 | Langhans et al. |
| 5,621,416 A | 4/1997 | Lennen |
| 5,621,454 A | 4/1997 | Ellis et al. |
| 5,621,484 A | 4/1997 | Cotty |
| 5,621,579 A | 4/1997 | Yuen |
| 5,621,793 A | 4/1997 | Bednarek et al. |
| 5,621,889 A | 4/1997 | Lermuzeaux et al. |
| 5,621,903 A | 4/1997 | Luciw et al. |
| 5,623,494 A | 4/1997 | Rostoker et al. |
| 5,623,547 A | 4/1997 | Jones et al. |

(56) References Cited

U.S. PATENT DOCUMENTS

| | | |
|---|---|---|
| 5,623,601 A | 4/1997 | Vu |
| 5,625,668 A | 4/1997 | Loomis et al. |
| 5,625,715 A | 4/1997 | Trew et al. |
| 5,625,783 A | 4/1997 | Ezekiel et al. |
| 5,625,814 A | 4/1997 | Luciw |
| 5,627,547 A | 5/1997 | Ramaswamy et al. |
| 5,627,564 A | 5/1997 | Yang |
| 5,627,915 A | 5/1997 | Rosser et al. |
| 5,629,626 A | 5/1997 | Russell et al. |
| 5,629,693 A | 5/1997 | Janky |
| 5,630,159 A | 5/1997 | Zancho |
| 5,630,204 A | 5/1997 | Hylton et al. |
| 5,630,206 A | 5/1997 | Urban et al. |
| 5,632,007 A | 5/1997 | Freeman |
| 5,632,011 A | 5/1997 | Landfield et al. |
| 5,632,041 A | 5/1997 | Peterson et al. |
| 5,633,484 A | 5/1997 | Zancho et al. |
| 5,633,630 A | 5/1997 | Park |
| 5,633,872 A | 5/1997 | Dinkins |
| 5,633,932 A | 5/1997 | Davis et al. |
| 5,634,849 A | 6/1997 | Abecassis |
| 5,635,925 A | 6/1997 | Kishi et al. |
| 5,635,982 A | 6/1997 | Zhang et al. |
| 5,635,986 A | 6/1997 | Kim |
| 5,636,211 A | 6/1997 | Newlin et al. |
| 5,636,276 A | 6/1997 | Brugger |
| 5,636,282 A | 6/1997 | Holmquist et al. |
| 5,636,292 A | 6/1997 | Rhoads |
| 5,636,346 A | 6/1997 | Saxe |
| 5,636,371 A | 6/1997 | Yu |
| 5,637,826 A | 6/1997 | Bessacini et al. |
| 5,638,078 A | 6/1997 | Wichtel |
| 5,638,279 A | 6/1997 | Kishi et al. |
| 5,640,323 A | 6/1997 | Kleimenhagen et al. |
| 5,642,434 A | 6/1997 | Nakao et al. |
| 5,644,686 A | 7/1997 | Hekmatpour |
| 5,644,735 A | 7/1997 | Luciw et al. |
| 5,646,612 A | 7/1997 | Byon |
| 5,646,839 A | 7/1997 | Katz |
| 5,646,843 A | 7/1997 | Gudat et al. |
| 5,646,997 A | 7/1997 | Barton |
| 5,647,017 A | 7/1997 | Smithies et al. |
| 5,647,364 A | 7/1997 | Schneider et al. |
| 5,648,768 A | 7/1997 | Bouve |
| 5,649,061 A | 7/1997 | Smyth |
| 5,649,284 A | 7/1997 | Yoshinobu |
| 5,652,570 A | 7/1997 | Lepkofker |
| 5,654,771 A | 8/1997 | Tekalp et al. |
| 5,655,081 A | 8/1997 | Bonnell et al. |
| 5,655,117 A | 8/1997 | Goldberg et al. |
| 5,657,221 A | 8/1997 | Warman et al. |
| 5,657,397 A | 8/1997 | Bokser |
| 5,657,414 A | 8/1997 | Lett et al. |
| 5,659,195 A | 8/1997 | Kaiser et al. |
| 5,659,368 A | 8/1997 | Landis |
| 5,659,616 A | 8/1997 | Sudia |
| 5,659,653 A | 8/1997 | Diehl et al. |
| 5,659,726 A | 8/1997 | Sandford, II et al. |
| 5,659,732 A | 8/1997 | Kirsch |
| 5,661,652 A | 8/1997 | Sprague et al. |
| 5,661,755 A | 8/1997 | Van De Kerkhof et al. |
| 5,663,733 A | 9/1997 | Lennen |
| 5,663,734 A | 9/1997 | Krasner |
| 5,663,757 A * | 9/1997 | Morales .......................... 725/5 |
| 5,664,018 A | 9/1997 | Leighton |
| 5,664,046 A | 9/1997 | Abecassis |
| 5,666,400 A | 9/1997 | McAllister et al. |
| 5,666,416 A | 9/1997 | Micali |
| 5,668,554 A | 9/1997 | Orr et al. |
| 5,668,878 A | 9/1997 | Brands |
| 5,668,880 A | 9/1997 | Alajajian |
| 5,668,897 A | 9/1997 | Stolfo |
| 5,669,061 A | 9/1997 | Schipper |
| 5,671,343 A | 9/1997 | Kondo et al. |
| 5,671,411 A | 9/1997 | Watts et al. |
| 5,673,305 A | 9/1997 | Ross |
| 5,675,494 A | 10/1997 | Sakurai et al. |
| 5,675,663 A | 10/1997 | Koerner et al. |
| 5,675,800 A | 10/1997 | Fisher, Jr. et al. |
| 5,677,684 A | 10/1997 | McArthur |
| 5,677,837 A | 10/1997 | Reynolds |
| 5,677,955 A | 10/1997 | Doggett et al. |
| 5,678,057 A | 10/1997 | Rostoker et al. |
| 5,678,175 A | 10/1997 | Stuart et al. |
| 5,678,182 A | 10/1997 | Miller et al. |
| 5,679,940 A | 10/1997 | Templeton et al. |
| 5,680,460 A | 10/1997 | Tomko et al. |
| 5,682,032 A | 10/1997 | Philipp |
| 5,682,142 A | 10/1997 | Loosmore et al. |
| 5,682,196 A | 10/1997 | Freeman |
| 5,682,437 A | 10/1997 | Okino et al. |
| 5,682,525 A | 10/1997 | Bouve et al. |
| 5,682,532 A | 10/1997 | Remington et al. |
| 5,684,488 A | 11/1997 | Liautaud et al. |
| 5,684,860 A | 11/1997 | Milani et al. |
| 5,686,910 A | 11/1997 | Timm et al. |
| 5,687,215 A | 11/1997 | Timm et al. |
| 5,687,236 A | 11/1997 | Moskowitz et al. |
| 5,689,245 A | 11/1997 | Noreen et al. |
| 5,689,269 A | 11/1997 | Norris |
| 5,689,442 A | 11/1997 | Swanson et al. |
| 5,691,724 A | 11/1997 | Aker et al. |
| 5,691,903 A | 11/1997 | Racette, III |
| 5,692,214 A | 11/1997 | Levine |
| 5,696,403 A | 12/1997 | Rostoker et al. |
| 5,696,503 A | 12/1997 | Nasburg |
| 5,696,827 A | 12/1997 | Brands |
| 5,696,908 A | 12/1997 | Muehlberger et al. |
| 5,696,964 A | 12/1997 | Cox et al. |
| 5,699,053 A | 12/1997 | Jonsson |
| 5,699,056 A | 12/1997 | Yoshida |
| 5,699,255 A | 12/1997 | Ellis et al. |
| 5,699,427 A | 12/1997 | Chow et al. |
| 5,701,120 A | 12/1997 | Perelman et al. |
| 5,701,328 A | 12/1997 | Schuchman et al. |
| 5,701,369 A | 12/1997 | Moon et al. |
| 5,701,419 A | 12/1997 | McConnell |
| 5,703,562 A | 12/1997 | Nilsen |
| 5,704,029 A | 12/1997 | Wright, Jr. |
| 5,706,427 A | 1/1998 | Tabuki |
| 5,706,498 A | 1/1998 | Fujimiya et al. |
| 5,708,780 A | 1/1998 | Levergood et al. |
| 5,708,832 A | 1/1998 | Inniss et al. |
| 5,710,565 A | 1/1998 | Shirai et al. |
| 5,710,601 A | 1/1998 | Marshall et al. |
| 5,710,833 A | 1/1998 | Moghaddam et al. |
| 5,710,834 A | 1/1998 | Rhoads |
| 5,710,884 A | 1/1998 | Dedrick |
| 5,710,887 A | 1/1998 | Chelliah et al. |
| 5,712,899 A | 1/1998 | Pace, II |
| 5,712,912 A | 1/1998 | Tomko et al. |
| 5,712,914 A | 1/1998 | Aucsmith et al. |
| 5,715,400 A | 2/1998 | Reimer et al. |
| 5,717,391 A | 2/1998 | Rodriguez |
| 5,717,757 A | 2/1998 | Micali |
| 5,717,814 A | 2/1998 | Abecassis |
| 5,717,923 A | 2/1998 | Dedrick |
| 5,719,579 A | 2/1998 | Torre et al. |
| 5,719,918 A | 2/1998 | Serbetciouglu et al. |
| 5,719,950 A | 2/1998 | Osten et al. |
| 5,721,781 A | 2/1998 | Deo et al. |
| 5,724,070 A | 3/1998 | Denninghoff et al. |
| 5,724,091 A | 3/1998 | Freeman et al. |
| 5,724,424 A | 3/1998 | Gifford |
| 5,724,472 A | 3/1998 | Abecassis |
| 5,724,521 A | 3/1998 | Dedrick |
| 5,724,567 A | 3/1998 | Rose et al. |
| 5,724,573 A | 3/1998 | Agrawal et al. |
| 5,726,688 A | 3/1998 | Siefert et al. |
| 5,726,893 A | 3/1998 | Schuchman et al. |
| 5,726,898 A | 3/1998 | Jacobs |
| 5,726,911 A | 3/1998 | Canada et al. |
| 5,727,057 A | 3/1998 | Emery et al. |
| 5,727,092 A | 3/1998 | Sandford, II et al. |

(56) References Cited

U.S. PATENT DOCUMENTS

| | | |
|---|---|---|
| 5,729,217 A | 3/1998 | Ito et al. |
| 5,729,741 A | 3/1998 | Liaguno et al. |
| 5,731,785 A | 3/1998 | Lemelson et al. |
| 5,731,788 A | 3/1998 | Reeds |
| 5,731,844 A * | 3/1998 | Rauch et al. ............... 725/40 |
| 5,732,074 A | 3/1998 | Spaur et al. |
| 5,732,125 A | 3/1998 | Oyama |
| 5,732,219 A | 3/1998 | Blumer et al. |
| 5,734,154 A | 3/1998 | Jachimowicz et al. |
| 5,734,337 A | 3/1998 | Kupersmit |
| 5,734,348 A | 3/1998 | Aoki et al. |
| 5,734,444 A | 3/1998 | Yoshinobu |
| 5,734,699 A | 3/1998 | Lu et al. |
| 5,734,752 A | 3/1998 | Knox |
| 5,734,786 A | 3/1998 | Mankovitz |
| 5,734,853 A | 3/1998 | Hendricks et al. |
| 5,734,893 A | 3/1998 | Li et al. |
| 5,737,420 A | 4/1998 | Tomko et al. |
| 5,737,444 A | 4/1998 | Colla et al. |
| 5,737,529 A | 4/1998 | Dolin, Jr. et al. |
| 5,737,700 A | 4/1998 | Cox et al. |
| 5,740,244 A | 4/1998 | Indeck et al. |
| 5,740,274 A | 4/1998 | Ono et al. |
| 5,740,362 A | 4/1998 | Buickel et al. |
| 5,740,532 A | 4/1998 | Fernandez et al. |
| 5,740,549 A | 4/1998 | Reilly et al. |
| 5,742,086 A | 4/1998 | Rostoker et al. |
| 5,742,683 A | 4/1998 | Lee et al. |
| 5,742,685 A | 4/1998 | Berson et al. |
| 5,742,811 A | 4/1998 | Agrawal et al. |
| 5,742,829 A | 4/1998 | Davis et al. |
| 5,745,126 A | 4/1998 | Jain et al. |
| 5,745,555 A | 4/1998 | Mark |
| 5,745,569 A | 4/1998 | Moskowitz et al. |
| 5,745,573 A | 4/1998 | Lipner et al. |
| 5,745,604 A | 4/1998 | Rhoads |
| 5,745,640 A | 4/1998 | Ishii et al. |
| 5,745,681 A | 4/1998 | Levine et al. |
| 5,745,710 A | 4/1998 | Clanton, III et al. |
| 5,745,758 A | 4/1998 | Shaw et al. |
| 5,745,759 A | 4/1998 | Hayden et al. |
| 5,748,716 A | 5/1998 | Levine |
| 5,748,738 A | 5/1998 | Bisbee et al. |
| 5,748,763 A | 5/1998 | Rhoads |
| 5,748,776 A | 5/1998 | Yoshida |
| 5,748,780 A | 5/1998 | Stolfo |
| 5,748,783 A | 5/1998 | Rhoads |
| 5,748,805 A | 5/1998 | Withgott et al. |
| 5,748,890 A | 5/1998 | Goldberg et al. |
| 5,749,060 A | 5/1998 | Graf et al. |
| 5,751,211 A | 5/1998 | Shirai et al. |
| 5,751,282 A | 5/1998 | Girard et al. |
| 5,751,286 A | 5/1998 | Barber et al. |
| 5,751,809 A | 5/1998 | Davis et al. |
| 5,751,831 A | 5/1998 | Ono |
| 5,751,836 A | 5/1998 | Wildes et al. |
| 5,751,909 A | 5/1998 | Gower |
| 5,752,217 A | 5/1998 | Ishizaki et al. |
| 5,753,970 A | 5/1998 | Rostoker |
| 5,754,060 A | 5/1998 | Nguyen et al. |
| 5,754,548 A | 5/1998 | Hoekstra et al. |
| 5,754,657 A | 5/1998 | Schipper et al. |
| 5,754,938 A | 5/1998 | Herz et al. |
| 5,754,939 A | 5/1998 | Herz et al. |
| 5,757,431 A | 5/1998 | Bradley et al. |
| 5,757,916 A | 5/1998 | MacDoran et al. |
| 5,758,257 A | 5/1998 | Herz et al. |
| 5,758,259 A | 5/1998 | Lawler |
| 5,760,530 A | 6/1998 | Kolesar |
| 5,760,713 A | 6/1998 | Yokoyama et al. |
| 5,760,739 A | 6/1998 | Pauli |
| 5,760,742 A | 6/1998 | Branch et al. |
| 5,761,288 A | 6/1998 | Pinard et al. |
| 5,761,298 A | 6/1998 | Davis et al. |
| 5,761,320 A | 6/1998 | Farinelli et al. |
| 5,761,516 A | 6/1998 | Rostoker et al. |
| 5,761,655 A | 6/1998 | Hoffman |
| 5,761,686 A | 6/1998 | Bloomberg |
| 5,763,862 A | 6/1998 | Jachimowicz et al. |
| 5,764,139 A | 6/1998 | Nojima et al. |
| 5,764,770 A | 6/1998 | Schipper et al. |
| 5,764,789 A | 6/1998 | Pare, Jr. et al. |
| 5,764,809 A | 6/1998 | Nomami et al. |
| 5,764,923 A | 6/1998 | Tallman et al. |
| 5,765,152 A | 6/1998 | Erickson |
| 5,767,496 A | 6/1998 | Swartz et al. |
| 5,767,804 A | 6/1998 | Murphy |
| 5,767,893 A | 6/1998 | Chen et al. |
| 5,767,913 A | 6/1998 | Kassatly |
| 5,767,922 A | 6/1998 | Zabih et al. |
| 5,768,382 A | 6/1998 | Schneier et al. |
| 5,768,385 A | 6/1998 | Simon |
| 5,768,421 A | 6/1998 | Gaffin et al. |
| 5,768,426 A | 6/1998 | Rhoads |
| 5,768,437 A | 6/1998 | Monro et al. |
| 5,768,680 A | 6/1998 | Thomas |
| 5,770,849 A | 6/1998 | Novis et al. |
| 5,771,071 A | 6/1998 | Bradley et al. |
| 5,771,307 A | 6/1998 | Lu et al. |
| 5,771,353 A | 6/1998 | Eggleston et al. |
| 5,771,354 A | 6/1998 | Crawford |
| 5,773,886 A | 6/1998 | Rostoker et al. |
| 5,774,129 A | 6/1998 | Poggio et al. |
| 5,774,170 A | 6/1998 | Hite et al. |
| 5,774,357 A | 6/1998 | Hoffberg et al. |
| 5,774,551 A | 6/1998 | Wu et al. |
| 5,774,664 A | 6/1998 | Hidary et al. |
| 5,774,670 A | 6/1998 | Montulli |
| 5,774,825 A | 6/1998 | Reynolds |
| 5,774,827 A | 6/1998 | Smith, Jr. et al. |
| 5,774,828 A | 6/1998 | Brunts et al. |
| 5,774,870 A | 6/1998 | Storey |
| 5,777,360 A | 7/1998 | Rostoker et al. |
| 5,777,374 A | 7/1998 | Rostoker et al. |
| 5,777,451 A | 7/1998 | Kobayashi et al. |
| 5,777,580 A | 7/1998 | Janky et al. |
| 5,778,102 A | 7/1998 | Sandford, II et al. |
| 5,778,135 A | 7/1998 | Ottesen et al. |
| 5,778,181 A | 7/1998 | Hidary et al. |
| 5,778,226 A | 7/1998 | Adams et al. |
| 5,778,333 A | 7/1998 | Koizumi et al. |
| 5,780,928 A | 7/1998 | Rostoker et al. |
| 5,781,101 A | 7/1998 | Stephen et al. |
| 5,781,906 A | 7/1998 | Aggarwal et al. |
| 5,784,007 A | 7/1998 | Pepper |
| 5,784,461 A | 7/1998 | Shaffer et al. |
| 5,784,463 A | 7/1998 | Chen et al. |
| 5,784,566 A | 7/1998 | Viavant et al. |
| 5,784,616 A | 7/1998 | Horvitz |
| 5,786,998 A | 7/1998 | Neeson et al. |
| 5,787,187 A | 7/1998 | Bouchard et al. |
| 5,787,201 A | 7/1998 | Nelson et al. |
| 5,789,733 A | 8/1998 | Jachimowicz et al. |
| 5,789,770 A | 8/1998 | Rostoker et al. |
| 5,790,668 A | 8/1998 | Tomko |
| 5,790,674 A | 8/1998 | Houvener et al. |
| 5,790,703 A | 8/1998 | Wang |
| 5,790,789 A | 8/1998 | Suarez |
| 5,790,974 A | 8/1998 | Tognazzini |
| 5,791,294 A | 8/1998 | Manning |
| 5,793,413 A | 8/1998 | Hylton et al. |
| 5,793,631 A | 8/1998 | Ito et al. |
| 5,793,753 A | 8/1998 | Hershey et al. |
| 5,793,813 A | 8/1998 | Cleave |
| 5,793,868 A | 8/1998 | Micali |
| 5,793,888 A | 8/1998 | Delanoy |
| 5,794,164 A | 8/1998 | Beckert et al. |
| 5,794,174 A | 8/1998 | Janky et al. |
| 5,794,209 A | 8/1998 | Agrawal et al. |
| 5,794,210 A | 8/1998 | Goldhaber et al. |
| 5,794,249 A | 8/1998 | Orsolini et al. |
| 5,795,228 A | 8/1998 | Trumbull et al. |
| 5,796,634 A | 8/1998 | Craport et al. |
| 5,797,001 A | 8/1998 | Augenbraun et al. |

(56) References Cited

U.S. PATENT DOCUMENTS

| | | | |
|---|---|---|---|
| 5,797,128 A | 8/1998 | Birnbaum | |
| 5,797,395 A | 8/1998 | Martin | |
| 5,798,785 A * | 8/1998 | Hendricks et al. | 725/46 |
| 5,799,082 A | 8/1998 | Murphy et al. | |
| 5,799,083 A | 8/1998 | Brothers et al. | |
| 5,799,086 A | 8/1998 | Sudia | |
| 5,799,087 A | 8/1998 | Rosen | |
| 5,799,088 A | 8/1998 | Raike | |
| 5,799,109 A | 8/1998 | Chung et al. | |
| 5,799,292 A | 8/1998 | Hekmatpour | |
| 5,801,422 A | 9/1998 | Rostoker et al. | |
| 5,801,432 A | 9/1998 | Rostoker et al. | |
| 5,801,747 A | 9/1998 | Bedard | |
| 5,801,750 A | 9/1998 | Kurihara | |
| 5,801,753 A | 9/1998 | Eyer et al. | |
| 5,802,199 A | 9/1998 | Pare, Jr. et al. | |
| 5,802,208 A | 9/1998 | Podilchuk et al. | |
| 5,802,243 A | 9/1998 | Yao et al. | |
| 5,802,361 A | 9/1998 | Wang et al. | |
| 5,802,492 A | 9/1998 | DeLorme et al. | |
| 5,805,082 A | 9/1998 | Hassett | |
| 5,805,719 A | 9/1998 | Pare, Jr. et al. | |
| 5,805,763 A | 9/1998 | Lawler et al. | |
| 5,805,803 A | 9/1998 | Birrell et al. | |
| 5,806,005 A | 9/1998 | Hull et al. | |
| 5,806,018 A | 9/1998 | Smith et al. | |
| 5,806,061 A | 9/1998 | Chaudhari et al. | |
| 5,808,197 A | 9/1998 | Dao | |
| 5,808,330 A | 9/1998 | Rostoker et al. | |
| 5,808,564 A | 9/1998 | Simms et al. | |
| 5,808,566 A | 9/1998 | Behr et al. | |
| 5,808,907 A | 9/1998 | Shetty et al. | |
| 5,809,415 A | 9/1998 | Rossmann | |
| 5,809,437 A | 9/1998 | Breed | |
| 5,809,471 A | 9/1998 | Brodsky | |
| 5,810,680 A | 9/1998 | Lobb et al. | |
| 5,811,863 A | 9/1998 | Rostoker et al. | |
| 5,812,086 A | 9/1998 | Bertiger et al. | |
| 5,812,087 A | 9/1998 | Krasner | |
| 5,812,398 A | 9/1998 | Nielsen | |
| 5,812,591 A | 9/1998 | Shumaker et al. | |
| 5,812,668 A | 9/1998 | Weber | |
| 5,812,749 A | 9/1998 | Fernandez et al. | |
| 5,812,768 A | 9/1998 | Page et al. | |
| 5,812,786 A | 9/1998 | Seazholtz et al. | |
| 5,812,997 A | 9/1998 | Morimoto et al. | |
| 5,814,798 A | 9/1998 | Zancho | |
| 5,815,092 A | 9/1998 | Gregg, III et al. | |
| 5,815,135 A | 9/1998 | Yui et al. | |
| 5,815,252 A | 9/1998 | Price-Francis | |
| 5,815,577 A | 9/1998 | Clark | |
| 5,815,657 A | 9/1998 | Williams et al. | |
| 5,818,510 A | 10/1998 | Cobbley et al. | |
| 5,819,227 A | 10/1998 | Obuchi | |
| 5,819,266 A | 10/1998 | Agrawal et al. | |
| 5,819,284 A | 10/1998 | Farber et al. | |
| 5,819,285 A | 10/1998 | Damico et al. | |
| 5,819,288 A | 10/1998 | De Bonet | |
| 5,819,289 A | 10/1998 | Sanford, II et al. | |
| 5,821,880 A | 10/1998 | Morimoto et al. | |
| 5,822,214 A | 10/1998 | Rostoker et al. | |
| 5,822,432 A | 10/1998 | Moskowitz et al. | |
| 5,822,436 A | 10/1998 | Rhoads | |
| 5,825,283 A | 10/1998 | Camhi | |
| 5,825,871 A | 10/1998 | Mark | |
| 5,825,880 A | 10/1998 | Sudia et al. | |
| 5,826,000 A | 10/1998 | Hamilton | |
| 5,826,014 A | 10/1998 | Coley et al. | |
| 5,826,029 A | 10/1998 | Gore, Jr. et al. | |
| 5,826,195 A | 10/1998 | Westerlage et al. | |
| 5,828,402 A | 10/1998 | Collings | |
| 5,828,751 A | 10/1998 | Walker et al. | |
| 5,828,809 A | 10/1998 | Chang et al. | |
| 5,828,840 A | 10/1998 | Cowan et al. | |
| RE35,954 E | 11/1998 | Levine | 380/10 |
| 5,829,782 A | 11/1998 | Breed et al. | |
| 5,832,089 A | 11/1998 | Kravitz et al. | |
| 5,832,119 A | 11/1998 | Rhoads | |
| 5,832,212 A | 11/1998 | Cragun et al. | |
| 5,832,279 A | 11/1998 | Rostoker et al. | |
| 5,832,464 A | 11/1998 | Houvener et al. | |
| 5,834,821 A | 11/1998 | Rostoker et al. | |
| 5,835,087 A | 11/1998 | Herz et al. | |
| 5,835,726 A | 11/1998 | Shwed et al. | |
| 5,838,237 A | 11/1998 | Revell et al. | |
| 5,838,314 A | 11/1998 | Neel et al. | |
| 5,838,812 A | 11/1998 | Pare, Jr. et al. | |
| 5,839,088 A | 11/1998 | Hancock et al. | |
| 5,839,119 A | 11/1998 | Krsul et al. | |
| 5,839,438 A | 11/1998 | Graettinger et al. | |
| 5,840,020 A | 11/1998 | Heinonen et al. | |
| 5,841,122 A | 11/1998 | Kirchhoff | |
| 5,841,367 A | 11/1998 | Giovanni | |
| 5,841,396 A | 11/1998 | Krasner | |
| 5,841,865 A | 11/1998 | Sudia | |
| 5,841,886 A | 11/1998 | Rhoads | |
| 5,841,907 A | 11/1998 | Javidi et al. | |
| 5,841,978 A | 11/1998 | Rhoads | |
| 5,842,194 A | 11/1998 | Arbuckle | |
| 5,842,200 A | 11/1998 | Agrawal et al. | |
| 5,844,244 A | 12/1998 | Graf et al. | |
| 5,844,573 A | 12/1998 | Poggio et al. | |
| 5,845,227 A | 12/1998 | Peterson | |
| 5,845,240 A | 12/1998 | Fielder | |
| 5,845,267 A | 12/1998 | Ronen | |
| 5,845,288 A | 12/1998 | Syeda-Mahmood | |
| 5,847,661 A | 12/1998 | Ricci | |
| 5,847,688 A | 12/1998 | Ohi et al. | |
| 5,848,155 A | 12/1998 | Cox | |
| 5,848,158 A | 12/1998 | Saito et al. | |
| 5,848,231 A | 12/1998 | Teitelbaum et al. | |
| 5,848,373 A | 12/1998 | DeLorme et al. | |
| 5,848,396 A | 12/1998 | Gerace | |
| 5,850,218 A | 12/1998 | LaJoie et al. | |
| 5,850,352 A | 12/1998 | Moezzi et al. | |
| 5,850,442 A | 12/1998 | Muftic | |
| 5,850,446 A | 12/1998 | Berger et al. | |
| 5,850,451 A | 12/1998 | Sudia | |
| 5,850,470 A | 12/1998 | Kung et al. | |
| 5,850,481 A | 12/1998 | Rhoads | |
| 5,852,232 A | 12/1998 | Samsavar et al. | |
| 5,852,351 A | 12/1998 | Canada et al. | |
| 5,852,823 A | 12/1998 | De Bonet | |
| 5,854,856 A | 12/1998 | Moura et al. | |
| 5,854,923 A | 12/1998 | Dockter et al. | |
| 5,854,994 A | 12/1998 | Canada et al. | |
| 5,855,008 A | 12/1998 | Goldhaber et al. | |
| 5,857,022 A | 1/1999 | Sudia | |
| 5,857,023 A | 1/1999 | Demers et al. | |
| 5,857,036 A | 1/1999 | Barnsley et al. | |
| 5,857,155 A | 1/1999 | Hill et al. | |
| 5,857,181 A | 1/1999 | Augenbraun et al. | |
| 5,857,201 A | 1/1999 | Wright, Jr. et al. | |
| 5,860,010 A | 1/1999 | Attal | |
| 5,861,881 A | 1/1999 | Freeman et al. | |
| 5,861,906 A | 1/1999 | Dunn et al. | |
| 5,862,223 A | 1/1999 | Walker et al. | |
| 5,862,246 A | 1/1999 | Colbert | |
| 5,862,260 A | 1/1999 | Rhoads | |
| 5,862,262 A | 1/1999 | Jacobs et al. | |
| 5,862,264 A | 1/1999 | Ishikawa et al. | |
| 5,862,509 A | 1/1999 | Desai et al. | |
| 5,864,125 A | 1/1999 | Szabo | |
| 5,864,165 A | 1/1999 | Rostoker et al. | |
| 5,864,323 A | 1/1999 | Berthon | |
| 5,864,481 A | 1/1999 | Gross et al. | |
| 5,864,667 A | 1/1999 | Barkan | |
| 5,864,669 A | 1/1999 | Osterman et al. | |
| 5,867,118 A | 2/1999 | McCoy et al. | |
| 5,867,205 A * | 2/1999 | Harrison | 725/38 |
| 5,867,221 A | 2/1999 | Pullen et al. | |
| 5,867,226 A * | 2/1999 | Wehmeyer et al. | 725/46 |
| 5,867,386 A | 2/1999 | Hoffberg et al. | |
| 5,867,404 A | 2/1999 | Bryan | |

(56) References Cited

U.S. PATENT DOCUMENTS

| | | |
|---|---|---|
| 5,867,578 A | 2/1999 | Brickell et al. |
| 5,867,579 A | 2/1999 | Saito |
| 5,867,603 A | 2/1999 | Barnsley et al. |
| 5,867,795 A | 2/1999 | Novis et al. |
| 5,867,799 A | 2/1999 | Lang et al. |
| 5,867,802 A | 2/1999 | Borza |
| 5,867,821 A | 2/1999 | Ballantyne et al. |
| 5,869,822 A | 2/1999 | Meadows, II et al. |
| 5,870,030 A | 2/1999 | DeLuca et al. |
| 5,870,151 A | 2/1999 | Korber |
| 5,870,493 A | 2/1999 | Vogl et al. |
| 5,870,502 A | 2/1999 | Bonneau et al. |
| 5,870,710 A | 2/1999 | Ozawa et al. |
| 5,870,723 A | 2/1999 | Pare, Jr. et al. |
| 5,870,724 A | 2/1999 | Lawlor et al. |
| 5,870,744 A | 2/1999 | Sprague |
| 5,870,754 A | 2/1999 | Dimitrova et al. |
| 5,872,380 A | 2/1999 | Rostoker et al. |
| 5,872,508 A | 2/1999 | Taoka |
| 5,872,588 A | 2/1999 | Aras et al. |
| 5,872,834 A | 2/1999 | Teitelbaum |
| 5,872,848 A | 2/1999 | Romney et al. |
| 5,872,849 A | 2/1999 | Sudia |
| 5,873,080 A | 2/1999 | Coden et al. |
| 5,874,914 A | 2/1999 | Krasner |
| 5,875,108 A | 2/1999 | Hoffberg et al. |
| 5,875,183 A | 2/1999 | Nitadori |
| 5,875,265 A | 2/1999 | Kasao |
| 5,875,446 A | 2/1999 | Brown et al. |
| 5,876,926 A | 3/1999 | Beecham |
| 5,877,759 A | 3/1999 | Bauer |
| 5,878,135 A | 3/1999 | Blatter et al. |
| 5,878,137 A | 3/1999 | Ippolito et al. |
| 5,878,144 A | 3/1999 | Aucsmith et al. |
| 5,878,356 A | 3/1999 | Garrot, Jr. et al. |
| 5,878,417 A | 3/1999 | Baldwin et al. |
| 5,880,768 A | 3/1999 | Lemmons et al. |
| 5,881,225 A | 3/1999 | Worth |
| 5,881,226 A | 3/1999 | Veneklase |
| 5,881,231 A | 3/1999 | Takagi et al. |
| 5,884,277 A | 3/1999 | Khosla |
| 5,884,282 A | 3/1999 | Robinson |
| 5,884,305 A | 3/1999 | Kleinberg et al. |
| 5,886,732 A | 3/1999 | Humpleman |
| 5,886,743 A | 3/1999 | Oh et al. |
| 5,887,243 A | 3/1999 | Harvey et al. |
| 5,887,269 A | 3/1999 | Brunts et al. |
| 5,889,329 A | 3/1999 | Rostoker et al. |
| 5,889,474 A | 3/1999 | LaDue |
| 5,889,477 A | 3/1999 | Fastenrath |
| 5,889,506 A | 3/1999 | Lopresti et al. |
| 5,889,852 A | 3/1999 | Rosecrans et al. |
| 5,889,862 A | 3/1999 | Ohta et al. |
| 5,889,863 A | 3/1999 | Weber |
| 5,889,868 A | 3/1999 | Moskowitz et al. |
| 5,889,919 A | 3/1999 | Inoue et al. |
| 5,890,061 A | 3/1999 | Timm et al. |
| 5,890,068 A | 3/1999 | Fattouche et al. |
| 5,890,079 A | 3/1999 | Levine |
| 5,890,152 A | 3/1999 | Rapaport et al. |
| 5,892,346 A | 4/1999 | Moroto et al. |
| 5,892,536 A | 4/1999 | Logan et al. |
| 5,892,824 A | 4/1999 | Beatson et al. |
| 5,892,838 A | 4/1999 | Brady |
| 5,892,900 A | 4/1999 | Ginter et al. |
| 5,892,902 A | 4/1999 | Clark |
| 5,893,075 A | 4/1999 | Plainfield et al. |
| 5,893,095 A | 4/1999 | Jain et al. |
| 5,893,110 A | 4/1999 | Weber et al. |
| 5,893,111 A | 4/1999 | Sharon, Jr. et al. |
| 5,893,113 A | 4/1999 | McGrath et al. |
| 5,894,323 A | 4/1999 | Kain et al. |
| 5,895,371 A | 4/1999 | Levitas et al. |
| 5,895,454 A | 4/1999 | Harrington |
| 5,895,464 A | 4/1999 | Bhandari et al. |
| 5,896,176 A | 4/1999 | Das et al. |
| 5,896,369 A | 4/1999 | Warsta et al. |
| 5,897,616 A | 4/1999 | Kanevsky et al. |
| 5,898,154 A | 4/1999 | Rosen |
| 5,898,391 A | 4/1999 | Jefferies et al. |
| 5,898,392 A | 4/1999 | Bambini et al. |
| 5,898,434 A | 4/1999 | Small et al. |
| 5,898,830 A | 4/1999 | Wesinger, Jr. et al. |
| 5,898,835 A | 4/1999 | Truong |
| 5,899,975 A | 5/1999 | Nielsen |
| 5,899,999 A | 5/1999 | De Bonet |
| 5,900,825 A | 5/1999 | Pressel et al. |
| 5,901,214 A | 5/1999 | Shaffer et al. |
| 5,901,229 A | 5/1999 | Fujisaki et al. |
| 5,901,244 A | 5/1999 | Souma et al. |
| 5,901,246 A | 5/1999 | Hoffberg et al. |
| 5,901,255 A | 5/1999 | Yagasaki |
| 5,901,342 A | 5/1999 | Heiskari et al. |
| 5,901,978 A | 5/1999 | Breed et al. |
| 5,903,261 A | 5/1999 | Walsh et al. |
| 5,903,454 A | 5/1999 | Hoffberg et al. |
| 5,903,651 A | 5/1999 | Kocher |
| 5,903,654 A | 5/1999 | Milton et al. |
| 5,903,678 A | 5/1999 | Ibenthal |
| 5,903,880 A | 5/1999 | Biffar |
| 5,903,892 A | 5/1999 | Hoffert et al. |
| 5,905,433 A | 5/1999 | Wortham |
| 5,905,493 A | 5/1999 | Belzer et al. |
| 5,905,505 A | 5/1999 | Lesk |
| 5,905,800 A | 5/1999 | Moskowitz et al. |
| 5,907,149 A | 5/1999 | Marckini |
| 5,907,293 A | 5/1999 | Tognazzini |
| 5,907,446 A | 5/1999 | Ishii et al. |
| 5,907,491 A | 5/1999 | Canada et al. |
| 5,907,706 A | 5/1999 | Brodsky et al. |
| 5,907,793 A | 5/1999 | Reams |
| 5,907,836 A | 5/1999 | Sumita et al. |
| 5,908,454 A | 6/1999 | Zyburt et al. |
| 5,909,183 A | 6/1999 | Borgstahl et al. |
| 5,909,493 A | 6/1999 | Motoyama |
| 5,910,987 A | 6/1999 | Ginter et al. |
| 5,910,988 A | 6/1999 | Ballard |
| 5,910,999 A | 6/1999 | Mukohzaka |
| 5,911,035 A | 6/1999 | Tsao |
| 5,911,139 A | 6/1999 | Jain et al. |
| 5,911,143 A | 6/1999 | Deinhart et al. |
| 5,912,696 A | 6/1999 | Buehl |
| 5,912,818 A | 6/1999 | McGrady et al. |
| 5,912,974 A | 6/1999 | Holloway et al. |
| 5,912,989 A | 6/1999 | Watanabe |
| 5,913,025 A | 6/1999 | Higley et al. |
| 5,913,196 A | 6/1999 | Talmor et al. |
| 5,913,205 A | 6/1999 | Jain et al. |
| 5,913,917 A | 6/1999 | Murphy |
| 5,914,654 A | 6/1999 | Smith |
| 5,914,712 A | 6/1999 | Sartain et al. |
| 5,915,008 A | 6/1999 | Dulman |
| 5,915,018 A | 6/1999 | Aucsmith |
| 5,915,027 A | 6/1999 | Cox et al. |
| 5,915,034 A | 6/1999 | Nakajima et al. |
| 5,915,038 A | 6/1999 | Abdel-Mottaleb et al. |
| 5,915,068 A | 6/1999 | Levine |
| 5,915,087 A | 6/1999 | Hammond et al. |
| 5,915,093 A | 6/1999 | Berlin et al. |
| 5,915,214 A | 6/1999 | Reece et al. |
| 5,915,250 A | 6/1999 | Jain et al. |
| 5,915,973 A | 6/1999 | Hoehn-Saric et al. |
| 5,916,300 A | 6/1999 | Kirk et al. |
| 5,917,405 A | 6/1999 | Joao |
| 5,917,408 A | 6/1999 | Cardillo et al. |
| 5,917,912 A | 6/1999 | Ginter et al. |
| 5,917,958 A | 6/1999 | Nunally et al. |
| 5,918,014 A | 6/1999 | Robinson |
| 5,918,223 A | 6/1999 | Blum et al. |
| 5,918,227 A | 6/1999 | Polnerow et al. |
| 5,920,058 A | 7/1999 | Weber et al. |
| 5,920,384 A | 7/1999 | Borza |
| 5,920,477 A | 7/1999 | Hoffberg et al. |
| 5,920,628 A | 7/1999 | Indeck et al. |

(56) References Cited

U.S. PATENT DOCUMENTS

| | | |
|---|---|---|
| 5,920,629 A | 7/1999 | Rosen |
| 5,920,856 A | 7/1999 | Syeda-Mahmood |
| 5,920,861 A | 7/1999 | Hall et al. |
| 5,922,040 A | 7/1999 | Prabhakaran |
| 5,922,074 A | 7/1999 | Richard et al. |
| 5,923,376 A | 7/1999 | Pullen et al. |
| 5,923,763 A | 7/1999 | Walker et al. |
| 5,923,780 A | 7/1999 | Morfill et al. |
| 5,924,053 A | 7/1999 | Horowitz et al. |
| 5,925,126 A | 7/1999 | Hsieh |
| 5,926,117 A | 7/1999 | Gunji et al. |
| 5,926,548 A | 7/1999 | Okamoto |
| 5,928,306 A | 7/1999 | France et al. |
| 5,928,325 A | 7/1999 | Shaughnessy et al. |
| 5,928,333 A | 7/1999 | Landfield et al. |
| 5,929,753 A | 7/1999 | Montague |
| 5,930,250 A | 7/1999 | Klok et al. |
| 5,930,369 A | 7/1999 | Cox et al. |
| 5,930,777 A | 7/1999 | Barber |
| 5,930,783 A | 7/1999 | Li et al. |
| 5,930,804 A | 7/1999 | Yu et al. |
| 5,933,080 A | 8/1999 | Nojima |
| 5,933,100 A | 8/1999 | Golding |
| 5,933,498 A | 8/1999 | Schneck et al. |
| 5,933,515 A | 8/1999 | Pu et al. |
| 5,933,546 A | 8/1999 | Stone |
| 5,933,811 A | 8/1999 | Angles et al. |
| 5,933,823 A | 8/1999 | Cullen et al. |
| 5,933,827 A | 8/1999 | Cole et al. |
| 5,935,071 A | 8/1999 | Schneider et al. |
| 5,935,190 A | 8/1999 | Davis et al. |
| 5,936,667 A | 8/1999 | Saib et al. |
| 5,937,068 A | 8/1999 | Audebert |
| 5,937,163 A | 8/1999 | Lee et al. |
| 5,937,392 A | 8/1999 | Alberts |
| 5,937,394 A | 8/1999 | Wong et al. |
| 5,937,421 A | 8/1999 | Petrov et al. |
| 5,938,704 A | 8/1999 | Torii |
| 5,938,717 A | 8/1999 | Dunne et al. |
| 5,938,721 A | 8/1999 | Dussell et al. |
| 5,940,004 A | 8/1999 | Fulton |
| 5,940,072 A | 8/1999 | Jahanghir et al. |
| 5,940,387 A | 8/1999 | Humpleman |
| 5,940,821 A | 8/1999 | Wical |
| 5,943,422 A | 8/1999 | Van Wie et al. |
| 5,943,423 A | 8/1999 | Muftic |
| 5,943,424 A | 8/1999 | Berger et al. |
| 5,943,427 A | 8/1999 | Massie et al. |
| 5,943,428 A | 8/1999 | Seri et al. |
| 5,944,823 A | 8/1999 | Jade et al. |
| 5,945,919 A | 8/1999 | Trask |
| 5,945,944 A | 8/1999 | Krasner |
| 5,945,988 A | 8/1999 | Williams et al. |
| 5,946,083 A | 8/1999 | Melendez et al. |
| 5,946,414 A | 8/1999 | Cass et al. |
| 5,946,488 A | 8/1999 | Tanguay et al. |
| 5,946,490 A | 8/1999 | Lieberherr et al. |
| 5,946,629 A | 8/1999 | Sawyer et al. |
| 5,946,669 A | 8/1999 | Polk |
| 5,946,687 A | 8/1999 | Gehani et al. |
| 5,948,026 A | 9/1999 | Beemer, II et al. |
| 5,948,038 A | 9/1999 | Daly et al. |
| 5,948,040 A | 9/1999 | DeLorme et al. |
| 5,948,061 A | 9/1999 | Merriman et al. |
| 5,948,136 A | 9/1999 | Smyers |
| 5,949,045 A | 9/1999 | Ezawa et al. |
| 5,949,046 A | 9/1999 | Kenneth et al. |
| 5,949,866 A | 9/1999 | Coiera et al. |
| 5,949,876 A | 9/1999 | Ginter et al. |
| 5,949,879 A | 9/1999 | Berson et al. |
| 5,949,881 A | 9/1999 | Davis |
| 5,949,882 A | 9/1999 | Angelo |
| 5,949,885 A | 9/1999 | Leighton |
| 5,950,137 A | 9/1999 | Kim |
| 5,950,195 A | 9/1999 | Stockwell et al. |
| 5,951,055 A | 9/1999 | Mowry, Jr. |
| 5,951,620 A | 9/1999 | Ahrens et al. |
| 5,952,638 A | 9/1999 | Demers et al. |
| 5,952,641 A | 9/1999 | Korshun |
| 5,952,941 A | 9/1999 | Mardirossian |
| 5,953,419 A | 9/1999 | Lohstroh et al. |
| 5,953,526 A | 9/1999 | Day et al. |
| 5,953,650 A | 9/1999 | Villevieille |
| 5,953,677 A | 9/1999 | Sato |
| 5,954,583 A | 9/1999 | Green |
| 5,954,773 A | 9/1999 | Luper |
| 5,955,973 A | 9/1999 | Anderson |
| 5,956,400 A | 9/1999 | Chaum et al. |
| 5,956,408 A | 9/1999 | Arnold |
| 5,956,487 A | 9/1999 | Venkatraman et al. |
| 5,956,660 A | 9/1999 | Neumann |
| 5,956,664 A | 9/1999 | Bryan |
| 5,958,016 A | 9/1999 | Chang et al. |
| 5,958,050 A | 9/1999 | Griffin et al. |
| 5,959,529 A | 9/1999 | Kail, IV |
| 5,959,536 A | 9/1999 | Chambers et al. |
| 5,959,580 A | 9/1999 | Maloney et al. |
| 5,960,083 A | 9/1999 | Micali |
| 5,960,177 A | 9/1999 | Tanno |
| 5,960,362 A | 9/1999 | Grob et al. |
| 5,961,569 A | 10/1999 | Craport et al. |
| 5,961,572 A | 10/1999 | Craport et al. |
| 5,963,092 A | 10/1999 | Van Zalinge |
| 5,963,167 A | 10/1999 | Lichten et al. |
| 5,963,582 A | 10/1999 | Stansell, Jr. |
| 5,963,645 A | 10/1999 | Kigawa et al. |
| 5,963,648 A | 10/1999 | Rosen |
| 5,963,657 A | 10/1999 | Bowker et al. |
| 5,963,670 A | 10/1999 | Lipson et al. |
| 5,963,908 A | 10/1999 | Chadha |
| 5,963,924 A | 10/1999 | Williams et al. |
| 5,964,821 A | 10/1999 | Brunts et al. |
| 5,964,822 A | 10/1999 | Alland et al. |
| 5,966,446 A | 10/1999 | Davis |
| 5,966,533 A | 10/1999 | Moody |
| 5,966,658 A | 10/1999 | Kennedy, III et al. |
| 5,966,696 A | 10/1999 | Giraud |
| 5,968,109 A | 10/1999 | Israni et al. |
| 5,968,176 A | 10/1999 | Nessett et al. |
| 5,969,598 A | 10/1999 | Kimura |
| 5,969,765 A | 10/1999 | Boon |
| 5,970,143 A | 10/1999 | Schneier et al. |
| 5,970,173 A | 10/1999 | Lee et al. |
| 5,970,486 A | 10/1999 | Yoshida et al. |
| 5,973,309 A | 10/1999 | Livingston |
| 5,973,376 A | 10/1999 | Rostoker et al. |
| 5,973,643 A | 10/1999 | Hawkes et al. |
| 5,973,683 A | 10/1999 | Cragun et al. |
| 5,974,146 A | 10/1999 | Randle et al. |
| 5,974,188 A | 10/1999 | Ibenthal |
| 5,974,235 A | 10/1999 | Nunally et al. |
| 5,974,368 A | 10/1999 | Schepps et al. |
| 5,974,398 A | 10/1999 | Hanson et al. |
| 5,974,412 A | 10/1999 | Hazlehurst et al. |
| 5,974,548 A | 10/1999 | Adams |
| 5,977,884 A | 11/1999 | Ross |
| 5,977,906 A | 11/1999 | Ameen et al. |
| 5,977,964 A | 11/1999 | Williams et al. |
| 5,978,475 A | 11/1999 | Schneier et al. |
| 5,978,494 A | 11/1999 | Zhang |
| 5,978,516 A | 11/1999 | Dickopp et al. |
| 5,978,578 A | 11/1999 | Azarya et al. |
| 5,978,747 A | 11/1999 | Craport et al. |
| 5,978,766 A | 11/1999 | Luciw |
| 5,978,804 A | 11/1999 | Dietzman |
| 5,978,840 A | 11/1999 | Nguyen et al. |
| 5,978,918 A | 11/1999 | Scholnick et al. |
| 5,979,773 A | 11/1999 | Findley, Jr. et al. |
| 5,982,281 A | 11/1999 | Layson, Jr. |
| 5,982,324 A | 11/1999 | Watters et al. |
| 5,982,386 A | 11/1999 | Fujimoto |
| 5,982,445 A | 11/1999 | Eyer et al. |
| 5,982,520 A | 11/1999 | Weiser et al. |
| 5,982,891 A | 11/1999 | Ginter et al. |

(56) References Cited

U.S. PATENT DOCUMENTS

| | | |
|---|---|---|
| 5,982,894 A | 11/1999 | McCalley et al. |
| 5,983,092 A | 11/1999 | Whinnett et al. |
| 5,983,099 A | 11/1999 | Yao et al. |
| 5,983,158 A | 11/1999 | Suzuki et al. |
| 5,983,161 A | 11/1999 | Lemelson et al. |
| 5,983,176 A | 11/1999 | Hoffert et al. |
| 5,983,196 A | 11/1999 | Wendkos |
| 5,983,208 A | 11/1999 | Haller et al. |
| 5,983,214 A | 11/1999 | Lang et al. |
| 5,983,218 A | 11/1999 | Syeda-Mahmood |
| 5,983,350 A | 11/1999 | Minear et al. |
| 5,984,366 A | 11/1999 | Priddy |
| 5,986,746 A | 11/1999 | Metz et al. |
| 5,987,132 A | 11/1999 | Rowney |
| 5,987,136 A | 11/1999 | Schipper et al. |
| 5,987,140 A | 11/1999 | Rowney et al. |
| 5,987,153 A | 11/1999 | Chan et al. |
| 5,987,155 A | 11/1999 | Dunn et al. |
| 5,987,306 A | 11/1999 | Nilsen et al. |
| 5,987,381 A | 11/1999 | Oshizawa |
| 5,987,440 A | 11/1999 | O'Neil et al. |
| 5,987,454 A | 11/1999 | Hobbs |
| 5,987,459 A | 11/1999 | Swanson et al. |
| 5,987,519 A | 11/1999 | Peifer et al. |
| 5,987,552 A | 11/1999 | Chittor et al. |
| 5,987,979 A | 11/1999 | Bryan |
| 5,990,687 A | 11/1999 | Williams |
| 5,990,801 A | 11/1999 | Kyouno et al. |
| 5,990,927 A | 11/1999 | Hendricks et al. |
| 5,991,399 A | 11/1999 | Graunke et al. |
| 5,991,408 A | 11/1999 | Pearson et al. |
| 5,991,429 A | 11/1999 | Coffin et al. |
| 5,991,431 A | 11/1999 | Borza et al. |
| 5,991,519 A | 11/1999 | Benhammou et al. |
| 5,991,690 A | 11/1999 | Murphy |
| 5,991,731 A | 11/1999 | Colon et al. |
| 5,991,735 A | 11/1999 | Gerace |
| 5,991,740 A | 11/1999 | Messer |
| 5,991,751 A | 11/1999 | Rivette et al. |
| 5,991,806 A | 11/1999 | McHann, Jr. |
| 5,991,832 A | 11/1999 | Sato et al. |
| 5,991,877 A | 11/1999 | Luckenbaugh |
| 5,991,878 A | 11/1999 | McDonough et al. |
| 5,995,094 A | 11/1999 | Eggen et al. |
| 5,995,625 A | 11/1999 | Sudia et al. |
| 5,995,630 A | 11/1999 | Borza |
| 5,995,673 A | 11/1999 | Ibenthal et al. |
| 5,995,882 A | 11/1999 | Patterson et al. |
| 5,995,978 A | 11/1999 | Cullen et al. |
| 5,995,997 A | 11/1999 | Horvitz |
| 5,996,076 A | 11/1999 | Rowney et al. |
| 5,999,091 A | 12/1999 | Wortham |
| 5,999,095 A | 12/1999 | Earl et al. |
| 5,999,124 A | 12/1999 | Sheynblat |
| 5,999,126 A | 12/1999 | Ito |
| 5,999,216 A | 12/1999 | Kaars |
| 5,999,629 A | 12/1999 | Heer et al. |
| 5,999,637 A | 12/1999 | Toyoda et al. |
| 5,999,808 A | 12/1999 | LaDue |
| 5,999,878 A | 12/1999 | Hanson et al. |
| 5,999,919 A | 12/1999 | Jarecki et al. |
| 5,999,973 A | 12/1999 | Glitho et al. |
| 6,002,406 A | 12/1999 | Zhao |
| 6,002,756 A | 12/1999 | Lo et al. |
| 6,002,767 A | 12/1999 | Kramer |
| 6,002,770 A | 12/1999 | Tomko et al. |
| 6,002,772 A | 12/1999 | Saito |
| 6,002,794 A | 12/1999 | Bonneau et al. |
| 6,003,084 A | 12/1999 | Green et al. |
| 6,003,135 A | 12/1999 | Bialick et al. |
| 6,003,765 A | 12/1999 | Okamoto |
| 6,004,276 A | 12/1999 | Wright et al. |
| 6,005,513 A | 12/1999 | Hardesty |
| 6,005,561 A | 12/1999 | Hawkins et al. |
| 6,005,597 A | 12/1999 | Barrett et al. |
| 6,005,859 A | 12/1999 | Harvell et al. |
| 6,005,861 A | 12/1999 | Humpleman |
| 6,005,939 A | 12/1999 | Fortenberry et al. |
| 6,005,943 A | 12/1999 | Cohen et al. |
| 6,006,197 A | 12/1999 | d'Eon et al. |
| 6,006,218 A | 12/1999 | Breese et al. |
| 6,006,265 A | 12/1999 | Rangan et al. |
| 6,006,328 A | 12/1999 | Drake |
| 6,006,332 A | 12/1999 | Rabne et al. |
| 6,009,177 A | 12/1999 | Sudia |
| 6,009,323 A | 12/1999 | Heffield et al. |
| 6,009,330 A | 12/1999 | Kennedy, III et al. |
| 6,009,356 A | 12/1999 | Monroe |
| 6,009,363 A | 12/1999 | Beckert et al. |
| 6,009,386 A | 12/1999 | Cruickshank et al. |
| 6,009,403 A | 12/1999 | Sato |
| 6,009,409 A | 12/1999 | Adler et al. |
| 6,009,410 A | 12/1999 | LeMole et al. |
| 6,009,430 A | 12/1999 | Joseph et al. |
| 6,009,452 A | 12/1999 | Horvitz |
| 6,009,475 A | 12/1999 | Shrader |
| 6,009,526 A | 12/1999 | Choi |
| 6,011,787 A | 1/2000 | Nakano et al. |
| 6,011,858 A | 1/2000 | Stock et al. |
| 6,011,872 A | 1/2000 | Qian et al. |
| 6,011,895 A | 1/2000 | Abecassis |
| 6,012,039 A | 1/2000 | Hoffman et al. |
| 6,012,046 A | 1/2000 | Lupien et al. |
| 6,012,049 A | 1/2000 | Kawan |
| 6,012,051 A | 1/2000 | Sammon, Jr. et al. |
| 6,012,052 A | 1/2000 | Altschuler et al. |
| 6,012,083 A | 1/2000 | Savitzky et al. |
| 6,012,088 A | 1/2000 | Li et al. |
| 6,013,007 A | 1/2000 | Root et al. |
| 6,014,090 A | 1/2000 | Rosen et al. |
| 6,014,184 A | 1/2000 | Knee et al. |
| 6,014,406 A | 1/2000 | Shida et al. |
| 6,014,634 A | 1/2000 | Scroggie et al. |
| 6,014,638 A | 1/2000 | Burge et al. |
| 6,014,666 A | 1/2000 | Helland et al. |
| 6,016,318 A | 1/2000 | Tomoike |
| 6,016,348 A | 1/2000 | Blatter et al. |
| 6,016,476 A | 1/2000 | Maes et al. |
| 6,016,484 A | 1/2000 | Williams et al. |
| 6,016,485 A | 1/2000 | Amakawa et al. |
| 6,016,509 A | 1/2000 | Dedrick |
| 6,018,292 A | 1/2000 | Penny, Jr. |
| 6,018,372 A | 1/2000 | Etheredge |
| 6,018,659 A | 1/2000 | Ayyagari et al. |
| 6,018,695 A | 1/2000 | Ahrens et al. |
| 6,018,699 A | 1/2000 | Baron, Sr. et al. |
| 6,018,710 A | 1/2000 | Wynblatt et al. |
| 6,018,724 A | 1/2000 | Arent |
| 6,018,738 A | 1/2000 | Breese et al. |
| 6,018,739 A | 1/2000 | McCoy et al. |
| 6,018,801 A | 1/2000 | Palage et al. |
| 6,020,845 A | 2/2000 | Weinberg et al. |
| 6,020,883 A | 2/2000 | Herz et al. |
| 6,020,924 A | 2/2000 | Jahanghir |
| 6,021,202 A | 2/2000 | Anderson et al. |
| 6,021,231 A | 2/2000 | Miyatake et al. |
| 6,021,399 A | 2/2000 | Demers et al. |
| 6,021,403 A | 2/2000 | Horvitz et al. |
| 6,021,491 A | 2/2000 | Renaud |
| 6,021,497 A | 2/2000 | Bouthillier et al. |
| 6,023,223 A | 2/2000 | Baxter, Jr. |
| 6,023,232 A | 2/2000 | Eitzenberger |
| 6,023,241 A | 2/2000 | Clapper |
| 6,023,242 A | 2/2000 | Dixon |
| 6,023,267 A | 2/2000 | Chapuis et al. |
| 6,023,530 A | 2/2000 | Wilson |
| 6,023,694 A | 2/2000 | Kouchi et al. |
| 6,023,729 A | 2/2000 | Samuel et al. |
| 6,023,762 A | 2/2000 | Dean et al. |
| 6,025,788 A | 2/2000 | Diduck |
| 6,025,837 A | 2/2000 | Matthews, III et al. |
| 6,025,868 A | 2/2000 | Russo |
| 6,026,166 A | 2/2000 | LeBourgeois |
| 6,026,167 A | 2/2000 | Aziz |

(56) References Cited

U.S. PATENT DOCUMENTS

| | | | |
|---|---|---|---|
| 6,026,193 A | 2/2000 | Rhoads |
| 6,026,375 A | 2/2000 | Hall et al. |
| 6,026,379 A | 2/2000 | Haller et al. |
| 6,026,490 A | 2/2000 | Johns-Vano et al. |
| 6,028,537 A | 2/2000 | Suman et al. |
| 6,028,548 A | 2/2000 | Farmer |
| 6,028,604 A | 2/2000 | Matthews, III et al. |
| 6,028,857 A | 2/2000 | Poor |
| 6,028,932 A | 2/2000 | Park |
| 6,028,933 A | 2/2000 | Heer et al. |
| 6,028,936 A | 2/2000 | Hillis |
| 6,028,937 A | 2/2000 | Tatebayashi et al. |
| 6,028,939 A | 2/2000 | Yin |
| 6,029,045 A | 2/2000 | Picco et al. |
| 6,029,067 A | 2/2000 | Pfundstein |
| 6,029,150 A | 2/2000 | Kravitz |
| 6,029,151 A | 2/2000 | Nikander |
| 6,029,160 A | 2/2000 | Cabrera et al. |
| 6,029,176 A | 2/2000 | Cannon |
| 6,029,195 A | 2/2000 | Herz |
| 6,029,245 A | 2/2000 | Scanlan |
| 6,029,247 A | 2/2000 | Ferguson |
| 6,031,531 A | 2/2000 | Kimble |
| 6,031,573 A | 2/2000 | MacCormack et al. |
| 6,031,580 A | 2/2000 | Sim |
| 6,031,797 A | 2/2000 | Van Ryzin et al. |
| 6,031,910 A | 2/2000 | Deindl et al. |
| 6,031,913 A | 2/2000 | Hassan et al. |
| 6,031,914 A | 2/2000 | Tewfik et al. |
| 6,032,051 A | 2/2000 | Hall et al. |
| 6,032,054 A | 2/2000 | Schwinke |
| 6,032,084 A | 2/2000 | Anderson et al. |
| 6,032,089 A | 2/2000 | Buckley |
| 6,032,097 A | 2/2000 | Iihoshi et al. |
| 6,032,118 A | 2/2000 | Tello et al. |
| 6,032,141 A | 2/2000 | O'Connor et al. |
| 6,032,156 A | 2/2000 | Marcus |
| 6,032,202 A | 2/2000 | Lea et al. |
| 6,034,618 A | 3/2000 | Tatebayashi et al. |
| 6,034,677 A | 3/2000 | Noguchi et al. |
| 6,035,038 A | 3/2000 | Campinos et al. |
| 6,035,041 A | 3/2000 | Frankel et al. |
| 6,035,398 A | 3/2000 | Bjorn |
| 6,035,402 A | 3/2000 | Vaeth et al. |
| 6,035,406 A | 3/2000 | Moussa et al. |
| 6,035,714 A | 3/2000 | Yazdi et al. |
| 6,037,870 A | 3/2000 | Alessandro |
| 6,037,933 A | 3/2000 | Blonstein et al. |
| 6,037,998 A | 3/2000 | Usui et al. |
| 6,038,315 A | 3/2000 | Strait et al. |
| 6,038,316 A | 3/2000 | Dwork et al. |
| 6,038,322 A | 3/2000 | Harkins |
| 6,038,337 A | 3/2000 | Lawrence et al. |
| 6,038,367 A | 3/2000 | Abecassis |
| 6,038,436 A | 3/2000 | Priest |
| 6,038,554 A | 3/2000 | Vig |
| 6,038,560 A | 3/2000 | Wical |
| 6,038,563 A | 3/2000 | Bapat et al. |
| 6,038,568 A | 3/2000 | McGrath et al. |
| 6,038,581 A | 3/2000 | Aoki et al. |
| 6,038,591 A | 3/2000 | Wolfe et al. |
| 6,038,625 A | 3/2000 | Ogino et al. |
| 6,038,665 A | 3/2000 | Bolt et al. |
| 6,038,666 A | 3/2000 | Hsu et al. |
| 6,040,783 A | 3/2000 | Houvener et al. |
| 6,040,829 A | 3/2000 | Croy et al. |
| 6,041,122 A | 3/2000 | Graunke et al. |
| 6,041,123 A | 3/2000 | Colvin, Sr. |
| 6,041,147 A | 3/2000 | Mead |
| 6,041,349 A | 3/2000 | Sugauchi et al. |
| 6,041,355 A | 3/2000 | Toga |
| 6,041,357 A | 3/2000 | Kunzelman et al. |
| 6,041,408 A | 3/2000 | Nishioka et al. |
| 6,041,410 A | 3/2000 | Hsu et al. |
| 6,041,411 A | 3/2000 | Wyatt |
| 6,041,412 A | 3/2000 | Timson et al. |
| 6,042,383 A | 3/2000 | Herron |
| 6,044,131 A | 3/2000 | McEvoy et al. |
| 6,044,155 A | 3/2000 | Thomlinson et al. |
| 6,044,157 A | 3/2000 | Uesaka et al. |
| 6,044,168 A | 3/2000 | Tuceryan et al. |
| 6,044,170 A | 3/2000 | Migdal et al. |
| 6,044,205 A | 3/2000 | Reed et al. |
| 6,044,349 A | 3/2000 | Tolopka et al. |
| 6,044,350 A | 3/2000 | Weiant, Jr. et al. |
| 6,044,388 A | 3/2000 | DeBellis et al. |
| 6,044,401 A | 3/2000 | Harvey |
| 6,044,403 A | 3/2000 | Gerszberg et al. |
| 6,044,462 A | 3/2000 | Zubeldia et al. |
| 6,044,463 A | 3/2000 | Kanda et al. |
| 6,044,464 A | 3/2000 | Shamir |
| 6,044,466 A | 3/2000 | Anand et al. |
| 6,044,468 A | 3/2000 | Osmond |
| 6,044,698 A | 4/2000 | Bryan |
| 6,045,039 A | 4/2000 | Stinson et al. |
| 6,047,051 A | 4/2000 | Ginzboorg et al. |
| 6,047,066 A | 4/2000 | Brown et al. |
| 6,047,067 A | 4/2000 | Rosen |
| 6,047,072 A | 4/2000 | Field et al. |
| 6,047,078 A | 4/2000 | Kang |
| 6,047,234 A | 4/2000 | Cherveny et al. |
| 6,047,236 A | 4/2000 | Hancock et al. |
| 6,047,242 A | 4/2000 | Benson |
| 6,047,258 A | 4/2000 | Allison et al. |
| 6,047,268 A | 4/2000 | Bartoli et al. |
| 6,047,269 A | 4/2000 | Biffar |
| 6,047,322 A | 4/2000 | Vaid et al. |
| 6,047,325 A | 4/2000 | Jain et al. |
| 6,047,327 A | 4/2000 | Tso et al. |
| 6,047,374 A | 4/2000 | Barton |
| 6,047,887 A | 4/2000 | Rosen |
| 6,048,276 A | 4/2000 | Vandergrift |
| 6,049,333 A | 4/2000 | LaJoie et al. |
| 6,049,610 A | 4/2000 | Crandall |
| 6,049,612 A | 4/2000 | Fielder et al. |
| 6,049,613 A | 4/2000 | Jakobsson |
| 6,049,614 A | 4/2000 | Kim |
| 6,049,627 A | 4/2000 | Becker et al. |
| 6,049,671 A | 4/2000 | Slivka et al. |
| 6,049,758 A | 4/2000 | Bunks et al. |
| 6,049,777 A | 4/2000 | Sheena et al. |
| 6,049,785 A | 4/2000 | Gifford |
| 6,049,786 A | 4/2000 | Smorodinsky |
| 6,049,787 A | 4/2000 | Takahashi et al. |
| 6,049,838 A | 4/2000 | Miller et al. |
| 6,049,872 A | 4/2000 | Reiter et al. |
| 6,049,874 A | 4/2000 | McClain et al. |
| 6,049,875 A | 4/2000 | Suzuki et al. |
| 6,052,081 A | 4/2000 | Krasner |
| 6,052,082 A | 4/2000 | Hassan et al. |
| 6,052,466 A | 4/2000 | Wright |
| 6,052,467 A | 4/2000 | Brands |
| 6,052,468 A | 4/2000 | Hillhouse |
| 6,052,469 A | 4/2000 | Johnson et al. |
| 6,052,556 A | 4/2000 | Sampsell |
| 6,052,591 A | 4/2000 | Bhatia |
| 6,052,598 A | 4/2000 | Rudrapatna et al. |
| 6,052,676 A | 4/2000 | Hekmatpour |
| 6,052,688 A | 4/2000 | Thorsen |
| 6,052,750 A | 4/2000 | Lea |
| 6,052,780 A | 4/2000 | Glover |
| 6,052,788 A | 4/2000 | Wesinger, Jr. et al. |
| 6,053,554 A | 4/2000 | Doniaz |
| 6,054,950 A | 4/2000 | Fontana |
| 6,055,314 A | 4/2000 | Spies et al. |
| 6,055,321 A | 4/2000 | Numao et al. |
| 6,055,335 A | 4/2000 | Ida et al. |
| 6,055,337 A | 4/2000 | Kim |
| 6,055,478 A | 4/2000 | Heron |
| 6,055,508 A | 4/2000 | Naor et al. |
| 6,055,512 A | 4/2000 | Dean et al. |
| 6,055,542 A | 4/2000 | Nielsen et al. |
| 6,055,560 A | 4/2000 | Mills et al. |
| 6,055,569 A | 4/2000 | O'Brien et al. |

(56) References Cited

U.S. PATENT DOCUMENTS

| | | |
|---|---|---|
| 6,055,573 A | 4/2000 | Gardenswartz et al. |
| 6,055,575 A | 4/2000 | Paulsen et al. |
| 6,055,636 A | 4/2000 | Hillier et al. |
| 6,055,637 A | 4/2000 | Hudson et al. |
| 6,055,639 A | 4/2000 | Schanze |
| D424,061 S | 5/2000 | Backs et al. .......... D14/218 |
| D424,577 S | 5/2000 | Backs et al. .......... D14/718 |
| 6,056,197 A | 5/2000 | Hara et al. |
| 6,056,199 A | 5/2000 | Wiklof et al. |
| 6,057,808 A | 5/2000 | Tajima |
| 6,057,872 A | 5/2000 | Candelore |
| 6,057,890 A | 5/2000 | Virden et al. |
| 6,057,966 A | 5/2000 | Carroll et al. |
| 6,058,179 A | 5/2000 | Shaffer et al. |
| 6,058,187 A | 5/2000 | Chen |
| 6,058,188 A | 5/2000 | Chandersekaran et al. |
| 6,058,189 A | 5/2000 | McGough |
| 6,058,193 A | 5/2000 | Cordery et al. |
| 6,058,206 A | 5/2000 | Kortge |
| 6,058,303 A | 5/2000 | åstrom et al. |
| 6,058,307 A | 5/2000 | Garner |
| 6,058,338 A | 5/2000 | Agashe et al. |
| 6,058,381 A | 5/2000 | Nelson |
| 6,058,383 A | 5/2000 | Narasimhalu et al. |
| 6,060,989 A | 5/2000 | Gehlot |
| 6,060,995 A | 5/2000 | Wicks et al. |
| 6,060,996 A | 5/2000 | Kaiser et al. |
| 6,061,018 A | 5/2000 | Sheynblat |
| 6,061,021 A | 5/2000 | Zibell |
| 6,061,097 A | 5/2000 | Satterfield |
| 6,061,448 A | 5/2000 | Smith et al. |
| 6,061,451 A | 5/2000 | Muratani et al. |
| 6,061,454 A | 5/2000 | malik et al. |
| 6,061,468 A | 5/2000 | Kang |
| 6,061,503 A | 5/2000 | Chamberlain |
| 6,061,561 A | 5/2000 | Alanara et al. |
| 6,061,632 A | 5/2000 | Dreier |
| 6,061,658 A | 5/2000 | Chou et al. |
| 6,061,665 A | 5/2000 | Bahreman |
| 6,061,680 A | 5/2000 | Scherf et al. |
| 6,061,682 A | 5/2000 | Agrawal et al. |
| 6,061,692 A | 5/2000 | Thomas et al. |
| 6,061,709 A | 5/2000 | Bronte |
| 6,061,729 A | 5/2000 | Nightingale |
| 6,061,789 A | 5/2000 | Hauser et al. |
| 6,061,790 A | 5/2000 | Bodnar |
| 6,061,791 A | 5/2000 | Moreau |
| 6,061,792 A | 5/2000 | Simon |
| 6,061,794 A | 5/2000 | Angelo et al. |
| 6,061,796 A | 5/2000 | Chen et al. |
| 6,061,797 A | 5/2000 | Jade et al. |
| 6,061,798 A | 5/2000 | Coley et al. |
| 6,061,799 A | 5/2000 | Eldridge et al. |
| 6,064,336 A | 5/2000 | Krasner |
| 6,064,376 A | 5/2000 | Berezowski et al. |
| 6,064,378 A | 5/2000 | Chaney et al. |
| 6,064,398 A | 5/2000 | Ellenby et al. |
| 6,064,438 A | 5/2000 | Miller |
| 6,064,723 A | 5/2000 | Cohn et al. |
| 6,064,737 A | 5/2000 | Rhoads |
| 6,064,738 A | 5/2000 | Fridrich |
| 6,064,740 A | 5/2000 | Curiger et al. |
| 6,064,741 A | 5/2000 | Horn et al. |
| 6,064,751 A | 5/2000 | Smithies et al. |
| 6,064,764 A | 5/2000 | Bhaskaran et al. |
| 6,064,878 A | 5/2000 | Denker et al. |
| 6,064,967 A | 5/2000 | Speicher |
| 6,064,970 A | 5/2000 | McMillan et al. |
| 6,064,976 A | 5/2000 | Tolopka |
| 6,064,977 A | 5/2000 | Haverstock et al. |
| 6,065,008 A | 5/2000 | Simon et al. |
| 6,065,042 A | 5/2000 | Reimer et al. |
| 6,065,119 A | 5/2000 | Sandford, II et al. |
| 6,065,675 A | 5/2000 | Teicher |
| 6,067,045 A | 5/2000 | Castelloe et al. |
| 6,067,107 A | 5/2000 | Travaille et al. |
| 6,067,121 A | 5/2000 | Shigihara |
| 6,067,369 A | 5/2000 | Kamei |
| 6,067,401 A | 5/2000 | Abecassis |
| 6,067,466 A | 5/2000 | Selker et al. |
| 6,067,500 A | 5/2000 | Morimoto et al. |
| 6,067,570 A | 5/2000 | Kreynin et al. |
| 6,067,620 A | 5/2000 | Holden et al. |
| 6,068,184 A | 5/2000 | Barnett |
| 6,069,647 A | 5/2000 | Sullivan et al. |
| 6,069,914 A | 5/2000 | Cox |
| 6,069,952 A | 5/2000 | Saito et al. |
| 6,069,954 A | 5/2000 | Moreau |
| 6,069,955 A | 5/2000 | Coppersmith et al. |
| 6,069,969 A | 5/2000 | Keagy et al. |
| 6,069,970 A | 5/2000 | Salatino et al. |
| 6,070,141 A | 5/2000 | Houvener et al. |
| 6,070,167 A | 5/2000 | Qian et al. |
| 6,070,228 A | 5/2000 | Belknap et al. |
| 6,070,239 A | 5/2000 | McManis |
| 6,070,798 A | 6/2000 | Nethery |
| 6,072,421 A | 6/2000 | Fukae et al. |
| 6,072,520 A | 6/2000 | Yuen et al. |
| 6,072,645 A | 6/2000 | Sprague |
| 6,072,870 A | 6/2000 | Nguyen et al. |
| 6,072,874 A | 6/2000 | Shin et al. |
| 6,072,876 A | 6/2000 | Obata et al. |
| 6,072,894 A | 6/2000 | Payne |
| 6,072,904 A | 6/2000 | Desai et al. |
| 6,072,934 A | 6/2000 | Abecassis |
| 6,072,983 A | 6/2000 | Klosterman |
| 6,073,106 A | 6/2000 | Rozen et al. |
| 6,073,125 A | 6/2000 | Cordery et al. |
| 6,073,160 A | 6/2000 | Grantham et al. |
| 6,073,172 A | 6/2000 | Frailong et al. |
| 6,073,234 A | 6/2000 | Kigo et al. |
| 6,073,236 A | 6/2000 | Kusakabe et al. |
| 6,073,237 A | 6/2000 | Ellison |
| 6,073,238 A | 6/2000 | Drupsteen |
| 6,073,240 A | 6/2000 | Kurtzberg et al. |
| 6,073,242 A | 6/2000 | Hardy et al. |
| 6,075,455 A | 6/2000 | DiMaria et al. |
| 6,075,466 A | 6/2000 | Cohen et al. |
| 6,075,467 A | 6/2000 | Ninagawa |
| 6,075,526 A | 6/2000 | Rothmuller |
| 6,075,551 A | 6/2000 | Berezowski et al. |
| 6,075,570 A | 6/2000 | Usui et al. |
| 6,075,575 A | 6/2000 | Schein et al. |
| 6,075,852 A | 6/2000 | Ashworth et al. |
| 6,075,854 A | 6/2000 | Copley et al. |
| 6,075,860 A | 6/2000 | Ketcham |
| 6,075,861 A | 6/2000 | Miller, II |
| 6,075,864 A | 6/2000 | Batten |
| 6,075,865 A | 6/2000 | Scheidt et al. |
| 6,075,987 A | 6/2000 | Camp, Jr. et al. |
| 6,076,077 A | 6/2000 | Saito |
| 6,076,078 A | 6/2000 | Camp et al. |
| 6,076,162 A | 6/2000 | Deindl et al. |
| 6,076,163 A | 6/2000 | Hoffstein et al. |
| 6,076,164 A | 6/2000 | Tanaka et al. |
| 6,076,167 A | 6/2000 | Borza |
| 6,078,265 A | 6/2000 | Bonder et al. |
| 6,078,269 A | 6/2000 | Markwell et al. |
| 6,078,284 A | 6/2000 | Levanon |
| 6,078,502 A | 6/2000 | Rostoker et al. |
| 6,078,586 A | 6/2000 | Dugan et al. |
| 6,078,663 A | 6/2000 | Yamamoto |
| 6,078,665 A | 6/2000 | Anderson et al. |
| 6,078,667 A | 6/2000 | Johnson |
| 6,078,783 A | 6/2000 | Kawamura et al. |
| 6,078,909 A | 6/2000 | Knutson |
| 6,078,946 A | 6/2000 | Johnson |
| 6,079,018 A | 6/2000 | Hardy et al. |
| 6,079,020 A | 6/2000 | Liu |
| 6,079,021 A | 6/2000 | Abadi et al. |
| 6,079,047 A | 6/2000 | Cotugno et al. |
| 6,079,621 A | 6/2000 | Vardanyan et al. |
| 6,081,199 A | 6/2000 | Hogl |
| 6,081,206 A | 6/2000 | Kielland |

(56) References Cited

U.S. PATENT DOCUMENTS

| | | |
|---|---|---|
| 6,081,229 A | 6/2000 | Soliman et al. |
| 6,081,519 A | 6/2000 | Petler |
| 6,081,533 A | 6/2000 | Laubach et al. |
| 6,081,597 A | 6/2000 | Hoffstein et al. |
| 6,081,598 A | 6/2000 | Dai |
| 6,081,610 A | 6/2000 | Dwork et al. |
| 6,081,691 A | 6/2000 | Renard et al. |
| 6,081,750 A | 6/2000 | Hoffberg et al. |
| 6,081,780 A | 6/2000 | Lumelsky |
| 6,081,790 A | 6/2000 | Rosen |
| 6,081,793 A | 6/2000 | Challener et al. |
| 6,081,893 A | 6/2000 | Grawrock et al. |
| 6,081,900 A | 6/2000 | Subramaniam et al. |
| 6,083,248 A | 7/2000 | Thompson |
| 6,083,353 A | 7/2000 | Alexander, Jr. |
| 6,084,510 A | 7/2000 | Lemelson et al. |
| 6,084,512 A | 7/2000 | Elberty et al. |
| 6,084,595 A | 7/2000 | Bach et al. |
| 6,084,870 A | 7/2000 | Wooten et al. |
| 6,085,236 A | 7/2000 | Lea |
| 6,085,320 A | 7/2000 | Kaliski, Jr. |
| 6,087,952 A | 7/2000 | Prabhakaran |
| 6,087,960 A | 7/2000 | Kyouno et al. |
| 6,088,455 A | 7/2000 | Logan et al. |
| 6,088,635 A | 7/2000 | Cox et al. |
| 6,088,651 A | 7/2000 | Nageswaran |
| 6,088,654 A | 7/2000 | Lepere et al. |
| 6,091,886 A | 7/2000 | Abecassis |
| 6,091,956 A | 7/2000 | Hollenberg |
| 6,094,164 A | 7/2000 | Murphy |
| 6,094,169 A | 7/2000 | Smith et al. |
| 6,094,618 A | 7/2000 | Harada |
| 6,094,722 A | 7/2000 | Astola et al. |
| 6,097,073 A | 8/2000 | Rostoker et al. |
| 6,097,285 A | 8/2000 | Curtin |
| 6,097,313 A | 8/2000 | Takahashi et al. |
| 6,097,441 A | 8/2000 | Allport |
| 6,097,974 A | 8/2000 | Camp, Jr. et al. |
| 6,098,048 A | 8/2000 | Dashefsky et al. |
| 6,101,499 A | 8/2000 | Ford et al. |
| 6,101,916 A | 8/2000 | Panot et al. |
| 6,104,316 A | 8/2000 | Behr et al. |
| 6,104,338 A | 8/2000 | Krasner |
| 6,104,619 A | 8/2000 | Shigehiro |
| 6,104,712 A | 8/2000 | Robert et al. |
| 6,104,815 A | 8/2000 | Alcorn et al. |
| 6,107,944 A | 8/2000 | Behr et al. |
| 6,107,959 A | 8/2000 | Levanon |
| 6,107,961 A | 8/2000 | Takagi |
| 6,108,331 A | 8/2000 | Thompson |
| 6,108,434 A | 8/2000 | Cox et al. |
| 6,108,555 A | 8/2000 | Maloney et al. |
| 6,108,696 A | 8/2000 | Mendhekar et al. |
| 6,108,698 A | 8/2000 | Tenev et al. |
| 6,111,523 A | 8/2000 | Mee |
| 6,111,541 A | 8/2000 | Karmel |
| 6,111,883 A | 8/2000 | Terada et al. |
| 6,111,988 A | 8/2000 | Horowitz et al. |
| 6,114,970 A | 9/2000 | Kirson et al. |
| 6,115,052 A | 9/2000 | Freeman et al. |
| 6,115,079 A | 9/2000 | McRae |
| 6,115,611 A | 9/2000 | Kimoto et al. |
| 6,115,691 A | 9/2000 | Ulwick |
| 6,118,104 A | 9/2000 | Berkcan et al. |
| 6,118,403 A | 9/2000 | Lang |
| 6,118,450 A | 9/2000 | Proehl et al. |
| 6,118,493 A | 9/2000 | Duhault et al. |
| 6,118,886 A | 9/2000 | Baumgart et al. |
| 6,119,013 A | 9/2000 | Maloney et al. |
| 6,119,095 A | 9/2000 | Morita |
| 6,119,101 A | 9/2000 | Peckover |
| 6,119,123 A | 9/2000 | Elenbaas et al. |
| 6,119,164 A | 9/2000 | Basche |
| 6,119,229 A | 9/2000 | Martinez et al. |
| 6,119,946 A | 9/2000 | Teicher |
| 6,121,915 A | 9/2000 | Cooper et al. |
| 6,121,923 A | 9/2000 | King |
| 6,121,924 A | 9/2000 | Meek et al. |
| 6,122,403 A | 9/2000 | Rhoads |
| 6,122,514 A | 9/2000 | Spaur et al. |
| 6,122,520 A | 9/2000 | Want et al. |
| 6,122,593 A | 9/2000 | Friederich et al. |
| 6,122,628 A | 9/2000 | Castelli et al. |
| 6,122,634 A | 9/2000 | Brodsky |
| 6,124,544 A | 9/2000 | Alexander et al. |
| 6,124,810 A | 9/2000 | Segal et al. |
| 6,124,854 A | 9/2000 | Sartain et al. |
| 6,125,209 A | 9/2000 | Dorricott |
| 6,127,945 A | 10/2000 | Mura-Smith |
| 6,127,970 A | 10/2000 | Lin |
| 6,127,975 A | 10/2000 | Maloney |
| 6,128,397 A | 10/2000 | Baluja et al. |
| 6,128,398 A | 10/2000 | Kuperstein et al. |
| 6,128,469 A | 10/2000 | Zenick, Jr. et al. |
| 6,128,482 A | 10/2000 | Nixon et al. |
| 6,128,501 A | 10/2000 | Ffoulkes-Jones |
| 6,128,587 A | 10/2000 | Sjolander |
| 6,128,599 A | 10/2000 | Walker et al. |
| 6,128,608 A | 10/2000 | Barnhill |
| 6,128,619 A | 10/2000 | Fogarasi et al. |
| 6,128,624 A | 10/2000 | Papierniak et al. |
| 6,128,634 A | 10/2000 | Golovchinsky et al. |
| 6,128,649 A | 10/2000 | Smith et al. |
| 6,128,655 A | 10/2000 | Fields et al. |
| 6,128,663 A | 10/2000 | Thomas |
| 6,128,668 A | 10/2000 | Barber et al. |
| 6,129,274 A | 10/2000 | Suzuki |
| 6,130,726 A | 10/2000 | Darbee et al. |
| 6,130,898 A | 10/2000 | Kostreski et al. |
| 6,131,060 A | 10/2000 | Obradovich et al. |
| 6,131,066 A | 10/2000 | Ahrens et al. |
| 6,131,067 A | 10/2000 | Girerd et al. |
| 6,133,853 A | 10/2000 | Obradovich et al. |
| 6,133,874 A | 10/2000 | Krasner |
| 6,133,909 A | 10/2000 | Schein et al. |
| 6,133,914 A | 10/2000 | Rogers et al. |
| 6,134,483 A | 10/2000 | Vayanos et al. |
| 6,134,541 A | 10/2000 | Castelli et al. |
| 6,134,594 A | 10/2000 | Helland et al. |
| 6,137,433 A | 10/2000 | Zavorotny et al. |
| 6,138,072 A | 10/2000 | Nagai |
| 6,138,073 A | 10/2000 | Uchigaki |
| 6,138,142 A | 10/2000 | Linsk |
| 6,138,173 A | 10/2000 | Hisano |
| 6,140,943 A | 10/2000 | Levine |
| 6,140,957 A | 10/2000 | Wilson et al. |
| 6,141,611 A | 10/2000 | Mackey et al. |
| 6,144,318 A | 11/2000 | Hayashi et al. |
| 6,144,338 A | 11/2000 | Davies |
| 6,144,767 A | 11/2000 | Bottou et al. |
| 6,144,905 A | 11/2000 | Gannon |
| 6,144,917 A | 11/2000 | Walters et al. |
| 6,145,082 A | 11/2000 | Gannon et al. |
| 6,147,598 A | 11/2000 | Murphy et al. |
| 6,148,179 A | 11/2000 | Wright et al. |
| 6,148,261 A | 11/2000 | Obradovich et al. |
| 6,150,927 A | 11/2000 | Nesbitt |
| 6,150,937 A | 11/2000 | Rackman |
| 6,150,961 A | 11/2000 | Alewine et al. |
| 6,150,980 A | 11/2000 | Krasner |
| 6,151,551 A | 11/2000 | Geier et al. |
| 6,151,600 A | 11/2000 | Dedrick |
| 6,151,624 A | 11/2000 | Teare et al. |
| 6,154,123 A | 11/2000 | Kleinberg |
| 6,154,172 A | 11/2000 | Piccionelli et al. |
| 6,154,658 A | 11/2000 | Caci |
| 6,154,745 A | 11/2000 | Kari et al. |
| 6,157,317 A | 12/2000 | Walker |
| 6,157,413 A | 12/2000 | Hanafee et al. |
| 6,157,621 A | 12/2000 | Brown et al. |
| 6,157,890 A | 12/2000 | Nakai et al. |
| 6,160,570 A | 12/2000 | Sitnik |
| 6,160,841 A | 12/2000 | Stansell, Jr. et al. |
| 6,160,998 A | 12/2000 | Wright et al. |

(56) References Cited

U.S. PATENT DOCUMENTS

| | | |
|---|---|---|
| 6,161,062 A | 12/2000 | Sicre et al. |
| 6,161,071 A | 12/2000 | Shuman et al. |
| 6,161,097 A | 12/2000 | Glass et al. |
| 6,161,125 A | 12/2000 | Traversat et al. |
| 6,163,338 A | 12/2000 | Johnson et al. |
| 6,163,345 A | 12/2000 | Noguchi et al. |
| 6,163,681 A | 12/2000 | Wright et al. |
| 6,163,711 A | 12/2000 | Juntunen et al. |
| 6,163,748 A | 12/2000 | Guenther |
| 6,163,749 A | 12/2000 | McDonough et al. |
| 6,166,627 A | 12/2000 | Reeley |
| 6,167,136 A | 12/2000 | Chou |
| 6,167,188 A | 12/2000 | Young et al. |
| 6,167,238 A | 12/2000 | Wright |
| 6,167,239 A | 12/2000 | Wright et al. |
| 6,167,253 A | 12/2000 | Farris et al. |
| 6,167,255 A | 12/2000 | Kennedy, III et al. |
| 6,169,894 B1 | 1/2001 | McCormick et al. |
| 6,169,901 B1 | 1/2001 | Boucher |
| 6,169,902 B1 | 1/2001 | Kawamoto |
| 6,171,109 B1 | 1/2001 | Ohsuga |
| 6,172,674 B1 | 1/2001 | Etheredge |
| 6,173,275 B1 | 1/2001 | Caid et al. |
| 6,175,362 B1 | 1/2001 | Harms et al. |
| 6,175,728 B1 | 1/2001 | Mitama |
| 6,175,782 B1 | 1/2001 | Obradovich et al. |
| 6,175,789 B1 | 1/2001 | Beckert et al. |
| 6,175,829 B1 | 1/2001 | Li et al. |
| 6,175,868 B1 | 1/2001 | Lavian et al. |
| 6,177,873 B1 | 1/2001 | Cragun |
| 6,177,931 B1 | 1/2001 | Alexander et al. |
| 6,178,506 B1 | 1/2001 | Quick, Jr. |
| 6,181,333 B1 | 1/2001 | Chaney et al. |
| 6,181,922 B1 | 1/2001 | Iwai et al. |
| 6,181,994 B1 | 1/2001 | Colson et al. |
| 6,182,006 B1 | 1/2001 | Meek |
| 6,182,094 B1 | 1/2001 | Humpleman et al. |
| 6,182,287 B1 | 1/2001 | Schneidewend et al. |
| 6,182,509 B1 | 2/2001 | Leung |
| 6,182,904 B1 | 2/2001 | Ulczynski et al. |
| 6,184,798 B1 | 2/2001 | Egri |
| 6,184,926 B1 | 2/2001 | Khosravi et al. |
| 6,185,337 B1 | 2/2001 | Tsujino et al. |
| 6,185,427 B1 | 2/2001 | Krasner et al. |
| 6,185,484 B1 | 2/2001 | Rhinehart |
| 6,185,491 B1 | 2/2001 | Gray et al. |
| 6,185,737 B1 | 2/2001 | Northcutt et al. |
| 6,188,354 B1 | 2/2001 | Soliman et al. |
| 6,188,397 B1 | 2/2001 | Humpleman |
| 6,188,777 B1 | 2/2001 | Darrell et al. |
| 6,188,909 B1 | 2/2001 | Alanara et al. |
| 6,189,019 B1 | 2/2001 | Blumer et al. |
| 6,189,098 B1 | 2/2001 | Kaliski, Jr. |
| 6,191,781 B1 | 2/2001 | Chaney et al. |
| 6,192,314 B1 | 2/2001 | Khavakh et al. |
| 6,192,340 B1 | 2/2001 | Abecassis |
| 6,192,341 B1 | 2/2001 | Becker et al. |
| 6,195,542 B1 | 2/2001 | Griffith |
| 6,195,557 B1 | 2/2001 | Havinis et al. |
| 6,195,568 B1 | 2/2001 | Irvin |
| 6,195,651 B1 | 2/2001 | Handel et al. |
| 6,195,654 B1 | 2/2001 | Wachtel |
| 6,195,692 B1 | 2/2001 | Hsu |
| 6,198,479 B1 | 3/2001 | Humpleman et al. |
| 6,198,875 B1 | 3/2001 | Edenson et al. |
| 6,199,015 B1 | 3/2001 | Curtwright et al. |
| 6,199,045 B1 | 3/2001 | Giniger et al. |
| 6,199,076 B1 | 3/2001 | Logan et al. |
| 6,199,082 B1 | 3/2001 | Ferrel et al. |
| 6,199,099 B1 | 3/2001 | Gershman et al. |
| 6,199,136 B1 | 3/2001 | Shteyn |
| 6,201,209 B1 | 3/2001 | Llado Abella |
| 6,201,493 B1 | 3/2001 | Silverman |
| 6,201,948 B1 | 3/2001 | Cook et al. |
| 6,202,008 B1 | 3/2001 | Beckert et al. |
| 6,202,023 B1 | 3/2001 | Hancock et al. |
| 6,202,027 B1 | 3/2001 | Alland et al. |
| 6,203,366 B1 | 3/2001 | Muller et al. |
| 6,204,798 B1 | 3/2001 | Fleming, III |
| 6,204,804 B1 | 3/2001 | Andersson |
| 6,205,107 B1 | 3/2001 | Burr |
| 6,205,330 B1 | 3/2001 | Winbladh |
| 6,205,432 B1 | 3/2001 | Gabbard et al. |
| 6,208,247 B1 | 3/2001 | Agre et al. |
| 6,208,290 B1 | 3/2001 | Krasner |
| 6,208,758 B1 | 3/2001 | Ono et al. |
| 6,208,844 B1 | 3/2001 | Abdelgany |
| 6,208,862 B1 | 3/2001 | Lee |
| 6,208,989 B1 | 3/2001 | Dockter et al. |
| 6,209,129 B1 | 3/2001 | Carr et al. |
| 6,211,777 B1 | 4/2001 | Greenwood et al. |
| 6,211,907 B1 | 4/2001 | Scaman et al. |
| 6,211,921 B1 | 4/2001 | Cherian et al. |
| 6,212,328 B1 | 4/2001 | Nakamura |
| 6,215,441 B1 | 4/2001 | Moeglein et al. |
| 6,215,526 B1 | 4/2001 | Barton et al. |
| 6,216,129 B1 | 4/2001 | Eldering |
| 6,216,133 B1 | 4/2001 | Masthoff |
| 6,216,157 B1 | 4/2001 | Vishwanath et al. |
| 6,219,421 B1 | 4/2001 | Backal |
| 6,219,696 B1 | 4/2001 | Wynblatt et al. |
| 6,219,839 B1 | 4/2001 | Sampsell |
| 6,222,932 B1 | 4/2001 | Rao et al. |
| 6,222,939 B1 | 4/2001 | Wiskott et al. |
| 6,223,124 B1 | 4/2001 | Matsuno et al. |
| 6,225,546 B1 | 5/2001 | Kraft et al. |
| 6,225,890 B1 | 5/2001 | Murphy |
| 6,225,901 B1 | 5/2001 | Kail, IV |
| 6,226,389 B1 | 5/2001 | Lemelson et al. |
| 6,230,111 B1 | 5/2001 | Mizokawa |
| 6,230,199 B1 | 5/2001 | Revashetti et al. |
| 6,230,318 B1 | 5/2001 | Halstead et al. |
| 6,233,389 B1 | 5/2001 | Barton et al. |
| 6,233,468 B1 | 5/2001 | Chen |
| 6,233,610 B1 | 5/2001 | Hayball et al. |
| 6,233,611 B1 | 5/2001 | Ludtke et al. |
| 6,233,682 B1 | 5/2001 | Fritsch |
| 6,236,365 B1 | 5/2001 | LeBlanc et al. |
| 6,236,395 B1 | 5/2001 | Sezan et al. |
| 6,236,652 B1 | 5/2001 | Preston et al. |
| 6,236,975 B1 | 5/2001 | Boe et al. |
| 6,236,978 B1 | 5/2001 | Tuzhilin |
| 6,236,985 B1 | 5/2001 | Aggarwal et al. |
| 6,237,049 B1 | 5/2001 | Ludtke |
| 6,239,081 B1 | 5/2001 | Korzilius et al. |
| 6,239,742 B1 | 5/2001 | Krasner |
| 6,239,794 B1 | 5/2001 | Yuen et al. |
| 6,240,240 B1 | 5/2001 | Nagano et al. |
| 6,240,365 B1 | 5/2001 | Bunn |
| 6,240,456 B1 | 5/2001 | Teng et al. |
| 6,240,555 B1 | 5/2001 | Shoff et al. |
| 6,243,450 B1 | 6/2001 | Jansen et al. |
| 6,243,469 B1 | 6/2001 | Kataoka et al. |
| 6,243,492 B1 | 6/2001 | Kamei |
| 6,243,707 B1 | 6/2001 | Humpleman et al. |
| 6,243,725 B1 | 6/2001 | Hempleman et al. |
| 6,246,441 B1 | 6/2001 | Terakado et al. |
| 6,246,672 B1 | 6/2001 | Lumelsky |
| 6,246,688 B1 | 6/2001 | Angwin et al. |
| 6,246,935 B1 | 6/2001 | Buckley |
| 6,247,006 B1 | 6/2001 | Tanabe et al. |
| 6,247,019 B1 | 6/2001 | Davies |
| 6,247,130 B1 | 6/2001 | Fritsch |
| 6,247,135 B1 | 6/2001 | Feague |
| 6,249,218 B1 | 6/2001 | Blair |
| 6,249,252 B1 | 6/2001 | Dupray |
| 6,249,815 B1 | 6/2001 | Foladare et al. |
| 6,249,817 B1 | 6/2001 | Nakabayashi et al. |
| 6,249,873 B1 | 6/2001 | Richard et al. |
| 6,249,914 B1 | 6/2001 | Harrison et al. |
| 6,250,148 B1 | 6/2001 | Lynam |
| 6,252,539 B1 | 6/2001 | Phillips et al. |
| 6,252,544 B1 | 6/2001 | Hoffberg |
| 6,252,630 B1 | 6/2001 | Kusumi et al. |

(56) References Cited

U.S. PATENT DOCUMENTS

| | | |
|---|---|---|
| 6,253,203 B1 | 6/2001 | O'Flaherty et al. |
| 6,253,237 B1 | 6/2001 | Story et al. |
| 6,255,942 B1 | 7/2001 | Knudsen |
| 6,255,953 B1 | 7/2001 | Barber |
| 6,260,147 B1 | 7/2001 | Quick, Jr. |
| 6,260,192 B1 | 7/2001 | Rosin et al. |
| 6,262,721 B1 | 7/2001 | Tsukidate et al. |
| 6,262,730 B1 | 7/2001 | Horvitz et al. |
| 6,263,268 B1 | 7/2001 | Nathanson |
| 6,263,309 B1 | 7/2001 | Nguyen et al. |
| 6,263,313 B1 | 7/2001 | Milsted et al. |
| 6,263,384 B1 | 7/2001 | Yanase |
| 6,263,501 B1 | 7/2001 | Schein et al. |
| 6,266,060 B1 | 7/2001 | Roth |
| 6,266,644 B1 | 7/2001 | Levine |
| 6,266,649 B1 | 7/2001 | Linden et al. |
| 6,266,814 B1 | 7/2001 | Lemmons et al. |
| 6,268,846 B1 | 7/2001 | Georgiev |
| 6,269,172 B1 | 7/2001 | Rehg et al. |
| 6,269,275 B1 | 7/2001 | Slade |
| 6,272,216 B1 | 8/2001 | Vaios |
| 6,272,231 B1 | 8/2001 | Maurer et al. |
| 6,272,405 B1 | 8/2001 | Kubota |
| 6,272,467 B1 | 8/2001 | Durand et al. |
| 6,272,476 B1 | 8/2001 | Shi et al. |
| 6,272,479 B1 | 8/2001 | Farry et al. |
| 6,275,229 B1 | 8/2001 | Weiner et al. |
| 6,275,231 B1 | 8/2001 | Obradovich |
| 6,275,268 B1 | 8/2001 | Ellis et al. |
| 6,275,648 B1 | 8/2001 | Knudson et al. |
| 6,275,692 B1 | 8/2001 | Skog |
| 6,275,774 B1 | 8/2001 | Baron, Sr. et al. |
| 6,275,812 B1 | 8/2001 | Haq et al. |
| 6,275,824 B1 | 8/2001 | O'Flaherty et al. |
| 6,275,849 B1 | 8/2001 | Ludwig |
| 6,281,792 B1 | 8/2001 | Lerg et al. |
| 6,281,808 B1 | 8/2001 | Glier et al. |
| 6,282,464 B1 | 8/2001 | Obradovich |
| 6,282,714 B1 | 8/2001 | Ghori et al. |
| 6,285,794 B1 | 9/2001 | Georgiev et al. |
| 6,285,899 B1 | 9/2001 | Ghaem et al. |
| 6,285,931 B1 | 9/2001 | Hattori et al. |
| 6,288,643 B1 | 9/2001 | Lerg et al. |
| 6,288,716 B1 | 9/2001 | Humpleman et al. |
| 6,292,109 B1 | 9/2001 | Murano et al. |
| 6,292,747 B1 | 9/2001 | Amro et al. |
| 6,294,987 B1 | 9/2001 | Matsuda et al. |
| 6,295,001 B1 | 9/2001 | Barber |
| 6,295,346 B1 | 9/2001 | Markowitz et al. |
| 6,295,449 B1 | 9/2001 | Westerlage et al. |
| 6,295,492 B1 | 9/2001 | Lang et al. |
| 6,297,732 B2 | 10/2001 | Hsu et al. |
| 6,297,768 B1 | 10/2001 | Allen, Jr. |
| 6,298,302 B2 | 10/2001 | Walgers et al. |
| 6,298,348 B1 | 10/2001 | Eldering |
| 6,298,445 B1 | 10/2001 | Shostack et al. |
| 6,301,370 B1 | 10/2001 | Steffens et al. |
| 6,304,816 B1 | 10/2001 | Berstis |
| 6,307,139 B1 | 10/2001 | Iwamura |
| 6,307,504 B1 | 10/2001 | Sheynblat |
| 6,307,751 B1 | 10/2001 | Bodony et al. |
| 6,308,175 B1 | 10/2001 | Lang et al. |
| 6,308,269 B2 | 10/2001 | Proidl |
| 6,310,886 B1 | 10/2001 | Barton |
| 6,311,060 B1 | 10/2001 | Evans et al. |
| 6,313,786 B1 | 11/2001 | Sheynblat et al. |
| 6,314,190 B1 | 11/2001 | Zimmermann |
| 6,314,326 B1 | 11/2001 | Fuchu |
| 6,314,364 B1 | 11/2001 | Nakamura |
| 6,314,366 B1 | 11/2001 | Farmakis et al. |
| 6,314,412 B1 | 11/2001 | Yamaguchi et al. |
| 6,314,420 B1 | 11/2001 | Lang et al. |
| 6,314,422 B1 | 11/2001 | Barker et al. |
| 6,314,568 B1 | 11/2001 | Ochiai et al. |
| 6,314,573 B1 | 11/2001 | Gordon et al. |
| 6,317,090 B1 | 11/2001 | Nagy et al. |
| 6,317,718 B1 | 11/2001 | Fano |
| 6,317,722 B1 | 11/2001 | Jacobi et al. |
| 6,317,882 B1 | 11/2001 | Robbins |
| 6,321,221 B1 | 11/2001 | Bieganski |
| 6,321,257 B1 | 11/2001 | Kotola et al. |
| 6,323,803 B1 | 11/2001 | Jolley et al. |
| 6,324,126 B1 | 11/2001 | Nagano |
| 6,324,393 B1 | 11/2001 | Doshay |
| 6,324,450 B1 | 11/2001 | Iwama |
| 6,324,542 B1 | 11/2001 | Wright, Jr. et al. |
| 6,324,650 B1 | 11/2001 | Ogilvie |
| 6,326,903 B1 | 12/2001 | Gross et al. |
| 6,327,045 B1 | 12/2001 | Teng et al. |
| 6,327,073 B1 | 12/2001 | Yahav et al. |
| 6,327,473 B1 | 12/2001 | Soliman et al. |
| 6,327,536 B1 | 12/2001 | Tsuji et al. |
| 6,327,590 B1 | 12/2001 | Chidlovskii et al. |
| 6,327,607 B1 | 12/2001 | Fant |
| 6,330,499 B1 | 12/2001 | Chou et al. |
| 6,332,086 B2 | 12/2001 | Avis |
| 6,332,127 B1 | 12/2001 | Bandera et al. |
| 6,332,156 B1 | 12/2001 | Cho et al. |
| 6,333,703 B1 | 12/2001 | Alewine et al. |
| 6,333,919 B2 | 12/2001 | Gaffney |
| 6,339,370 B1 | 1/2002 | Ruhl et al. |
| 6,339,842 B1 | 1/2002 | Fernandez et al. |
| 6,340,959 B1 | 1/2002 | Inamori |
| 6,341,288 B1 | 1/2002 | Yach et al. |
| 6,341,523 B2 | 1/2002 | Lynam |
| 6,343,218 B1 | 1/2002 | Kaneda et al. |
| 6,343,810 B1 | 2/2002 | Breed |
| 6,349,352 B1 | 2/2002 | Lea |
| 6,351,776 B1 | 2/2002 | O'Brien et al. |
| 6,353,398 B1 | 3/2002 | Amin et al. |
| 6,360,093 B1 | 3/2002 | Ross et al. |
| 6,360,102 B1 | 3/2002 | Havinis et al. |
| 6,360,253 B1 | 3/2002 | Freeny |
| 6,362,730 B2 | 3/2002 | Razavi et al. |
| 6,362,748 B1 | 3/2002 | Huang |
| 6,363,254 B1 | 3/2002 | Jones et al. |
| 6,363,421 B2 | 3/2002 | Barker et al. |
| 6,366,893 B2 | 4/2002 | Hannula et al. |
| 6,367,019 B1 | 4/2002 | Ansell et al. |
| 6,370,475 B1 | 4/2002 | Breed et al. |
| 6,373,851 B1 | 4/2002 | Dadario |
| 6,374,286 B1 | 4/2002 | Gee et al. |
| 6,374,290 B1 | 4/2002 | Scharber et al. |
| 6,377,209 B1 | 4/2002 | Krasner |
| 6,377,825 B1 | 4/2002 | Kennedy et al. |
| 6,377,860 B1 | 4/2002 | Gray et al. |
| 6,381,535 B1 | 4/2002 | Durocher et al. |
| 6,381,603 B1 | 4/2002 | Chan et al. |
| 6,382,897 B2 | 5/2002 | Mattio et al. |
| 6,384,776 B1 | 5/2002 | Martin |
| 6,388,579 B1 | 5/2002 | Adcox et al. |
| 6,389,340 B1 | 5/2002 | Rayner |
| 6,389,483 B1 | 5/2002 | Larsson |
| 6,389,543 B1 | 5/2002 | Dawson et al. |
| 6,392,591 B1 | 5/2002 | Hsu et al. |
| 6,392,692 B1 | 5/2002 | Monroe |
| 6,397,253 B1 | 5/2002 | Quinlan et al. |
| 6,400,304 B1 | 6/2002 | Chubbs, III |
| 6,400,314 B1 | 6/2002 | Krasner |
| 6,400,690 B1 | 6/2002 | Liu et al. |
| 6,400,953 B1 | 6/2002 | Furukawa |
| 6,400,958 B1 | 6/2002 | Isomursu et al. |
| 6,400,996 B1 | 6/2002 | Hoffberg et al. |
| 6,401,027 B1 | 6/2002 | Xu et al. |
| 6,401,029 B1 | 6/2002 | Kubota et al. |
| 6,401,085 B1 | 6/2002 | Gershman et al. |
| 6,404,352 B1 | 6/2002 | Ichikawa et al. |
| 6,405,033 B1 | 6/2002 | Kennedy, III et al. |
| 6,405,132 B1 | 6/2002 | Breed et al. |
| 6,408,174 B1 | 6/2002 | Steijer |
| 6,411,254 B1 | 6/2002 | Moeglein et al. |
| 6,414,955 B1 | 7/2002 | Clare et al. |
| 6,415,188 B1 | 7/2002 | Fernandez et al. |
| 6,415,210 B2 | 7/2002 | Hozuka et al. |

(56) References Cited

U.S. PATENT DOCUMENTS

| | | |
|---|---|---|
| 6,417,782 B1 | 7/2002 | Darnall |
| 6,418,424 B1 | 7/2002 | Hoffberg et al. |
| 6,421,002 B2 | 7/2002 | Krasner |
| 6,421,429 B1 | 7/2002 | Merritt et al. |
| 6,421,606 B1 | 7/2002 | Asai et al. |
| 6,421,608 B1 | 7/2002 | Motoyama et al. |
| 6,424,912 B1 | 7/2002 | Correia et al. |
| 6,425,004 B1 | 7/2002 | Hardjono |
| 6,429,789 B1 | 8/2002 | Kiridena et al. |
| 6,429,812 B1 | 8/2002 | Hoffberg |
| 6,430,164 B1 | 8/2002 | Jones et al. |
| 6,430,488 B1 | 8/2002 | Goldman et al. |
| 6,430,504 B1 | 8/2002 | Gilbert et al. |
| 6,433,734 B1 | 8/2002 | Krasner |
| 6,434,400 B1 | 8/2002 | Villevieille et al. |
| 6,436,049 B1 | 8/2002 | Kamiyama et al. |
| 6,437,692 B1 | 8/2002 | Petite et al. |
| 6,442,391 B1 | 8/2002 | Johansson et al. |
| 6,442,485 B2 | 8/2002 | Evans |
| 6,445,308 B1 | 9/2002 | Koike |
| 6,445,690 B2 | 9/2002 | Sato et al. |
| 6,446,076 B1 | 9/2002 | Burkey et al. |
| 6,449,473 B1 | 9/2002 | Raivisto |
| 6,449,476 B1 | 9/2002 | Hutchison, IV et al. |
| 6,449,540 B1 | 9/2002 | Rayner |
| 6,449,688 B1 | 9/2002 | Peters et al. |
| 6,450,407 B1 | 9/2002 | Freeman et al. |
| 6,452,484 B1 | 9/2002 | Drori |
| 6,452,535 B1 | 9/2002 | Rao et al. |
| 6,452,910 B1 | 9/2002 | Vij et al. |
| 6,453,910 B1 | 9/2002 | Lloyd |
| 6,456,852 B2 | 9/2002 | Bar et al. |
| 6,463,272 B1 | 10/2002 | Wallace et al. |
| 6,463,343 B1 | 10/2002 | Emens et al. |
| 6,463,462 B1 | 10/2002 | Smith et al. |
| 6,466,260 B1 | 10/2002 | Hatae et al. |
| 6,466,796 B1 | 10/2002 | Jacobson et al. |
| 6,466,971 B1 | 10/2002 | Humpleman et al. |
| 6,469,639 B2 | 10/2002 | Tanenhaus et al. |
| 6,470,053 B1 | 10/2002 | Liu |
| 6,470,263 B2 | 10/2002 | Ito et al. |
| 6,470,349 B1 | 10/2002 | Heninger et al. |
| 6,472,982 B2 | 10/2002 | Eida et al. |
| 6,473,688 B2 | 10/2002 | Kohno et al. |
| 6,477,143 B1 | 11/2002 | Ginossar |
| 6,477,150 B1 | 11/2002 | Maggenti et al. |
| 6,480,144 B1 | 11/2002 | Miller et al. |
| 6,480,699 B1 | 11/2002 | Lovoi |
| 6,480,900 B1 | 11/2002 | Habert |
| 6,483,094 B1 | 11/2002 | Yahav et al. |
| 6,484,080 B2 | 11/2002 | Breed |
| 6,490,525 B2 | 12/2002 | Baron, Sr. et al. |
| 6,493,338 B1 | 12/2002 | Preston et al. |
| 6,493,633 B2 | 12/2002 | Baron, Sr. et al. |
| 6,493,637 B1 | 12/2002 | Steeg |
| 6,493,753 B2 | 12/2002 | Ludtke et al. |
| 6,493,874 B2 | 12/2002 | Humpleman |
| 6,496,107 B1 | 12/2002 | Himmelstein |
| 6,496,117 B2 | 12/2002 | Gutta et al. |
| 6,496,575 B1 | 12/2002 | Vasell et al. |
| 6,496,689 B1 | 12/2002 | Keller et al. |
| 6,496,778 B1 | 12/2002 | Lin |
| 6,496,860 B2 | 12/2002 | Ludtke et al. |
| 6,498,972 B1 | 12/2002 | Rao et al. |
| 6,498,987 B1 | 12/2002 | Kelly et al. |
| 6,498,989 B1 | 12/2002 | Pisetski et al. |
| 6,499,027 B1 | 12/2002 | Weinberger |
| 6,504,491 B1 | 1/2003 | Christians |
| 6,504,631 B1 | 1/2003 | Barry et al. |
| 6,505,086 B1 | 1/2003 | Dodd, Jr. et al. |
| 6,505,100 B1 | 1/2003 | Stuempfle et al. |
| 6,505,101 B1 | 1/2003 | Brill |
| 6,505,123 B1 | 1/2003 | Root et al. |
| 6,507,810 B2 | 1/2003 | Razavi et al. |
| 6,510,152 B1 | 1/2003 | Gersberg et al. |
| 6,510,387 B2 | 1/2003 | Fuchs et al. |
| 6,512,922 B1 | 1/2003 | Burg et al. |
| 6,512,930 B2 | 1/2003 | Sandegren |
| 6,515,595 B1 | 2/2003 | Obradovich et al. |
| 6,515,623 B2 | 2/2003 | Johnson |
| 6,516,664 B2 | 2/2003 | Lynam |
| 6,519,466 B2 | 2/2003 | Pande et al. |
| 6,522,682 B1 | 2/2003 | Kohli et al. |
| 6,522,875 B1 | 2/2003 | Dowling et al. |
| 6,522,977 B2 | 2/2003 | Corrigan et al. |
| 6,523,696 B1 | 2/2003 | Saito et al. |
| 6,525,687 B2 | 2/2003 | Roy et al. |
| 6,525,688 B2 | 2/2003 | Chou et al. |
| 6,526,268 B1 | 2/2003 | Marrah et al. |
| 6,526,335 B1 | 2/2003 | Treyz et al. |
| 6,526,349 B2 | 2/2003 | Bullock et al. |
| 6,526,352 B1 | 2/2003 | Breed et al. |
| 6,529,153 B1 | 3/2003 | Dijkstra |
| 6,529,159 B1 | 3/2003 | Fan et al. |
| 6,529,829 B2 | 3/2003 | Turetzky et al. |
| 6,531,982 B1 | 3/2003 | White et al. |
| 6,532,494 B1 | 3/2003 | Frank et al. |
| 6,535,743 B1 | 3/2003 | Kennedy, III et al. |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,539,336 B1 | 3/2003 | Vock et al. |
| 6,539,422 B1 | 3/2003 | Hunt et al. |
| 6,542,076 B1 | 4/2003 | Joao |
| 6,542,077 B2 | 4/2003 | Joao |
| 6,542,464 B1 | 4/2003 | Takeda et al. |
| 6,542,734 B1 | 4/2003 | Abrol et al. |
| 6,542,743 B1 | 4/2003 | Soliman |
| 6,542,748 B2 | 4/2003 | Hendrey et al. |
| 6,542,749 B2 | 4/2003 | Tanaka et al. |
| 6,542,750 B2 | 4/2003 | Hendrey et al. |
| 6,542,758 B1 | 4/2003 | Chennakeshu et al. |
| 6,542,793 B2 | 4/2003 | Kojima et al. |
| 6,542,794 B2 | 4/2003 | Obradovich |
| 6,545,601 B1 | 4/2003 | Monroe |
| 6,546,419 B1 | 4/2003 | Humpleman et al. |
| 6,549,130 B1 | 4/2003 | Joao |
| 6,549,145 B2 | 4/2003 | Hsu et al. |
| 6,549,776 B1 | 4/2003 | Joong |
| 6,549,844 B1 | 4/2003 | Egberts |
| 6,549,936 B1 | 4/2003 | Hirabayashi |
| 6,550,012 B1 | 4/2003 | Villa et al. |
| 6,552,682 B1 | 4/2003 | Fan |
| 6,556,824 B1 | 4/2003 | Purnadi et al. |
| 6,556,832 B1 | 4/2003 | Soliman |
| 6,559,773 B1 | 5/2003 | Berry |
| 6,560,461 B1 | 5/2003 | Fomukong et al. |
| 6,560,534 B2 | 5/2003 | Abraham et al. |
| 6,560,607 B1 | 5/2003 | Lassesen |
| 6,560,639 B1 | 5/2003 | Dan et al. |
| 6,563,418 B1 | 5/2003 | Moon |
| 6,563,796 B1 | 5/2003 | Saito |
| 6,567,035 B1 | 5/2003 | Elliott |
| 6,568,754 B1 | 5/2003 | Norton et al. |
| 6,570,530 B2 | 5/2003 | Gaal et al. |
| 6,571,201 B1 | 5/2003 | Royal, Jr. et al. |
| 6,571,279 B1 | 5/2003 | Herz et al. |
| 6,573,831 B2 | 6/2003 | Ikeda et al. |
| 6,574,488 B2 | 6/2003 | Oba et al. |
| 6,574,538 B2 | 6/2003 | Sasaki |
| 6,574,548 B2 | 6/2003 | DeKock et al. |
| 6,574,558 B2 | 6/2003 | Kohli |
| 6,580,373 B1 | 6/2003 | Ohashi |
| 6,580,390 B1 | 6/2003 | Hay |
| 6,580,904 B2 | 6/2003 | Cox et al. |
| 6,580,979 B2 | 6/2003 | Payton et al. |
| 6,584,382 B2 | 6/2003 | Karem |
| 6,584,403 B2 | 6/2003 | Bunn |
| 6,584,552 B1 | 6/2003 | Kuno et al. |
| 6,587,046 B2 | 7/2003 | Joao |
| 6,587,835 B1 | 7/2003 | Treyz et al. |
| 6,590,507 B2 | 7/2003 | Burns |
| 6,590,529 B2 | 7/2003 | Schwoegler |

(56) References Cited

U.S. PATENT DOCUMENTS

| | | |
|---|---|---|
| 6,590,602 B1 | 7/2003 | Fernandez et al. |
| 6,591,279 B1 | 7/2003 | Emens et al. |
| 6,594,304 B2 | 7/2003 | Chan |
| 6,594,500 B2 | 7/2003 | Bender et al. |
| 6,597,311 B2 | 7/2003 | Sheynblat et al. |
| 6,597,903 B1 | 7/2003 | Dahm et al. |
| 6,600,417 B2 | 7/2003 | Lerg et al. |
| 6,600,914 B2 | 7/2003 | Uhlik et al. |
| 6,603,405 B2 | 8/2003 | Smith |
| 6,603,973 B1 | 8/2003 | Foladare et al. |
| 6,606,495 B1 | 8/2003 | Korpi et al. |
| 6,606,554 B2 | 8/2003 | Edge |
| 6,609,004 B1 | 8/2003 | Morse et al. |
| 6,611,201 B1 | 8/2003 | Bishop et al. |
| 6,611,755 B1 | 8/2003 | Coffee et al. |
| 6,611,757 B2 | 8/2003 | Brodie |
| 6,614,349 B1 | 9/2003 | Proctor et al. |
| 6,614,385 B2 | 9/2003 | Kuhn et al. |
| 6,615,088 B1 | 9/2003 | Myer et al. |
| 6,615,099 B1 | 9/2003 | Muller et al. |
| 6,615,137 B2 | 9/2003 | Lutter et al. |
| 6,616,071 B2 | 9/2003 | Kitamura et al. |
| 6,618,593 B1 | 9/2003 | Drutman et al. |
| 6,618,670 B1 | 9/2003 | Chansarkar |
| 6,618,764 B1 | 9/2003 | Shteyn |
| 6,621,452 B2 | 9/2003 | Knockeart et al. |
| 6,622,083 B1 | 9/2003 | Knockeart et al. |
| 6,622,156 B2 | 9/2003 | Hirabayashi |
| 6,622,304 B1 | 9/2003 | Carhart |
| 6,624,881 B2 | 9/2003 | Waibel et al. |
| 6,625,590 B1 | 9/2003 | Chen et al. |
| 6,628,227 B1 | 9/2003 | Rao et al. |
| 6,628,233 B2 | 9/2003 | Knockeart et al. |
| 6,628,928 B1 | 9/2003 | Crosby et al. |
| 6,629,033 B2 | 9/2003 | Preston et al. |
| 6,630,884 B1 | 10/2003 | Shanmugham |
| 6,633,238 B2 | 10/2003 | Lemelson et al. |
| 6,633,255 B2 | 10/2003 | Krasner |
| 6,640,145 B2 | 10/2003 | Hoffberg et al. |
| 6,640,184 B1 | 10/2003 | Rabe |
| 6,641,087 B1 | 11/2003 | Nelson |
| 6,646,559 B2 | 11/2003 | Smith |
| 6,647,257 B2 | 11/2003 | Owensby |
| 6,647,269 B2 | 11/2003 | Hendrey et al. |
| 6,647,270 B1 | 11/2003 | Himmelstein |
| 6,647,328 B2 | 11/2003 | Walker |
| 6,650,288 B1 | 11/2003 | Pitt et al. |
| 6,650,983 B1 | 11/2003 | Rao et al. |
| 6,650,984 B1 | 11/2003 | Rao et al. |
| 6,654,689 B1 | 11/2003 | Kelly et al. |
| 6,661,372 B1 | 12/2003 | Girerd et al. |
| 6,661,773 B1 | 12/2003 | Pelissier et al. |
| 6,662,091 B2 | 12/2003 | Wilson et al. |
| 6,662,106 B2 | 12/2003 | Evans |
| 6,662,642 B2 | 12/2003 | Breed et al. |
| 6,665,539 B2 | 12/2003 | Sih et al. |
| 6,665,541 B1 | 12/2003 | Krasner et al. |
| 6,670,905 B1 | 12/2003 | Orr |
| 6,670,912 B2 | 12/2003 | Honda |
| 6,671,620 B1 | 12/2003 | Garin et al. |
| 6,673,019 B2 | 1/2004 | Kamiyama |
| 6,675,081 B2 | 1/2004 | Shuman et al. |
| 6,675,196 B1 | 1/2004 | Kronz |
| 6,677,894 B2 | 1/2004 | Sheynblat et al. |
| 6,678,250 B1 | 1/2004 | Grabelsky et al. |
| 6,678,516 B2 | 1/2004 | Nordman et al. |
| 6,678,612 B1 | 1/2004 | Khawam |
| 6,680,674 B1 | 1/2004 | Park |
| 6,680,694 B1 | 1/2004 | Knockeart et al. |
| 6,680,695 B2 | 1/2004 | Turetzky et al. |
| 6,681,114 B2 | 1/2004 | Chang et al. |
| 6,681,121 B1 | 1/2004 | Preston et al. |
| 6,684,137 B2 | 1/2004 | Takagi et al. |
| 6,687,504 B1 | 2/2004 | Raith |
| 6,690,017 B2 | 2/2004 | Remillard et al. |
| 6,690,294 B1 | 2/2004 | Zierden |
| 6,690,657 B1 | 2/2004 | Lau et al. |
| 6,690,681 B1 | 2/2004 | Preston et al. |
| 6,690,742 B2 | 2/2004 | Chan |
| 6,691,019 B2 | 2/2004 | Seeley et al. |
| 6,694,258 B2 | 2/2004 | Johnson et al. |
| 6,697,103 B1 | 2/2004 | Fernandez et al. |
| 6,697,629 B1 | 2/2004 | Grilli et al. |
| 6,697,730 B2 | 2/2004 | Dickerson |
| 6,697,824 B1 | 2/2004 | Bowman-Amuah |
| 6,698,195 B1 | 3/2004 | Hellinger |
| 6,700,482 B2 | 3/2004 | Ververs et al. |
| 6,701,144 B2 | 3/2004 | Kirbas et al. |
| 6,703,971 B2 | 3/2004 | Pande et al. |
| 6,703,972 B2 | 3/2004 | van Diggelen |
| 6,704,651 B2 | 3/2004 | van Diggelen |
| 6,707,421 B1 | 3/2004 | Drury et al. |
| 6,708,100 B2 | 3/2004 | Russell et al. |
| 6,711,474 B1 | 3/2004 | Treyz et al. |
| 6,711,475 B2 | 3/2004 | Murphy |
| 6,714,139 B2 | 3/2004 | Saito et al. |
| 6,714,793 B1 | 3/2004 | Carey et al. |
| 6,715,077 B1 | 3/2004 | Vasudevan et al. |
| 6,718,174 B2 | 4/2004 | Vayanos |
| 6,718,239 B2 | 4/2004 | Rayner |
| 6,718,263 B1 | 4/2004 | Glass et al. |
| 6,720,915 B2 | 4/2004 | Sheynblat |
| 6,720,920 B2 | 4/2004 | Breed et al. |
| 6,721,578 B2 | 4/2004 | Minear et al. |
| 6,721,871 B2 | 4/2004 | Piispanen et al. |
| 6,724,342 B2 | 4/2004 | Bloebaum et al. |
| 6,725,031 B2 | 4/2004 | Watler et al. |
| 6,725,139 B2 | 4/2004 | Miller et al. |
| 6,725,159 B2 | 4/2004 | Krasner |
| 6,728,323 B1 | 4/2004 | Chen et al. |
| 6,728,514 B2 | 4/2004 | Bandeira et al. |
| 6,728,528 B1 | 4/2004 | Loke |
| 6,728,617 B2 | 4/2004 | Rao et al. |
| 6,730,913 B2 | 5/2004 | Remillard et al. |
| 6,731,940 B1 | 5/2004 | Nagendran |
| 6,734,799 B2 | 5/2004 | Munch |
| 6,734,821 B2 | 5/2004 | van Diggelen |
| 6,735,506 B2 | 5/2004 | Breed et al. |
| 6,735,630 B1 | 5/2004 | Gelvin et al. |
| 6,738,013 B2 | 5/2004 | Orler et al. |
| 6,738,697 B2 | 5/2004 | Breed |
| 6,738,800 B1 | 5/2004 | Aquilon et al. |
| 6,738,814 B1 | 5/2004 | Cox et al. |
| 6,741,188 B1 | 5/2004 | Miller et al. |
| 6,741,842 B2 | 5/2004 | Goldberg et al. |
| 6,741,933 B1 | 5/2004 | Glass |
| 6,745,021 B1 | 6/2004 | Stevens |
| 6,745,038 B2 | 6/2004 | Callaway, Jr. et al. |
| 6,747,596 B2 | 6/2004 | Orler et al. |
| 6,748,195 B1 | 6/2004 | Phillips |
| 6,748,318 B1 | 6/2004 | Jones |
| 6,751,452 B1 | 6/2004 | Kupczyk et al. |
| 6,751,464 B1 | 6/2004 | Burg et al. |
| 6,754,485 B1 | 6/2004 | Obradovich et al. |
| 6,754,585 B2 | 6/2004 | Root et al. |
| 6,756,938 B2 | 6/2004 | Zhao et al. |
| 6,757,544 B2 | 6/2004 | Rangarajan et al. |
| 6,757,574 B2 | 6/2004 | Gardner et al. |
| 6,757,611 B1 | 6/2004 | Rao et al. |
| 6,759,970 B1 | 7/2004 | Horita et al. |
| 6,768,944 B2 | 7/2004 | Breed et al. |
| 6,771,208 B2 | 8/2004 | Lutter et al. |
| 6,771,629 B1 | 8/2004 | Preston et al. |
| 6,772,331 B1 | 8/2004 | Hind et al. |
| 6,772,340 B1 | 8/2004 | Peinado et al. |
| 6,774,367 B2 | 8/2004 | Stephan et al. |
| 6,774,846 B2 | 8/2004 | Fullerton et al. |
| 6,775,605 B2 | 8/2004 | Rao et al. |
| 6,775,655 B1 | 8/2004 | Peinado et al. |
| 6,775,802 B2 | 8/2004 | Gaal |
| 6,778,073 B2 | 8/2004 | Lutter et al. |
| 6,778,136 B2 | 8/2004 | Gronemeyer |
| 6,778,885 B2 | 8/2004 | Agashe et al. |
| 6,778,924 B2 | 8/2004 | Hanse |

(56) References Cited

U.S. PATENT DOCUMENTS

| | | |
|---|---|---|
| 6,779,004 B1 | 8/2004 | Zintel |
| 6,781,530 B2 | 8/2004 | Moore |
| 6,781,963 B2 | 8/2004 | Crockett et al. |
| 6,782,048 B2 | 8/2004 | Santhoff |
| 6,782,315 B2 | 8/2004 | Lu et al. |
| 6,785,551 B1 | 8/2004 | Richard |
| 6,788,249 B1 | 9/2004 | Farmer et al. |
| 6,791,472 B1 | 9/2004 | Hoffberg |
| 6,792,263 B1 | 9/2004 | Kite |
| 6,792,351 B2 | 9/2004 | Lutter |
| 6,795,699 B1 | 9/2004 | McCraw et al. |
| 6,799,050 B1 | 9/2004 | Krasner |
| 6,801,124 B2 | 10/2004 | Naitou |
| 6,801,159 B2 | 10/2004 | Swope et al. |
| 6,801,507 B1 | 10/2004 | Humpleman et al. |
| 6,801,662 B1 | 10/2004 | Owechko et al. |
| 6,801,843 B2 | 10/2004 | Rao et al. |
| 6,804,524 B1 | 10/2004 | Vandermeijden |
| 6,807,534 B1 | 10/2004 | Erickson |
| 6,807,558 B1 | 10/2004 | Hassett et al. |
| 6,809,653 B1 | 10/2004 | Mann et al. |
| 6,810,323 B1 | 10/2004 | Bullock et al. |
| 6,812,860 B1 | 11/2004 | Schwarzwalder, Jr. |
| 6,813,542 B2 | 11/2004 | Peshkin et al. |
| 6,813,560 B2 | 11/2004 | van Diggelen et al. |
| 6,813,777 B1 | 11/2004 | Weinberger et al. |
| 6,816,111 B2 | 11/2004 | Krasner |
| 6,816,458 B1 | 11/2004 | Kroon |
| 6,816,710 B2 | 11/2004 | Krasner |
| 6,816,719 B1 | 11/2004 | Heinonen et al. |
| 6,816,727 B2 | 11/2004 | Cox et al. |
| 6,816,734 B2 | 11/2004 | Wong et al. |
| 6,816,878 B1 | 11/2004 | Zimmers et al. |
| 6,819,268 B2 | 11/2004 | Wakamatsu et al. |
| 6,819,919 B1 | 11/2004 | Tanaka |
| 6,819,991 B2 | 11/2004 | Rao et al. |
| 6,820,041 B2 | 11/2004 | Royal, Jr. et al. |
| 6,820,269 B2 | 11/2004 | Baucke et al. |
| 6,823,244 B2 | 11/2004 | Breed |
| 6,826,607 B1 | 11/2004 | Gelvin et al. |
| 6,826,725 B1 | 11/2004 | Beezer et al. |
| 6,826,775 B1 | 11/2004 | Howe et al. |
| 6,829,437 B2 | 12/2004 | Kirby |
| 6,829,475 B1 | 12/2004 | Lee et al. |
| 6,832,178 B1 | 12/2004 | Fernandez et al. |
| 6,832,251 B1 | 12/2004 | Gelvin et al. |
| 6,832,373 B2 | 12/2004 | O'Neill |
| 6,833,785 B2 | 12/2004 | Brown et al. |
| 6,836,223 B2 | 12/2004 | Moore |
| 6,836,226 B2 | 12/2004 | Moore |
| 6,839,020 B2 | 1/2005 | Geier et al. |
| 6,839,021 B2 | 1/2005 | Sheynblat et al. |
| 6,842,715 B1 | 1/2005 | Gaal |
| 6,842,774 B1 | 1/2005 | Piccioni |
| 6,847,872 B2 | 1/2005 | Bodin et al. |
| 6,850,252 B1 | 2/2005 | Hoffberg |
| 6,853,849 B1 | 2/2005 | Tognazzini |
| 6,853,907 B2 | 2/2005 | Peterson et al. |
| 6,853,916 B2 | 2/2005 | Fuchs et al. |
| 6,856,282 B2 | 2/2005 | Mauro et al. |
| 6,857,016 B1 | 2/2005 | Motoyama et al. |
| 6,859,831 B1 | 2/2005 | Gelvin et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor et al. |
| 6,868,331 B2 | 3/2005 | Hanebrink |
| 6,868,389 B1 | 3/2005 | Wilkins et al. |
| 6,871,139 B2 | 3/2005 | Liu et al. |
| 6,873,854 B2 | 3/2005 | Crockett et al. |
| 6,876,926 B2 | 4/2005 | Kirkland et al. |
| 6,882,837 B2 | 4/2005 | Fernandez et al. |
| 6,882,905 B2 | 4/2005 | Hall et al. |
| 6,883,747 B2 | 4/2005 | Ratkovic et al. |
| 6,885,940 B2 | 4/2005 | Brodie et al. |
| 6,888,497 B2 | 5/2005 | King et al. |
| 6,888,932 B2 | 5/2005 | Snip et al. |
| 6,891,838 B1 | 5/2005 | Petite et al. |
| 6,895,034 B2 | 5/2005 | Nunally et al. |
| 6,895,238 B2 | 5/2005 | Newell et al. |
| 6,895,240 B2 | 5/2005 | Laursen et al. |
| 6,895,249 B2 | 5/2005 | Gaal |
| 6,895,324 B2 | 5/2005 | Straub |
| 6,900,758 B1 | 5/2005 | Mann et al. |
| 6,901,057 B2 | 5/2005 | Rune et al. |
| 6,903,684 B1 | 6/2005 | Simic et al. |
| 6,904,029 B2 | 6/2005 | Fors et al. |
| 6,906,619 B2 | 6/2005 | Williams et al. |
| 6,907,224 B2 | 6/2005 | Younis |
| 6,907,238 B2 | 6/2005 | Leung |
| 6,907,458 B2 | 6/2005 | Tomassetti et al. |
| 6,911,997 B1 | 6/2005 | Okamoto et al. |
| 6,912,395 B2 | 6/2005 | Benes et al. |
| 6,912,398 B1 | 6/2005 | Domnitz |
| 6,915,126 B2 | 7/2005 | Mazzara, Jr. |
| 6,915,208 B2 | 7/2005 | Garin et al. |
| 6,916,096 B2 | 7/2005 | Eberl et al. |
| 6,917,331 B2 | 7/2005 | Gronemeyer |
| 6,920,129 B2 | 7/2005 | Preston et al. |
| 6,922,664 B1 | 7/2005 | Fernandez et al. |
| 6,925,368 B2 | 8/2005 | Funkhouser et al. |
| 6,926,374 B2 | 8/2005 | Dudeck et al. |
| 6,927,546 B2 | 8/2005 | Adamson et al. |
| 6,930,634 B2 | 8/2005 | Peng et al. |
| 6,933,837 B2 | 8/2005 | Gunderson et al. |
| 6,934,300 B2 | 8/2005 | Tomassetti et al. |
| 6,937,187 B2 | 8/2005 | van Diggelen et al. |
| 6,937,732 B2 | 8/2005 | Ohmura et al. |
| 6,937,872 B2 | 8/2005 | Krasner |
| 6,938,073 B1 | 8/2005 | Mendhekar et al. |
| 6,939,155 B2 | 9/2005 | Postrel |
| 6,940,646 B2 | 9/2005 | Taniguchi et al. |
| 6,941,144 B2 | 9/2005 | Stein |
| 6,941,374 B1 | 9/2005 | Kronz |
| 6,943,955 B2 | 9/2005 | Kaschke et al. |
| 6,944,540 B2 | 9/2005 | King et al. |
| 6,947,772 B2 | 9/2005 | Minear et al. |
| 6,950,058 B1 | 9/2005 | Davis et al. |
| 6,950,638 B2 | 9/2005 | Videtich et al. |
| 6,952,155 B2 | 10/2005 | Himmelstein |
| 6,952,714 B2 | 10/2005 | Peart |
| 6,952,715 B1 | 10/2005 | Kronz |
| 6,956,467 B1 | 10/2005 | Mercado, Jr. |
| 6,957,073 B2 | 10/2005 | Bye |
| 6,961,562 B2 | 11/2005 | Ross |
| 6,963,616 B2 | 11/2005 | Chan |
| 6,963,899 B1 | 11/2005 | Fernandez et al. |
| 6,965,754 B2 | 11/2005 | King |
| 6,965,767 B2 | 11/2005 | Maggenti et al. |
| 6,965,816 B2 | 11/2005 | Walker |
| 6,968,449 B1 | 11/2005 | Sierra et al. |
| 6,968,736 B2 | 11/2005 | Lynam |
| 6,969,183 B2 | 11/2005 | Okubo et al. |
| 6,970,102 B2 | 11/2005 | Ciolli |
| 6,970,917 B1 | 11/2005 | Kushwaha et al. |
| 6,972,669 B2 | 12/2005 | Saito et al. |
| 6,973,030 B2 | 12/2005 | Pecen et al. |
| 6,973,166 B1 | 12/2005 | Tsumpes |
| 6,973,320 B2 | 12/2005 | Brown et al. |
| 6,973,378 B2 | 12/2005 | Yamada |
| 6,975,266 B2 | 12/2005 | Abraham et al. |
| 6,975,364 B2 | 12/2005 | Lin |
| 6,978,453 B2 | 12/2005 | Rao et al. |
| 6,980,816 B2 | 12/2005 | Rohles et al. |
| 6,983,200 B2 | 1/2006 | Bodin et al. |
| 6,985,105 B1 | 1/2006 | Pitt et al. |
| 6,985,189 B1 | 1/2006 | Takada et al. |
| 6,986,147 B2 | 1/2006 | Gooding |
| 6,987,758 B1 | 1/2006 | Koyama |
| 6,987,964 B2 | 1/2006 | Obradovich et al. |
| 6,988,026 B2 | 1/2006 | Breed et al. |
| 6,988,034 B1 | 1/2006 | Marlatt et al. |
| 6,989,766 B2 | 1/2006 | Mese et al. |
| 6,990,080 B2 | 1/2006 | Bahl et al. |

(56) References Cited

U.S. PATENT DOCUMENTS

| | | |
|---|---|---|
| 6,990,407 B1 | 1/2006 | Mbekeani et al. |
| 6,993,429 B2 | 1/2006 | Obradovich et al. |
| 6,993,511 B2 | 1/2006 | Himmelstein |
| 6,993,570 B1 | 1/2006 | Irani |
| 6,996,720 B1 | 2/2006 | DeMello et al. |
| 6,999,779 B1 | 2/2006 | Hashimoto |
| 6,999,782 B2 | 2/2006 | Shaughnessy et al. |
| 7,000,469 B2 | 2/2006 | Foxlin et al. |
| 7,006,881 B1 | 2/2006 | Hoffberg et al. |
| 7,006,950 B1 | 2/2006 | Greiffenhagen et al. |
| 7,020,701 B1 | 3/2006 | Gelvin et al. |
| 7,020,751 B2 | 3/2006 | Kershaw |
| 7,024,321 B1 | 4/2006 | Deninger et al. |
| 7,024,363 B1 | 4/2006 | Comerford et al. |
| 7,024,393 B1 | 4/2006 | Peinado et al. |
| 7,027,773 B1 | 4/2006 | McMillin |
| 7,028,313 B2 | 4/2006 | Gooding |
| 7,039,393 B1 | 5/2006 | Kite |
| 7,042,363 B2 | 5/2006 | Katrak et al. |
| 7,043,532 B1 | 5/2006 | Humpleman et al. |
| 7,047,411 B1 | 5/2006 | DeMello et al. |
| 7,049,953 B2 | 5/2006 | Monroe |
| 7,062,379 B2 | 6/2006 | Videtich |
| 7,064,656 B2 | 6/2006 | Belcher et al. |
| 7,065,351 B2 | 6/2006 | Carter et al. |
| 7,065,507 B2 | 6/2006 | Mohammed et al. |
| 7,069,188 B2 | 6/2006 | Roberts |
| 7,079,857 B2 | 7/2006 | Maggenti et al. |
| 7,079,993 B2 | 7/2006 | Stephenson et al. |
| 7,082,359 B2 | 7/2006 | Breed |
| 7,084,859 B1 | 8/2006 | Pryor |
| 7,085,637 B2 | 8/2006 | Breed et al. |
| 7,089,206 B2 | 8/2006 | Martin |
| 7,092,723 B2 | 8/2006 | Himmelstein |
| 7,103,018 B1 | 9/2006 | Hansen et al. |
| 7,103,460 B1 | 9/2006 | Breed |
| 7,103,511 B2 | 9/2006 | Petite |
| 7,103,574 B1 | 9/2006 | Peinado et al. |
| 7,104,955 B2 | 9/2006 | Bardy |
| 7,106,717 B2 | 9/2006 | Rousseau et al. |
| 7,109,859 B2 | 9/2006 | Peeters |
| 7,110,880 B2 | 9/2006 | Breed et al. |
| 7,113,860 B2 | 9/2006 | Wang |
| 7,117,243 B2 | 10/2006 | Peart |
| 7,120,129 B2 | 10/2006 | Ayyagari et al. |
| 7,120,508 B2 | 10/2006 | Peshkin et al. |
| 7,123,926 B2 | 10/2006 | Himmelstein |
| 7,124,004 B2 | 10/2006 | Obradovich |
| 7,126,583 B1 | 10/2006 | Breed |
| 7,136,710 B1 | 11/2006 | Hoffberg et al. |
| 7,136,838 B1 | 11/2006 | Peinado et al. |
| 7,142,099 B2 | 11/2006 | Ross et al. |
| 7,142,844 B2 | 11/2006 | Obradovich et al. |
| 7,146,260 B2 | 12/2006 | Preston et al. |
| 7,147,246 B2 | 12/2006 | Breed et al. |
| 7,149,741 B2 | 12/2006 | Burkey et al. |
| 7,151,768 B2 | 12/2006 | Preston et al. |
| 7,151,946 B2 | 12/2006 | Maggenti et al. |
| 7,155,335 B2 | 12/2006 | Rennels |
| 7,158,758 B2 | 1/2007 | Lim et al. |
| 7,158,956 B1 | 1/2007 | Himmelstein |
| 7,161,926 B2 | 1/2007 | Elson et al. |
| 7,164,177 B2 | 1/2007 | Chang et al. |
| 7,164,662 B2 | 1/2007 | Preston et al. |
| 7,165,040 B2 | 1/2007 | Ehrman et al. |
| 7,171,189 B2 | 1/2007 | Bianconi et al. |
| 7,171,381 B2 | 1/2007 | Ehrman et al. |
| 7,171,457 B1 | 1/2007 | Wilson et al. |
| 7,174,253 B2 | 2/2007 | Videtich |
| 7,177,623 B2 | 2/2007 | Baldwin |
| 7,178,049 B2 | 2/2007 | Lutter |
| 7,187,947 B1 | 3/2007 | White et al. |
| 7,202,776 B2 | 4/2007 | Breed |
| 7,203,300 B2 | 4/2007 | Shaffer et al. |
| 7,206,305 B2 | 4/2007 | Preston et al. |
| 7,207,041 B2 | 4/2007 | Elson et al. |
| 7,207,042 B2 | 4/2007 | Smith et al. |
| 7,209,969 B2 | 4/2007 | Lahti et al. |
| 7,215,965 B2 | 5/2007 | Fournier et al. |
| 7,216,145 B2 | 5/2007 | Collings, III |
| 7,218,940 B2 | 5/2007 | Niemenmaa et al. |
| 7,221,669 B2 | 5/2007 | Preston et al. |
| 7,221,959 B2 | 5/2007 | Lindqvist et al. |
| 7,225,400 B2 | 5/2007 | Beezer et al. |
| 7,239,949 B2 | 7/2007 | Lu et al. |
| 7,242,988 B1 | 7/2007 | Hoffberg et al. |
| 7,249,266 B2 | 7/2007 | Margalit et al. |
| 7,257,426 B1 | 8/2007 | Witkowski et al. |
| 7,257,545 B1 | 8/2007 | Hung |
| 7,268,700 B1 | 9/2007 | Hoffberg |
| 7,269,188 B2 | 9/2007 | Smith |
| 7,271,737 B1 | 9/2007 | Hoffberg |
| 7,272,497 B2 | 9/2007 | Koshiji et al. |
| 7,272,637 B1 | 9/2007 | Himmelstein |
| 7,274,988 B2 | 9/2007 | Mukaiyama |
| 7,275,038 B1 | 9/2007 | Weinstock et al. |
| 7,277,693 B2 | 10/2007 | Chen et al. |
| 7,283,567 B2 | 10/2007 | Preston et al. |
| 7,283,904 B2 | 10/2007 | Benjamin et al. |
| 7,286,522 B2 | 10/2007 | Preston et al. |
| 7,295,925 B2 | 11/2007 | Breed et al. |
| 7,298,248 B2 | 11/2007 | Finley et al. |
| 7,298,289 B1 | 11/2007 | Hoffberg |
| 7,301,494 B2 | 11/2007 | Waters |
| 7,302,339 B2 | 11/2007 | Gray |
| 7,305,467 B2 | 12/2007 | Kaiser et al. |
| 7,317,696 B2 | 1/2008 | Preston et al. |
| 7,330,693 B1 | 2/2008 | Goss |
| 7,330,872 B2 | 2/2008 | Peart et al. |
| 7,343,160 B2 | 3/2008 | Morton |
| 7,343,317 B2 | 3/2008 | Jokinen et al. |
| 7,343,586 B1 | 3/2008 | Hernandez, III |
| 7,359,782 B2 | 4/2008 | Breed |
| 7,373,243 B2 | 5/2008 | Tengler et al. |
| 7,375,728 B2 | 5/2008 | Donath et al. |
| 7,379,707 B2 | 5/2008 | DiFonzo et al. |
| 7,383,341 B1 | 6/2008 | Saito et al. |
| 7,385,501 B2 | 6/2008 | Miller et al. |
| 7,386,477 B2 | 6/2008 | Fano |
| 7,411,982 B2 | 8/2008 | Smith |
| 7,418,346 B2 | 8/2008 | Breed et al. |
| 7,418,476 B2 | 8/2008 | Salesky et al. |
| 7,426,438 B1 | 9/2008 | Robertsson |
| 7,450,955 B2 | 11/2008 | Himmelstein |
| 7,451,005 B2 | 11/2008 | Hoffberg et al. |
| 7,463,896 B2 | 12/2008 | Himmelstein |
| 7,467,372 B2 | 12/2008 | Loughlin et al. |
| 7,471,236 B1 | 12/2008 | Pitt et al. |
| 7,472,419 B1 | 12/2008 | Balasubramaniam et al. |
| 7,480,941 B1 | 1/2009 | Balasubramaniam et al. |
| 7,484,008 B1 | 1/2009 | Gelvin et al. |
| 7,504,983 B2 | 3/2009 | Chen et al. |
| 7,505,772 B2 | 3/2009 | Himmelstein |
| 7,506,020 B2 | 3/2009 | Ellis |
| 7,508,810 B2 | 3/2009 | Moinzadeh et al. |
| 7,509,134 B2 | 3/2009 | Fournier et al. |
| 7,509,404 B2 | 3/2009 | Agrawal et al. |
| 7,525,450 B2 | 4/2009 | Miller et al. |
| 7,536,189 B2 | 5/2009 | Himmelstein |
| 7,548,961 B1 | 6/2009 | Fernandez et al. |
| 7,576,679 B1 | 8/2009 | Orr et al. |
| 7,577,872 B2 | 8/2009 | DiBartolomeo et al. |
| 7,586,631 B2 | 9/2009 | Omori |
| 7,587,370 B2 | 9/2009 | Himmelstein |
| 7,594,000 B2 | 9/2009 | Himmelstein |
| 7,596,391 B2 | 9/2009 | Himmelstein |
| 7,596,609 B1 | 9/2009 | Refuah et al. |
| 7,599,715 B2 | 10/2009 | Himmelstein |
| 7,603,465 B2 | 10/2009 | Akashika et al. |
| 7,606,170 B2 | 10/2009 | Fischer |
| 7,610,588 B1 | 10/2009 | Hager et al. |
| 7,614,055 B2 | 11/2009 | Buskens et al. |
| 7,629,899 B2 | 12/2009 | Breed |
| 7,631,032 B1 | 12/2009 | Refuah et al. |

(56) References Cited

U.S. PATENT DOCUMENTS

| | | |
|---|---|---|
| 7,640,268 B2 | 12/2009 | Gotoh et al. |
| 7,650,319 B2 | 1/2010 | Hoffberg et al. |
| 7,664,315 B2 | 2/2010 | Woodfill et al. |
| 7,681,007 B2 | 3/2010 | Rustagi et al. |
| 7,685,230 B2 | 3/2010 | Lakshminarasimhan Kanchi |
| 7,733,853 B2 | 6/2010 | Moinzadeh et al. |
| 7,747,281 B2 | 6/2010 | Preston et al. |
| 7,747,291 B2 | 6/2010 | Himmelstein |
| 7,761,700 B2 | 7/2010 | Sierra et al. |
| 7,764,219 B2 | 7/2010 | Pitt et al. |
| 7,769,633 B2 | 8/2010 | Jokinen et al. |
| 7,779,087 B2 | 8/2010 | Wilson et al. |
| 7,783,304 B2 | 8/2010 | Himmelstein |
| 7,793,136 B2 | 9/2010 | Lutter |
| 7,804,440 B1 | 9/2010 | Orr |
| 7,809,367 B2 | 10/2010 | Hellaker |
| 7,813,822 B1 | 10/2010 | Hoffberg |
| 7,814,172 B2 | 10/2010 | Martin et al. |
| 7,847,685 B2 | 12/2010 | Miller et al. |
| 7,848,763 B2 | 12/2010 | Fournier et al. |
| 7,859,402 B2 | 12/2010 | Miller et al. |
| 7,891,004 B1 | 2/2011 | Gelvin et al. |
| 7,899,690 B1 | 3/2011 | Weinstock et al. |
| 7,904,187 B2 | 3/2011 | Hoffberg et al. |
| 7,904,569 B1 | 3/2011 | Gelvin et al. |
| 7,907,976 B2 | 3/2011 | Himmelstein |
| 7,912,645 B2 | 3/2011 | Breed et al. |
| 7,965,222 B2 | 6/2011 | Pitt et al. |
| 7,966,078 B2 | 6/2011 | Hoffberg et al. |
| 7,974,714 B2 | 7/2011 | Hoffberg |
| 7,983,835 B2 | 7/2011 | Lagassey |
| 7,987,003 B2 | 7/2011 | Hoffberg et al. |
| 7,987,472 B2 | 7/2011 | Hager et al. |
| 7,999,721 B2 | 8/2011 | Orr |
| 8,020,028 B1 | 9/2011 | Lutter |
| 8,031,060 B2 | 10/2011 | Hoffberg et al. |
| 8,032,477 B1 | 10/2011 | Hoffberg et al. |
| 8,046,313 B2 | 10/2011 | Hoffberg et al. |
| 8,065,420 B2 | 11/2011 | Akashika et al. |
| 8,108,231 B2 | 1/2012 | Boruff et al. |
| 8,135,843 B2 | 3/2012 | Kramer |
| 8,165,916 B2 | 4/2012 | Hoffberg et al. |
| 8,166,522 B2 | 4/2012 | Martin et al. |
| 2001/0000045 A1 | 3/2001 | Yu et al. |
| 2001/0000194 A1 | 4/2001 | Sequeira |
| 2001/0000458 A1 | 4/2001 | Shtivelman et al. |
| 2001/0000540 A1 | 4/2001 | Cooper et al. |
| 2001/0001022 A1 | 5/2001 | Kinghorn |
| 2001/0001024 A1 | 5/2001 | Yanagihara et al. |
| 2001/0001160 A1 | 5/2001 | Shoff et al. |
| 2001/0002224 A1 | 5/2001 | Sasaki et al. |
| 2001/0002852 A1 | 6/2001 | Kwoh |
| 2001/0005804 A1 | 6/2001 | Rayner |
| 2001/0007086 A1 | 7/2001 | Rogers et al. |
| 2001/0007147 A1 | 7/2001 | Goldschmidt Iki et al. |
| 2001/0008427 A1 | 7/2001 | Seo |
| 2001/0009034 A1 | 7/2001 | Lee |
| 2001/0009548 A1 | 7/2001 | Morris |
| 2001/0009604 A1 | 7/2001 | Ando et al. |
| 2001/0009605 A1 | 7/2001 | Ando et al. |
| 2001/0009855 A1 | 7/2001 | I'Anson |
| 2001/0010046 A1 | 7/2001 | Muyres et al. |
| 2001/0010094 A1 | 7/2001 | Moir |
| 2001/0010095 A1 | 7/2001 | Ellis et al. |
| 2001/0010523 A1 | 8/2001 | Sezan et al. |
| 2001/0010755 A1 | 8/2001 | Ando et al. |
| 2001/0011264 A1 | 8/2001 | Kawasaki |
| 2001/0011284 A1 | 8/2001 | Humpleman et al. |
| 2001/0011372 A1 | 8/2001 | Lee |
| 2001/0011373 A1 | 8/2001 | Inoue |
| 2001/0011996 A1 | 8/2001 | Terakado et al. |
| 2001/0012323 A1 | 8/2001 | Gaedke et al. |
| 2001/0012440 A1 | 8/2001 | Itoi |
| 2001/0012443 A1 | 8/2001 | Ando et al. |
| 2001/0013123 A1 | 8/2001 | Freeman et al. |
| 2001/0013124 A1 | 8/2001 | Klosterman et al. |
| 2001/0013125 A1 | 8/2001 | Kitsukawa et al. |
| 2001/0013906 A1 | 8/2001 | Thorgeirsson |
| 2001/0013952 A1 | 8/2001 | Boon |
| 2001/0014201 A1 | 8/2001 | Ando et al. |
| 2001/0014210 A1 | 8/2001 | Kang |
| 2001/0014895 A1 | 8/2001 | Sappal |
| 2001/0014974 A1 | 8/2001 | Asada et al. |
| 2001/0016944 A1 | 8/2001 | Terakado et al. |
| 2001/0016945 A1 | 8/2001 | Inoue |
| 2001/0016946 A1 | 8/2001 | Inoue |
| 2001/0016947 A1 | 8/2001 | Nishikawa et al. |
| 2001/0018628 A1 | 8/2001 | Jenkins et al. |
| 2001/0019367 A1 | 9/2001 | Walton et al. |
| 2001/0019658 A1 | 9/2001 | Barton et al. |
| 2001/0020297 A1 | 9/2001 | Inoue |
| 2001/0021994 A1 | 9/2001 | Nash |
| 2001/0021995 A1 | 9/2001 | Hatano |
| 2001/0022003 A1 | 9/2001 | Narushima |
| 2001/0023401 A1 | 9/2001 | Weishut et al. |
| 2001/0023433 A1 | 9/2001 | Natsubori et al. |
| 2001/0023498 A1 | 9/2001 | Cosmao et al. |
| 2001/0024565 A1 | 9/2001 | Yui et al. |
| 2001/0024566 A1 | 9/2001 | Mankovitz |
| 2001/0026386 A1 | 10/2001 | Yamamoto et al. |
| 2001/0026561 A1 | 10/2001 | Morris et al. |
| 2001/0026677 A1 | 10/2001 | Chen et al. |
| 2001/0027557 A1 | 10/2001 | Shinkawa et al. |
| 2001/0027558 A1 | 10/2001 | Sasselli et al. |
| 2001/0029511 A1 | 10/2001 | Burda et al. |
| 2001/0029610 A1 | 10/2001 | Corvin et al. |
| 2001/0030644 A1 | 10/2001 | Allport |
| 2001/0030661 A1 | 10/2001 | Reichardt |
| 2001/0030711 A1 | 10/2001 | Saito |
| 2001/0032333 A1 | 10/2001 | Flickinger |
| 2001/0037238 A1 | 11/2001 | Gotoh et al. |
| 2001/0037242 A1 | 11/2001 | Bataillon et al. |
| 2001/0037375 A1 | 11/2001 | Story et al. |
| 2001/0037462 A1 | 11/2001 | Bengtson |
| 2001/0039514 A1 | 11/2001 | Barenbaum et al. |
| 2001/0039544 A1 | 11/2001 | Chakrabarti et al. |
| 2001/0042001 A1 | 11/2001 | Goto et al. |
| 2001/0042002 A1 | 11/2001 | Koopersmith |
| 2001/0044309 A1 | 11/2001 | Bar et al. |
| 2001/0047357 A1 | 11/2001 | Vaithilingam et al. |
| 2001/0047379 A1 | 11/2001 | Jun et al. |
| 2001/0048483 A1 | 12/2001 | Steinberg et al. |
| 2001/0049820 A1 | 12/2001 | Barton |
| 2001/0049822 A1 | 12/2001 | Yoshida et al. |
| 2001/0052847 A1 | 12/2001 | Auerbach |
| 2001/0056405 A1 | 12/2001 | Muyres et al. |
| 2001/0056540 A1 | 12/2001 | Ober et al. |
| 2001/0056544 A1 | 12/2001 | Walker |
| 2002/0001317 A1 | 1/2002 | Herring |
| 2002/0002488 A1 | 1/2002 | Muyres et al. |
| 2002/0004744 A1 | 1/2002 | Muyres et al. |
| 2002/0008619 A1 | 1/2002 | Lerg et al. |
| 2002/0008637 A1 | 1/2002 | Lemelson et al. |
| 2002/0012329 A1 | 1/2002 | Atkinson et al. |
| 2002/0014976 A1 | 2/2002 | Yoshida |
| 2002/0016171 A1 | 2/2002 | Doganata et al. |
| 2002/0016962 A1 | 2/2002 | Decarmo |
| 2002/0019763 A1 | 2/2002 | Linden et al. |
| 2002/0019764 A1 | 2/2002 | Mascarenhas |
| 2002/0019776 A1 | 2/2002 | Simpson |
| 2002/0019855 A1 | 2/2002 | Sakaguchi et al. |
| 2002/0022924 A1 | 2/2002 | Begin |
| 2002/0022927 A1 | 2/2002 | Lemelson et al. |
| 2002/0034757 A1 | 3/2002 | Cubicciotti |
| 2002/0036750 A1 | 3/2002 | Eberl et al. |
| 2002/0037735 A1 | 3/2002 | Maggenti et al. |
| 2002/0038182 A1 | 3/2002 | Wong et al. |
| 2002/0046084 A1 | 4/2002 | Steele et al. |
| 2002/0049389 A1 | 4/2002 | Abreu |
| 2002/0049527 A1 | 4/2002 | Kohno et al. |
| 2002/0052214 A1 | 5/2002 | Maggenti et al. |
| 2002/0061760 A1 | 5/2002 | Maggenti et al. |
| 2002/0067475 A1 | 6/2002 | Waibel et al. |
| 2002/0069529 A1 | 6/2002 | Wieres |

(56) References Cited

U.S. PATENT DOCUMENTS

| | | |
|---|---|---|
| 2002/0070852 A1 | 6/2002 | Trauner et al. |
| 2002/0082048 A1 | 6/2002 | Toyoshima |
| 2002/0087401 A1 | 7/2002 | Leapman et al. |
| 2002/0095501 A1 | 7/2002 | Chiloyan et al. |
| 2002/0102999 A1 | 8/2002 | Maggenti et al. |
| 2002/0105423 A1 | 8/2002 | Rast |
| 2002/0111213 A1 | 8/2002 | McEntee et al. |
| 2002/0112047 A1 | 8/2002 | Kushwaha et al. |
| 2002/0121969 A1 | 9/2002 | Joao |
| 2002/0135504 A1 | 9/2002 | Singer |
| 2002/0144010 A1 | 10/2002 | Younis et al. |
| 2002/0147766 A1 | 10/2002 | Vanska et al. |
| 2002/0147982 A1 | 10/2002 | Naidoo et al. |
| 2002/0154631 A1 | 10/2002 | Makansi et al. |
| 2002/0163579 A1 | 11/2002 | Patel et al. |
| 2002/0170685 A1 | 11/2002 | Weik, III et al. |
| 2002/0173317 A1 | 11/2002 | Nykanen et al. |
| 2002/0174073 A1 | 11/2002 | Nordman et al. |
| 2002/0181501 A1 | 12/2002 | Nova et al. |
| 2002/0185590 A1 | 12/2002 | Yahav et al. |
| 2002/0193938 A1 | 12/2002 | DeKock et al. |
| 2002/0198632 A1 | 12/2002 | Breed et al. |
| 2002/0198633 A1 | 12/2002 | Weimper |
| 2003/0001816 A1 | 1/2003 | Badarneh |
| 2003/0006881 A1 | 1/2003 | Reyes |
| 2003/0009602 A1 | 1/2003 | Jacobs et al. |
| 2003/0011684 A1 | 1/2003 | Narayanaswami et al. |
| 2003/0016005 A1 | 1/2003 | Leibowitz et al. |
| 2003/0018430 A1 | 1/2003 | Ladetto et al. |
| 2003/0034462 A1 | 2/2003 | Remillard et al. |
| 2003/0036881 A1 | 2/2003 | Remillard et al. |
| 2003/0037163 A1 | 2/2003 | Kitada et al. |
| 2003/0040145 A1 | 2/2003 | Borghs et al. |
| 2003/0041329 A1 | 2/2003 | Bassett |
| 2003/0045998 A1 | 3/2003 | Medl |
| 2003/0053536 A1 | 3/2003 | Ebrami |
| 2003/0059208 A1 | 3/2003 | Ando et al. |
| 2003/0060188 A1 | 3/2003 | Gidron et al. |
| 2003/0060956 A1 | 3/2003 | Rao et al. |
| 2003/0060980 A1 | 3/2003 | Prakah-Asante et al. |
| 2003/0062997 A1 | 4/2003 | Naidoo et al. |
| 2003/0065788 A1 | 4/2003 | Salomaki |
| 2003/0067542 A1 | 4/2003 | Monroe |
| 2003/0078064 A1 | 4/2003 | Chan |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081557 A1 | 5/2003 | Mettala et al. |
| 2003/0081934 A1 | 5/2003 | Kirmuss |
| 2003/0081935 A1 | 5/2003 | Kirmuss |
| 2003/0093187 A1 | 5/2003 | Walker |
| 2003/0098800 A1 | 5/2003 | Jambhekar et al. |
| 2003/0099375 A1 | 5/2003 | Sefcik |
| 2003/0100965 A1 | 5/2003 | Sitrick et al. |
| 2003/0100982 A1 | 5/2003 | Rao et al. |
| 2003/0101329 A1 | 5/2003 | Lahti et al. |
| 2003/0101341 A1 | 5/2003 | Kettler, III et al. |
| 2003/0103484 A1 | 6/2003 | Oommen et al. |
| 2003/0114157 A1 | 6/2003 | Spitz et al. |
| 2003/0119528 A1 | 6/2003 | Pew et al. |
| 2003/0125853 A1 | 7/2003 | Takagi et al. |
| 2003/0149528 A1 | 8/2003 | Lin |
| 2003/0151507 A1 | 8/2003 | Andre et al. |
| 2003/0153340 A1 | 8/2003 | Crockett et al. |
| 2003/0153341 A1 | 8/2003 | Crockett et al. |
| 2003/0153342 A1 | 8/2003 | Crockett et al. |
| 2003/0153343 A1 | 8/2003 | Crockett et al. |
| 2003/0154010 A1 | 8/2003 | Rao et al. |
| 2003/0154011 A1 | 8/2003 | Rao et al. |
| 2003/0155513 A1 | 8/2003 | Remillard et al. |
| 2003/0161298 A1 | 8/2003 | Bergman et al. |
| 2003/0163524 A1 | 8/2003 | Gotoh et al. |
| 2003/0169181 A1 | 9/2003 | Taylor |
| 2003/0169185 A1 | 9/2003 | Taylor |
| 2003/0182053 A1 | 9/2003 | Swope et al. |
| 2003/0189499 A1 | 10/2003 | Stricklin et al. |
| 2003/0193409 A1 | 10/2003 | Crank |
| 2003/0204640 A1 | 10/2003 | Sahinoja et al. |
| 2003/0206100 A1 | 11/2003 | Richman et al. |
| 2003/0214405 A1 | 11/2003 | Lerg et al. |
| 2003/0222819 A1 | 12/2003 | Karr et al. |
| 2003/0222981 A1 | 12/2003 | Kisak et al. |
| 2003/0223381 A1 | 12/2003 | Schroderus |
| 2003/0225516 A1 | 12/2003 | DeKock et al. |
| 2004/0002326 A1 | 1/2004 | Maher |
| 2004/0002348 A1 | 1/2004 | Fraccaroli |
| 2004/0006424 A1 | 1/2004 | Joyce et al. |
| 2004/0008651 A1 | 1/2004 | Ahmed |
| 2004/0009813 A1 | 1/2004 | Wind |
| 2004/0010591 A1 | 1/2004 | Sinn et al. |
| 2004/0014457 A1 | 1/2004 | Stevens |
| 2004/0019420 A1 | 1/2004 | Rao et al. |
| 2004/0022416 A1 | 2/2004 | Lemelson et al. |
| 2004/0030670 A1 | 2/2004 | Barton |
| 2004/0044623 A1 | 3/2004 | Wake et al. |
| 2004/0049428 A1 | 3/2004 | Soehnlen et al. |
| 2004/0064550 A1 | 4/2004 | Sakata et al. |
| 2004/0067752 A1 | 4/2004 | Himmelstein |
| 2004/0068724 A1 | 4/2004 | Gardner, III et al. |
| 2004/0073361 A1 | 4/2004 | Tzamaloukas et al. |
| 2004/0073642 A1 | 4/2004 | Iyer |
| 2004/0090121 A1 | 5/2004 | Simonds et al. |
| 2004/0093141 A1 | 5/2004 | Rao et al. |
| 2004/0107033 A1 | 6/2004 | Rao et al. |
| 2004/0111200 A1 | 6/2004 | Rao et al. |
| 2004/0117091 A1 | 6/2004 | Prakah-Asante et al. |
| 2004/0145459 A1 | 7/2004 | Himmelstein |
| 2004/0162064 A1 | 8/2004 | Himmelstein |
| 2004/0164228 A1 | 8/2004 | Fogg et al. |
| 2004/0189512 A1 | 9/2004 | Takashima et al. |
| 2004/0193371 A1 | 9/2004 | Koshiji et al. |
| 2004/0201500 A1 | 10/2004 | Miller et al. |
| 2004/0203931 A1 | 10/2004 | Karaoguz |
| 2004/0204806 A1 | 10/2004 | Chen et al. |
| 2004/0205151 A1 | 10/2004 | Sprigg et al. |
| 2004/0215931 A1 | 10/2004 | Ellis |
| 2004/0229632 A1 | 11/2004 | Flynn et al. |
| 2004/0248569 A1 | 12/2004 | Kondou et al. |
| 2004/0260669 A1 | 12/2004 | Fernandez |
| 2005/0003797 A1 | 1/2005 | Baldwin |
| 2005/0009506 A1 | 1/2005 | Smolentzov et al. |
| 2005/0021666 A1 | 1/2005 | Dinnage et al. |
| 2005/0026569 A1 | 2/2005 | Lim et al. |
| 2005/0028034 A1 | 2/2005 | Gantman et al. |
| 2005/0034417 A1 | 2/2005 | Toguchi |
| 2005/0039178 A1 | 2/2005 | Marolia et al. |
| 2005/0041578 A1 | 2/2005 | Huotari et al. |
| 2005/0050252 A1 | 3/2005 | Kuno |
| 2005/0070221 A1 | 3/2005 | Upton |
| 2005/0086467 A1 | 4/2005 | Asokan et al. |
| 2005/0091118 A1 | 4/2005 | Fano |
| 2005/0091184 A1 | 4/2005 | Seshadri et al. |
| 2005/0112030 A1 | 5/2005 | Gaus |
| 2005/0125117 A1 | 6/2005 | Breed |
| 2005/0130656 A1 | 6/2005 | Chen |
| 2005/0137765 A1 | 6/2005 | Hein et al. |
| 2005/0153654 A1 | 7/2005 | Anderson et al. |
| 2005/0209995 A1 | 9/2005 | Aksu et al. |
| 2005/0233741 A1 | 10/2005 | Zamani et al. |
| 2005/0234851 A1 | 10/2005 | King et al. |
| 2005/0246314 A1 | 11/2005 | Eder |
| 2005/0259675 A1 | 11/2005 | Tuohino et al. |
| 2005/0260984 A1 | 11/2005 | Karabinis |
| 2005/0264417 A1 | 12/2005 | Miller et al. |
| 2005/0266858 A1 | 12/2005 | Miller et al. |
| 2005/0267638 A1 | 12/2005 | Peshkin et al. |
| 2005/0272442 A1 | 12/2005 | Miller et al. |
| 2005/0275505 A1 | 12/2005 | Himmelstein |
| 2005/0278712 A1 | 12/2005 | Buskens et al. |
| 2006/0019676 A1 | 1/2006 | Miller et al. |
| 2006/0030334 A1 | 2/2006 | Hashimoto |
| 2006/0053225 A1 | 3/2006 | Poikselka et al. |

(56) References Cited

U.S. PATENT DOCUMENTS

| | | |
|---|---|---|
| 2006/0083217 A1 | 4/2006 | Bae |
| 2006/0132349 A1 | 6/2006 | Stern et al. |
| 2006/0146766 A1 | 7/2006 | Nakajima et al. |
| 2006/0167784 A1 | 7/2006 | Hoffberg |
| 2006/0206259 A1 | 9/2006 | Stiller et al. |
| 2006/0206576 A1 | 9/2006 | Obradovich et al. |
| 2006/0212558 A1 | 9/2006 | Sahinoja et al. |
| 2006/0212562 A1 | 9/2006 | Kushwaha et al. |
| 2006/0234639 A1 | 10/2006 | Kushwaha et al. |
| 2006/0234698 A1 | 10/2006 | Fok et al. |
| 2006/0259240 A1 | 11/2006 | Hashimoto |
| 2007/0026854 A1 | 2/2007 | Nath et al. |
| 2007/0030539 A1 | 2/2007 | Nath et al. |
| 2007/0042765 A1 | 2/2007 | Bailin et al. |
| 2007/0050673 A1 | 3/2007 | DiBartolomeo et al. |
| 2007/0054677 A1 | 3/2007 | Himmelstein |
| 2007/0060056 A1 | 3/2007 | Whitaker et al. |
| 2007/0082678 A1 | 4/2007 | Himmelstein |
| 2007/0115868 A1 | 5/2007 | Chen et al. |
| 2007/0115897 A1 | 5/2007 | Chen et al. |
| 2007/0207797 A1 | 9/2007 | Pitt et al. |
| 2008/0015748 A1 | 1/2008 | Nagy |
| 2008/0031213 A1 | 2/2008 | Kaiser et al. |
| 2008/0090591 A1 | 4/2008 | Miller et al. |
| 2008/0091537 A1 | 4/2008 | Miller et al. |
| 2008/0092140 A1 | 4/2008 | Doninger et al. |
| 2008/0119212 A1 | 5/2008 | Himmelstein |
| 2008/0126565 A1 | 5/2008 | Osano et al. |
| 2008/0146248 A1 | 6/2008 | Himmelstein |
| 2008/0161018 A1 | 7/2008 | Miller et al. |
| 2008/0261529 A1 | 10/2008 | Rosenblatt |
| 2009/0015461 A1 | 1/2009 | Pitt et al. |
| 2009/0079614 A1 | 3/2009 | Pitt et al. |
| 2009/0082950 A1 | 3/2009 | Vorona |
| 2009/0122723 A1 | 5/2009 | Hirano et al. |
| 2009/0156125 A1 | 6/2009 | Himmelstein |
| 2009/0156203 A1 | 6/2009 | Himmelstein |
| 2009/0221275 A1 | 9/2009 | Trip |
| 2009/0282458 A1 | 11/2009 | Hjelm |
| 2009/0304009 A1 | 12/2009 | Kolhi et al. |
| 2009/0311994 A1 | 12/2009 | Himmelstein |
| 2009/0311995 A1 | 12/2009 | Himmelstein |
| 2010/0057290 A1 | 3/2010 | Brillhart et al. |
| 2010/0214148 A1 | 8/2010 | Kuhn |
| 2010/0214149 A1 | 8/2010 | Kuhn |
| 2010/0238065 A1 | 9/2010 | Pitt et al. |
| 2010/0291874 A1 | 11/2010 | Himmelstein |
| 2010/0312433 A1 | 12/2010 | Preston et al. |

FOREIGN PATENT DOCUMENTS

| | | |
|---|---|---|
| CA | 1298903 | 4/1992 |
| CA | 2245963 | 2/2000 |
| DE | 3125161 | 1/1983 |
| DE | 3310111 | 9/1984 |
| DE | 3325397 | 1/1985 |
| DE | 3419156 | 11/1985 |
| DE | 4035979 | 6/1991 |
| DE | 4123097 | 1/1992 |
| DE | 4237987 | 5/1994 |
| DE | 19743137 | 4/1999 |
| DE | 19922608 | 11/2000 |
| DE | 19931161 | 1/2001 |
| EP | 0059120 | 9/1982 |
| EP | 0155776 | 9/1985 |
| EP | 0158214 | 10/1985 |
| EP | 0181012 | 5/1986 |
| EP | 0290725 | 11/1988 |
| EP | 0295678 | 12/1988 |
| EP | 0323230 | 7/1989 |
| EP | 0323246 | 7/1989 |
| EP | 0348528 | 1/1990 |
| EP | 0379198 | 7/1990 |
| EP | 0393935 | 10/1990 |
| EP | 0441576 | 8/1991 |
| EP | 0444738 | 9/1991 |
| EP | 0485120 | 5/1992 |
| EP | 0501058 | 9/1992 |
| EP | 0512789 | 11/1992 |
| EP | 0718614 | 6/1996 |
| EP | 0748727 | 12/1996 |
| EP | 0750406 | 12/1996 |
| EP | 0785535 | 7/1997 |
| EP | 0 814 393 A1 | 12/1997 |
| EP | 0814393 | 12/1997 |
| EP | 0841648 | 5/1998 |
| EP | 0849948 | 6/1998 |
| EP | 0851681 | 7/1998 |
| EP | 0921411 | 6/1999 |
| EP | 1100063 | 5/2001 |
| EP | 1355128 | 10/2003 |
| EP | 1 975 902 A2 | 10/2008 |
| FR | 2554612 | 5/1985 |
| GB | 2079453 | 1/1982 |
| GB | 2126040 | 3/1984 |
| GB | 2238870 | 6/1991 |
| GB | 2256987 | 12/1992 |
| GB | 2261977 | 6/1993 |
| GB | 2320973 | 7/1998 |
| JP | 61115298 | 6/1986 |
| JP | 63066479 | 5/1988 |
| JP | 63188517 | 12/1988 |
| JP | 1079679 | 3/1989 |
| JP | 1130299 | 5/1989 |
| JP | 1136300 | 5/1989 |
| JP | 1272656 | 10/1989 |
| JP | 2212713 | 8/1990 |
| JP | 3150699 | 6/1991 |
| JP | 3245076 | 10/1991 |
| JP | 3269317 | 11/1991 |
| JP | 8076706 | 3/1996 |
| JP | 9027096 | 1/1997 |
| JP | 10243438 | 9/1998 |
| JP | 11250383 | 9/1999 |
| JP | 11-283158 A | 10/1999 |
| JP | 11283158 | 10/1999 |
| JP | 2000078678 | 3/2000 |
| JP | 2000092714 | 3/2000 |
| JP | 2000207691 | 7/2000 |
| JP | 2000261731 | 9/2000 |
| JP | 2000267564 | 9/2000 |
| JP | 2001041753 | 2/2001 |
| JP | 2001089414 | 4/2001 |
| JP | 2001127047 | 5/2001 |
| JP | 2001173815 | 6/2001 |
| JP | 2001173817 | 6/2001 |
| JP | 2002004285 | 1/2002 |
| JP | 2002103584 | 4/2002 |
| JP | 2002212713 | 7/2002 |
| JP | 2003044015 | 2/2003 |
| JP | 2003137679 | 5/2003 |
| JP | 2003150699 | 5/2003 |
| JP | 2003245075 | 9/2003 |
| JP | 2003245076 | 9/2003 |
| JP | 2003269317 | 9/2003 |
| JP | 2005010775 | 1/2005 |
| JP | 3137679 | 12/2007 |
| JP | 2008287386 | 11/2008 |
| JP | 2010079679 | 4/2010 |
| JP | 2010243438 | 10/2010 |
| JP | 2011030299 | 2/2011 |
| JP | 2011036300 | 2/2011 |
| JP | 2011250383 | 12/2011 |
| JP | 2012072656 | 4/2012 |
| WO | WO9214215 | 8/1992 |
| WO | 92/19078 A1 | 10/1992 |
| WO | WO9219078 | 10/1992 |
| WO | 92/21001 A1 | 11/1992 |
| WO | WO9221001 | 11/1992 |
| WO | 95/00860 A1 | 1/1995 |
| WO | WO9500860 | 1/1995 |
| WO | WO9515658 | 6/1995 |
| WO | WO9522131 | 8/1995 |
| WO | WO9615614 | 5/1996 |

(56) References Cited

FOREIGN PATENT DOCUMENTS

| | | | |
|---|---|---|---|
| WO | 97/08839 A2 | 8/1996 | |
| WO | WO9624229 | 8/1996 | |
| WO | WO 97/06613 | 2/1997 | ............... H04H 1/02 |
| WO | WO9708839 | 3/1997 | |
| WO | WO9722066 | 6/1997 | |
| WO | 97/23973 A1 | 7/1997 | |
| WO | 97/26061 A1 | 7/1997 | |
| WO | WO9723973 | 7/1997 | |
| WO | WO9726061 | 7/1997 | |
| WO | WO9729373 | 8/1997 | |
| WO | WO 98/43380 | 10/1998 | |
| WO | WO 98/47249 | 10/1998 | ............... H04H 1/00 |
| WO | WO9908436 | 2/1999 | |
| WO | WO 99/14947 | 3/1999 | ............. H04N 5/445 |
| WO | 99/17477 A2 | 4/1999 | |
| WO | WO9917477 | 4/1999 | |
| WO | 99/23809 A1 | 5/1999 | |
| WO | WO9923809 | 5/1999 | |
| WO | WO 99/30493 | 6/1999 | ............... H04N 7/10 |
| WO | WO 99/39466 | 8/1999 | ............... H04H 1/00 |
| WO | WO 99/43111 | 8/1999 | ............... H04H 1/00 |
| WO | WO9957662 | 11/1999 | |
| WO | WO9965183 | 12/1999 | |
| WO | WO0029948 | 5/2000 | |
| WO | WO0040038 | 7/2000 | |
| WO | 00/54237 A1 | 9/2000 | |
| WO | WO0054237 | 9/2000 | |
| WO | WO0130061 | 4/2001 | |
| WO | WO0158110 | 8/2001 | |

OTHER PUBLICATIONS

Bolster, Kathryn, "Reading made fun: BookWhiz," Oct. 1988, Small Computers in Libraries, v8, n9, p. 12(3).*
Vic Sussman, "The Audio Book Business," The Washington Post, Mar. 20, 1988. p. x.10.*
Internet Article "Networked Image Databases", Net_image_data-0.3.html at dcas.ucdavis.edu.
Chang, Yuh-Lin, et al., "Integrated Image and Speech Analysis for Content-Based Video Indexing".
Press Release from Internet dated Jan. 9, 1988, "New Unit Has Six Auxiliary Inputs to Remotely Monitor Vacation Homes, Offices or Other Important Areas in Need of Surveillance".
Press Release from Internet dated Jan. 9, 1988 re: Gemstar International Group Ltd.
Index of Thesis by John R. Smith entitled "Integrated Spatial and Feature Image Systems: Retrieval, Analysis and Compression".
Brown, Martin G., et al., "Automatic Content-Based Retrieval of Broadcast News".
Wilkins, R.J., et al., "The MAVIS project-extending generic links and content based retrieval to non-textual documents in the Microcosm model".
Barnsley, Michael, et al., "A Better Way to Compress Images", BYTE, Jan. 1988.
Doherty, Richard, "MPEG Group Reveals Audiovisual Code Data", Electronic Engineering Times, p. 97, Dec. 2, 1991.
Yoshida, Junko, "EMC$^2$ Pushes Video Rental by Satellite", Electronic Engineering Times, pp. 97-98, Dec. 2, 1991.
Yoshida, Junko, "Copy-protect Logjam Stalls DVD-PC Debut", EE Times, pp. 1 and May 26, 1997.
Press Release from Internet dated Nov. 12, 1996 "Keyware Technologies Inc."
Press Release from Internet dated Jan. 28, 1997 "Iterated Systems Announces Partnership With Emc$^3$".
National Aeronautics and Space Administration Contract No. NAS7-918, Technical Support Package on "Electronic "Noses" Made From Conductive Polymeric Films", for Jul. 97 NASA Tech Brief, vol. 21, No. 7, Item #103.
National Aeronautics and Space Administration Contract No. NAS7-918, Technical Support Package on "Acoustic Wind-Velocity Analyzer", for Jul. 97 NASA Tech Brief, vol. 21, No. 7, Item 115.
Internet Article "Video Processing for Content Based Retrieval", Video Databases.
IEEE Article "Image Database with Relevance Feedback", Project Description.
Press for Release from Internet dated Sep. 16, 1997 "Texas Instruments Incorporated".
Press Release from Internet dated Sep. 23, 1997 "New Modular Videophone Retails $329".
Bibliography of Papers on Multimedia Retrieval.
Press Release from Internet dated Sep. 15, 1997 "Extends Leadership in Knowledge Retrieval With Excalibur Internet".
Coding of Moving Pictures and Audio, ISO/IEC JTC1/SC29/WG11 N1686, MPEG97/ "Report on MPEG-7 Seminar in Bristol".
Damore, Kelley, Fractal compression gets boost from showbiz world. (Total Multimedia Inc., Iterated Systems Inc.'s Poem and TMM Producer video compression software and tools), Info World, Dec. 21, 1992, v14, n51, pl(2).
Pearson, Bill, "1394 Digital Content Protection: How Does It Work?", Multimedia Systems Design, November, pp. 20-27.
Press Release from Internet dated Jul. 8, 1998 "BrainTech, Inc. Teams with UTMC on Vision System Project and BrainTech's Odysee Development System Marketing".
Won, Annika, "What is an Intelligent Interface?", Notes from an Introduction seminar, Mar. 1997, http://www.sics.se/~annika/papers/intint.html.
Marchionini, Gary, "Interfaces and Psychological Theory", Oct 91 Psychological Dimensions of User-Computer Interfaces, ERIC Digest, http://www.ed.gov/databases/ERIC_Digesrs/ed337203.html.
Press Release from Internet dated Jul. 27, 1998 "Macrovision Corporation Reports Record Net Revenues, Net Income and Earnings Per Share for Second Quarter".
Copy Management in the Digital Era, An AES Workshop at the Audio Engineering Society Convention Amsterdam, May 16-19, 1998, http://diva.eecs.berkeley.edu/~linnartz.aes/main/aes.html.
Press Release from Internet dated Feb. 24, 1999 "Frisby Technologies, Inc. Acquires Marketer of Cooling Vests".
Press Release from Internet dated Apr. 1, 1999 "Frisby Technologies Inc files Dec. 31, 1998 10-K. Reports $2.8 mil tot rev, $-3.0.84 EPS".
Press Release from Internet dated Apr. 6, 1999 "Phoenix Technologies' IEEE 1394 Core Licensed by C-Cube Microsystems".
Press Release from Internet dated Jul. 15, 1998 "Digimarc Software Chosen by Adobe".
Press Release from Internet dated Jan. 7, 1999 "Replay Networks and E! Entertaimnent Television Networks Sign Agreement".
Internet Articles and Biography on David Benyon, http://umuai.informatik.uni-essen.de/benyon.html and http://www.dcs.napier.ac.uk/~dbenyon/publ.html.
Press Release from Internet dated Jan. 4, 1999 "Hot Technology Companies: 140 Qualify in December".
Press Release from Internet dated Jan. 26, 1999 "TiVo and ZDTV Get Networked".
Press Release from Internet dated Mar. 29, 1999 "Replay Networks and Showtime Networks, Inc. Announce Personal TV Deal for Showtime, The Movie Channel, Sundance Channel and FLIX".
Healey, Jon, "Start-up aims for TV on demand", San Jose Mercury News, Aug. 21, 1998, http://www4.mercurycenter.com.
Costlow, Terry, "Hard drives tuned for foray into prime-time TV", Electronic Engineering Times, Dec. 21, 1998, pp. 6 and 10.
Healey, Jon, "Start-up aims for TV on demand", San Jose Mercury News, Aug. 20, 1998, http://www.mercurycenter.com.
Press Release from Internet dated Jan. 25, 1999 "Scientific-Atlanta's Explorer 2000 Advanced Digital Set-Top Will Support ACTV's Individualized Television", http://www.actv.com.
Press Release from Internet dated Apr. 19, 1999 "TiVo and Replay Networks License Macrovisions's Copy Protection Technology", http://www.businesswire.com.
Pearson, Bill, "1394 Digital Content Protection: How Does It Work?", Multimedia Systems Design Magazine, November, pp. 20-27.
Internet Article "Visual Contextual Awareness in Wearable Computing" Perceptual Computing TR#465, MIT Media Laboratory to appear IEEE ISWC '98, http://testarne.www.media.mit.edu.

(56) References Cited

OTHER PUBLICATIONS

Internet Article "Color Based Image Retrieval Exploiting JPEG Scheme", http://www.cacs.usl.edu/~zxl9826/599/img.html.
Eakins, John P., et al., "Content-Based Image Retrieval", A Report to the JISC Technology Applications Programme, Institute for Image Data Research, University of Northumbria at Newcastle, http://www.unn.ac.uk/iidr/report.html.
Internet Article "Publications and Proposals", http://www.ifp.uiucedu/~yrui/html/publication.html.
National Aeronautics and Space Administration Contract No. \NAS\7-918 Technical Support Package on System Finds Objects of Interest in an Image Data Base for Apr. 98, NASA Tech Brief vol. 22, No. 4, Item #156 from JPL New Technology Report NPO-20213.
"Multimedia Storage and Archiving System", SPIE Proceedings vol. 2916, http://www.spie.org/web/abstracts/2900/2916.html.
Chang, Yuh-Lin, et al., "Integrated Image and Speech Analysis for Content-Based Video Indexing", Matsushita Information Technology Laboratory, Panasonic Technologies, Inc., Princeton, NJ.
Carts-Powell, Yvonne, "Photonics East presents broad coverage of security technologies", SPIEWeb, OE Reports, http://www.spie.org/web/oer/October/oct96/pepreview.html.
Internet Article "Department of Computing Science University of Alberta—Database Systems Research Group", http://web.cs.ualberta.ca/~database/research/multimedia/multimedia.html.
Internet Article Sean Landis' CS718 Project, Fall 1995, http://www.tc.cornell.edu/Visualization/Education/cs718/fall1995/landis.index.html.
Internet Article Retrieval Experiment Results (I, II,III) and More, http://www.cacs.usl.edu/~zx19826/599/exp1.html.
Rui, Yong, et al., "Browsing and Retrieving Video Content in a Unified Framework", Redman Institute for Advanced Science and Technology, University of Illinois at Urbana-Champaign, Urbana, IL 61801.
Coding of Moving Pictures and Audio, ISO/IEC JTC1/SC29/WG11 N1920, MPEG97, Fribourg—Oct. 1997, MPEG-7 Requirements Group, http://www.takilab.k.dendai.ac.ip/~kane/mpeg/mpeg-7/.
Chang, Shih-Fu, "Content-Based Image/Video Search, Editing and Watermarking", http://www.cnmtc.columbia.edu/news/imagesearch.html.
MPEG-7 and IR, http://www.psy.gla.ac.uk/-steve/mpeg7.html.
Common European Newsletter, Multimedia Content Manipulation and Management, User Assisted Segmentation of Semantic Objects in Video Squences, http://www.esat.kuleuven.ac.be/-konijn/teltec.htm.
Common European Newsletter, Multimedia Content Manipulation and Management, MPEG7: The Next of the Family?, http://www.esat.kuleuven,ac.be/~konijn/MPEG7.html.
Coding of Moving Pictures and Audio, ISO/IEC JTC1/SC29/WG11, N 1733, MPEG97, Stockholm—Jul. 1997, MPEG-7: Context and Objectives (V.4—Stockholm), http://rtlab.kaistac.kr/~gunhan/MPEG7/mpeg7v4.html.
Coding of Moving Pictures and Audio, ISO/IEC JTC1/SC29/WG11, N1735, MPEG97, Jul. 1997/Stockholm, MPEG-7 Applications Document, http://rtlab.kaist.ac.kr/~gunhan/MPEG7/mpeg7app.html.
Coding of Moving Pictures and Audio, ISO/IEC JTC1/SC29/WG11/MPEG 97/N1734, Jul. 1997/Stockholm, Second Draft of MPEG-7 Requirements, http://rtlab.kaist ac.kr/~gunhan/MPEG7/mpeg7req.html.
Coding of Moving Pictures and Audio, ISO/IEC JTC1/SC29/WG11, N2460, MPEG98, Oct. 1998/Atlantic City, USA/MPEG-7: Context and Objectives (version—10 Atlantic City), http://drogo.cselt.stet.lt/mpeg/standards/mpeg-7/mpeg-7.htm.
Coding of Moving Pictures and Audio, ISO/IEC JTC1/SC29/WG11, MPEG 98/N2464, Oct. 1998, Atlantic City, USA, MPEG-7 Proposal Package Description (PPD), Requirements Group, http://drogo.eselt.stet.it/mpeg/public/w2464.html.
Internet Article, TC10 News #56, http://www.inf.enst.fr/~elc/GRCE/news/tc10news56.txt.
Bains, Sunny, "Optical correlator expands into3-D scenes", Electronic Engineering Times, Sep. 7, 1998, p. 57.
Bursky, Dave, "Improved DSP ICs Eye New Horizons", Electronic Design, Nov. 11, 1993, pp. 69-82.
Press Release from Internet dated Nov. 12, 1996 Yahoo! First to Offer Internet Image Search Using Excalibur Visual RetrievalWare, http://www.prnewswire.com.
Press Release from Internet dated Jan. 28, 1997, "Iterated's Technology to Enable the Productions of Video for edd/Electronic Digital Delivery", $^{http}$://www.iterated.com.
Yoshida, Junko, "The video-on-demand demand"; Electronic Engineering Times; Mar. 15, 1993, pp. 1 and 72.
Anson, Louisa F.; "Fractal Image Compression"; BYTE; Oct. 1993; pp. 195-202.
Bagley, Hal and Sloan, Jeff; "In Pursuit of Perfection"; Photonics Spectra; Aug. 1993; pp. 101-106.
Baran, Nicholas, "Fractal Compression Goes On-Line"; BYTE; Sep. 1993, p. 40.
Bains, Sunny; "Trained neural network recognizes faces"; Laser Focus World; Jun. 1993; pp. 26 and 28.
Shepard, Jeffrey D.; "Tapping the potential of data compression"; Military & Aerospace Electronics; May 17, 1993; pp. 25-28.
Thesis of Linda I. Hoffberg; "Designing a Programmable Interface for a Video Cassette Recorder (VCR) to Meet the User's Needs".
Thesis of Linda I. Hoffberg "Designing User Interface Guidelines for Time-Shift on a Video Cassette Recorder (VCR)".
Kolbert, Elizabeth; "With 500 Channels, How Could Anyone Learn What's on?".
Bove, Michael; "What's Wrong with Today's Video Coding?"; TV Technology, Feb. 1995.
Bove, Michael; "Object-Oriented Television" paper submitted to SMPTE Journal, Mar. 1995.
Becker, Shawn, et al.; "Semiautomatic 3-D model extraction from uncalibrated 2-D camera views"; Proc. SPIE Image Syntheses, Feb. 1995.
Chalom, Edmond, et al.; "Segmentation of frames in a video sequence using motion and other attributes"; Proc. SPIE Digital Video Compression: Algorithms and Technologies, Feb. 1995.
Fox, Jeffrey A, et al., "Dynamic Rules for User Interface Design" M89-22, May 1989.
Smith, Sidney, et al., "Guidelines for Designing User Interface Software" MITRE, ESD-TR-86-278, MTR 10090, Aug. 1986.
Siochi, et al., "A Study of Computer-Supported User Interface Evaluation Using Maximal Repeating Pattern Analysis", Dept. of Physics & Computer Science, Christopher Newport College and Dept. of Computer Science, Virginia Tech, CHI Proceedings '91.
Cypher, Allen, "Video Presentation Eager: Programming Repetitive Tasks by Example", Advanced Technology Group, Apple Computer, CHI Proceedings '91.
IEEE PAMI Table of Contents—Jan. 1997.
Shapiro, Linda, et al., "Efficient Content-Based Image Retrieval", Dept. of Computer Science and Engineering, University of Washington, http://www.cs.columbia.edu/~klavans/Activities/98-IDM-Workshop/participant.../aberman.htm Sep. 17, 1999.
Alba-Flores, Rocio, et al., "Content-based Search Prototype for Image Databases", http://computer.org/conferen/proceed/meta/1999/papers/44/ralba.html.
"Gates Wows the Audience with CES Keynote", The Andover News Network, http://www.andovernews.com/egi-bin/news_story.pl2107167/topstories Jan. 12, 2000.
Hoffberg, Linda, "Designing a Programmable Interface for a Video Cassette Recorder (VCR) to Meet the User's Needs".
Hoffberg, Linda, Designing User Interface Guidelines for Time-Shift Programming on a Video Cassette Recorder (VCR).
Adobe Ventures Portfolio, Virage Inc., http://www.adobe.com/aboutadobe/adobeventures/Virage.htm.
"Iterated Systems and Emc$^3$ sign digital video deal", http://www.emc3.com/news/plugged_in_sum97/iterated.html.
"Graham-Patten Launches Comparisonics$^{\&trade}$Sound Matching Software", http://www.gpsys.com/pr0406984.html.
"CS_destroy_sample_processor", http://www.comparisonics.com/api_dsp.html.
"Stephen V. Rice", http://www.isri.unlv.edu/~rice/.

(56) References Cited

OTHER PUBLICATIONS

Boney, Laurence, et al., "Digital Watermarks for Audio Signals".
Gautama, S., et al., "Context Driven Matching in Structural Pattern Recognition".
Sawhney, Nitin, et al., "Nomadic Radio: Scaleable and Contextual Notification for Wearable Audio Messaging".
Hartung, Frank, et al., "Spread Spectrum Watermarking: Malicious Attacks and Counterattacks".
"Audio Advertisement Recognition", http://www.signalogic.com/ad_recog.htm.
"Machine recognition and classification of musical patterns", http://www.es.tut.fi/~ilya/MPR htm.
"Music, Mind, Machine", Smartunes\Music Mind Machine_files\dh-95-c.htm.
"Content based recognition in compressed domain", http://www.dcs.uky.edu/~-yuan/compress.html.
Gassner, Michael, et al., Meter as mechanism: A neural network that learns metrical patterns, httpp://gubbio.cs.berkeley.edu/mlpapers/showpaper.doit?3ca24b5d95c2a363c39228a1a8795ea1.
"The Audio Research Group", http://www.dcs.gla.ac.uk/~arg/.
Beeferman, Doug, "QPD: Query by Pitch Dynamics Indexing tonal music by content", http://www.link.cs.cmu.edu/qpd/doc/html/.
Pachet, Francois, et al., "A Combinatorial Approach to Content-Based Music Selection", http://computer.org/conferen/proceed/icmcs/0253/Volume%201/02539457abs.htm.
Uitdenbogerd, Alexandra, et al., "Manipulation of music for melody matching" ACM Multimedia 98—Electronic Proceedings, http://www.kom.e-technik.tu-darmstadt.de/pr/workshop/chair/ACMMM98/electr.../index.htm.
"Moods—Technical Description", http://www.des.uky.edu/~moods/.
"Moods: A Popular Description", http://www.des.uky.edu/~moods/moods_popular.html.
Smith, Brian, "A survey of compressed domain processing techniques", http://www.uky.edu/~kiernan/DL/bsmith.html.
IEEE workshop on content-based access of image and video libraries (In conjunction with IEEE CVPR-2000) Jun. 12, 2000, http://disney.ctr.columbia.edu/cbaivl/.
Griffioen, James, et al., "Content-based multimedia data management and efficient remote access", http://www.uky.edu/~kiernan/DL/brent.html.
Eakins, John, et al., "Content-based image retrieval", http://www.jtap.ac.uk/reports/htm/jtap--039 html.
Chang, Shih-Fu, et al., "VideoQ: an automated content based video search system using visual cues", http://www.uni-mannheim.de/acm97/papers/sundaram/acmMM97paper.html.
Chang, Shih-Fu, et al., "Finding Images/Video from large distributed information sources Columbia's content-based visual query project", http://www.cs.pitt.edu/~panos/idm98/Imported/sfchang.html.
Thiel, Ulrich, et al., "Beyond similarity searching: concept-based video retrieval and Browsing", http://www.darmstadt.gmd.de/~evens/delos99/.
Wood, Matthew, et al., "Iterative refinement by relevance feedback in content-based digital image retrieval" ACM Multimedia 98—Electronic Proceedings, http://info.acm.org/sigmm/MM98/electronic_proceedings/wood/index.html.
"LBSC 878 information storage and retrieval, Spring 1999, Bibliography: retreival from collections of video recordings", http://www.wam.umd.edu/~wpuntai/video/VdoBiblio.htm.
"Attrasoft Neural Network Application Software", http://attrasoft.com/image/Help35.html.
9th International Workshop on Database and Expert Systems Applications, Aug. 26-28, 1998 Vienna, Austria, http://computer.org.proceedings.dexa/8353/8353toc.htm.
Schweitzer, Haim, "Computational limitations of model based recognition" http://www.utd.edu/~haim/publications/html/modelnpc.html.
Ozcan, Fatma, "Comparison of content based image retrieval systems", http://www.cs.umd.edu/~fatma/abstract.html.

Wang, H., et al., "A signature for content-based image retrieval using a geometrical transform", http://info.acm.org/sigmm/MM98/electronic_proceedings/wang/index.html.
Chang, Shih-Fu, et al., "VideoQ: an automated content based video search system using visual cues", http://info.acm.org/sigmm/MM97/papers/sundaram/acmMM97paper.html.
"Create, Edit, Tag, Multimedia Scenes", The Samoff Multimedia Composition and Authoring Toolkit.
Morikawa et al., "3D Structure Extraction Coding of Image Sequences", Journal of Visual Communication and Image Representation, vol. 2, No. 4, pp. 332-344, Dec. 1991.
Jagadish H.V., "A Retrieval Technique for Similar Shapes", Proceedings of the 1991 ACM SIGMOD International Conference on Management of Data, pp. 208-217, May 1991.
Rabitti et al., "An Approach to Image Retrieval from Large Image Databases", Proceedings of the 10th Annual International ACM SIGIR Conference on Research and Development in Information Retrieval, pp. 284-295, 1987.
Karukonda et al., "Design of a Pictorial Knowledgebase", Proceedings of the 15th Annual Conference on Computer Science, pp. 114-119, Feb. 1987.
Horaud, Radu, "New Methods for Matching 3-D Objects with Single Perspective Views", IEEE Transactions on Pattern Analysis and Machine Intelligence, vol. PAMI-9, No. 3, May 1987.
Musmann et al., "Object-Oriented Analysis-Synthesis Coding of Moving Images", Signal Processing: Image Communication 1, Elsvier Science Publishers B.V., pp. 117-138, 1989.
Haralick et al., "Textural Features for Image Classification", IEEE Transactions on Systems, Man and Cybernetics, vol. SMC-3, No. 6, pp. 610-621, Nov. 1973.
Turk et al., "Eigenfaces for Recognition", Electronic Imaging East Conference, pp. 132-135, 1990.
Turk et al., "Eigenfaces for Recognition", Journal of Cognitive Neuroscience, vol. 3, No. 1, pp. 71-86, Winter 1991.
Besl et al., "Three-Dimensional Object Recognition", Computing Surveys, vol. 17, No. 1, Mar. 1985.
"A signature for content-based image retrieval using a geometrical transform", http://info.acm.org/sigmm/MM98/electronic_proceedings/wang.index.html.
"Adaptive Intelligent Tutoring".
"Artificial perception and music recognition (Lecture notes in artificial intelligence, vol. 746)", http://www.briansbooks.com/catalog/books/0387573941.
"Attrasoft Neural Network Application Software", http://attrasoft.com/.
"Audio Advertisement Recognition", http://www.signalogic.com/ad.sub.--recog.htm.
"Audio Feature Extraction & Analysis for Scene Classification", http://vision.poly.edu: 8080/paper/audio-mmsp.html.
"Bluetooth Specification Emerges As Designers Prep New Products", Wireless Systems Design, Sep. 1999, pp. 8-10.
"Bookmarks for Ben Schouten", http://www.swi.nl/ftp/bens/mdb/book4.html.
"Bulldog at Work", http://www.bulldog.com/BulldogAtWork.html.
"Bulldog Personalities", http://www.bulldog.com/BulldogPersonalities.html.
"Bulldog provides content management application for Sun's storedge media central software platform", http://www.bulldog.com/press/press_release/PressRelease14.html.
"Cisco Develops "Always on" Home Networks", The Andover News Network, http://www. andovernews.com/cgi-bin/news_story.p12107183/topstories Jan. 12, 2000.
"Comparisonics Corporation", http://www.comparisonics.com/corp.html.
"Comparisonics", http://www.comparisonics.com.
"Comparisonics—Applications of Comparisonics", http://www.comparisonics.com/apps.html.
"Comparisonics—Find Audio and Video! See the Audio!",http://www.comparisonics.com/ White Paper.html.
"Comparisonics—Searching Audio and Video by Sound", http://www.comparisonics.com/ search.html.
"Comparisonics—Visualizing Audio by Coloring the Audio Waveform Display", http:// www.comparisonics.com/color.html.

(56) References Cited

OTHER PUBLICATIONS

"Compression ICS Target Digital Cameras", EDN, (Nov. 28, 1991).
"Content based recognition in compressed domain papers", Content Analysis of Compressed Video, Aug. 1996.
"Content based recognition in compressed domain", http://www.dcs.uky.edu/.about.yuan/ compress.html.
"Content-based classification and retrieval of Audio using the nearest feature line method: experimental results", http://markov.eee.ntu.edu.sg:8000/demos/audio/experiments/audio.html.
"Create, Edit, Tag, Multimedia Scenes", The Sarnoff Multimedia Composition and Authoring Toolkit.
"CS.sub.—process.sub.—sample", http://www.comparisonics.com/api.sub.--ps. html.
"CS_compare_signatures", http://www.comparisonics.com/api_cs.html.
"CS_create-sample_processor", http://www.comparisonics.com/api_csp.html.
"CS_get_color", http://www.comparisonics.com/api_gc.html.
"CS_get_signature", http://www.comparisonics.com/api_gs.html.
"CS_process_sample", http://www.comparisonics.com/api_ps.html.
"CUIDAD Working Group MIDEM/99", http://www.ircam.fr/produits/techno/multimedia/ Cuidad/MIDEM_Prese . . /MIDEM_Puig.htm.
"Data Translation/Media 100 to Split Up", Advanced Imaging, pp. 8-9, Sep. 1996.
"Detailed algorithm", http://info.acm.org/sigmm/MM98/electronic.sub.--proceedings/nastar/node8.- html.
"Detailed algorithm", http://info.acm.org/sigmm/MM98/electronic_proceedings/nastar/ node8.html.
"Divx Comment Page", Anti-Divx comment page.
"Edd Canada gets CRTC approval", http://www.emc3.com/news/plugged_in_sum97/ index.html.
"Edd Core Technology—Time & Space Compression", http://emc3.com/edd/ov01.html.
"Emerging, Public, High-Tech Company Chooses Area As New Corp. HQ", Spotlight on Excalibur Technologies; Golden Triangle Business Week, pp. 2 and 3.
"Encryption won't prevent the infringement of DVD disks", EE Times, May 12, 1997, Issue: 953, Techsearch Results.
"Face Recognition DataBlade Module" from Informix and Excalibur Technologies Corporation.
"Fox Digital selects Bulldog as enterprise content management solution to increase production efficiencies and reduce media distribution costs", http://www.bulldog.com/press/press_release/PressRelease15.html.
"Fractal Geometry Compresses Video Images That Have Independent Resolution", EDN, (Nov. 7, 1991):122-123.
"Fractal Image Compression—the Future? Start-up #117", Semiconductor Currents, Nov. 1991.
"Frame Grabber/Imager has the TMS34020 IC", Unknown.
"Gates Wows the Audience with CES Keynote", The Andover News Network, http://www.andovernews.com/cgi-bin/news_story.p12107167/topstories Jan. 12, 2000.
"GK Intelligent Systems—Business Summary".
"Graham-Patten Launches Comparisonics.sup.&trade Sound Matching Software", http://www. gpsys.com/pr0406984.html.
"IBM Unleashes QBIC Image-Content Search", Reprint appeared in The Seybold Report on Desktop Publishing (ISSN 0889-9762), vol. 9, No. 1, Sep. 12, 1994.
"Image Compression Using Fractals and Wavelets"; Final Report for the Phase II Contract Sponsored by the Office of Naval Research, Contract No. N00014-91-C-0117; Jun. 2, 1993.
"Image Recognition for Web Search & Security", Advanced Imaging, p. 9.
"Intelligent Human Machine Interface Considering Interactive Adaptation", Fukudu Labs, http://www.mein.nagona-u.ac.jp/activity/Interactive_Adaption-e.html, Sep. 19, 1996.
"Iterated Systems and Emc.sup.3 sign digital video deal", http://www.emc3.com/news/ plugged_in_sum97/iterated.html.

"Knowledge From The Video Screen", KMWorld, p. 10, Dec. 1998.
"LBSC 878 information storage and retrieval, Spring 1999, Bibliography: retreival from collections of video recordings", http://www.wam.umd.edu/.about.wpuntai/video/VdoBiblio.htm.
"Machine recognition and classification of musical patterns", http://www.es.tut.fi/.about.ilya/ MPR.htm.
"Microway" AD, 1991.
"MOODS: A Popular Description", http://www.des.uky.edu/.about.moods/moods.sub.--popular.html.
"Multimedia Storage and Archiving System", SPIE Proceedings vol. 2916, http://www. spie.org/web/abstract/2900/2916.html.
"Music Sketcher Section Details", http://www.research.ibm.com/mathsci/emc/tutorial/ details.htm.
"Music, Mind, Machine", Smartunes.backslash.Music Mind Machine_files.backslach.dh-95-c.htm.
"Never Miss Anything Again", Starsight Brochure (1994).
"New book on computer music, music cognition and AI", http://landfield.com/faqs/music/ midi/bibliography.section-1.html.
"No Slacking in Silicon Valley", Business Week, Aug. 17, 1998, http://www.tivo.com.
"On-Line Web Photo Search & Handle Capability: Let the Next Round Begin", Jul. 1998, p. 9.
"Open . . . successfully completes first phase of production with Bulldog's leading content management solution", http://www.bulldog.com/press/press_release/PressRelease17.html.
"Optical Computer 'Recognizes' Images in Femtoseconds"; Photonics Spectra, p. 28.
"Oracle8 Visual Information Retrieval Cartridge User's Guide Release 1.0.1", http://www. sch.bme.hu/misc/oracle8/cartridg/a55255/vir_cbr.htm.
"Real-Time Profiling DataBlade Module" from Informix and Excalibur Technologies Corporation.
"Retrieving Semantically Distant Analogies", KSL-94-46.
"Scene Locator", New Media, Nov./Dec. (Nov. 12, 1991).
"SceneChange DataBlade Module" from Informix and Excalibur Technologies Corporation.
"Stephen V. Rice", http://www.isri.unlv.edu/.about.rice/.
"Technique Compresses Images 100:1"; Photonics Spectra, pp. 38 and 40.
"The "Smart" House: Human Factors in Home Automation", Human Factors in Practice (Dec. 1990) 3-36.
"The Audio Research Group", http://www.dcs.gla.ac.uk/.about.arg/.
"The Bulldog Group, Inc.—About the Company", http://www.bulldog.com/AboutTheCompany.html.
"The Comparisonics API Version 2.0", http://www.comparisonics.com/api.html.
"The Daily Double—A review of a company whose stock price has doubled within the last year", Gemstar International Group, http://fnews.yahoo.com/fool/98/09/03/double_980903.
"The Highs and Lows of Nielsen Home Video Index," Marketing & Media Decisions, (Nov. 1985): 84-86.
"The Quest for User Friendly", US News & World Report, (Jun. 13, 1988): 54-56.
"Tuned Into the Web", Byte, Dec. 1996, p. 40.
"Video for Everyone", Jan. 1997 Byte, pp. 59 and 60.
"Visitors to Haskins Laboratories Peter Desain and Henkjan Honing", http://www.haskins. yale.edu/haskings/misc/visitors/beat.html.
"Visual Contextual Awareness in Wearable Computing" Perceptual Computing TR#465, MIT Media Laboratory to appear IEEE ISWC '98, http://testarne.www.media.mit.edu.
"Voice Recognition: Understanding The Master's Voice", PC Magazine, (Oct. 27, 1987): 261-308.
"WebTV Personal TV service gives you ultimate control over what you watch and when you watch it", http://www.webtv.net/products/satellite/ptv.html.
"What is Akoff Music Compser?", http://akoff.hypermart.net/more.html.
8.times.8 Via TV Phone Web Page, 8.times.8.com, Jul. 14, 1997.
9.sup.th International Workshop on Database and Expert Systems Applications, Aug. 26-28, 1998 Vienna, Austria, http://computer.org.proceedings.dexa/8353/8353toc.htm.

(56) References Cited

OTHER PUBLICATIONS

Abedine, Kamran, "An Ergonomically—Improved Control Unit Design", Proceedings of Interface 87 (1987):375-380.
Abedine, Kamran, "Guidelines for Designing Better VCRS", California State Polytechnic University, Pomona, Report No. IME 46.2, (Feb. 4, 1987).
Abedini, Kamran, "An Ergonomically-Improved Control Unit Design", Proceedings of Interface 87, (1987): 375-380.
Adachi, Toshio, et al., "Feature selection for neural network recognition", IEEE, pp. 696-701.
Adalian, Josef, "Microsoft turned on by TV biz".
Adams, Frank, et al., "A parallel network for visual cognition", IEEE Transactions on Neural Networks v 3 n 6 Nov. 1992, pp. 906-922.
ADL '96 "A Forum on Research and Technology Advances in Digital Libraries", Sponsors: NASA Goddard Space Flight Center, National Library of Medicine, The IEEE Computer Society and The Library of Congress.
Adobe Ventures Portfolio, Digimarc Corporation, http://www.adobe.com/aboutadobe/ adobeventures/Digimarc.htm.
Aerospace Electronics, May 17, 1993, pp. 25-28.
Agosti, Bleeker, "Content-Based Retrieval of Multimedia".
Alba-Flores, Rocio, et al., "Content-based Search Prototpye for Image Databases", http://computer.org/conferen/proceed/meta/1999/papers/44/ralba.html.
Alken Mrs Video Conversions (International Video Standards) Jul. 14, 1997.
Allan, James, "Multimodal indexing, retrieval, and browsing: Combining content-based image retrieval with text retrieval", Computer Science Dept. Univ. of Massachusetts, Multimodal IR at UMass.
An, J.M., et al., "Role of domain coverage and consensus in a network of learning and problem solving systems", IEEE, Computer Society, Los Alamitos, CA, USA pp. 443-453.
Anson, Louisa F, "Fractal Image Compression," Byte, (Oct. 1993): 195-202.
Anson, Louisa, et al., "Graphics Compression Technology—A New Method for Image Reproduction Using the Fractal Transform Process", SunWorld, pp. 43-52, Oct. 1991.
Arnold, Michael, et al., "MP3 robust Audio Watermarking".
ATI-TV TV Tuner and video input card for AMC enabled graphics including Video Xpression and 3D Xpression.
Atkinson, Terry, "VCR Programming Making Life Easier Using Bar Codes", The Globe.
Baffet, G.; Charara, A.; Dherbomez, G.; An Observer of Tire—Road Forces and Friction for Active Security Vehicle Systems Mechatronics, IEEE/ASME Transactions on vol. 12, Issue 6, Dec. 2007 pp. 651-661 Digital Object Identifier 10.1109/TMECH.2007.910099.
Bagley, Hal & Sloan, Jeff, "In Pursuit of Perfection", Photonics Spectra, (Aug. 1993): 101-106.
Baines, Sunny, "Optical Correlator Expands Into 3-D Scenes", Electronic Engineering Times, p. 57, Sep. 7, 1998.
Bains, Sunny; "Trained neural network recognized faces"; Laser Focus World; Jun. 1993; pp. 26 and 28.
Bannon, Karen J., "Home Networking System Includes Phone Gear", Inter@ctive Week, Feb. 8, 1999.
Baran, Nicholas, "Fractal Compression Goes On-Line", Byte , (Sep. 1993): 40.
Barnsley, Michael F., "Fractal Image Compression", AK Peters, Ltd., Wellesley, MA.
Bassia, P., et al., "Robust audio watermarking in the time domain".
Becker, Shawn, et al., Semiautomatic 3-D model extraction from uncalibrated 2-D camera views, MIT Media Laboratory.
Beeferman, Doug, "QPD: Query by Pitch Dynamics Indexing Tonal Music by Content", http://bobo.link.cs.cmu.edu/dougb/qpd/doc/html/qpd.html.
Bender, Walter et al, "Newspace: Mass Media and Personal Computing", Usenix Summer 1991 329-348.
Bensch, U, "VPV-Video Text Programs Video Recorder", IEEE, (1988):788-792.

Bindra, Ashok et al, "Ti Leads Five-Firm Parallel-Processing Effort", Electronic Engineering Times, (Dec. 2, 1991): 21-22.
Bindra, Ashok, "Compression Schemes Enhance Video", Electronic Engineering Times, Mar. 31, 1997, pp. 86 and 97.
Bindra, Ashor et al, "TI Leads Five-Firm Parallel-Processing Effort", Electronic Engineering Times, (Dec. 2, 1991): 21-22.
Biography Information for Dave White, "Dave White's Web Page".
Blackburn, Steven, et al., "A Tool for content based navigation of music", ACM Multimedia 98—Electronic Proceedings, http://info.acm.org/sigmm/MM98/electronic_proceedings/blackburn/index.html.
Blum, Thom, et al., "Audio Analysis for Content-Based Retrieval".
Boney, Laurence, et al., "Digital Watermarks for Audio Signals", Dept. of Electrical Engineering, University of Minnesota.
Booney, Paula, "New Word for Windows to Tap 'Smart' Features" PC Week, vol. 10: 1&14 (Mar. 22, 1993).
Bouet, Marinette, et al., "Powerful image organization in visual retrieval systems" ACM Multimedia 98—Electronic Proceedings, http://info.acm.org/sigmm/MM98/electronic_proceedings/bouet/index.html.
Bove, Michael; "Object-Oriented Television" paper submitted SMPTE Journal, Mar. 1995.
Bowen, Ted Smalley, "Transarc and Iona team up for object transaction system", Server, pp. 29 and 30.
Bowen, Ted Smalley, "Web searches to gain smart user interface", InfoWorld.
Breidt, et al., Improved Quasi-Maxium Likelihood Estimation for Stochastic Volatility Models, (1995) Modelling and Prediction: Honoring Seymour Geisser.
Brochure about Excalibur Visual RetrievalWare—Transforming Information into Knowledge.
Brown, Chappell, "Startup Nestor Readies Neural Network-Based Products", EE Times, pp. 1 and 10, Sep. 1, 1986.
Brown, et al., User Models, Intelligent Interface Agents and Expert Systems, (1997) Proceedings of Interface 12-17.
Brown, Martin, et al., "Automatic content-based retrieval of broadcast news", http://svr-www.eng.cam.ac.uk/Research/Projects/vmr/mm95.html.
Brusilovsky, Peter, et al., "Visual annotation of links in adaptive hypermedia", International Center for Scientific and Technical Information, http://www.acm.org/sigchi/ chi95/Electronic/documnts/shortppr/plb_bdy.htm.
Bryant, Adam, "For the Lowly Radio, New Tricks Are in Store", The New York Times, (Feb. 17, 1993): D2L.
Bryant, Adam; "For the Lowly Radio, New Tricks are in Store"; The New York Times, Feb. 17, 1993.
Bui, Venkatesh, et al., Learning other agents' preferences in multi-agent negotiation using the Bayesian classifier, Int.J. Cooperative Inf. Syst. 8(4):275-294(1999).
Burke, Dan, "GomezWire: Online brokers shut out WebTV", http://www.zdii.com.
Burke, Robin, et al., "Intelligent Web Search Engines", PC A1 Jan./Feb. 1997.
Bursky, Dave "Improved DSP ICS Eye New Horizons", Electronic Design, (Nov. 11, 1993):69-82.
Callaghan, Sarah, "Neural Networks and Musical Style Recognition", http://www.geocities.com/CapeCanaveral/2125/project.html.
Cantrell, Tom, "FireWire getting hot", Computer Design, Oct. 1997, p. 81-85.
Card, Stuart, "A Method for Calculating Performance Times for Users of Interactive Computing Systems", IEEE Ch 1424, (Jan. 1979): 653-658.
Carlson, Brian, ""MPEG-7" for Multimedia Searching: Room for Video Content Recognition?".
Carlson, Brian, "Flat Panel X-Ray & Visible Image Capture-Filmless", Advanced Imaging, p. 14.
Carlson, Brian, "The Consumer Desktop Looks at Vision: R&D Directions at Microsoft and MIT", Advanced Imaging, pp. 26 and 28.
Carlson, Mark A, "Design Goals for an Effective User Interface", Human Interfacing with Instruments,:1-4.
Carroll, Paul, "High Tech Gear Draws Ones of Uncle" Wall Street Journal, (Apr. 27, 1988): 29.

(56) References Cited

OTHER PUBLICATIONS

Carter, Robert; "The Business of Technology"; Electronic Engineering Times; Apr. 20, 1992; p. 22.
Carts-Powell, Yvonne, "Photonics East presents broad coverage of security technologies", SPIEWeb, OE Reports, http://www.spie.org/web/oer/Oct./oct96/pepreview.html.
Casaent, David, "Optical Pattern Recognition: for Inspection, Image Enhancement", Photonics Spectra, (1991):130-140.
Cha, Guang-Ho, et al., "Object-oriented retrieval mechanism for semistructured image collections", http://info.acm.org/sigmm/MM98/electronic_proceedings/cha/index.html.
Chalom, Edmond, et al., "Segmentation of frames in a video sequence using motion and other attributes", MIT Media Laboratory.
Chang, Shih-Fu, "Content-Based Image/Video Search, Editing and Watermarketing", http://www.cnmtc.columbia.edu/news/imagesearch.html.
Chang, Shih-Fu, et al., "Finding Images/Video from large distributed information sources Columbia's content-based visual query project", http://www.cs.pitt.ecu/.about.panos/ idm98/Imported/sfchang.html.
Chang, Shih-Fu, et al., "VideoQ: an automated content based video search system using visual cues", http://www.uni-mannheim.dc/acm97/papers/sundaram/acmMM97paper.html; http://info.acm.org/sigmm/MM97/papers/sundaram/acmMM97paper.html.
Chang, Shi-Kuo, et al., "Image information systems: Where do we go from here?", IEEE Transactions on Knowledge and Data Engineering v 4 n 5 Oct. 1992, pp. 431-442.
Chang, Yuh-Lin, et al., "Integraged Image and Speech Analysis for Content-Based Video Indexing", Matsushita Information Technology Laboratory, Panasonic Technologies, Inc., Princeton, NJ.
Chapter 7. Digital Library: content-based retrieval, http://www.cs.sfu.ca/CC365/li/material/ notes.Chap7/Chap7.html.
Cheng, Knowledgescapes: A Probabilistic Model for Mining Tacit Knowledge for Information Retrieval, (2000) Tech. Report http://www.cs.berkeley.edu/njfc/papers/01/keying/.
CIIR-DARPA/PTO Project, Browsing, Discovery and Search in Large Distributed Databases of Complex and Scanned Documents.
Claymon, Deborah, "One to Watch", The Red Herring Magazine, Aug. 1998, http://www.redherring.com.
Cobb, Nathan, "I Dont Get It" The Globe Magazine, (Mar. 25, 1990): 22-29.
Coding of Moving Pictures and Associated Audio, ISO/IEC JTC1/SC29/WG11/N2463, MPEG 98/Atlantic City, MPEG-7 Evaluation Process Document, http://drogo.cselt,stet.it/mpeg/public/w2463.html.
Coding of Moving Pictures and Audio, ISO/IEC JTC1/SC29/WG11 N, MPEG97/Feb. 1997, MPEG-7 FAQs.
Coding of Moving Pictures and Audio, ISO/IEC JTC1/SC29/WG11 N1678, MPEG97/Bristol—Apr. 1997, MPEG-7: Context and Objectives (v.3).
Coding of Moving Pictures and Audio, ISO/IEC JTC1/SC29/WG11 N1920, MPEG97, Fribourg—Oct. 1997, MPEG-7 Requirements Group, http://www.takilab.k.dendai.ac.ip/ .about.kane/mpeg/mpeg-7/.
Coding of Moving Pictures and Audio, ISO/IEC JTC1/SC29/WG11 N2329, Jul. 1998/Dublin, Draft MPEG-7 Evaluation Process Document (Version 3).
Coding of Moving Pictures and Audio, ISO/IEC JTC1/SC29/WG11 N2469, MPEG98, Oct. 1998, Atlantic City, USA, Call for Proposals for MPEG-7 Technology, http://www.darmstadt.gmd.de/mobile.MPEG7/Documents/N2469.html.
Coding of Moving Pictures and Audio, ISO/IEC JTC1/SC29/WG11, MPEG98/N2466, MPEG98/Oct. 1998, Atlantic City, USA, Licensing Agreement for the MPEG-7 Content Set, http://drogo.cselt.stet.it/mpeg/public/w2466.html.
Coding of Moving Pictures and Audio, ISO/IEC JTC1/SC29/WG11, MPEG 98/N2464, Oct. 1998, Atlantic City, USA, MPEG-7 Proposal Package Description (PPD), Requirements Group, http://drogo.eselt.stet.it/mpeg/public/2464.html.
Coding of Moving Pictures and Audio, ISO/IEC JTC1/SC29/WG11, N 1733, MPEG97, Stockholm—Jul. 1997, MPEG-7: Context and Objectives (V.4-Stockholm), http://rtlab.kaist ac.kr/.about.gunhan/MPEG7/mpeg7v4.html.
Coding of Moving Pictures and Audio, ISO/IEC JTC1/SC29/WG11, N1686 MPEG97/ Bristol/Apr. 1997, Report on MPEG-7 Seminar in Bristol, http://drogo.cselt.stet.it/mpeg/ documents/mpeg-7_seminar_summary.htm.
Coding of Moving Pictures and Audio, ISO/IEC JTC1/SC29/WG11, N1735, MPEG97, Jul. 1997/Stockholm, MPEG-7 Applications Document, http://rtlab.kaist.ac.kr/.about.gunhan/ MPEG7/mpeg7app.html.
Coding of Moving Pictures and Audio, ISO/IEC JTC1/SC29/WG11, N2465, MPEG 98/ Oct. 1998/Atlantic City, MPEG-7 Test & Evaluation AHG Meeting, http://drogo.cselt. stet.it/mpeg/public/w2465.html.
Coding of Moving Pictures and Audio, ISO/IEC JTC1/SC29/WG11, N2469, MPEG 98, Oct. 1998, Atlantic City, USA, Call for Proposals for MPEG-7 Technology, http://drogo. cselt.stet.it/mpeg/public/w2469.html.
Coding of Moving Pictures and Audio, ISO/IEC JTC1/SC29/WG11, N2462, MPEG 98, Oct. 1998, Atlantic City, MPEG-7 Applications Document v.7, http://drogo.cselt.stet. it/mpeg/public/w2462.html.
Coding of Moving Pictures and Audio, ISO/IEC JTC1/SC29/WG11, N2461, MPEG 98, Oct. 1998, Atlantic City, USA, MPEG-7 Requirements Document V.7, http://drogo. cselt.stet.it/mpeg/public/w2461.html.
Coding of Moving Pictures and Audio, ISO/IEC JTC1/SC29/WG11, N2460, MPEG 98, Oct. 1998, Atlantic City, USA, MPEG-7:Context and Objectives (version—10 Atlantic City, http://drogo.cselt.stet.it/mpeg/public/w2460.html.
Coding of Moving Pictures and Audio, ISO/IEC JTC1/SC29/WG11, N2460, MPEG98, Oct. 1998/Atlantic City, USA/MPEG-7: Context and Objectives (version—10 Atlantic City), http://drogo.cselt.stet.1t/mpeg/standards/mpeg-7/mpeg-7.htm.
Coding of Moving Pictures and Audio, ISO/IEC JTC1/SC29/WG11/ MPEG 97/N1734, Jul. 1997/Stockholm, Second Draft of MPEG-7 Requirements, http://rtlab.kaist.ac.kr/.about.gunhan/ MPEG7/mpeg7req.html.
Coding of Moving Pictures and Audio, ISO/IEC JTC1/SC29/WG11/ N, MPEG 96/Jul. 1996 Short MPEG-4 description.
Coding of Moving Pictures and Audio, ISO/IEC JTC1/SC29/WG11/ N1578, MPEG97/ Feb. 1997/Sevilla, MPEG-7: Context and Objectives (v.2).
Coding of Moving Pictures and Audio, ISO/IEC JTC1/SC29/WG11/ N1579, MPEG97, Feb. 1997/Seville, MPEG-7 Seminar Announcement.
Coding of Moving Pictures and Audio, ISO/IEC JTC1/SC29/WG11/ N2467, MPEG98, Oct. 1998/Atlantic City, USA, Description of MPEG-7 Content Set, http://drogo. cselt,stet,it/mpeg/public/w2467.html.
Coding of Moving Pictures and Audio, ISO/IEC JTC1/SG239/ WG11 N1686, MPEG97/ "Report on MPEG-7 Seminar in Bristol".
Coding of Moving Pictures and Audio, ISO/JTC1/SC29/WG11/N, MPEG 97/ Feb. 1997, MPEG-7 FAQs.
Coding of Moving Pictures and Autio, ISO/IEC JTC1/SC29/WG11/ N2468, MPEG98/ Oct. 1998, Atlantic City, USA, Distribution of MPEG-7 content set, http://drogo. cselt.stet.it/mpeg/public/w2468.html.
Cohen, Raines, "Full Pixel Search Helps Users Locate Graphics", MacWeek, (Aug. 23, 1993).
Comaford, Christine', "User Responsive Software Must Anticipate Our Needs", PC Week (May 24, 1993).
Common European Newsletter, Multimedia Content Manipulation and Management, Object Tracking for Content-based Functionalities, http://www.esat.kuleuven.ac.be/-konijn/emparis.htm.
Common European Newsletter, Multimedia Content Manipulation and Management, Editorial, http://www.esat.kuleuven.ac.be/-konijn/ed4.htm.
Common European Newsletter, Multimedia Content Manipulation and Management, Motion and Grey-level Based Hierarchical Seg-

(56) References Cited

OTHER PUBLICATIONS mentation of Video Sequences for Content-based Functionalities, http://www.esat.kuleuven.ac.be/-konijn/ccett.htm.
Common European Newsletter, Multimedia Content Manipulation and Mgmt, Special Guest Editorial—Ferran Marques UPC, http://www.esat.kuleuven.ac.be/-konijn/ed-ferran.htm.
Common European Newsletter, Multimedia Content Manipulation and Management, Requirements for Segmenting Content to be Coded Using MPEG-4, http://www.esat.kuleuven.ac.be/-konijn/koenen6.htm.
Common European Newsletter, Multimedia Content Manipulation and Management, Automatic Segmentation of Video Sequences for Video Object Generation, http://www.esat.kuleuven.ac.be/-konijn/hannover1.htm.
Common European Newsletter, Multimedia Content Manipulation and Management, IST Video Analysis Framework, http://www.esat.kuleuven.ac.be/-konijn/cnet.htm.
Common European Newsletter, Multimedia Content Manipulation and Management, Region-based Analysis of Video Sequences for Coding and Feature Extraction, http://www.esat.kuleuven.ac.be/-konijn/gps.htm.
Common European Newsletter, Multimedia Content Manipulation and Management, User Assisted Segmentation of Semantic Objects in Video Sequences, http://www.esat.kuleuven.ac.be/-konijn/teltec.htm.
Common European Newsletter, Multimedia Content Manipulation and Management, Towards Future Image Sequence Manipulation Tools, http://www.esat.kuleuven.ac.be/-konijn/nemesis.htm.
Common European Newsletter, Multimedia Content Manipulation and Management, Object Tracking for Content-based Functionalities, http://www.esat.kuleuven.ac.be/-konijn/upc.htm.
Common European Newsletter, Multimedia Content Manipulation and Management, Extraction of Optical Flow and Stereo by nonlinear diffusion, http://www.esat.kuleuven.ac.be/-konijn/proes.htm.
Common European Newsletter, Multimedia Content Manipulation and Management, 3D-Based Coding of Video Sequences, http://www.esat.kuleuven.ac.be/-konijn/surrey.html.
Common European Newsletter, Multimedia Content Manipulation and Management, Estimation and Compensation of Camera Motion for Segmentation of Moving Objects, http://www.esat.kuleuven.ac.be/-konijn/hannover2.htm.
Common European Newsletter, Multimedia Content Manipulation and Management, Structuring a Video for Compact Visual Representation and Content-based Indexing, http:///www.esat.kuleuven.ac.be/-konijn/irisa.htm.
Common European Newsletter, Multimedia Content Manipulation and Management, Motion Tracking Based on Kalman Filtering for Recursive Spatio-temporal Segmentation and Object Tracking, http://www.esat.kuleuven.ac.be/-konijn/epfl.htm.
Common European Newsletter, Multimedia Content Manipulation and Management, Motion Information Manipulation for Added Functionalities, http://www.esat.kuleuven.ac.be/-konijn/ucl.htm.
Common European Newsletter, Multimedia Content Manipulation and Management, ACcenTS MCM Commission Column, http://www.esat.kuleuven.ac.be/-konijn/EUC7.htm.
Common European Newsletter, Multimedia Content Manipulation and Management, AccenTS MCM Commission Column, http://www.esat.kuleuven.ac.be/-konijn/EUC6.htm.
Common European Newsletter, Multimedia Content Manipulation and Management, MPEG7: The Next of the Family?, http://www.esat.kuleuven,ac.be/.about.konijn/MPEG7.html.
Common European Newsletter, Multimedia Content Manipulation and Management, Editorial, http://www.esat.kuleuven.ac.be/-konijn/ed6.htm.
Conway, William "New Modem Standards Challenge Integrators With Multiple Choices", Computer Technology Review, (Fall 1991) 23-28.
Copy Management in the Digital Era, An AES Workshop at the Audio Engineering Society Convention Amsterdam, May 16-19, 1998, http://diva.eecs.berkeley.edu/.about.linnartz.aes/ main/aes.html.
Corporate Info, http://www.emc3.com/corporate/offices.html.
Corporate Profile for ACTV, Inc.
Costlow, Terry, "Fingerprint ID points to sales", Electronic Engineering Times, Jun. 23, 1997, pp. 49 and 68.
Costlow, Terry, "Hard drives tuned for foray into prime-time TV", Electronic Engineering Times, Dec. 21, 1998, pp. 6, 10.
Costlow, Terry, "IBM' Points a New Way", Electronic Engineering Times, (Oct. 28, 1991):62.
Costlow, Terry, et al., "Copy-protection moves cast new cloud over DVD", EE Times, Sep. 15, 1997, pp. 1 and 4.
Costlow, Terry; "IBM points a new way"; Design.
Coy, Peter, "First, Take a Picture. Now, Squeeeeze It", Business Week, p. 100A, Sep. 30, 1991.
Coyle, Edward, "A system for machine recognition of music patterns".
Crestani, "Adaptive Information Retrieval".
Cruz-Alcazar, Pedro, et al., "A study of grammatical inference algorithms in automatic music composition and musical style recognition", http://gubbio.cs.berkeley.edu/mlpapers/showpaper.doit?60b17c7e42b0a9171386dcc1d260cf48.
CUIDAD Working Group—Mar. 2, 1999.
Cyper, Allen, "Eager: Programming Repetitive Tasks by Example", Advanced Technology Group, Apple Computer, CHI Proceedings '91.
Cypher, Allen, "Video Presentation Eager: Programming Repetitive Tasks by Example", CHI '91 Proceedings, (1991), pp. 445-446.
Damore, Kelley, Fractal compression gets boost from showbiz world. (Total Multimedia Inc., Iterated Systems Inc.'s Poem and TMM Product video compression software and tools), InfoWorld, Dec. 21, 1992, v14, n51, p. 1(2).
Dasgupta, P.; A Multiagent Swarming System for Distributed Automatic Target Recognition Using Unmanned Aerial Vehicles Systems, Man and Cybernetics, Part A, IEEE Transactions on vol. 38, Issue 3, May 2008 pp. 549-563 Digital Object Identifier 10.1109/TSMCA.2008.918619.
Davic's IPR Policy, http://www.davic.org/IPR.htm.
David Salesin biography.
Davis, Andrew W., "Cutting Time to Market by Alliance: Collaboration for Standards-Based A/V Product Development", Advanced Imaging, Jan. 1997, pp. 38-40.
Davis, Frederic E, "A Scripting Language for the Mac One Man's Odyssey", PC Week, (Nov. 11, 1991):142.
De Jesus, Edmund, "Walking, Talking Web", Jan. 1997 Byte 80NA, pp. 1, 2, 4.
De Leon, Autumn, "Can V chips rid your TV of Smut & Violence?", Time Digital.
Deb, et al., Understanding Interactions Among Genetic Algorithm Parameters, (1998) Foundations of Genetic Algorithms 5.
Defining the Database Battleground—An Interview with Informix Software CTO Mike Stonebraker, CommunicationsWeek, Dec. 16, 1996, pp. 15 and 16.
Delis, Vasilis, "Assessing Multimedia Similarity: A Framework for Structure and Motion", http://info.acm.org/sigmm/MM98,electronic_proceedings/delis/index.html.
Dialog 03817580 EI Monthly No. EIP94031234279 Title: Part I: modeling image curves using invariant 3-D object curve models—a path to 3-D recognition and shape estimation from image contours Author: Cohen, Fernand S.; Wang, Jin-Yinu Corporate Source: Drexel Univ, Philadelphia, PA, USA Source: IEEE Transactions on Pattern Analysis and Machine Intelligence v 16 n 1 Jan. 1994, p. 1-12 Publication Year: 1994.
Dialog No. 03798198 EI Monthly No. EIP94021198639 Title: Magnetization reversal in CoPt magnetooptic recording alloys Author: Klenefeld, T.; Kim, W.S.; Valentin, J.; Weller, D. Corporate Source: Univ Duisburg, Duisberg, Ger Conference Title: Proceedings of the 1993 MRS Spring Meeting on Magnetic Ultrathin Films Conference Location: San Francisco, CA, USA Source: Multilayers and Surfaces Materials Research Society Symposium Proceedings v 313

(56) References Cited

OTHER PUBLICATIONS

1993. Publ by Materials Research Society, Pittsburgh, PA, USA. p. 315-319 Publications Year: 1993.

Dialog No. 03810278 EI Monthly No. EIP94021217664 Title: From global to local, a continuum of shape models with fractal priors Author: Venuri, B.C.; Radisavljevic, A. Corporate Source: Univ of Florida, Gainsesville, FL, USA Conference Title: Proceedings of the 1993 IEEE Computer Society Conference on Computer Vision and Pattern Recognition Conference Location: New York, NY, USA Conference Sponsor: IEEE Source: IEEE Computer Vision and Pattern Recognition Proc 1993 IEEE Comput Soc Conf Comput Vision Pattern Recognit 1993. Publ by IEEE, IEEE Service Center, Piscataway, NJ, USA,(IEEE cat n 93CH3309-2). p. 307-313 Publication Year: 1993.

Dialog No. 03810291 EI Monthly No. EIP94021217677 Title: Robust affine invariant matching with application to line features Author: Tsai, Frank C.D. Corporate Source: New York Univ, New York, NY, USA Conference Title: Proceedings of the 1993 IEEE Computer Society Conference on Computer Vision and Pattern Recognition Conference Location: New York, NY, USA Conference Sponsor: IEEE Source: IEEE Computer Vision and Pattern Recognition Proc 1993 IEEE Comput Soc Conf Comput Vision Pattern Recognit 1993. Publ by IEEE, IEEE Servie Center, Piscataway, NJ, USA,(IEEE cat n 93CH3309-2). p. 393-399 Publication Year: 1993.

Dialog No. 03810367 EI Monthly No. EIP94021217753 Title: Model-based invariants for 3D vision Author: Weinshall, D. Corporate Source: Hebrew Univ of Jerusalem, Jerusalem, Ist Conference Title: Proceedings of the 1993 IEEE Computer Society Conference on Computer Vision and Pattern Recognition Conference Location: New York, NY, USA Conference Sponsor: IEEE Source: IEEE Computer Vision and Pattern Recognition Proc 1993 IEEE Comput Soc Conf Comput Vision Pattern Recognit 1993. Publ by IEEE, IEEE Service Center, Piscataway, NJ, USA,(IEEE cat n 93CH3309-2). p. 695-696 Publication Year: 1993.

Dialog No. 03854639 EI Monthly No. EIP94051281744 Title: Competitive neural network for affine invariant pattern recognition Author: Kurogi, Shulchi Corporate Source: Kyushu Inst of Technology, Kitakyushu, Jpn Conference Title: Proceedings of 1993 International Joint Conference on Neural Networks. Part 1 (or 3). Conference Location: Nagoya, Jpn Conference Sponsor: ENNS; INNS; IEEE; SICE; IEICE; et al Source: Proceedings of the International Joint Conference on Neural Networks v 1 1993. Publ by IEEE, IEEE Service Center, Piscataway, NJ, USA,93CH3353-0. p. 181-184. Publication Year: 1993.

Dialog No. 03854641 EI Monthly No. EIP94051281746 Title: Segmentation method of texture image by using neural network Author: Oe, Shunichiro; Hashida, Masaharu; Shinohara, Yasunori Corporate Source: Univ of Tokushima, Tokushima, Jpn Conference Title: Proceedings of 1993 International Joint Conference on Neural Networks, Part 1 (or 3) Conference Location: Nagoya, Jpn Conference Sponsor: ENNS; INNS; IEEE; SICE; IEICE; et al Source: Proceedings of the International Joint Conference on Neural Networks v 1 1993, Publ by IEEE, IEEE Service Center, Piscataway, NJ, USA,93CH3353-0. p. 189-192 Publication Year: 1993.

Dialog No. 0310278 EI Monthly No. EIP94021217664 Title: From global to local, a continuum of shape models with fractal priors Author: Vemuri, B.C.; Radisavljevic, A. Corporate Source: Univ of Florida, Gainesville, FL, USA Conference Title: Proceedings of the 1993 IEEE Computer Society on Computer Vision and Pattern Recognition Conference Location: New York, NY, USA Conference Sponsor: IEEE Source: IEEE Computer Vision and Pattern Recognition Proc 1993 IEEE Comput Soc Conf Comput Vision Pattern Recognit 1993. Publ by IEEE, IEEE Service Center, Piscataway, NJ, USA, (IEEE cat n 93CH3309-2). pp. 307-313 Publication Year: 1993.

Dialog No. 03730066 EI Monthly No. EIP93121161511 Title: Multi-target tracking in dense threat environments Author: Toomarian, Nikzad Corporate Source: California Inst of Technology, Pasadena, CA, USA Source: Computer & Electrical Engineering v 19 n 6 Nov. 1993. pp. 469-479 Publication Year: 1993.

Dialog No. 03747408 EI Monthly No. EIP93111125364 Title: Fractal neutron optics multilayers in cantor ternary set pattern Author: Maaza, M.; Pardo, B.; Megademini, T. Corporate Source: Commissaria; a l'Energie Atomique-Centre National de la Recherche Scientifique, Gif-sur-Yvente, Fr Source: Journal of Applied Crystallography v 26 pt 4 Aug. 1, 1993. pp. 519-524 Publication Year: 1993.

Dialog No. 03750577 EI Monthly No. EIP93111131815 Title: Fractal precision models of lathe-type turning matchines Author: Tumer, Irem Y.; Srinlvasen, R.L.; Wood, Kristin L.; Busch-Vishniac, Ilene Corporate Source: Univ of Texas, Austin, TX, USA Conference Title: Proceedings of the 19th Annual ASME Design Automation Conference. part 2 (of 2) Conference Location: Albuquerque, NM, USA Conference Sponsor: ASME, The Design Engineering Division Source: Advances in Design Automation American Society of Mechanical Engineers, Design Engineering Division (Publication) DE v 65 pt 2 1993. Publ by ASME, New York, NY, USA. pp. 501-513 Publication Year, 1993.

Dialog No. 03751707 EI Monthly No. EIP93111134256 Title: Computer art representing the behavior of the Newton-Raphson method Author: Walter, David John Corporate Source: Nanyang Technological Univ, Singapore Source: Computers & Graphics (Pergamon) v 17 n 4 Jul.-Aug. 1993. pp. 487-488 Publication Year: 1993.

Dialog No. 03755356 EI Monthly No. EIP93121139068 Title: Realistic phase distributions derived from the Wigner function Author: Bandiilla, A.; Ritze, H.H. Corporate Source: Univ Berlin, Berlin, Ger Source: Journal of the European Optical Society Part B: Quantum Optics v 5 n 4 Aug. 1993. pp. 213-222 Publication Year: 1993.

Dialog No. 03758542 EI Monthly No. EIP93121144140 Title: Implications of the user's informatoin processing strategy on the design of decision aids for complex systems Author: Matthews, Michael L.; McFadden, Sharon M. Corporate Source: Univ of Guelph. Ont. Can Conference Title: Proceedings of the 37th Annual Meeting the Human Factors and Ergonomics Society Conference Location: Seattle, WA, USA Source: Designing for Diversity Proceedgins of the Human Factors and Ergonomics Society v 1 1993. publ by Human Factors and Ergonomics Society, Inc., Santa Monica, CA, USA. pp. 358-362 Publication Year: 1993.

Dialog No. 03759087 EI Monthly No. EIP93111136171 Title: Chaos and fractal algorithms applied to signal processing and analysis Author: Handley, J.W.; Jaerusch, H.M.; Bjork, C.A.; Richardson, L.T.; Carruth, R.T. Corporate Source: Univ of Alabama in Huntsville, Huntsville, AL, USA Source: Simulation v 60 n 4 Apr. 1993. pp. 261-279 Publication Year: 1993.

Dialog No. 03759968 EI Monthly No. EIP93111136890 Title: Face recognition: Features versus templates Author: Brunelli, Roberto; Poggio, Tomaso Corporate Source: Instinuito per la Ricerez Scientifica e Tecnologica, Trento, Italy Source: IEEE Transactions on Pattern Analysis and Machine Intelligence v 15 n 10 Oct. 1993. pp. 1042-1052 Publication Year: 1993.

Dialog No. 03763234 EI Monthly No. EIP93121145940, Title: Pattern recognition properties of various features spaces for higher order neural networks, Author: Schmidt, William A. C.; Davis, John P., Corporate Source: Naval Air Development Cent Mission and Avionics Technology Dep, Warminster PA, USA, Source: IEEE Transactions on Pattern Analysis and Machine Intelligence v 15 n 8 Aug. 1993. pp. 795-801, Publication Year: 1993.

Dialog No. 03765361 EI Monthly No. EIP93071030657 Title: Investigating facial verification systems using backpropagation neural networks Author: Payne, Tanya L.; Solheim, Inger, Castain, Ralph Corporate Source: Los Alamos Natl Lab, Los Alamos, NM, USA Conference Title: Proceedings of the 3rd Workshop on Neural Networks: Academic/Industrial/NASA/Defense Conference Location: Alabama, AL, USA Conference Sponsor: Auburn University Space Power Institute; Center for Commercial Development of Space Power and Advanced Electronics; NASA Headquarter Source: Proceedings of SPIE—The International Society for Optical Engineering v 1721 1993. Publ by Society of Photo-Optical Instrumentation Engineers, Bellingham, WA, USA. pp. 340-344 Publication Year: 1993.

(56) References Cited

OTHER PUBLICATIONS

Dialog No. 03765362 EI Monthly No. EIP93071030658 Title: Neural net based 2D-vision system for real-time applications Author: Reddy, O.N.; Valthilingham, S.; Bean, W.C. Corporate Source: Lamar Univ, Beaumont, TX, USA Conference Title: Proceedings of the 3rd Workshop on Neural Networks: Academic/Industrial/NASA/ Defense Conference Location: Alabama, AL, USA Conference Sponsor: Auburn University Space Power Institute; Center for Commercial Development of Space Power and Advanced Electronics; NASA Headquarters Source: Proceedings of SPIE—The International Society for Optical Engineering v 1721 1993. Publ by Society of Photo-Optical Instrumentation Engineers, Bellingham, WA, USA. pp. 345-348 Publication Year: 1993.
Dialog No. 03765834 EI Monthly No. EIP93101115999 Title: Improved electro-optical target detection in a natural fractal environment Author: Cohen, G.; Reina, G.; Tidhar, Gil; Rotman, Stanley R. Corporate Source: Ben-Gurion Univ. of the Negev, Beer-Sheva, Isr Conference Title: 8th Meeting on Optical Engineering in Israel: Optical Engineering and Remote Sensing Conference Location: Tel Aviv, Isr Conference Sponsor: SPIE—International Soc for Opt Engineering, Bellingham, WA USA; Int Commission for Optics; European Optical Soc; Optical Soc of America: Asia-Pacific Optics Federation Source: Proceedings of SPIE—The International Society for Optical Engineering v 1971 1993. Publ by Society of Photo-Optical Instrumentation Engineers, Bellingham, WA, USA, pp. 78-92 Publication Year: 1993.
Dialog No. 037681138 EI Monthly No. EIP3121154399 Title: 2 plus 3 model; fractal processes for knowledge-based engineering design Author: Chen, Q. Corporate Source: Dalian Univ of Technology, Dalian, China Source: Cybernetics and Systems v 24 n 5 Sep.-Oct. 1993. pp. 419-440 Publication Year: 1993.
Dialog No. 03769393 EI Monthly No. EIP93121154226 Title: Outdoor landmark recognition using fractal based vision and neural networks Author: Luo, Ren C.; Potlapalli, Harsh; Hislop, David W. Corporate Source: North Carolina State Univ, Raleigh, NC, USA Conference Title: Proceedings of the IEEE/RSJ International Conference on Intelligent Robots and Systems Conference Location: Yokchama, Jpn Conference Sponsor: IEEE Industrial Electronics Society, IEEE Robotics and Automation Society; Robotics Society of Japan (RSJ); Society of Instrument and Control Engineer (SICE); New Technology Foundation Source: 1993 International Conference on Intelligent Robots and Systems 1993. Publ by IEEE, IEEE Service Center, Piscataway, NJ, USA, (IEEE cat n 93CH3213-6). pp. 612-618 Publication Year: 1993.
Dialog No. 03770066 EI Monthly No. EIP93121161511, Title: Multi-target tracking in dense threat environments, Author: Toomarian, Nikzad, Corporate Source: California Inst of Technology, Pasadena, CA, USA, Source: Computers & Electrical Engineering v 19 n 6 Nov. 1993. pp. 469-479 Publication Year: 1993.
Dialog No. 03770270 EI Monthly No. EIP93121161716, Title: Recognition and inspection of manufactured parts using line moments of their boundaries, Author: Wen, Wei; Lozzi, Andrei, Corporate Source: Univ of Sydney, Sydney, Aust, Source: Pattern Recognition v26 n 10 Oct. 1993. pp. 1461-1471, Publication Year: 1993.
Dialog No. 03770294 EI Monthly No. EIP93121161740, Title: New linear systolic arrays for the string comparison algorithm, Author: Gusev, Marjan; Evans, David J., Corporate Source: Univ ;48 Kiril i Metodij' of Skopje, Skopje, Macedonia, Source: Parallel Computing v 19 n 10 Oct. 1993. pp. 1177-1193, Publication Year: 1993.
Dialog No. 03771133 EI Monthly No. EIP93121160707 Title: Proceedings of the Graphics Interface Author: Anen (Ed.) Conference Title: Proceedings of the Graphics Interface Conference Location: Toronto, Ont, Can Source: Proceedings—Graphics Interface 1993. Publ by Canadian Information Processing Soc, Toronto, Ont, Can. 263p. Publication Year: 1993.
Dialog No. 03773364 EI Monthly No. EIP94011166633 Title: High confidence visual recognition of persons by a test of statistical independence Author: Daugman, John G. Corporate Source: Cambridge Univ. Cambridge, Engl Source: IEEE Transactions on Pattern Analysis and Machine Intellignece v 15 n 11 Nov. 1993. pp. 1148-1161 Publication Year: 1993.
Dialog No. 03773367 EI Monthly No. EIP94011166696 Title: Texture classification by wavelet packet signatures Author: Laine, Andrew; Fan, Nan Corporate Source: Univ of Florida, Gainesville, FL., USA Source: IEEE Transactions on Pattern Analysis and Machine Intelligence v 15 n 11 Nov. 1993. pp. 1186-1191 Publication Year: 1993.
Dialog No. 03780009 EI Monthly No. EIP93121138971, Title: Metal/coating/electrolyte interfacial impedance and its global fractal model, Author: Hubrecht, J.; Embrechts, M.; Bogzerts, W. Corporate Source: Katholieke Univ Leuven, Heverlee, Belg, Conference Title: Proceedings of the Second International Symposium on Electrochemical Impedance Spectroscopy, Conference Location: Berling, Ger, Source: Electrochimica Acta v 38 n 14 Oct. 1993, pp. 1867-1875, Publication Year: 1993.
Dialog No. 03780159 EI Monthly No. EIP94011171743 Title: Sens-perceptor: Image based evidence formation model as a logical sensor for robot hand preshaping Author: Nazlibilek, L.; Erkmen, A.; Erkmen, I. Corporate Source: Middle East Technical Univ, Ankara, Turk Conference Title: Proceedings of the 1993 IEEE International Symposium on Intelligent Control Conference Location: Chicago, IL, USA Conference Sponsor: IEEE Control Systems Society Source: Proc 1993 IEEEE Int Symp Intell Control 1993. Publ by IEEE, IEEE Service Center, Piscataway, NJ, USA(IEEE cat n 93CH3278-9). pp. 326-331 Publication Year: 1993.
Dialog No. 03780174 EI Monthly No. EIP94011171758 Title: Barnet: A new approach to behavior arbitration Author: Yavnai Corporate Source: Rafael, Haifa, Isr Conference Title: Proceedings of the 1993 IEEE International Symposium on Intelligent Control Conference Location: Chicago, IL, USA Conference Sponsor: IEEE Control Systems Society Source: Proc 1993 IEEE Int Symp Intell Control 1993. Publ by IEEE, IEEE Service Center, Piscataway, NJ, USA, (IEEE cat n 93CH3278-9). pp. 417-422 Publication Year: 1993.
Dialog No. 03782823 EI Monthly No. EIP94011185543 Title: Fractal analysis of fracture patterns using the standard box-counting technique: valid and invalid methodologies Author: Walsh, J.J.; Waterson, J. Corporate Source: Univ of Liverpool, Liverpool, Engl Source: Journal of Structural Geology v 15 n 12 Dec. 1993. pp. 1509-1512 Publication Year: 1993.
Dialog No. 03795505 EI Monthly No. EIP94021200624 Title: Fractal image coding: a review Author: Jacquin, Arnand E. Corporate Source: AT&T Bell Lab, Murray Hill, NJ, USA Source: Proceedings of the IEEE v 81 n 10 Oct. 1993. pp. 1451-1465 Publication Year: 1993.
Dialog No. 03798198 EI Monthly No. EIP94021198639 Title: Magnetization reversal in CoPt magnetoopic recording alloys Author: Klenefeld, T.; Kim, W.S.; Valentin, J.; Weller, D. Corporate Source: Univ Duisburg, Duisburg Ger Conference Title: Proceedings of the 1993 MRS Spring Meeting on Magnetic Ultrathin Films Conference Location: San Francisco, CA, USA Source: Multilayers and Surfaces Materialse Research Society Symposium Proceedings v 313 1993. Publ by Materials Rsearch Society, Pittsburgh, PA, USA. pp. 315-319 Publication Year 1993.
Dialog No. 03803851 EI Monthly No. EIP94021215641 Title: Fractal modeling techniques for spatial data Author: Gregorski, Mark E.; Jensen, Olivia Corporate Source: Univ of Waterloo, Waterloo, Ont, Can Source: IEEE Transactions on Geoscience and Remote Sensing v 31 n 5 Sep. 1993. pp. 980-988. Publication Year: 1993.
Dialog No. 03807554 EI Monthly No. EIP94021216087 Title: VLSI architecture for polygon recognition Author: Sastry, Raghu; Ranganthan, N.; Bunka, Horst Corporate Source: Univ. of South Florida, Tampa, FL, USA Source: IEEE Transactions on Very Large Scale Integration (VLSI) Systems v 1 n 4 Dec. 1993. pp. 398-407 Publication Year: 1993.
Dialog No. 03810232 EI Monthly No. EIP94021217618 Title: IEEE Computer Vision and Pattern Recognition Author: Anon(Ed.) Conference Title: Proceedings of the 1993 IEEE Computer Society Conference on Computer Vision and Pattern Recognition Conference Location: New York, NY, USA, Conference Sponsor: IEEE Source: IEEE Computer Vision and Pattern Recognition Proc 1993

(56) References Cited

OTHER PUBLICATIONS

IEEE Comput Soc Conf Comput Vision Pattern Recognit 1993. Publ by IEEE, IEEE Service Center, Piscataway, NJ, USA, (IEEE cat n 93CH3309-2) 801p. Publication Year: 1993.
Dialog No. 03810250 EI Monthly No. EIP94021217636 Title: Efficient recognition of rotationally symmetric surfaces and straight homogeneous generalized cylinders Authors: Liu, Jane; Mundy, Joe; Forsyth, David; Zisserman, Andrew; Rothwell, Charlie Corporate Source: GE Cent for Research and Development, Schenectady, NY, USA Conference Title: Proceedings of the 1993 IEEE Computer Society Conference on Computer Vision and Pattern Recognition Conference Location Proc 1993 IEEE Comput Soc Conf Comput Vision Pattern Recognit 1993. Publ by IEEE, IEEE Service Center, Piscataway, NJ, USA, (IEEE cat n 93CH3309-2). pp. 123-128 Publication Year: 1993.
Dialog No. 03810264 EI Monthly No. EIP94021217650 Title: On the recognition of occluded shapes and generic faces using multiple-template expansion matching Author: Ben-Arie, Jezekjel; Rao, K. Raghunath Corporate Source: Illinois Inst of Technology, Chicago, IL, USA Conference Title: Proceedings of the 1993 IEEE Computer Society Conference on Computer Vision and Pattern Recognition Conference Location: New York, NY, USA Conference Sponsor: IEEE Source: IEEE Computer Vision and Pattern Recognition Proc 1993 IEEE Comput Soc Conf Vision Pattern Recognit 1993. Publ by IEEE, IEEE Service Center, Piscataway, NJ, USA, (IEEE cat n 93CH3309-2). pp. 214-219 Publication Year: 1993.
Dialog No. 03810278 EI Monthly No. EIP94021217664, Title: From global to local, a continuum of shape models with fractal priors, Author: Vemuri, B.C.; Radisavljevic, A., Corporate Source: Univ of Florida, Gainesville, FL, USA, Conference Title: Proceedings of the 1993 IEEE Computer Society Conference on Computer Vision and Pattern Recognition, Conference Location: New York, NY, USA, Conference Sponsor: IEEE, Source; IEEE Computer Vision and Pattern Recognition Proc 1993 IEEE Comput Soc Conf Comput Vision Pattern Recognit 1993. Publ by IEEE, IEEE Service Center, Piscataway, NJ, USA, (IEEE cat n 93CH3309-2), pp. 307-313 Publication Year: 1993.
Dialog No. 03810291 EI Monthly No. EIP94021217677 Title: Robust affine invariant matching with application to line features Author: Tsai, Frank C.D. Corporate Source: New York Univ, New York, NY, USA Conference Title: Proceedings of the 1993 IEEE Computer Society Conference on Computer Vision and Pattern Recognition Conference Location: New York, NY, USA Conference Sponsor: IEEE Source: IEEE Computer Vision and Recognition Proc 1993 IEEE COmput Soc Conf Comput Vision Pattern Recognit 1993. Publ by IEEE, IEEE Service Center, Piscataway, NJ, USA, (IEEE cat n 93CH3309-2). pp. 393-399 Publication Year: 1993.
Dialog No. 03810367 EI Monthly No. EIP94021217753 Title: Model-based invariants for 3D vision Author: Weinshall, D. Corporate Source: Hebrew Univ of Jerusalem, Jerusalem, Isr Conference Title: Proceedings of the 1993 IEEE Computer Society Conference on Computer Vision and Pattern Recognition Conference Location: New York, NY, USA Conference Sponsor: IEEE Source: IEEE Computer Vision and Pattern Recognition Proc 1993 IEEE Comput Soc Conf Comput Vision Pattern Recognit 1993. Publ by IEEE, IEEE Service Center, Piscataway, NJ, USA,(IEEE cat n 93CH3309-2). pp. 695-696 Publication Year: 1993.
Dialog No. 03810848 EI Monthly No. EIP94021207991 Title: retrieval of forest spatial pattern from SAR images Author: Ranson, K. Jon; Sun, Guoqing Corporate Source: Goddard Space Flight Center, Greenbelt, MD, USA Conference Title: Proceedings of the 13th Annual International Geoscience and Remote Sensing Symposium Conference Location: Tokyo, Jpn Conference Sponsor: IEEE: The Institute of Electronics, Information, and Communication Engineers of Japan; Union Radio Scientifique Internationale Source: International Geoscience and Remote Sensing Symposium (IGARSS) v 3 1993. Publ by IEEE, IEEE Service Center, Piscataway, NJ, USA,(IEEE cat n 93CH3294-6). pp. 1213-1215 Publication Year: 1993.
Dialog No. 03812580 EI Monthly No. EIP94031234279 Title: Part I: modeling image curves using invariant 3-D object curve models-a path to 3-D recognition and shape estimation from image contours Author: Cohen, Fernand S.; Wang, Jin-Yinu Corporate Source: Drexel Univ, Philadelphia, PA, USA Source: IEEE Transactions on Pattern Analysis and Machine Intelligence v 16 n 1 Jan 1994. pp. 1-12 Publication Year: 1994.
Dialog No. 03817787 EI Monthly No. EIP94031234613 Title: Lalpacian and orthogonal wavelet pyramid decompositions in coarse-to-fine registration Author: Allen, Ronald L.; Kamangar, Farhad, A.; Stokely, Ernest M. Corporate Source: Univ of Texas at Arlington, TX, USA Source: IEEE Transactions on Signal Processing v41 n 12 Dec. 1993. pp. 3536-3541 Publication Year: 1993.
Dialog No. 03819787 EI Monthly No. EIP93121145108 Title: Object tracking through adaptive correlation Author: Montera, Dennis A.; Rogers, Steven, K.; Ruck, Dennis W.; Oxley, Mark E. Corporate Source: Air Force Inst. of Technology, Wright-Patterson AFB, OH, USA Conference Title: Optical Pattern Recognition IV Conference Location: Orlando, FL, USA Conference Sponsor: SPIE—Int Soc for Opt Engineering, Bellingham, WA USA Source: Proceedings of SPIE—The International Society for Optical Engineering v 1959 1993. Publ by Society of Photo-Optical Instrumentation Engineers, Bellingham, WA, USA. pp. 314-321. Publication Year: 1993.
Dialog No. 03826583 EI Monthly No. EIP94031243260 Title: Planar three-line junction perspective problem with application to the recognition of polygonal patterns Author: Caglioti, Vincezo Corporate Source: Politecnico di Milano, Milano, Italy Source: Pattern Recognition v 26 n 11 Nov. 1993. pp. 1603-1618 Publication Year: 1993.
Dialog No. 03829823 EI Monthly No. EIP94041253516 Title: Analysis of radial core experiments for hydrochloric acid interaction with limestones Author: Frick, T.P.; Mostofizadeh, Rebdokht; Economides, M.J. Corporate Source: Mining Univ Leoben, Leoben, Austria Conference Title: Proceedings of the International Symposium on Formation Damage Control Conference Location: Lafayette, LA, USA Source: Proceedings—SPE International Symposium on Formation Damage control 1994, Pub by Society of Petroleum Engineers (SPE), Richardson, TX, USA. p. 577. 592 Publication Year: 1994.
Dialog No. 03839591 EI Monthly No. EIP94041264411 Title: Fractal characteristics of mesofractures in compressed rock specimens Author: Zhao, Yonghong; Huang, Jiefan; Wang, Ren Corporate Source: Peking Univ, Beijing, China Conference Title: Proceedings of the 34th U.S. Symposium on Rock Mechanics Conference Location: Madison, WI, USA Source: International Journal of Rock Mechanics and Mining Science & Mechanics Geomechanics Abstracts v 30 n Dec. 7. 1993. pp. 877-882 Publication Year: 1993.
Dialog No. 03847362 EI Monthly No. EIP94041265976 Title: Systemized serendipity for producing computer art Author: Walter, David Corporate Source: Imperial Coll of Science, Technology and Medicine, London, UK Source: Computers & Graphics (Pergamon) v 17 n 6 Nov.-Dec. 1993. pp. 699-700 Publication Year: 1993.
Dialog No. 03854639 EI Monthly No. EIP94051281744 Title: Competitive neural network for affine invariant pattern recognition Author: Kurogi, Shuichi Corporate Source: Kyushu Inst of Technology, Kitakyushu, Jpn Conference Title: Proceedings of 1993 International Joint Conference on Neural Networks. Part 1 (of 3) Conference Location: Nagoya, Jpn Conference Sponsor: ENNS; INNS; IEEE; SCIE; IEICE; et al Source: Proceedings of the International Joint Conference on Neural Networks v 1993. Publ by IEEE, IEEE Service Center, Piscataway, NJ, USA 93CH3353-0. pp. 181-184. Publication Year: 1993.
Dialog No. 03854641 EI Monthly No. EIP94051281746 Title: Segmentation method of texture image by using neural network Author: Oe, Shunichiro; Hashida, Masaharu; Shinohara, Yasunori Corporate Source: Univ of Tokushima, Tokushima, Jpn Conference Title: Proceedings of 1993 International Joint Conference on Neural Networks. Part 1 (of 3) Conference Location: Nagoya, Jpn Conference Sponsor: ENNS; INNS; IEEE; SICE; IEICE; et al Source: Proceedings of the International Joint Conference on Neural Networks v 1 1993. Publ by IEEE, IEEE Service Center, Piscataway, NJ, USA,93CH3353-0. pp. 189-192 Publication Year: 1993.

(56) References Cited

OTHER PUBLICATIONS

Dialog No. 03854872 EI Monthly No. EIP94051281977 Title: Network model for invariant object recognition and rotation angle estimation Author: You, Shingchern, D.; Ford, Gary E. Corporate Source: Univ of California, Davis, CA, USA Conference Title: Proceedings of 1993 International Joint Conferenceon Neural Networks. Part 3 (of 3) Conference Location: Nagoya, Jpn Conferenc Sponsor: ENNS; INNS; IEEE; SICE; IEICE; et al Source: Proceedings of the International Joint Conference on Neural Networks v 3 1993. Publ by IEEE, IEEE Service Center, Piscataway, NJ, USA. 93CH3353-0. pp. 2145-2148 Publication Year: 1993.

Dialog No. 03854884 EI Monthly No. EIP94051281989, Title: Texture classification using a two-stage neural network approach, Author: Raghu, P.P.; Poongodi, R.; Yegnanarayana, B., Corporate Source: Indian Inst of Technology, Madras, India, Conference Title: Proceedings of 1993 International Joint Conference on Neural Networks. Part 3 (of 3), Conference Location: Nagoya, Jpn, Conference Sponsor: ENNS, INNS; IEEE; SICE; IEICE; et al, Source: Proceedings of the International Joint Conference on Neural Networks v 3 1993. Publ by IEEE, IEEE Service Center, Piscataway, NJ, USA, 93CH3353-0. pp. 2195-2198, Publication Year: 1993.

Dialog No. 03855007 EI Monthly No. EIP94051282111 Title: Waveform recognition and classification using an unsupervised network Author: Lee, C.K.; Yeung, K.F. Corporate Source: Hong Kong Polytechnic, Hung Hom, Hong Kong Conference Title: Proceedings of 1993 International Joint Conference on Neural Networks. Part 3 (of 3) Conference Location: Nagoya, Jpn Conference Sponsor: ENNS; INNS; IEEE; IEICE; et al Source: Proceedings of the International Joint Conference on Neural Networks v 3 1993. Publ by IEEE, IEEE Service Center, Piscataway, NJ, USA. 93CH3353-0. pp. 2710-2713 Publication Year: 1993.

Dialog No. 03855870 EI Monthly No. EIP94051282331 Title: Correlation effects of fractal compression Author: Sirgany, Wajie N.; Mazel, David S. Corporate Source: IBM Federal Systems Co, Manaesas, VA, USA Corporate Source: Proceedings of the 27th Asilomar Conference on Signals, System & Computers Conference Location: Pacific Grove, CA, USA Conference Sponsor: IEEE Computer Society Press; Naval Postgraduate School; San Jose State university Source: Conference Record of the Asilomar Conference on Signals, Systems & Computers v 2 1993. Publ by IEEE, Computer Society Press, Los Alamitos, CA, USA. pp. 1524-1528 Publication Year: 1993.

Dialog No. 03747408 EI Monthly No. EIP93111125364 Title: Fractal neutron optics multilayers in cantor ternary set pattern Author: Maaza, M.; Panto, B.; Megadademini, T. Corporate Source: Commissarial a l'Energie Atomique-Centre NAtional de la Recherche Scientifique, Gif-sur-Yvene, Fr Source: Journal of Applied Crystallography v 26 pt 4 Aug. 1, 1993. p. 519-524 Publication Year: 1993.

Dialog No. 03750577 EI Monthly No. EIP93111131815 Title: Fractal precision models of lathe-type turning machines Author: Tumer, Irem Y.; Srinivasan, R.S.; Wood, Kristin L.; Busch-Vishniac, Ilene Corporate Source: Univ of Texas, Austin, TX, USA Conference Title: Proceedings of the 19th Annual ASME Design Automation Conference, part 2 (of 2) Conference Location: Albuquerque, NM, USA Conference Sponsor: ASME, the Design Engineering Division Source: Advances in Design Automation American Society of Mechanical Engineers, Design Engineering Division (Publication) DE v 65 pt 2 1993. Publ by ASME, New York, NY, USA. p. 501-513 Publication Year: 1993.

Dialog No. 03751707 EI Monthly No. EIP93111134256 Title: Computer art representing the behavior of the Newton-Raphson method Author: Walter, David John Corporate Source: Nanyang Technological Univ, Singapore Source: Computers & Graphics (Pergamon) v 17 n 4 Jul.-Aug. 1993. p. 487-488 Publication Year: 1993.

Dialog No. 03755356 EI Monthly No. EIP3121139068 Title: Realistic phase distributions derived from the Wigner function Author: Bandilla, A.; Ritze, H.H. Corporate Source: Univ Berlin, Berlin, Ger Source: Journal of the European Optical Society Part B: Quantum Optics v 5 n 4 Aug. 1993. p. 213-222 Publication Year: 1993.

Dialog No. 03758542 EI Monthly No. EIP93121144140 Title: Implications of the user's information processing strategy on the design of decision aids for complex systems Author: Matthews, Michael L.; McFadden, Sharon M. Corporate Source: Univ of Guelph. Guelph. Ont. Can Conference Title: Proceedings of the 37th Annual Meeting the Human Factors and Ergonomics Society Conference Location: Seattle, WA, USA Source: Designing for Diversity Proceedings of the Human Factors and Ergonomics Society v 1 1993. Publ by Human Factors and Ergonomics Society, Inc., Santa Monica, CA, USA. p. 358-362 Publication Year: 1993.

Dialog No. 03759087 EI Monthly No. EIP93111136171 Title: Chaos and fractal algorithms applied to signal processing and analysis Author: Handley, J.W.; Jaerusch, H.M.; Bjork, C.A.; Richardson, L.T.; Carruth, R.T. Corporate Source: Univ of Alabama in Huntsville, Huntsville, AL, USA Source: Simulation v 60 n 4 Apr. 1993. p. 261-279 Publication Year: 1993.

Dialog No. 03759968 EI Monthly No. EIP93111136890 Title: Face recognition: Features versus templates Author: Brunelli, Roberto; Poggio, Tomaso Corporate Source: Istituto per la Recercz Scientifica e Tecnologica, Trento, Italy Source: IEEE Transactions on Pattern Analysis and Machine Intelligence v 15 n 10 Oct. 1993. p. 1042-1052 Publication Year: 1993.

Dialog No. 03763234 EI Monthly No. EIP93121145940 Title: Pattern recognition properties of various feature spaces for higher order neural networks Author: Schmidt, William A. C.; Davis, John P. Corporate Source: Naval Air Development Cent Mission and Avionics Technology Dep, Warminster, PA, USA Source: IEEE Transactions on Pattern Analysis and Machine Intelligence v 15 n 8 Aug. 1993. p. 795-801 Publication Year: 1993.

Dialog No. 03765361 EI Monthly No. EIP93071030657 Title: Investigating facial verification systems using backpropagation neural networks Author: Payne, Tanya L.; Solheim, Inger; Castain, Ralph Corporate Source: Los Alamos Natl Lab, Los Alamos, NM, USA Conference Title: Proceedings of the 3rd Workshop on Neural Networks: Academic/Industrial/NASA/Defense Conference Location: Alabama, AL, USA Conference Sponsor: Auburn University Space Power Institute: Center for Commercial Development of Space Power and Advanced Electronics; NASA Headquarters Source: Proceedings of SPIE—The International Society for Optical Engineering v 1721 1993. Publ by Society of Photo-Optical Instrumentation Engineers. Bellingham, WA, USA. p. 340-344 Publication Year: 1993.

Dialog No. 03765362 EI Monthly No. EIP93071030658 Title: Neural net based 2D-vision system for real-time applications Author: Reddy, G.N.; Valthillingham, S; Bean, W.C. Corporate Source: Lamar Univ, Beaumont, TX, USA Conference Title: Proceedings of the 3rd Workshop on Neural Networks: Academic/Industrial/NASA/ Defense Conference Location: Alalbama, AL, USA Conference Sponsor: Auburn University Space Power Institute: Center for Commercial Development of Space Power and Advanced Electronics: NASA Headquarters Source: Proceedings of SPIE—The International Society for Optical Engineering v 1721 1993. Publ by Society of Photo-Optical Instrumentation Engineers, Bellingham, WA, USA. p. 345-348 Publication Year: 1993.

Dialog No. 03765834 EI Monthly No. EIP93101115999 Title: Improved electro-optical target detection in a natural fractal environment Author: Cohen, G.; Reina, G.; Tkihar, Gil; Rotman, Stanley, R. Corporate Source: Ben-Gurion Univ. of the Negev, Beer-Sheva, Isr Conference Title: 8th Meeting on Optical Engineering in Israel: Optical Engineering and Remote Sensing Conference Location: Tel Aviv, Isr Conference Sponsor: SPIE—Int Soc for Opt Engineering, Bellingham, WA USA; Int Commission for Optics; European Optical Soc; Optical Soc of America: Asia-Pacific Optics Federation Source: Proceedings of SPIE—The International Society for Optical Engineering v 1971 1993. Publ by Society of Photo-Optical Instrumentation Engineers, Bellingham, WA, USA, p. 78-92 Publication Year: 1993.

Dialog No. 03768138 EI Monthly No. EIP93121154399 Title: 2 plus 3 model: fractal processes for knowledge-based engineering design Author: Chen, Q. Corporate Source: Dalian Univ of Tech-

(56) References Cited

OTHER PUBLICATIONS nology, Dalian, China Source: Cybernetics and Systems v 24 n 5 Sep.-Oct. 1993. p. 419-440 Publication Year: 1993.

Dialog No. 03769393 EI Monthly No. EIP93121154226 Title: Outdoor landmark recognition using fractal based vision and neural networks Author: Luo, Ren C.; Podapalli, Harsh; Hislop, David W. Corporate Source: North Carolina State Univ, Raleigh, NC, USA Conference Title: Proceedings of the IEEE/RSJ International Conference on Intelligent Robots and Systems Conference Location: Yokohama, Jpn Conference Sponsor: IEEE Industrial Electronics Society; IEEE Robotics and Automation Society; Robotics Society of Japan (RSJ); Society of Instrument and Control Engineers (SICE); New Technology Foundation Source: 1993 International Conference on Intelligent Robots and Systems 1993. Publ by IEEE, IEEE Service Center, Piscataway, NJ, USA,(IEEE cat n 93CH3213-6). p. 612-618 Publication Year: 1993.

Dialog No. 03770066 EI Monthly No. EIP93121161511 Title: Multi-target tracking in dense threat environments Author: Toomarian, Nikzad Corporate Source: California Inst of Technology, Pasadena, CA, USA Source: Computers & Electrical Engineering v 19 n 6 Nov. 1993. p. 469-479 Publication Year: 1993.

Dialog No. 03770270 EI Monthly No. EIP93121161716 Title: Recognition and inspection of manufactured parts using line moments of their boundaries Author: Wen, Wei; Lozzi, Andrei Corporate Source: Univ of Sydney, Sydney, Aust Source: Pattern Recognition v 26 n 10 Oct 1993. p. 1461-1471 Publication Year: 1993.

Dialog No. 03770294 EI Monthly No. EIP93121161740 Title: New linear systolic arrays for the string comparison algorithm Author: Gosev, Marjan; Evans, David J. Corporate Source: Univ ?Kiril i Meindij of Skopje, Skopje, Macedonia Source: Parallel Computing v 19 n 10 Oct. 1993. p. 1177-1193 Publication Year: 1993.

Dialog No. 03773364 EI Monthly No. EIP94011166693 Title: High confidence visual recognition of persons by a test of statistical independence Author: Daugman, John G. Corporate Source: Cambridge Univ, Cambridge, Engl Source: IEEE Transactions on Pattern Analysis and Machine Intelligence v 15 n 11 Nov. 1993. p. 1148-1161 Publication Year: 1993.

Dialog No. 03780009 EI Monthly No. EIP93121138971 Title: Metal/coating/electrolyte interfacial impedance and its global fractal model Author: Hubrecht, J.; Embrechts, M.; Bogserts, W. Corporate Source: Katholieke Univ Leuven, Heverlee, Belg Conference Title: Proceedings of the Second International Symposium on Electrochemical Impedance Spectroscopy Conference Location: Berling, Ger Source: Electrochimica Acta v 38 n 14 Oct. 1993. p. 1867-1875 Publication Year: 1993.

Dialog No. 03780159 EI Monthly No. EIP94011171743 Title: Sens-perceptor: Image based evidence formation module as a logical sensor for robot hand preshaping Author: Nazlibilek, S.; Erkmen, A.; Erkmen, I. Corporate Source: Middle East Technical Univ, Ankara, Turk Conference Title: Proceedings of the 1993 IEEE International Symposium on Intelligent Control Conference Location: Chicago, IL, USA Conference Sponsor: IEEE Control Systems Society Source: Proc 1993 IEEE Int Symp Intell Control 1993. Publ by IEEE, IEEE Service Center, Piscataway, NJ, USA,(IEEE cat n 93CH3278-9), p. 326-331 Publication Year: 1993.

Dialog No. 03780174 EI Monthly No. EIP94011171758 Title: Barnet: A new approach to behavior arbitration Author: Yavnal Corporate Source: Rafael, Haifa, 1st Conference Title: Proceedings of the 1993 IEEE International Symposium on Intelligent Control Conference Location: Chicago, IL, USA Conference Sponsor: IEEE Control Systems Society Source: Proc 1993 IEEE Int Symp Intell Control 1993. Publ by IEEE, IEEE Service Center, Piscataway, NJ, USA.(IEEE cat n 93CH3278-9). p. 417-422 Publication Year: 1993.

Dialog No. 03782823 EI Monthly No. EIP94011185543 Title: Fractal analysis of fracture patterns using the standard box-counting technique: valid and invalid methodologies Author: Walsh, J.J.; Watterson, J. Corporate Source: Univ of Liverpool, Liverpool, Engl Source: Journal of Structural Geology v 15 n 12 Dec. 1993. p. 1509-1512 Publication Year: 1993.

Dialog No. 03795505 EI Monthly No. EIP94021200624 Title: Fractal image coding: a review Author: Jacquin, Arnaud E. Corporate Source: AT&T Bell Lab, Murray Hill, NJ, USA Source: Proceedings of the IEEE v 81 n 10 Oct. 1993. p. 1451-1465 Publication Year: 1993.

Dialog No. 03803851 EI Monthly No. EIP94021215641 Title: Fractal modeling techniques for spatial data Author: Gregorski, Mark E.; Jensen, Olivia Corporate Source: Univ of Waterloo, Waterloo, Ont, Can Source: IEEE Transactions on Geoscience and Remote Sensing v 31 n 5 Sep. 1993. p. 980-988 Publication Year: 1993.

Dialog No. 03807554 EI Monthly No. EIP94021216087 Title: VLSI architecture for polygon recognition Author: Sastry, Baghu; Ganganathan, N.; Bunka, Horst Corporate Source: Univ of South Florida, Tampa, FL, USA Source: IEEE Transactions on Very Large Scale Integration (VLSI) Systems v 1 n 4 Dec. 1993. p. 398-407 Publication Year: 1993.

Dialog No. 03810250 EI Monthly No. EIP94021217636 Title: Efficient recognition of rotationally symmetric surfaces and straight homogeneous generalized cylinders Author: Liu, Jane; Mundy, Joe; Forsyth, David; Zisserman, Andrew; Rothwell, Charlie Corporate Source: GE Cent for Research and Development, Schenectady, NY, USA Conference Title: Proceedings of the 1993 IEEE Computer Society Conference on Computer Vision and Pattern Recognition Conference Location: New York, NY, USA Conference Sponsor: IEEE Source: IEEE Computer Vision and Pattern Recognition Proc 1993 IEEE Comput Soc Conf Comput Vision Pattern Recognit 1993. Publ by IEEE, IEEE Service Center, Piscataway, NJ, USA,(IEEE cat n 93CH3309-2). p. 123-128 Publication Year: 1993.

Dialog No. 03810264 EI Monthly No. EIP94021217650 Title: On the recognition of occluded shapes and generic faces using multiple-template expansion matching Author: Ben-Arie, Jezekiel; Rao, K. Raghunath Corporate Source: Illinois Inst of Technology, Chicago, IL, USA Conference Title: Proceedings of the 1993 IEEE Computer Society Conference on Computer Vision and Pattern Recognition Conference Location: New York, NY, USA Conference Sponser: IEEE Source: IEEE Computer Vision and Pattern Recognition Proc 1993 IEEE Comput Soc Conf Comput Vision Pattern Recognit 1993. Publ by IEEE, IEEE Service Center, Piscataway, NJ, USA,(IEEE cat n 93CH3309-2). p. 214-219 Publication Year: 1993.

Dialog No. 03810848 EI Monthly No. EIP94021207991 Title: Retrieval of forest spatial pattern from SAR images Author: Ranson, K. Jon: Sun, Guoqing Corporate Source: Goddard Space Flight Center, Greenbelt, MD, USA Conference Title: Proceedings of the 13th Annual International Geoscience and Remote Sensing Symposium Conference Location: Tokyo, Jpn Conference Sponsor: IEEE; The Institute of Electronics, Information, and Communication Engineers of Japan; Union Radio Scientifique Internationale Source: International Geoscience and Remote Sensing Symposium (IGARSS) v 3 1993. Publ by IEEE, IEEE Service Center, Piscataway, NJ, USA,(IEEE cat n 93CH3294-6). p. 1213-1215 Publication Year: 1993.

Dialog No. 03817787 EI Monthly No. EIP94031234613 Title: Laplacian and orthogonal wavelet pyramid decompositions in coarse-to-fine registration Author: Allen, Ronald L.; Kamangar, Fathad A.; Stokely, Ernest M. Corporate Source: Univ of Texas at Arlington, Arlington, TX, USA Source: IEEE Transactions on Signal Processing v 41 n 12 Dec. 1993. p. 3536-3541 Publication Year: 1993.

Dialog No. 03819787 EI Monthly No. EIP93121145108 Title: Object tracking through adaptive correlation Author: Montera, Dennis A.; Rogers, Steven K.; Rock, Dennis W.; Oxley, Mark E. Corporate Source: Air Force Inst. of Technology, Wright-Patterson AFB, OH, USA Conference Title: Optical Pattern Recognition IV Conference Location: Orlando, FL, USA Conference Sponsor: SPIE—Int Soc for Opt Engineering, Bellingham, WA USA Source: Proceedings of SPIE—The International Society for Optical Engineering v 1959 1993. Publ by Society of Photo-Optical Instrumentation Engineers, Bellingham, WA, USA. p. 314-321 Publication Year: 1993.

Dialog No. 03826583 EI Monthly No. EIP94031243260 Title: Planar three-line junction perspective problem with application to the recognition of polygonal patterns Author: Caglioti, Vincezo

(56) References Cited

OTHER PUBLICATIONS

Corporate Source: Politecnico di Milano, Milano, Italy Source: Pattern Recognition v 26 n 11 Nov. 1993. p. 1603-1618 Publication Year: 1993.
Dialog No. 03829823 EI Monthly No. EIP94041253516 Title: Analysis of radial core experiments for hydrochloric acid interaction with limestones Author: Frick, T.P.; Mostofizadeh, Behdokhr; Economides, M.J. Corporate Source: Mining Univ Lenben, Leoben, Austria Conference Title: Proceedings of the International Symposium on Formation Damage Control Conference Location: Lafayette, LA, USA Source: Proceedings—SPE International Symposium on Formation Damage Control 1994. Publ by Society of Petroleum Engineers (SPE), Richardson, TX, USA. p. 577-592 Publication Year: 1994.
Dialog No. 03839591 EI Monthly No. EIP94041264411 Title: Fractal characteristics of mesofractures in compressed rock specimens Author: Zhao, Yonghong; Huang, Jiefan; Wang, Ren Corporate Source: Peking Univ. Beijing, China Conference Title: Proceedings of the 34th U.S. Symposium on Rock Mechanics Conference Location: Madison, WI, USA Source: International Journal of Rock Mechanics and Mining Sciences & Geomechanics Abstracts v 30 n 7 Dec. 1993. p. 877-882 Publication Year: 1993.
Dialog No. 03847362 EI Monthly No. EIP94041265976 Title: Systemized serendipity for producing computer art Author: Walter, David Corporate Source: Imperial Coll of Science, Technology and Medicine, London, UK Source: Computers & Graphics (Pergamon) v 17 n 6 Nov.-Dec. 1993, p. 699-700 Publication Year: 1993.
Dialog No. 03854872 EI Monthly No. EIP94051281977 Title: Network model for invariant object recognition and rotation angle estimation Author: You, Shingchern D.; Ford, Gary E. Corporate Source: Univ of California, Davis, CA, USA Conference Title: Proceedings of 1993 International Joint Conference on Neural Networks. Part 3 (of 3) Conference Location: Nagoya, Jpn Conference Sponsor: ENNS; INNS; IEEE; SICE; IEICE; et al Source: Proceedings of the International Joint Conference on Neural Networks v 3 1993. Publ by IEEE, IEEE Service Center, Piscataway, NJ, USA.93CH3353-0. p. 2145-2148 Publication Year: 1993.
Dialog No. 03854884 EI Monthly No. EIP94051281989 Title: Texture classification using a two-stage neural network approach Author: Raghu, P.P.; Poongadi, R.; Yegnanarayana, B. Corporate Source: Indian Inst of Technology, Madras, India Conference Title: Proceedings of 1993 International Joint Conference on Neural Networks. Part 3 (of 3) Conference Location: Nagoya, Jpn Conference Sponsor: ENNS; INNS; IEEE; SICI; IEICE; et al Source: Proceedings of the International Joint Conference on Neural Networks v 3 1993. Publ by IEEE, IEEE Service Center, Piscataway, NJ, USA.93CH3353-0. p. 2195-2198 Publication Year: 1993.
Dialog No. 03855007 EI Monthly No. EIP94051282111 Title: Waveform recognition and classification using an unsupervised network Author: Lee, C.K.; Yeung, K.F. Corporate Source: Hong Kong Polytechnic, Hung Hom, Hong Kong Conference Title: Proceedings of 1993 International Joint Conference on Neural Netowrks. Part 3 (of 3) Conference Location: Nagoya, Jpn Conference Sponsor: ENNS; INNS; IEEE; SICE; IEICE; et al Source: Proceedings of the International Joint Conference on Neural Networks v 3 1993. Publ by IEEE, IEEE Service Center, Piscataway, NJ USA.93CH3353-0. p. 2710-2713 Publication Year: 1993.
Dialog No. 03855870 EI Monthly No. EIP94051282331 Title: Correlation effects of fractal compression Author: Sirgany, WaJle N.; Mazel, David S. Corporate Source: IBM Federal Systems Co, Manassas, VA, USA Conference Title: Proceedings of the 27th Asilomar Conference on Signals, Systems & Computers Conference Location: Pacific Grove, CA, USA Conference Sponsor: IEEE Computer Society Press; Naval Postgraduate School; San Jose State university Source: Conference Record of the Asilomar Conference on Signals, Systems & Computers v 2 1993. Publ by IEEE, Computer Society Press, Los Alamitos, CA, USA, p. 1524-1528 Publication Year: 1993.
Didier LeGall, "MPEG: a Video Compression Standard for Multimedia Applications", Communications of the ACM (Apr. 1991).
Ding et al., U.S. Appl. No. 60/212,546, filed Jun. 20, 2000, US Provisional Patent Application, pp. 1-8.
Discovery Communications, Inc. webpage.
Dobie, Mark, et al., "A flexible architecture for content and concept based multimedia information exploration", http://www.mmrg.ecs.soton.ac.uk/publications/archive/dobie1999/html/.
Dodds, Philip V.W., "DVD's Royalty—The Reign of Patents", IMA Newsletter Article, IMA Newsletter Article: DVD's Royalty—The Rei . . . .
Doherty, Richard, "Digital Compression Hikes Cable Capacity", Electronic Engineering, (Dec. 2, 1991): 1-16.
Doherty, Richard, "Fractals Yield High Compression", Electronic Engineering Times, p. 39, Sep. 30, 1991.
Doherty, Richard, "MPEG Group Reveals Audiovisual Code Data", Electronic Engineering Times 1991, (Dec. 2, 1991): 97.
Donovan, John W., "Intel/IBM's Audio-Video Kernel", BYTE, (Dec. 1991): 177-202.
Dorai et al., On the Evolution of Videotext Description Scheme and Its Validation Experiments for MPEG-7, http://woodworm.cs.uml.edu/.about.rprice/ep/dorai/index.html, Proceedings of the 2000 ACM Workshops on Multimedia, LA, CA. pp. 67-70, 2000.
Doyle, Bob, "DV Cassette: Here Come the Digital Video Camcorders", NewMedia Lab, http://www.dtvgroup.com/DigVideo/DVC/DVC.html.
Dubois, et al., A possibilistic logic machinery for qualitative decision, (1997) AAAI /Spring Symp. on Qualitative Preferences, Deliberation and Practical Reasoning.
Dyke, Terence, et al., "Rallying Around the IEEE 1394", http://eagle.onr.com/aea/media.tvtech34.html.
Eakins, John P., et al., "Content-Based Image Retrieval", A Report to the JISC Technology Applications Programme, Institute for Image Data Research, University of Northumbria at Newcastle, http://www.unn.ac.uk/iidr/report.html, www.jisc.ac.uk/uploaded_documents/jtap-039.doc.
Eiben, et al., Parameter Control in Evolutionary Algorithms—IEEE Transactions on Evolutionary Computation, vol. 3, Issue 2, pp. 124-141, Jul. 1999.
Elrich, David J., "Maverick move rocks DVD Consortium", DVD: Sony, Philips drop a bomb.
Erickson, Thomas and Salomon, Gitta "Designing a Desktop Information System: Observation and Issues", CHI '91 Proceedings. (1991) ACM 0-89791-383-3/91/0004/0049, pp. 49-54.
Erickson, Thomas, et al., "Designing a Desktop Information System: Observations and Issues", Human Interface, Advanced Technology Group, Apple Computer, CHI Proceedings '91.
Eriksson, Larry J., "A Primer on Active Sound and Vibration Control", Sensors, Feb. 1997, pp. 18-31.
Ewell, Miranda, "The Valley's Mentor", San Jose Mercury News, Mar. 8, 1998, http://www4.mercurycenter.com.
Excalibur Technologies article, http://www.excalib.com/home2.html.
FAQ Comp. Compression Newsgroup, Part 3, Image Compression Hardware, Jul. 11, 1997.
Fernandez-Madrigal, J.A.; Cruz-Martin, E.; Gonzalez, J.; Galindo, C.; Blanco, J.L.; Application of UWB and GPS technologies for vehicle localization in combined indoor-outdoor environments Signal Processing and Its Applications, 2007. ISSPA 2007. 9th International Symposium on Feb. 12-15, 2007 pp. 1-4.
Fisher, Yuval, et al., "Fractal image compression for mass storage applications", Proceedings of SPIE—The International Society for Optical Engineering v 1662, pp. 244-255.
Foote, Jonathan, et al., "An intelligent media browser using automatic multimodal analysis", http://info.acm.org/sigmm/MM98/electronic_proceedings/foote/index.html.
Fox, Jeffrey, A. and Smith, Sydney L., "Dynamic Rules for User Interface Design"(Druid), M89-22, Mitre Corporation, Bedford, Massachusetts, (May 1989), (pp. 1-2, 40-42 provided).
Gassner, Michael, et al., Meter as mechanism: A neural network that learns metrical patterns, http://gubbio.cs.berkeley.edu/m1papers/showpaper.doit?3ca24b5d95c2a363c39228a1a8795ea1.

(56) References Cited

OTHER PUBLICATIONS

Gautama, S., et al., "Context Driven Matching in Structural Patter Recognition", Vakgroep Telecommunicatie en Informatieverwerking, Universiteit Gent, St. Pietersnieuwstraat 41, B9000 Gent, Belgium.

Gautama, S., et al., "Learning Relational Models of Shape: A Study of the Hypergraph Formalism".

Goldberg, Lee, "Integrated Tuner Circuit Puts Television in New Places", Electronic Design, Jan. 25, 1999, pp. 34, 36, 38, 40.

Golden, Daniel, "The Face of the Future", Boston Globe, Jun. 30, 1996.

Green, Lee, "Thermo Tech," Popular Mechanics, (Oct. 1985): 155-160.

Greenwood, Dan, "Application of neural networks to drone control", International Telemetering Conference v26, pp. 775-781.

Greiff, et al., Mitre TDT-2000 Segmentation System, (2000) Proc. TDT2000 Workshop. Abramovich, et al., Wavelet analysis and its statistical applications, (1999) http://meth.tau.ac.il/nfelix/tx/PAPERS/JRSSD.

Grifffioen, James, et al., "Content-based multimedia data management and efficient remote access", http://www.uky.edu/.about.kiernan/DL/brent.html.

Group Announces DVD Encryption Achievement, Copyright Protection Technical Working Group . . . .

Guglielmo, Connie, "Magnifi to Ease Audio, Video Content Searches", Inter@ctive Week, May 26, 1997.

Guglielmo, Connie, "MPEG Standard Aims to Squeeze Digital Video Into Mainstream", MacWeek (Dec. 3, 1991 vol. 5, No. 41): 31-32.

Guglielmo, Connie, "Personify Predicts Buying Patterns", Interactive Week 5(25) Jun. 29, 1998. p. 50.

Gupta, G.S.; Messom, C.; Demidenko, S.; Craig, R.; A contingent of autonomous marching robots: intricacies of system design and motion control Toh Ser Khoon; Electronics, Circuits and Systems, 2003. ICECS 2003. Proceedings of the 2003 10th IEEE International Conference on vol. 1, Dec. 14-17, 2003 pp. 396-399 vol. 1.

Gurley, J. William, "How the Web Will Warp Advertising", Fortune, Nov. 9, 1998, http://www.pathfinder.com.

Hara, Yoshiko, "Input device 'reads' gestures", EE Times, p. 22, Nov. 25, 1996.

Hara, Yoshiko, "JVC, Sony push D-VHS as home digital recorder", Electronic Engineering Times, Apr. 5, 1999, p. 26.

Harrington, et al., GESIA: Uncertainty-Based Reasoning for a Generic Expert System Intelligent User Interface—Proceedings 8th IEEE Intl Conf. Nov. 16-19, 1996, pp. 52-55.

Hartmann, Georg, "Motion induced transformations of spatial representations: Mapping 3D information onto 2D", Neural Networks v 5 n 5, Sep.-Oct. 1992, pp. 823-834.

Hartung, Frank, et al., "Spread Specrum Watermarking: Malicious Attacks and Counterattacks".

Hawkins, William J., "Super Remotes", Popular Science, (Feb. 1989): 76-77.

Healey, Jon, "Smart TV recorders get another player", San Jose Mercury News, Sep. 10, 1998, http://www.sjmercury.com.

Hettrick, Scott, "'PVRs' called threat to nets", The Hollywood Reporter.

Hoban, Phoebe, "Stacking The Decks", New York v 20: p. 14 (Feb. 16, 1987).

Hoffberg, Linda I, "Designing a Programmable Interface for a Video Cassette Recorder (VCR) to Meet the User's Needs", Interface '91:346-351.

Hoffberg, Linda I, "Designing User Interface Guidelines for Time-Shift Programming on a Video Cassette Recorder (VCR)":501-504.

Hoffberg, Linda I, Thesis "An Improved Human Factored Interface for Programmable Devices: A Case Study of the VCR", Tufts University Master of Sciences in Engineering Design (Submitted Nov. 1990).

Hoffberg, Linda I., "Designing User Interface Guidelines for Time-Shift Programming on a Video Cassette Recorder(VCR)": pp. 501-504 (1991).

Hooge, Charles, "Fuzzy Logic Pattern Recognition Beyond Neural Networks", Vision Systems Design, Jan. 1998, pp. 32-37.

Horvitz, et al., Display of Information for Time-Critical Decision Making, Proceedings of the Eleventh Conference on Uncertainty in Artificial Intelligence, Montreal, Aug. 1995. Jeh, Scaling Personalized Web Search Lecture Notes: Advanced Algorithms (CS361A), Nov. 20, 2002 Technical Report http://theory.stanford.edu/wrajeev/cs361.2002.html. Resnick, et al., GroupLens: An Open Architecture for Collaborative Filtering of Netnews, Proceedings of ACM 1994 Conference on Computer Supported Cooperative Work, Chapel Hill, NC. pp. 175-186 (1994).

Horvitz, et al., The Lumiere Project: Bayesian User Modeling for Inferring the Goals and Needs of Software Users, Proceedings of the Fourteenth Conference on Uncertainty in Artificial Intelligence, Madison, WI, Jul. 1998.

Huang, Jing, "Content-based Video Parsing and Querying", http://www.cs.cornell.edu/ Info/People/kettmake/cs631/Project/proposal.html.

Human Media Project "Trademark Database Research at Electrotechnical Laboratory".

ICPR'96 Scientific Program Conference Topics and References.

IEEE PAMI Abstracts 1996.

IEEE PAMI Abstracts—Feb. 1997.

IEEE PAMI Table of Contents—Dec. 1996.

IEEE PAMI Table of Contents—Feb. 1997.

IEEE Transaction on Pattern Analysis and Machine Intelligence Past issues Table of Contents.

IEEE Workshop on Content-Based Access of Image and Video Libraries (in Conjunction with CVPR'97) Jun. 20, 1997.

IEEE workshop on content-based access of image and video libraries (in conjunction with IEEE CVPR-2000) Jun. 12, 2000, htp://disney.ctr.columbia.edu/cbaivl/.

Inpsec 4607872 B9404-6140C-074 C9404-1250-045 Doc Type: Conference Paper Title: Characterization of clutter in IR images using maximum likelihood adaptive neural system Authors: Perlovsky, L.I.; Jaskolski, J.J.; Chernick, J. Affiliation: Nichols Res. Corp., Wakefield, MA, USA Conf. Title: Conference Record of the Twenty-Sixth Asilomar Confernece on Signals, Systems and Computers (Cat. No. 92CH3245-8) p. 1076-80 vol. 2 Editors: Singh, A. Publishers: IEEE Comput. Soc. Press Los Alamitos, CA, USA Date: 1992 2 vol. (xviii+xix+1156 pp.).

Inspe 4631735 C9405-1250-077 Doc Type: Journal Paper Title: Non-analytic object recognition using the Hough transform with the machine technique Authors: Set, P.-K.; Siu, W.-C. Affiliation: Dept. of Electron. Eng., Hong Kong Polytech., Hung Hom, Hong Kong Journal: IEE Proceedings-Computers and Digital Techniques vol. 141 Iss: 1 pp. 11-16 Date: Jan. 1994.

Inspec :699540 B9408-6140C 083 C9408-5260B-046 Doc Type: Journal Paper Title: A new modern compensation method for image sequence coding using hierarchical grid interpolation Authors: Chuag-Ian Huang; Chao-Yuen Hsu Affiliation: Inst. of Electr. Eng., Nat. Tsing Hua Univ., Hsinchu, Taiwan Journal: IEEE Transactions on Circuits and Systems for Video Technology vol. 4 Iss: 1 pp. 42-52 Date: Feb. 1994.

Inspec 4; Eewing, T.K., Serati, R.A.; Johnson, K.M.; Simon, D.M. Affiliation: Boulder Nonlinear Syst. Inc., Boulder, CO, USA Journal: Proceedings of the SPIE—The International Society for Optical Engineering vol. 1959 pp. 55-68 Date: 1993.

Inspec 4393819 B9403-6140C-226 C9403-1250-178 Doc Type: Journal Paper Title: Invariant object recognition based on a neural network of cascaded RCE nets Authors: Li, W.; Nasrabadi, N.M. Affiliation: Dept. of Electr. & Comput. Eng., State Univ. of New York, Buffalo, NY, USA Journal: International Journal of Pattern Recognition and Aftificial Intelligence vol: 7 Iss: 4 p. 815-29 Date: Aug. 1993.

Inspec 441256 B9308-6140C-136 C9308-5260B-086, Doc Type: Journal Paper, Title: Advances in digital image processing, Authors: Anuradha, M., Affiliation: Rakshapuram Colony, Hyderabed, India, Journal: Students' Journal of the Institution of Electronics & Telecommunication Engineers, vol. 33 Iss: 3 pp. 197208, Date: Jul.-Sep. 1992.

Inspec 4422202 C9307-5260B-085 Doc Type: Conference Paper Title: Sensitivity of Alias to small variations in the dimension of

(56) References Cited

OTHER PUBLICATIONS fractal images Authors: Bock, P.; Kocinski, C.J.; Schmidt, H.; Klinnert, R.; Kober, R.; Rovner, R. Affiliation: Res. Inst. for Appl. Knowledge Process., Ulm, Germany Conf. Title: IJCNN International Joint Conference on Neural Networks (Cat. No. 92CH3114-6) pp. 339-353 vol. 4 Publisher: IEEE New York, NY, USA Date: 1992.

Inspec 4422802 B9307-6140C-189 C9307-1250-145 Doc Type: Conference Paper Title: Efficient compression of wavelet coefficients for smooth and fractal-like data Authors: Culik, K., II; Dube, S. Affiliation: Dept. of Comput. Sci., South Carolina, Columbia, SC, USA Conf. Title: STACS 93. 10th Annual Symposium on Theoretical Aspects of Computer Science pp. 343-353 Editors: Enjalbert, P.; Finkel, A.; Wagner, K.W. Publisher: Spring-Verlag Berlin, Germany Date: 1993 xiv+723 pp.

Inspec 4426937 B9307-0170L-017 C9307-5260B-120 Doc Type: Conference Paper Title: A fractal dimension feature extraction technique for detecting flaws in silicon wafers Authors: Stubbendieck. G.T.; Oldham, W.J.B. Affiliation: Dept. of Comput. Sci., Texas Tech. Univ., Lubbock, TX, USA Conf. Title: IJCCN International Joint Conference on Neural Networks (Cat. No. 92CH3114-6) pp. 717-723 vol. 3 Publisher: IEEE New York, NY, USA Date: 1992.

Inspec 4431389 B9308-6140C-029 C9308-5260B-014 Doc Type: Journal Paper Title: A parallel image generation by an IFS and an adaptive IFS estimation of the gray scale image Authors: Sonehara, N.; Nakane, K. Journal: Journal of the Institute of Image Electronics Engineers of Japan vol. 21 Iss: 5 pp. 486-493 Date: Oct. 1992.

Inspec 4441256 B9308-6140C-136 C9308-5260B-086 Doc Type: Journal Paper Title: Advances in digital image processing Authors: Anuradha, M. Affiliation: Rakshnpuram Colony, Hyderabad, India Journal: Students' Journal of the Institution of Electronics & Telecommunication Engineers vol. 33 Iss: 3 pp. 197-208 Date: Jul.-Sep. 1992.

Inspec 4441526 C9308-1250-125 Doc Type: Conference Paper Title: Optoelectronic fractal scanning technique for wavelet transform and neural net pattern classifiers Authors: Phuvzn, S.; Oh, T.K.; Caviris, N.; Li, Y.; Szu, H. Affiliation NAVSWC, Silver Spring, MD USA Conf. Title: IJCNN International Joint Conference on Neural Networks (Cat. No. 92CH3114 6) pp. 40 6 vol. 1 Publisher: IEEE New York, NY, USA Date: 1992.

Inspec 4454529 B9309-6140C-103 C9309-1250-099 Doc Type: Conference Paper Title: Fractal approximation add data: Sch. of Electron. & Electr. Eng., Bath Univ., UK Conf. Title: ICASSP-92 IEEE International Conference on Acoustics, Speech and Signal Processing (Cat. No. 92CH3103-9) pp. 485-488 vol. 3 Publisher: IEEE New York, NY, USA Date: 1992 5 vol. 3219 pp.

Inspec 4454556 B9309-6140C-127 C9309-1250-112 Doc Type: Conference Paper Title: Recursive estimation of facial expression and movement Authors: Li, H.; Roivinen, P.; Forchheimer, R. Affiliation: Dept. of Electr. Eng., Linkoping Univ., Sweden Conf. Title: ICASSP 92: 1992 IEEE International Conference on Acoustics. Speech and Signal Processing (Cat. No. 92CH3103-9) pp. 391-396 vol. 3 Publisher: IEEE New York, NY, USA Date: 1992 5 vol. 3219 pp.

Inspec 4458920 C9309-1250-161 Doc Type: Book Chapter Title: Recognition and generation of fractal patterns by using syntactic techniques Authors: Blane-Talon, J. Affiliation: Div. of Inf. Technol., CSSRO, Canberra, Act, Australia Book Title: Complex systems: from biology computation pp. 141-152 Editors: Green, D.G.; Bossomaler, T. Publisher: IOS Press Amsterdam, Netherlands Date: 1993 x+376 pp.

Inspec 4459657 B9309-6140C-202 C9309-1250-169 Doc Type: Conference Paper Title: Inverse problem for two-dimensional fractal sets using the wavelet transform and the moment method Authors: Rinaldo, R.; Zakhor, A. Affiliation: Dept. of Electr. Eng. & Comput. Sci, California Univ., Berkeley, CA, USA Conf. Title: ICASSP-92: 1992 IEEE International Conference on Acoustics, Speech and Signal Processing (Cat. No. 92C3103-9) pp. 665-668 vol. 4 Publisher: IEEE New York, NY, USA Date: 1992 5 vol. 3219 pp.

Inspec 4464625 A9319-4230-003 B9310-6140C-006 C9310-1250-003 Doc Type: Conference Paper in Journal Title: Optical image analysis using fractal techniques Authors: Kozaius, S.P.: Andrews, H.G.; Foor, W.E. Affiliation: Dept. of Eelctr. & Comput. Eng., Florida Inst. of Technol., Melbourne, FL, USA Journal: Proceedings of tha SPIE—The International Society for Optical Engineering vol. 1790 pp. 117-124 Date: 1993.

Inspec 4465220 B9310-6140C-008 C9310-1250-004 Doc Type: Journal Paper Title: 3-D motion estimation in model-based facial image coding Authors: Li, H.; Roivainen, P.; Forcheimer, R. Affiliation: Dept. of Electr. Eng., Linkoping Univ., Sweden Journal: IEEE Transactions on Pattern Analysis and Machine Intelligence vol. 15 Iss: 6 pp. 545-555 Date: Jun. 1993.

Inspec 4468930 B9310-6140C-081 C9310-5260B-053 Doc Type: Conference Paper in Journal Title: A fractal model for digital image texture analysis Authors: Penolkas, M.G.; Mitra, S. Affiliation: Dept. of Electr. Eng., Texas Tech. Univ., Lubbock, TX, USA Journal: Proceedings of the SPIE—The International Society for Optical Engineering vol. 1771 pp. 292-298 Date: 1993.

Inspec 4471319 B9310-6140C-098 C9310-1250-061 Doc Type: Conference Paper Title: Fractal image compression using iterative transforms: applications to DTED Authors: Jacobs, E.W.; Boss, R.D. Affiliation: NCCOSC RDT&E Div., San Diego, CA, USA Conf. Title: MILCOM '92—Communications—Fusing Command, Control and Intelligent—Conference Record (Cat. No. 92CH 3131-0) pp. 0/1122-0-1128 vol. 3 Publisher: IEEE New York, NY, USA Date: 1992.

Inspec 4471518 B9310-6140C-103 C9310-1250-066 Doc Type: Conference Paper Title: Wavelet multiscale representation and morphological filtering for texture segmentation Authors: Xie, Z.Y.; Brady, M. Affiliation: Dept. of Eng. Sci., Oxford Univ., UK Conf. Title: IEE Colloquim on 'Morphological and Nonlinear Image Processing Techniques' (Digest No. 1993/145) pp. 2/1-2/8 Publisher: IEE London, UK Date: 1193 51 pp.

Inspec 4471520 B9310-6140C-105 C9310-1250-068 Doc Type: Conference Paper Title: Multiresolutional texture analysis based on morphological techniques Authors: Popov, A.T., Hall, A.G. Affiliation: Fac. of Math. & Inf., St. Kilment Ohrikiski Univ. of Sofia, Bulgaria Conf. Title: IEE Colloquim on Morphological and Non-linear Image Processing Techniques (Digest No. 1993/145) pp. 4/1-4/6 Publisher: IEE London, UK Date: 1993 51 pp.

Inspec 4476336 B9310-6140C-168 C9310-5260B-089 Doc Type: Journal Paper Title: Motion segmentation and qualitative dynamic scene analysis from an image sequence Authors: Bouthemy, P.; Francois, E.Affiliation: IRISA/INRIA, Reanes, France Journal: International Journal of Computer Vision vol. 10 Iss: 2 pp. 157-182 Date Apr. 1993.

Inspec 4479373 C9310-1250-133 Doc Type: Conference Paper in Journal Title: Bayesian methods for the use of implicit polynomials and algebraic invariants in practical computer vision Authors: Subrahmonia, J.; Keren, D.; Cooper, D.B. Affiliation: Lab. for Eng. Man/Machine Syst., Brown Univ., Providence, RI, USA Journal: Proceedings of the SPIE—The International Society for Optical Engineering vol. 1830 pp. 104-117 Date: 1992.

Inspec 4481437 B9310-6140C-191 C9310-5260B-115 Doc Type: Journal Paper Title: Analysis of snowflake shape by a region and contour approach Authors: Muramoto, K.; Matsuura, K.; Shiina, T. Affiliation: Fac. of Technol., Kanazawa Univ., Japan Journal: Transactions of the Institute of Electronics, Information and Communication Engineers D-II vol. 176D-II Iss: 5 pp. 949-958 Date: May 1993.

Inspec 4484044 C9311-1250-007 Doc Type: Conference Paper in Journal Title: Markov iterated function system model of Images Authors: Huiguo Luo: Yaoting Zhu: Guangxi Zhu; Faguan Wan Affiliation: Dept. of Electr. & Inf. Eng., Hunrhong Univ. of Sci. & Technol., Wohen, China Journal: Proceedings of the SPIE—The International Society for Optical Engineering vol. 1 71 pp. 598-604 Date: 1993.

Inspec 4492170 A9321-0365-052 B9311-6140C-084 C9311-1250-052 Doc Type: Journal Paper Title: Two ways to incorporate scale

(56) References Cited

OTHER PUBLICATIONS in the Helsenberg group with an interviewing operator Authors: Segman, I.; Schempp, W. Affiliation: Div. of Appl. Sci., Harvard Univ., Cambridge, MA, USA Journal of Mathematical Imaging and Vision vol. 3 Iss: 1 pp. 79-94 Date: Mar. 1993.

Inspec 4495112 B9311-6140C-120 C9311-1250-075 Doc Type: Conference Paper in Journal Title: Affine models for motion and shape recovery Authors: Fuh, C.-S.; Maragos, P. Affiliation: Div. of Appl. Sci., Harvard Univ., Cambridge, MA, USA Journal: Proceedings of the SPIE—The International Society for Optical Engineering vol. 1818 Iss: pt. 1 p. 120-34 Date: 1992.

Inspec 4495283 B9311-0250-010 C9311-1160-037 Doc Type: Journal Paper Title: On the most robust affine basis Authors: Gottman, C. Affiliation: Dept. of Comput. Sci. Technlou, Haifa, Israel Journal: Pattern Recognition Letters vol. 14 Iss: pp. 647-650 Date: Aug. 1993.

Inspec 44990066 B9311-6140C-213 C9311-1250-151 Doc Type: Conference Paper Title: Color image compression based on fractal geometry Authors: Hong Yan; Fillippoff; G. Affiliation: Dept. of Electr. Eng., Sydney Univ., NSW, Australia Conf. Title: ICIP 92. Proceedings of the 2nd Singapore International Conference on Image Processing pp. 3-5 Editors: Srinivasa, V.; Ong Sim Heng; Ang Yew Hock Publisher: World Scientific Singapore Date: 1992 xxii+734 pp.

Inspec 4499009 B9311-6140C-216 C9311-1250-153 Doc Type: Conference Paper Title: A new image compression method based on fractals and human visual system Authors: Li. Ding-Bing; Chang Yi-Lin; Hu Zheng Affiliation: Dept. 1. Xidian Univ., X1 'An, China Conf. Title: ICIP 92. Proceedings of the 2nd Singapore International Conference on Image Processing pp. 16-20 Editors: Srinivasa, V.; Ong Sim Heng; Ang Yew Hock Publisher: World Scientific Singapore Date: 1992 xxll+734 pp.

Inspec 4499022 B9311-6140C-226 C9311-1250-157 Doc Type: Conference Paper Title: Affine and projective image invariants based on algebraic invariants Authors: Reiss, T.H. Affiliation: Dept. of Eng., Cambridge Univ., UK Conf. Title: ICIP 92. Proceedings of the 2nd Singapore International Conference on Image Processing pp. 80-84 Editors: Srinivasa, V.; Ong Sim Heng: Ang Yew Hock Publisher: World Scientific Singapore Date: 1992 xxii+734 pp.

Inspec 4499057 B9311-6140C-252 C9311-1250-182 Doc Type: Conference Paper Title: Fractal dimension estimation: some methods and their reliability Authors: Lim Hock; Lxi Choy Heng; Oh Geok Lian Affiliation: Dept. of Phys., Nat. Univ. of Singapore, Singapore Conf. Title: ICIP 92, Proceedings of the 2nd Singapore International Conference on Image Processing pp. 380-384 Editors: Srinivasa, V.; Ong Sim Heng; Ang Yew Hock Publisher: World Scientific Singapore Date: 1992 xxii+734 pp.

Inspec 4502313 B9311-6140C-330 C9311-1250-245 Doc Type: Journal Paper Title: Fractal-based image sequence compression science Authors: Haibo Li, Novak, M.; Forchheimer, R. Affiliation: Dept. of Electr. Eng., Linkoping Univ., Sweden Journal: Optical Engineering vol. 32 Iss: 7 pp. 1588-1595, Date: Jul. 1993.

Inspec 4504545 B9312-6140C-001 C9312-1250-001 Doc Type: Conference Paper in Journal Title: Fast algorithm to select maps in an iterated function system fractal model Authors: Vines, G.; Hayes, M.H., III Affiliation: Sch. of Electr. Eng., Georgia Inst. of Technol., Atlanta, GA, USA Journal: Proceedings of the SPIE—The International Society for Optical Engineering vol. 1818 Iss: pt.3 pp. 944-949 Date: 1992.

Inspec 4504546 B9312-6140C-002 C9312-1250-002 Doc Type: Conference Paper in Journal Title: Image classification and segmentation using multichannel fractal modelling Authors: Kaloyeras, D.K.; Kollias, S.D. Affiliation: Dept. of Electr. & Comp. Eng., Nat. Tech. Univ. of Athens, Greece Journal: Proceedings of the SPIE—The International Society for Optical Engineering vol. 1818 Iss: pt. 3 pp. 950-957 Date: 1992.

Inspec 4508271 B9312-6140C-058 C9312-1250-052 Doc Type: Journal Paper Title: Object recognition using alegbraic and differential invariants Authors: Reiss, T.H. Affiliation: Commun. Signal Processing Lab., Cambridge Univ., UK Journal: Signal Processing vol. 32 Iss: 3 pp. 367-395 Date: Jun. 1993.

Inspec 4508845 B9312-6140C-073 C9312-1250-057 Doc Type: Conference Paper Title: Directed spreading activation in multiple layers for low-level feature extraction Authors: Arul Valan. A.; Yegnanarayana, B. Affiliation: Dept. of Comput. Sci. & Eng., Indian Inst. of Technol., Madras, Indian Inst. of Technol., Madras, India Conf. Title: Communications on the Move. Singapore. ICCS/ISITA '92 (Cat. No. 92TH0179-6) pp. 563-567 vol. 2 Editors: Ng. C.S.; Yeo, T.S.; Yeo, S.P. Publisher: IEEE New York, NY, USA Date: 1990 3 vol. (xxvii+1422 pp.).

Inspec 4509986 B9312-6140C-105 C9312-1250-076 Doc Type: Journal Paper Title: The geometric transformation of the discrete images Authors: Margant, L. Affiliation: Polytech. Inst. of Bucharest, Romania Journal: IPB Bulehn Scientific, polytechnic Institute of Bucharest Scientific, Bulletin, Electrical Engineering vol. 53 Iss: 1-2 pp. 117-127 Date: 1991.

Inspec 4518350 B9312-6140C-201 C9312-1250-138 Doc Type: Conference Paper Title: Natural scene segmentation using fractal based autocorrelation Authors: Luo, R.C.; Podapalli, H.; Hislop, D.W. Affiliation: Dept. of Electr. & Comput. Eng., North Carolina State Univ., Raleigh, NC, USA Conf. Title: Proceedings of the 1992 International Conference on Industrial Electronics, Control, Instrumentation, and Automation. Power Electronics and Motion Control (Cat. No. 92CH3137-7) p. 700-5 vol. 2 Publisher: IEEE New York, NY, USA Date: 1992 3 vol. 1649 pp.

Inspec 4519462 A9324-9575-007 C9312-1250-166 Doc Type: Journal Paper Title: Neural network and wavelet transform for scale-invariant data classification Authors; Szu, H.H.; Yang, X.-Y.; Telfer, B.A.; Sheng, Y. Affiliation: Naval Surface Warfare Center, Dahlgren Division Code R44, Silver Spring, MD, USA Journal: Physical Review E (Statistical Physics, Plasmas, Fluids, and Related Interdisciplinary Topics) vol. 48 Iss: 2 pp. 1497-1501 Date: Aug. 1991.

Inspec 4527508 B9401-6140C-022 C9401-1250-016 Doc Type: Journal Paper Title: Extraction of symmetry properties using correlation with rotated and reflected images Authors: Masuda, T.; Yamamoto, K.; Yamada, H. Affiliation: Electrotech. Lab., Tsukuba, Japan Journal: Electronics and Communications in Japan, Part 3 (Fundamental Electronic Science) vol: 76 Iss: 1 p. 8-19 Date: Jan. 1993.

Inspec 4528335 B9401-6140C-036 C9401-5260B-013 Doc Type: Journal Paper Title: Recognition and Inspection of manufactured parts using line moments of their boundaries Authors: Wei Wen; Lozzi, A. Affiliation: Dept. of Mech. Eng., Sydney Univ., NSW, Australian Journal: Pattern Recognition vol. 26 Iss: 10 pp. 1461-1471 Date: Oct. 1993.

Inspec 4529410 B9401-0100-005 C9401-1260-018 Doc Type: Conference Paper Conf. Title: DCC '93. Data Compression Conference (Cat. No. 93TH0536-3) Editors: Storer, J.A.; Cohn, M. Publisher: IEEE Comput. Soc. Press Los Alamitos, CA, USA Date: 1993 xiii+505 pp.

Inspec 4529435 B9401-6140C-063 C9401-1250-042 Doc Type: Conference Paper Title: Efficient compression of wavelet coefficients for smooth and fractal like data Authors: Culik, K., H; Dube, S.; Rajcani. P. Affiliation: Dept. of Comput. Sci., South Carolina Univ., Columbia, SC, USA Conf. Title: DCC '93. Data Compression Conference (Cat. No. 93TH0536-3) pp. 234-243 Editors: Storer, J.A.; Cohn, M. Publisher: IEEE Comput. Soc. Press Los Alamitos, CA, USA Date: 1993 xiii+505 pp.

Inspec 4529436 B9401-6140C-064 C9401-5260B-035 Doc Type: Conference Paper Title: Fractal based image compression with affine transformations Authors: Raittinen, H.; Kaski, K. Affiliation: Dept. of Electr. Eng., Tampere Univ. of Technol., Finland Conf. Title: DCC '93. Data Compression Conference (Cat. No. 93TH0536-3) pp. 244-253 Editors: Storer, J.A.; Cohn, M. Publisher: IEEE Comput. Soc. Press Los Alamitos, CA, USA Date: 1993 xiii+505 pp.

Inspec 4529437 B9401-6140C-065 C9401-1250-043 Doc Type: Conference Paper Title: Generalized fractal transforms; complexity issues Authors: Monro, D.M. Affiliation: Sch. of Electron. & Electr. Eng., Bath Univ., UK Conf. Title: DCC '93, Data Compression Conference (Cat. No. 93TH10536-3) pp. 254-261 Editors: Storer,

(56) References Cited

OTHER PUBLICATIONS

J.A.; Cohn, M. Publisher: IEEE Comput. Soc. Press Los Alamitos, CA, USA Date: 1993 xiii+505 pp.
Inspec 4532589 B9401-6140C-091 C9401-1250-060 Doc Type: Journal Paper Title: Fractal image compression Authors: Goojun Lu Affiliation: Dept. of Syst. & Comput. Sci., Nat. Univ. of Singapore, Singapore Journal: Signal Processing: Image Communication vol. 5 Iss: 4 pp. 327-343 Date: Oct. 1993.
Inspec 4535866 B9401-6140C-121 C9401-1250-084 Doc Type: Conference Paper in Journal Title: Fractal equations and their solutions Authors: Liu, Y. Affiliation: Dept. of Math. & Comput. Sci., Savannah State Coll., GA, USA Journal: Proceedings of the SPIE—The International Society for Optical Engineering vol. 1904 pp. 52-68 Date: 1993.
Inspec 4544295 C9401-5260B-140 Doc Type: Journal Paper Title: Trackability as a cue for potential obstacle identification and 3-D description Authors: Sawhney, H.S.; Hanson, A.R. Affiliation: Dept. of Comput. Sci., Massachusetts Univ., Amherst, MA, USA Journal: International Journal of Computer Vision vol. II Iss: 3 pp. 237-265 Date: Dec. 1993.
Inspec 4547438 C9401-5260B-162 Doc Type: Conference Paper Title: A hierarchy of invariant representations of 3D shape Authors: Weinshall, D. Affiliation: Inst. of Comput. Sci., Hebrew univ. of Jerusalem, Israel Conf. Title: Proceedings of IEEE Workshop Qualitative Vision (Cat. No. 93TH0521-5) pp. 97-106 Publisher: IEEE Comput. Soc. Press Los Alamitos, CA, USA Date: 1993, evi+151 pp.
Inspec 4547439 C9401-5260B-163 Doc Type: Conference Paper Title: A geometric invariant for visual recognition and 3D reconstruction from two perspective/orthographic views Authors: Shashua, A. Affiliation: Dept. of Brain & Cognitive Sci., MIT, Cambridge, MA, USA Conf. Title: Proceedings of IEEE Workshop on Qualitative Vision (Cat. No. 93TH0521-5) pp. 107-117 Publisher: IEEE Comput. Soc. Press Los Alamitos, CA, USA Date: 1993 vi+151 pp.
Inspec 4548815 B9401-6140C-277 C9401-1250-198 Doc Type: Conference Paper in Journal Title: Image-data-based matching for affine transformed pictures Authors: Nomura, Y.; Harada. Y.; Fujii, S. Affiliation: Dept. of Inf. Eng., Nagoya Univ., Japan Journal: Proceedings of the SPIE—The International Society for Optical Engineering vol. 1827 pp. 97-104 Date: 1993.
Inspec 4549004 B9401-6140C-300 C9401-1250-215 Doc Type: Journal Paper Title: Modeling of deterministic chaotic noise to improve target recognition Authors: McAulay, P.D.; Saruhan, K. Affiliation: Dept. of Electr. Eng. & Comput. Sci., Lehigh Univ., Bethlehem, PA, USA Journal: Proceedings of the SPIE—The International Society for Optical Engineering Vol. 1955 pp. 210-217 Date: 1993.
Inspec 4549014 B9401-6140C-307 C9401-1250-222 Doc Type: Journal Paper Title: Determining the fractal dimension of scenes and digital signals using Roseta and other novel approaches Authors: Jaznisch, H.M.; Barton, P.E.; Carruth, R.T. Affiliation: Nichols Res. Corp., Huntsville, AL, USA Journal: Proceedings of the SPIE—The International Society for Optical Engineering vol. 1995 pp. 298-315 Date: 1993.
Inspec 4550663 B9401-6140C-331 C9401-1250-237 Doc Type: Journal Paper Title: A 3-D vision system model for automatic object surface sensing Authors: Theodoracatos, V.E.; Calkins, D.E. Affiliation: Sch. of Aerosp. & Mech. Eng., Oklahoma Univ., Norman, OK, USA Journal: International Journal of Computer Vision vol. II Iss: 1 pp. 75-99 Date; Aug. 1993.
Inspec 4555192 B9402-6140C-006 C9401-1250-003 Doc Type: Journal Paper Title: Contractivity of fractal transforms for image coding Authors: Hungen, B. Affiliation: Inst. of Commun. Eng., Azchen Univ. of Technol., Germany Journal: Electronics Letters vol. 29 Iss: 20 pp. 1749-1750 Date: Sep. 30, 1993.
Inspec 4561907 B9402-6140C-053 C9402-1250-037 Doc Type: Journal Paper Title: Improved fractal geometry based texture segmentation technique Authors: Chaudhuri, B.D.; Satkar, N.; Kundu, P. Affiliation: Electron. & Commun. Sci. Unit. Indian Stat. Inst., Calcutta, India Journal: IEE Proceedings E [Computers and Digital Techniques] vol. 140 Iss: 5 pp. 233-241 Date: Sep. 1993.
Inspec 4567756 B9402 6140C-035 C9402-1250-060 Doc Type: Journal Paper Title: Moment-based edge detection in anisotropic image data Authors; Xie Xiaoua, Luo Limin; Wei Yu Affiliation: Dept. of Biol. & Med. Eng., Southeast Univ., Nanjing, China Journal: Acta Electronica Sinica vol. 21 Iss: 10 pp. 14-21 Date: Oct. 1993.
Inspec 4571131 C9402-5260B-064 Doc Type: Journal Paper Title: A framework for spatiotemporal control in the tracking of visual contours Authors: Blake, A.; Curwen, R.; Zisserman, A. Affiliation: Dept. of Eng. Sci., Oxford Univ., UK Journal: International Journal of Computer Vision vol. II Iss: 2 pp. 127-145 Date: Oct. 1993.
Inspec 4572079 B9402-6140C-117 C9402-1250-083, Doc Type: Journal Paper, Title: Image data matching for affine transformed pictures—reduction of calculation, Authors: Ujifuku, S.; Nomura, Y.; Fujii, S., Affiliation: Fac. of Eng., Nagoya Univ., Japan, Journal: Transactions of the Institute of Electronics, Information and Communication Engineers D-II vol. J76D-II Iss: 8 pp. 1581-1586, Date: Aug. 1993.
Inspec 4575223 B9402-6140C-175 C9402-5260B-097 Doc Type: Conference Paper Title: An interleaved scanline algorithm for 2-D affine transformations of images Authors: Kannappan, K. Affiliation: LSI Logic, Milpitas, CA, USA Conf. Title: Proceedings of the 35th Midwest Symposium on Circuits and Systems (Cat. No. 92CH3099-9) pp. 179-182 vol. 1 Publisher: IEEE New York, NY, USA Date: 1992 2 vol. xxviii+1584 pp.
Inspec 4575628 B9402-6140C-214 C9402-1250-172 Doc Type: Conference Paper Title: Fractal dimension image for texture segmentation Authors: Zhi-Yan Xie; Brady, M. Affiliation: Dept. of Eng. Sci., Oxford Univ., UK Conf. Title: ICARCV '92, Second International Conference on Automation, Robotics and Computer Vision p. CV-4.3/1-5 vol. 1 Publisher: Nanyang Technol. Univ Singapore Date: 1992 3 vol. (viii+934+viii+861+vii+908 pp.).
Inspec 4575679 B9402-6140C-251 C9402-1250-198, Doc Type: Conference Paper, Title: A multiresolution region-growing technique for image motion estimation, Authors: Wooi Boon Goh; Marin, G.R., Affiliation: Sch. of Appl. Sci., Nanyang Technol. Univ., Singapore, Conf. Title: ICARCV '92, Second International Conference on Automation, Robotics and Computer Vision, p. CV-11.5/1-5 vol. 1, Publisher: Nanyang Technol. Univ Singapore, Date: 1992 3 vol. (viii+934+viii+861+vii+908 pp.).
Inspec 4575763 C9402-1230D-093 Doc Type: Conference Paper Title: Fractal-like self-organizing associative memory for spatiotemporal patterns Authors: Nishina, T.; Hagiwarz, M.; Nakagawa, M. Affiliation: Dept. of Electr. Eng., Keio Univ., Yokohama, Japan Conf. Title: ICARCV '92. Second International Conference on Automation, Robotics and Computer Vision p. INV-7.1/106 vol. 1 Publisher: Nanyang Technol. Univ Singapore Date: 1992 3 vol. (viii+934+viii+861+vil+908 pp.).
Inspec 4575769 B9402-6140C-251 C9402-1250-198 Doc Type: Conference Paper Title: A multiresolution region-growing technique for image motion estimation Authors: Wooi Boon Goh; Martin, G.R. Affiliation: Sch. of Appl. Sci., Nanyang Technol. univ., Singapore Conf. Title: Icarcv '92. Second International Conference on Automation, Robitics and Computer Vision p. CV-11.5/1-5 vol. 1 Publisher: Nanyang Technol. Univ Singapore Date: 1992 3 vol. (viii+934+viii+861+vil+908 pp.).
Inspec 4579482 B9403-6140C-007 C9403-1250-003 Doc Type: Journal Paper Title: Moment-based edge detection in anisotropic image data Authors: Xie Xiaohus; Luo Limin; Wel Yu Affiliation: Dept. of Biol. & Med. Eng., Southeast Univ., Nanjing, China Journal: Chinese Journal of Electronics vol. 2 Iss: 2 pp. 12-18 Date: Jul. 1993.
Inspec 4579882 B9403-6140C-011 C9403-5260B-007 Doc Type: Conference Paper in Journal Title: Experiments in the use of fractal in computer pattern recognition Authors: Sadjadi, F. Affiliation: Mach. Intelligence Co., Los Angeles, CA, USA Journal: Proceedings of the SPIE—The International Society for Optical Engineering vol. 1960 pp. 214-222 Date: 1993.
Inspec 4579906 B9403-6140C-020 C9403-1250-013, Doc Type: Conference Paper in Journal, Title: Iconic system for object recognition and location determination, Authors: Popov, M.; Reznik, A.;

(56) References Cited

OTHER PUBLICATIONS

Shkwar, A., Affiliation: Kiev High Aviation Eng. Sch., Ukraine, Journal: Proceedings of the SPIE—The International Society for Optical Engineering, vol. 1960 pp. 466-474, Date: 1993.

Inspec 4580742 B9403-6140C-033 C9403-1250-022 Doc Type: Journal Paper Title: On the calculation of Fractal features from images Authors: Chen, S.S.; Keller, J.M.; Crownover, R. M. Affiliation: Allied Bendix/King Radio Corp., Olathe, KS, USA Journal: IEEE Transactions on Pattern Analysis and Machine Intelligence vol. 15 Iss: 10 p. 1087-90 Date: Oct. 1993.

Inspec 458378 C9403-5260B-028 Doc Type: Conference Paper Title: Frame-to-frame image motion estimation with fuzzy logic system Authors: Lipp, J. I. Affiliation: Dept. of Electr. Eng., Michigan Technol. Univ. Houghton, MI, USA Conf. Title: Proceedings of the 35.sup.th Midwest Symposium on Circuits and Systems (Cat. No. 92 CH3099-9) p. 987-90-7 vol. 2 Publisher: IEEE New York, NY, USA Date 1992 2 vol. xxvii+1584 pp.

Inspec 4584412 B9403-6140C-070 C9403-1250-053 Title: Application of the EM technique to estimation of affine modeled image motion Authors: Shaltaf, S.; Namazi, N.M. Affiliation: Dept. of Electr. Eng., Michigan Technol. Univ. Houghton, MI, USA Conf. Title: Proceedings of the 35.sup.th Midwest Symposium on Circuits and Systems (Cat. No. 92CH3099-9) p. 1324-7 Publisher: IEEE New York, NY, USA Date 1992 2 vol. xxvii+1584 pp.

Inspec 4584709 B9403-6140C-079 C9403-1250-063 Doc Type: Conference Paper Title: Classification of texture by an association between a self-organizing feature map Authors: Maillard, E.; Zeir, D.; Merckle, J. Affiliation: IRP, Mulhouse, France Conf. Title: Signal Processing VI—Theories and Applications, Proceedings of Eusipco 92, Sixth European Signal Processing Conference pp. 1173-1176 vol. 2 Editors: Vandewaile, J.; Doite, R.; Moonen, M.; Oosterlinck, A. Publishers: Elsevier Amsterdam, Netherlands Date: 1992 3 vol. ivii+1844 pp.

Inspec 4588458 B9403-6140C-121 C9403-1250-100 Doc Type: Journal Paper Title: Viewpoint independent representation and recognition of polygonal faces in 3-D Authors: Bunke, H.; Glauser, T. Affiliation: Bern Univ, Switzerland Journal: IEEE Transactions on Robotics and Automation vol. 9 Iss. 4 p. 457-63. Date: Aug. 1993.

Inspec 4589423 B9403-1295-008 C9403-5190-007 Doc Type: Journal Paper Title: Generalization ability of extended cascaded artificial neural network architecture Authors: Kamruzzaman, J.; Kumagal, Y.; Hikita, H. Affiliation: Dept. of Electr. & Electron. Eng., Bangladesh Univ. of Eng. & Technol., Dhaks, Bangladesh Journal: IEICE Transactions on Fundamentals of Electronics, Communications and Computer Sciences vol. E76-A Iss: 10 pp. 1877-1883 Date: Oct. 1993.

Inspec 4591752 C9403-61605-018 Doc Type: Conference Paper in Journal Title: Self-aligning and compressed autosophy video databases Authors: Holtz, K. Affiliation: Omni Dimensional Networks, San Francisco, CA, USA Journal: Proceedings of the SPIE—The International Society for Optical Engineering vol: 1908 p. 37-48 Date: 1993.

Inspec 4592004 B9403-6140C-208 C9403-1250-163 Doc Type: Conference Paper in Journal Title: Optical Hart wavelet transform for image features extraction Authors: Guofan Jin; Yinbai Yan; Wenlu Wang; Zhiqing Wen; Minxian Wu Affiliation: Dept. of Precision Instrum, Tsinghua Univ., Beijing, China Journal: Proceedings of the SPIE—The International Society for Optical Engineering vol. 2034 pp. 371-380 Date: 1993.

Inspec 4592282 B9403-6140C-217 C9403-1250-172 Doc Type: Journal Paper Title: Introducing rotation invariance into the neocognitron model for target recognition Authors: Chihwen Li; Chwan-Hwa Wu Affiliation: Dept. of Electr. Eng., Auburn Univ., AL, USA Journal: Pattern Recognition Letters vol. 14 Iss: 12 pp. 985-995 Date: 1993.

Inspec 4593814 B9403-6140C-224 C9403-1250-176 Doc Type: Journal Paper Title: Multi-modular neural network architectures: applications in optical character and human face recognition Authors: Soulic, F.F.; Viennet, E.; Lamy, B. Affiliation: Lab. de Recherche en Inf., Univ. de Paris-Sod, Orsay, France Journal: International Journal of Pattern Recognition and Artificial Intelligence vol. 7 Iss: 4 pp. 721-755 Date: Aug. 1993.

Inspec 4593819 B9403-6140C-226 C9403-1250-178 Doc Type: Journal Paper Title: Invariant object recognition based on a neural network of cascaded RCE nets Authors: Li, W.; Nasrabadi, N.M. Affiliation: Dept. of Electr. & Comput. Eng., State Univ. of New York, Buffalo, NY, USA Journal: International Journal of Pattern Recognition and Artificial Intelligence vol. 7 Iss: 4 pp. 815-829 Date: Aug. 1993.

Inspec 4595560 B9403-7230C-035 C9403-3240E-002 Doc Type: Conference Paper Title: A CMOS silicon VI SI optical sensor Authors: Camp, W.O., Jr.; Van der Splegel, J. Affiliation: IBM Federal Syst. Co., Owego, NH, USA Conf. Title: 1992 IEEE International Conference on Systems, Man and Cybernetics (Cat. No. 92CH3176-5) pp. 25-30 vol. 1 Publisher: IEEE New York, NY, USA Date: 1992 2 vol. xviii+1735 pp.

Inspec 4595625 B9403-6140C-264 C9403-1250-198 Doc Type: Conference Paper Title: Vector contour representation for object recognition in neural networks Authors: Starzyk, J.A.; Chai, S. Affiliation: Dept. of Electr. & Comput. Eng., Ohio Univ., Athena, OH, USA. Conf. Title: 1992 IEEE International Conference on Systems, Man and Cybernetics (Cat. No. 92CH3176-5) pp. 299-404 vol. 1 Publisher: IEEE New York, NY, USA Date: 1992 2 vol. xviii+1735 pp.

Inspec 4595662 C9403-1250-200 Doc Type: Conference Paper Title: Comments on the evaluation of a certain pattern classification method as an intellectual information processing Authors: Munakata, T.; Okashita, K.; Nakahara, T. Affiliation: Dept. of Mech. Eng., Hiroshima-Denki Inst. of Technol., Hiroshima-city, Japan Conf. Title: 1992 IEEE International Conference on Systems, Man and Cybernetics (Cat. No. 92CH3176-5) pp. 611-616 vol. 1 Publisher: IEEE New York, NY, USA Date: 1992 2 vol. xviii+1735 pp.

Inspec 4596005 B9403-6140C-279 C9403-1250-213 Doc Type: Conference Paper Title: Reducing the complexity of a fractal-based image coder Authors: Oien. G.E.; Leposy, S.; Ramstad, T.A. Affiliation: Inst. for Teleteknikk, Norges Tekniska Hogskola Trondheim Norway Conf. Title: Signal Processing VI, Theories and Applications, Proceedings of EUSIPCO-92, Sixth European Signal Processing Conference p. 1353-6 vol. 3 Editors: Vandewalle J.; Bolte, R.; Moonen, M.; Oosterlinck, A. Publisher: Elsevier Amsterdam, Netherlands Date: 1992 3 vol. lvil 1844 pp.

Inspec 4596010 B9403-6140C-282 C9403-1250-215 Doc Type: Conference Paper Title: An efficient image compression algorithm based on filter bank analysis and fractal theory Authors: Temerinac, M.; Kozzrev, A.; Tipovski, Z.; Simsic, B. Affiliation: Fac. of Tech. Sci., Novi Sad univ., Yugoslavia Conf. Title: Signal Processing VI—Theories and Applications Proceedings of EUSIPCO-92, Sixth European Signal Processing Conference pp. 1373-1376 vol. 3 Editors: Vandewalie, J.; Boite, R.; Moonen, M.; Oosterlinck, A. Publisher: Elsevier Amsterdam, Netherlands, Date: 1992 3 vol. 1vii+1844 pp.

Inspec 4596362 C9403-1230D-112 Doc Type: Conference Paper Title: Invariant object recognition using Fahiman and Lebiere's learning algorithm Authors: Ito, K.; Hamamoto, M.; Kamruzzaman, J.; Kumagal, Y. Affiliation: Dept. of Comput. Sci., Mutoran Inst. of Technol., Japan Conf. Title: New Trends in Neural Computation. International Workshop on Artifcial Neural Networks. Iwann '93 Proceedings pp. 237-242 Editors: Mira J.; Cabestany, J.; Prieto, A. Publishers: Springer-Verlag Berlin, Germany Date: 1993 746 pp.

Inspec 4597653 B9403-6140C-294 C9403-1250-229 Doc Type: Conference Paper in Journal Title: Affine-invariant moments and B-splines for object recognition from image curves Authors: Huang, Z.; Cohen, F.S. Affiliation: Dept. of Electr. & Comput. Eng., Drexel Univ., Philadelphia, PA, USA Journal: Proceedings of the SPIE—The International Society for Optical Engineering vol. 1964 pp. 2-12 Date: 1993.

Inspec 4597772 A9406-1230-014 B9403-4120-043 Doc Type: Conference Paper in Journal Title: Optical processing and storage with bacteriorbodopsin Authors: Brauchle, C.; Hampp. N.; Oesterhelt, D. Affiliation: Inst. for Phys. Chem., Munchen Univ., Germany Journal: Proceedings of the SPIE—The International Society for Optical Engineering vol. 1852 pp. 238-242 Date: 1993.

(56) References Cited

OTHER PUBLICATIONS

Inspec 460339 B9410-1230-017 B9405-6410C-162 C9405-1250-113 Doc Type: Journal Paper Title: Recognition of partially occluded objects by correlation methods Authors: Campos. J.; Styczynski, K.,; Yzuei, M.J.; Chalasinska-Macukow, K. Affiliation: Dept. of Phys., Barcelona Univ., Spain Journal: Optics Communications vol. 106 Iss: 1-3 pp. 45-51 Date: Mar. 1, 1994.

Inspec 4603677 C9404-1230D-003 Doc Type: Conference Paper in Journal Title: Differential theory of learning for efficient neural network pattern recognition Authors: Hampshire, J.B., II; Vijaya Kumar, B.V.K. Affiliation: Dept. of Electr. & Comput. Eng., Carnegie Mellon Univ., Pittsburgh, PA USA Journal: Proceedings of the SPIE—The International Society for Optical Engineering vol. 1965 pp. 76-95 Date: 1993.

Inspec 4603689 B9404-6140C-029 C9404-1250-021 Doc Type: Conference Paper in Journal Title: Evaluation of the fractal dimension as a pattern recognition feature using neutral networks Authors: DaPonte, J.; Parikh, J.A.; Decker, J.; Vitale, J. Affiliation: Southern Connecticut State Univ., New Haven, CT USA Journal: Proceedings of the SPIE—The International Society for Optical Engineering vol. 1965 pp. 221-231 Date: 1993.

Inspec 4604007 C9404-5260B-015 Doc Type: Journal Paper Title: Fuzzy control systems for image Identification Authors: Xaldert, J.; Kerber, J.V. Journal: Elektronik vol. 42 Iss: 24 pp. 84, 89-91 Date Nov. 30, 1993.

Inspec 4606815 C9404-5290 004 Doc Type: Journal Paper Title: The use of neural networks in pattern recognition and control Authors: Windsor, C.,G. Affiliation: Nat. Nondestructive Test. Centre, Harwell Lab., UK Journal: Systems Science vol. 19 Iss: 3 pp. 31-41 Date: 1993.

Inspec 460782 B9404-6140C-067 C9404-1250-040 Doc Type: Conference Paper Title: Gabor wavelet transform and application to problems in early vision Authors: Mahjunath, B.S. Affilication: Dept. of Electr. & Comput. Eng., California Univ., Santa Barbara, CA, USA Conf. Title: Conference Record at the Twenty-Sixth Asilomar Conference on Signals, Systems and Computers (Cat. No. 92CH3245-8) pp. 796-800 vol. 2. Editors: Singh, A. Publisher: IEEE Comput. Soc. Press Los Alamitos, CA, USA Date: 1992 2 vol. (xviii+xix+1156 pp.).

Inspec 4607842 B9404-6140C-067 C9404-1250-040 Doc Type: Conference Paper Title: Gabor wavelet transform and application to problems in early vision Authors: Manjunath, B.S. Affiliation: Dept. of Electr. & Comput. Eng., California Univ., Santa Barbara, CA, USA Conf. Title: Conference Record of the Twenty-Sixth Asilomar Conference on Signals, Systems and Computers (Cat. No. 92CH3245-8) p. 796-800 vol. 2 Editors: Singh, A. Publisher: IEEE Comput. Soc. Press Los Alamitos, CA, USA Date: 1992 2 vol. (xviii+xix+1156 pp.).

Inspec 4607867 B9404-6310-009 C9404-7410-010 Doc Type: Conference Paper Title: High resolution radar target identification Authors: Novak, L.M.; Irving, W.W.; Verbout, S.M.; Owirka, G.J. Affiliation: MIT Lincoln Lab., Lexington, MA, USA Conf. Title: Conference Record at the Twenty-Sixth Asilomar Conference on Signals, Systems and Computers (Cat. No. 92CH3245-8) p. 1048-1057 vol. 2 Editors: Singh, A. Publisher: IEEE Comput. Soc. Press Los Alamitos, CA, USA Date: 1992 2 vol. (xviii+xix+1156 pp.).

Inspec 4607872 B9404-6140C-074 C9404-1250-045 Doc Type: Conference Paper Title: Characterization of clutter in IR images using maximum likelihood adaptive neural system Authors: Perlovsky, L.Il; Jaskolski, J.J.; Chernick, J. Affiliation: Nicholas Res. Corp., Wakefield, MA, USA Conf. Title: Conference Record of the Twenty-Sixth Asilomar Conference on Signals, Systems and Computers (Cat. No. 92CH3245-8) pp. 1076-1080 vol. 2 Editors: Singh, A. Publisher: IEEE Comput. Soc. Press Los Alamitos, CA, USA Date: 1992 2 vol. (xviii+xix+1156 pp.).

Inspec 460835 B9407-6140C-081 C9407-1250-055 Doc Type: Journal Paper Title: Affine theorem for the Hartey transform of an image Authors: Bracewell, R.N. Affiliation: Space, Telecommun. & Radiosci. Lab., Stanford Univ., CA, USA Journal: Proceedings of the IEEE vol. 82 Iss: 3 pp. 388-390 Date: Mar. 1994.

Inspec 4609089 B9404-6140C-114 C9404-1250-055 Doc Type: Conference Paper in Journal Title: Feature competition and domain of attraction in artificial-perceptron pattern-recognizer Authors: Mu, C.I,.J. Affiliation: Dept. of Electr. Eng., Southern Illinois Univ., Carbondale, IL, USA Journal: Proceedings of the SPIE—The International Society for Optical Engineering vol. 2032 pp. 87-90 Date: 1993.

Inspec 4609092 B9404-6140C-117 C9404-1250-057 Doc Type: Conference Paper in Journal Title: Storing temporal sequences of patterns in neural networks Authors: Krishzswamy, D.; Mehrotra, K.; Mohan, C.K.; Ranka, S. Affiliation: Sch. of Comput. & Inf. Sci., Syracuse Univ. NY, USA Journal: Proceedings of the SPIE—The International Society for Optical Engineering vol. 2032 pp. 120-126 Date: 1993.

Inspec 4609095 B9404-6140C-120 C9404-1250-059 Doc Type: Conference Paper in Journal Title: Spatio-temporal pattern recognition using hidden Markov models Authors: Fielding, K.H.; Ruck, D.W.; Fogers, S.K.; Welsh, B.M.; Oxely, M.E. Affiliation: Air Force Inst. of Technol., Dept. of Electr. & Comput. Eng., Wright-Patterson AFB, OH, USA Journal: Proceedings of the SPIE—The International Society for Optical Engineering vol. 2032 pp. 144-154 Date: 1993.

Inspec 4609098 B9404-6140C-112 C9404-1250-061, Doc Type: Conference Paper in Journal, Title: Evolving neural network pattern classifiers, Authors: McDonnell, J.R.; Waagen, D.E.; Page, W.C., Affiliation: NCCOSC, RDT&E Div., San Diego, CA, USA, Journal: Proceedings of the SPIE—The International Society for Optical Engineering, vol. 2032 pp. 176-187, Date: 1993.

Inspec 4609104 B9404-6140C-127 C9404-1250-064 Doc Type: Conference Paper in Journal Title: Robust fractal characterization of 1-D and 2-D signals Authors: Avadhanam, N.; Mitra, S. Affiliation: Dept. of Electr. Eng., Texas Tech. Univ., Lubbock, TX, USA Journal: Proceedings of the SPIE—The International Society for Optical Engineering vol. 2032 pp. 232-244 Date: 1993.

Inspec 4612850 B9404-6140C-173 C9404-1250-096 Doc Type: Conference Paper Title: A fractal block coding technique employing frequency sensitive competitive learning Authors: Wall, L.; Kinsner, W. Affiliation: Dept. of Electr. & Comput. Eng., Manitoba Univ., Winnipeg, Man., Canada Conf. Title: IEEE WESCANEX 93. Communications, Computers and Power in the Modern Environment Conference Proceedings (Cat. No. 93CH3317-5) pp. 320-329 Publisher: IEEE New York, NY, USA Date: 1993 ix+415 pp.

Inspec 4614452 B9404-6140C-184 C9404-1250-107 Doc Type: Conference Paper in Journal Title: Extensions of fractal theory Authors: Liu, Y. Affiliation: Dept. of Math. & Comput. Sci., Savannah State Coll., GA, USA Journal: Proceedings of the SPIE—The International Society for Optical Engineering vol. 1966 pp. 255-268 Date: 1993.

Inspec 4614474 A9408-0130C-007 B9404-0100-039 C9404-7330-067 Doc Type: Conference Proceedings in Journal Conf. Title: Medical Imaging 1993: Image Processing Journal: Proceedings of the SPIE—The International Society for Optical Engineering vol. 1898 Date: 1993.

Inspec 46144745 A9408-0130C-007 B9404-0100-039 C9404-7330-067, Doc Type: Conference Proceedings in Journal, Conf. Title: Medical Imaging 1993; Image Processing, Journal: Proceedings of the SPIE—The International Society for Optical Engineering, vol. 1898, Date: 1993.

Inspec 4614533 B9401-0100-043 C9404-1250-113, Doc Type: Conference Proceedings in Journal, Conf. Title: Visual Communications and Image Processing '93, Journal: Proceedings of the SPIE—The International Society for Optical Engineering, vol. 2094 Iss: pt. 1. Date 1993.

Inspec 4614545 B9404-6140C-196 C9404-1250-118 Doc Type: Conference Paper in Journal Title: Fractal approach to low rate video coding Authors: Hurtgen, B.; Burtgen, P. Affiliation: Inst. for Commun. Eng., Aachen Univ. of Technol., Germany Journal: Proceedings of the SPIE—The International Society for Optical Engineering vol. 2094 Iss: pt.1 pp. 120-131 Date: 1993.

Inspec 4614546 B9404-6140C-197 C9404-1250-119 Doc Type: Conference Paper in Journal Title: Sequence coding based on the fractal theory of iterated transformations systems Authors: Reusens, E. Affiliation: Signal Process. Lab., Swiss Federal Inst. of Technol.,

(56) References Cited

OTHER PUBLICATIONS

Lausanno, Switzerland Journal: Proceedings of the SPIE—The International Society for Optical Engineering vol. 2094 Iss: pt.1 pp. 132-140 Date: 1993.
Inspec 4617406 A9408-4230-005 B9404-6140C-251 C9404-1250-152 Doc Type: Journal Paper Title: Optoelectronically implemented three-layer neural network with 100.RTM.100 input for pattern recognition Authors: Gao-Guang, Stu: Yang Sun: Yanxin Zhang; Xangpeng Yang Affiliation: Inst. of Modern Opt., Nankai Univ., Tianjin, China Journal: Optical Memory & Neural Networks vol. 2 Iss: 3 pp. 151-155 Date: 1993.
Inspec 4617407 A9408-4240-004 B9404-4180-027 C9404-5270-022 Doc Type: Journal Paper Title: Holographic implementation of interpattern association (IPA) neural network Authors: Taiwei Lu; Lin. F. Affiliation: Physical Opt. Corp., Torrance, CA, USA Journal: Optical Memory & Neural Networks vol. 2 Iss: 3 pp. 157-166 Date: 1993.
Inspec 4619943 C9404-7480-093 Doc Type: Conference Paper in Journal Title: Recognition of containers using a multidimensional pattern classifier Authors: Magee, M.; Weniger, R.; Wenzel, D.; Pirasteh, R. Affiliation: Dept. of Comput. Sci., Wyoming Univ., Laramie, WY, USA Journal: Proceedings of the SPIE—The International Society for Optical Engineering vol. 1825 pp. 33-45 Date: 1992.
Inspec 4619946 B9404-6140C-271 C9404-1250-164 Doc Type: Conference Paper in Journal Title: Pattern recognition using Hilbert space Authors: Lin, Y. Affiliation: Dept. of Math. and Comput. Sci., Savannah State Coll., GA, USA Journal: Proceedings of the SPIE—The International Society for Optical Engineering vol. 1825 pp. 63-77 Date: 1992.
Inspec 4619976 C9404-5260B-168 Doc Type: Conference Paper in Journal Title: Algorithm for dynamic object tracking Authors: Datcu, M.; Folta, F.; Toma, C. Affiliation: Polytechnic Inst. of Bucharest, Romania Journal: Proceedings of the SPIE—The International Society for Optical Engineering vol. 1825 pp. 389-394 Date: 1992.
Inspec 4620036 C9404-1230-048 Doc Type: Conference Paper in Journal Conf. Title: Adaptive and Learning Systems II Journal: Proceedings of the SPIE—The International Society for Optical Engineering vol. 1962 Date: 1993.
Inspec 4620225 B9404-6140C-346 C9404-1250-215 Doc Type: Conference Paper in Journal Title: A pyramid AR model to generate fractal Brownian random (FBR) field Authors: Bingcheng Li; Song Do Ma Affiliation: Inst. of Autom., Chinese Acad. of Sci., Beijing, China Journal: Proceedings of the SPIE—The International Society for Optical Engineering vol. 2094 Iss: pt.3 pp. 1094-1102 Date: 1993.
Inspec 4620235 B9404-6140C-354 C9404-1250-220 Doc Type: Conference Paper in Journal Title: Fractal-based image coding with polyphase decomposition Authors: Kwn-lyt Wong; Ching-Han Hsu; Jay Kuo, C.-C. Affiliation: Dept. of Electr. Eng. Syst., univ. of Southern California, Los Angeles, CA, USA Journal: Proceedings of the SPIE—The International Society for Optical Engineering vol. 2094 Iss: pt.3 pp. 1207-1218 Date: 1993.
Inspec 4620247 A9408-4230-008 B9404-6140C-359 C9404-1250-224 Doc Type: Conference Paper in Journal Title: Sequential and fused optical filters for clutter reduction and detection Authors: Casasent, D. Affiliation: Dept. of Electr. & Comput. Eng., Carnegie Mellon Univ., Pittsburgh, PA, USA Journal: Proceedings of the SPIE—The International Society for Optical Engineering vol. 1959 pp. 2-11 Date: 1993.
Inspec 4620253 B9404-4150D-005 C9404-5260B-212 Doc Type: Conference Paper in Journal Title: Programmable 128*128 ferroelectric-liquid-crystal spatial-light-modulator compact correlator Authors Serati, S.A.; Ewing, T.K., Serati, R.A.; Johnson, K.M.; Simon, D.M. Affiliation: Boulder Nonlinear Syst. Inc., Boulder, CO, USA Journal: Proceedings of the SPIE—The International Society for Optical Engineering vol: 1959 p. 55-68 Date: 1993.
Inspec 4620259 B9404-6140C-368 C9404-5260B-217 Doc Type: Conference Paper in Journal Title: Automatic target recognition with intensity-and distortion-invariant hybrid composite filters Authors: Rahmati. M.; Hassebrook, L.G.; Vijaya Kumar, B.V.K. Affiliation: Dept. of Electr. Engl., Kentucky Univ., Lexington, KY, USA Journal: Proceedings of the SPIE—The International Society for Optical Engineering vol. 1959 pp. 133-145 Date: 1993.
Inspec 4620265 A9408-4230-017 B9404-6140C-374 C9404-1250-233 Doc Type: Conference Paper in Journal Title: Distortion invariant optical pattern recognition using composite binary filters Authors: Roe, M.G.; Sebehrer, K.L.; Dobson, R.; Schirber, L. Affiliation: Rocketdyne Div., Rockwell Int. Corp., Canoga Park, CA, USA Journal: Proceedings of the SPIE—The International Society for Optical Engineering vol. 1959 pp. 203-213 Date: 1993.
Inspec 4620266 A9408-1230-018 B9404-6140C-375 C9404-1250-234 Doc Type: Conference Paper in Journal Title: Design of distortion-invariant correlation filters using supervised learning Authors: Kozaitis, S.P.; Coter, R.H.; Foot, W.E. Affiliation: Dept. of Electr. & Comput. Eng., Florida Inst. of Technol., Melbourne, FL, USA Journal: Proceedings of the SPIE—The International Society for Optical Engineering vol. 1959 pp. 214-219 Date: 1993.
Inspec 4620268 B9404-8520B-006 C9404-5260B-220 Doc Type: Conference Paper in Journal Title: Optical roadsign recognition to improve active safety features Authors: Guibert, L.: Keryer, G.; Attia, M. Affiliation: Groupe Optique et Syst. de Commun., Telecom Bretagne, Brest, France Journal: Proceedings of the SPIE—The International Society for Optical Engineering vol. 1959 pp. 230-234 Date: 1993.
Inspec 4624108 C9404-6130B-051 Doc Type: Journal Paper Title: Coloring of a landscape by fuzzy logic Authors: Terano, T.; Masui, S.; Terada, T.; Watanabe, H. Journal: Japanese Journal of Fuzzy Theory and Systems vol. 5 Iss: 2 pp. 209-221 Date: 1993.
Inspec 4625222 C9404-5530-010 Doc Type: Conference Paper Title: Extending conventional template matching to include color, rotation, and scale Authors: McGarry, F.J. Conf. Title: Proceedings of the International Robots and Vision Automation Conference P. 4/5 Publisher: Robotic Ind Assoc Ann Arbor, MI, USA Date 1993 xxv+889 pp.
Inspec 4626634 B9405-6140C 008 C9405-1250-009 Doc Type: Conference Paper in Journal Title: Invariant pattern recognition using higher-order neural networks Authors: Sundthankar, S.; Jaravine, V.A. Affiliation: Kingston Univ., UK Journal: Proceedings of the SPIE—The International Society for Optical Engineering vol: 1826 p. 160-7 Date: 1992.
Inspec 4626658 C9405-1250-021 Doc Type: Conference Paper in Journal Title: Computing part hierarchies of 3D object shape from metric and nonmetric surface representations Authors: Zlateva, S. Affiliation: Dept. of Comput. Sci., Boston Univ., MA, USA Journal: Proceedings of the SPIE—The International Society for Optical Engineering vol. 1826 pp. 419-427 Date: 1992.
Inspec 4626670 B9405-6140C-021 C9405-1250-027 Doc Type: Conference Paper in Journal Title: Search Space reductions in deriving a fractal set for an arbitrary shape Authors: Neuleton, D.J.; Garigliano, R. Affiliation: Sch. of Eng. & Comput. Sci., Durham Univ., UK Journal: Proceedings of the SPIE—The International Society for Optical Engineering vol. 1962 pp. 137-145 Date: 1993.
Inspec 4626676 B9405-6140C-025 C9405-1250-031 Doc Type: Conference Paper in Journal Title: Discriminant analysis in serial images using fractal based features Authors: Priebe, C.E.; Solka, J.L.; Rogers, G.W. Affiliation: Syst. Res. & Technol. Dept., Advanced Computation Technol., Dahlgren, VA, USA Journal: Proceedings of the SPIE—The International Society for Optical Engineering vol: 1962 p. 196-208 Date: 1993.
Inspec 4626677 B9405-6140C-026 C9405-1250-032 Doc Type: Conference Paper in Journal Title: A probabilistic approach to fractal based texture discrimination Authors: Soika, J.L.; Priebe, C.E.; Rogers, G.W. Affiliation: Dept. of Syst. Res. & Technol., Naval Surface Warfare Center, Dahlgren, VA, USA Journal: Proceedings of the SPIE—The International Society for Optical Engineering vol. 1962 pp. 209-218 Date: 1993.
Inspec 4626678 B9405-6140C-027 C9405-5260B-006 Doc Type: Conference Paper in Journal Title: Parallel computation of fractal dimension Authors: Hayes, H.I.; Solka, J.L.; Priebe, C.E. Affiliation: Syst. Res. & Technol. Dept., Naval Surface Warfare Center, Dahlgren,

(56) References Cited

OTHER PUBLICATIONS

VA, USA Journal: Proceedings of the SPIE—The International Society for Optical Engineering vol: 1962 p. 219-30 Date: 1993.
Inspec 4626788 B9405-6140C-043 C9405-1250-043 Doc Type: Conference Paper in Journal Title: Structural limitations of self-affine and partially self-affine fractal compression Authors: Domaszewicz, J.: Vaishampayan, V.A. Affiliation: Dept. fo Electr. Eng., Texas A&M Univ., College Station, TX, USA Journal: Proceedings of the SPIE—The International Society for Optical Engineering vol. 2094 Iss: pt.3 pp. 1498-1507 Date: 1993.
Inspec 4626801 B9405-6140C-056 C9405-1250-050 Doc Type: Conference Paper in Journal Title: An affine transform based image vector quantizer Authors: Brahmanandam, M.B.; Panchanathan, S.; Goldberg, M. Affiliation: Dept. of Electr. Eng., Ottawa Univ., Ont., Canada Journal: Proceedings of the SPIE—The International Society for Optical Engineering vol. 2094 Iss: pt.3 pp. 1639-1648 Date: 1993.
Inspec 4626891 B9405-6140C-079 C9405-5260B-039 Doc Type: Conference Paper in Journal Title: Object tracking through adaptive correlation Authors: Montera, D.A.; Rogers, S.K.; Ruck, D.W.; Oxley, M.E. Affiliation: Dept. of Electr. & Comput. Eng., Air Force Inst. of Technol., Wright-Patterson AFB, OH, USA Journal: Proceedings of the SPIE—The International Society for Optical Engineering vol. 1959 pp. 314-321 Date: 1993.
Inspec 4626929 B9405-6140C-087 C9405-5260B-047 Doc Type: Conference Paper in Journal Title: Continuous-tone image recognition using fractal theory Authors: Ying Liu Affiliation: Dept. of Math. & Comput. Sci., Savannah State Coll., GA, USA Journal: Proceedings of the SPIE—The International Society for Optical Engineering vol. 2060 pp. 112-124 Date: 1993.
Inspec 4626933 C9405-5260B-049 Doc Type: Conference Paper in Journal Title: Projected morion group for vision Authors: Tanalm, M. Affiliation: Electrotech. Lab., Tsukuba, Japan Journal: Proceedings of the SPIE—The International Society for Optical Engineering vol. 2060 pp. 161-168 Date: 1993.
Inspec 4626939 C9405-1250-068 Doc Type: Conference Paper in Journal Title: Searching geometric libraries using generalized epsilon-congruence Authors: Phillips, P.J. Affiliation: Rutor, Rutgers Univ., New Brunswick, NJ, USA Journal: Proceedings of the SPIE—The International Society for Optical Engineering vol. 2060 pp. 225-236 Date: 1993.
Inspec 4628608 C9405-5260B-064 Doc Type: Journal Paper Title: Adaptive edge detection with fractal dimension Authors: Cheong, C.K.; Aizawa, K.; Salio, T.; Hatori, M. Affiliation: Fac. of Eng., Tokyo Univ., Japan Journal: Transactions of the Institute of Electronics. Information and Communication Engineers D-II vol. J176D-II Iss: 11 pp. 2459-2463 Date: Nov. 1993.
Inspec 4631735 C9405-1250-077 Doc Type: Journal Paper Title: Non-analytic object recognition using the Hough transform with the machine technique Authors: Set, P.-K.; Siu, W.-C. Affiliation: Dept. of Electron. Eng., Hong Kong Polytech., Hung Hom, Hong Kong Journal: IEE Proceedings—Computers and Digital Techniques vol. 141 Iss: 1 pp. 11-16 Date: Jan. 1994.
Inspec 4632058 B9405-0100-016 C9405-5260B-092 Doc Type: Conference Proceedings in Journal Conf. Title: Intelligent Robots and Computer Vision XI: Biological, Neural Net and 3-D Methods Journal: Proceedings of the SPIE—The International Society for Optical Engineering vol. 1826 Date: 1992.
Inspec 4632109 A9409-4280B-002 B9405-4170-003, Doc Type: Conference Paper in Journal, Title: Spatial-spectral optical pattern recognition using an acousto-optic tunable filter preprocessor, Authors: Chao, T.-H., Reyes, G.; Hegblom, E.; Cheng, L.J., Affiliation: Jet Propulsion Lab., California Inst. of Technol., Pasadena, CA, USA, Journal: Proceedings of the SPIE—The International Society for Optical Engineering, vol. 1959 pp. 410-420, Date; 1993.
Inspec 4632197 A9409-1280B-002 B9405-4170-003 Doc Type: Conference Paper in Journal Title: Spatial-spectral optical pattern recognition using an acousto-optic runable filter preprocessor Authors: Chao, T.-H.; Reyes, O.; Hegblom, E.; Cheng, L.J. Affiliation: Jet Propulsion Lab., California Inst. of Technol., Pasadena, CA, USA Journal: Proceedings of the SPIE—The International Society for Optical Engineering vol: 1959 p. 410-20 Date: 1993.
Inspec 4632198 B9405-4180-003 C9405-5270-002 Doc Type: Conference Paper in Journal Title: Shift invariant optical neural network with holographic bipolar synapses Authors: Chao, T. H. Affiliation: Jet Propulsion Lab., California Inst. of Technol., Pasadena, CA, USA Journal: Proceedings of the SPIE—The International Society for Optical Engineering vol. 1959 pp. 422-430 Date: 1993.
Inspec 4632199 B9405-4120-003 C9405-5320K-006 Doc Type: Conference Paper in Journal Title: A content-addressable polychromatic neural net using a specially doped LiNbO/sub 3/ photorefractive crystal Authors: Yu, F.T.S.; Yin. S.; Uang, C.-M. Affiliation: Dept. of Electr. & Comput. Eng., Pennsylvania State Univ., University Park, PA, USA Journal: Proceedings of the SPIE—The International Society for Optical Engineering vol. 1959 pp. 431-441 Date: 1993.
Inspec 4632200 B9405-4180-004 C9405-5270-003 Doc Type: Conference Paper in Journal Title: Three-dimensional pattern recognition using an opto-electronic inner product complex neural network Authors: Awwal, A.A.S.; Power, G.J. Affiliation: Dept. of Comput. Sci. & Eng., Wright State Univ., Dayton, OH, USA Journal: Proceedings of the SPIE—The International Society for Optical Engineering vol. 1959 pp. 442-451 Date: 1993.
Inspec 4634402 B9405-6140C-115 C9405-5260B-098 Doc Type: Journal Paper Title: Associative structures for vision Authors: Anguita, D.: Parodi, G,; Zunino, R. Affiliation: Dept. of Biophys. & Electron. Eng., Genoa Univ., Italy Journal: Multidimensional Systems and Signal Processing vol. 5 Iss: 1 pp. 75-96 Date: Jan. 1994.
Inspec 4637182 B9405-6140C-145 C9405-1250-096 Doc Type: Journal Paper Title: Bessel sequences and affine frames Authors: Chui, C.K.; Xianliang Shi Affiliation: Center for Approx. Theory, Texas A&M Univ., College Station, TX, USA Journal: Applied and Computational Harmonic Analysis vol. 1 Iss: 1 pp. 2949 Date: Dec. 1993.
Inspec 4637540 B9405-6140C-152 C9405-1250-103 Doc Type: Journal Paper Title: Classified vector quantisation with variable block-size DCT models Authors: Lee, M.H.; Crebbin, G. Affiliation: Dept. of Electr. & Electron. Eng., Western Australia Univ., Nedlands, WA Australia Journal: IEE Proceedings—Vision, Image and Signal Processing vol. 141 Iss: 1 pp. 39-48 Date: Feb. 1994.
Inspec 4638188 C9405-3390-079 Doc Type: Journal Paper Title: Uncalibrated stereo hand-eye coordination Authors: Hollinghurst, N.; Cipolla, R. Affiliation: Dept. of Eng., Cambridge Univ., UK Journal: Image and Vision Computing vol. 12 Iss: 3 p. 187-92 Date: Apr. 1994.
Inspec 4639978 B9405-6140C-159 C9405-1250-112 Doc Type: Journal Paper Title: A method to estimate position and orientation of 3-D object from 2-D projection Authors: Nomura, Y.; Sae-Han, D.; Fujii, S. Affiliation: Fac. of Eng., Nagoya Univ., Japan Journal: Transactions of the Institute of Electronics, Information and Communicaton Engineers D-II vol. 177D-II Iss: 1 pp. 101-107 Date: Jan. 1994.
Inspec 4640339 A9410-4230-017 B9405-6140C-162 C9405-1250-113 Doc Type: Journal Paper Title: Recognition of partially occluded objects by correlation methods Authors: Campos. J.; Styczynski, K.; Yzuel, M.J.; Chalasinska-Macukow, K. Affiliation: Dept. of Phys., Barcelona Univ., Spain Journal: Optics Communications vol. 106 Iss: 1-3 p. 45-51 Date: Mar. 1, 1994.
Inspec 4644141 B9405-6140C-192 C9405-1250-133 Doc Type: Journal Paper Title: Space and frequency variant image enhancement based on a Gabor representation Authors: Castobal, G.; Navarro, R. Affiliation: Inst. de Opt. CSIC, Madrid, Spain Journal: Pattern Recognition Letters vol. 15 Iss: 3 pp. 273-277 Date: Mar. 1994.
Inspec 4644903 B9405-6140C-196 C9405-5260B-180 Doc Type: Journal Paper Title: RPCT algorithm and its VLSI implementation Authors: Tang, Y.Y.; Suen, C.Y. Affiliation: Centre for Pattern Recognition & Machine Intelligence, Concordia Univ., Montreal, Que., Canada Journal: IEEE Transactions on Systems, Man and Cybernetics vol. 24 Iss 1 pp. 87-99 Date: Jan. 1994.
Inspec 4644907 B9405-6140C-198 C9405-1250-137 Doc Type: Journal Paper Title: An efficient differential box-counting approach to compute fractal dimension of image Authors: Sarkar, N.; Chaudhuri, B.B. Affiliation: Electron. & Commun. Sci. Unit, Indian Stat. Inst.,

(56) References Cited

OTHER PUBLICATIONS

Inst., Calcutta, India Journal: IEEE Transactions on Systems, Man and Cybernetics vol. 24 Iss: 1 pp. 115-120 Date: Jan. 1994.

Inspec 4645049 B9405-6140C-203 C9405-1250-141 Doc Type: Journal Paper Title: Part I: Modeling image curves using invariant 3-D object curve models—a path to 3-D recognition and shape estimation from image contours Authors: Cohen, F.S.; Jin-Yinn Wang Affiliation: Dept. of Electr. & Comput. Eng., Drexel Univ., Philadelphia, PA, USA Journal: IEEE Transactions on Pattern Analysis and Machine Intelligence vol. 16 Iss: 1 pp. 1-12 Date: Jan. 1994.

Inspec 4648042 B9405-6140C-249 C9405-1250-179 Doc Type: Conference Paper Title: A feature space for derivatives of deformations Authors: Bookstein, F.L.; Green, W.D.K. Affiliation: Center for Human Growth & Dev., Michigan Univ., Ann Arbor, MI, USA Conf. Title: Information Processing in Medical Imaging 13th International Conference, IPMI '93 Proceedings pp. 1-16 Editors: Barrett, H.H.; Gmitro, A.F. Publisher: Springer-Verlag Berlin, Germany Date: 1993 xvi+567 pp.

Inspec 4654377 B9406-6140C-026 C9406-1250-020 Doc Type: Conference Paper in Journal Title: A fuzzy logic approach to object recognition Authors: Trung Tat Pham; Guanrong Chen Affiliation: McDonnell Douglas Aerosp., Adv. Software Technol. Group. Houston, TX, USA Journal: Proceedings of the SPIE—The International Society for Optical Engineering vol. 2061 pp. 547-556 Date: 1993.

Inspec 4656179 B940-6140C-040 C9406-1250-030, Doc Type: Journal Paper, Title: Neocognitron with dual C-cell layers, Authors: Fukushima, K.; Okada, M.; Hiroshige, K., Affiliation: Dept. of Biophys. Eng., Osaka Univ., Japan, Journal: Neural Networks, vol. 7 Iss: 1 pp. 41-47, Date: 1994.

Inspec 4656976 C9406-2590-006 Doc Type: Conference Paper in Journal Title: An incremental neutral classifier on a MIMD parallel computer Authors: Azcarraga, A.; Paugarn-Moisy, H.; Puzzenat, D. Affiliation: Lifia Imag Inpg, Grenoble, France Journal: Ifip Transactions A [Computer Science and Technology] vol. A-44 pp. 13-22 Date: 1994.

Inspec 4657256 C9406-5260B-031 Doc Type: Journal Paper Title: An experimental study of an object recognition system that learns Authors: Chung-Mong Lee: Ting-Chuen Pong; Slagle, J.R.; Esterline, A. Affiliation: Dept. of Comput. Sci., Hong Kong Univ. of Sci. & Technol., Hong Kong Journal: Pattern Recognition vol. 27 Iss. 1 pp. 65-89 Date: Jan. 1994.

Inspec 4657258 B9406-6140C-063 C9406-1250-044 Doc Type: Journal Paper Title: The canonical coordinates method for pattern recognition. II. Isomorphisms with affine transformations Authors: Blatt, N.; Rubinstein, S. Affiliation: Dept. of Math., Technion-Israel Inst. of Technol., Haifa, Israel Journal: Pattern Recognition vol. 27 Iss: 1 pp. 99-107 Date: Jan. 1994.

Inspec 4657264 B9406-6140C 067 C9406-5260B-034 Doc Type: Journal Paper Title: Variations on the evidence-based object recognition theme Authors: Caelli, T.; Dreier, A. Affiliation: Dept. of Comput. Sci., Curtin Univ. of Technol., Perth, WA, Australia Journal: Pattern Recognition vol. 27 Iss: 2 pp. 185-204 Date: Feb. 1994.

Inspec 4657799 B9406-6140C-077 C9406-5260B-039 Doc Type: Journal Paper Title: An analysis of different area from shadow mask using morphological operations Authors: Okada, Y. Affiliation: Ryukoku Univ., Ohtsu, Japan Journal: Transactions of the Institute of Electrical Engineers of Japan, Part C vol. 113-C Iss: 12 pp. 1056-1061 Date: Dec. 1993.

Inspec 4658298 C9406-5260B-046 Doc Type: Conference Paper Title: Robustness and evolution in an adaptive system applications on classification task Authors: Biodi, J. Affiliation: Univ. of Nice-Sophia Antipolis, Yalbonne, France Conf. Title: Artificial Neural Nets and Genetic Algorithms. Proceedings of the International Conference pp. 463-470 Editors: Albrecht, R.F.; Reeves, C.R.; Steele, N.C. Publisher: Springer-Verlag Berlin, Germany Date: 1993 xiii+737 pp.

Inspec 4666379 C9406-5260B-115 Doc Type: Conference Paper in Journal Title: A study of Fourier descriptors statistical features Authors: Darwish, A.M.; Mohamed, E.E.H. Affiliation: Dept. of Electron. Eng., Cairo Univ., Giza, Egypt Journal: Proceedings of the SPIE—The International Society for Optical Engineering vol. 1989 pp. 195-204 Date: 1993.

Inspec 4666384 C9406-7490-009 Doc Type: Conference Paper in Journal Title: Pattern classification of RGB colour images using a BP neural network classifier Authors: Iia, J. Affiliation: Sch. of Electr. & Electron. Eng., Nanyang Technological Univ. Singapore Journal: Proceedings of the SPIE—The International Society for Optical Engineering vol. 1989 pp. 248-256 Date: 1993.

Inspec 4666461 A9412-8780-003 B9406-2230-005 Doc Type: Journal Paper Title: Mutated bacteriorhodopsins-versatile media in optical image processing Authors: Hampp, N.; Zeisel, D. Affiliation: Inst. for Phys. Chem., Munich Univ., Germany Journal: IEEE Engineering in Medicine and Biology Magazine vol. 13 Iss: 1 pp. 67-74 Date: Feb.-Mar. 1994.

Inspec 4666480 B9406-6140C-147 C9406-1250-102 Doc Type: Journal Paper Title: Affine point matching Authors: Sprinzak, J.; Werman, M. Affiliation: Dept. of Comput. Sci., Hebrew Univ., Jerusalem, Israel Journal: Pattern Recognition Letters vol: 15 Iss: 4 p. 337-339 Date: Apr. 1994.

Inspec 4666490 B9406-6140C-154 C9406-1250-109 Doc Type: Journal Paper Title: Efficacy of fractal features in segmenting images of natural textures Authors: Dubuisson, M.-P.; Dubes, R.C. Affiliation: Dept. of Comput. Sci., Michigan State Univ., East Lansing, MI, USA Journal: Pattern Recognition Letters vol. 15 Iss: 4 pp. 419-431 Date: Apr. 1994.

Inspec 4666580 B9406-6140C-147 C9406-1250-102 Doc Type: Journal Paper Title: Affine point matching Authors: Sprinzak, J.; Werman, M. Affiliation: Dept. of Comput. Sci., Hebrew Univ., Jerusalem, Israel Journal: Pattern Recognition Letters vol. 15 Iss: 4 pp. 337-339 Date: Apr. 1994.

Inspec 4666757 B9406-128 C9406-1260-077 Doc Type: Journal Paper Title: Multiscale recursive estimation, data fusion, and regularization Authors: Chou, K.C., Willsky, A.S.; Benveniste, A. Affiliation: Sri Int., Menlo Park, CA, USA Journal: IEEE Transactions on Automatic Control vol: 39 Iss: 3 p. 464-78 Date: Mar. 1994.

Inspec 4668515 A9412 4230-005 B9406-4180-028 C9406-1250-121 Doc Type: Journal Paper Title: Adaptive-optical neural network for classifying patterns on structured backgrounds Authors: Pavlov, A. V. Affiliation: Vavilov (S.I.) State Opt. Inst., Saint Petersburg, Russia Journal: Optics and Spectroscopy vol. 75 Iss: 3 pp. 391-394 Date: Sep. 1993.

Inspec 4668515 A9412-4230-005 B9406-4180-028 C9406-1250-121 Doc Type: Journal Paper Title: Adaptive-optical neural network for classifying patterns on structured backgrounds Authors: Pavlov, A. V. Affiliation: Vavilov (S.I.) State Opt. Inst. Saint Petersburg, Russia Journal: Optics and Spectroscopy vol. 75 Iss: 3 p. 391-4 Date: Sep. 1993.

Inspec 4669185 C9406-1230-068 Doc Type: Journal Paper Title: Rule-base structure identification in an adaptive-network-based fuzzy inference system Authors: Chen-Tsai Sun Affiliation: Dept. of Comput. & Inf. Sci., Nat. Chiao Tung Univ., Hsinchu, Taiwan Journal: IEEE Transactions on Fuzzy Systems vol. 2 Iss: 1 pp. 64-73 Date: Feb. 1994.

Inspec 4669186 C9406-1230-068 Doc Type: Journal Paper Title: Rule-base structure identification in an adaptive-network-based fuzzy inference system Authors: Chuen-Tsai Sun Affiliation: Dept. of Comput. & Inf. Sci., Nat. Chiao Tung Univ., Hsinchu, Taiwan Journal: IEEE Transactions on Fuzzy Systems vol. 2 Iss: 1 pp. 64-73 Date: Feb. 1994.

Inspec 4670688 C9406-5260B-164 Doc Type: Conference Paper in Journal Title: Knowledge based object recognition and model generation Authors: Paulus, D.W.R.; Winzen, A.; Niemann, H. Affiliation: Lehrstuld fur Musterezkennang, Univ. Erlangen-Nurnberg, Germany Journal: Proceedings of the SPIE—The International Society for Optical Engineering vol. 1989 pp. 382-393 Date: 1993.

Inspec 4671654 B9406-6140C-211 C9406-1250-138 Doc Type: Journal Paper Title: Image coding using fractal parameters of contour lines Authors: Suzuki, Y.; Sumiyoshi, H.; Miyauchi, A. Affiliation: Dept. of Electron. & Commun. Eng., Musashi Inst. of

(56) References Cited

OTHER PUBLICATIONS

Technol., Tokyo, Japan Journal: Journal of the Institute of Television Engineers of Japan vol. 48 Iss: 1 pp. 69-77 Date: Jan. 1994.
Inspec 4672860 B9406-6140C-227 C9406-1250-151 Doc Type: Journal Paper Title: Can the fractal dimension of images be measured? Authors: Qian Huang; Lorch, J.R.; Dubes, R.C. Affiliation: Dept. of Comput. Sci., Michigan State Univ., East Lansing, MI, USA Journal: Pattern Recognition vol. 27 Iss: 3 pp. 339-349 Date: Mar. 1994.
Inspec 4677845 C9407-5260B-019 Doc Type: Conference Paper Title: Distortion-invariant object recognition using adaptive resonance theory Authors: Kadiran, S., Patnaik, L.M. Affiliation: Tao Consultancy Services, Bombay, India Conf. Title: Proceedings 1993 The First New Zealand International Two-Stream Conference on Artificial Neural Networks and Expert Systems p. 341-344 Editors: Kasabov, N.K. Publisher: IEEE Comput. Soc. Press Los Alamitos, CA, USA Date: 1993 xiii+346 pp.
Inspec 4678792 A9413-1230-024 B9407-6140C-034 C9407-5260B-023, Doc Type: Conference Paper in Journal, Title: Optical fractal image processor for noise-embedded targets detection, Authors: Kim, D.H.; Caulfield, H.J.; Jannson, T.; Kostrzewski, A.; Savant, G., Affiliation: Phys. Optics Corp., Torrance, CA, USA, Journal: Proceedings of the SPIE—The International Society for Optical Engineering, vol. 2026 pp. 144-149, Date: 1993.
Inspec 4678793 A9413-4230-025 B9407-6140C-035 C9407-1250-023 Doc Type: Conference Paper in Journal Title: Performance of the optical wavelet matched filter Authors: Roherge, D.; Sheng, Y. Affiliaoon: Dept de Phys., Laval Univ., Ste-Foy, Canada Journal. Proceedings of the SPIE—The International Society for Optical Engineering vol. 2026 pp. 150-160. Date: 1993.
Inspec 4678814 A9413 4230-029 B9407-6140C-038 C9407-1250-025 Doc Type: Conference Paper in Journal Title: Optical synergetic computers for pattern recognition Authors: Haken, H. Affiliation: Inst. for Theor. Phys. & Synergetics, Stutigart, Germany Journal: Proceedings of the SPIE—The International Society for Optical Engineering vol. 2039 pp. 270-281 Date: 1993.
Inspec 4680787 B9407-6140C-080 C9407-6130B-014 Doc Type: Journal Paper Title: Simulation of fractal multidimensional images using multidimensional recursive filters Authors: Bruton, L.T.; Bartley, N.R. Affiliation: Dept. of Electr. & Comput. Eng., Calgary Univ., Alta., Canada Journal: IEEE Transactions on Circuits and Systems II: Analog and Digital Signal Processing vol. 41 Iss: 3 pp. 181-188 Date: Mar. 1994.
Inspec 4680835 B9407-6140C-081 C9407-1250-055 Doc Type: Journal Paper Title: Affine theorem for the Hartley transform of an Image Authors: Bracewell, R.N. Affiliation: Space, Telecommun. & Radiosci. Lab., Stanford Univ., CA, USA Journal: Proceedings of the IEEE vol. 82 Iss: 3 p. 388-90 Date: Mar. 1994.
Inspec 4681576 C9407-1230-025 Doc Type: Conference Proceedings Conf. Title: Proceedings of IEEE 2nd International Fuzzy Systems Conference Publisher: IEEE New York, NY, USA Date: 1993 2 vol. (xviii+xx+1430 pp.).
Inspec 468356 A9414-1230-015 C9407-1230D-066 Doc Type: Journal Paper Title: Multiple dynamic neural network for pattern time sequence processing Authors: Kotov, V.B. Affiliation: Inst. of Opt. Neural Technol., Acad. of Sci., Moscow, Russia Journal: Optical Memory & Neural Networks vol. 2 Iss: 4 pp. 235-243 Date: 1993.
Inspec 4683860 A9414-230-005 B9407-6140C-104 C9407-1250-076 Doc Type: Journal Paper Title: Fractal error for detecting man-made features in serial images Authors: Cooper, B.E.; Chenoweth, D.L.; Selvage, J.E. Affiliation: Comput. Sci. & Eng. Program, Louisville Univ., KY, USA Journal: Electronics Letters vol. 30 Iss: 7 pp. 554-555 Date: Mar. 31, 1994.
Inspec 4684331 B9407-6140C-107 C9407-1250-078 Doc Type: Journal Paper Title: Uncertainty management for rule-based system with applications to image analysis Authors: Mogre, A.; McLaren, R.; Keller, J.; Krishnapuram, R. Affiliation: LSI Logic Corp., Milpitas, CA, USA Journal: IEEE Transactions on Systems, Man and Cybernetics vol. 24 Iss: 3 pp. 470-481 Date: Mar. 1994.

Inspec 4685821 B9407-6140C-123 C9407-1250-093 Doc Type: Journal Paper Title: Nonorthogonal image expansion related to optimal template matching in complex images Authors: Ragbunath Rao, K.; Ben-Arie, J. Affiliation: Dept. of Electr. & Comput. Eng., Illinois Inst. of Technol. Chicago, IL, USA Journal: CVGIP: Graphical Models and Image Processing vol. 56 Iss: 2 pp. 149-160 Date: Mar. 1994.
Inspec 4686006 B9407-6140C-129 C9407-1250-101 Doc Type: Journal Paper Title: Intensity-and distortion-invariant pattern recognition with complex linear morphology Authors: Rahmati, M.; Hasselbrook, L.G. Affiliation: Dept. of Electr. Eng., Kentucky Univ., Lexington, KY, USA Journal: Pattern Recognition vol. 27 Iss: 4 pp. 549-568 Date: Apr. 1994.
Inspec 4686009 A9414-4230-012 B9407-6140C-132 C9407-1250-104 Doc Type: Journal Paper Title: Optical pattern recognition using Bayesian classification Affiliation: Dept. of Electr. & Comput. Engl., New Mexico State Univ., Las Cruces, NM, USA Journal: Pattern Recognition vol. 27 Iss: 4 pp. 587-606 Date: Apr. 1994.
Inspec 4686356 A9414-4230-015 C9407-1230D-066, Doc Type: Journal Paper, Title: Multilayer dynamic neural network for pattern time sequence processing, Authors: Kotov, V.B., Affiliation: Inst. of Opt. Neural Technol Acad. of Sci., Moscow, Russia, Journal: Optical Memory & Neural Networks, vol. 2 Iss: 4 pp. 235-243, Date: 1993.
Inspec 4686357 A9414-1230-016 B9407-6140C-135 C9407-1250-106 Doc Type: Journal Paper Title: Pattern recognition by optical neural network based on the optical correlator Authors: Pavlov, A. V.; Shubnikow, E.I. Affiliation: Lab. of Opt. Pattern Recognition & Neural Networks, Vavilov (S.I.) State Opt. Inst., Saint Petersburg, Russia Journal: Optical Memory & Neural Networks vol. 2 Iss: 4 pp. 245-250 Date: 1993.
Inspec 4686995 B9407-6140C-139 C9407-1250-110 Doc Type: Conference Paper Title: A new class of fuzzy operators for image processing: design and implementation Authors: Russo, F. Affiliation: Dipartimento di Elettrotecnica Elettronica Inf., Trieste Univ., Italy Conf. Title: Second IEEE International Conference on Fuzzy Systems (Cat. No. 93CH3136-9) pp. 815-820 vol. 2 Publisher: IEEE New York, NY, USA Date: 1993 vol. 2 (xviii+xx+1430 pp.).
Inspec 4689867 A9414-4230-026 B9407-6140C-167 C9407-1250-134 Doc Type: Journal Paper Title: Edge enhancement techniques for improving the performance of binary phase-only filter pattern recognition devices Authors: Khoury, J.; Gianino, P.D.; Kane, J.S.; Woods, C.L. Affiliation: Tufts Univ., Medford, MA, USA Journal: Optical Engineering vol. 33 Iss: 3 pp. 856-864 Date: Mar. 1994.
Inspec 4690859 B9407-6140C-178 C9407-1250-136 Doc Type: Conference Paper Title: Structure from motion: a region based approach using affine transformations and moment invariants Authors: Lee, C.-Y.; Cooper, D.B. Affiliation: Div. of Eng., Brown Univ., Providence, RI, USA Conf. Title: Proceedings IEEE International Conference on Robotics and Automation (Cat. No. 93CH3247-4) p. 120-7 vol. 3 Publisher: IEEE Comput. Soc. Press Los Alamitos, CA, USA Date: 1993 3 vol. (xviii+1051+xvi+848+xviii+1042 pp.).
Inspec 4691097 B9407-0100-079 C9407-5260B-083 Doc Type: Conference Proceedings Conf. Title: Proceedings of 4th International Workshop on Time-Varying Image Processing and Moving Object Recognition Editors: Cappellini, V. Publisher: Elsevier Amsterdam, Netherlands Date: 1994 xiii+429 pp.
Inspec 4691104 B9407 6140C-184 C9407-1250-144 Doc Type: Conference Paper Title: Study on Gabor expansion and wavelet decomposition for texture analysis Authors: Nemeth, G.; Boroczky, L. Affiliation: KFKI Res. Inst. for Meas. & Comput. Techniques, Budapest, Hungary Conf. Title: Efficient Texture Analysis: Advanced Methods, Applications (KFKI-1994-2/N) pp. 31-41 Editors: Nemeth, G.; Boroczky, L. Publisher: KFKI Res. Instr. Meas. Comput. Tech Budapest, Hungary Date: 1994 94 pp.
Inspec 4691106 B9407-6140C-186 C9407-1250-145 Doc Type: Conference Paper Title: Fractals and multifractals; theory and application to texture recognition Authors: Fioravanni, S.; Giusto, D.D. Affiliation: Dipartimento di Ingegnetic Biofisica ed Electronica, Genova Univ., Italy Conf. Title: Efficient Texture Analysis: Advanced Methods, Applications (KFKI-1994-2/N) p. 51-9 Editors: Nemeth, G.; Boroczky, L. Publisher: KFKI Res. Inst. Meas. Comput. Tech Budapest, Hungary Date: 1994 94 pp.

(56) References Cited

OTHER PUBLICATIONS

Inspec 4694458 B9408-6140C-025 C9408-5260B-006 Doc Type: Journal Paper Title: Model-based multiresolution motion estimation in noisy images Authors: Wool Boon Goh; Martin, G.R. Affiliation: Sch. of Appl. Sci., Nanyang Technol. Inst., Singapore Journal: CVGIP: Image Understanding vol. 59 Iss: 3 p. 307-19 Date: May 1994.
Inspec 4694463 B9408-6140C-028 C9408-5260B-008, Doc Type: Journal Paper, Title: Image analysis and computer vision: 1993, Authors: Rosenfeld, A., Affiliation: Center for Autom. Res., Maryland Univ., College Park, MD, USA, Journal: CVGIP: Image Understanding, vol. 59 Iss: 3 pp. 367-396, Date: May 1994.
Inspec 4695175 C9408-5260B-011 Doc Type: Journal Paper Title: Generated Moment invariant features by cascaded neural network for pattern classification Authors: Raveendran, P.; Omaru, S. Affiliation: Dept. of Electr. Eng., Malaya Univ., Kuala Lumput, Malaysia Journal: Transactions of the Information Processing Society of Japan vol. 35 Iss: 2 pp. 291-300 Date: Feb. 1994.
Inspec 4695429 B9408-6140C-031 C9408-5260B-013 Doc Type: Conference Paper Title: Vector quantization based target cueing Authors: Call, R.W.; Puisipher, D.C. Affiliation: Paramas Syst. Corp., Salt Lake City, UT, USA Conf. Title: Proceedings of the IEEE 1993 National Aerospace and Electronics Conference. Naecon 1993 (Cat. No. 93CH3306-8) pp. 240-244 vol. 1 Publisher: IEEE New York, NY, USA Date: 1993 2 vol. xvii+1171 pp.
Inspec 4695587 B9408-6140C-032 C9408-1250-015 Doc Type: Conference Paper Title: Multi-level fractal block coding in video compression Authors: Lia, J.; Matlow, S.; Murphy, N.A. Affiliation: Sch. of Electron. Eng., Dublin City Univ., Ireland Conf. Title: DSP—The Enabling Technology for Communications. Conference Proceedings (ERA 93/0008) pp. 6.4/1-9 Publisher: ERA Technol Leatherhead, UK Date: 1993 iv+284 pp.
Inspec 4696290 A9415-4230-030 B9408-6140C-040 Doc Type: Journal Paper Title: Controlled-intensity detection peaks in a binary joint transform correlator Authors: Carnicer, A.; Moneo, I.R. de F. Affiliation: Dept. de Fisica Aplicada I Electron., Barcelona Univ., Spain Journal: Applied Optics vol. 33 Iss: 14 pp. 3070-3075 Date: May 10, 1994.
Inspec 4696291 A9415-4230-031 B9408-614000-041 C9408-1250-018, Doc Type: Journal Paper, Title: Invariant optical pattern recognition based on a contour bank, Authors: Shoude Chang; Arsenault, H.H.; Dahe Liu, Affiliation: Dept. de Phys., Laval Univ., Que. Canada, Journal: Applied Optics, vol. 33 Iss: 14 pp. 3076-3085, Date: May 10, 1994.
Inspec 4697248 A9415-4230-036 B9408-6140C-046 C9408-1250-021, Doc Type: Conference Paper in Journal, Title: Spatially multiplexed composite filters for optical pattern recognition, Authors: Abushagur, M.A.G., Affiliation; Dept. of Electr. & Comput. Eng., Alabama Univ., Huntsville, AL, USA, Journal: Proceedings of the SPIE—The Internatoinal Society for Optical Engineering, vol. 2026 pp. 338-343, Date: 1993.
Inspec 4697251 A9415-1230-038 B9408-6140C-048 C9408-1250-022 Doc Type: Conference Paper in Journal Title: Fractal dimension estimation for optical image segmentation Authors: Andrews, H.G., II; Getbehead, M.A.; Kozaitis. S.P. Affiliation: Rome Lab. Photonics Center, Griffiss AFB, NY, USA Journal: Proceedings of the SPIE—The International Society for Optical Engineering vol. 2026 pp. 361-370 Date: 1993.
Inspec 4697256 A9415-4230-041 B9408-4180-010 C9408-1250-025 Doc Type: Conference Paper in Journal Title: Large-scale neural network model for multi-class pattern recognition Authors: Phys. Optics Corp., Torrance, CA, USA Affiliation: Lu, T.; Lin, F.; Chou, H.; Kostrzewski, A.; Chen, J. Journal: Proceedings of the SPIE—The International Society for Optical Engineering vol. 2026 pp. 403-414 Date: 1993.
Inspec 4697282 C9408-5260B-031 Doc Type: Conference Paper in Journal Title: Hybrid pyramid/neural network object recognition Authors: Ansidan, P.; Burt, P.J.; Pearson, J.C.; Spence, C.D. Affiliation: David Semoff Res. Center, Princeton, NJ, USA Journal: Proceedings of the SPIE—The International Society for Optical Engineering vol. 2103 pp. 92-97 Date: 1994.
Inspec 4697503 B9408-6140C-051 C9408-1250-029 Doc Type: Journal Paper Title: Two-plus-one-dimensional differential geometry Authors: Koenderink, J.J.; Van Doom, A.J. Affiliation: Buys Ballot Lab., Utrecht Biophys. Res. Inst., Netherlands Journal: Pattern Recognition Letters vol. 15 Iss: 5 pp. 439-443 Date: May 1994.
Inspec 46977248 A9415-4230-036 B9408-6140C-046 C9408-1250-021 Doc Type: Conference Paper in Journal Title: Spatially multiplexed composite filters for optical pattern recognition Authors: Abushagur, M.A.G. Affiliation: Dept. of Electr. & Comput. Eng., Alabama Univ., Huntsville, AL, USA Journal: Proceedings of the SPIE—The International Society for Optical Engineering vol. 2026 pp. 338-343 Date: 1993.
Inspec 469782 C9408-5260B-31, Doc Type: Conference Paper in Journal, Title: Hybrid pyramid/neural network object recognition, Authors: Anandan, P.; Burt, P.J.; Pearson, J.C.; Spence, C.D., Affiliation: David Sarnoff Res. Center, Princeton, NJ, USA, Journal: Proceedings of the SPIE—The International Society for Optical Engineering, vol. 2103 pp. 92-97, Date: 1994.
Inspec 4699458 B9408-6140C-025 C9408-5260B-006 Doc Type: Journal Paper Title: Model-based multiresolution motion estimation in noisy images Authors: Wool Boon Gob; Martin, O.R. Affiliation: Sch. of Appl. Sci., Nanyang Technol. Inst., Singapore Journal: CVGIP: Image Understanding vol. 59 Iss: 3 pp. 307-319 Date: May 1994.
Inspec 4699527 B9408-6140C-076 C9408-52608-5260B-043 Doc Type: Journal Paper Title: A probabilistic matching algorithm for computer vision Authors: Camps, O.I.; Shapiro, L.G.; Haralick, R.M. Affiliation: Dept. of Electr. Eng., Pennsylvania State Univ., University Park, PA, USA Journal: Annals of Mathematics and Artifical Intelligence vol. 10 Iss: 1-2 pp. 85-124 Date: May 1994.
Inspec 4699540 B9408-6140CC083 C9408-5260B-045, Doc Type: Journal Paper, Title: A new motion compensation method for image sequence coding using hierarchical grid interpolation, Authors: Chung-Lin Huang; Chao-Yuen Hsu, Affiliation: Inst. of Electr. Eng., Nat. Tsing Hua Univ., Hsinchu, Taiwan, Journal: IEEE Transactions on Circuits and Systems for Video Technology, vol. 4 Iss: 1 p. 42-52, Date: Feb. 1994.
Inspec 4701135 B9408-6140-085 C9408-1250-63, Doc Type: Conference Paper, Title: Pattern theory in algorithm design, Authors: Axtell, M.; Ross, T.; Noviskey, M., Conf. Title: Proceedings of the IEEE 1993 National Aerospace and Electronics Conference. Naecon 1993 (Cat. No. 93CH3306-8) p. 920-5 vol. 2, Publisher: IEEE, New York, NY, USA, Date: 1993 2 vol. xvii+1171 pp.
Inspec 4701197 B9408-0100-026 C9408-1250-066 Doc Type: Conference Proceedings Conf. Title: Proceedings of the IEEE Southwest Symposium on Image Analysis and Interpretation Publisher: IEEE Comput. Soc. Press Los Alamitos, CA, USA Date: 1994 viii+167 pp.
Inspec 4702077 B9408-4180-022 C9408-5270-017 Doc Type: Conference Paper in Journal Title: Optoelectronically implemented neural network with a wavelet preprocessor Authors: Chao, T.-H.; Hegbloni, E.; Lae, B.; Stone, W.W.; Michdi, W.I. Affiliation: Jet Propulsion Lab., California Inst. of Technol., Pasadena, C.A. USA Journal: Proceedings of the SPIE—The International Society for Optical Engineering vol. 2026 pp. 472-283 Date: 1993.
Inspec 4704763 C9408-7150-019 Doc Type: Journal Paper Title: Design and implementation of map database systems (MDS) Authors: Tan Guozben, Huang Qingming; Gao Wen; Zhang Tianwon; Zhu Zhiying Affiliation: Dept. of Comput. Sci. & Eng., Dalian Univ. of Technol., China Journal: Journal of Dalian University of Technology vol. 34 Iss: 2 pp. 180-184 Date: Apr. 1994.
Inspec 4706056 B9408-6140C-143 C9408-1250-088 Doc Type: Conference Paper Title: Spotting recognition of human gestures from motion images Authors: Takahash. K.; Schl. S.; Oka, R. Affiliation: Tsukube Res. Center, Ibaraki, Japan Conf. Title: Time-Varying Image Processing and Moving Object Recognition. 3. Proceedings of the 4th International Workshop pp. 65-72 Editors: Cappellini, V. Publisher: Elsevier Amsterdam, Netherland Date: 1994 xiii+429 pp.

(56) References Cited

OTHER PUBLICATIONS

Inspec 4706074 B9408-6310-021 Doc Type: Conference Paper Title: The Concept of kinematical image and its practical use in radar target studies Authors; Bertrand, J.; Bertrand, P.; Vignaud, L. Affiliation: CNRS, Paris VII Univ., France Conf. Title: Time-Varying Image Processing and Moving Object Recognition, 3. Proceedings of the 4th International Workshop pp. 217-224 Editors: Cappellini, V. Publisher: Elsevier Amsterdam, Netherlands Date: 1994 xiii+429 pp.
Inspec 4706675 B9408-6140C-186 C9408-1250-106 Doc Type: Conference Paper Title: Analysis of texture images using robust fractal description Authors: Avadhanam, N.; Mitra, S. Affiliation: Dept. of Electr. & Comput. Eng., California Univ., Davis, CA, USA Conf. Title: Proceedings of the IEEE Southwest Symposium on Image Analysis and Interpretation p. 1-6 Publisher: IEEE Comput. Soc. Press Los Alamitos, CA, USA Date: 1994 viii+167 pp.
Inspec 4706688 B9408-6140C-197 C9408-1250-116 Doc Type: Conference Paper Title: An invariant traffic sign recognition system based on sequential color processing and geometrical transformation Authors: Kang, D.S.; Griswold, N.C.; Kehtarmavaz, N. Atfiliation: Dept. of Electr. Eng., Texas A&M Univ., College Station, TX, USA Conf. Title: Proceedings of the IEEE Southwest Symposium on Image Analysis and Interpretation pp. 88-93 Publisher: IEEE Comput. Soc. Press Los Alamitos, CA, USA Date: 1994 viii+167 pp.
Integrated Information Technology Inc., Data Sheets.
International Organisation for Standardisation Organisation Internationale de Normalisation, ISO/IEC JTC1/SC29/WG11, MPEG97/2290, Jul. 1997.
Internet Article "1.1 Visual information retrieval".
Internet Article "1.1.1 Why unconstrained imagery?".
Internet Article "1394 High Performance Serial Bus", http://www.ti.com/sc/docs/msp/ 1394/1394.htm.
Internet Article "1394 TA Related Websites", http://www.1394ta.org/abouttech/weblink.html.
Internet Article "1394 Technologies", http://developer.intel.com/solutions/tech/1394.htm.
Internet Article "21145 Phoneline/Ethernet LAN controller", http://developer.intel.com.
Internet Article "A Day at the DVD Forum: Technical Notes."
Internet Article "A new approach to TV viewing", http://www.usatoday.com.
Internet Article "A new approach to TV viewing", USA Today, Sep. 14, 1998, http:// www.usatoday.com.
Internet Article "Abstract of Aniko Simon' PhD thesis".
Internet Article "abstract.html at www.c3.lanl.gov".
Internet Article "Automatic Content-Based Retrieval of Broadcast News".
Internet Article "B.S. Manjunath ".
Internet Article "Bringing High-Quality Digital Video to the PC".
Internet Article "Call for Papers—Special Issue on Image and Video Processing for Digital Libraries", IEEE Transactions of Image Processing, http://vivaldi.ece.ucsb.edu/tip-special-cfp.html.
Internet Article "Color Based Image Retrieval Exploiting JPEG Scheme", http://www.cacs. usl.edu/.about.zx19826/599/img.html.
Internet Article "Color-based Image Retrieval".
Internet Article "Consumer and Professional Digital Video Recording and Data Formats", http://www.adaptec.com/technology/standards/1394formats.html.
Internet Article "Content Based Image Search Technical Papers".
Internet Article "Current Research on Video and Image Databases".
Internet Article "Department of Computing Science University of Alberta—Database Systems Research Group", http://web.cs.ualberta.ca/.about.database/research/multimedia/ multimedia.html.
Internet Article "Digital Video Disc (DVD) Copy Protection Process", DVD Copy Protection Process.
Internet Article "Digital Video Disc", C-Cube Microsystems-Technology.
Internet Article "Ditigal Video Disc", C-Cube Microsystems-Technology.
Internet Article "Draft ICPR98 Conference Schedule", http://www.cssip.elec.uq.edu.au/ icpr98/schedule.txt.
Internet Article "EET-i Top of the News Week of Apr. 22, 1996", EET-i Week of Apr. 22, 1996.
Internet Article "Efficient Management of Image and Video Data" Alexandria Digital Library Project, http://vivaldi.ece.ucsb.edu.
Internet Article "Energy Conservation Working Group of the 1394 Trade Association (1394-PCWG)", http://www.1394-pewg.org/.
Internet Article "Entertainment", http://208.246.40.20/newpage/entertain/middle.html.
Internet Article "Fast Multiresolution Image Querying".
Internet Article "For TV Watchers, Pause Stops Time", http://www.nydailynews.com.
Internet Article "Have Fun", http://www3.techstocks.com.
Internet Article "IBM helps make Digital Versatile Disk (DVD) a reality".
Internet Article "IEEE 1394 I/O Connector System", http://www.molex.com/other/news1394.html.
Internet Article "IMage DataBase Project General Information".
Internet Article "Image Database with Relevance Feeback", Project Description.
Internet Article "Image-Based Recognition using Learning for Generalizing Parameters".
Internet Article "ImageGREP: Fast Visual Pattern Matching in Image Databases".
Internet Article "Individualized Television", http://208.246.40.20/newpage/tv/middle.html.
Internet Article "Instructions for the Demo".
Internet Article "Integration, Management and Processing of Images for High-end Applications—CBIR Internet-sites", http://iris.elis.rug.ac.be/pds/imvb_sites.html.
Internet Article "Intel 21145 Phoneline/Ethernet LAN Controller Product Brief".
Internet Article "Internet Learning", http://208.246.40.20/newpage/internet/middle.html.
Internet Article "Jesse Berst's Anchor Desk", http://www.zdnet.com.
Internet Article "John R. Smith".
Internet Article "Just Play It Again, Sam", http://www.newsweek.com.
Internet Article "Local copies of CBIR-articles", http://telin.rug.ac.be/pds/imvb/list_available_art.html.
Internet Article "MPI Video: Content-Centric Interactivity and Gestalt Video".
Internet Article "MultiMedia/Image Database Systems, Query by Image and Video Content: The QBIC System", http://www.cs.usask.ca/homepages/grads/tpg134.clotho_web_page.
Internet Article "Network Image Databases", Net.sub.--image.sub.--data-0.3html at dcas.ucdavis.edu.
Internet Article "Numinous Technologies, Inc.".
Internet Article "P1394B (Gigabit 1394)", http://www.zayante.com/p1394b.
Internet Article "Patter Analysis and Applications Journal", Deja News-Article.
Internet Article "Program Guides", http://www.yahoo.com/Business_and_Economy.
Internet Article "Publications and Proposals", http://www.ifp.uiucedu/.about.yrui/html/ publication.html.
Internet Article "QBIC—IBM's Query by Image Content", http://wwwqbic.almaden.ibm.com.
Internet Article "Replay TV Lets Viewers Take Control, Watch TV on Their Own Schedules", http://www.gadgetguru.com.
Internet Article "Replay TV—The Tool for Serious Couch Potatoes", http://cnnfn.com.
Internet Article "Research in Video and Image Libraries: Browsing, Retrieval, Annotation", http://www-white.media.mit.edu.
Internet Article "Scenic Video/Image Retrieval—A Demo, Keyframe Search—A Demo".
Internet Article "Similarity Indexing: Algorithms and Performance" by David A. White.
Internet Article "Special Issue of Image Communication on MPEG-4", MPEG-4 Special Issue.
Internet Article "Steve Gallant Publications".

(56) References Cited

OTHER PUBLICATIONS

Internet Article "TCI Targets JamTV", http://geekreport.com.
Internet Article "Technical Approach", http://www.irt.de/customtv.add_info.html.
Internet Article "The Application of Metadata Standards to Video Indexing", http://www.dstc.edu.au/RDU/staff/jane-hunter/EuroDL/final.html.
Internet Article "The DVD copy protection problem", DVD copy protection problem.
Internet Article "The Home Phoneline Networking Alliance—Simple, High-speed Ethernet Technology for the Home", A White Paper, Jun. 1998.
Internet Article "The ultimate TV gadget?", http://www.slashdot.org.
Internet Article "Thomson Consumer Electronics", http://www.vtopia.com.
Internet Article "TiVo Trials Begin", http://geekreport.com.
Internet Article "Video Processing for Content Based Rerieval", Video Databases.
Internet Article "View-Based Recognition using SHOSLIF".
Internet Article "Visual '97 Final Program", http://vision.ucsd.edu/visual97/program.html.
Internet Article "Watch it Your Way", http://popularmechanics.com.
Internet Article "WinAMP Streaming MP3 Revolution Begins!", http://geekreport.com.
Internet Article CIIR Multi-media Indexing (manmatha@cs.umass . . . ).
Internet Article Content-based Video Retrieval Intro.
Internet Article dated Sep. 21, 1997 "Web TV".
Internet Article Minutes of the Domain 1 Plenary meeting (Brussels, Dec. 10, 1997), AC219-WP2-ITL-97023-MM-AC/b.
Internet Article New Guides Put More Power in TV Viewers' Hands, San Francisco Chronicle, Aug. 20, 1998, http://www.sfgate.com.
Internet Article on IVP, http://www.ivp.com.
Internet Article on New Enterprise Associates (NEA), http://www.nea.com.
Internet Article R. Manmatha (manmatha@cs.umass.edu).
Internet Article re MbTV—Metabyte, Inc., http://www.metabyte.com.
Internet Article re: "Magnifi" and brochure entitled "New Media Data Management".
Internet Article Retrieval Experiment Results (I, II,III) and More, http://www.cacs.usl.edu/ .about.zx19826/599/exp1.html.
Internet Article Trial Period License Agreement for IBM Query by Image Content (QBIC), http://service.software.ibm.com/dl/eqbic/qbic-1.
Internet Article, http://mambo.ucsc.edu/pst/ccrmas/199605/19960522.html.
Internet Article, http://www.scizzl.com/SCIvsEtc.html.
Internet Article, Muscle Fish article in IEEE MultiMedia 1996, vol. 3, No. 3: Fall 1996, pp. 27-36, http://www.musclefish.com/ieeemm96/index.html.
Internet Article, TC10 News #56, http://www.inf.enst.fr/.about.elc/GRCE/news/tc10news56.txt.
Internet Articles "About TiVo", "TiVo Press", "Who is TiVo", "TiVo Jobs", "Contact TiVo", http://www.tivo.com.
Internet Articles "Context-Aware Computing" and "MIT Papers on Context Awareness in Wearable Computing", http://www.media.mit.edu.
Internet Articles "Replay Networks", http://www.replaytv.com.
Internet Articles and Biography on David Benyon, http://umuai.informatik.uni-essen.de/benyon.html and http://www.dcs.napier.ac.uk/.about.dbenyon/publ.html.
Internet Articles re "Muscle Fish", http://www.musclefish.com.
Inuzuka, Nobuhiro, et al., "Representation and learning of concepts based on scope", IEEE, Computer Society, Los Alamitos, CA, USA pp. 1617-1621.
ISO/IEC JTC1/SC29 WG11 Web Page.
Iterated Systems, Inc. Corporate Profile.
J.L.; Soto, R.; Gordillo, J.L.; Local and global teleoperation of an autonomous vehicle Jaramillo, Systems, Man and Cybernetics, 2007. ISIC. IEEE International Conference on Oct. 7-10, 2007 pp. 260-266 Digital Object Identifier 10.1109/ICSMC.2007.4414005.
Jacobs, Charles E., et al., "Fast Multiresolution Image Querying", Department of Computer Science and Engineering; University of Washington, Seattle, WA 98195.
Jansen, Michael, "FireWire", http://www.engg.ksu.edu/KSE/spring96/firewire/firewire2.html.
Joachims, A Probabilistic Analysis of the Rocchio Algorithm with TFIDF for Text Categorization, Mar. 1996 ICML 1997, Nashville TN 143-151.
John D. Musa, "The Operational Profile in Software Reliability Engineering: An Overview", IEEE proceedings of 3rd Inter. Symposium on Software Reliability Engineering, Oct. 1992.
Johnson, Colin, "Surfing the Web Gets New Smarts", Electronic Engineering Times Jan. 5, 1998, pp. 37 and 42.
Johnson, R. Colin, "Kit Employs Fuzzy Logic for Smart Web Searches".
Johnson, R. Colin, "Tool kit allows online multimedia in real-time", Design.
Jung, et al., "Simulating human tasks using simple natural language instructions", EI Monthly No. EIM9302-007786, Piscataway, NJ, pp. 1049-1057.
Kahney, Leander, "Avian updates image searcher", MacWeek, Aug. 19, 1996.
Kalman, A New Approach to Linear Filtering and Prediction Problems, Transactions of the ASME—Journal of Basic Engineering, 82 (Series D): 35-45, 1960.
Kankanhalli, Mohan, et al., "Content based watermarking of images" ACM Multimedia 98—Electronic Proceedings, http://info.acm.org/sigmm/MM98/electronic_Proceedings/kankanhalli/index. html.
Katseff etal, "Predictive Prefetch in the Nemesis Multimedia Information Service", proceedings of the 2nd International Conference on Multimedia, Oct. 1994.
Kernel, BYTE, (Dec. 1991): 177-202.
Kim, Yongmin, "Chips Delivery Multimedia", BYTE, (Dec. 1991): 163-173.
Kita, Yasuyo, "Elastic-Model Driven Analysis of Several Views of a Deformable Cylindrical Object", IEEE PAMI—Abstracts 1996.
Kolbert, Elizabeth, "With 500 Channels, How Could Anyone Learn What's On", The New York Times, (Jan. 4, 1993): 1.
Kolson, Ann, "Computer Wimps Drown in a Raging Sea of Technology", Globe, (May 24, 1989).
Kopp, Greg, et al., "Stay Tuned: Photonic Filters Color Your World", Photonics Spectra, Mar. 1997, pp. 125-130.
Kozaitis, Samuel P., et al., "Optical estimation of fractal dimension for image assessment", Proceedings of SPIE—The International Society for Optical Engineering v 1702, pp. 186-191.
Kraiss, K F, "Alternative Input Devices for Human Computer Interaction", Preprint.
Kreifeldt, J.G., "A Methodology for Consumer Product Safety Analysis," Dept of Engineering Design—Tufts University, : pp. 175-184, date unknown.
Kreifeldt, John, "Human Factors Approach to Medical Insrument Design" Human Interfacing With Instruments: 1-6.
LaGale Didier, "MPEG: A Video Compression Standard for Multimedia Applications", Communications of the ACM (Apr. 1991/vol. 34, No. 4) 47-58.
Lebourgeois, Frank, et al., "Towards a description for video indexation", http://rfv17.insa-lyon.fr.
Letter and Brochure from STAR Sight.
Li Ze-Nian, et al., "C-Bird: content-based image retrieval from digital libraries using illumination invariance and recognition kernel".
Liu, Chih-Chin, et al., "An approximate string matching algorithm for content-based music data retrieval", http://computer.org/conferen/proceed/icmcs/0253/Volume%201/ 02539451abs.htm.
Losee, Robert M., "Browsing Document Collections: Automatically Organizing Digital Libraries and Hypermedia using the Gray Code", Inf. Proc. and Mgt 3(2) 1997, 175-192.
Lu, Cary, "State of the Art—Publish It Electronically", BYTE, (Sep. 1993): 94-109.

(56) References Cited

OTHER PUBLICATIONS

Lu, Cary; "Publish It Electronically"; BYTE, Sep. 1993.
Lyons, Daniel, "The Buzz About Firefly", The New York Times Magazine, pp. 37-40, Jun. 29, 1997.
Ma, Wei-Ying, et al., "NETRA: A content-based image retrieval system", http://vivaldi.ece.ucsb.edu/users/wei.codebase/example.html.
MacKeown, W.P.J.; Greenway, P.; Thomas, B.T.; Wright, W.A. . . ., "Road recognition with a neural networks" (Adv. Comput. Res. Centre, Bristol Univ.) UK Journal Engineering Applications of Artifical Intelligence vol. 7 Iss: 2 pp. 169-176 Date: Apr. 1994.
Marchionini, Gary, "Interfaces and Psychological Theory", Oct. 1991 Psychological Dimensions of User-Computer Interfaces, ERIC Digest, http://www.ed.gov/databases/ERIC.sub.--Digesrs/ed337203.html.
Material from BrainTech website.
Maybeck, Stochastic models, estimation, and control, vol. 1, 1979, pp. 1-16, Academic Press.
Mc Williams, Brian, "Encryption Plan Proposed for Digital Video", PC World News Radio, Feb. 19, 1998, http://wwwI.pcworld.com/news/daily/data/0298/980219175243.html.
McNamara, George, "Multimedia the Rainbow Pot- or Pothole?" Computer Technology, (1991).
Meaads, Jon, "Friendly or Frivolous?", Hardware Gimmicks and Software, (Jan. 1988): 95-100.
Meda, Hirotada et al, "Impact: An Interactive Natural-Motion-Picture Dedicated Multimedia Authoring System", CHI '91 Proceedings(1991) ACM 0-889791-383-3/91/0004/0343,pp. 343-350.
Mera, Narciso, "DSP and Open Real Time OS Target Multimedia Applications", Computer Technology Review, (Fall 1991):14-17.
Micromint, "The Catalog of Embedded Controllers", (Winter 1991): 1-28.
Mike Cowlishaw Web page, Mar. 1996.
Mock, et al., Adaptive User Models for Intelligent Information Filtering, (1994) Prac. 3.sup.rd Golden West Int'l Conf. on Intelligent Systems.
Moisan, Serge, "Less to ReDo, Less Cost: GrayScale for Document Capture and Recognition", Advanced Imaging, Mar. 1996, pp. 55-58.
Moore, . T.G. & Dartnall, A., "Human Factors of a Microelectronic Product. The Central Heating Timer/Programmer", Applied Ergonomics, (1982), 13.1:15-23.
Morony, Mike, "Audio Processing to Indexing and Retrieval of Arbitrary TV Video Data".
Moser, Karen D., "Rexx/Windows Shortens GUI Design Time", PC Week, (1991).
MPEG Video Group Homepage.
MPEG-7 and IR, http://www.psy.gla.ac.uk/-steve/mepg7.html.
Nakamura, et al., Automatic recording agent for digital video server, http://woodworm.cs.uml.edu/.about.rprice/ep/nakamura/, Proceedings of the Eighth ACM International Conference on Multimedia, CA, pp. 57-66, 2000.
Nass, Richard, "PC and Consumer Technologies Converge to Form Smart Appliances", Embedded Systems Development, Jun. 1999, pp. 24-27.
Nass, Richard, "Wiring a House With Network Capabilities Reaps Many Benefits", Tech Focus Embedded Systems Development, (Jan. 1999) 19-22.
National Aeronautics and Space Administration Contract No. NAS7-918, Technical Support Package on "Electronic "Noses"Made From Conductive Polymeric Films", for Jul. 1997 NASA Tech Brief, vol. 21, No. 7, Item #103.
National Aeronautics and Space Administration Contract No. NAS7-918, Technical.
National Aeronautics and Space Administration Contract No. NAS7-918, Technical Support Package on "Acoustic Wind-Velocity Analyzer", for Jul. 1997 NASA Tech Brief, vol. 21, No. 7, Item 115.
National Aeronautics and Space Administration Contract No./NAS/7-918 Technical Support Package on System Finds Objects of Interest in an Image Data Base for Apr. 1998, NASA Tech Brief vol. 22, No. 4, Item #156 from JPL New Technology Report NPO-20213.
NBC TV News "Radio TV Reports" (Jul. 17, 1990) 1-37.
Nelson, Lee J., "Commercializing Face Recognition: How to Judge Fresh Players & Approaches", Advanced Imaging, p. 86.
Netrologic Inc. Brochure.
Netrologic, Inc. "Image Compression Using Fractals and Wavelets" Final Report for the Phase II Contract Sponsored by The Office of Naval Research Contract No. N 00014-91-C-0117, (Jun. 2, 1993): Index-62.
Newspace: Mass Media and Personal Computing; pp. 329-348; USENIX, Summer 1991.
Norman, Donald A., "Infuriating by Design", Psychology Today, vol. 22, (Mar. 1988): 52-56.
Nygren, E., et al., "The Art of the Obvious" CHI '92, May 3-7, 1992, pp. 235-239.
Oakes, Chris, "FasTV Hopes for a Fast Start", http://www.wired.com/news/news/technology/story/17537.html.
Ogle, Virginia E., et al., "Chabot: Retrieval from a Relational Database of Images", University of California, Berkeley, http://http.cs.berkeley.edu.
Ohara, H.; Murakami, T.; A Stability Control by Active Angle Control of Front-Wheel in a Vehicle System Industrial Electronics, IEEE Transactions on vol. 55, Issue 3, Mar. 2008 pp. 1277-1285 Digital Object Identifier 10.1109/TIE.2007.909051.
Oppermann, Reinhard, et al., "Adaptability and Adaptivity in Learning Systems", Knowledge Transfer, vol. II. 1997, pp. 173-179, http://zeus.gmd.de/-kinshuk/papers/ k97_gmd.html.
Optical Computing "Trained Neural Network Recognizes Faces", Laser Focus World (Jun. 1993): 26-28.
Orwant, Jonathan L., "Doppelganger: A User Modeling System", Bachelor's Thesis, Massachusetts Institute of Technology (Jun. 1991). (Date of first public availability unknown).
Orwant, Jonathan L., "The Doppelganger User Modeling System", in Proc. of teh IJCAI Workshop W4: Agent Modellnig for Intelligent Interaction, Sydney, Austrailia, pp. 164-168, Aug. 24-30, 1991.
Ozcan, Fatma, "Comparison of content based image retrieval systems", http://www.cs.umd.edu/.about.fatma/abstract.html.
Pachet, Francois, et al., "A Combinatorial Approach to Content-Based Music Selection", http://computer.org/conferen/proceed/icmcs/0253/Volume%201/025394457abs.htm.
Parker, Dana J., "Standard Deviations", CD-ROM Professional, Dec. 1996, Standard Deviations.
Parker, Dana J., DVD Copy Protection: An Agreement At Last? PC Webopaedia Definition and Links, Jul. 14, 1997.
Pearson, Bill, "1394 Digital Content Protection: How Does It Work?", Multimedia Systems Design, Nov., pp. 20-27.
Ph.D. Thesis entitled "Ruben's Research".
Picard, Rosalind (ROZ), Internet Home Page Information, http://vismod.www.media. mit.edu.
Pitta, Julie, "Interactivity: the Great White Whale", Forbes, Sep. 21, 1998.
Platte, Hans. Joachim et al "A New Intelligent Remote Control Unit for Consumer Electronic Devices", IEEE, (1985): 59-68.
Poindra, Ashok et al, "T1 Leads Five-Firm Parallel-Processing Effort", Electronic Engineering Times, (Dec. 2, 1991):21-22.
Press Release from Interent dated Dec. 9, 1996, "Company Launches New Object Manager Developer Program", http://prnewswire.com.
Press Release from Internet "ACTV & Prevue Networks to Demonstrate Integrated Digital Capabilities at the Western Show", http://www.actv.com/newpage/press/actvpvue.html.
Press Release from Internet dated Apr. 19, 1999 "Quantum is First to Market With End-to-end Storage Solution for Digital Video Applications".
Press Release from Internet dated Apr. 19, 1999 "TiVo and Replay Newtorks License Macrovisions's Copy Protection Technology", http://www.businesswire.com.
Press Release from Internet dated Apr. 26, 1999 "Replay Networks, Inc. Launches New Era in Television as Personal TV Leader Ships Award-Winning ReplayTV".

(56) References Cited

OTHER PUBLICATIONS

Press Release from Internet dated Apr. 26, 1999 "TiVo Selects Atmel's Smart Card Crytpo Controller for Authentication and Security; AT90SC3232C Offers Highest Security", http://www.businesswire.com.
Press Release from Internet dated Apr. 27, 1999 "Building a Smarter House", http://www.abcnews.go.com.
Press Release from Internet dated Apr. 30, 1997 "Gemstar International Group Ltd."
Press Release from Internet dated Apr. 5, 1999 "C-Cube to Co-Develop Advanced Digital Video Applications for PC Platforms".
Press Release from Internet dated Apr. 6, 1999 "Pheonix Technologies' IEEE 1394 Core Licensed by C-Cube Microsystems".
Press Release from Internet dated Apr. 6, 1999 "Strategy Analytics: Interactive video is next Internet battleground".
Press Release from Internet dated Apr. 7, 1997 "Discovery Communications Selects HP's Broadcast Server".
Press Release from Internet dated Apr. 7, 1997, "New Alliances with The Duck Corp., Telos Systems and Voxware Inc.: Microsoft Delivers First MPEG-4 Codec".
Press Release from Internet dated Aug. 11, 1998 "Engage Technologies and Net Perceptions Join Forces to Deliver Market-Leading Internet Personalization Solutions".
Press Release from Internet dated Aug. 11, 1998 "IBM, Record Companies in Talks for Internet Music Distribution".
Press Release from Internet dated Aug. 11, 1998 "Iterated Systems Announces Agreement with MCI Telecommunications Corporation".
Press Release from Internet dated Aug. 11, 1998 "Net Perceptions Enters Exclusive Partnership with Neural Applications".
Press Release from Internet dated Aug. 11, 1998 "Sun Microsystems and ACTV Net to Provide Virtual Learning Solution", http://www.actv.com.
Press Release from Internet dated Aug. 12, 1998 "InterVU Launches Rich Media Site".
Press Release from Internet dated Aug. 12, 1998 "Thomson Multimedia Signs Early Adopter Agreement with Cross-Industry Group for Enhanced Television Specifications", http://www.prnewswire.com.
Press Release from Internet dated Aug. 18, 1998 "School District of Philadelphia Expands Contract for ACTV Net's eSchool Online", http://www.actv.com.
Press Release from Internet dated Aug. 21, 1997 "Excalibur Technologies Corp."
Press Release from Internet dated Aug. 3, 1998 "Gemstar to Launch VCR Plus+ System in Mexico".
Press Release from Internet dated Aug. 3, 1998 "GE's NBC and GE Capital to Buy 6% of Intertainer for $3 Million".
Press Release from Internet dated Aug. 3, 1998 "K-tel International to Offer Online Digital Downloads via Liquid Audio".
Press Release from Internet dated Aug. 3, 1998 "N2K's Music Boulevard to Offer Customer-Created Miles Davis CDs".
Press Release from Internet dated Aug. 3, 1998 "NEC Introduces New Multimedia Search Engine for the Web".
Press Release from Internet dated Aug. 4, 1997 "Nextlevel Systems, Inc. Invests in ACTV and Enters into Joint Marketing Program", http://www.actv.com.
Press Release from Internet dated Aug. 4, 1998 "Brain Tech, Inc. will launch a marketing effort with UTMC Microelectronic Systems Inc."
Press Release from Internet dated Aug. 4, 1998 "Macrovision Corporation and Trimark Pictures Sign DVD Copy Protection Agreement".
Press Release from Internet dated Aug. 5, 1998 "N2K's Music Boulevard Prefers Visa".
Press Release from Internet dated Aug. 5, 1998 "New Standalone Embedding Tool Simplifies and Automates Digimarc Embedding Process for Web Publishing".
Press Release from Internet dated Aug. 6, 1998 "Aris Technologies, Inc. Announces Strategic Relationship with Online Music Company".
Press Release from Internet dated Dec. 10, 1996, Informix Software, Inc. (NASDAQ: IFMX).
Press Release from Internet dated Dec. 17, 1998 "Replay Networks, Inc. to Start National Service Trials Next Week".
Press Release from Internet dated Dec. 18, 1998 "The TV That Watches Back", http:// www.wired.com.
Press Release from Internet dated Dec. 21, 1998 "Quantum Corporation and Tivo, Inc. Announce Strategic Alliance Enabling Consumers to Take Control of Live Television".
Press Release from Internet dated Dec. 21, 1998 "TiVo Debuts TView, a Revolutionary Distributed Television Viewing Management Platform for the TV Industry".
Press Release from Internet dated Dec. 21, 1998 "TiVo, Inc. and Quantum Corp. Announce Strategic Alliance Enabling Consumers to Take Control of Live Television".
Press Release from Internet dated Dec. 21, 1998 "TiVo, Inc. Poised to Transform Television Through Debut of Breakthrough Personal TV Service".
Press Release from Internet dated Dec. 22, 1998 "TiVo forms tie with Quantum".
Press Release from Internet dated Dec. 22, 1998 "Varo Vision to Integrate Iomega's Clik Drive into Digital Audio Products".
Press Release from Internet dated Dec. 23, 1996 "StarSight Telecast, Inc."
Press Release from Internet dated Dec. 23, 1996, "Gemstar International Group Limited (NASDAQ:GMSTF) and StarSight Telecast Inc.".
Press Release from Internet dated Dec. 3, 1998 "Skyconnect & ACTV to Offer New Opportunities for Digital Advertising", http://www.actv.com.
Press Release from Internet dated Dec. 30, 1998 "TiVo's New Year's Resolution".
Press Release from Internet dated Dec. 4, 1997 "Macrovision Corporation".
Press Release from Internet dated Dec. 9, 1996, "Company Launches New Object Manager Developer Program", http://prnewswire.com.
Press Release from Internet dated Dec. 9, 1997 "Applied Magic and Quadrant International Announce ADV601LC-Based Products".
Press Release from Internet dated Dec. 9, 1997 "Cubic VideoComm".
Press Release from Internet dated Feb. 10, 1999 "Replay Networks, Inc. Announces Entertainment Advisory Council".
Press Release from Internet dated Feb. 10, 1999 "Scientific-Atlanta and Cox Communications Announce Deployment of Explorer 2000".
Press Release from Internet dated Feb. 16, 1999 "TiVo Inc. and General Motors Announce Charter Advertising Partner Agreement".
Press Release from Internet dated Feb. 17, 1999 "Apple, Compaq, Matsushita (Panasonic) Philips, Sony and Toshiba Announce Support for IEEE1394 and Plans to Form Patent Pool", www.prnewswire.com.
Press Release from Internet dated Feb. 17, 1999 "Gemstar EPG Advertising Goes Live Nationwide".
Press Release from Internet dated Feb. 17, 1999 "MGI Software Previews Breakthrough Digital Video Technology for Intel's Forthcoming Pentium III Processor".
Press Release from Internet dated Feb. 17, 1999 "Paul Allen's Charter to Acquire Cable-TV Systems in 18 States".
Press Release from Internet dated Feb. 2, 1999 "Sharp Corporation First to License Tri-Vision's Flexible V-gis V-chip Technology".
Press Release from Internet dated Feb. 2, 1999 "Television Industry Embraces TiVo at NATPE".
Press Release from Internet dated Feb. 3, 1998 "NETCOM Launches Cost-Effective ISDN Solutions; New Services Bring NETCOM's High-Speed Network to Small Offices".
Press Release from Internet dated Feb. 4, 1999 "Watching Super Bowl XXXIII: What the Viewers Missed . . . and a Solution from Quantum Corporation".
Press Release from Internet dated Feb. 8, 1999 "Full Text-TriVision <TVL.TO>Q3 results".
Press Release from Internet dated Feb. 8, 1999 "Gemstar International Group Limited Reports Third Quarter Financial Results".

(56) References Cited

OTHER PUBLICATIONS

Press Release from Internet dated Feb. 8, 1999 "Home PC Market Gets a Free Ride from Innovative Business Launched at Demo 99", http://www.prnewswire.com.
Press Release from Internet dated Feb. 8, 1999 "ReplayTV Selected to Show Breakthrough Technology at DEMO '99".
Press Release from Internet dated Feb. 8, 1999 "TiVo to Highlight 'Broadband' TiVo Services at Demo '99".
Press Release from Internet dated Feb. 9, 1999 "InfoValue Releases Industry's Fastest, NT-Compatible Video-on-Demand Software".
Press Release from Internet dated Jan. 14, 1999 "TiVo Steps Into the Ring with Showtime for Tyson vs. Botha Bout".
Press Release from Internet dated Jan. 14, 1999 "Wink Communications Expands Management Team", http;//www.prnewswire.com.
Press Release from Internet dated Jan. 18, 1999 "Broadcasters Set to Challenge ISPs for Interactive Service Dominance Says Strategy Analytics", http://www.prnewswire.com.
Press Release from Internet dated Jan. 18, 1999 "Intel and RSA to Accelerate Delivery of New PC and Application Security Products", http://developer.intel.com/pressroom/ archive/releases/cn118996b. htm.
Press Release from Internet dated Jan. 18, 1999 "Replay TV Featured at David Coursey's Showcase '99", http://www.prnewswire. com.
Press Release from Internet dated Jan. 19, 1999 "Bridge Technology Group LLC Reports First Quarter Results on Stock Picks".
Press Release from Internet dated Jan. 21, 1999 "Metabyte Announces Personalized TV Software", http://www.prnewswire.com.
Press Release from Internet dated Jan. 25, 1999 "Scientific-Atlanta's Explorer 2000 Advanced Digital Set-Top Will Support ACTV's 'Individualized Television'".
Press Release from Internet dated Jan. 26, 1999 "TiVo and the Weather Channel to Deliver Showcased Programming and Predictions for TiVo Personal TV Service".
Press Release from Internet dated Jan. 26, 1999 "TiVo and ZDTV Get Newtorked".
Press Release from Internet dated Jan. 27, 1998 "e-Net, Inc."
Press Release from Internet dated Jan. 27, 1998 "VideoServer, Inc."
Press Release from Internet dated Jan. 27, 1999 "Charter, TCI to Buy InterMedia Units for $2.4 Bln".
Press Release from Internet dated Jan. 28, 1997 "Iterated Systems Announces Partnership With Emc.sup.3".
Press Release from Internet dated Jan. 28, 1997, "Iterated's Technology to Enable the Productions of Video for edd/Electronic Digital Delivery", .sup.http://www.iterated.com.
Press Release from Internet dated Jan. 28, 1997, "Iterated's Technology to Enable the Production of Video for edd/Electronic Digital Delivery", .sup.http://www.iterated.com.
Press Release from Internet dated Jan. 28, 1998 "Diamond Multimedia and Earthlink Begin Dual-Line Modem Trials Utilizing Diamond's Shotgun Technology".
Press Release from Internet dated Jan. 28, 1999 "Replay TV Racks Up Top Industry Awards".
Press Release from Internet dated Jan. 28, 1999 "TiVo Brings Home HBO Through Agreement Benefitting Personal Television Service Users".
Press Release from Internet dated Jan. 28, 1999 "TiVo Personalized Television Service Inks Showtime Relationship".
Press Release from Internet dated Jan. 29, 1999 "Bridge Technology Group LLC Comments on Recent ACTV Agreement".
Press Release from Internet dated Jan. 4, 1999 "Hot Technology Companies: 140 Qualify in Dec."
Press Release from Internet dated Jan. 5, 1999 "Only Two More Days Until TiVo Changes Television Forever!"
Press Release from Internet dated Jan. 6, 1997, "Breakthrough Time-Space and Space-Compression Technology Delivers Videos", http://www.prnewswire.com.
Press Release from Internet dated Jan. 6, 1997, "Former MCI Chief Technology Officer Will Lead Drive to Implement edd", http://www. prnewswire.com.
Press Release from Internet dated Jan. 6, 1999 "Philips Announces Personal TV".
Press Release from Internet dated Jan. 6, 1999 "Replay TV Wins CES 1999 'Best of Show' Award".
Press Release from Internet dated Jan. 7, 1997, "Video Delivered Direct to VCRs", http://www.prnewswire.com.
Press Release from Internet dated Jan. 7, 1998, "Philips Magnavox WebTVr Plus Receiver Integrates TV and World Wide Web Viewing".
Press Release from Internet dated Jan. 7, 1999 "Replay Networks and E! Entertainment Television Networks Sign Agreement".
Press Release from Internet dated Jan. 7, 1999 "Replay Networks Inc. Announces Backing by Vulcan Ventures, Inc."
Press Release from Internet dated Jan. 7, 1999 "TiVo Inc. Announces Vulcan Ventures Investment".
Press Release from Internet dated Jan. 8, 1998 "CES Booth 10827".
Press Release from Internet dated Jan. 8, 1998, Lucent Technologies Equipped TV Video Phone Offers Enhanced Screen Graphics, Software Downloads, Password and Security Features and Video Quality Unmatched.
Press Release from Internet dated Jan. 8, 1999 "Billionaire Paul Allen to Invest in Television Startup TiVo".
Press Release from Internet dated Jan. 8, 1999 "Harris Radio ICs Selected for ShareWave's Wireless Multimedia Home Networking Solutions", http://www.prnewswire. com.
Press Release from Internet dated Jan. 8, 1999 "TiVo Personal Television Service", http://www.gadgetguru.com.
Press Release from Internet dated Jan. 9, 1998 "C-Phone Corporation".
Press Release from Internet dated Jan. 9, 1998 re: Gemstar International Group Ltd.
Press Release from Internet dated Jan. 9, 1998, "New Product Connects to VideoConferencing Rooms, PC's and Other TV-Based Video Products".
Press Release from Internet dated Jan. 9, 1998, "New Unit Has Six Auxiliary Inputs to Remotely Monitor Vacation Homes, Offices or Other Important Areas in Need of Surveillance".
Press Release from Internet dated Jul. 15, 1998 "Digimarc Software Chosen by Adobe for Adobe Image Ready 1.0".
Press Release from Internet dated Jul. 16, 1998 "Gemstar Rejects United Video Proposal".
Press Release from Internet dated Jul. 16, 1998 "NBC and Gemstar Announce Agreement for Interactive Program Guide on TVs, VCRs and Satellite Systems".
Press Release from Internet dated Jul. 20, 1998 "Digimarc Turns Online Images Into Powerful Marketing Agents".
Press Release from Internet dated Jul. 21, 1998 "IBM and ISLIP Announce Agreement", http://www.prnewswire.com.
Press Release from Internet dated Jul. 21, 1998 "ISLIP and Informix Deliver Media Asset", http://www.prnewswire.com.
Press Release from Internet dated Jul. 21, 1998 "Virage Named Market Winner by Frost & Sullivan".
Press Release from Internet dated Jul. 22, 1998 "Gemstar Responds to United Video Announcement".
Press Release from Internet dated Jul. 22, 1998 "ISLIP Introduces MediaKey Logger", www.prnewswire.com.
Press Release from Internet dated Jul. 22, 1998 "N2K Inc. Announces Record 1998 Second Quarter Revenue of $10.0 Million".
Press Release from Internet dated Jul. 22, 1998 "United Video Satellite Group's Offer for Gemstar Withdrawn", http://www. prnewswire.com.
Press Release from Internet dated Jul. 27, 1998 "Macrovision Corporation Reports Record New Revenues, Net Income and Earnings Per Share for Second Quarter".
Press Release from Internet dated Jul. 28, 1998 "Gemstar Files Patent Infringement Lawsuit Against Prevue Networks, Inc.".
Press Release from Internet dated Jul. 28, 1998 "Macrovision, Philips, and Digimarc Join Forces to Propose New Digital Watermarking and Play Control Standard".
Press Release from Internet dated Jul. 28, 1998 "SESAC Renews Agreement with Long-Time Licensee Muzak".
Press Release from Internet dated Jul. 29, 1998 "Gemstar International Group Limited Reports First Quarter Financial Results".

(56) References Cited

OTHER PUBLICATIONS

Press Release from Internet dated Jul. 30, 1998 "Corbis and Alta Vista Launch the World's Largest Consumer Online Picture Search".
Press Release from Internet dated Jul. 6, 1998 "BrainTech, Inc. Teams with UTMC on Vision System Project and BrainTech's Odysee Development System Marketing".
Press Release from Internet dated Jul. 7, 1998 "Number of Macrovision-Encoded Cassettes Exceeds Two Billion Plateau".
Press Release from Internet dated Jun. 1, 1998 "Sybase and Excalibur Technologies Deliver Innovative Video Retrieval Solution for the Net".
Press Release from Internet dated Jun. 24, 1997 "Curtis Mathes Holding Corp.".
Press Release from Internet dated Mar. 18, 1999 "ACTV Names Art Cohen Senior Vice President of Advertising & E-commerce".
Press Release from Internet dated Mar. 20, 1997 re: Concurrent Computer Corp.
Press Release from Internet dated Mar. 23, 1999, "Net Video Coming of Age?", http:// www.wired.com/news/print.
Press Release from Internet dated Mar. 24, 1999 "Forrester: Personal Video Recorders Will Bring Fundamental Changes to Television Networks".
Press Release from Internet dated Mar. 25, 1999 "Microsoft's U.K. WebTV Tests Joined by MTV, Saatchi".
Press Release from Internet dated Mar. 25, 1999 "UK couch potatoes warm to Microsoft WebTV".
Press Release from Internet dated Mar. 26, 1999 "Microsoft Acquires Numinous, Graphics Software Startup".
Press Release from Internet dated Mar. 26, 1999 "Microsoft buys Numinous Tech", http://www.news.com.
Press Release from Internet dated Mar. 29, 1999 "Kiss Your VCR Goodbye", http://www. wired.com.
Press Release from Internet dated Mar. 29, 1999 "Personal TV Recorder Debuts".
Press Release from Internet dated Mar. 29, 1999 "Philips, Tivo to Sell Personal Video Recorders, WSJ Reports".
Press Release from Internet dated Mar. 29, 1999 "Replay Networks and Showtime Networks, Inc. Announced Personal TV Deal for Showtime, The Movie Channel, Sundance Channel and FLIX".
Press Release from Internet dated Mar. 29, 1999 "Replay Networks, Inc. Announces $8 Million Investment with Venture Firm Kleiner Perkins Caufield & Byers as Lead Investor".
Press Release from Internet dated Mar. 30, 1999 "Alta Vista Unveils New Multi-Media Search Technology".
Press Release from Internet dated Mar. 30, 1999 "TiVo and Showtime Networks Bolster Relationship, Announce New Equity Investment".
Press Release from Internet dated May 13, 1997 "Curtis Mathes technology goes beyond the competition with easy all-in-one system for home televisions".
Press Release from Internet dated May 13, 1997 Encryption Mandates by DVD Consortium Hit Home—and the Home PC, in EMedia Professional's Jun. 1997 Special Feature, Yahoo Finance.
Press Release from Internet dated May 15, 1997 "Faroudja Laboratories has filed a lawsuit".
Press Release from Internet dated May 16, 1997, "DVD '97".
Press Release from Internet dated May 19, 1997 "Combined NetChannel service sets standard for new TVSP".
Press Release from Internet dated May 19, 1997 "IMSI".
Press Release from Internet dated May 19, 1997 "NetChannel expands TV through the power of the Internet".
Press Release from Internet dated May 19, 1997 "Spyglass to Co-Develop Thomson Program Guide for RCA Set-Top Box".
Press Release from Internet dated May 19, 1997 "Sumner Redstone".
Press Release from Internet dated May 20, 1997 "Excalibur Technologies Corp.".
Press Release from Internet dated May 21, 1997 "Peter H. Bachmann".
Press Release from Internet dated May 27, 1997 "Aptex Software Inc.".
Press Release from Internet dated May 27, 1997 "C-Cube Integrates Copy Protection and Decryption Into Its Single-Chip DVD Decoder", Yahoo Finance.
Press Release from Internet dated May 27, 1997 "Netscape Communications Corporation".
Press Release from Internet dated May 27, 1997, "C-Cube Microsystems".
Press Release from Internet dated May 27, 1997, E4 (Elecede Technologies Inc.) and Chromatic Research Inc.
Press Release from Internet dated May 28, 1997, "Charting the course for video on the PC, S3(R) Incorporated".
Press Release from Internet dated May 28, 1997, "Continuing its leadership in the DVD market, C-Cube Microsystems Inc.".
Press Release from Internet dated May 29, 1998 "PBS Licenses Excalibur Knowledge Retrieval Products to Create Advanced Online Applications".
Press Release from Internet dated May 4, 1998 "Rainbow Sports & ACTV to Launch Digital Network Featuring Fox Sports Bay Area Programming", http://www.actv.com.
Press Release from Internet dated May 5, 1997 "Gemstar International Group Ltd.".
Press Release from Internet dated May 7, 1997 "Viacom Inc.".
Press Release from Internet dated May 8, 1997 "Gemstar International Group Limited".
Press Release from Internet dated Nov. 12, 1996 "Excalibur Technologies Corp.".
Press Release from Internet dated Nov. 12, 1996 "Keyware Technologies Inc.".
Press Release from Internet dated Nov. 12, 1996 Yahoo! First to Offer Internet Image Search Using Excalibur Visual RetrievalWare, http:www.prnewswire.com.
Press Release from Internet dated Nov. 12, 1996, "Company Delivers New Products, Intensifies Focus on Eliminating InfoGlut in Large Organizations", http://www.prnewswire. com.
Press Release from Internet dated Nov. 12, 1996, Keyware Technologies Inc. will introduce the industry's first server, http://www. prnewswire.com.
Press Release from Internet dated Nov. 13, 1998 "New Digital Copy Protection Proposal Would Secure Authorized Copies", http://www. zenith.com/main/pr_documents/ pr.hdtv.111398.html.
Press Release from Internet dated Nov. 20, 1996 "Excalibur offers complete suite of DataBlade modules", demers@excalib.com.
Press Release from Internet dated Nov. 20, 1996 "Excalibur Technologies Corp.".
Press Release from Internet dated Nov. 20, 1996, Excalibur Technologies Corporation (Nasdaq:EXCA), http://www.prnewswire. com.
Press Release from Internet dated Nov. 25, 1998 "The Box Music Network and ACTV to Explore Enhanced Programming", http://www.actv.com.
Press Release from Internet dated Nov. 4, 1996 "Excalibur Technologies Corp.".
Press Release from Internet dated Nov. 4, 1996, Excalibur Technologies Corporation (Nasdaq:EXCA), http://www.prnewswire. com.
Press Release from Internet dated Nov. 5, 1996 "Oracle Corp. and Virage, Inc.".
Press Release from Internet dated Nov. 5, 1996, "Leading Database Vendor Broadens Support for Multimedia Datatypes", http://www.prnewswire.com.
Press Release from Internet dated Nov. 5, 1997 "Easy-to-Use TV Phone Turns Regular Phone Calls Into Video Phone Calls".
Press Release from Internet dated Nov. 5, 1997 "IBM and Magnifi".
Press Release from Internet dated Oct. 1, 1996 "Blueridge Technologies".
Press Release from Internet dated Oct. 13, 1998 "Alta Vista Unveils the Most Powerful and Useful Guide to the Internet".
Press Release from Internet dated Oct. 13, 1998 "Compaq Soups up Alta Vista with New Search Technology".
Press Release from Internet dated Oct. 13, 1998 "Compaq's Alta Vista Selects Virage".
Press Release from Internet dated Oct. 14, 1996, "The U.S. home video industry is losing an estimated $370 million annually".

(56) References Cited

OTHER PUBLICATIONS

Press Release from Internet dated Oct. 14, 1997 "Excalibur Technologies Corp.".
Press Release from Internet dated Oct. 15, 1996, Gemstar's TV Guide Plus+ system introduced in Magnavox and JVC televisions and VCRs.
Press Release from Internet dated Oct. 15, 1997 "New License Agreements for Web Developers Simplify".
Press Release from Internet dated Oct. 17, 1996, "Movie>>Advance (TM), offspring of Commercial>>Advance(R)", http://www.prnewswire.com.
Press Release from Internet dated Oct. 22, 1996, "Products to take advantage of Inherent Flexibility of New Open Standard".
Press Release from Internet dated Oct. 22, 1997 "Why Microsoft's Operating System Should Be Accessible to All Legitimate Competitors".
Press Release from Internet dated Oct. 23, 1996, "Stephen M. Studdert", http://www.prnewswire.com.
Press Release from Internet dated Oct. 28, 1996, Zilog, Inc. (NYSE:ZLG).
Press Release from Internet dated Oct. 28, 1997 "Gemstar International Group Limited".
Press Release from Internet dated Oct. 28, 1997 "Mitsubishi Electronics America Inc.".
Press Release from Internet dated Oct. 29, 1996 "Copyright Protection Technical Working Group Announces DVD Encryption Achievement", Copyright Protection Technical Working Group . . . .
Press Release from Internet dated Oct. 29, 1997 "Gemstar's StarSight Interactive Program Guide Part of a Full-Service Package".
Press Release from Internet dated Oct. 29, 1997 "New Utility can also be configured to delete cookie and history".
Press Release from Internet dated Oct. 3, 1996, "Tyco Toys Inc. (NYSE:TTI) has announced eagerly anticipated video camera for kids".
Press Release from Internet dated Oct. 3, 1997 "ISLIP Media, Inc.".
Press Release from Internet dated Oct. 4, 1996 "Excalibur Technologies Corp.".
Press Release from Internet dated Oct. 6, 1997 "Acorn Provides Enhanced Java Support".
Press Release from Internet dated Oct. 6, 1997 "The Acorn Group today announced".
Press Release from Internet dated Oct. 7, 1996 "Excalibur Technologies Corp. and Sequent Computer Systems Inc.".
Press Release from Internet dated Oct. 7, 1997 "Gartner Symposium/ITEXPO '97".
Press Release from Internet dated Oct. 8, 1996 "Excalibur Gives Global Access to Lotus Notes and Other Mission-Critical Information".
Press Release from Internet dated Oct. 8, 1996, "Autonomy Inc.".
Press Release from Internet dated Oct. 8, 1996, "High Speed Broadband Online Service to Reach 638,000 Households".
Press Release from Internet dated Oct. 8, 1997 "Virage, Inc.".
Press Release from Internet dated Oct. 8, 1998 "ACTV Signs New Contracts to Deliver eSchool Online in New York City and Massachusetts", http://www.actv.com.
Press Release from Internet dated Oct. 9, 1996, "MSU Corp (OTC: MUCP) is arranging meetings in New York City".
Press Release from Internet dated Sep. 10, 1997 "Excalibur Technologies Corp.".
Press Release from Internet dated Sep. 15, 1997 "Extends Leadership in Knowledge Retrieval With Exalibur Internet".
Press Release from Internet dated Sep. 15, 1997 "Industry Leaders Endorse Virage's Compelling Solutions".
Press Release from Internet dated Sep. 15, 1997 "Informix Software, Inc.".
Press Release from Internet dated Sep. 15, 1997 "Perspecta".
Press Release from Internet dated Sep. 15, 1997 "Sun Microsystems, Inc.".
Press Release from Internet dated Sep. 15, 1998 "Intel Announces Industry's First Single-Chip Silicon Solution for Home Networking", http://www.intel.com.
Press Release from Internet dated Sep. 15, 1998 "Liberty Media Invests in ACTV, Inc.", http://www.actv.com.
Press Release from Internet dated Sep. 16, 1997 "New WebTV(R) Plus System".
Press Release from Internet dated Sep. 16, 1997 "Texas Instruments Incorporated".
Press Release from Internet dated Sep. 17, 1997 "Oracle Corp.".
Press Release from Internet dated Sep. 17, 1997 "Virage and Oracle Announce First Availability of Compelling Media".
Press Release from Internet dated Sep. 21, 1995 "Belmont Research awarded ARPA SBIR Phase II", Belmont Research image retrieval.
Press Release from Internet dated Sep. 23, 1996, "Viva Productions Inc. of the Philippines has singed an agreement with Macrovision".
Press Release from Internet dated Sep. 23, 1997 "New Modular and Set-Top Videophones with Web Browsing Capability".
Press Release from Internet dated Sep. 23, 1997 "New Modular Videophone Retails for $329".
Press Release from Internet dated Sep. 30, 1997 "Go-Video, Inc.".
Press Release from Internet dated Sep. 8, 1997 "Knowledge Retrieval Leader".
Press Releases from Internet dated Oct. 3, 1997 "ISLIP Media, Inc.".
Publication by IBM Ultimedia Manager.
Publication by InSide Gartner Group, pp. 5-8, Oct. 9, 1991.
Publication by Superbase Inc.
Publisher: IEEE Comput. Soc. Press Los Alamitos, CA, USA Date: 1994 viii+167 pp.
Puzicha, Jan, "Multiscale Annealing for Texture Segmentation, Color Quantization and Image Retrieval", Talks at the International Computer Science Institute, http://www.icsi. berkeley.edu/talks/puzicha.html.
Quinnel, Richard A, "Gyroscope Allows 3-D Motion Sensing for Robotics and Desktop Computers", EDN, (Nov. 7, 1991):120.
Quinnell, Richard A., "Image Compression Part 3", EDN, May 13, 1993, pp. 114-120.
Rames Jain biography.
Ramo, Joshua Cooper, "Winner Take All", Time, Sep. 16, 1996.
Ramstein, Christophe, "Adaptive User Interfaces with Force Feedback", Performance Support Systems Group, Centre for Information Technology Innovation, http://www.uni.paderborn.de/chi96/EIPub/WWW/chi96www/videos/Ramstein/Cr_ami.htm.
Reinhardt, Andy, et al., "Microsoft Licenses Fractal Technology", BYTE, p. 26, May 1992.
Research Update dated Sep. 30, 1998 Neidiger/Tucker/Bruner, Inc. Recommendation Speculative BUY-SB, http://208.246.40.20/newpage/report/middle.html.
rexx.faq at rexx.hursley.ibm.com, Frequently Asked Questions About Rexx, Aug. 12, 1994.
Ritchie, Gill, "Human Computer Interaction Archive", The London Parallel Applications Centre, http://hypatia.dcs.qmw.ac.uk/SEL-HPC/Articles/GeneratedHtml/ hci.adapui.html.
Roberts, Johnnie, et al.; "Smart Sets—Age of Interactive TV may be nearing as IBM and Warner Talk Deal"; The Wall Street Journal; May 21, 1992; vol. CCXIX No. 100.
Robertson, John, et al., "Automatic speech recognition for generalised time based media retrieval and indexing", ACM Multimedia 98—Electronic Proceedings, http://info. acm.org/sigmm/MM98/electronic_proceedings/robertson/index.html.
Robinson, Gail, "Chip senses fingerprints for low-cost security", Electronic Engineering Times, Jun. 23, 1997, p. 41.
Rooney, Paula; "New Word for Windows to tap 'smart' features"; PCWeek, Mar. 22, 1993, vol. 10, No. 11; pp. 1 and 14.
Rui, Yong, et al., "A Relevance Feedback Architecture for Content-based Multimedia Information Retrieval Systems", University of Illinois at Urbana-Champaign.
Rui, Yong, et al., "Browsing and Retrieving Video Content in a Unified Framework", Reckman Institute for Advanced Science and Technology, University of Illinois at Urbana-Champaign, Urbana, IL 61801.

(56) References Cited

OTHER PUBLICATIONS

Rui, Yong, et al., "Image Retrieval: Past, Present, and Future", Dept. of ECE & Beckman Institute, University of Illinois at Urbana-Champaign, Urbana, IL.
Rui, Yong, et al., "Relevance Feedback: A Power Tool for Interactive Content-Based Image Retrieval", Dept. of ECE & Beckman Institute, University of Illinois at Urbana-Champaign, Urbana, IL, IEEE Transactions on Circuits and Video Technology, IEEE Transactions on Circuits and Video Technology.
Sawhney, Nitin, et al., "Nomadic Radio: Scaleable and Contextual Nofigication for Wearable Audio Messaging", Proceedings of CHI'99, the ACM SIGHI Conference on Human Factors in Computing Systems, May 15-20, Pittsburgh, PA Copyright 1999 ACM.
Schmitt, Lee & Olson, Dean, "Let's Discuss Programmable Controllers" Modern Machine Shop, (May 1987): 90-99.
Schroder, Erica, "Digital cameras come into focus".
Schweiker, K.S., "A fractal detection algorithm for a LADAR sensor", (Hercules Defense Electron.), Syst. Inc., Clearwater, FL, USA, Proceedings of the SPIE—The International Society for Optical Engineering, vol. 1960, pp. 35-35, Date: 1993.
Schweitzer, Haim, "Computational limitations of model based recognition" http://www.utd.edu.about.haim/publications/html/modelnpc.html.
Seales, et al., "Content Analysis of Compressed Video".
Sean Landis' CS718 Project, Fall 1995, http://www.tc.cornell.edu/Visualization/Education/cs718/falll 995/landis.index.html.
Search of ACM Abstracts (www.acm.org, Sep. 1, 1997) for "Intelligent Agent".
Shapiro, Linda, et al., "Efficient Content-Based Image Retrieval", Dept. of Computer Science and Engineering, University of Washington, http://www.cs.columbia.edu/.about.klavans/ Activities/98-IDM-Workshop/participant . . /aberman.htm Sep. 17, 1999.
Sharpe, Lora, "Teen Havens", The Globe, : 12.
Shepard, Jeffrey D, "Tapping the Potential of Data Compression", Military & Aerospace Electronics (May 17, 1993): 25-28.
Shmulevich, Ilya, et al., "Perceptual Issues in Music Pattern Recognition—Complexity of Rhythm and Key Finding".
Shmulevich, Ilya, et al., "Rhythm complexity measures for music pattern recognition".
Shmulevich, Ilya, et al., "The use of recursive median filters for establishing the tonal context in music".
Shoham, A mechanism for reasoning about utilities (and probabilities) (preliminary report), IJCAI (1997).
Siochi, Antonio C. and Hix, Deborah, "A Study of Computer-Supported User Interface Evaluation Using Maximal Repeating Pattern Analysis", CHI '91 Proceedings(1991). (1991), ACM 0-89791-383-3/91/0004/0301,pp. 301-304.
Siohi, Antonio C. and Hix. Deborah, "A Study of Computer-Supported User Interface Evaluation Using Maximal Repeating Pattern Analysis", CHI '91 Proceedings, (1991), ACM 0-89791-383-3/91/0004/0301,pp. 301-304.
Smith, Brian, "A survey of compressed domain processing techniques", http://www.uky.edu/.about.kiernan/DL/bsmith.html.
Smith, John R., et al., "SaFe: A General Framework for Integrated Spatial and Feature Image Search", IEEE Signal Processing Society 1997 Workshop on Multimedia Signal Processing, Jun. 23-25, 1997, Princeton, NJ.
Smith, John R., et al., "VisualSEEk: a Content-Based Image/Video Retrieval System".
Smith, John, et al.; "VisualSEEk: A fully automated content-based image query system"; Dept. of Electrical Engineering and Center for Image Technology for New Media, Columbia University, New York, NY 10027.
Smith, Sidney L. and Mosier, Jane N., "Guidelines for Designing User Interface Software", ESD-TR-86-278, MTR 10090, Mitre Corporation, Bedford, Massachusetts, (Aug. 1986), (pp. 1-10, 401-418 provided) NTIS AD A177 198.
Spencer, Harvey, "For Front-End/Scanning Economy: A Universally-Readable Document?", Advanced Imaging, p. 52-54.
Spering, Barbara Tullis, Thomas, "Are You a Better" Mouser or Trackballer? A Comparison of Cursor Postioning Performance, McDonnell Douglas Astronautics Company :1-4.
SPSS, Inc. Web Page, 1997.
Stochastic Modeling of an Automated Guided Vehicle System With One Vehicle and a Closed-Loop Path Kahraman, A. F.; Gosavi, A.; Oty, K. J.; Automation Science and Engineering, IEEE Transactions on [see also Robotics and Automation, IEEE Transactions on] vol. 5, Issue 3, Jul. 2008 pp. 504-518 Digital Object Identifier 10.1109/TASE.2008.917.
Su, Jonathan, et al., "A Channel Model for a Watermark Attack".
Swanson, Mitchell, et al., "Coding for Content-based Retrieval".
Swets, Daniel L. and Weng, John J., "Efficient Content-Based Image Retrieval Using Automatic Feature Selection".
Tarr, Greg, "Personalized TV System Heads to Retail Shelves", Nov. 16, 1998, http://www.twice.com.
Taschek, John, "Will Video Indexing Kill Off the Database?", PC Week, Oct. 12, 1998, p. 63.
Teal, Steven L., "A Performance Model of System Delay and User Strategy Selection", CHI '92, May 3-7, 1992, pp. 295-305.
Technical Overview by Excalibur Technologies.
Technical Program ACM MM98, http://info.acm.org/sigmm/MM98/program.html.
Technology Newsletter, Electronic Design/Sep. 3, 1996.
Tello, Ernest R, "Between Man and Machine", BYTE, (Sep. 1988): 288-293.
The ANSI Standard for Rexx Web Page Jul. 14, 1997.
The history behind Broadcatch. Printed from www.broadcatch.com/smartv.html on Aug. 31, 2005.
The Media Lab: Inventing the future at M.I.T.; by Stewart Brand, 1987.
The MPEG Home Page, http://drogo.cselt.stet.it/mpeg.
The SCIT multi-vehicle networked control testbed Qinghua Li; Mingxiang Ling; Zhenshen Qu; Weinan Xie; Systems and Control in Aerospace and Astronautics, 2006. ISSCAA 2006. 1st International Symposium on Jan. 19-21, 2006 pp. 4 pp. Digital Object Identifier 10.1109/ISSCCA.2006.1627530.
Thesis by John R. Smith entitled "Integrated Spatial and Feature Image Systems: Retrieval, Analysis and Compression".
Thiel, Ulrich, et al., "Beyond similarity searching: concept-based video retrieval and Browsing", http://www.darmstadt.gmd.de/.about.evens/delos99/.
Thomas, Owen, "Launch Takes Music Personally", The Red Herring Online, Nov. 7, 1997.
Touradj Ebrahimi, "MPEG-4 Video Verification Model: A video encoding/decoding algorithm based on content representation".
Trachtenberg, Jeffrey, "How Do We Confuse Thee? Let Us Count the Ways", Forbes, (Mar. 21, 1988): 155-160.
Ueda, et al., Impact: An Interactive Natural-Motion-Picture Dedicated Multimedia Authoring System, Central Research Laboratory, Hitachi, Ltd., CHI Proceedings '91.
Ueda, Hirotada et al, "Impact: An Interactive Natural-Motion-Picture Dedicated Multimedia Authoring System", CHI '91 Proceedings (1991) ACM 0-89791-383-3/91/0004/0343, pp. 343-350.
Uhlig, Bayesian Vector Autoregressions with Stochastic Volatility, Feb. 2, 1996 Econometrica.
Uitdenbogerd, Alexandra, et al., "Manipulation of music for melody matching" ACM Multimedia 98—Electronic Proceedings, http://www.kom.e-technik.tu-darmstadt.de/pr/workhop/chair/ACMMM98/electr.- ../index.htm.
Vellaikal, Asha, et al., "Content-Based Image Retrieval Using Multiresolution Histogram Representation".
Verplank, William, "Graphics in Human-Computer Communication: Principles of Graphical User-Interface Design", Preprint.
Vidakovic, Wavelet-Based Nonparametric Bayes Methods, (1998) http://www.isye.gatech.edu/nbrani/up/chapter.ps.
Video Glossary by Dave Marsh, as of Jul. 14, 1997.
Vieira, Marina, et al., "Metadata for content-based search on an MHEG-5 multimedia objects server", http://computer.org/conferen/proceed/meta/1999/papers/32/MViera.html.
Virage article, http://www.virage.com/.
VLBV98 Workshop Schedule, http://www.ifp.uiuc.edu/vlbv98/schedule.html.

(56) References Cited

OTHER PUBLICATIONS

Vonder Haar, Steven, "Content Drives Targeting", Interactive Week 5(30) Aug. 14, 1998 p. 8.

Voorbraak, "Decision Analysis using Partial Probability Theory", Working Papers of AMI (1997).

Wang, H., et al., "A signature for content-based image retrieval using a geometrical transform", http://info.acm.org/sigmm/MM98/electronic.sub.--proceedings/wang/index.ht- ml.

Wang, James Z., "Content Based Image Search Demo Page".

WebSeek at Columbia University, "A Content-Based Image and Video Catalog and Search Tool for the Web".

Wei, et al., Omni-face detection for video/image content description, http://woodworm.cs.uml.edu/.about.rprice/ep/wei/index.html, Proceedings of the 2000 ACM Workshops on Multimedia LA, CA pp. 185-189, 2000.

Weinshall, Daphna, et al., "On View Likelihood and Stability", IEEE PAMI: Abstracts—Feb. 1997.

Weiss, Ray, "32-Bit Floating Point DSP Processors", EDN, (Nov. 7, 1997:):128-146.

West, Bayesian inference in cyclical component dynamic linear models, Aug. 8, 1995, J. American Statistical Assn.

Widyantoro, Dynamic Modeling and Learning User Profile in Personalized News Agent, Thesis, May 1999, Texas A & M.

Wieldenbeck, Susan, et al, "Using Protocol Analysis to Study the User Interface", Bulletin of the American Society for Information Science, (Jul. 1989):25-26.

Wilf, Itzhak, "Computer, Retrieve for Me the Video Clip of the Winning Goal", Advanced Imaging, Aug. 1998, pp. 53-55.

Wilke, William, "Easy Operation of Instruments by Both Man and Machine", Human Interfacing With Instruments: 1-4.

Wilkins, R.J., et al., "The MAVIS project-extending generic links and content based retrieval to non-textual documents in the Microcosm model", http://www.ecs.soton.ac.uk/publications/rj/1994.im/griffith/resjorn.html.

William A. Graven bio, http://emc3/corporate/officers/graven.html.

Wingfield, Nick, "An Internet Fledgling Pushes for Control of Key Technology", The Wall Street Journal, p. B9, Wednesday, Oct. 8, 1997.

Wold, Erling, et al., "Classification, Search, and Retrieval of Audio", CRC Handbook of Multimedia Computing 1999, http://www.musclefish.com/crc/index.html.

Won, Annika, "What is an Intelligent Interface?", Notes from an Introduction seminar, Mar. 1997, http://www.sics.se/.about.annika/papers/intint.html.

Wood, Matthew, et al., "Iterative refinement by relevance feedback in content-based digital image retrieval" ACM Multimedia 98—Electronic Proceedings, http://info.acm.org/sigmm/MM98/electronic.sub.--proceedings/wood/index.ht- ml.

Yang, et al., Feature Subset Selection Using a Genetic Algorithm, (1998) IEEE Intelligent Systems 13(2): 44-49; http://chunnan.iis.sinica.edu.tw/nn/bookfinal.ps.

Yli-Harja, Olli, et al., "Graph-based Smoothing of Class Data with Applications in Musical Key Finding".

Yoshida, Junko, "As factions mull watermark proposal . . . Copy-protect logjam stalls DVD-PC debut", EE Times, May 26, 1997, Issue: 955, Techsearch Results.

Yoshida, Junko, "Battle Brewing Over Digital-Video Format", Electronic Engineering Times, (Dec. 2, 1991):20-21.

Yoshida, Junko, "Copy-protect Logjam Stalls DVD-PC Debut", EE Times, pp. 1 and 4, May 26, 1997.

Yoshida, Junko, "Digital Encryption Hostilities Renewed", EE Times, pp. 1 and 14, Monday, Dec. 7, 1998.

Yoshida, Junko, "Digital World Divided on Watermark Specs", EE Times, pp. 1 and 142, Jul. 27, 1998.

Yoshida, Junko, "EMC.sup.2 Pushes Video Rental by Satellite", Electronic Engineering Times (Dec. 2, 1991) 97-98.

Yoshida, Junko, "Intel Bids to Break Copyright Stalemate", EE Times, pp. 1 and 16, Apr. 28, 1997.

Yoshida, Junko, et al., "Video, games, CDs, converge at CES"; Electronic Engineering Times; Jan. 11, 1993; Issue 728; pp. 1 and 8.

Yoshida, Junko, FireWire plan protects video transfer—Intel bids to break copyright stalemate, EETIMES, Apr. 28, 1997, Issue: 951, Techsearch Results.

Young, Jeffrey, "Pirate's Best Friend", Forbes (Mar. 10, 1997) C-Cube's Hot Chip, Forbes (Mar. 10, 1997) C-Cube's hot chip.

Yucel Altunbasak, "Content-Based Video Representation and Motion Tracking for Visual Communication and Multimedia", altunbas.html at www.seas.rochester.edu.

Z/I Imaging Signs Agreement with Defininens, Apr. 25, 2001, http://www.ziimaging.com/News/PressReleases/2001/0425.sub.--02/htm.

Zeisel, Gunter et al, "An Interactive Menu-Driven Remote Control Unit for TV-Receivers and VC-Recorders", IEEE, (1988):814-818.

Zhuang, Yueting, et al., "Applying Semantic Association to Support Content-Based Video Retrieval", Department of Computer Science, Zhejiang University, Hangzhou, China.

Zlotnick, Technology for Integrating Qualitative and Quantitative Factors in Making Major Decisions.

Zook, Chris, "8mm Incorporates Arithmetic Encoding for Data Compression", Computer Technology Review, (Fall 1991):81-85.

\* cited by examiner

Times for the Minimum, Theoretical and Actual Keypresses

Existing Interface

New Interface

ADAPTIVE PATTERN RECOGNITION BASED CONTROL SYSTEM AND METHOD

The present application is:

a Continuation-In-Part of U.S. patent application Ser. No. 09/241,135 filed on Feb. 1, 1999, now U.S. Pat. No. 6,400,996;

a Continuation-In-Part of U.S. patent application Ser. No. 09/260,802 filed on Mar. 2, 1999, now U.S. Pat. No. 7,242,988;

a Continuation-In-Part of U.S. patent application Ser. No. 09/304,536 filed on May 4, 1999, now U.S. Pat. No. 6,418,424; and claims priority to U.S. Provisional Patent Application No. 60/157,829 filed on Oct. 5, 1999.

A portion of the disclosure of this patent document and appendices contain material that is subject to copyright protection. The copyright owner has no objection to the facsimile reproduction by anyone of this patent document or the patent disclosure, as it appears in the U.S. Patent and Trademark Office patent file or records, but otherwise reserves all copyright rights whatsoever.

FIELD OF THE INVENTION

The present invention relates to the field of adaptive systems, and more particularly systems and methods which are adaptive to a human user input and/or a data environment, as well as applications for such systems and methods. More particularly, embodiments of the invention involve, for example, consumer electronics, personal computers, control systems, and professional assistance systems.

BACKGROUND OF THE INVENTION

The prior art is rich in various systems and methods for data analysis, as well as various systems and methods relating to useful endeavors. In general, most existing systems and methods provide concrete functions, which have a defined response to a defined stimulus. Such systems, while embodying the "wisdom" of the designer, have a particular shortcoming in that their capabilities, user interface and functionality are static.

Intelligent or learning systems are also known. These systems are typically limited by the particular paradigm employed, and rarely are the learning algorithms general enough to be applied without limitation to other fields. In fact, while the generic theory and systems which learn are well known, the application of such systems to particular problems often requires both a detailed description of the problem, as well as knowledge of the input and output spaces. Even once these factors are known, a substantial tuning effort may be necessary to enable acceptable operation.

Therefore, the present invention builds upon the prior art, which defines various problems to be addressed, intelligent systems and methods, tuning paradigms and user interfaces. Therefore, as set forth below, and in the attached appendix of references and abstracts, incorporated herein by reference, a significant number of references detail fundamental technologies which may be improved according to the present invention, or incorporated together to form a part of the present invention. Thus, the complete disclosure of these references, combined with the disclosure herein, and/or with each other, are a part of the present invention. The disclosure herein is not meant to be limiting as to the knowledge of a person of ordinary skill in the art. Thus, prior art cited herein is intended to (1) disclose information related to the application published before the filing or effective filing date hereof; (2) define the problem in the art to which the present invention is directed, (3) define prior art methods of solving various problems also addressed by the present invention; (4) define the state of the art with respect to methods disclosed or referenced herein; (5) detail technologies used to implement methods or apparatus in accordance with the present invention; and/or (6) define elements of the invention as disclosed in individual references, combinations of references, and/or combinations of disclosure of the references with the express disclosure herein.

Human Interface

Aspects of the present invention provide an advanced user interface. The subject of man-machine interfaces has been studied for many years, and indeed the entire field of ergonomics and human factors engineering revolves around optimization of human-machine interfaces. Typically, the optimization scheme optimizes the mechanical elements of a design, or seeks to provide a universally optimized interface. Thus, a single user interface is typically provided for a system, although some systems have multiple different interfaces which may be related or unrelated. In fact, some systems provide a variety of related interfaces, for example, novice, intermediate and advanced, to provide differing balances between available control and presented complexity. Further, adaptive and/or responsive human-machine computer interfaces are now well known. However, a typical problem presented is to define a self-consistent and useful (i.e., an improvement over a well-designed static interface) theory for altering the interface. Therefore, even where, in a given application, a theory for optimization exists, the theory is typically not generalizable to other applications. Therefore, one aspect of the present invention is to provide such an overall theory by which adaptive and/or responsive user interfaces may be constructed and deployed.

In a particular application, the user interface according to the present invention may be applied to general-purpose-type computer systems, for example, personal computers. While it might seem that a general-purpose-type computer system interface would necessarily be general purpose, and therefore not require modification for the many potential uses, this is not the case. In fact, the lack of application specificity may make such an interface difficult to use, decreasing efficiency of use and increasing user frustration and the probability of error. One aspect of the present invention thus relates to a programmable device that comprises a menu-driven interface in which the user enters information using a direct manipulation input device. An earlier type of interface scheme addressing this issue is disclosed in Verplank, William L., "Graphics in Human-Computer Communication: Principles of Graphical User-Interface Design", Xerox Office Systems. See the references cited therein: Foley, J. D., Wallace, V. L., Chan, P., "The Human Factor of Computer Graphics Interaction Techniques", IEEE CG&A, November 1984, pp. 13-48; Koch, H., "Ergonomische Betrachtung von Schreibtastaturen", Humane Production, 1, pp. 12-15 (1985); Norman, D. A., Fisher, D., "Why Alphabetic Keyboards Are Not Easy To Use: Keyboard Layout Doesn't Much Matter", Human Factors 24(5), pp. 509-519 (1982); Perspectives: High Technology 2, 1985; Knowlton, K., "Virtual Pushbuttons as a Means of Person-Machine Interaction", Proc. of Conf. Computer Graphics, Pattern Recognition and Data Structure, Beverly Hills, Calif., May 1975, pp. 350-352; "Machine Now Reads, enters Information 25 Times Faster Than Human Keyboard Operators", Information Display 9. p. 18 (1981); "Scanner Converts Materials to Electronic Files for PCs", IEEE CG&A, December 1984, p. 76; "New Beetle Cursor Director Escapes All Surface Constraints", Information Display 10, p. 12, 1984; Lu, C., "Computer Pointing Devices: Living With Mice", High Technology, January 1984, pp. 61-65; "Finger Painting", Information Display 12, p. 18, 1981; Kraiss, K. F., "Neuere Methoden der Interaktion an der Schnittstelle Mensch-Maschine", Z. F. Arbeitswissenschaft, 2, pp. 65-70, 1978; Hirzinger, G., Landzettel, K., "Sensory Feedback Structures for Robots with Supervised Learning", IEEE Conf. on Robotics and Automation, St. Louis, March 1985: Horgan, H., "Medical Electronics", IEEE Spectrum, January 1984, pp. 90-93.

A menu based remote control-contained display device is disclosed in Platte, Oberjatzas, and Voessing, "A New Intelligent Remote Control Unit for Consumer Electronic Device", IEEE Transactions on Consumer Electronics, Vol. CE-31, No. 1, February 1985, 59-68.

It is noted that in text-based applications, an input device that is accessible, without the necessity of moving the user's hands from the keyboard, may be preferred. Known manual input devices include the trackball, mouse, and joystick. In addition, other devices are known, including the so-called "J-cursor" or "mousekey" which embeds a two (x,y) or three (x,y,p) axis pressure sensor in a button conformed to a finger, present in a general purpose keyboard; a keyboard joystick of the type described in Electronic Engineering Times, Oct. 28, 1991, p. 62, "IBM Points a New Way"; a so-called "isobar" which provides a two axis input by optical sensors (θ, x), a two and one half axis (x, y, digital input) input device, such as a mouse or a "felix" device, infrared, acoustic, etc.; position sensors for determining the position of a finger or pointer on a display screen (touch-screen input) or on a touch surface, e.g., "GlidePoint" (ALPS/Cirque); goniometer input (angle position, such as human joint position detector), etc. Many of such suitable devices are summarized in Kraiss, K. F., "Alternative Input Devices For Human Computer Interaction", Forschunginstitut Für Anthropotecahnik, Werthhoven, F. R. Germany. Another device, which may also be suitable is the GyroPoint, available from Gyration Inc., which provides 2-D or 3-D input information in up to six axes of motion: height, length, depth, roll, pitch and yaw. Such a device may be useful to assist a user in inputting a complex description of an object, by providing substantially more degrees of freedom sensing than minimally required by a standard graphic user interface. The many degrees of freedom available thus provide suitable input for various types of systems, such as "Virtual Reality" or which track a moving object, where many degrees of freedom and a high degree of input accuracy is required. The Hallpot, a device which pivots a magnet about a Hall effect sensor to produce angular orientation information, a pair of which may be used to provide information about two axes of displacement, available from Elweco, Inc, Willoughby, Ohio, may also be employed as an input device.

User input devices may be broken down into a number of categories: direct inputs, i.e. touch-screen and light pen; indirect inputs, i.e. trackball, joystick, mouse, touch-tablet, bar code scanner (see, e.g., Atkinson, Terry, "VCR Programming: Making Life Easier Using Bar Codes"). keyboard, and multi-function keys; and interactive input, i.e. Voice activation/instructions (see, e.g., Rosch, Winn L., "Voice Recognition: Understanding the Master's Voice", PC Magazine, Oct. 27, 1987, 261-308); and eye tracker and data suit/data glove (see, e.g. Tello, Ernest R., "Between Man And Machine", Byte, September 1988, 288-293; products of EXOS, Inc; Data Glove). Each of the aforementioned input devices has advantages and disadvantages, which are known in the art.

Studies suggest that a "direct manipulation" style of interface has advantages for menu selection tasks. This type of interface provides visual objects on a display screen, which can be manipulated by "pointing" and "clicking" on them. For example, the popular Graphical User Interfaces ("GUIs"), such as Macintosh and Microsoft Windows, and others known in the art, use a direct manipulation style interface. A device such as a touch-screen, with a more natural selection technique, is technically preferable to the direct manipulation method. However, the accuracy limitations and relatively high cost make other inputs more commercially practical. Further, for extended interactive use, touchscreens are not a panacea for office productivity applications. In addition, the user must be within arms' length of the touch-screen display. In a cursor positioning task, Albert (1982) found the trackball to be the most accurate pointing device and the touch-screen to be the least accurate when compared with other input devices such as the light pen, joystick, data tablet, trackball, and keyboard. Epps (1986) found both the mouse and trackball to be somewhat faster than both the touch-pad and joystick, but he concluded that there were no significant performance differences between the mouse and trackball as compared with the touch-pad and joystick.

A particular focus of the present invention is the application of the principles herein to consumer electronic devices and simple controls. The videocassette recorder (VCR) device exemplifies many of the issues presented. There have been many proposals and implementations seeking to improve the operation of the VCR control system. For example, a directional or direct manipulation-type sensor based infrared remote control is disclosed in Zeisel, Tomas, Tomaszewski, "An Interactive Menu-Driven Remote Control Unit for TV-Receivers and VC-Recorders", IEEE Transactions on Consumer Electronics, Vol. 34, No. 3, 814-818 (1988), which relates to a control for programming with the West German Videotext system. This implementation differs from the Videotext programming system than described in Bensch, U., "VPV—VIDEOTEXT PROGRAMS VIDEORECORDER", IEEE Transactions on Consumer Electronics, Vol. 34, No. 3, 788-792 (1988), which describes the system of Video Program System Signal Transmitters, in which the VCR is programmed by entering a code for the Video Program System signal, which is emitted by television stations in West Germany. Each separate program has a unique identifier code, transmitted at the beginning of the program, so that a user need only enter the code for the program, and the VCR will monitor the channel for the code transmission, and begin recording when the code is received, regardless of schedule changes. The Videotext Programs Recorder (VPV) disclosed does not intelligently interpret the transmission, rather the system reads the transmitted code as a literal label, without any analysis or determination of a classification of the program type.

The following references are also relevant to the interface aspects of the present invention:
Hoffberg, Linda I, "AN IMPROVED HUMAN FACTORED INTERFACE FOR PROGRAMMABLE DEVICES: A CASE STUDY OF THE VCR" Master's Thesis, Tufts University (Master of Sciences in Engineering Design, November, 1990).
"Bar Code Programs VCR", Design News, Feb. 1, 1988, 26.
"How to find the best value in VCRs", Consumer Reports, March 1988, 135-141.

"Low-Cost VCRs: More For Less", Consumer Reports, March 1990, 168-172.

"Nielsen Views VCRs", Television Digest, Jun. 23, 1988, 15.

"The Highs and Lows of Nielsen Homevideo Index", Marketing & Media Decisions, November 1985, 84-86+.

"The Quest for 'User Friendly'", U.S. News & World Report, Jun. 13, 1988, 54-56.

"The Smart House: Human Factors in Home Automation", Human Factors in Practice, December 1990, 1-36.

"VCR, Camcorder Trends", Television Digest, Vol. 29:16 (Mar. 20, 1989).

"VCR's: A Look At The Top Of The Line", Consumer Reports, March 1989, 167-170.

"VHS Videocassette Recorders", Consumer Guide, 1990, 17-20.

Abedini, Kamran, "An Ergonomically-improved Remote Control Unit Design", Interface '87 Proceedings, 375-380.

Abedini, Kamran, and Hadad, George, "Guidelines For Designing Better VCRs", Report No. IME 462, Feb. 4, 1987.

Bensch, U., "VPV—VIDEOTEXT PROGRAMS VIDEORECORDER", IEEE Transactions on Consumer Electronics, 34(3):788-792.

Berger, Ivan, "Secrets of the Universals", Video, February 1989, 45-47+.

Beringer, D. B., "A Comparative Evaluation of Calculator Watch Data Entry Technologies: Keyboards to Chalkboards", Applied Ergonomics, December 1985, 275-278.

Bier, E. A. et al. "MMM: A User Interface Architecture for Shared Editors on a Single Screen," Proceedings of the ACM Symposium on User Interface Software and Technology, Nov. 11-13, 1991, p. 79.

Bishop, Edward W., and Guinness, G. Victor Jr., "Human Factors Interaction with Industrial Design", Human Factors, 8(4):279-289 (August 1966).

Brown, Edward, "Human Factors Concepts For Management", Proceedings of the Human Factors Society, 1973, 372-375.

Bulkeley, Debra, "The Smartest House in America", Design News, Oct. 19, 1987, 56-61.

Card, Stuart K., "A Method for Calculating Performance times for Users of Interactive Computing Systems", IEEE, 1979, 653-658.

Carlson, Mark A., "Design Goals for an Effective User Interface", Electro/82 Proceedings, 3/1/1-3/1/4.

Carlson, Mark A., "Design Goals for an Effective User Interface", Human Interfacing with Instruments, Session 3.

Carroll, Paul B., "High Tech Gear Draws Cries of "Uncle", Wall Street Journal, Apr. 27, 1988, 29.

Cobb, Nathan, "I don't get it", Boston Sunday Globe Magazine, Mar. 25, 1990, 23-29.

Davis, Fred, "The Great Look-and-Feel Debate", A+, 5:9-11 (July 1987).

Dehning, Waltraud, Essig Heidrun, and Maass, Susanne, The Adaptation of Virtual Man-Computer Interfaces to User Requirements in Dialogs, Germany: Springer-Verlag, 1981.

Ehrenreich, S. L., "Computer Abbreviations—Evidence and Synthesis", Human Factors, 27(2):143-155 (April 1985).

Friedman, M. B., "An Eye Gaze Controlled Keyboard", Proceedings of the 2nd International Conference on Rehabilitation Engineering, 1984, 446-447.

Gilfoil, D., and Mauro, C. L., "Integrating Human Factors and Design: Matching Human Factors Methods up to Product Development", C. L. Mauro Assoc., Inc., 1-7.

Gould, John D., Boies, Stephen J., Meluson, Antonia, Rasammy, Marwan, and Vosburgh, Ann Marie, "Entry and Selection Methods For Specifying Dates". Human Factors, 32(2):199-214 (April 1989).

Green, Lee, "Thermo Tech: Here's a common sense guide to the new thinking thermostats", Popular Mechanics, October 1985, 155-159.

Grudin, Jonathan, "The Case Against User Interface Consistency", MCC Technical Report Number ACA-HI-002-89, January 1989.

Harvey, Michael G., and Rothe, James T., "VideoCassette Recorders: Their Impact on Viewers and Advertisers", Journal of Advertising, 25:19-29 (December/January 1985).

Hawkins, William J., "Super Remotes", Popular Science, February 1989, 76-77.

Henke, Lucy L., and Donohue, Thomas R., "Functional Displacement of Traditional TV Viewing by VCR Owners", Journal of Advertising Research, 29:18-24 (April-May 1989).

Hoban, Phoebe, "Stacking the Decks", New York, Feb. 16, 1987, 20:14.

Howard, Bill, "Point and Shoot Devices", PC Magazine, 6:95-97 (August 1987).

Jane Pauley Special, NBC TV News Transcript, Jul. 17, 1990, 10:00 PM.

Kolson, Ann, "Computer wimps drown in a raging sea of technology", The Hartford Courant, May 24, 1989, B1.

Kreifeldt, J. G., "A Methodology For Consumer Product Safety Analysis", The 3rd National Symposium on Human Factors in Industrial Design in Consumer Products, August 1982, 175-184.

Kreifeldt, John, "Human Factors Approach to Medical Instrument Design", Electro/82 Proceedings, 3/3/1-3/3/6.

Kuocheng, Andy Poing, and Ellingstad, Vernon S., "Touch Tablet and Touch Input", Interface '87, 327.

Ledgard, Henry, Singer, Andrew, and Whiteside, John, Directions in Human Factors for Interactive Systems, New York, Springer-Verlag, 1981.

Lee, Eric, and MacGregor, James, "Minimizing User Search Time Menu Retrieval Systems", Human Factors, 27(2): 157-162 (April 1986).

Leon, Carol Boyd, "Selling Through the VCR", American Demographics, December 1987, 40-43.

Long, John, "The Effect of Display Format on the Direct Entry of Numerical Information by Pointing", Human Factors, 26(1):3-17 (February 1984).

Mantei, Marilyn M., and Teorey, Toby J., "Cost/Benefit Analysis for Incorporating Human Factors in the Software Lifecycle", Association for Computing Machinery, 1988.

Meads, Jon A., "Friendly or Frivolous", Datamation, Apr. 1, 1988, 98-100.

Moore, T. G. and Dartnall, "Human Factors of a Microelectronic Product: The Central Heating Timer/Programmer", Applied Ergonomics, 1983, 13(1):15-23.

Norman, Donald A., "Infuriating By Design", Psychology Today, 22(3):52-56 (March 1988).

Norman, Donald A., The Psychology of Everyday Things, New York, Basic Book, Inc. 1988.

Platte, Hans-Joachim, Oberjatzas, Gunter, and Voessing, Walter, "A New Intelligent Remote Control Unit for Consumer Electronic Device", IEEE Transactions on Consumer Electronics, Vol. CE-31(1):59-68 (February 1985).

Rogus, John G. and Armstrong, Richard, "Use of Human Engineering Standards in Design", Human Factors, 19(1): 15-23 (February 1977).

Rosch, Winn L., "Voice Recognition: Understanding the Master's Voice", PC Magazine, Oct. 27, 1987, 261-308.

Sarver, Carleton, "A Perfect Friendship", High Fidelity, 39:42-49 (May 1989).

Schmitt, Lee, "Let's Discuss Programmable Controllers", Modern Machine Shop, May 1987, 90-99.

Schniederman, Ben, Designing the User Interface: Strategies for Effective Human-Computer Interaction, Reading, Mass., Addison-Wesley, 1987.

Smith, Sidney J., and Mosier, Jane N., Guidelines for Designing User Interface Software, Bedford, Mass., MITRE, 1986.

Sperling, Barbara Bied, Tullis Thomas S., "Are You a Better 'Mouser' or 'Trackballer'? A Comparison of Cursor—Positioning Performance", An Interactive/Poster Session at the CHI+GI'87 Graphics Interface and Human Factors in Computing Systems Conference.

Streeter, L. A., Ackroff, J. M., and Taylor, G. A. "On Abbreviating Command Names", The Bell System Technical Journal, 62(6):1807-1826 (July/August 1983).

Swanson, David, and Klopfenstein, Bruce, "How to Forecast VCR Penetration", American Demographic, December 1987, 44-45.

Tello, Ernest R., "Between Man And Machine", Byte, September 1988, 288-293.

Thomas, John, C., and Schneider, Michael L., Human Factors in Computer Systems, New Jersey, Ablex Publ. Co., 1984.

Trachtenberg, Jeffrey A., "How do we confuse thee? Let us count the ways", Forbes, Mar. 21, 1988, 159-160.

Tyldesley, D. A., "Employing Usability Engineering in the Development of Office Products", The Computer Journal", 31(5):431-436 (1988).

Verplank, William L., "Graphics in Human-Computer Communication: Principles of Graphical User-Interface Design", Xerox Office Systems.

Voyt, Carlton F., "PLC's Learn New Languages", Design News, Jan. 2, 1989, 78.

Whitefield, A. "Human Factors Aspects of Pointing as an Input Technique in Interactive Computer Systems", Applied Ergonomics, June 1986, 97-104.

Wiedenbeck, Susan, Lambert, Robin, and Scholtz, Jean, "Using Protocol Analysis to Study the User Interface", Bulletin of the American Society for Information Science, June/July 1989, 25-26.

Wilke, William, "Easy Operation of Instruments by Both Man and Machine". Electro/82 Proceedings, 3/2/1-3/2/4.

Yoder, Stephen Kreider, "U.S. Inventors Thrive at Electronics Show", The Wall Street Journal, Jan. 10, 1990, B1.

Zeisel, Gunter, Tomas, Philippe, Tomaszewski, Peter, "An Interactive Menu-Driven Remote Control Unit for TV-Receivers and VC-Recorders", IEEE Transactions on Consumer Electronics, 34(3):814-818.

Agent Technologies

Presently well known human computer interfaces include so-called agent technology, in which the computer interface learns a task defined (inherently or explicitly) by the user and subsequently executes the task or negotiates with other systems to achieve the results desired by the user. The user task may be defined explicitly, by defining a set of rules to be followed, or implicitly, by observation of the user during completion of the specified task, and generalizing to a generalized construct or "agent". Such systems are available from Firefly (www.firefly.com), and are commercially present in some on-line commerce systems, such as Amazon.com (www.amazon.com). There is some debate in the art as to what constitutes an "agent". Herein, such "agent" technology shall be interpreted to encompass any automated method or system which embodies decision-making capability defined by or derived from the user, and which may vary between different users. See:

"ABI WHAP, Web Hypertext Applications Processor," http://alphabase.com/abi3/whapinfo.html#profiling, (1996 Jul. 11).

"AdForce Feature Set", http://www.imgis.com/index.html/core/p2—2html (1997 Apr. 11)

"IPRO," http://www.ipro.com/, Internet profiles Corporation Home and other Web Pages (1996 Jul. 11).

"Media Planning is Redefined in a New Era of Online Advertising," PR Newswire, (1996 Feb. 5).

"My Yahoo! news summary for My Yahoo! Quotes", http://my.yahoo.com, (1997 Jan. 27).

"NetGravity Announces Adserver 2.1", http://www.netgravity.com/news/pressrel/launch21.html (1997 Apr. 11).

"Netscape & NetGravity: Any Questions?", http://www.netgravity.com/, (1996 Jul. 11).

"Network Site Main", http://www.doubleclick.net/frames/general/nets2set.htm (1997 Apr. 11).

"Real Media," http://www.realmedia.com/index.html, (1996 Jul. 11).

"The Front Page", http://live.excite.com/?aBb (1997 Jan. 27) and (1997 Apr. 11).

"The Pointcast Network," http:/www.pointcast.com/, (1996, Spring).

"The Power of PenPoint", Can et al., 1991, p. 39, Chapter 13, pp. 258-260.

"Welcome to Lycos," http://www.lycos.com, (1997 Jan. 27).

Abatemarco, Fred, "From the Editor", Popular Science, September 1992, p. 4

Berniker, M., "Nielsen plans Internet Service," Broadcasting & Cable, 125(30):34 (1995 Jul. 24).

Berry, Deanne, et al. In an Apr. 10, 1990 news release, Symantec announced a new version of MORE™.

Betts, M., "Sentry cuts access to naughty bits," Computers and Security, vol. 14, No. 7, p. 615 (1995).

Boy, Guy A., Intelligent Assistant Systems, Harcourt Brace Jovanovich, 1991, uses the term "Intelligent Assistant Systems".

Bussey, H. E., et al., "Service Architecture, Prototype Description, and Network Implications of a Personalized Information Grazing Service," IEEE Multiple Facets of Integration Conference Proceedings, vol. 3, No. Conf. 9, Jun. 3, 1990, pp. 1046-1053.

Donnelley, J. E., "WWW media distribution via Hopewise Reliabe Multicast," Computer Networks and ISDN Systems, vol. 27, No. 6, pp. 81-788 (April, 1995).

Edwards, John R., "Q&A: Integrated Software with Macros and an Intelligent Assistant", Byte Magazine, January 1986, vol. 11, Issue 1, pp. 120-122, critiques the Intelligent Assistant by Symantec Corporation.

Elofson, G. and Konsynski, B., "Delegation Technologies: Environmental Scanning with Intelligent Agents", Journal of Management Information Systems, Summer 1991, vol. 8, Issue 1, pp. 37-62.

Garretson, R., "IBM Adds 'Drawing Assistant' Design Tool to Graphics Series", PC Week, Aug. 13, 1985, vol. 2, Issue 32, p. 8.

Gessler, S. and Kotulla A., "PDAs as mobile WWW browsers," Computer Networks and ISDN Systems, vol. 28, No. 1-2, pp. 53-59 (December 1995).

Glinert-Stevens, Susan, "Microsoft Publisher: Desktop Wizardry", PC Sources, February, 1992, vol. 3, Issue 2, p. 357.

Goldberg, Cheryl, "IBM Drawing Assistant: Graphics for the EGA", PC Magazine. Dec. 24, 1985, vol. 4, Issue 26, p. 255.

Hendrix, Gary G. and Walter, Brett A., "The Intelligent Assistant: Technical Considerations Involved in Designing Q&A's Natural-language Interface", Byte Magazine, December 1987, vol. 12, Issue 14, p. 251.

Hoffman, D. L. et al., "A New Marketing Paradigm for Electronic Commerce," (1996 Feb. 19), http://www2000.ogsm.vanderbilt.edu novak/new.marketing.paradigm.html.

Information describing BroadVision One-to-One Application System: "Overview," p. 1; Further Resources on One-To-One Marketing, p. 1; BroadVision Unleashes the Power of the Internet with Personalized Marketing and Selling, pp. 1-3; Frequently Asked Questions, pp. 1-3; Products, p. 1; BroadVision One-To-One™, pp. 1-2; Dynamic Command Center, p. 1; Architecture that Scales, pp. 1-2; Technology, pp. 1; Creating a New Medium for Marketing and Selling BroadVision One-To-One and the World Wide Web a White Paper, pp. 1-15; http://www.broadvision.com (1996, January-March).

Jones, R., "Digital's World-Wide Web server: A case study," Computer Networks and ISDN Systems, vol. 27, No. 2, pp. 297-306 (November 1994).

McFadden, M., "The Web and the Cookie Monster," Digital Age, (1996, August).

Nadoli, Gajanana and Biegel, John, "Intelligent Agents in the Simulation of Manufacturing Systems", Proceedings of the SCS Multiconference on AI and Simulation, 1989.

Nilsson, B. A., "Microsoft Publisher is an Honorable Start for DTP Beginners", Computer Shopper, February 1992, vol. 12, Issue 2, p. 426, evaluates Microsoft Publisher and Page Wizard.

O'Connor, Rory J., "Apple Banking on Newton's Brain", San Jose Mercury News, Wednesday, Apr. 22, 1992.

Ohsawa, I. and Yonezawa, A., "A Computational Model of an Intelligent Agent Who Talks with a Person", Research Reports on Information Sciences, Series C, April 1989, No. 92, pp. 1-18.

Pazzani, M. et al., "Learning from hotlists and coldlists: Towards a WWW Information Filtering and Seeking Agent," Proceedings International Conference on Tools with Artificial Intelligence, January 1995, pp. 492-495.

Poor, Alfred, "Microsoft Publisher", PC Magazine, Nov. 26, 1991, vol. 10, Issue 20, p. 40, evaluates Microsoft Publisher.

PRNewswire, information concerning the PointCast Network (PCN) (1996 Feb. 13) p. 213.

Raggett, D., "A review of the HTML+document format," Computer Networks and ISDN Systems, vol. 27, No. 2, pp. 35-145 (November 1994).

Rampe, Dan, et al. In a Jan. 9, 1989 news release, Claris Corporation announced two products, SmartForm Designer and SmartForm Assistant, which provide "Intelligent Assistance", such as custom help messages, choice lists, and data-entry validation and formatting.

Ratcliffe, Mitch and Gore, Andrew, "Intelligent Agents take U.S. Bows.", MacWeek, Mar. 2, 1992, vol. 6, No. 9, p. 1.

Sharif Heger, A. and Koen, B. V., "KNOWBOT: an Adaptive Data Base Interface", Nuclear Science and Engineering, February 1991, vol. 107, No. 2, pp. 142-157.

Soviero, Marcelle M., "Your World According to Newton", Popular Science, September 1992, pp. 45-49.

Upendra Shardanand, "Social Information Filtering for Music Recommendation" September 1994, pp. 1-93, Massachusetts Institute of Technology, Thesis.

Weber, Thomas E., "Software Lets Marketers Target Web Ads," The Wall Street Journal, Apr. 21, 1997

Weiman, Liza and Moran, Tom, "A Step toward the Future", Macworld, August 1992, pp. 129-131.

Yan, T. W. and Garcia-Molina, H., "SIFT-A Tool for Wide-Area Information Dissemination," Paper presented at the USENIX Technical Conference, New Orleans. La. (1995, January), pp. 177-186.

See, also Virtual Library Jam Project, http://www.cs.mu.oz.au/agentlab/VLNL-JAM.html:

Akoulchina, Irina. and Jean-Gabriel Ganascia (1997) SATELIT-Agent: An Adaptive Interface Based on Learning Interface Agents Technology. In Proceedings of the Sixth International Conference on User Modeling. http://www.cs.mu.oz.au/agentlabNL/ps/AkoulchinaI.ps Ambrosini, Leonardo., Vincenzo Cirillo, and Alessandro Micarelli (1997). A Hybrid Architecture for User-Adapted Information Filtering on the World Wide Web. In Proceedings of the Sixth International Conference on User Modeling. http://www.cs.mu.oz.au/agentlabNL/ps/AmbrosiniL.ps Arocena, Gustavo O., Alberto O. Mendelzon, George A. Mihaila (1996). Applications of a Web query language. In Hyper Proceeding of the Sixth International World Wide Web Conference. http://www.cs.mu.oz.au/agentlabNL/html/PAPER267.html.

Benaki, Eftihia., Vangelis A. Karkaletsis, and Constantine D. Spyropoulos (1997) Integrating User Modeling Into Information Extraction: The UMIE Prototype. In Proceedings of the Sixth International Conference on User Modeling. http://www.cs.mu.oz.au/agentlab/VL/ps/BenakiE.ps Jeffrey M. Bradshaw, Peter D. Holm, John H. Boose, Douglas Skuce, Timothy C. Lethbridge (1992) Sharable Ontologies as a Basis for Communication and Collaboration in Conceptual Modeling. In Proceedings of the Seventh Knowledge Acquisition for Knowledge-Based Systems Workshop, Banff. http://www.cs.mu.oz.au/agentlabNL/html/KAW92SharableOntologies.html Jeffrey M. Bradshaw, Kenneth M. Ford, Jack R. Adams-Webber, John H. Boose (1993) Beyond the Repertory Grid: New Approaches to Constructivist Knowledge Acquisition Tool Development. In K. M. Ford & J. M. Bradshaw (Ed.) Knowledge Acquisition as Modeling. Wiley. http://www.cs.mu.oz.au/agentlabNL/html/BeyondtheRepGrid.html.

Bradshaw, Jeffrey M.; John H. Boose (1991) Mediating Representations for Knowledge Acquisition. In Proceedings of the AAAI '92 Knowledge Acquisition: From Science to Techniques to Tools Workshop Anaheim, Calif., July, 1991. http://www.cs.mu.oz.au/agentlabNL/html/MediatingRepsforKA.html Boose, John H.; Brian R. Gaines (1989) Knowledge Acquisition for Knowledge-Based Systems: Notes on the State-of-the-Art. In Machine Learning Journal, 4, pp. 377-394. http://www.cs.mu.oz.au/agentlab/VL/html/MLJEditorialNotes.html.

Boose, John H. (1990) Knowledge Acquisition Tools, Methods, and Mediating Representations. In John H. Boose. In Motoda, H., Mizoguchi, R., Boose, J. H., and Gaines, B. R. (Eds.) Knowledge Acquisition Tools, Methods, and Mediating Representations (1990). Proceedings of the First Japanese Knowledge Acquisition for Knowledge-Based Systems Workshop: JKAW-90, Ohmsha, Ltd:

Japan http://www.cs.mu.oz.au/agentlabNL/html/JKAW90KATechsMedReps.htm

Chekuri, Chandra, Michael H. Goldwasser, Prabhakar Raghaven & Eli Upfal (1996) Web search using automatic classification. In Report to Computer Science Department, Stanford University. http://www.cs.mu.oz.au/agentlabNL/html/WebSearch.html De Carolis, Berardina & Sebastiano Pizzutilo (1997) From Discourse Plans to User-Adapted Hypermedia. In Proceedings of the Sixth International Conference on User Modeling. http://www.cs.mu.oz.au/agentlabNL/ps/DeCarolisB.ps Fink, Josef, Alfred Kobsa, and Andreas Nill (1997) Adaptable and Adaptive Information Access for All Users, Including the Disabled and the Elderly. In Proceedings of the Sixth International Conference on User Modeling. http://www.cs.mu.oz.au/agentlab/VL/ps/FinkJ.ps Gaines, Brian R.; Mildred L G Shaw (1992) Integrated Knowledge Acquisition Architectures. In Journal for Intelligent Information Systems 1(1) 9-34, 1992. http://www.cs.mu.oz.au/agentlabNL/ps/IntegArchKA.ps Gaines, Brian R.; Mildred L G Shaw (1993) Eliciting Knowledge and Transferring it Effectively to a Knowledge-Based System. In IEEE Transactions on Knowledge and Data Engineering 5(1) 4-14, 1993. http://www.cs.mu.oz.au/agentlabNL/ps/KSSO.ps Gaines, Brian R.; Mildred L G Shaw (1993) Knowledge Acquisition Tools based on Personal Construct Psychology. In Knowledge Engineering Review, 8(1) 49-85, 1993. http://www.cs.mu.oz.au/agentlabNL/ps/KER93.ps Gaines, Brian R.; Mildred L G Shaw (1995) Concept Maps as Hypermedia Components. In International Journal of Human-Computer Studies, 1995. http://www.cs.mu.oz.au/agentlabNL/ps/ConceptMaps.ps Gaines, Brian R. (1991) An Interactive Visual Language for Term Subsumption Languages. In IJCAI91: Proceedings of the Twelfth International Joint Conference on Artificial Intelligence. pp. 817-823 San Mateo, Calif.: Morgan Kaufmann, 1991. http://www.cs.mu.oz.au/agentlab/VL/ps/IJCAI91.ps Gaines, Brian R. (1994) The Collective Stance in Modeling Expertise in Individuals and Organizations. In (short version in—International Journal of Expert Systems 7(1) 21-51.1994). http://www.cs.mu.oz.au/agentlab/VL/ps/Collective.ps Gaines, Brian R. Between Neuron, Culture and Logic: Explicating the Cognitive Nexus. In ICO: Intelligence Artificielle et Sciences Cognitives au Quebec, 3(2) 47-61, 1991. http://www.cs.mu.oz.au/agentlabNL/ps/ICO91.ps Gori, Marco., Marco Maggini, and Enrico Martinelli (1997) Web-Browser Access Through Voice Input and Page Interest Prediction. In Proceedings of the Sixth International Conference on User Modeling. http://www.cs.mu.oz.au/agentlabNL/ps/GoriM.ps Guarino, Nicola (1994) The Ontological Level. In R. Casati, B. Smith; G. White (eds.) Philosophy and the Cognitive Sciences, Vienna: Hulder-Pichler-Tempsky.

Harmelen van, Frank, Ramon Lopez de Mantaras, Jacek Malec, Jan Treur (1993) Comparing Formal Specification Languages for Complex Reasoning Systems. In Jackson, Peter (1990) Introduction to expert systems—2nd ed. Wokingham: Addison-Wesley.

Maglio, Paul P. and Rob Barrett (1997) How to Build Modeling Agents to Support Web Searchers. In Proceedings of the Sixth International Conference on User Modeling. http://www.cs.mu.oz.au/agentlabNL/ps/MaglioP.ps Marchiori, Massimo (1996) The quest for correct information on the Web: hyper search engines. In Hyper Proceeding of the Sixth International World Wide Web Conference. http://www.cs.mu.oz.au/agentlabNL/html/PAPER222.html Mills, Timothy, Ken Moody, Kerry Rodin (1997) Cobra: A new approach to IR system design. In Proceedings of RIAO '97, pp 425-449. http://www.cs.mu.oz.au/agentlabNL/ps/Cobra-riao.ps Mukherjea, Sougata, Kyoji Hirata; Yoshinori Hara (1996) Towards a multimedia world-wide web information retrieval engine. In Hyper Proceeding of the Sixth International World Wide Web Conference. http://www.cs.mu.oz.au/agentlabNL/html/PAPER3.html Newell, A. (1982) The Knowledge Level. In Artificial Intelligence, vol. 18, no. 1, pp. 87-127.

Prerau, David S. (1990) Developing and managing expert systems: proven techniques for business and industry. Mass: Addison-Wesley.

Ramscar, Michael., Helen Pain, and John Lee (1997) Do We Know What the User Knows, and Does It Matter? The Epistemics of User Modelling. In Proceedings of the Sixth International Conference on User Modeling. http://www.cs.mu.oz.au/agentlabNL/ps/RamscarM.ps Saracevic, Tefko., Amanda Spink, and Mei-Mei Wu (1997) Users and Intermediaries in Information Retrieval: What Are They Talking About? In Proceedings of the Sixth International Conference on User Modeling. http://www-.cs.mu.oz.au/agentlabNL/ps/SaracevicT.ps Seta, Kazuhisa., Mitsuru Ikeda, Osamu Kakusho, and Riichiro Mizoguchi (1997) Capturing a Conceptual Model for End-User Programming: Task Ontology as a Static User Model. In Proceedings of the Sixth International Conference on User Modeling. http://www.cs.mu.oz.au/agentlab/VL/ps/SetaK.ps Shakes, Jonathan, Mark Langheinrich; Oren Etzioni (1996) Dynamic reference shifting: a case study in the homepage domain. In Hyper Proceeding of the Sixth International World Wide Web Conference. http://www.cs.mu.oz.au/agentlabNL/html/PAPER39.html Shaw, Mildred L. G.; Brian R Gaines (1992) Kelly's Geometry of Psychological Space and its Significance for Cognitive Modeling. In The New Psychologist, October 1992, 23-31. http://www.cs.mu.oz.au/agentlabNL/ps/NewPsych92.ps Shaw, Mildred L. G.; Brian R Gaines (1995) Comparing Constructions through the Web. In Proceedings of CSCL95: Computer Supported Cooperative Learning. Bloomington, October, 1995. http://www.cs.mu.oz.au/agentlabNL/ps/CSCL95WG.ps Simons, Joel (1997) Using a Semantic User Model to Filter the World Wide Web Proactively. In Proceedings of the Sixth International Conference on User Modeling. http://www.cs.mu.oz.au/agentlabNL/ps/SimonsJ.ps Spertus, Ellen (1996) ParaSite: mining the structural information on the Web. In Hyper Proceeding of the Sixth International World Wide Web Conference. http://www.cs.mu.oz.au/agentlabNL/html/PAPER206.html Staff, Christopher (1997) HyperContext: A Model for Adaptive Hypertext. In Proceedings of the Sixth International Conference on User Modeling. http://www.cs.mu.oz.au/agentlabNL/ps/StaffC.ps Stefik, Mark (1995) Introduction to Knowledge Systems. San Francisco: Morgan Kaufmann.

Vassileva, Julita (1997) A New View of Interactive Human-Computer Environments. In Proceedings of the Sixth International Conference on User Modeling. http://www.cs.mu.oz.au/agentlabNL/ps/VassilevaJ.ps Weber, Gerhard.; Marcus Specht (1997) User Modeling and Adaptive Navigation Support in WWW-Based Tutoring Systems. In Proceedings of the Sixth International Conference on User Modeling. http://www.cs.mu.oz.au/agentlab/VL/ps/WeberG.ps Industrial Controls Industrial control systems are well known. Typically, a dedicated reliable hardware module controls a task using a conventional algorithm, with a low level user interface. These devices are programmable, and therefore a high level software program may be provided to translate user instructions into the low level commands, and to analyze any return data. See, U.S. Pat. No. 5,506,768, expressly incorporated herein by reference. See, also:

A. B. Corripio, "Tuning of Industrial Control Systems", Instrument Society of America, Research Triangle Park, N.C. (1990) pp. 65-81.

C. J. Harris & S. A. Billings, "Self-Tuning and Adaptive Control: Theory and Applications", Peter Peregrinus LTD (1981) pp. 20-33.

C. Rohrer & Clay Nesler, "Self-Tuning Using a Pattern Recognition Approach", Johnson Controls, Inc., Research Brief 228 (Jun. 13, 1986).

D. E. Seborg, T. F. Edgar, & D. A. Mellichamp, "Process Dynamics and Control", John Wiley & Sons, NY (1989) pp. 294-307, 538-541.

E. H. Bristol & T. W. Kraus, "Life with Pattern Adaptation", Proceedings 1984 American Control Conference, pp. 888-892, San Diego, Calif. (1984).

Francis Schied, "Shaum's Outline Series-Theory & Problems of Numerical Analysis", McGraw-Hill Book Co., NY (1968) pp. 236, 237, 243, 244, 261.

K. J. Astrom and B. Wittenmark, "Adaptive Control", Addison-Wesley Publishing Company (1989) pp. 105-215.

K. J. Astrom, T. Hagglund, "Automatic Tuning of PID Controllers", Instrument Society of America, Research Triangle Park, N.C. (1988) pp. 105-132.

R. W. Haines, "HVAC Systems Design Handbook", TAB Professional and Reference Books, Blue Ridge Summit, Pa. (1988) pp. 170-177.

S. M. Pandit & S. M. Wu, "Timer Series & System Analysis with Applications", John Wiley & Sons, Inc., NY (1983) pp. 200-205.

T. W. Kraus 7 T. J. Myron, "Self-Tuning PID Controller Uses Pattern Recognition Approach", Control Engineering, pp. 106-111, June 1984.

Pattern Recognition

Another aspect of some embodiments of the invention relates to signal analysis and complex pattern recognition. This aspect encompasses analysis of any data set presented to the system: internal, user interface, or the environment in which it operates. While semantic, optical and audio analysis systems are known, the invention is by no means limited to these types of 145 data.

Pattern recognition involves examining a complex data set to determine similarities (in its broadest context) with other data sets, typically data sets that have been previously characterized. These data sets may comprise multivariate inputs, sequences in time or other dimension, or a combination of both multivariate data sets with multiple dimensions.

The following cited patents and publications are relevant to pattern recognition and control aspects of the present invention, and are herein expressly incorporated by reference:

U.S. Pat. No. 5,067,163, incorporated herein by reference, discloses a method for determining a desired image signal range from an image having a single background, in particular a radiation image such as a medical X-ray. This reference teaches basic image enhancement techniques.

U.S. Pat. No. 5,068,664, incorporated herein by reference, discloses a method and device for recognizing a target among a plurality of known targets, by using a probability based recognition system. This patent document cites a number of other references, which are relevant to the problem of image recognition:

Appriou, A., "Interet des theories de l'in certain en fusion de donnees", Colloque International sur le Radar Paris, 24-28 avril 1989.

Appriou, A., "Procedure d'aide a la decision multi-informateurs. Applications a la classification multi-capteurs decibles", Symposium de l'Avionics Panel (AGARD) Turquie, 25-29 avril 1988.

Arrow, K. J., "Social choice and individual valves", John Wiley and Sons Inc. (1963).

Bellman, R. E., L. A. Zadeh, "Decision making in a fuzzy environment", Management Science, 17(4) (December 1970).

Bhatnagar, R. K., L. N. Kamal, "Handling uncertain information: a review of numeric and non-numeric methods", Uncertainty in Artificial Intelligence, L. N. Kamal and J. F. Lemmer, Eds. (1986).

Blair, D., R. Pollack, "La logique du choix collectif" Pour la Science (1983).

Chao, J. J., E. Drakopoulos, C. C. Lee, "An evidential reasoning approach to distributed multiple hypothesis detection", Proceedings of the 20th Conference on decision and control, Los Angeles, Calif., December 1987.

Dempster, A. P., "A generalization of Bayesian inference", Journal of the Royal Statistical Society, Vol. 30, Series B (1968).

Dempster, A. P., "Upper and lower probabilities induced by a multivalued mapping", Annals of mathematical Statistics, no. 38 (1967).

Dubois, D., "Modeles mathematiques de l'imprecis et de l'incertain en vue d'applications aux techniques d'aide a la decision", Doctoral Thesis, University of Grenoble (1983).

Dubois, D., N. Prade, "Combination of uncertainty with belief functions: a reexamination", Proceedings 9th International Joint Conference on Artificial Intelligence, Los Angeles (1985).

Dubois, D., N. Prade, "Fuzzy sets and systems-Theory and applications", Academic Press, New York (1980).

Dubois, D., N. Prade, "Theorie des possibilites: application a la representation des connaissances en informatique", Masson, Paris (1985).

Duda, R. O., P. E. Hart, M. J. Nilsson, "Subjective Bayesian methods for rule-based inference systems", Technical Note 124-Artificial Intelligence Center-SRI International.

Fua, P. V., "Using probability density functions in the framework of evidential reasoning Uncertainty in knowledge based systems", B. Bouchon, R. R. Yager, Eds. Springer Verlag (1987).

Ishizuka, M., "Inference methods based on extended Dempster and Shafer's theory for problems with uncertainty/fuzziness", New Generation Computing, 1:159-168 (1983), Ohmsha, Ltd, and Springer Verlag.

Jeffrey, R. J., "The logic of decision", The University of Chicago Press, Ltd., London (1983)(2nd Ed.).

Kaufmann, A., "Introduction a la theorie des sous-ensembles flous", Vol. 1, 2 et 3-Masson-Paris (1975).

Keeney, R. L., B. Raiffa, "Decisions with multiple objectives: Preferences and value tradeoffs". John Wiley and Sons, New York (1976).

Ksienski et al., "Low Frequency Approach to Target Identification", Proc. of the IEEE, 63(12):1651-1660 (December 1975).

Kyburg, H. E., "Bayesian and non Bayesian evidential updating". Artificial Intelligence 31:271-293 (1987).

Roy, B., "Classements et choix en presence de points de vue multiples", R.I.R.O.-2eme annee-no. 8, pp. 57-75 (1968).

Roy, B., "Electre III: un algorithme de classements fonde sur une representation floue des preferences en presence de criteres multiples", Cahiers du CERO, 20(1):3-24 (1978).

Scharlic, A., "Decider sur plusieurs criteres. Panorama de l'aide a la decision multicritere" Presses Polytechniques Romandes (1985).

Shafer, G., "A mathematical theory of evidence", Princeton University Press, Princeton, N.J. (1976).

Sugeno, M., "Theory of fuzzy integrals and its applications". Tokyo Institute of Technology (1974).

Vannicola et al, "Applications of Knowledge based Systems to Surveillance", Proceedings of the 1988 IEEE National Radar Conference, 20-21 Apr. 1988, pp. 157-164.

Yager, R. R., "Entropy and specificity in a mathematical theory of Evidence", Int. J. General Systems, 9:249-260 (1983).

Zadeh, L. A., "Fuzzy sets as a basis for a theory of possibility", Fuzzy sets and Systems 1:3-28 (1978).

Zadeh, L. A., "Fuzzy sets", Information and Control, 8:338-353 (1965).

Zadeh, L. A., "Probability measures of fuzzy events", Journal of Mathematical Analysis and Applications, 23:421-427 (1968).

U.S. Pat. No. 5,067,161, incorporated herein by reference, relates to a video image pattern recognition system, which recognizes objects in near real time.

U.S. Pat. Nos. 4,817,176 and 4,802,230, both incorporated herein by reference, relate to harmonic transform methods of pattern matching of an undetermined pattern to known a patterns, and are useful in the pattern recognition method of the present invention. U.S. Pat. No. 4,998,286, incorporated herein by reference, relates to a harmonic transform method for comparing multidimensional images, such as color images, and is useful in the present pattern recognition methods.

U.S. Pat. No. 5,067,166, incorporated herein by reference, relates to a pattern recognition system, in which a local optimum match between subsets of candidate reference label sequences and candidate templates. It is clear that this method is useful in the pattern recognition aspects of the present invention. It is also clear that the interface and control system of the present invention are useful adjuncts to the method disclosed in U.S. Pat. No. 5,067,166.

U.S. Pat. No. 5,048,095, incorporated herein by reference, relates to the use of a genetic learning algorithm to adaptively segment images, which is an initial stage in image recognition. This patent has a software listing for this method. It is clear that this method is useful in the pattern recognition aspects of the present invention. It is also clear that the interface and control system of the present invention are useful adjuncts to the method disclosed in U.S. Pat. No. 5,048,095.

Fractal-Based Image Processing

Fractals are a relatively new field of science and technology that relate to the study of order and chaos. While the field of fractals is now very dense, a number of relevant principles are applicable. First, when the coordinate axes of a space are not independent, and are related by a recursive algorithm, then the space is considered to have a fractional dimensionality. One characteristic of such systems is that a mapping of such spaces tends to have self-similarity on a number of scales. Interestingly, natural systems have also been observed to have self-similarity over several orders of magnitude, although as presently believed, not over an unlimited range of scales. Therefore, one theory holds that images of natural objects may be efficiently described by iterated function systems (IFS), which provide a series of parameters for a generic formula or algorithm, which, when the process is reversed, is visually similar to the starting image. Since the "noise" of the expanded data is masked by the "natural" appearance of the result, visually acceptable image compression may be provided at relatively high compression ratios accompanied by substantial loss of true image information. This theory remains the subject of significant debate, and, for example, wavelet algorithm advocates claim superior results for a more general set of starting images. It is noted that, on a mathematical level, wavelets and fractal constructs are similar or overlapping.

U.S. Pat. Nos. 5,065,447, and 4,941,193, both incorporated herein by reference, relate to the compression of image data by using fractal transforms. These are discussed in detail below. U.S. Pat. No. 5,065,447 cites a number of references, relevant to the use of fractals in image processing:

U.S. Pat. No. 4,831,659.

"A New Class of Markov Processes for Image Encoding", School of Mathematics, Georgia Inst. of Technology (1988), pp. 14-32.

"Construction of Fractal Objects with Iterated Function Systems", Siggraph '85 Proceedings, 19(3):271-278 (1985).

"Data Compression: Pntng by Numbrs", The Economist, May 21, 1988.

"Fractal Geometry-Understanding Chaos", Georgia Tech Alumni Magazine, p. 16 (Spring 1986).

"Fractal Modelling of Biological Structures", Perspectives in Biological Dynamics and Theoretical Medicine, Koslow, Mandell, Shlesinger, eds., Annals of New York Academy of Sciences, vol. 504, 179-194 (date unknown).

"Fractal Modelling of Real World Images, Lecture Notes for Fractals: Introduction, Basics and Perspectives", Siggraph (1987).

"Fractals-A Geometry of Nature", Georgia Institute of Technology Research Horizons, p. 9 (Spring 1986).

A. Jacquin, "A Fractal Theory of Iterated Markov Operators with Applications to Digital Image Coding", PhD Thesis, Georgia Tech, 1989.

A. Jacquin, "Image Coding Based on a Fractal Theory of Iterated Contractive Image Transformations" p. 18, January 1992 (Vol 1 Issue 1) of IEEE Trans on Image Processing.

A. Jacquin, 'Fractal image coding based on a theory of iterated contractive image transformations', Proc. SPIE Visual Communications and Image Processing, 1990, pages 227-239.

A. E. Jacquin, 'A novel fractal block-coding technique for digital images', Proc. ICASSP 1990.

Baldwin, William, "Just the Bare Facts, Please", Forbes Magazine, Dec. 12, 1988.

Barnsley et al., "A Better Way to Compress Images", Byte Magazine, January 1988, pp. 213-225.

Barnsley et al., "Chaotic Compression", Computer Graphics World, November 1987.

Barnsley et al., "Harnessing Chaos For Images Synthesis", Computer Graphics, 22(4):131-140 (August, 1988).

Barnsley et al., "Hidden Variable Fractal Interpolation Functions", School of Mathematics, Georgia Institute of Technology, Atlanta, Ga. 30332, July, 1986.

Barnsley, M. F., "Fractals Everywhere", Academic Press, Boston, Mass., 1988.

Barnsley, M. F., and Demko, S., "Iterated Function Systems and The Global Construction of Fractals", Proc. R. Soc. Lond., A399:243-275 (1985).

Barnsley, M. F., Ervin, V., Hardin, D., Lancaster, J., "Solution of an Inverse Problem for Fractals and Other Sets", Proc. Natl. Acad. Sci. U.S.A., 83:1975-1977 (April 1986).

Beaumont J M, "Image data compression using fractal techniques", British Telecom Technological Journal 9(4): 93-108 (1991).

Byte Magazine, January 1988, supra, cites:

D. S. Mazel, Fractal Modeling of Time-Series Data, PhD Thesis, Georgia Tech, 1991. (One dimensional, not pictures).

Derra, Skip, "Researchers Use Fractal Geometry,", Research and Development Magazine, March 1988.

Elton, J., "An Ergodic Theorem for Iterated Maps", Journal of Ergodic Theory and Dynamical Systems, 7 (1987).

Fisher Y, "Fractal image compression", Siggraph 92.

Fractal Image Compression Michael F. Barnsley and Lyman P. Hurd ISBN 0-86720-457-5, ca. 250 pp.

Fractal Image Compression: Theory and Application, Yuval Fisher (ed.), Springer Verlag, New York, 1995. ISBN number 0-387-94211-4.

Fractal Modelling of Biological Structures, School of Mathematics, Georgia Institute of Technology (date unknown).

G. E. Oien, S. Lepsoy & T. A. Ramstad, 'An inner product space approach to image coding by contractive transformations', Proc. ICASSP 1991, pp 2773-2776.

Gleick, James, "Making a New Science", pp. 215, 239, date unknown.

Graf S, "Barnsley's Scheme for the Fractal Encoding of Images", Journal Of Complexity, V8, 72-78 (1992).

Jacobs, E. W., Y. Fisher and R. D. Boss. "Image Compression: A study of the Iterated Transform Method. Signal Processing 29, (1992) 25-263.

M. Barnsley, L. Anson, "Graphics Compression Technology, SunWorld, October 1991, pp. 42-52.

M. F. Barnsley, A. Jacquin, F. Malassenet, L. Reuter & A. D. Sloan, 'Harnessing chaos for image synthesis', Computer Graphics, vol 22 no 4 pp 131-140, 1988.

M. F. Barnsley, A. E. Jacquin, 'Application of recurrent iterated function systems to images', Visual Comm. and Image Processing, vol SPIE-1001, 1988.

Mandelbrot, B., "The Fractal Geometry of Nature", W.H. Freeman & Co., San Francisco, Calif., 1982, 1977.

Monro D M and Dudbridge F, "Fractal block coding of images", Electronics Letters 28(11):1053-1054 (1992).

Monro D. M. & Dudbridge F. 'Fractal approximation of image blocks', Proc ICASSP 92, pp. III: 485-488.

Monro D. M. 'A hybrid fractal transform', Proc ICASSP 93, pp. V: 169-72.

Monro D. M., Wilson D., Nicholls J. A. 'High speed image coding with the Bath Fractal Transform', IEEE International Symposium on Multimedia Technologies Southampton, April 1993.

Peterson, Ivars, "Packing It In-Fractals.", Science News, 131(18):283-285 (May 2, 1987).

S. A. Hollatz, "Digital image compression with two-dimensional affine fractal C interpolation functions", Department of Mathematics and Statistics, University of Minnesota-Duluth, Technical Report 91-2. (a nuts-and-bolts how-to-do-it paper on the technique).

Stark, J., "Iterated function systems as neural networks", Neural Networks, Vol 4. pp 679-690, Pergamon Press, 1991.

Vrscay, Edward R. "Iterated Function Systems: Theory, Applications, and the Inverse Problem. *Fractal Geometry and Analysis*, J. Belair and S. Dubuc (eds.) Kluwer Academic, 1991, 405-468.

U.S. Pat. No. 5,347,600, incorporated herein by reference, relates to a method and apparatus for compression and decompression of digital image data, using fractal methods. According to this method, digital image data is automatically processed by dividing stored image data into domain blocks and range blocks. The range blocks are subjected to processes such as a shrinking process to obtain mapped range blocks. The range blocks or domain blocks may also be processed by processes such as affine transforms. Then, for each domain block, the mapped range block which is most similar to the domain block is determined, and the address of that range block and the processes the blocks were subjected to are combined as an identifier which is appended to a list of identifiers for other domain blocks. The list of identifiers for all domain blocks is called a fractal transform and constitutes a compressed representation of the input image. To decompress the fractal transform and recover the input image, an arbitrary input image is formed into range blocks and the range blocks processed in a manner specified by the identifiers to form a representation of the original input image.

"Image Compression Using Fractals and Wavelets", Final Report for the Phase II Contract Sponsored by the Office of Naval Research, Contract No. N00014-91-C-0117, Netrologic Inc., San Diego, Calif. (Jun. 2, 1993), relates to various methods of compressing image data, including fractals and wavelets. This method may also be applicable in pattern recognition applications. This reference provides theory and comparative analysis of compression schemes.

A fractal-processing method based image extraction method is described in Kim, D. H.; Caulfield, H. J.; Jannson, T.; Kostrzewski, A.; Savant, G, "Optical fractal image processor for noise-embedded targets detection", *Proceedings of the SPIE—The International Society for Optical Engineering*, Vol. 2026, p. 144-9 (1993) (SPIE Conf: Photonics for Processors, Neural Networks, and Memories 12-15 Jul. 1993, San Diego, Calif., USA). According to this paper, a fractal dimensionality measurement and analysis-based automatic target recognition (ATR) is described. The ATR is a multi-step procedure, based on fractal image processing, and can simultaneously perform preprocessing, interest locating, segmenting, feature extracting, and classifying. See also, Cheong, C. K.; Aizawa, K.; Saito, T.; Hatori, M., "Adaptive edge detection with fractal dimension", *Transactions of the Institute of Electronics, Information and Communication Engineers D-II*, J76D-II(11):2459-63 (1993); Hayes, H. I.; Solka, J. L.; Priebe, C. E.; "Parallel computation of fractal dimension", *Proceedings of the SPIE—The International Society for Optical Engineering*, 1962:219-30 (1993); Priebe, C. E.; Solka, J. L.; Rogers, G. W., "Discriminant analysis in aerial images using fractal based features", *Proceedings of the SPIE—The International Society for Optical Engineering*, 1962:196-208 (1993). See also, Anson, L., "Fractal Image Compression", Byte, October 1993, pp. 195-202; "Fractal Compression Goes On-Line", Byte, September 1993.

Methods employing other than fractal-based algorithms may also be used. See, e.g., Liu, Y., "Pattern recognition using Hilbert space", *Proceedings of the SPIE—The International Society for Optical Engineering*, 1825:63-77 (1992), which describes a learning approach, the Hilbert learning. This approach is similar to Fractal learning, but the Fractal part is replaced by Hilbert space. Like the Fractal learning, the first stage is to encode an image to a small vector in the internal space of a learning system. The next stage is to quantize the internal parameter space. The internal space of a Hilbert learning system is defined as follows: a pattern can be interpreted as a representation of a vector in a Hilbert space. Any vectors in a Hilbert space can be expanded. If a vector happens to be in a subspace of a Hilbert space where the dimension L of the subspace is low (order of 10), the vector can be specified by its norm, an L-vector, and the Hermitian operator which spans the Hilbert space, establishing a mapping from an image space to the internal space P. This mapping converts an input image to a 4-tuple: t in P=(Norm, T, N, L-vector), where T is an operator parameter space, N is a set of integers which specifies the boundary condition. The encoding is implemented by mapping an input pattern into a point in its internal space. The system uses local search algorithm, i.e., the system adjusts its internal data locally. The search is first conducted for an operator in a parameter space of operators, then an error function delta (t) is computed. The algorithm stops at a local minimum of delta (t). Finally, the input training set divides the internal space by a quantization procedure. See also, Liu, Y., "Extensions of fractal theory", *Proceedings of the SPIE—The International Society for Optical Engineering*, 1966:255-68(1993).

Fractal methods may be used for pattern recognition. See, Sadjadi, F., "Experiments in the use of fractal in computer pattern recognition", *Proceedings of the SPIE—The International Society for Optical Engineering*, 1960:214-22 (1993). According to this reference, man-made objects in infrared and millimeter wave (MMW) radar imagery may be recognized using fractal-based methods. The technique is based on estimation of the fractal dimensions of sequential blocks of an image of a scene and slicing of the histogram of the fractal dimensions computed by Fourier regression. The technique is shown to be effective for the detection of tactical military vehicles in IR, and of airport attributes in MMW radar imagery.

In addition to spatial self-similarity, temporal self-similarity may also be analyzed using fractal methods. See, Reusens, E., "Sequence coding based on the fractal theory of iterated transformations systems", *Proceedings of the SPIE—The International Society for Optical Engineering*, 2094(pt.1):132-40(1993). This reference describes a scheme based on the iterated functions systems theory that relies on a 3D approach in which the sequence is adaptively partitioned. Each partition block can be coded either by using the spatial self-similarities or by exploiting temporal redundancies. Audio and Radar data are typically susceptible to such analysis to produce particularly useful results, due to the existence of echoes and relatively transfer functions (including resonant features).

Fractal compression methods may be used for video data for transmission. See, Hurtgen, B.; Buttgen, P., "Fractal approach to low rate video coding", *Proceedings of the SPIE—The International Society for Optical Engineering*, 2094(pt.1):120-31(1993). This reference relates to a method for fast encoding and decoding of image sequences on the basis of fractal coding theory and the hybrid coding concept. The DPCM-loop accounts for statistical dependencies of natural image sequences in the temporal direction. Those regions of the original image where the prediction, i.e. motion estimation and compensation, fails are encoded using an advanced fractal coding scheme, suitable for still images, and whose introduction instead of the commonly used Discrete Cosine Transform (DCT)-based coding is advantageous especially at very low bit rates (8-64 kbit/s). In order to increase reconstruction quality, encoding speed and compression ratio, some additional features such as hierarchical codebook search and multilevel block segmentation may be employed. This hybrid technique may be used in conjunction with the present adaptive interface or other features of the present invention.

Fractal methods may be used to segment an image into objects having various surface textures. See, Zhi-Yan Xie; Brady, M., "Fractal dimension image for texture segmentation", ICARCV '92. Second International Conference on Automation, Robotics and Computer Vision, p. CV-4.3/1-5 vol. 1, (1992). According to this reference, the fractal dimension and its change over boundaries of different homogeneous textured regions is analyzed and used to segment textures in infrared aerial images. Based on the fractal dimension, different textures map into different fractal dimension image features, such that there is smooth variation within a single homogeneous texture but sharp variation at texture boundaries. Since the fractal dimension remains unchanged under linear transformation, this method is robust for dismissing effects caused by lighting and other extrinsic factors. Morphology is the only tool used in the implementation of the whole process: texture feature extraction, texture segmentation and boundary detection. This makes possible parallel implementations of each stage of the process.

Rahmati, M.; Hassebrook, L. G., "Intensity- and distortion-invariant pattern recognition with complex linear morphology", *Pattern Recognition*, 27 (4):549-68(1994) relates to a unified model based pattern recognition approach is introduced which can be formulated into a variety of techniques to be used for a variety of applications. In this approach, complex phasor addition and cancellation are incorporated into the design of filter(s) to perform implicit logical operations using linear correlation operators. These implicit logical operations are suitable to implement high level gray scale morphological transformations of input images. In this way non-linear decision boundaries are effectively projected into the input signal space yet the mathematical simplicity of linear filter designs is maintained. This approach is applied to the automatic distortion- and intensity-invariant object recognition problem. A set of shape operators or complex filters is introduced which are logically structured into a filter bank architecture to accomplish the distortion and intensity-invariant system. This synthesized complex filter bank is optimally sensitive to fractal noise representing natural scenery. The sensitivity is optimized for a specific fractal parameter range using the Fisher discriminant. The output responses of the proposed system are shown for target, clutter, and pseudo-target inputs to represent its discrimination and generalization capability in the presence of distortion and intensity variations. Its performance is demonstrated with realistic scenery as well as synthesized inputs.

Sprinzak, J.; Werman, M., "Affine point matching", *Pattern Recognition Letters*, 15(4):337-9(1994), relates to a pattern recognition method. A fundamental problem of pattern recognition, in general, is recognizing and locating objects within a given scene. The image of an object may have been distorted by different geometric transformations such as translation, rotation, scaling, general affine transformation or perspective projection. The recognition task involves finding a transformation that superimposes the model on its instance in the image. This reference proposes an improved method of superimposing the model.

Temporal Image Analysis

Temporal image analysis is a well-known field. This field holds substantial interest at present for two reasons. First, by temporal analysis of a series of two-dimensional images, objects and object planes (including motion planes) may be defined, which provide basis for efficient yet general algorithms for video compression, such as the Motion Picture Experts Group (MPEG) series of standards. Second, temporal analysis has applications in signal analysis for an understanding and analysis of the signal itself.

U.S. Pat. No. 5,280,530, incorporated herein by reference, relates to a method and apparatus for tracking a moving object in a scene, for example the face of a person in videophone applications, comprises forming an initial template of the face, extracting a mask outlining the face, dividing the template into a plurality (for example sixteen) sub-templates, searching the next frame to find a match with the template, searching the next frame to find a match with each of the sub-templates, determining the displacements of each of the sub-templates with respect to the template, using the displacements to determine affine transform coefficients and performing an affine transform to produce an updated template and updated mask.

U.S. Pat. No. 5,214,504 relates to a moving video image estimation system, based on an original video image of time n and time n+1, the centroid, the principal axis of inertia, the moment about the principal axis of inertia and the moment about the axis perpendicular to the principal axis of inertia are obtained. By using this information, an affine transformation for transforming the original video image at time n to the original video image at time n+1 is obtained. Based on the infinitesimal transformation (A), $\{e^{At}, \text{ and } e^{A(t-1)}\}$ obtained by making the affine transformation continuous with regard to time is executed on the original video image at time n and time n+1. The results are synthesized to perform an interpolation between the frames. $\{e^{a(t-1)}\}$ is applied to the original video system time n+1. The video image after time n+1 is thereby protected.

U.S. Pat. No. 5,063,603, incorporated herein by reference, relates to a dynamic method for recognizing objects and image processing system therefor. This reference discloses a method of distinguishing between different members of a class of images, such as human beings. A time series of successive relatively high-resolution frames of image data, any frame of which may or may not include a graphical representation of one or more predetermined specific members (e.g., particular known persons) of a given generic class (e.g. human beings), is examined in order to recognize the identity of a specific member; if that member's image is included in the time series. The frames of image data may be examined in real time at various resolutions, starting with a relatively low resolution, to detect whether some earlier-occurring frame includes any of a group of image features possessed by an image of a member of the given class. The image location of a detected image feature is stored and then used in a later-occurring, higher resolution frame to direct the examination only to the image region of the stored location in order to (1) verify the detection of the aforesaid image feature, and (2) detect one or more other of the group of image features, if any is present in that image region of the frame being examined. By repeating this type of examination for later and later occurring frames, the accumulated detected features can first reliably recognize the detected image region to be an image of a generic object of the given class, and later can reliably recognize the detected image region to be an image of a certain specific member of the given class. Thus, a human identity recognition feature of the present invention may be implemented in this manner. Further, it is clear that this recognition feature may form an integral part of certain embodiments of the present invention. It is also clear that the various features of the present invention would be applicable as an adjunct to the various elements of the system disclosed in U.S. Pat. No. 5,063,603.

U.S. Pat. No. 5,067,160, incorporated herein by reference, relates to a motion-pattern recognition apparatus, having adaptive capabilities. The apparatus recognizes a motion of an object that is moving and is hidden in an image signal, and discriminates the object from the background within the signal. The apparatus has an image-forming unit comprising non-linear oscillators, which forms an image of the motion of the object in accordance with an adjacent-mutual-interference-rule, on the basis of the image signal. A memory unit, comprising non-linear oscillators, stores conceptualized meanings of several motions. A retrieval unit retrieves a conceptualized meaning close to the motion image of the object. An altering unit alters the rule, on the basis of the conceptualized meaning. The image forming unit, memory unit, retrieval unit and altering unit form a holonic-loop. Successive alterations of the rules by the altering unit within the holonic loop change an ambiguous image formed in the image forming unit into a distinct image. U.S. Pat. No. 5,067,160 cites the following references, which are relevant to the task of discriminating a moving object in a background:

U.S. Pat. No. 4,710,964.

Shimizu et al, "Principle of Holonic Computer and Holovision", Journal of the Institute of Electronics, Information and Communication, 70(9):921-930 (1987).

Omata et al, "Holonic Model of Motion Perception", IEICE Technical Reports, 3/26/88, pp. 339-346.

Ohsuga et al, "Entrainment of Two Coupled van der Pol Oscillators by an External Oscillation", Biological Cybernetics, 51:225-239 (1985).

U.S. Pat. No. 5,065,440, incorporated herein by reference, relates to a pattern recognition apparatus, which compensates for, and is thus insensitive to pattern shifting, thus being useful for decomposing an image or sequence of images, into various structural features and recognizing the features. U.S. Pat. No. 5,065,440 cites the following references, incorporated herein by reference, which are also relevant to the present invention: U.S. Pat. Nos. 4,543,660, 4,630,308, 4,677,680, 4,809,341, 4,864,629, 4,872,024 and 4,905,296.

Recent analyses of fractal image compression techniques have tended to imply that, other than in special circumstances, other image compression methods are "better" than a Barnsley-type image compression system, due to the poor performance of compression processors and lower than expected compression ratios. Further, statements attributed to Barnsley have indicated that the Barnsley technique is not truly a "fractal" technique, but rather a vector quantization process that employs a recursive library. Nevertheless, these techniques and analyses have their advantages. As stated hereinbelow, the fact that the codes representing the compressed image are hierarchical represents a particular facet exploited by the present invention.

Another factor which makes fractal methods and analysis relevant to the present invention is the theoretical relation to optical image processing and holography. Thus, while such optical systems may presently be cumbersome and economically unfeasible, and their implementation in software models slow, these techniques nevertheless hold promise and present distinct advantages.

Biometric Analysis

Biometric analysis comprises the study of the differences between various organisms, typically of the same species. Thus, the intraspecies variations become the basis for differentiation and identification. In practice, there are many applications for biometric analysis systems, for example in security applications, these allow identification of a particular human.

U.S. Pat. No. 5,055,658, incorporated herein by reference, relates to a security system employing digitized personal characteristics, such as voice. The following references are cited:

"Voice Recognition and Speech Processing", Elektor Electronics, September 1985, pp. 56-57.

Naik et al., "High Performance Speaker Verification.", ICASSP 86, Tokyo, CH2243-4/86/0000-0881, IEEE 1986, pp. 881-884.

Shinan et al., "The Effects of Voice Disguise.", ICASSP 86, Tokyo, CH2243-4/86/0000-0885, IEEE 1986, pp. 885-888.

Parts of this system relating to speaker recognition may be used to implement a voice recognition system of the present invention for determining an actor or performer in a broadcast.

Neural Networks

Neural networks are a particular type of data analysis tool. There are characterized by the fact that the network is represented by a set of "weights", which are typically scalar values, which are derived by a formula which is designed to reduce the error between the a data pattern representing a known state and the network's prediction of that state. These networks, when provided with sufficient complexity and an appropriate training set, may be quite sensitive and precise. Further, the data pattern may be arbitrarily complex (although the computing power required to evaluate the output will also grow) and therefore these systems may be employed for video and other complex pattern analysis.

U.S. Pat. No. 5,067,164, incorporated herein by reference, relates to a hierarchical constrained automatic learning neural network for character recognition, and thus represents an example of a trainable neural network for pattern recognition, which discloses methods which are useful for the present invention. This Patent cites various references of interest:

U.S. Pat. Nos. 4,760,604, 4,774,677 and 4,897,811.

LeCun, Y., Connectionism in Perspective, R. Pfeifer, Z. Schreter, F. Fogelman, L. Steels, (Eds.), 1989, "Generalization and Network Design Strategies", pp. 143-55.

LeCun, Y., et al., "Handwritten Digit Recognition: Applications of Neural.", IEEE Comm. Magazine, pp. 41-46 (November 1989).

Lippmann, R. P., "An Introduction to Computing with Neural Nets", IEEE ASSP Magazine, 4(2):4-22 (April 1987).

Rumelhart, D. E., et al., Parallel Distr. Proc.: Explorations in Microstructure of Cognition, vol. 1, 1986, "Learning Internal Representations by Error Propagation", pp. 318-362.

U.S. Pat. Nos. 5,048,100, 5,063,601 and 5,060,278, all incorporated herein by reference, also relate to neural network adaptive pattern recognition methods and apparatuses. It is clear that the methods of U.S. Pat. Nos. 5,048,100, 5,060,278 and 5,063,601 may be used to perform the adaptive pattern recognition functions of the present invention.

More general neural networks are disclosed in U.S. Pat. Nos. 5,040,134 and 5,058,184, both incorporated herein be reference, which provide background on the use of neural networks. In particular, U.S. Pat. No. 5,058,184 relates to the use of the apparatus in information processing and feature detection applications.

U.S. Pat. No. 5,058,180, incorporated herein by reference, relates to neural network apparatus and method for pattern recognition, and is thus relevant to the intelligent pattern recognition functions of the present invention. This patent cites the following documents of interest:

U.S. Pat. Nos. 4,876,731 and 4,914,708.

Carpenter, G. A., S. Grossberg, "The Art of Adaptive Pattern Recognition by a Self-Organizing Neural Network," IEEE Computer, March 1988, pp. 77-88.

Computer Visions, Graphics, and Image Processing 1987, 37:54-115.

Grossberg, S., G. Carpenter, "A Massively Parallel Architecture for a Self-Organizing Neural Pattern Recognition Machine," Computer Vision, Graphics, and Image Processing (1987, 37, 54-115), pp. 252-315.

Gullichsen E., E. Chang, "Pattern Classification by Neural Network: An Experiment System for Icon Recognition," ICNN Proceeding on Neural Networks, March 1987, pp. IV-725-32.

Jackel, L. D., H. P. Graf, J. S. Denker, D. Henderson and I. Guyon, "An Application of Neural Net Chips: Handwritten Digit Recognition," ICNN Proceeding, 1988, pp. 11-107-15.

Lippman, R. P., "An Introduction to Computing with Neural Nets," IEEE ASSP Magazine, April 1987, pp. 4-22.

Pawlicki, T. F., D. S. Lee, J. J. Hull and S. N. Srihari, "Neural Network Models and their Application to Handwritten Digit Recognition," ICNN Proceeding, 1988, pp. 11-63-70.

Chao, T.-H.; Hegblom, E.; Lau, B.; Stoner, W. W.; Miceli, W. J., "Optoelectronically implemented neural network with a wavelet preprocessor", *Proceedings of the SPIE—The International Society for Optical Engineering*, 2026:472-82 (1993), relates to an optoelectronic neural network based upon the Neocognitron paradigm which has been implemented and successfully demonstrated for automatic target recognition for both focal plane array imageries and range-Doppler radar signatures. A particular feature of this neural network architectural design is the use of a shift-invariant multichannel Fourier optical correlation as a building block for iterative multilayer processing. A bipolar neural weights holographic synthesis technique was utilized to implement both the excitatory and inhibitory neural functions and increase its discrimination capability. In order to further increase the optoelectronic Neocognitron's self-organization processing ability, a wavelet preprocessor was employed for feature extraction preprocessing (orientation, size, location, etc.). A multichannel optoelectronic wavelet processor using an e-beam complex-valued wavelet filter is also described.

Neural networks are important tools for extracting patterns from complex input sets. These systems do not require human comprehension of the pattern in order to be useful, although human understanding of the nature of the problem is helpful in designing the neural network system, as is known in the art. Feedback to the neural network is integral to the training process. Thus, a set of inputs is mapped to a desired output range, with the network minimizing an "error" for the training data set. Neural networks may differ based on the computation of the "error", the optimization process, the method of altering the network to minimize the error, and the internal topology. Such factors are known in the art.

Optical Pattern Recognition

Optical image processing holds a number of advantages. First, images are typically optical by their nature, and therefore processing by this means may (but not always) avoid a data conversion. Second, many optical image processing schemes are inherently or easily performed in parallel, improving throughput. Third, optical circuits typically have response times shorter than electronic circuits, allowing potentially short cycle times. While many optical phenomena may be modeled using electronic computers, appropriate applications for optical computing, such as pattern recognition, hold promise for high speed in systems of acceptable complexity.

U.S. Pat. No. 5,060,282, incorporated herein by reference, relates to an optical pattern recognition architecture implementing the mean-square error correlation algorithm. This method allows an optical computing function to perform pattern recognition functions. U.S. Pat. No. 5,060,282 cites the following references, which are relevant to optical pattern recognition:

Kellman, P., "Time Integrating Optical Signal Processing", Ph. D. Dissertation, Stanford University, 1979, pp. 51-55.
Molley, P., "Implementing the Difference-Squared Error Algorithm Using An Acousto-Optic Processor", SPIE, 1098:232-239, (1989).
Molley, P., et al., "A High Dynamic Range Acousto-Optic Image Correlator for Real-Time Pattern Recognition", SPIE, 938:55-65 (1988).
Psaltis, D., "Incoherent Electro-Optic Image Correlator", Optical Engineering, 23(1):12-15 (January/February 1984).
Psaltis, D., "Two-Dimensional Optical Processing Using One-Dimensional Input Devices", Proceedings of the IEEE, 72(7):962-974 (July 1984).
Rhodes, W., "Acousto-Optic Signal Processing: Convolution and Correlation". Proc. of the IEEE, 69(1):65-79 (January 1981).
Vander Lugt, A., "Signal Detection By Complex Spatial Filtering", IEEE Transactions On Information Theory, IT-10, 2:139-145 (April 1964).
U.S. Pat. Nos. 5,159,474 and 5,063,602, expressly incorporated herein by reference, also relate to optical image correlators. Also of interest is Li, H. Y., Y. Qiao and D. Psaltis, Applied Optics (April, 1993). See also, Bains, S., "Trained Neural Network Recognizes Faces", Laser Focus World, June, 1993, pp. 26-28; Bagley, H. & Sloan, J., "Optical Processing: Ready For Machine Vision?", Photonics Spectra, August 1993, pp. 101-106.

Optical pattern recognition has been especially applied to two-dimensional patterns. In an optical pattern recognition system, an image is correlated with a set of known image patterns represented on a hologram, and the product is a pattern according to a correlation between the input pattern and the provided known patterns. Because this is an optical technique, it is performed nearly instantaneously, and the output information can be reentered into an electronic digital computer through optical transducers known in the art. Such a system is described in Casasent, D., Photonics Spectra, November 1991, pp. 134-140. The references cited therein provide further details of the theory and practice of such a system: Lendaris, G. G., and Stanely, G. L., "Diffraction Pattern Sampling for Automatic Target Recognition", Proc. IEEE 58:198-205 (1979); Ballard, D. H., and Brown, C. M., Computer Vision, Prentice Hall, Englewood Cliffs, N. J (1982); Optical Engineering 28:5 (May 1988) (Special Issue on product inspection); Richards J., and Casasent, D., "Real Time Hough Transform for Industrial Inspection" Proc. SPIE Technical Symposium, Boston 1989 1192:2-21 (1989); Maragos, P., "Tutorial Advances in Morphological Image Processing" Optical Engineering 26:7:623-632 (1987); Casasent, D., and Tescher, A., Eds., "Hybrid Image and Signal Processing II", Proc. SPIE Technical Symposium, April 1990, Orlando Fla. 1297 (1990); Ravichandran, G. and Casasent, D., "Noise and Discrimination Performance of the MINACE Optical Correlation Filter", Proc. SPIE Technical Symposium, April 1990, Orlando Fla., 1471 (1990); Weshsler. H. Ed., "Neural Nets For Human and Machine Perception", Academic Press, New York (1991).

By employing volume holographic images, the same types of paradigms may be applied to three dimensional images.

Query by Image Content

Query by image content, a phrase coined by IBM researchers, including Dr. Ramesh Jain, relates to a system for retrieving image data stored in a database on the basis of the colors, textures, morphology or objects contained within the image. Therefore, the system characterizes the stored images to generate a metadata index, which can then be searched. Unindexed searching is also possible.

A number of query by image content systems are known, including both still and moving image systems, for example from IBM (QBIC), Apple (Photobook), Belmont Research Inc. (Steve Gallant), BrainTech Inc.; Center for Intelligent Information Retrieval (Umass Amherst), Virage, Inc., Informix Software, Inc. (Illustra), Islip Media, Inc., Magnifi, Numinous Technologies, Columbia University VisualSeek/WebSeek (Chang et al., John R. Smith), Monet (CWI and UvA), Visual Computing Laboratory, UC San Diego (ImageGREP, White and Jain). See also, ISO/IEC MPEG-7 literature, Content Based Recognition (CBR) and Content Based Image Recognition (CBIR) literature.

See, Jacobs, et al., "Fast Multiresolution Image Querying", Department of Computer Science, University of Washington, Seattle Wash.

Sean Landis' CS718 Project, Fall 1995, http://people.ce-.mediaone.net/landis/projects/cs718/index.htm, expressly incorporated herein by reference.

Metadata, Image retrieval: combining content-based and metadata-based approaches; Michael Day reports from the Second UK Conference on Image Retrieval held in Newcastle on the 25-26 Feb. 1999; http://www.ariadne.ac.uk/issue19/metadata, expressly incorporated herein by reference.

U.S. Pat. No. 5,655,117, expressly incorporated herein by reference, relates to a method and apparatus for indexing multimedia information streams for content-based retrieval. See also:

Gong et al, "An Image Database System with Content Capturing and Fast Image Indexing Abilities", PROC of the International Conference on Multimedia Computing and Systems. pp. 121-130 May 19, 1994.
Hongjiang, et al., Digital Libraries, "A Video Database System for Digital Libraries". pp. 253-264, May 1994.
S. Abe and Y. Tonomura, Systems and Computers in Japan, vol. 24, No. 7, "Scene Retrieval Method Using Temporal Condition Changes", pp. 92-101, 1993.
Salomon et al, "Using Guides to Explore Multimedia Databases", PROC of the Twenty-Second Annual Hawaii International Conference on System Sciences. vol. IV, 3-6 Jan. 1989, pp. 3-12 vol. 4. Jan. 6, 1989.

Stevens, "Next Generation Network and Operating System Requirements for Continuous Time Media", in Herrtwich (Ed.), Network and Operating System Support for Digital Audio and Video, pp. 197-208, November 1991.

U.S. Pat. No. 5,606,655, expressly incorporated herein by reference, relates to a method for representing contents of a single video shot using frames. The method provides a representative frame (Rframe) for a group of frames in a video sequence, selecting a reference frame from the group of frames and storing the reference frame in a computer memory. This system defines a peripheral motion tracking region along an edge of the reference frame and successively tracks movement of boundary pixels in the tracking region, symbolizing any of the length of the shot and the presence of any caption. See, also:

"A Magnifier Tool for Video Data", Mills et al., Proceedings of ACM Computer Human Interface (CHI), May 3-7, 1992, pp. 93-98.

"A New Family of Algorithms for Manipulating Compressed Images", Smith et al., IEEE Computer Graphics and Applications, 1993.

"Anatomy of a Color Histogram", Novak et al., Proceeding of Computer Vision and Pattern Recognition, Champaign, Ill., June 1992, pp. 599-605.

"Automatic Structure Visualization for Video Editing", Ueda et al., InterCHI'93 Conference Proceedings, Amsterdam, The Netherlands, 24-29 Apr. 1993, pp. 137-141.

"Automatic Video Indexing and Full-Video Search for Object Appearances", Nagasaka et al., Proceedings of the IFIP TC2/WG2.6 Second Working Conference on Visual Database Systems, North Holland, Sep. 30-Oct. 3, 1991, pp. 113-127.

"Color Indexing", Swain et al., International Journal of Computer Vision, vol. 7, No. 1, 1991, pp. 11-32.

"Content Oriented Visual Interface Using Video Icons for Visual Database Systems", Tonomura et al., Journal of Visual Languages and Computing (1990) 1, pp. 183-198.

"Developing Power Tools for Video Indexing and Retrieval". Zhang et al., Proceedings of SPIE Conference on Storage and Retrieval for Image and Video Databases, San Jose, Calif., 1994.

"Image Information Systems: Where Do We Go From Here?", Chang et al., IEEE Transactions on Knowledge and Data Engineering, vol. 4, No. 5, October 1992, pp. 431-442.

"Image Processing on Compressed Data for Large Video Databases". Arman et al., Proceedings of First ACM International Conference on Multimedia, Anaheim, Calif., 1-6 Aug. 1993, pp. 267-272.

"Image Processing on Encoded Video Sequences", Arman et al., ACM Multimedia Systems Journal, to appear 1994.

"Impact: An Interactive Natural-Motion-Picture Dedicated Multimedia Authoring System", Ueda et al., Proceedings of Human Factors in Computing Systems (CHI 91), New Orleans, La., April 27-May 2, 1991, pp. 343-350.

"MPEG: A Video Compression Standard for Multimedia Applications", Le Gall, Communications of the ACM, vol. 34, No. 4, April 1991, pp. 47-58.

"News On-Demand for Multimedia Networks", Miller et al., ACM International Conference on Multimedia, Anaheim, Calif., 1-6, August 1993, pp. 383-392.

"Overview of the px64 kbit/s Video Coding Standard", Liou. Communications of the ACM, vol. 34, No. 4, April 1991, pp. 60-63.

"Pattern Recognition by Moment Invariants", Hu et al., Proc. IRE, vol. 49, 1961, p. 1428.

"Pattern Recognition Experiments in the Mandala/Cosine Domain", Hsu et al., IEEE Transactions on Pattern Analysis and Machine Intelligence, vol. PAMI-5, No. 5, September 1983, pp. 512-520.

"The JPEG Still Picture Compression Standard", Wallace, Communications of the ACM, vol. 34, No. 4, April 1991, pp. 31-44.

"The Revised Fundamental Theorem of Moment Invariants", Reiss, IEEE Transactions on Pattern Analysis and Machine Intelligence, vol. 13, No. 8, August 1991, pp. 830-834.

"VideoMAP and VideoSpacelcon: Tools for Anatomizing Video Content", Tonomura et al., Inter CHI'93 Conference Proceedings, Amsterdam, The Netherlands, 24-29 April, 1993, pp. 131-136.

"Visual Pattern Recognition by Moment Invariants", IRE Trans. Inform. Theory, vol. 8, February 1962, pp. 179-187.

"Watch—Grab—Arrange—See: Thinking with Motion Images via Streams and Collages", Elliott, Ph.D. Thesis, MIT, February 1993.

Book entitled Digital Image Processing, by Gonzalez et al., Addison-Wesley, Readings, Mass., 1977.

Book entitled Digital Picture Processing by Rosenfeld et al., Academic Press, Orlando, Fla., 1982.

Book entitled Discrete Cosine Transform—Algorithms, Advantages, Applications, by Rao et al., Academic Press, Inc., 1990.

Book entitled Sequential Methods in Pattern Recognition and Machine Learning, Fu, Academic, NY, N.Y. 1968.

C.-C. J. Kuo (ed), "Multimedia Storage and Archiving Systems", SPIE Proc. Vol. 2916 (Nov. 18-Nov. 22, 1996).

U.S. Pat. No. 5,600,775, expressly incorporated herein by reference, relates to a method and apparatus for annotating full motion video and other indexed data structures. U.S. Pat. No. 5,428,774, expressly incorporated herein by reference relates to a system of updating an index file of frame sequences so that it indexes non-overlapping motion image frame sequences. U.S. Pat. No. 5,550,965, expressly incorporated herein by reference, relates to a method and system for operating a data processor to index primary data in real time with iconic table of contents. U.S. Pat. No. 5,083,860, expressly incorporated herein by reference, relates to a method for detecting change points in motion picture images. U.S. Pat. No. 5,179,449, expressly incorporated herein by reference, relates to a scene boundary detecting apparatus. See also:

"A show and tell of the QBIC technology—Query By Image Content (QBIC)", IBM QBIC Almaden web site, pp. 1-4.

"Chaos & Non-Linear Models in Economics".

"Chaos Theory in the Financial Markets. Applying Fractals, Fuzzy Logic, Genetic Algorithms".

"Evolutionary Economics & Chaos Theory".

"Four Eyes", MIT Media Lab web site; pp. 1-2.

"Frequently asked questions about visual information retrieval", Virage Incorporated web site; pp. 1-3.

"IBM Ultimedia Manager 1.1 and Clinet Search", IBM software web site, pp. 1-4.

"Image Detection and Registration", Digital Image Processing, Pratt, Wiley, New York, 1991.

"Jacob Methodology" @ http://WWCSAI.diepa.unipait/research/projects/jacob/jacob-method.html.

"Market Analysis. Applying Chaos Theory to Invstment & Economics".

"Photobook", MIT Media Lab web site; Aug. 7, 1996; pp. 1-2.

"Profiting from Chaos. Using Chaos Theory for Market Timing, Stock Selection & Option".

"Shape Analysis", Digital Image Processing, Pratt, Wiley, New York, 1991.

"The QBIC Project", IBM QBIC Almaden web site, home page (pp. 1-2).

"Virage—Visual Information Retrieval", Virage Incorporated, home page.

"Virage Products", Virage Incorporated web site; pp. 1-2.

"Visual Information Retrieval: A Virage Perspective Revision 3", Virage Incorporated web site; 1995; pp. 1-13.

"Workshop Report: NSF—ARPA Workshop on Visual Information Management Systems", Virage Incorporated web. site; pp. 1-15.

A. D. Bimbo, et al, "3-D Visual Query Language for Image Databases", Journal Of Visual Languages & Computing, 1992, pp. 257-271.

A. E. Cawkell. "Current Activities in Image Processing Part III: Indexing Image Collections", CRITique, vol. 4, No. 8, May 1992, pp. 1-11, ALSIB, London.

A. Pizano et al, "Communicating with Pictorial Databases", Human-Machine Interactive Systems, pp. 61-87, Computer Science Dept, UCLA, 1991.

A. Yamamoto et al, "Extraction of Object Features from Image and its Application to Image Retrieval", IEEE 9th International Conference On Pattern Recognition, 1988, 988-991.

A. Yamamoto et al, "Image Retrieval System Based on Object Features", IEEE Publication No. CH2518-9/87/0000-0132, 1987, pp. 132-134.

A. Yamamoto et al., "Extraction of Object Features and Its Application to Image Retrieval", Trans. of IEICE, vol. E72, No. 6, 771-781 (June 1989).

A. Yamamoto et al., "Extraction of Object Features from Image and Its Application to Image Retrieval", Proc. 9th Annual Conference on Pattern Recognition, vol. II, pp. 988-991 (November 1988).

A. Soffer and H. Samet. Retrieveal by content in symbolic-image databases. In Symposium on Electronic Imaging: Science and Technology—Storage & Retrieval for Image and Video Databases IV, pages 144-155. IS&T/SPIE, 1996.

Abadi, M., et al, "Authentication and Delegation with Smart-cards", Oct. 22, 1990, revised Jul. 30, 1992 Report 67, Systems Research Center, Digital Equipment Corp., Palo Alto, Calif.

Advertisement for "TV Decision," CableVision, Aug. 4, 1986.

American National Standard, "Financial Institution Retail Message Authentication", ANSI X9.19 1986.

American National Standard, "Interchange Message Specification for Debit and Credit Card Message Exchange Among Financial Institutions", ANSI X9.2-1988.

Antonofs, M., "Stay Tuned for Smart TV," Popular Science, November 1990, pp. 62-65.

Arman et al., "Feature Management for Large Video Databases", 1993. (Abstract Only).

ASIAN TECHNOLOGY INFORMATION PROGRAM (ATIP) REPORT: ATIP95.65: Human Computer Interface International, 7/95 Yokohama.

Barber et al. "Ultimedia Manager: Query by Image Content and it's Applications" IEE, 1994, pp. 424-429, January 1994.

Barros, et al. "Indexing Multispectral Images for Content-Based Retrieval", Proc. 23rd AIPR Workshop on Image and Information Retrieval, Proc. 23rd Workshop, Washington, D.C., October 1994, pp. 25-36.

Belkin, N. J., Croft, W. B., "Information Filtering And Information Retrieval: Two Sides of the Same Coin?", Communications of the ACM, December 1992, vol. 35, No. 12, pp. 29-38.

Benoit Mandelbrot: "Fractal Geometry of Nature", W H Freeman and Co., New York, 1983 (orig ed 1977).

Benoit Mandelbrot: "Fractals—Form, Chance and Dimensions", W H Freeman and Co., San Francisco, 1977.

Bimbo et al., "Sequence Retrieval by Contents through Spatio Temporal Indexing", IEEE on CD-ROM, pp. 88-92, Aug. 24, 1993.

Bolot, J.; Turletti, T. & Wakeman, I.; "Scalable Feedback Control for Multicast Video Distribution In the Internet"; Computer Communication Review, vol. 24, No. 4 Oct. 1994, Proceedings of SIGCOMM 94, pp. 58-67.

Bos et al., "SmartCash: a Practical Electronic Payment System", pp. 1-8; August 1990.

Branko Pecar: "Business Forecasting for Management", McGraw-Hill Book Co., London, 1994.

Brian H Kaye: "A Random Walk Through Fractal Dimensions", VCH Verlagsgesellschaft, Weinheim, 1989.

Brugliera, Vito, "Digital On-Screen Display—A New Technology for the Consumer Interface", Symposium Record Cable Sessions. Jun. 11, 1993, pp. 571-586.

Burk et al, "Value Exchange Systems Enabling Security and Unobservabil ity". Computers & Security, 9 1990, pp. 715-721.

C. Chang et al, "Retrieval of Similar Pictures on Pictorial Databases", Pattern Recognition, vol. 24, No. 7, 1991, pp. 675-680.

C. Chang, "Retrieving the Most Similar Symbolic Pictures from Pictorial Databases", Information Processing & Management, vol. 28, No. 5, 1992.

C. Faloutsos et al, "Efficient and Effective Querying by Image Content", Journal of Intelligent Information Systems:Integrating Artificial Intelligence and Database Technologies, vol. 3-4, No. 3, July 1994, pp. 231-262.

C. Goble et al, "The Manchester Multimedia Information System", Proceedings of IEEE Conference, Eurographics Workshop, April, 1991, pp. 244-268.

C. C. Chang and S. Y. Lee. Retrieval of similar pictures on pictorial databases. Pattern Recog., 24(7), 1991.

Case Study: The CIRRUS Banking Network, Comm. ACM 8, 28 pp. 7970-8078, August 1985.

Chalmers, M., Chitson, P., "Bead: Explorations In Information Visualization", 15th Ann. Int'l SIGIR 92/Denmark-June 1992, pp. 330-337.

Chang et al., "Intelligent Database Retrieval by Visual Reasoning", PROC Fourteenth Annual International Computer Software and Application Conference, 31 Oct.-1 Nov. 1990, pp. 459-464.

Chang, Yuh-Lin, Zeng, Wenjun, Kamel, Ibrahim, Alonso, Rafael, "Integrated Image and Speech Analysis for Content-Based Video Indexing".

Chaum et al, "Untraceable Electronic Cash", Advances in Cryptology, 1988, pp. 319-327.

Chaum et al; "Achieving Electronic Privacy", Scientific American, pp. 319-327; 1988.

Chaum, D. "Security without Identification: Card Computers to Make Big Brother Obsolete", Communications of the ACM, 28(10), October 1985, pp. 1030-1044.

Chaum, D. "Untraceable Electronic Mail, Return Addresses, and Digital Pseudonyms", Communications of the ACM, vol. 24, No. 2, February 1981.

Chaum, D., "Achieving Electronic Privacy", Scientific American, August 1992, pp. 96-101.

Chaum, D. L. et al.; "Implementing Capability-Based Protection Using Encryption"; Electronics Research Laboratory, College of Engineering, University of California, Berkeley, Calif.; Jul. 17, 1978.

Cliff Pickover, Spiral Symmetry (World Scientific).

Cliff Pickover, Chaos in Wonderland: Visual Adventures in a Fractal World (St. Martin's Press)

Cliff Pickover, Computers and the Imagination (St. Martin's Press) Cliff Pickover, Mazes for the Mind: Computers and the Unexpected (St. Martin's Press).

Cliff Pickover, Computers, Pattern, Chaos, and Beauty (St. Martin's Press).

Cliff Pickover, Frontiers of Scientific Visualization (Wiley).

Cliff Pickover, Visions of the Future: Art, Technology, and Computing in the 21st Century (St. Martin's Press).

Cohen, Danny; "Computerized Commerce"; ISI Reprint Series ISI/RS-89/243; October, 1989; Reprinted from Information Processing 89, Proceedings of the IF1P World Computer Congress, held Aug. 28-Sep. 1, 1989.

Cohen, Danny; "Electronic Commerce"; University of Southern California, Information Sciences Institute, Research Report ISI/RR-89-244; October, 1989.

Common European Newsletter, Multimedia Content manipulation and Management, http://ww.esat.kuleuven-.ac.be/—konij in/ . . . .

CompuServe Information Service Users Guide, CompuServe International, 1986, pp. 109-114.

Computer Shopper, November 1994, "Internet for Profit", pp. 180-182, 187, 190-192, 522-528, 532, 534.

Computer, Vol. 28(9), September 1995.

Compuvid Sales Manual (date unknown).

Corporate Overview, Virage Incorporated web site; pp. 1-4.

Cox, Ingemar J., et al., "PicHunter: Bayesian Relevance Feedback for Image Retrieval," Proc. of the ICPR '96, IEEE, pp. 361-369.

Cutting, D. R.; Karger, D. R.; Pedersen, J. O. & Tukey, J. W. "Scatter/Gather: A Cluster-based Approach to Browsing Large Document Collections", 15 Ann. Int'l SIGIR '92, ACM, 1992, pp. 318-329.

D K Arrowsmith & C M Place: "An Introduction to Dynamical Systems", Cambridge University Press, Cambridge, 1990.

Damashek, M., Gauging Similarity via N-Grams: Language-Independent Sorting, Categorization, and Retrieval of Text, pp. 1-11, Jan. 24, 1995.

Data Partner 1.0 Simplifies DB Query Routines, PC Week, Sep. 14, 1992, pp. 55 & 58.

David E Rumelhart & James L McClelland: "Parallel Distributed Processing", Vol 1., The MIT Press, Cambridge, Mass., 1986.

Deering, S.; Estrin, D.; Farinacci, D.; Jacobson, V.; Liu, C.; Wei, L; "An Architecture for Wide-Area Multicast Routing", Computer Communication Review, vol. 24. No. 4. October 1994. Proceedings of SIGCOMM 94, pp. 126-135.

Donal Daly: "Expert Systems Introduced", Chartwell-Bratt, Lund, 1988.

Dukach, Seymon; Prototype Implementation of the SNPP Protocol; allspic.lcs.mit.edu; 1992.

E. Binaghi et al, "Indexing and Fuzzy Logic Based Retrieval of Color Images", Visual Database Systems, II, 1992, pp. 79-92.

E. Binaghi et al., "A Knowledge-Based Environment for Assessment of Color Similarity", Proc. 2nd Annual Conference on Topics for A1, pp. 268-285 (1990).

E. Lee, "Similarity Retrieval Techniques", Pictorial Information Systems, Springer Verlag, 1980 pp. 128-176.

E. G. M. Petrakis and C. Faloutsos. Similarity searching in large image databases. Technical Report 3388, Department of Computer Science, University of Maryland, 1995.

Edward Reitman: "Exploring the Geometry of Nature", Windcrest Books, Blue Ridge Summit, 1989.

Even et al; "Electronic Wallet"; pp. 383-386; 1983.

F. J. Varela and P. Bourgine (eds.): Proceedings of the first European Conference on Artificial Life. Cambridge, Mass.: MIT Press. (1991).

Fassihi, Theresa & Bishop, Nancy, "Cable Guide Courting National Advertisers," Adweek, Aug. 8, 1988.

Flickner, et al. "Query by Image and Video Content, the QBIC System", IEEE Computer 28(9); 23-32, 1995.

Foltz, P. W., Dumais, S. T., "Personalized Information Delivery: An Analysis Of Information Filtering Methods", Communications of the ACM, December 1992, vol. 35, No. 12, pp. 51-60.

Frank Pettit: "Fourier Transforms in Action", Chartwell-Bratt, Lund, 1985.

G F Page, J B Gomm & D Williams: "Application of Neural Networks to Modelling and Control", Chapman & Hall, London, 1993.

G. Mannes, "Smart Screens", Video Magazine, December 1993) (2 Pages).

G. Tortora et al, "Pyramidal Algorithms", Computer Vision, Graphics and Images Processing, 1990, pp. 26-56.

Gautama, S., D'Haeyer, J. P. F., "Context Driven Matching in Structural Pattern Recognition".

Gautama, S., Haeyer, J. D., "Learning Relational Models of Shape: A Study of the Hypergraph Formalism".

Gene F Franklin, J David Powell & Abbas Emami-Naeini: "Feedback Control of Dynamic Systems", Addison-Wesley Publishing Co. Reading, 1994.

George E P Box & Gwilym M Jenkins: "Time Series Analysis: Forecasting and Control". Holden Day, San Francisco, 1976.

Gifford, D., "Notes on Community Information Systems", MIT LCS™-419, December 1989.

Gifford, David K.; "Cryptographic Sealing for Information Secrecy and Authentication": Stanford University and Xerox Palo Alto Research Center; Communication of the ACM; vol. 25, No. 4; April, 1982.

Gifford, David K.; "Digital Active Advertising"; U.S. patent application Ser. No. 08/168,519; filed Dec. 16, 1993.

Gligor, Virgil D. et al.; "Object Migration and Authentication"; IEEE Transactions on Software Engineering; vol. SE-5, No. 6; November, 1979.

Gong et al. "An Image Database System with Content Capturing and Fast Image Indexing Abilities" IEEE, 1994, pp. 121-130, May 1994.

Gregory L Baker & Jerry P Gollub: "Chaotic Dynamics: An Introduction", Cambridge University Press, Cambridge, 1990.

Gupta, Amarnath; Weymount, Terry & Jain, Ramesh, "Semantic Queries With Pictures: The VIMSYS Model", Proceedings of the 17th International Conference on Very Large Data Bases, pp. 69-79, Barcelona, September, 1991.

H. Tamura et al, "Image Database Systems: A Survey", Pattern Recognition, vol. 17, No. 1, 1984, pp. 29-34.

H. Tamura, et al., "Textural Features Corresponding to Visual Perception," IEEE Transactions on System, Man, and Cyb., vol. SMC-8, No. 6, pp. 460-473 (1978).

H. Samet. The quadtree and related hierarchical data structures. ACM Computing Surveys, 16(2):187-260, 1984.

Hans Lauwerier: "Fractals—Images of Chaos", Penguin Books, London, 1991.

Harty et al., "Case Study: The VISA Transaction Processing System," 1988.

Heinz-Otto Peitgen & Deitmar Saupe: "The Science of Fractal Images", Springer-Verlag, New York, 1988.

Heinz-Otto Peitgen, Hartmut Jurgens & Deitmar Saupe: "Fractals for the Classroom", Springer-Verlag, 1992.

Hirata, et al. "Query by Visual Example, Content Based Image Retrieval" Advance in Database Technology-EDBT '92, Springer-Verlag, Berlin 1992, pp. 56-71

Hirzalla et al., "A Multimedia Query User Interface", IEEE on CD-ROM, pp. 590-593, Sep. 5, 1995.

Hooge, Charles, "Fuzzy logic Extends Pattern Recognition Beyond Neural Networks", Vision Systems Design, January 1998, pp. 32-37.

Hou et al., "Medical Image Retrieval by Spatial Features", IEEE on CD-ROM, pp. 1364-1369, Oct. 18, 1992.

Iino et al., "An Object-Oriented Model for Spatio-Temporal Synchronization of Multimedia Information", May, 1994.

Information Network Institute, Carnegie Mellon University, Internet Billing Server, Prototype Scope Document, Oct. 14, 1993.

Ingemar J. Cox et al., "Target Testing and the Pic Hunter Bayesian Multimedia Retrieval System," Proc. of the 3d Forum on Research and Technology Advances in Digital Libraries. ADL '96, IEEE, pp. 66-75.

Intel Corporation, iPower Technology, Marketing Brochure, date unknown.

Intuit Corp. Quicken User's Guide, "Paying Bills Electronically", pp. 171-192; undated.

ISO/IEC JTC1/SC29/WG11 N1735, MPEG97, July 1997—Stockholm, "MPEG-7 Applications Document".

ISO/IEC JTC1/SC29/WG11 N2460, MPEG98, October 1998 "MPEG-7 Context and Objectives (v.10—Atlantic City)"; ISO/IEC JTC1/SC29/WG11 N1920, MPEG97, October 1997 "MPEG-7 Context and Objectives (v.5—Fribourg)"; ISO/IEC JTC1/SC29/WG11 N1733, MPEG97, July 1997, "MPEG-7 Context and Objectives (v.4—Stockholm)".

ISO/IEC JTC1/SC29/WG11 N2461, MPEG98, October 1998—Atlantic City, "MPEG-7 Requirements".

ISO/IEC JTC1/SC29/WG11 N2462, MPEG98, October 1998—Atlantic City, "MPEG-7 Applications".

ISO/IEC JTC1/SC29/WG11 N2467, MPEG98, October 1998—Atlantic City, "MPEG-7 F5 Content Set".

Itzhak Wilf, "Computer, Retrieve For Me the Video Clip of the Winning Goal", Advanced Imaging, August 1998, pp. 53-55.

Ivar Ekeland: "Mathematics and the Unexpected", The University of Chicago Press, Chicago, 1988Kenneth Falconer: "Fractal Geometry", John Wiley & Sons, Chichester, 1990.

Ivars Peterson: "The Mathematical Tourist", W H Freeman, New York, 1988.

Iyengar et al., "Codes Designs for Image Browsing", 1994.

J W Bruce & P J Giblin: "Curves and Singularities", Cambridge University Press, Cambridge, 1992.

J. Hasegawa et al, "Intelligent Retrieval of Chest X-Ray Image Database Using Sketches", System And Computers In Japan, 1989, pp. 29-42.

J. M. Chassery. et al., "An Interactive Segmentation Method Based on Contextual Color and Shape Criterion", IEEE Transactions on Pattern Analysis and Machine Intelligence, vol. PAMI-6, No. 6, (November 1984).

J. Wachman, "A Video Browser that Learns by Example", Masters Thesis, Massachusetts Institute of Technology; 1996; also appears as MIT Media Laboratory Technical Report No. 383.

J. Hafner, H. S. Sawhney, W. Equitz, M. Flickner, and W. Niblack. Efficient color histogram indexing for quadratic form distance functions. IEEE Trans. Pattern Anal. Machine Intell., July 1995.

J. R. Bach, C. Fuller, A. Gupta, A. Hampapur, B. Horowitz, R. Humphrey, R. C. Jain, and C. Shu. Virage image search engine: an open framework for image management. In Symposium on Electronic Imaging: Science and Technology—Storage & Retrieval for Image and Video Databases IV, pages 76-87. IS&T/SPIE, 1996.

J. R. Smith and S.-F. Chang. Querying by color regions using the VisualSEEk content-based visual query system. In M. T. Maybury, editor, Intelligent Multimedia Information Retrieval. IJCAI, 1996.

J. R. Smith and S.-F. Chang. Tools and techniques for color image retrieval. In Symposium on Electronic Imaging: Science and Technology—Storage & Retrieval for Image and Video Databases IV, volume 2670, San Jose, Calif., February 1996. IS&T/SPIE.

Jacobs, Charles E., Finkelstein, Adam, Salesin, David H., "Fast Multiresolution Image Querying".

James Gleick: "Chaos—Making a New Science", Heinemann, London, 1988.

Jane Hunter, "The Application of Metadata Standards to Video Indexing" http://www.dtsc.edu.au/RDU/staff/jane-hunter/EuroDL/final.html (<12/24/98).

Jim Binkley & Leslie Young, Rama: An Architecture for Internet Information Filtering, Journal of Intelligent Information Systems: Integrating Artificial Intelligence and Database Technologies, vol. 5, No. 2, September 1995, pp. 81-99.

Jonathan Berry, "A Potent New Tool for Selling Database Marketing", Business Week, Sep. 5, 1994, pp. 34-40.

Joseph L McCauley: "Chaos, Dymanics, and Fractals", Cambridge University Press, Cambridge, 1993.

JPL New Technology Report NPO-20213, Nasa Tech Brief Vol. 22, No. 4, Item #156 (April 1998).

Judith H. Irven et al., "Multi-Media Information Services: A Laboratory Study", IEEE Communications Magazine, vol. 26, No. 6, June, 1988, pp. 24-44.

K V Mardia, J T Kent & J M Bibby: "Multivariate Analysis", Academic Press, London, 1979.

K. Hirata et al, "Query by Visual Example Content Based Image Retrieval", Advances In Database Technology, March, 1992, pp. 57-71.

K. Wakimoto et al, "An Intelligent User Interface to an Image Database using a Figure interpretation Method", IEEE Publication No. CH2898-5/90/0000/0516, 1990, pp. 516-520.

K. Woolsey, "Multimedia Scouting", IEEE Computer Graphics And Applications, July 1991 pp. 26-38.

Kelly et al. "Efficiency Issues Related to Probability Density Function Comparison", SPIE vol. 2670, pp. 42-49 January 1996.

Kelly. P. M., et al. "Candid Comparison Algorithm for Navigating Digital Image Databases", Proceedings 7th International Working Conference on Scientific and Statistical Database Management, pp. 252-258, 1994.

Krajewski, M. et al, "Applicability of Smart Cards to Network User Authentication". Computing Systems, vol. 7, No. 1, 1994.

Krajewski, M., "Concept for a Smart Card Kerberos", 15th National Computer Security Conference, October 1992.

Krajewski, M., "Smart Card Augmentation of Kerberos, Privacy and Security Research Group Workshop on Network and Distributed System Security", February 1993.

Lampson, Butler: Abadi, Martin; Burrows, Michael; and Wobber, Edward; "Authentication in Distributed Systems: Theory and Practice"; ACM Transactions on Computer Systems; vol. 10, No. 4; November, 1992; pp. 265-310.

Landis, Sean, "Content-Based Image Retrieval Systems for Interior Design", http://www.tc.cornell.eduNisualization/Education/cs718/fal11995/landis/index.html.

Langton C G (ed): Artificial Life; Proceedings of the first international conference on Artificial life, Redwood City: Addison-Wessley (1989).

Lee et al., "Video Indexing—An Approach based on Moving Object and Track", Proceedings of Storage and Retrieval for Image and Video Databases, pp. 25-36. February 1993.

Lee, Denis, et al., "Query by Image Content Using Multiple Objects and Multiple Features: User Interface Issues," 1994 Int'l Conf. on Image Processing, IEEE, pp. 76-80.

Lennart Ljung & Torsten Soderstrom: "Theory and Practice of Recursive Identification", The MIT Press, Cambridge, Mass., 1983.

Lennart Ljung: "System Identification; Theory for the User", Prentice-Hall Englewood Cliffs, N.J., 1987.

Loeb, S., "Architecting Personalized Delivery of Multimedia Information", Communications of the ACM, December 1992, vol. 35, No. 12, pp. 39-50.

M V Berry, I C Persival & N O Weiss: "Dynamical Chaos", The Royal Society, London, 1987, Proceedings of a Royal Society Discussion Meeting held on 4 & 5 Feb. 1987.

M. Bender, "EFTS: Electronic Funds Transfer Systems", Kennikat Press, Port Washington, N.Y., pp. 43-46 1975.

M. H. O'Docherty et al, "Multimedia Information System—The Management and Semantic Retrieval of all Electronic Data Types", The Computer Journal, vol. 34, No. 3, 1991.

M. Ioka, "A Method of Defining the Similarity of Images on the Basis of Color Information", Bulletin Of The National Museum Of Ethnology Special Issue, pp. 229-244, No. 17, November 1992.

M. Kurokawa, "An Approach to Retrieving Images by Using their Pictorial Features", IBM Research, Japan, September 1989.

M. Swain et al, "Color Indexing", International Journal Of Computer Vision, 1991, pp. 12-32.

M. Stricker and A. Dimai. Color indexing with weak spatial constraints. In Symposium on Electronic Imaging: Science and Technology—Storage & Retrieval for Image and Video Databases IV, pages 29-41. IS&T/SPIE, 1996.

M. Stricker and M. Orengo. Similarity of color images. In Storage and Retrieval for Image and Video Databases III, volume SPIE Vol. 2420, February 1995.

Mackay et al., "Virtual Video Editing in Interactive Multimedia Applications", 1989.

Manners, George, "Smart Screens; Development of Personal Navigation Systems for TV Viewers," Video Magazine, December 1993.

Martin Casdagli & Stephen Eubank: "Nonlinear Modelling and Forecasting", Addison-Wesley Publishing Co., Redwood City, 1992.

Martinez et al. "Imagenet: A Global Distribution Database for Color Image Storage and Retrieval in Medical Imaging Systems" IEEE, 1992, 710-719, May 1992.

Marvin A. Sirbu; Internet Billing Service Design And Prototype Implementation; pp. 1-19; An Internet Billing Server.

Masahiro Morita & Yoichi Shinoda, Information Filtering Based on User Behavior Analysis and Best Match Text Retrieval, Proceedings of the Seventeenth Annual International ACM-SIGIR Conference on Research and Development in Information Retrieval, Dublin, July 3-6, 1994, Pages Title Page (272)-281.

Medvinsy et al, "NetCash: A Design for Practical Electronic Currency on the Internet", Proc. 1st ACM Conf. on Comp. and Comm. Security, November 1993.

Medvinsy et al., "Electronic Currency for the Internet", Electronic Markets, pp. 30-31, September 1993.

Meyer, J. A., Roitblat, H. L., Wilson, W. (eds.): From Animals to Animats. Proceedings of the Second International Conference on Simulation of Adaptive Behaviour. Cambridge, Mass.: MIT Press. (1991).

Middleton, G. V. ed., 1991, Nonlinear Dynamics, Chaos and Fractals, with Applications to Geological Systems. Geol. Assoc. Canada Short Course Notes Vol. 9 (available from the GAC at Memorial University of Newfoundland, St. John's NF A1B 3×5).

Mills, "Media Composition for Casual Users", 1992.

Minneman et al., "Where Were We: making and using near-synchronous, pre-narrative video", Multimedia '93, pp. 1-11. December 1993.

N. Hutheesing, "Interactivity for the passive", Forbes magazine Dec. 6, 1993 (@ Forbes Inc. 1993) (2 pages).

N. S. Chang et al., "Query-by-Pictorial Example", IEEE Transactions on Software Engineering, vol. SE-6, No. 6, pp. 519-524 (November 1980).

N. S. Chang, et al., "Picture Query Languages for Pictorial Data-Base Systems", Computer vol. 14, No. 11, pp. 23-33 (November 1981).

Nagasaka et al., "Automatic Video Indexing and Full-Video Search for Object Appearances", Visual Database Systems, (Knuth et al., eds.), pp. 113-126. January 1992.

National Westminster Bank Group Brochure; pp. 1-29; undated.

Needham, Roger M. and Schroeder, Michael D.; "Using Encryption for Authentication in Large Networks of Computers"; Communications of the ACM; vol. 21, No. 12: December, 1978: pp. 993-999.

Needham, Roger M.; "Adding Capability Access to Conventional File Servers"; Xerox Palo Alto Research Center; Palo Alto, Calif.

Newman, B. C., "Proxy-Based Authorization and Accounting for Distributed Systems", Proc. 13th Int. Conf. on Dist. Comp. Sys., May 1993.

Niblack, W. et al., "The QBIC Project: Querying Images by Content Using Color, Texture, and Shape", IBM Computer Science Research Report, pp. 1-20 (Feb. 1, 1993).

Nussbaumer et al., "Multimedia Delivery on Demand: Capacity Analysis and Implications", Proc 19th Conference on Local Computer Networks, 2-5 Oct. 1994, pp. 380-386.

O. Guenther and A. Buchmann. Research issues in spatial databases. In ACM SIGMOD Record, volume 19, December 1990.

Okamoto et al; "Universal Electronic Cash", pp. 324-337; 1991.

Ono, Atsushi, et al., "A Flexible Content-Based Image Retrieval System with Combined Scene Description Keyword," Proc. of Multimedia '96, IEEE, pp. 201-208.

Otis Port, "Wonder Chips-How They'll Make Computing Power Ultrafast and Ultracheap", Business Week, Jul. 4, 1994, pp. 86-92.

P G Drazin: "Nonlinear System", Cambridge University Press, Cambridge, 1992.

P. Stanchev et al, "An Approach to Image Indexing of Documents", Visual Database Systems, II, 1992, pp. 63-77.

Peter J Diggle: "Time Series: A Biostatistical Introduction", Clarendon Press, Oxford, 1990.

Peters:"Chaos and Order in the Capital Markets", Wiley, 1991Gershenfeld & Weigend: "The Future of Time Series", Addison-Wesley, 1993.

Pfitzmann et al; "How to Break and Repair a Provably Secure Untraceable Payment System"; pp. 338-350; 1991.

Phillips, "MediaView: a general multimedia digital publication system", Comm. of the ACM, v. 34, n. 7, pp. 75-83. July 1991.

Predrag Cvitanovic: "Universality in Chaos", Adam Hilger, Bristol, 1989.

R. Mehrotra et al, "Shape Matching Utilizing Indexed Hypotheses Generation and Testing", IEEE Transactions On Robotics, vol. 5, No. 1, February 1989, pp. 70-77.

R. Price, et al., "Applying Relevance Feedback to a Photo Archival System", Journal of Information Science 18, pp. 203-215 (1992).

R. W. Picard et al, "finding Similar Patterns in Large Image Databases", IEEE ICASSP, Minneapolis, Minn., vol. V, pp. 161-164, April 1993; also appears in MIT Media Laboratory Technical Report No. 205.

Rangan et al., "A Window-based Editor for Digital Video and Audio", January 1992.

Richards et al., "The Interactive Island", IEE Revies, July/August 1991 pp. 259-263.

Rivest, R.; "The MD5 Message-Digest Algorithm"; MIT Laboratory for Computer Science and RSA Data Security, Inc.: April, 1992.

Rivest, R. L. et al., "A Method for Obtaining Digital Signatures and Public-Key Cryptosystems," Laboratory for Computer Science, Massachusetts Institute of Technology, M5 Cambridge, Mass.

Rivest, R. L.; Shamir, A. & Adleman, L.; "A Method for Obtaining Digital Signatures and Public-Key Cryptosystems", Communications of the ACM, February 1978, vol. 21, No. 2, pp. 120-126.

Robert Brown: "Statistical Forecasting for Inventory Control", McGraw-Hill Book Co., New York, 1958.

Robinson, G., and Loveless, W., "Touch-Tone' Teletext—A Combined Teletext-Viewdata System," IEEE Transactions on Consumer Electronics, vol. CE-25, No. 3, July 1979, pp. 298-303.

Roizen, Joseph, "Teletext in the USA," SMPTE Journal, July 1981, pp. 602-610.

Rose, D. E.; Mander, R.; Oren, T.; Ponceleon, D. B.; Salomon, G. & Wong, Y. Y. "Content Awareness in a File System Interface Implementing the 'Pile' Metaphor for Organizing Information", 16 Ann. Int'l SIGIR '93, ACM, pp. 260-269.

Ross Anderson, "Why Cryptosystems Fail", Proc. 1st Conf. Computer and Comm. Security, pp. 215-227, November 1993.

Ross J. Anderson, "UEPS-A Second Generation Electronic Wallet", Proc. of the Second European Symposium on Research in Computer Security (ESORICS), Toulouse, France, pp. 411-418, Touluse, France.

Rui, Yong, Huang, Thomas S., Chang, Shih-Fu, "Image Retrieval: Past Present and Future".

Rui, Yong, Huang, Thomas S., Mehotra, Sharad, "Browsing and retrieving Video Content in a Unified Framework".

Rui, Yong, Huang, Thomas S., Ortega, Michael, Mehotra, Sharad, "Relevance Feedback: A Power Tool for Interactive Content-Based Image Retrieval".

S. Chang et al, "An Intelligent Image Database System", IEEE Transactions On Software Engineering, vol. 14, No. 5, May 1988, pp. 681-688.

S. Chang et al, "Iconic Indexing by 2-D Strings", IEEE Transactions On Pattern Analysis And Machine Intelligence, vol. PAMI-9, No. 3, May 1987.

S. Chang et al, "Iconic Indexing by 2-D Strings", IEEE Transactions On Pattern Analysis And Machine Intelligence, vol. 9, No. 3, May 1987, pp. 413-427.

S. Charles et al, "Using Depictive Queries to Search Pictorial Databases", Human Computer Interaction, 1990, pp. 493-498.

S. Lee et al, "2D C-string: A New Spatial Knowledge Representation for Image Database Systems", Pattern Recognition, vol. 23, 1990, pp. 1077-1087.

S. Lee et al, "Similarity Retrieval of Iconic Image Database", Pattern Recognition, vol. 22, No. 6 1989, pp. 675-682.

S. Lee et al, "Spatial Reasoning and Similarity Retrieval of Images Using 2D C-string Knowledge Representation", Pattern Recognition, 1992, pp. 305-318.

S. Negandaripour et al "Challenges in Computer Vision: Future Research Direction", IEEE Transactions On Systems, Man And Cybernetics, pp. 189-199, 1992, at Conference on Computer Vision and Pattern Recognition.

S. Tanaka et al, "Retrieval Method for an Image Database based on Topological Structure", SPIE, vol. 1153, 1989, pp. 318-327.

S.-F. Chang. Compressed-domain techniques for image/video indexing and manipulation. In Proceedings, I.E.E.E. International Conference on Image Processing, Washington, D.C., October 1995. invited paper to the special session on Digital Library and Video on Demand.

S.-K. Chang, Q. Y. Shi, and C. Y. Yan. Iconic indexing by 2-D strings. IEEE Trans. Pattern Anal. Machine Intell., 9(3):413-428, May 1987.

S.-K. Chang. Principles of Pictorial Information Systems Design. Prentice Hall, 1989.

Salton, G., "Developments in Automatic Text Retrieval", Science, vol. 253, pp. 974-980, Aug. 30, 1991.

Schamuller-Bichl, I., "IC-Cards in High-Security Applications", in Selected Papers from the Smart Card 2000 Conference, Springer Verlag, 1991, pp. 177-199.

Semyon Dukach, "SNPP: A Simple Network Payment Protocol", MIT Laboratory for Computer Science, Cambridge, Mass., 1993.

Shann et al. "Detection of Circular Arcs for Content-Based Retrieval from an Image Database" IEE Proc.-Vis. Image Signal Process, vol. 141, No. 1, February 1994, pp. 49-55.

Sheldon G Lloyd & Gerald D Anderson: "Industrial Process Control", Fisher Controls Co., Marshalltown, 1971.

Sheth et al., "Evolving Agents for Personalized Information Filtering", 1-5 Mar. 1993, pp. 345-352.

Sheth, B. & Maes, P. "Evolving Agents For Personalized Information Filtering", Proc. 9th IEEE Conference, 1993 pp. 345-352.

Sincoskie, W. D. & Cotton C. J. "Extended Bridge Algorithms for Large Networks", IEEE Network, January 1988-vol. 2, No. 1, pp. 16-24.

Smith, J. et al., "Quad-Tree Segmentation for Texture-Based Image Query" Proceeding ACM Multimedia 94, pp. 1-15, San Francisco, 1994.

Smoliar, S. et al., "Content-Based Video Indexing and Retrieval", IEEE Multimedia, pp. 62-72 (Summer 1994).

Society for Worldwide Interbank Financial Telecommunications S.C., "A.S.W.I.F.T. Overview", undated.

Spyros Makridakis & Steven Wheelwright: "The Handbook of Forecasting", John Wiley, New York, 1982.

Steven C Chapra & Raymond P Canale: "Numerical Methods for Engineers", McGraw-Hill Book Co., New York, 1988.

T. Arndt, "A Survey of Recent Research in Image Database Management", IEEE Publication No. TH0330-1/90/0000/0092, pp. 92-97, 1990.

T. Gevers et al, "Enigma: An Image Retrieval System", IEEE 11th IAPR International Conference On Pattern Recognition, 1992, pp. 697-700.

T. Gevers et al, "Indexing of Images by Pictorial Information", Visual Database Systems, II, 1992 IFIP, pp. 93-101.

T. Kato et al, "A Cognitive Approach Interaction", International Conference Of Multimedia Information Systems, January, 1991, pp. 109-119.

T. Kato et al, "Trademark: Multimedia Database with Abstracted Representation on Knowledge Base", Proceedings Of The Second International Symposium On Interoperable Information Systems, pp. 245-252, November 1988.

T. Kato et al, "Trademark: Multimedia Image Database System with Intelligent Human Interface", System And Computers In Japan, 1990, pp. 33-46.

T. Kato, "A Sketch Retrieval Method for Full Color Image Database-Query by Visual Example", IEEE, Publication No. 0-8186-2910-X/92, 1992, pp. 530-533.

T. Kato, "Intelligent Visual Interaction with Image Database Systems Toward the Multimedia Personal Interface", Journal Of Information Processing, vol. 14. No. 2, 1991, pp. 134-143.

T. Minka, "An Image Database Browser that Learns from User Interaction", Masters Thesis, Massachusetts Institute of Technology; 1996; also appears as MIT Media Laboratory Technical Report 365.

T.-S. Chua, S.-K. Lim, and H.-K. Pung. Content-based retrieval of segmented images. In Proc. ACM Intern. Conf. Multimedia, October 1994.

Tak W. Yan & Hector Garcia-Molina, SIFT-A Tool for Wide-Area Information Dissemination, 1995 USENIX Technical Conference, New Orleans, La., January 16-20, pp. 177-186.

Tanton, N. E., "UK Teletext—Evolution and Potential," IEEE Transactions on Consumer Electronics, vol. CE-25, No. 3, July 1979, pp. 246-250.

Tenenbaum, Jay M. and Schiffman, Allan M.; "Development of Network Infrastructure and Services for Rapid Acquisition"; adapted from a white paper submitted to DARPA by MCC in collaboration with EIT and ISI.

Training Computers To Note Images, New York Times, Apr. 15, 1992.

Turcotte, Donald L., 1992, Fractals and Chaos in Geology and Geophysics. Cambridge U.P.

TV Communications Advertisement for MSI Datacasting Systems, January 1973.

V. Gudivada et al, "A Spatial Similarity Measure for Image Database Applications", Technical Report 91-1, Department of Computer Science, Jackson, Miss., 39217, 1990-1991.

V. N. Gudivada and V. V. Raghavan. Design and evaluation of algorithms for image retrieval by spatial similarity. ACM Trans. on Information Systems, 13(2), April 1995.

Vittal, J., "Active Message Processing: Message as Messengers", pp. 175-195; 1981.

Voydock, Victor et al.; "Security Mechanisms in High-Level Network Protocols"; Computing Surveys; vol. 15, No. 2; June 1981.

W Gellert, H Kustner, M Hellwich & H Kastner: "The VNR Concise Encyclopedia of Mathematics", Van Nostrand Reinhols Co., New York, 1975.

W. Grosky et al, "A Pictorial Index Mechanism for Model-based Matching", Data 7 Knowledge Engineering 8, 1992, pp. 309-327.

W. Grosky et al, "Index-based Object Recognition in Pictorial Data Management", Computer Vision, 1990. pp. 416-436.

W. Niblack et al, "Find me the Pictures that Look Like This: IBM'S Image Query Project", Advanced Imaging, April 1993. pp. 32-35.

W. Niblack, R. Barber, W. Equitz, M. Flickner, E. Glasman, D. Petkovic, P. Yanker, and C. Faloutsos. The QBIC project: Querying images by content using color, texture, and shape. In Storage and Retrieval for Image and Video Databases, volume SPIE Vol. 1908, February 1993.

W. T. Freeman et al, "The Design and Use of Steerable Filters", IEEE Transactions on Pattern Analysis and Machine Intelligence, vol. 15, No. 9, September 1991, pp. 891-906.

Weber et al., "Marquee: A Tool for Real-Time Video Logging", CHI '94. April 1994.

Willett, P., "Recent Trends in Hierarchic Document Clustering: A Critical Review", Information Processing & Management, vol. 24, No. 5, pp. 557-597, 1988

William L. Thomas, "Electronic Program Guide Applications—The Basics of System Design", 1994 NCTA Technical Papers, pp. 15-20.

X. Zhang, et al, "Design of a Relational Image Database Management System: IMDAT", IEEE Publication No. TH0166-9/87/0000-0310, 1987, pp. 310-314.

Y. Okada, et al., "An Image Storage and Retrieval System for Textile Pattern Adaptable to Color Sensation of the Individual", Trans. Inst. Elec. Inf. Comm., vol. J70D, No. 12, pp. 2563-2574, December 1987 (Japanese w/English Abstract).

Y. Yoshida et al, "Description of Weather Maps and Its Application to Implementation of Weather Map Database", IEEE 7th International Conference On Pattern Recognition, 1984, pp. 730-733.

Yan et al., "Index Structures for Information Filtering Under the Vector Space Model", PROC the 10th International Conference on Data Engineering, pp. 14-18 of DRD203RW User's Manual relating to the DSS Digital System.

Z. Chen et al, "Computer Vision for Robust 3D Aircraft Recognition with Fast Library Search", Pattern Recognition, vol. 24, No. 5, pp. 375-390, 1991, printed in Great Britain.

Zhuang, Yueting, Rui, Yong, Huang, Thomas S., Mehotra, Sharad, "Applying Semantic Association to Support Content-Based Video Retrieval".

Video on Demand

Video on demand has long been sought as a means for delivering personalized media content. The practical systems raise numerous issues, including data storage formats, retrieval software, server hardware architecture, multitasking and buffering arrangements, physical communications channel, logical communications channel, receiver and decoder system, user interface, etc. In addition, typically a pay-per-view concept may be employed, with concomitant subscription, royalty collection and accounting issues. See, e.g.:

A. D. Gelman, et al.: A Store-And-Forward Architecture For Video-On-Demand Service; ICC 91 Conf.; June 1991; pp. 842-846.

Caitlin Bestler: Flexible Data Structures and Interface Rituals For Rapid Development of OSD Applications; 93 NCTA Tech. Papers; Jun. 6, 1993; pp. 223-236.

Consumer Digest advertisement: Xpand Your TV's Capability: Fall/Winter 1992; p. 215.

Daniel M. Moloney: Digital Compression in Todays Addressable Enviroment; 1993 NCTA Technical Papers; Jun. 6, 1993; pp. 308-316.

Great Presentations advertisement: Remote, Remote; 1987; p. 32H.

Henrie van den Boom: An Interactive Videotex System for Two-Way CATV Networks; AEU, Band 40; 1986; pp. 397-401.

Hong Kong Enterprise advertisement: Two Innovative New Consumer Products From SVI; November 1988; p. 379.

IEEE Communications Magazine; vol. 32, No. 5, May 1994 New York, N.Y., US, pp. 68-80, XP 000451097 Chang et al "An Open Systems Approach to Video on Demand".

Proceedings of the IEEE, vol. 82, No. 4, April 1994 New York, N.Y., US, pp. 585-589, XP 000451419 Miller "A Scenario for the Deployment of Interactive Multimedia Cable Television Systems in the United States in the 1990's".

Reimer, "Memories in my Pocket", Byte, pp. 251-258, February 1991.

Sharpless, "Subscription teletext for value added services", August 1985.

Demographically Targeted Advertising Through Electronic Media

Since the advent of commercially subsidized print media, attempts have been made to optimize the placement and compensation aspects relating to commercial messages or advertisements in media. In general, advertisers subsidize a large percentage of the cost of mass publications and communications, in return for the inclusion and possibly strategic placement of advertisements in the publication. Therefore, the cost of advertising in such media includes the cost of preparation of the advertisement, a share of the cost of publication and a profit for the content provider and other services. Since the advertiser must bear some of the cost of production and distribution of the content, in addition to the cost of advertisement placement itself, the cost may be substantial. The advertiser justifies this cost because the wide public reception of the advertisement, typically low cost per consumer "impression", with a related stimulation of sales due to commercial awareness of the advertisers' products and services. Therefore, the advertisement is deemed particularly effective if either the audience is very large, with ad response proportionate to the size of the audience, or if it targets a particularly receptive audience, with a response rate higher than the general population.

On the other hand, the recipient of the commercial publication is generally receptive of the advertisement, even though it incurs a potential inefficiency in terms of increased data content and inefficiencies in receiving the content segment, for two reasons. First, the advertisements subsidize the publication, lowering the monetary cost to the recipient. Second, it is considered economically efficient for a recipient to review commercial information relating to prospective purchases or expenditures, rather than directly soliciting such information from the commercial source, i.e., "push" is better than "pull". For this reason specialty publications are produced, including commercial messages appropriate for the particular content of the media or the intended recipients. In fact, in some forms of publications, most, if not all the information content is paid advertisements, with few editorial or independently produced pieces.

Mass media, on the other hand, tends not to include specialty commercial messages, because the interested population is too disperse and the resulting response rate from an advertisement too low, and further because the majority of the audience will be disinterested or even respond negatively to certain messages. Thus, mass media generally includes a majority of retail advertisements, with specialty advertisements relegated, if at all, to a classified section which is not interspersed with other content.

This is the basis for a "least common denominator" theory of marketing, that mass media must merchandise to the masses, while specialty media merchandises to selected subpopulations. As a corollary, using such types of media, it may be difficult to reach certain specialized populations who do not consistently receive a common set of publications or who receive primarily publications which are unspecialized or directed to a different specialty.

Where a recipient has limited time for reviewing media, he or she must divide his or her available time between mass media and specialty media. Alternatively, publication on demand services have arisen which select content based on a user's expressed interests. Presumably. these same content selection algorithms may be applied to commercial messages. However, these services are primarily limited distribution, and have content that is as variable as commercial messages. Likewise, mass media often has regionally variable content, such as local commercials on television or cable systems, or differing editions of print media for different regions. Methods are known for demographic targeting of commercial information to consumers; however, both the delivery methods and demographic targeting methods tend to be suboptimal.

Sometimes, however, the system breaks down, resulting in inefficiencies. These result where the audience or a substantial proportion thereof is inappropriate for the material presented, and thus realize a low response rate for an advertiser or even a negative response for the media due to the existence of particular commercial advertisers. The recipients are bombarded with inappropriate information, while the advertiser fails to realize optimal return on its advertising expenditures. In order to minimize the occurrence of these situations, services are available, including A. C. Nielsen Co. and Arbitron, Inc., which seek to determine the demographics of the audience of broadcast media.

U.S. Pat. No. 5,436,653, incorporated herein by reference, relates to a broadcast segment recognition system in which a signature representing a monitored broadcast segment is compared with broadcast segment signatures in a data base representing known broadcast segments to determine whether a match exists. Therefore, the broadcast viewing habits of a user may be efficiently and automatically monitored, without pre-encoding broadcasts or the like.

U.S. Pat. No. 5,459,306, incorporated herein by reference, relates to a method for delivering targeting information to a prospective individual user. Personal user information is gathered, as well as information on a user's use of a product, correlated and stored. Classes of information potentially relevant to future purchases are then identified, and promotions and recommendations delivered based on the information and the user information.

U.S. Pat. No. 5,483,278, incorporated herein by reference, relates to a system having a user interface which can access downloaded electronic programs and associated information records, and which can automatically correlate the program information with the preferences of the user, to create and display a personalized information database based upon the results of the correlation. Likewise, U.S. Pat. No. 5,223,914, expressly incorporated herein by reference, relates to a system and method for automatically correlating user preferences with a T.V. program information database.

U.S. Pat. No. 5,231,494, expressly incorporated herein by reference, relates to a system that selectively extracts one of a plurality of compressed television signals from a single channel based on viewer characteristics.

U.S. Pat. No. 5,410,344 relates to a system for selecting video programs based on viewers preferences, based on content codes of the programs.

U.S. Pat. No. 5,485,518, incorporated herein by reference, relates to a system for electronic media program recognition and choice, allowing, for example, parental control of the individual programs presented, without requiring a transmitted editorial code.

Videoconferencing Technologies

Videoconferencing systems are well known in the art. A number of international standards have been defined, providing various telecommunication bandwidth and communication link options. For example, H.320, H.323 and H.324 are known transport protocols over ISDN, packet switched networks and public switched telephone networks, respectively. H.324 provides a multimedia information communication and videoconferencing standard for communication over the standard "plain old telephone system" network ("POTS"), in which the video signal is compressed using DCT transforms and motion compensation for transmission over a v.80 synchronous v.34-type modem link. The video image is provided as a video window with relatively slow frame rate. This image, in turn, may be presented on a computer monitor or television system, with appropriate signal conversion. See, Andrew W. Davis, "Hi Grandma!: Is It Time for TV Set POTS Videoconferencing?", *Advanced Imaging*, pp. 45-49 (March 1997); Jeff Child, "H.324 Paves Road For Mainstream Video Telephony", *Computer Design*, January 1997, pp. 107-110. A newly proposed set of extensions to H.324, called H.324/M, provides compatibility with mobile or impaired telecommunications systems. and accommodates errors and distortions in transmissions, reduced or variable transmission rates and other anomalies of known available mobile telecommunications systems, such as Cellular, GSM, and PCS.

Four common standards are employed, which are necessary for videoconferencing stations to communicate with each other under common standards. The first is called h.320, and encompasses relatively high bandwidth systems, in increments of 64 kbits/sec digital communication with a synchronous communication protocol. Generally, these systems communicate with 128 kbits/sec, 256 kbits/sec or 384 kbits/sec, over a number of "bonded" ISDN B-channels. The second standard h.324, employs a standard POTS communication link with a v.80/v.34bis modem, communicating at 33.6 kbits/sec synchronous. The third standard, is the newly established H.321 standard, which provides for videoconferencing over a packet switched network, such as Ethernet, using IPX or TCP/IP. Finally, there are so-called Internet videophone systems, such as Intel Proshare. See, Andrew W. Davis, "The Video Answering Machine: Intel ProShare's Next Step", *Advanced Imaging*, pp. 28-30 (March 1997).

In known standards-based videoconferencing systems. the image is generally compressed using a discrete cosine transform, which operates in the spatial frequency domain. In this domain, visually unimportant information, such as low frequencies and high frequency noise are eliminated, leaving visually important information. Further, because much of the information in a videoconference image is repeated in sequential frames, with possible movement, this redundant information is transmitted infrequently and filtered from the transmitted image stream, and described with motion vector information. This motion vector information encodes objects which are fixed or move somewhat between frames. Such known techniques include H.261, with integer pixel motion estimation, and H.263, which provides ½ pixel motion estimation. Other techniques for video compression are known or have been proposed, such as H.263+, and MPEG-4 encoding. Many standard videoconferencing protocols require the initial transmission of a full frame image, in order to set both transmitting and receiving stations to the same encoding state. The digital data describing this image is typically Huffman encoded for transmission. Multiple frames may be combined and coded as a unit, for example as so-called PB frames. Other techniques are also known for reducing image data transmission bandwidth for various applications, including video conferencing.

Each remote videoconference terminal has an interface system, which receives the digital data, and separates the video information (1-1.261, H.263), audio information (G.711, G.723, G.723.1), data protocol information (HDLC, V.14, LAPM, etc.) and control information (H.245, H.221/H.223) into discrete streams, which are processed separately. Likewise, each terminal interface system also assembles the audio information, video information, data protocols and control data for transmission. The control information consists of various types of information; the standard control protocol which addresses the data format, error correction, exception handling, and other types of control; and the multipoint control information, such as which remote videoconference terminal(s) to receive audio information from, selective audio muting, and such. Generally, the standard, low level control information is processed locally, at the codec interface system, and filtered from the remainder of the multipoint control system, with only the extracted content information made available to the other stations.

The ITU has developed a set of multipoint videoconferencing standards or recommendations, T.120-T.133, T.RES series, H.231, 11.243, etc. These define control schemes for multiple party video conferences. Typically, these protocols are implemented in systems that either identically replicate the source image data stream from one source to a plurality of destinations, or completely decode and reencode the image in a different format in a "transcoder" arrangement, to accommodate incompatible conference stations. The ITU standards also allow optional data fields which may be used to communicate digital information essentially outside the videoconference scheme, and provide data conferencing capabilities, which allow videoconferencing and data conferencing to proceed simultaneously. See, ITU T.120-T.127, T.130-T.133, T.RES, T.Share and T.TUD recommendations, expressly incorporated herein by reference.

There are a number of known techniques for transmitting and displaying alphanumeric data on a television, the most common of which are teletext, used primarily in Europe, and closed caption, which is mandated in television sets larger than 13 inches by the Television Decoder Circuitry Act of 1990, and Section 305 of the Telecommunications Act of 1996, and Federal Communication Commission (FCC) regulations. The American closed caption standard is EIA 608. The later is of particular interest because many current generation televisions, especially larger sizes, include a closed caption decoder, and thus require no external hardware or connections, separate from the hardware and cabling for supplying the video signal. See, TCC Tech Facts, Vols. I-4, (www.wgbh.org, rev. 9/95) expressly incorporated herein by reference. The closed caption signal is distributed on Line 21 of the vertical blanking interval (VBI). The existing standard supports 480 bits/sec, with a potential increase to 9600 bits/sec in the forthcoming ATSC standard.

Electronic Program Guide (EPG) information and advertising information is presently being transmitted during the VBI in the U.S. by NBC affiliates, using the Gemstar system. Proposals exist for distributing such information using a 900 MHz paging network to wireless receivers associated with television viewing apparatus, and further to provide bi-directional capabilities and electronic commerce integration.

Known systems provide a videoconferencing system which resides in a "set top box", i.e., a stand-alone hardware device suitable for situation on top of a television set, providing all of the necessary functionality of a videoconferencing system employing the television as the display and possibly audio speaker functions. These systems, however, do not integrate the television functions, nor provide interaction between the video and videoconferencing systems. C-Phone Inc., Wilmington N.C., provides a C-Phone Home product line which provides extensions to H.324 and/or H.320 communications in a set-top box.

Other known videophone and videoconferencing devices are disclosed, e.g., in U.S. Pat. Nos. 5,600,646; 5,565,910; 5,564,001; 5,555,443; 5,553,609; 5,548,322; 5,542,102; 5,537,472; 5,526,405; 5,509,009; 5,500,671; 5,490,208; 5,438,357; 5,404,579; 5,374,952; 5,224,151; 4,543,665; 4,491,694; 4,465.902; 4,456,925; 4,427,847; 4,414,432; 4,377,729; 4,356,509; 4,349,701; 4,338,492; 4,008,376 and 3,984,638 each of which is expressly incorporated herein by reference.

Known Web/TV devices (from Sony/Magnavox/Philips) allow use of a television to display alphanumeric data, as well as audiovisual data, but formats this data for display outside the television. In addition, embedded Web servers are also known. See, Richard A. Quinell, "Web Servers in embedded systems enhance user interaction", *EDN*, Apr. 10, 1997, pp. 61-68, incorporated herein by reference. Likewise, combined analog and digital data transmission schemes are also known. See. U.S. Pat. No. 5,404,579.

A class of computing devices, representing a convergence of personal computers and entertainment devices, and which provide network access to the Internet (a publicly available network operating over TCP/IP). ITU standards for communications systems allow the selective addition of data, according to T.120-T.133, T.RES series of protocols, as well as HDLC, V.14, LAPM, to the videoconference stream, especially where excess bandwidth is available for upload or download.

A system may be provided with features enabling it to control a so-called smart house and/or to be a part of a security and/or monitoring system, with imaging capability. These functions are provided as follows. As discussed above, various data streams may be integrated with a videoconference data stream over the same physical link. Therefore, external inputs and outputs may be provided to the videophone or videoconference terminal, which maybe processed locally and/or transmitted over the telecommunications link. The local device, in this case, is provided with a continuous connection or an autodial function, to create a communications link as necessary. Therefore, heating ventilation and air conditioning control (HVAC), lighting, appliances, machinery, valves, security sensors, locks, gates, access points, etc., may all be controlled locally or remotely through interfaces of the local system, which may include logic level signals, relays, serial ports, computer networks, fiber optic interfaces, infrared beams, radio frequency signals, transmissions through power lines, standard-type computer network communications (twisted pair, coaxial cable, fiber optic cable), acoustic transmissions and other known techniques. Likewise, inputs from various devices and sensors, such as light or optical, temperature, humidity, moisture, pressure, fluid level, security devices, radio frequency, acoustic, may be received and processed locally or remotely. A video and audio signal transmission may also be combined with the data signals, allowing enhanced remote monitoring and control possibilities. This information, when transmitted through the telecommunication link, may be directed to another remote terminal, for example a monitoring service or person seeking to monitor his own home, or intercepted and processed at a central control unit or another device. Remote events may be monitored, for example, on a closed caption display mode of a television attached to a videophone.

While the preferred embodiments of the invention adhere to established standards, the present invention also encompasses communications which deviate from or extend beyond such standards, and thus may engage in proprietary communications protocols, between compatible units.

Other References

In addition, the following patents are considered relevant to the data compression and pattern recognition functions of the apparatus and interface of the present invention and are incorporated herein by reference: U.S. Pat. Nos. 3,609,684; 3,849,760; 3,950,733; 3,967,241; 4,025,851; 4,044,243; 4,100,370; 4,118,730; 4,148,061; 4,213,183; 4,225,850; 4,228,421; 4,230,990; 4,245,245; 4,254,474; 4,264,924; 4,264,925; 4,305,131; 4,326,259; 4,331,974; 4,338,626; 4,390,904; 4,395,780; 4,420,769; 4,442,544; 4,449,240; 4,450,531; 4,468,704; 4,491,962; 4,499,601; 4,501,016; 4,511,918; 4,543,660; 4,546,382; 4,547,811; 4,547,899; 4,581,762; 4,593,367; 4,602,279; 4,630,308; 4,646,250; 4,656,665; 4,658,429; 4,658,370; 4,660,166; 4,677,466; 4,697,209; 4,672,683; 4,677,680; 4,682,365; 4,685,145; 4,695,975; 4,710,822; 4,710,964; 4,716,404; 4,719,591; 4,731,863; 4,734,786; 4,736,439; 4,739,398; 4,742,557; 4,747,148; 4,752,890; 4,653,109; 4,760,604; 4,764,971; 4,764,973; 4,771,467; 4,773,024; 4,773,099; 4,774,677; 4,775,935; 4,783,752; 4,783,754; 4,783,829; 4,789,933; 4,790,025; 4,799,270; 4,802,103; 4,803,103; 4,803,736; 4,805,224; 4,805,225; 4,805,255; 4,809,331; 4,809,341; 4,817,171; 4,817,176; 4,821,333; 4,823,194; 4,829,453; 4,831,659; 4,833,637; 4,837,842; 4,843,562; 4,843,631; 4,845,610; 4,864,629; 4,872,024; 4,876,731; 4,881,270; 4,884,217; 4,887,304; 4,888,814; 4,891,762; 4,893,346; 4,897,811; 4,905,162; 4,905,286; 4,905,296; 4,906,099; 4,906,940; 4,908,758; 4,914,708; 4,920,499; 4,926,491; 4,930,160; 4,931,926; 4,932,065; 4,933,872; 4,941,193; 4,944,023; 4,949,187; 4,956,870; 4,958,375; 4,958,375; 4,964,077; 4,965,725; 4,967,273; 4,972,499; 4,979,222; 4,987,604; 4,989,256; 4,989,258; 4,992,940; 4,995,078; 5,012,334; 5,014,219; 5,014,327; 5,018,218; 5,018,219; 5,019,899; 5,020,112; 5,020,113; 5,022,062; 5,027,400; 5,031,224; 5,033,101; 5,034,991; 5,038,379; 5,038,390; 5,040,134; 5,046,121; 5,046,122; 5,046,179; 5,047,867; 5,048,112; 5,050,223; 5,051,840; 5,052,043; 5,052,045; 5,052,046; 5,053,974; 5,054,093; 5,054,095; 5,054,101; 5,054,103; 5,055,658; 5,055,926; 5,056,147; 5,058,179; 5,058,180; 5,058,183; 5,058,186; 5,059,126; 5,060,276; 5,060,277; 5,060,279; 5,060,282; 5,060,285; 5,061,063;

5,063,524; 5,063,525; 5,063,603; 5,063,605; 5,063,608; 5,065,439; 5,065,440; 5,065,447; 5,067,160; 5,067,161; 5,067,162; 5,067,163; 5,067,164; 5,068,664; 5,068,723; 5,068,724; 5,068,744; 5,068,909; 5,068,911; 5,076,662; 5,099,422; 5,103,498; 5,109,431; 5,111,516; 5,119,507; 5,122,886; 5,130,792; 5,132,992; 5,133,021; 5,133,079; 5,134,719; 5,148,497; 5,148,522; 5,155,591; 5,159,474; 5,161,204; 5,168,529; 5,173,949; 5,177,796; 5,179,652; 5,202,828; 5,220,420; 5,220,648; 5,223,924; 5,231,494; 5,239,617; 5,247,347; 5,247,651; 5,259,038; 5,274,714; 5,283,641; 5,303,313; 5,305,197; 5,307,421; 5,315,670; 5,317,647; 5,317,677; 5,343,251; 5,351,078; 5,357,276; 5,381,158; 5,384,867; 5,388,198; 5,390,125; 5,390,281; 5,410,343; 5,410,643; 5,416,856; 5,418,951; 5,420,975; 5,421,008; 5,428,559; 5,428,727; 5,428,730; 5,428,774; 5,430,812; 5,434,933; 5,434,966; 5,436,653; 5,436,834; 5,440,400; 5,446,891; 5,446,919; 5,455,892; 5,459,517; 5,461,699; 5,465,308; 5,469,206; 5,477,447; 5,479,264; 5,481,294; 5,481,712; 5,483,278; 5,485,219; 5,485,518; 5,487,132; 5,488,425; 5,488,484; 5,495,292; 5,496,177; 5,497,314; 5,502,774; 5,504,518; 5,506,768; 5,510,838; 5,511,134; 5,511,153; 5,515,098; 5,515,099; 5,515,173; 5,515,453; 5,515,471; 5,517,598; 5,519,452; 5,521,841; 5,521,984; 5,522,155; 5,523,796; 5,524,065; 5,526,427; 5,535,302; 5,541,638; 5,541,662; 5,541,738; 5,543,929; 5,544,254; 5,546,475; 5,548,667; 5,550,575; 5,550,928; 5,550,965; 5,552,833; 5,553,221; 5,553,277; 5,554,983; 5,555,495; 5,557,728; 5,559,548; 5,560,011; 5,561,649; 5,561,718; 5,561,796; 5,566,274; 5,572,604; 5,574,845; 5,576,950; 5,579,471; 5,581,658; 5,586,218; 5,588,074; 5,592,560; 5,574,845; 5,579,471; 5,581,665; 5,581,800; 5,583,560; 5,586,025; 5,594,661; 5,594,911; 5,596,705; 5,600,733; 5,600,775; 5,604,542; 5,604,820; 5,604,823; 5,606,655; 5,611,020; 5,613,032; 5,614,940; 5,617,483; 5,617,565; 5,621,454; 5,621,484; 5,621,579; 5,621,903; 5,625,715; 5,625,783; 5,627,915; 5,634,849; 5,635,986; 5,642,434; 5,644,686; 5,644,735; 5,654,771; 5,655,117; 5,657,397; 5,659,653; 5,659,368; 5,659,732; 5,664,046; 5,668,897; 5,671,343; 5,671,411; 5,682,437; 5,696,964; 5,701,369; 5,710,601; 5,710,833; 5,710,834; 5,715,400; 5,717,814; 5,724,424; 5,724,472; 5,729,741; 5,734,893; 5,737,444; 5,740,274; 5,745,126; 5,745,640; 5,745,710; 5,751,286; 5,751,831; 5,754,938; 5,758,257; 5,761; 655; 5,764,809; 5,767,893; 5,767,922; 5,768,421; 5,768,426; 5,768,437; 5,778,181; 5,797,001; 5,798,785; 5,799,109; 5,801,750; 5,801,753; 5,805,763; 5,809,471; 5,819,288; 5,828,809; 5,835,087; 5,850,352; 5,852,823; 5,857,181; 5,862,260; H 331; and Re. 33,316. The aforementioned patents, some of which are mentioned elsewhere in this disclosure, and which form a part of this disclosure, may be applied in known manner by those skilled in the art in order to practice various embodiments of the present invention.

The following scientific articles, some of which are discussed elsewhere herein, are understood by those skilled in the art and relate to the pattern recognition and image compression functions of the apparatus and interface of the present invention:

"Fractal Geometry-Understanding Chaos", Georgia Tech Alumni Magazine, p. 16 (Spring 1986).

"Fractal Modelling of Biological Structures", School of Mathematics, Georgia Institute of Technology (date unknown).

"Fractal Modelling of Real World Images", Lecture Notes for Fractals: Introduction, Basics and Perspectives, Siggraph (1987).

"Fractals Yield High Compression", Electronic Engineering Times, Sep. 30, 1991, p. 39.

"Fractals-A Geometry of Nature", Georgia Institute of Technology Research Horizons, p. 9 (Spring 1986).

"Voice Recognition and Speech Processing", Elektor Electronics, September 1985, pp. 56-57.

Aleksander, I., "Guide to Pattern Recognition Using Random-Access Memories", Computers and Digital Techniques, 2(1):29-40 (February 1979).

Anderson, F., W. Christiansen, B. Kortegaard, "Real Time, Video Image Centroid Tracker", April 16-20, 1990.

Anson, L., M. Barnsley, "Graphics Compression Technology", SunWorld, pp. 43-52 (October 1991).

Appriou, A., "Interet des theories de l'incertain en fusion de donnees", Colloque International sur le Radar Paris, 24-28 avril 1989.

Appriou, A., "Procedure d'aide a la decision multi-informateurs. Applications a la classification multi-capteurs de cibles", Symposium de l'Avionics Panel (AGARD) Turquie. 25-29 avril 1988.

Arrow, K. J., "Social choice and individual valves", John Wiley and Sons Inc. (1963).

Barnsley et al., "A Better Way to Compress Images", Byte Magazine, January 1988.

Barnsley et al., "Harnessing Chaos For Images Systhesis", Computer Graphics, 22(4) (August/1988).

Barnsley et al., "Hidden Variable Fractal Interpolation Functions", School of Mathematics, Georgia Institute of Technology, Atlanta, Ga. 30332, July, 1986.

Batchelor, B. G., "Pattern Recognition, Ideas in Practice", Plenum Press, London and New York, (1978).

Batchelor, B. G., "Practical Approach to Pattern Classification", Plenum Press, London and New York, (1974).

Bellman, R. E., L. A. Zadeh, "Decision making in a fuzzy environment", Management Science, 17(4) (December 1970).

Bhatnagar, R. K., L. N. Kamal, "Handling uncertain information: a review of numeric and non-numeric methods", Uncertainty in Artificial Intelligence, L. N. Kamal and J. F. Lemmer, Eds. (1986).

Blair, D., R. Pollack, "La logique du choix collectif", Pour la Science (1983).

Burr, D. J., "A Neural Network Digit Recognizer", Proceedings of the 1986 IEEE International Conference of Systems, Man and Cybernetics, Atlanta, Ga., pp. 1621-1625.

Caffery, B., "Fractal Compression Breakthrough for Multimedia Applications", Inside. Oct. 9, 1991.

Carpenter, G. A., S. Grossberg, "The Art of Adaptive Pattern Recognition by a Self-Organizing Neural Network", IEEE Computer, March 1988, pp. 77-88.

Casasent, D., et al., "General I and Q Data Processing on a Multichannel AO System". Applied Optics, 25(18):3217-24 (Sep. 15, 1986).

Caudill, M., "Neural Networks Primer-Part III", AI Expert, June 1988, pp. 53-59.

Chao, J. J., E. Drakopoulos, C. C. Lee, "An evidential reasoning approach to distributed multiple hypothesis detection", Proceedings of the 20th Conference on decision and control, Los Angeles, Calif., December 1987.

Chao, T.-H.; Hegblom, E.; Lau, B.; Stoner, W. W.; Miceli, W. J., "Optoelectronically implemented neural network with a wavelet preprocessor", *Proceedings of the SPIE—The International Society for Optical Engineering*, 2026: 472-82(1993).

Chen et al., "Adaptive Coding of Monochrome and Color Images", November 1977, pp. 1285-1292.

Cheong, C. K.; Aizawa, K.; Saito, T.; Hatori, M., "Adaptive edge detection with fractal dimension", *Transactions of* the Institute of Electronics, Information and Communication Engineers D-II, J76D-11(11):2459-63 (1993).

Computer Visions, Graphics, and Image Processing, 1987, 37:54-115.

Computers and Biomedical Research 5, 388-410 (1972).

Cooper, L. N., "A Possible Organization of Animal Memory and Learning", Nobel 24, (1973), Collective Properties of Physical Systems, pp. 252-264.

Crawford et al., "Adaptive Pattern Recognition Applied To An Expert System For Fault Diagnosis In Telecommunications Equipment", pp. 10/1-8 (Inspec. Abstract No. 86C010699, Inspec IEE (London) & IEE Coll. on "Adaptive Filters", Digest No. 76, Oct. 10, 1985).

Danielsson, Erik, et al., "Computer Architectures for Pictorial Inf. Systems", IEEE Computer, November, 1981, pp. 53-67.

Dempster, A. P., "A generalization of Bayesian inference", Journal of the Royal Statistical Society, Vol. 30, Series B (1968).

Dempster, A. P., "Upper and lower probabilities induced by a multi valued mapping". Annals of mathematical Statistics, no. 38 (1967).

Denker, 1984 International Test Conf., October 1984, Philadelphia, Pa., pp. 558-563.

Dubois, D., "Modeles mathematiques de l'imprecis et de l'incertain en vue d'applications aux techniques d'aide a la decision", Doctoral Thesis, University of Grenoble (1983).

Dubois, D., N. Prade, "Combination of uncertainty with belief functions: a reexamination", Proceedings 9th International Joint Conference on Artificial Intelligence, Los Angeles (1985).

Dubois, D., N. Prade, "Fuzzy sets and systems-Theory and applications", Academic Press, New York (1980).

Dubois, D., N. Prade, "Theorie des possibilites: application a la representation des connaissances en informatique", Masson, Paris (1985).

Duda, R. O., P. E. Hart, M. J. Nilsson, "Subjective Bayesian methods for rule-based inference systems", Technical Note 124, Artificial Intelligence Center, SRI International.

Dunning, B. B., "Self-Learning Data-Base For Automated Fault Localization", IEEE, 1979, pp. 155-157.

Farrelle, Paul M. and Jain, Anil K., "Recursive Block Coding-A New Approach to Transform Coding", IEEE Transactions on Communications, Com. 34(2) (February 1986).

Fitzpatrick, J. M., J. J. Grefenstette, D. Van Gucht, "Image Registration by Genetic Search", Conf. Proc., IEEE Southeastcon 1984, pp. 460-464.

Fua, P. V., "Using probability density functions in the framework of evidential reasoning Uncertainty in knowledge based systems", B. Bouchon, R. R. Yager, Eds. Springer Verlag (1987).

Gogoussis et al., Proc. SPIE Intl. Soc. Opt. Eng., November 1984, Cambridge, Mass., pp. 121-127.

Grossberg, S., G. Carpenter, "A Massively Parallel Architecture for a Self-Organizing Neural Pattern Recognition Machine", Computer Vision, Graphics, and Image Processing, 1987, 37, 54-115, 252-315.

Gullichsen, E., E. Chang, "Pattern Classification by Neural Network: An Experiment System for Icon Recognition", ICNN Proceeding on Neural Networks, March 1987, pp. IV-725-32.

Haruki, K. et al., "Pattern Recognition of Handwritten Phonetic Japanese Alphabet Characters", International Joint Conference on Neural Networks, Washington, D.C., January 1990, pp. 11-515 to 11-518.

Hayashi, Y., et al., "Alphanumeric Character Recognition Using a Connectionist Model with the Pocket Algorithm", Proceedings of the International Joint Conference on Neural Networks, Washington, D.C. June 18-22, 1989, vol. 2, pp. 606-613.

Hayes, H. I.; Solka, J. L.; Priebe, C. E.; "Parallel computation of fractal dimension", *Proceedings of the SPIE—The International Society for Optical Engineering*, 1962:219-30 (1993).

Hinton et al., "Boltzmann Machines: Constraint Satisfaction Networks that Learn", Tech. Report CMU-CS-85-119, Carnegie-Mellon Univ, 5/84.

Hoare, F.; de Jager, G., "Neural networks for extracting features of objects in images as a pre-processing stage to pattern classification", Proceedings of the 1992 South African Symposium on Communications and Signal Processing. COMSIG '92 (Cat. No. 92TH0482-0). Inggs, M. (Ed.), p. 239-42 (1992).

Hopfield et al., "Computing with Neural Circuits: A Model", Science, 233:625-633 (8 Aug. 1986).

Hopfield, "Neural Networks and Physical Systems with Emergent Collective Computational Abilities", Proc. Natl. Acad. Sci. USA, 79:2554-2558 (April 1982).

Hopfield, "Neurons with graded response have collective computational properties like those of two-state neurons", Proc. Natl. Acad. Sci. USA, 81:3088-3092 (May 1984).

Hurtgen, B.; Buttgen, P., "Fractal approach to low rate video coding". *Proceedings of the SPIE—The International Society for Optical Engineering*, 2094(pt.1):120-31 (1993). Information Processing 71, North-Holland Publishing Company (1972) pp. 1530-1533. Ishizuka, M., "Inference methods based on extended Dempster and Shafer's theory for problems with uncertainty/fuzziness", New Generation Computing, Ohmsha, Ltd, and Springer Verlag, 1:159-168 (1983).

Jackel, L. D., H. P. Graf, J. S. Denker, D. Henderson and I. Guyon, "An Application of Neural Net Chips: Handwritten Digit Recognition", ICNN Proceeding, 1988, pp. 11-107-15.

Jean, J. S. N., et al., "Input Representation and Output Voting Considerations for Handwritten Numeral Recognition with Backpropagation", International Joint Conference on Neural Networks, Washington, D.C., January 1990, pp. 1-408 to 1-411.

Jeffrey, R. J., "The logic of decision", The University of Chicago Press, Ltd., London (1983)(2nd Ed.).

Kaufmann, A., "Introduction a la theorie des sous-ensembles flous", Vol. 1, 2 et 3, Masson, Paris (1975).

Keeney, R. L., B. Raiffa, "Decisions with multiple objectives: Preferences and value tradeoffs", John Wiley and Sons, New York (1976).

Kellman, P., "Time Integrating Optical Signal Processing", Ph. D. Dissertation, Stanford University, 1979, pp. 51-55.

Kim, D. H.; Caulfield, H. J.; Jannson, T.; Kostrzewski, A.; Savant, G, "Optical fractal image processor for noise-embedded targets detection", *Proceedings of the SPIE—The International Society for Optical Engineering*, Vol: 2026 p. 144-9 (1993) (SPIE Conf: Photonics for Processors, Neural Networks, and Memories 12-15 Jul. 1993, San Diego, Calif., USA).

Kohonen, "Self-Organization & Memory", Second Ed., 1988, Springer-Verlag, pp. 199-209.

Kortegaard, B. L., "PAC-MAN, a Precision Alignment Control System for Multiple Laser Beams Self-Adaptive Through the Use of Noise", Los Alamos National Laboratory, date unknown.

Kortegaard, B. L., "Superfine Laser Position Control Using Statistically Enhanced Resolution in Real Time", Los Alamos National Laboratory, SPIE-Los Angeles Technical Symposium, January 23-25, 1985.

Ksienski et al., "Low Frequency Approach to Target Identification", Proc. of the IEEE, 63(12):1651-1660 (December 1975).

Kyburg, H. E., "Bayesian and non Bayesian evidential updating", Artificial Intelligence No 31:271-293 (1987).

LeCun, Y. et al., "Handwritten Digit Recognition: Applications of Neural.", IEEE Comm. Magazine, November 1989, pp. 41-46.

LeCun, Y., "Connectionism in Perspective", in R. Pfeifer, Z. Schreter, F. Fogelman, L. Steels (Eds.), 1989, "Generalization and Network Design Strategies", pp. 143-155.

Liepins, G. E., M. R. Hilliard, "Genetic Algorithms: Foundations & Applications", Annals of Operations Research, 21:31-58 (1989).

Lin, H. K., et al., "Real-Time Screen-Aided Multiple-Image Optical Holographic Matched-Filter Correlator", Applied Optics, 21(18):3278-3286 (Sep. 15, 1982).

Lippman, R. P., "An Introduction to Computing with Neural Nets", IEEE ASSP Magazine, April 1987, pp. 4-22.

Lippmann, R. P., "An Introduction to Computing with Neural Nets", IEEE ASSP Magazine, vol. 4(2):4-22 (April 1987).

Liu, Y., "Extensions of fractal theory", *Proceedings of the SPIE—The International Society for Optical Engineering,* 1966:255-68(1993).

Liu, Y., "Pattern recognition using Hilbert space", *Proceedings of the SPIE—The International Society for Optical Engineering,* 1825:63-77 (1992).

Mahalanobis, A., et al., "Minimum Average Correlation Energy Filters", Applied Optics, 26(17):3633-40 (Sep. 1, 1987).

Martin, G. L. et al., "Recognizing Hand-Printed Letters and Digits Using Backpropagation Learning", Technical Report of the MCC, Human Interface Laboratory, Austin, Tex., January 1990, pp. 1-9.

McAulay, A. D., J. C. Oh, "Image Learning Classifier System Using Genetic Algorithms", IEEE Proc. of the National Aerospace & Electronics Conference, 2:705-710 (1989).

Miller, R. K., Neural Networks ((c) 1989: Fairmont Press, Lilburn, Ga.), pp. 2-12 and Chapter 4, "Implementation of Neural Networks", pp. 4-1 to 4-26.

Molley, P., "Implementing the Difference-Squared Error Algorithm Using An Acousto-Optic Processor", SPIE, 1098:232-239 (1989).

Molley, P., et al., "A High Dynamic Range Acousto-Optic Image Correlator for Real-Time Pattern Recognition", SPIE, 938:55-65 (1988).

Mori, "Towards the construction of a large-scale neural network", Electronics Information Communications Association Bulletin PRU 88-59, pp. 87-94.

Naik et al., "High Performance Speaker Verification.", ICASSP 86, Tokyo, CH2243-4/86/0000-0881, IEEE 1986, pp. 881-884.

Ney, H., et al., "A Data Driven Organization of the Dynamic Programming Beam Search for Continuous Speech Recognition", Proc. ICASSP 87, pp. 833-836, 1987.

Nilsson, N. J., The Mathematical Foundations of Learning Machines ((c) 1990: Morgan Kaufmann Publishers, San Mateo, Calif.) and particularly section 2.6 "The Threshold Logic Unit (TLU)", pp. 21-23 and Chapter 6, "Layered Machines" pp. 95-114.

Ohsuga et al., "Entrainment of Two Coupled van der Pol Oscillators by an External Oscillation", Biological Cybernetics, 51:225-239 (1985).

Omata et al., "Holonic Model of Motion Perception", IEICE Technical Reports, Mar. 26, 1988, pp. 339-346.

O'Neal et al., "Coding Isotropic Images", November 1977, pp. 697-707.

Pawlicki, T. F., D. S. Lee, J. J. Hull and S. N. Srihari, "Neural Network Models and their Application to Handwritten Digit Recognition", ICNN Proceeding, 1988, pp. 11-63-70.

Perry et al., "Auto-Indexing Storage Device", IBM Tech. Disc. Bulletin, 12(8):1219 (January 1970).

Peterson, Ivars, "Packing It In", Science News, 131(18): 283-285 (May 2, 1987).

Priebe, C. E.; Solka, J. L.; Rogers, G. W., "Discriminant analysis in aerial images using fractal based features", *Proceedings of the SPIE—The International Society for Optical Engineering,* 1962:196-208(1993).

Proceedings, 6th International Conference on Pattern Recognition 1982, pp. 152-136.

Psaltis, D., "Incoherent Electro-Optic Image Correlator", Optical Engineering, 23(1):12-15 (January/February 1984).

Psaltis, D., "Two-Dimensional Optical Processing Using One-Dimensional Input Devices", Proceedings of the IEEE, 72(7):962-974 (July 1984).

Rahmati, M.; Hassebrook, L. G., "Intensity- and distortion-invariant pattern recognition with complex linear morphology", Pattern Recognition, 27 (4):549-68(1994).

Reusens, E., "Sequence coding based on the fractal theory of iterated transformations systems", *Proceedings of the SPIE—The International Society for Optical Engineering,* 2094(pt.1):132-40(1993).

Rhodes, W., "Acousto-Optic Signal Processing: Convolution and Correlation". Proc. of the IEEE, 69(1):65-79 (January 1981).

Rosenfeld, Azriel and Avinash C. Kak, Digital Picture Processing, Second Edition, Volume 2, Academic Press, 1982.

Roy, B., "Classements et choix en presence de points de vue multiples", R.I.R.O.-2eme annee-no. 8. pp. 57-75 (1968).

Roy, B., "Electre III: un algorithme de classements fonde sur une representation floue des preferences en presence de criteres multiples", Cahiers du CERO, 20(1):3-24 (1978).

Rumelhart, D. E., et al., "Learning Internal Representations by Error Propagation", Parallel Distr. Proc.: Explorations in Microstructure of Cognition, 1:318-362 (1986).

Rumelhart, D. E., et al., Parallel Distributed Processing, ((c) 1986: MIT Press, Cambridge, Mass.), and specifically Chapter 8 thereof, "Learning Internal Representations by Error Propagation", pp. 318-362.

Rutherford, H. G., F. Taub and B. Williams, "Object Identification and Measurement from Images with Access to the Database to Select Specific Subpopulations of Special Interest", May 1986.

Rutter et al., "The Timed Lattice-A New Approach To Fast Converging Equalizer Design", pp. VIII/1-5 (Inspec. Abstract No. 84C044315, Inspec IEE (London) & IEE Saraga Colloquium on Electronic Filters, May 21, 1984).

Sadjadi, F., "Experiments in the use of fractal in computer pattern recognition", *Proceedings of the SPIE—The International Society for Optical Engineering,* 1960:214-22 (1993).

Sakoe, H., "A Generalization of Dynamic Programming Based Pattern Matching Algorithm Stack DP-Matching", Transactions of the Committee on Speech Research, The Acoustic Society of Japan, p. S83-23, 1983.

Sakoe, H., "A Generalized Two-Level DP-Matching Algorithm for Continuous Speech Recognition", Transactions of the IECE of Japan, E65(11):649-656 (November 1982).

Scharlic, A., "Decider sur plusieurs criteres. Panorama de l'aide a la decision multicritere", Presses Polytechniques Romandes (1985).

Schurmann, J., "Zur Zeichen and Worterkennung beim Automatischen Anschriftenlesen", Wissenschaftlichl, Berichte, 52(1/2) (1979).

Scientific American, "Not Just a Pretty Face", March 1990, pp. 77-78.

Shafer, G., "A mathematical theory of evidence", Princeton University Press, Princeton, N.J. (1976).

Shimizu et al., "Principle of Holonic Computer and Holovision", Journal of the Institute of Electronics, Information and Communication, 70(9):921-930 (1987).

Shinan et al., "The Effects of Voice Disguise.", ICASSP 86, Tokyo, CH2243-4/86/0000-0885, IEEE 1986, pp. 885-888.

Silverston et al., "Spectral Feature Classification and Spatial Pattern Rec.", SPIE 201:17-26, Optical Pattern Recognition (1979).

Simpson, W. R., C. S. Dowling, "WRAPLE: The Weighted Repair Assistance Program Learning Extension", IEEE Design & Test, 2:66-73 (April 1986).

Specht, IEEE Internatl. Conf. Neural Networks, 1:1525-1532 (July 1988), San Diego, Calif.

Sprageu, R. A., "A Review of Acousto-Optic Signal Correlators", Optical Engineering, 16(5):467-74 (September/October 1977).

Sprinzak, J.; Werman, M., "Affine point matching", Pattern Recognition Letters, 15(4):337-9(1994).

Stanley R. Sternberg, "Biomedical Image Processing", IEEE Computer, 1983, pp. 22-34.

Stewart, R. M., "Expert Systems For Mechanical Fault Diagnosis", IEEE, 1985, pp. 295-300.

Sugeno, M., "Theory of fuzzy integrals and its applications", Tokyo Institute of Technology (1974).

Svetkoff et al., Hybrid Circuits (GB), No. 13, May 1987, pp. 5-8.

Udagawa, K., et al, "A Parallel Two-Stage Decision Method for Statistical Character Recognition.", Electronics and Communications in Japan (1965).

Vander Lugt, A., "Practical Considerations for the Use of Spatial Carrier-Frequency Filters", Applied Optics, 5(11): 1760-1765 (November 1966).

Vander Lugt, A., "Signal Detection By Complex Spatial Filtering", IEEE Transactions On Information Theory, IT-10, 2:139-145 (April 1964).

Vander Lugt, A., et al., "The Use of Film Nonlinearites in Optical Spatial Filtering", Applied Optics, 9(1):215-222 (January 1970).

Vannicola et al., "Applications of Knowledge Based Systems to Surveillance", Proceedings of the 1988 IEEE National Radar Conference, 20-21 Apr. 1988, pp. 157-164.

Vitols, "Hologram Memory for Storing Digital Data", IBM Tech. Disc. Bulletin 8(11):1581-1583 (April 1966).

Wald, Sequential Analysis, Dover Publications Inc., 1947, pp. 34-43.

Wasserman, Philip D., "Neural Computing-Theory & Practice", 1989, pp. 128-129.

Willshaw et al., "Non-Holographic Associative Memory", Nature, 222:960-962 (Jun. 7, 1969).

Yager, R. R., "Entropy and specificity in a mathematical theory of Evidence", Int. J. General Systems, 9:249-260 (1983).

Yamada et. al., "Character recognition system using a neural network", Electronics Information Communications Association Bulletin PRU 88-58, pp. 79-86.

Yamane et al., "An Image Data Compression Method Using Two-Dimensional Extrapolative Prediction-Discrete Sine Transform", Oct. 29-31, 1986, pp. 311-316.

Zadeh, L. A., "Fuzzy sets as a basis for a theory of possibility", Fuzzy sets and Systems, 1:3-28 (1978).

Zadeh, L. A., "Fuzzy sets", Information and Control, 8:338-353 (1965).

Zadeh, L. A., "Probability measures of fuzzy events", Journal of Mathematical Analysis and Applications, 23:421-427 (1968).

Zhi-Yan Xie; Brady, M., "Fractal dimension image for texture segmentation", ICARCV '92. Second International Conference on Automation, Robotics and Computer Vision, p. CV-4.3/1-5 vol. 1, (1992).

Zhu, X., et al., "Feature Detector and Application to Handwritten Character Recognition", International Joint Conference on Neural Networks, Washington, D.C., January 1990, pp. 11-457 to 11-460.

The above-mentioned references are exemplary, and are not meant to be limiting in respect to the resources and/or technologies available to those skilled in the art. Of course it should be realized that the hardware for implementing a system may be integrally related to the choice of specific method or software algorithm for implementing the system, and therefore these together form a system. It is noted that in view of the present disclosure, it is within the skill of the artisan to combine in various fashions the available methods and apparatus to achieve the advanced interface and control system of the present invention.

SUMMARY AND OBJECTS OF THE INVENTION

The present invention provides, according to one embodiment, an adaptive user interface which changes in response to the context, past history and status of the system. The strategy employed preferably seeks to minimize, for an individual user at any given time, the search and acquisition time for the entry of data through the interface.

The interface may therefore provide a model of the user, which is employed in a predictive algorithm. The model parameters may be static (once created) or dynamic, and may be adaptive to the user or alterations in the use pattern.

The present invention also provides a model-based pattern recognition system, for determining the presence of an object within an image. By providing models of the objects within an image, the recognition process is relatively unaffected by perspective, and the recognition may take place in a higher dimensionality space than the transmitted media. Thus, for example, a motion image may include four degrees of freedom; x, y, chroma/luma, and time. A model of an object may include further dimensions, including z, and axes of movement. Therefore, the model allows recognition of the object in its various configurations and perspectives.

According to a particular embodiment of the invention, an image or scene, expressed as an ordered set of coefficients of an algorithm, wherein the coefficients relate to elements of defined variation in scale, and the resulting set of coefficients is related to the underlying image morphology, is exploited in order to provide a means for pattern analysis and recognition without requiring transformation to an orthogonal coordinate space (e.g., pixels). Typically, the expression of the image is compressed with loss of information.

A major theme of the present invention is the use of intelligent, adaptive pattern recognition in order to provide the operator with a small number of high probability choices, which may be complex, without the need for explicit definition of each atomic instruction comprising the desired action. The interface system predicts a desired action based on the user input, a past history of use, a context of use, and a set of predetermined or adaptive rules.

Because the present invention emphasizes adaptive pattern recognition of both the input of the user and data that may be available, the interface system proposes the extensive use of advanced signal processing and neural networks. These processing systems may be shared between the interface system and the functional system, and therefore a controller for a complex system may make use of the intrinsic processing power available rather than requiring additional computing power, although this unification is not required. In the case where the user interface employs common hardware elements, it is further preferred that the interface subsystem employ common models of the underlying data structures on which the device functionally operates.

In fact, while hardware efficiency dictates common hardware for the interface system and the operational routine, other designs may separate the interface system from the operational system, allowing portability and efficient application of a single interface system for a number of operational systems. Thus, the present invention also proposes a portable human interface system which may be used to control a number of different devices. In this case, a web browser metaphor is preferred, as it has become a standard for electronic communications.

A portable interface may, for example, take the form of a personal digital assistant or downloaded JAVA applet, with the data originating in a web server. The data from a web server or embedded web server may include a binary file, a generic HTML/XML file, or other data type. The interface receives the data and formats it based, at least in part, on parameters specific to the client or user. Thus, the presentation of data is responsive to the user, based on user preferences, as opposed to hardware limitations or compatibility issues. In a preferred embodiment, the data is transmitted separately from the presentation definition. The presentation definition, on the other hand, provides a set of parameters that propose or constrain the data presentation. The user system also provides a set of parameters that set preferences on presentation. Further, the data itself is analyzed for appropriate presentation parameters. These three sets of considerations are all inputs into a "negotiation" for an ultimate presentation scheme. Thus, the presentation is adaptive to server parameters, user parameters, and the data itself. For example, in a typical web-context, the color, size, typestyle, and layout of text may be modified based on these considerations. Other factors that may be altered include frame size and layout, size of hotspots, requirement for single or double clicks for action, and the like.

The adaptive nature of the present invention derives from an understanding that people learn most efficiently through the interactive experiences of doing, thinking, and knowing. For ease-of-use, efficiency, and lack of frustration of the user, the interface of the device should be intuitive and self explanatory, providing perceptual feedback to assist the operator in communicating with the interface, which in turn allows the operational system to receive a description of a desired operation. Another important aspect of man-machine interaction is that there is a learning curve, which dictates that devices which are especially easy to master become frustratingly elemental after continued use, while devices which have complex functionality with many options are difficult to master and may be initially rejected, or the user stops exploring. One such system which addresses this problem is U.S. Pat. No. 5,005,084, expressly incorporated herein by reference. The present invention addresses these issues by determining the most likely instructions of the operator, and presenting these as easily available choices, by analyzing the past history data and by detecting the "sophistication" of the user in performing a function, based on all information available to it. The context of use may also be a significant factor. The interface seeks to optimize the relevant portion of the interface adaptively and immediately in order to balance and optimize the interface for both quantitative and qualitative factors. This functionality may greatly enhance the quality of interaction between man and machine, allowing a higher degree of overall system sophistication to be tolerated and a greater value added than other interface designs. See, Commaford, C., "User-Responsive Software Must Anticipate Our Needs", PC Week, May 24, 1993.

The present interface system analyzes data from the user, which may be both the selections made by the user in context, as well as the efficiency by which the user achieves the selection. Thus, information concerning both the endpoints and time-dependent path of the process are considered and analyzed by the interface system.

The interface of the present invention may be advantageously applied to an operational system that has a plurality of functions, certain of which are unnecessary or are rarely used in various contexts, while others are used with greater frequency. In such systems, the functionality use is usually predictable. Therefore, the present invention provides an optimized interface system which, upon recognizing a context, dynamically reconfigures the availability or ease of availability of functions and allow various subsets to be used through "shortcuts". The interface presentation will therefore vary over time, use and the particular user.

The advantages to be gained by using an intelligent data analysis interface for facilitating user control and operation of the system are more than merely reducing the average number of selections or time to access a given function. Rather, advantages also arise from providing a means for access and availability of functions not necessarily previously existing or known to the user, therefore improving the perceived quality and usefulness of the product. Further advantages over prior interfaces accrue due to the availability of pattern recognition functionality as a part of the interface system.

In those cases where the pattern recognition functions are applied to large amounts of data or complex data sets, in order to provide a sufficient advantage and acceptable response time, powerful computational resources, such as advanced DSPs or neural network processors are made available to the interface system. On the other hand, where the data is simple or of limited scope, aspects of the technology may be easily implemented as added software functionality as improvements of existing products having limited computational resources.

The application of these technologies to multimedia systems provides a new model for performing image pattern recognition on multimedia data and for the programming of applications including such data. The ability of the interface of the present invention to perform abstractions and make decisions regarding a closeness of presented data to selection criteria makes the interface suitable for use in a programmable control, i.e., determining the existence of certain conditions and taking certain actions on the occurrence of detected events. Such advanced technologies might be especially valuable for disabled users.

In a multimedia environment, a user often wishes to perform an operation on a multimedia data event. Past systems have required explicit indexing of images and events. The present technologies, however, allow an image, diagrammatic, abstract or linguistic description of the desired event to be acquired by the interface system from the user and applied to identify or predict the multimedia event(s) desired without requiring a separate manual indexing or classification effort. These technologies may also be applied to single media data.

The interface system according to the present invention is not limited to a single data source, and may analyze data from many different sources for its operation. This data may be stored data or present in a data stream. Thus, in a multimedia system, there may be a real-time data stream, a stored event database, as well as an exemplar or model database. Further, since the device is adaptive, information relating to past experience of the interface, both with respect to exposure to data streams and user interaction, is also stored. This data analysis aspect of the operation of the present interface system may be substantially processor intensive, especially where the data includes abstract or linguistic concepts or images to be analyzed. Interfaces which do not relate to the processing of such data may be implemented on simpler hardware. On the other hand, systems which handle complex data types may necessarily include sophisticated processors, adaptable for use with the interface system, thus minimizing the additional computing power necessary in order to implement the interface according to the present invention. A portion of the data analysis may also overlap the functional analysis of the data for operation.

A fractal-based image processing system exemplifies one application of the technologies. A fractal-based system includes a database of image objects, which may be preprocessed in a manner which makes them suitable for comparison to a fractal-transformed image representation of an image to be analyzed. Thus, corresponding "fractal" transforms are performed on the unidentified image or a portion thereof and on an exemplar of a database. A degree of relatedness is determined in this "fractal transform domain", and the results used to identify objects within the image. The system then makes decisions based on the information content of the image, i.e. the objects contained therein.

The fractal-based image processing system presents many advantages. First, fractal-processed images may have dramatically reduced storage size requirements as compared to traditional methods while substantially retaining information important for image recognition. The process may be parallelized, and the exemplars may be multidimensional, further facilitating the process of identifying a two-dimensional projection of an object. The efficient storage of information allows the use of inexpensive storage media, i.e., CD-ROM, or the use of an on-line database through a serial data link, while allowing acceptable throughput. See, Zenith Starsight Telecast brochure, (1994); U.S. Pat. No. 5,353,121, expressly incorporated herein by reference.

As applied to a multimedia database storage and retrieval system, the user programs, through an adaptive user interface according to the present invention, the processing of data, by defining a criteria and the actions to be taken based on the determination of the criteria. The criteria, it is noted, need not be of a predefined type, and in fact this is a particular feature of the present invention. A pattern recognition subsystem is employed to determine the existence of selected criteria. To facilitate this process, a database of image objects may be stored as two counterparts: first, the data is stored in a compressed format optimized for normal use, such as human viewing on a video monitor, using, e.g., MPEG-2 or Joint Photographic Experts Group (JPEG) compression; second, it is stored in a preprocessed and highly compressed format adapted to be used with the pattern recognition system. Because the preprocessed data is highly compressed and used directly by the pattern recognition system, great efficiencies in storage and data transmission are achieved. The image preprocessing may include Fourier, DCT, wavelet, Gabor, fractal, or model-based approaches, or a combination thereof.

The potential significant hardware requirement for image processing and pattern recognition is counterbalanced by the enhanced functionality available by virtue of the technologies. When applied to multimedia devices, the interface system allows the operator to define complex criteria with respect to image, abstract or linguistic concepts, which would otherwise be difficult or impossible to formulate. Thus, the interface system becomes part of a computational system that would otherwise be too cumbersome for use. It is noted that, in many types of media streams, a number of "clues" are available defining the content, including close caption text, electronic program guides, simulcast data, related Internet web sites, audio tracks, image information, and the like. The latter two data types require difficult processing in order to extract a semantic content, while the former types are inherently semantic data.

A pattern recognition subsystem allows a "description" of an "event" without explicit definition of the data representing the "event". Thus, instead of requiring explicit programming, an operator may merely define parameters of the desired "event". This type of system is useful, for example, where a user seeks a generic type of data representing a variety of events. This eliminates the need for preindexing or standardized characterization of the data. The interface system therefore facilitates the formulation of a request, and then searches the database for data which corresponds to the request. Such preindexing or standardized characterization is extremely limiting with image and multimedia data, because "a picture is worth a thousand words", and without a priori knowing the ultimate search criteria, all possible criteria must be accounted for. Pattern recognition systems do not require initial translation of visual aspects into linguistic concepts, thus allowing broader searching capability. Of course, a pattern recognition system may be used in conjunction with other searching schemes, to mutual advantage.

The pattern recognition functionality of the interface system is not limited to multimedia data, and may be applied to data of almost any type, e.g., real-time sensor data, distributed control, linguistic data, etc.

It is noted that, in consumer electronics and particularly entertainment applications, the reliability of the system need not be perfect, and errors may be tolerable. On the other hand, in industrial control applications, reliability must be much higher, with fail-safe backup systems in place, as well as advanced error checking. One way to address this issue is to allow the advanced user interface to propose an action to the user, without actually implementing the action. However, in this case, the action and its proposed basis are preferably presented to the user in a sophisticated manner, to allow the basis for the action to be independently assessed by the user. Therefore, in a complex, multistep process, the user interface may be simplified by permitting a three step process: the user triggers a proposed response, analyzes the proposal and rationale, and confirms the proposal. Therefore, single step processes are inferior candidates for intelligent assistance.

Another notable aspect of the technologies is the contextual analysis. Often, multimedia data often includes a data component that closely corresponds to a format of a search criteria. Thus, while a search may seek a particular image, other portions of the datastream correlate well with the aspect of the image being searched, and may be analyzed by proxy, avoiding the need for full image analysis. The resulting preselected reduced number of images may then be fully analyzed, if necessary. Thus, especially as with respect to consumer electronics applications, where absolute accuracy may not be required, the processing power available for pattern recognition need not be sufficient for compete real-time signal analysis of all data. The present invention therefore proposes use of a variety of available data in order to achieve the desired level functionality at minimum cost.

One aspect of the present invention therefore relates to a mechanism for facilitating a user interaction with a programmable device. The interface and method of use of the present invention serves to minimize the learning and searching times, better reflect users' expectations, provide better matching to human memory limits, be usable by both novices and experienced users, reduce intimidation of novice users by the device, reduce errors and simplify the entering of programming data. The present invention optimizes the input format scheme for programming an event-driven device, and can also be applied to many types of programmable devices. Thus, certain human factors design concepts, heretofore unexploited in the design of consumer electronics devices and industrial controls, have been incorporated, and new precepts developed. Background and theory of various aspects of the present invention is disclosed in "AN IMPROVED HUMAN FACTORED INTERFACE FOR PROGRAMMABLE DEVICES: A CASE STUDY OF THE VCR", Master's Thesis, Tufts University (Master of Sciences in Engineering Design, November, 1990, publicly available January, 1991), by Linda I. Hoffberg. This thesis, and cited references, are incorporated herein by reference, and attached hereto as an appendix. Also referenced are: Hoffberg, Linda I., "Designing User Interface Guidelines For Time-Shift Programming of a Video Cassette Recorder (VCR)", Proc. of the Human Factors Soc. 35th Ann. Mtg. pp. 501-504 (1991); and Hoffberg, Linda I., "Designing a Programmable Interface for a Video Cassette Recorder (VCR) to Meet a User's Needs", Interface 91 pp. 346-351 (1991). See also, U.S. patent application Ser. No. 07/812,805, filed Dec. 23, 1991, incorporated herein by reference in its entirety, including appendices and incorporated references.

The present invention extends beyond simple predictive schemes which present exclusively a most recently executed command or most recently opened files. Thus, the possible choices are weighted in a multifactorial method, e.g., history of use, context and system status. rather than a single simple criterion alone. Known simple predictive criteria often exclude choices not previously selected, rather than weighing these choices in context with those which have been previously selected. While the system according to the present invention may include initial weightings, logical preferences or default settings, through use, the derived weightings are obtained adaptively based on an analysis of the status, history of use and context. It is noted that not all of the possible choices need be weighted, but rather merely a subset thereof.

For a given system, status, history of use and context may be interrelated factors. For example, the status of the machine is determined by the prior use, while the status also intersects context. The intended meaning of status is information relating to a path independent state of the machine at a given point in time. History of use is intended to implicate more than the mere minimum instructions or actions necessary to achieve a given state, and therefore includes information unnecessary to achieve a given state, i.e., path dependent information. Context is also related to status, but rather is differentiated in that context refers to information relating to the environment of use, e.g., the variable inputs or data upon which the apparatus acts or responds. Status, on the other hand, is a narrower concept relating more to the internal and constant functionality of the apparatus, rather than the particularities of its use during specific circumstances.

U.S. Pat. No. 5,187,797 relates to a machine interface system having hierarchical menus, with a simple (three button) input scheme. The choice(s) presented relate only to the system status, and not the particular history of use employed to obtain the system status nor the context of the choice. This system has a predetermined hierarchical menu structure, which is invariant with usage. The goal of this interface system is not to provide a learning interface, but rather to teach the user about or conform the user to the dictates of the predetermined and invariant interface of the device. While many types of programmable devices are known to exist, normally, as provided in U.S. Pat. No. 5,187,797, instructions are entered and executed in a predetermined sequence, with set branch points based on input conditions or the environment. See also U.S. Pat. Nos. 4,878,179, 5,124,908, and 5,247,433.

An aspect of the present invention provides a device having a predetermined or a generic style interface upon initial presentation to the user, with an adaptive progression in which specialized features become more easily available to a user who will likely be able to make use of them, while unused features are or remain "buried" within the interface. The interface also extracts behavioral information from the user and to alter the interface elements to optimize the efficiency of the user.

A videocassette recorder is a ubiquitous example of a programmable device, and therefore forms the basis of much of the discussion herein. It should, of course, be realized that many of the aspects of the present invention could be applied by one of ordinary skill in the art to a variety of controls having human interfaces, and that these other applications are included within the scope of the present invention.

The VCR apparatus typically involves a remote control entry device, and the interface of the present invention contains a graphical interface displayed for programming programmable devices. This aspect of the present invention seeks more accurate programming through the use of program verification to ensure that the input program is both valid and executable. Thus, it has a mechanism to store and check to verify that there are no conflicting programs. An apparatus according to the present invention can be connected, for example, to any infrared programmable device in order to simplify the programming process. By way of example only, an improved VCR interface forms the basis of a disclosed example. It is, of course, realized that the present method and apparatus may be applied to any programmable controller, i.e., any device which monitors an event or sensor and causes an event when certain conditions or parameters are met, and may also be used in other programming environments, which are not event driven. While the present interface is preferably learning and adaptive, it may also detect events and make decisions based on known or predetermined characteristics. Where a number of criteria are evaluated for making a decision, conflicts among the various criteria are resolved based on a strength of an evaluated criteria, a weighting of the criteria, an interactivity function relating the various criteria, a user preference, either explicitly or implicitly determined, and a contextual analysis. Thus, a user override or preference input may be provided to assist in resolving conflicts.

The present invention may incorporate an intelligent program recognition and characterization system, making use of any of the available cues, which allows an intelligent determination of the true nature of the broadcast and therefore is able to make a determination of whether parameters should be deemed met even with an inexact match to the specified parameters. Therefore, in contradistinction with VPV, the present invention provides, for example, intelligence. The VPV is much more like the "VCR Plus" device, known to those skilled in the art, which requires that a broadcast be associated with a predetermined code, with the predetermined code used as a criteria for initiating recording. Some problems with VCR Plus include identification of the codes which identify channel and time, post scheduling changes, incorrect VCR clock setting, and irregular schedules. VCR Plus also is limiting with respect to new technologies and cable boxes.

The videotext signal of the prior art includes a digitally encoded text message that may be displayed in conjunction with the displayed image, similar to the closed caption system. The aforementioned West German system demonstrates one way in which the transmitted signal may be received by a device and interpreted to provide useful information other than the transmitted program itself. However, the prior art does not disclose how this signal may be used to index and catalog the contents of a tape, nor does it disclose how this signal may be used to classify or interpret the character of the broadcast. In other words, in one embodiment of the present invention, the videotext or closed caption signal is not only interpreted as a literal label, as in the prior art, but is also further processed and analyzed to yield data about the content of the broadcast, other than merely an explicit identification of the simultaneously broadcast information.

Beyond or outside the visible region of an U.S. National Television Standards Committee (NTSC) broadcast video frame are a number of scan lines which are dedicated to presenting digital information, rather than analog picture information. Various known coding schemes are available for transmitting and receiving information in this non-viewing portion of the video transmission, and indeed standard exist defining the content of these information fields. Of course, various other transmission schemes provide a format for transmitting data. For example, standard frequency modulation (FM) transmissions may be associated with digital data transmissions in a subcarrier. Likewise, satellite transmissions may include digital data along with an audio data stream or within a video frame, which may be in analog format or digitally encoded.

Cable systems may transmit information either in the broadcast band or in a separate band. HDTV schemes also generally provide for the transmission of digital data of various sorts. Thus, known audio and video transmission systems may be used, with little or no modifications to provide enhanced functionality, according to the present invention. It is therefore possible to use known and available facilities for transmitting additional information relating to the broadcast information, in particular, the characteristics of the video broadcast, and doing so could provide significant advantages, used in conjunction with the interface and intelligent pattern recognition controller of the present invention. If this information were directly available, there would be a significantly reduced need for advanced image recognition functions, such advanced image recognition functions requiring costly hardware devices, while still maintaining the advantages of the present invention.

It is noted, however, that the implementation of a system in which characterization data of the broadcast is transmitted along therewith might require a new set of standards and the cooperation of broadcasters, as well as possibly the government regulatory and approval agencies. The present invention does not require, in all of its aspects, such standardization, and therefore may advantageously implement substantial data processing locally to the receiver. It is nevertheless within the scope of the invention to implement such a broadcast system with broadcast of characterization data in accordance with the present invention. Such broadcast characterization data may include characterizations as well as preprocessed data useful for characterizing according to flexible criteria in the local receiving device.

According to the present invention, if such characterizations are broadcast, they may, as stated above, be in band or out of band, e.g., making use of unused available spectrum bandwidth within the NTSC channel space, or other broadcast system channel space, or may be "simulcast" on a separate channel, such as an FM sideband or separate transmission channel. Use of a separate channel would allow a separate organization, other than the network broadcasters, to provide the characterization data for distribution to users of devices that make use of the present intelligent system for controlling a VCR or other broadcast information processing device. Thus, the characterization generating means need not be directly linked to the local user machine in order to fall within the scope of the present invention. The present invention also provides a mechanism for copyright holders or other proprietary interests to be protected, by limiting access to information be encryption or selective encryption, and providing an accounting system for determining and tracking license or broadcast fees.

Research has been performed relating to VCR usability, technology, implementation, programming steps, current technology, input devices, and human mental capacity. This research has resulted in a new paradigm for the entry of programming data into a sequential program execution device, such as a VCR, by casual users.

Four major problems in the interfaces of VCRs were found to exist. The first is that users spend far too much time searching for necessary information, which is necessary in order to complete the programming process. Second, many people do not program the VCR to record at a later time (time-shift) frequently, and thus forget the programming steps in the interim, i.e., the inter-session decay of the learning curve is significant. Third, the number of buttons on many remote control devices has become overwhelming. Fourth, people have become reluctant to operate or program VCRs because of their difficult operation. It was found that, by minimizing the learning and searching times, the user's programming time and frustration level can be greatly reduced. If VCRs are easier to program, users might program them more frequently. This would allow more efficiency and flexibility in broadcast scheduling, especially late night for time shift viewing. The present invention therefore provides an enhanced VCR programming interface having a simplified information structure, an intuitive operational structure, simplified control layout and enhanced automated functionality.

A new class of consumer device has been proposed, which replaces the videotape of a traditional videotape recorder with a random-access storage device, such as a magnetic hard disk drive. Multimedia data is converted through a codec (if necessary), and stored in digital form. Such systems are proposed by Tivo, Inc., Philips Electronics (Personal TV), Replay Networks, Inc. and Metabyte. Inc. Some of these systems employ a user preference based programming/recording method similar to that of the present invention.

In these systems, typically a content descriptive data stream formulated by human editors accompanies the broadcast or is available for processing and analysis. Based on a relation of the user preferences, which may be implied by actual viewing habits or input through simple accept/veto user feedback, selected media events may be recorded. However, such systems rely on a correspondence between the factors of interest to users and those encoded in the data stream, e.g., a "program guide". This is not always the case. However, where the available data describing the program maps reasonably well into the user preference space, such a system may achieve acceptable levels of performance, or stated otherwise, the program material selected by the system will be considered acceptable.

One particular aspect of these time-shifting consumer media recording devices is how they deal with advertising materials that accompany program material. In many instances, the user seeks to avoid "commercials", and the device may be programmed to oblige. However, as such devices gain wider acceptance, advertisers will be reluctant to subsidize broadcasts. Therefore, an advertising system may be integrated into the playback device that seeks to optimize the commercial messages presented to a viewer. By optimizing the messages or advertisements, the viewer is more receptive to the message, and economic implications ensue. For example, a viewer may be compensated, directly or indirectly, for viewing the commercials, which may be closely monitored and audited, such as by taking pictures of the audience in front of a "set-top box". The acquired data, including viewer preferences, may be transmitted back to commercial sponsors, allowing detailed demographic analysis.

In order to ensure privacy, the preference information and/or images may be analyzed by a proxy, with the raw data separated from the commercial users of such data. Thus, for example, the particular users of a system may register their biometric characteristics, e.g., face. Thereafter, the imager captures facial images and correlates these with its internal database. The image itself therefore need not be stored or transmitted. Viewer preferences and habits, on the other hand, likely must be transmitted to a central processing system for analysis.

Because the system is intelligent, copy protection and royalty accounting schemes may readily be implemented. Thus, broadcasters and content providers may encode broadcasts in such a way as to control the operation of the consumer device. For example, an IEEE-1394-type encryption key support (e.g., DTCP or XCA)/copy protection or DIVX scheme may be implemented. Further, certain commercial sponsors may be able to avoid deletion of their advertisement, while others may allow truncation. The acceptability of this to the consumer may depend on subsidies. In other words, a company is willing to pay for advertising. Instead of paying for placements directly to the media, a portion is paid to a service provider, based on consumer viewing. The media, on the other hand, may seek to adopt a pay-per-view policy, at least with respect to the service provider, in lieu of direct advertising revenues. The service provider will account to both advertisers and content providers for use. With sufficient viewing of commercials, the entire service charge for a system might be covered for a user. On the other hand, a viewer might prefer to avoid all commercials, and not get the benefit of a subsidy. The service provider performs the economically efficient function of delivering optimized, substituted commercials for the almost random commercials which flood the commercial broadcast networks, and thus can accrue greater profits, even after paying content providers a reasonable fee. An advertiser, by selecting a particular audience, may pay less than it would otherwise pay to a broadcaster. The content providers may also charge more for the privilege of use of their works.

As stated above, the content may be copy protected by the use of encryption and/or lockout mechanisms. Thus, by providing an alternative to an analog VCR, a full end-to-end encrypted signal may be provided, such as that proposed for the IEEE-1394 copy protection scheme. Because enhanced recording capabilities are provided to the consumer, the acceptance will be high. Because of the encryption, lack of portability and continued royalty accounting, content provider acceptance will also likely be high.

IEEE 1394 provides for Digital Content Protection. See, Bill Pearson "1394 Digital Content Protection, *Multimedia Systems Design*, (November/98). Techniques such as encryption and authentication/key exchange maintain content quality without degradation while preventing unauthorized copying. The IEEE 1394 content protection system provides four elements of digital content protection: Copy control information (CCI); Authentication and key exchange (AKE); Content encryption; and System renewability.

In an IEEE 1394 system, there are source devices and sink devices. The source device transmits a copy protection system stream of content. A source device is one that can send a stream of content and a sink device is one that can receive a stream of content. Multifunction devices such as PCs and record/playback devices such as digital VCRs can be both source and sink devices. The following is a step-by-step description of the interaction source and sink devices: The source device initiates the transmission of a stream of content marked with the appropriate copy protection status (e.g., "copy once," "copy never," or "no more copies") via the EMI bits. Upon receiving the content stream, the sink device inspects the EMI bits to determine the copy protection status of the content. If the content is marked "copy never," the sink device requests that the source device initiate full AKE. If the content is marked "copy once" or "no more copies," the sink device will request full AKE if it is supported. or restricted AKE if it isn't. If the sink device has already performed the appropriate authentication, it can then proceed. When the source device receives the authentication request, it proceeds with the type of authentication requested by the sink device, unless full AKE is requested but the source device can only support restricted AKE, in which case restricted AKE is performed. Once the devices have completed the required AKE procedure, a content-channel encryption key (content key) can be exchanged between them. This key is used to encrypt the content at the source device and decrypt the content at the sink.

The first element in the content protection scheme is the copy control information (CCI). CCI is a way for content owners to specify how their content can be used. Some examples are "copy never," "copy once," "no more copies," and "copy free." The content protection system is capable of securely communicating copy control information between devices. Two different CCI mechanisms are supported and are discussed below. In the event that conflicting copy protection requirements are specified by the different mechanisms, sink devices should follow the most restrictive CCI available. Embedded CCI is carried as part of the content stream. Many content formats (including MPEG) have fields allocated for carrying the CCI associated with the stream. The integrity of the embedded CCI is ensured since tampering with the content stream results in erroneous decryption of the content.

The encryption mode indicator (EMI) provides easily accessible yet secure transmission of CCI to bit stream recording devices (such as digital VCRs) that know nothing beyond the content. The EMI is placed in an easily accessible location. For 1394 buses, this location is the most significant two bits of the synch field of the isochronous packet header. Devices can then immediately determine the CCI of the content stream without needing to decode the content transport format to extract the embedded CCI. This ability is critical for enabling bit stream recording devices that do not recognize and cannot decode specific content formats. If the EMI bits are tampered with, the encryption and decryption modes will not match, resulting in erroneous decryption of the content.

The proposed system is based on robust and accepted cryptographic techniques that have evolved over the past 20 years to serve critical military, governmental, and commercial applications. These techniques have been thoroughly evaluated by hackers and by legitimate cryptography experts, and have proven their ability to withstand attack. The robustness and cryptographic stability of the system are derived from the proven strength of the underlying technologies, rather than merely how well a certain algorithm can be kept secret.

Before sharing valuable information, a connected device must first verify that another connected device is authentic. In an effort to balance the protection requirements of the film and recording industries with the real-world requirements of PC and CE users, the proposal includes a choice of two authentication levels, full and restricted. Full authentication can be used with all content protected by the system. Restricted authentication enables the protection of "copy-once" content only.

The full authentication system employs the public key-based Digital Signature Standard (Dss) and Diffie-Hellman key exchange algorithms. Dss is a method for digitally signing and verifying the signatures of digital documents to verify the integrity of the data. Both the Dss and Diffie-Hellman implementations for the proposed system employ elliptic curve cryptography. This technique offers superior performance compared to systems based on calculating discrete logarithms in a finite field.

The next element of content protection is known as authentication and key exchange (AKE). Before sharing valuable information, a connected device must first verify that another connected device is authentic. To balance the protection requirements of the content industries and the real-world requirements of PC and CE users, the specification includes a choice of two authentication levels: full and restricted. Full authentication can be used with all content protected by the system. Restricted authentication enables the protection of "copy once" content only.

All compliant devices must be assigned a unique public/private key pair that is generated by the DTLA. The private key must be stored within the device in such a way as to prevent its disclosure. The preferred method of storing the key would be to use a highly integrated device, such as a microcontroller with built-in EPROM. Compliant devices must also be given a device certificate by the DTLA. This certificate is stored in the compliant device and used during the authentication process. In addition, the compliant device will need to store the other constants and keys necessary to implement the cryptographic protocols. Full authentication uses the public key-based digital signature standard (DSS) and Diffie-Hellman (DH) key-exchange algorithms. DSS is a method for digitally signing and verifying the signatures of digital documents to verify the integrity of the data. DH key exchange is used during full authentication to establish control-channel symmetric cipher keys, which allows two or more parties to generate a shared key. Developed more than 20 years ago, the algorithm is considered secure when it is combined with digital signatures to prevent a so-called "man-in-the-middle" attack. A man-in-the-middle attack is when one person places himself between two others who are communicating. He can imitate either of the participants, modify and delete messages, or generate new ones entirely. A shared key helps prevent this type of attack because each message contains a digital signature signed with the private key of the source. The receiver of the message can easily verify that the message came from the intended source.

The full authentication protocol begins when the sink device initiates the authentication protocol by sending a request to the source device. The first step of the full authentication procedure is for the devices to exchange device certificates. Next, they exchange random challenges. Then each device calculates a DH key-exchange first-phase value. The devices then exchange signed messages that contain the following elements: The other device's random challenge; and The DH key-exchange first-phase value; The renewability message version number of the newest system renewability message (SRM) stored by the device. The devices process the messages they receive by first checking the message signature using the other device's public key to verify that the message has not been tampered with. The device also verifies the integrity of the other device's certificate. If these signatures cannot be verified, the device refuses to continue. Each device also examines the certificate revocation list embedded in its SRM to verify that the other device's certificate has not been revoked. In addition, by comparing the exchanged renewability version numbers, devices can invoke the SRM upgrade mechanisms at a later time. If no errors have occurred during the authentication process, the two devices have successfully authenticated each other and established an authorization key.

System renewability messages are not particularly used to disable source devices, but rather sink devices. For example, if a person manages to get a hold of a device ID for a digital television, and then modifies a digital VCR to have the device ID of his digital television. Then, when any device is talking with the modified digital VCR, it will think it is talking to a digital TV and will send data to the device, allowing a person to copy protected content. This is detected when a pirate device is discovered. Once one of these pirate devices is detected, they can all easily be disabled because they all share the same device ID. Once the device ID has been disabled, the SRM will propagate itself to other devices. Then, no legitimate device will allow protected content to be sent to the pirate device. The memory required for this function is limited to insure that it is reasonable to implement in low-cost consumer devices.

Restricted authentication is used between source devices and sink devices for the exchange of "copy once" and "copy no more" contents. Devices that only support "copy once" and "copy no more" content such as digital VCRs typically have limited computational resources. Restricted authentication relies on the use of a shared secret and hash functions to respond to a random challenge. It is based on a device being able to prove that it holds a secret shared with other devices. One device authenticates another by issuing a random challenge that is responded to by modifying it with the shared secret and multiple hashings. The restricted authentication protocol begins when the sink device initiates the authentication protocol by sending a request to the source device. The source device then requests the device ID of the sink device. After receiving the device ID, the source device generates a random challenge and sends it to the sink device. After receiving a random challenge back from the source device, the sink device computes a response using its license key (assigned by the DTLA and a function of the device ID and service key) and sends it to the source. After the sink device returns a response, the source device compares this response with similar information generated at the source side using its service key and the ID of the sink device. If the comparison matches its own calculation, the sink device has been verified and authenticated. The source and sink devices then each calculate an authorization key.

The following steps are common to both full and restricted authentication. The source device generates a random number for an exchange key, scrambles it using its calculated authorization key, and sends it to the sink device. The sink device then descrambles the exchange key using its own calculation of the authorization key. This exchange key can be repeatedly used to set up and manage the security of copyrighted content streams without further authentication.

The cipher used to encrypt the content must be robust enough to protect the content, yet efficient enough to implement on a variety of platforms. To ensure interoperability, all compliant devices must support the baseline cipher and possibly additional, optional ciphers for protecting the content. Ciphers can be used in the converted-cipher block-chaining mode. Cipher block-chaining is a technique that adds feedback into the input of the cipher. Converted-cipher block-chaining provides greater security than ordinary cipher block-chaining by using secretly converted ciphertext (ciphertext is the output of a cipher—plaintext in, ciphertext out) as feedback rather than known ciphertext on a public channel. Therefore, known-plaintext attacks and key-exhaustive searches become more difficult.

The M6 cipher is tentatively selected as the baseline cipher while DES, Blowfish, and others can be used as optional ciphers. The M6 cipher is a common-key block-cipher algorithm based on permutation-substitution. It is a rotation-based algorithm like Hitachi's MULTI2 encryption algorithm currently used as an encryption standard for a Japanese digital satellite broadcasting system. The M6 cipher is simpler than MULTI2 and uses the same type of algorithm seen in hash functions MD5 and SHA-1 that have shown their ability to withstand cryptographic attack.

Devices that support full authentication can receive and process SRMs that are created by the DTLA and distributed with content. System renewability is used to ensure the long-term system integrity by revoking the device IDs of compromised devices. SRMs can be updated from other compliant devices that have a newer list, from media with prerecorded content, or via compliant devices with external communication capability (i.e., over the Internet. phone lines, cable system, or network). There are several components of an SRM. Some of the most important are: A monotonically increasing system renewability version number is used to ensure that only the newest message is used, and is essentially a counter that increases but never decreases. A certificate revocation list (CRL) is used to revoke the certificates of devices whose security has been compromised. Some devices may have limited nonvolatile memory available to store the CRL and thus may only support a subset of the list. Therefore, the entries in the CRL should be ordered according to their perceived threat to content. This will ensure that entries for devices that are the greatest threat to content can be stored by compliant devices that support certificate revocation, but only have limited storage space for SRMs. A DTLA signature (a value calculated using the DTLA private key) of these components, which is used to ensure the integrity of the SRM.

The version number of a new SRM is examined. If the message is newer than the current information, the system verifies the integrity of the message. If the message is valid and intact, then the system updates its information. The system may revoke a device authorization, based on the SRM. First, the set-top box (STB) receives updated SRM with a particular device ID on its CRL. The STB then passes the SRM to the digital TV (DTV) when the next cable movie is watched. The DTV passes the SRM on to the DVD player when the next DVD movie is watched. Once all devices in the current environment have received the SRM, that device ID is fully revoked.

The user interface concepts according to the present invention are easily applied to other special purpose programmable devices, and also to general-purpose programmable devices wherein the programming paradigm is event-driven, as well as other programming systems. It should also be noted that it is within the scope of the present invention to provide an improved interface and programming environment for all types of programmable devices, and in this regard, the present invention incorporates adaptive features that optimize the programming environment for both the level of the user and the task to be programmed.

In optimizing the interface, four elements are particularly important: the input device, the display format, the sequence of the programming operation, and the ability of the device to properly interpret the input as the desired program sequence.

The present invention proceeds from an understanding that an absence of user frustration with respect to a programmable consumer or industrial device or interface, may be particularly important with respect to achieving the maximum potential functionality thereof. The interface must be designed to minimize the user's frustration level. This can be accomplished by clearly furnishing the possible choices, presenting the data in a logical sequence, and leading the user through the steps necessary to program the device.

When applied to other than audiovisual and/or multimedia application, the pattern recognition function may be used to control the execution of a program or selectively control execution of portions of the software. For example, in a programmable temperature controller application, a sensor or sensor array could be arranged to detect a "door opening". On the occurrence of the door opening, the system would recognize this pattern, i.e. a mass of air at a different temperature entering the environment from a single location, or a loss of climate controlled air through a single location. In either event, the system would take appropriate action, including: halt of normal climate control and impose a delay until the door is closed; after closure, set a time constant for maintenance of a steady state of the replaced air with the climate controlled air; based on the actual climatic condition after assimilation, or a predicted climatic condition after assimilation, begin a climate compensation control; optionally, during the door opening, control a pressure or flow of air to counterbalance the normal flow through the door, by using a fan or other device. The climate may differ in temperature, humidity, pollutants, or the like, and appropriate sensors may be employed.

The present invention also allows a dynamic user preference profile determination based on explicit or implicit desires, e.g., moods, which assist in processing data to make decisions which conform to the user preference at a given point in time. For example, voice patterns, skin temperature, heat pulse rate, external context, skin resistance (galvanic skin response), blood pressure, stress, as determined by EMG, EEG or other known methods, spontaneous motor activity or twitching, may be detected in order to determine or infer a user mood, which may be used as a dynamic influence on the user preference. These dynamic influences are preferably stored separately from static influences of the preferences, so that a resultant determined preference includes a dynamic influence based on a determined mood or other temporally varying factor and a static influence associated with the user.

When a group of people are using the system simultaneously, the system must make a determination of a composite preference of the group. In this case, the preferences of the individuals of the group, if known, may be correlated to produce an acceptable compromise. Where individual preferences are not a priori known, individual or group "interviews" may be initially conducted to assist in determining the best composite group preference.

It is therefore an object according to the present invention to provide a radio receiver or video receiver device, having a plurality of different available program sources, determining a program preference for one or more individuals subject to a presented program, comparing the determined program preference and a plurality of different program sources, and selects at least one program based on the comparison.

In formulating a group preference, individual dislikes may be weighted more heavily than likes, so that the resulting selection is tolerable by all and preferable to most group members. Thus, instead of a best match to a single preference profile for a single user, a group system provides a most acceptable match for the group. It is noted that this method is preferably used in groups of limited size, where individual preference profiles may be obtained, in circumstances where the group will interact with the device a number of times, and where the subject source program material is the subject of preferences. Where large groups are present, demographic profiles may be employed, rather than individual preferences. Where the device is used a small number of times by the group or members thereof, the training time may be very significant and weigh against automation of selection. Where the source material has little variety, or is not the subject of strong preferences, the predictive power of the device as to a desired selection is limited.

The present invention provides a system and method for making use of the available broadcast media forms for improving an efficiency of matching commercial information to the desires and interests of a recipient, improving a cost effectiveness for advertisers, improving a perceived quality of commercial information received by recipients and increasing profits and reducing required information transmittal by publishers and media distribution entities.

This improved advertising efficiency is accomplished by providing a system for collating a constant or underlying published content work with a varying, demographically or otherwise optimized commercial information content. This commercial information content therefore need not be predetermined or even known to the publisher of the underlying works, and in fact may be determined on an individual receiver basis. It is also possible to integrate the demographically optimized information within the content. For example, overlays in traditional media, and electronic substitutions or edits in new media, may allow seamless integration. The content alteration need not be only based on commercial information, and therefore the content may vary based on the user or recipient.

U.S. Pat. No. 5,469,206, expressly incorporated herein by reference, relates to a system that automatically correlates user preferences with electronic shopping information to create a customized database for the user.

Therefore, the granularity of demographic marketing may be very fine, on a receiver-by-receiver basis. Further, the accounting for advertisers will be more accurate, with a large sample and high quality information. In fact, in a further embodiment, an interactive medium may be used allowing immediate or real time communication between recipient and advertiser. This communication may involve the Internet, private networks or dial-up connections. Because the commercial messages are particularly directed to recipients, communication with each selected recipient is more valuable to an advertiser and that advertiser is willing to pay more for communication with each selected recipient. Recipients may therefore be selected to receive the highest valued appropriate commercial message(s). Thus, advertisers will tend to pay less and media producers will gain more revenues. Recipients will gain the benefit of selected and appropriate media, and further, may provide feedback for determining their preferences, which will likely correspond with their purchasing habits. Thus, the recipient will benefit by receiving optimized information.

Likewise, a recipient may place a value on receiving certain information, which forms the basis for "pay-per-view" systems. In this case, the recipient's values may also be considered in defining the programming.

This optimization is achieved by providing a device local to the recipient which selectively presents commercial information to the recipient based on characteristics individual to the recipient, which may be input by the recipient, the publisher, the advertiser, and/or learned by the system based on explicit or implicit feedback. The local device either has a local memory for advertising materials, or a telereception link for receiving commercial information for presentation, either on a real time basis or stored for later presentation. In a further embodiment, a user may control the content and/or commercial information received. In this case, the accounting system involves the user's account, and, for example, the recipient may be denied the subsidy from the commercial advertiser, and pay for the privilege of commercial free content.

It is also possible to employ the methods and systems according to the present invention to create a customized publication, which may be delivered physically to the recipient, for example as print media, facsimile transmission, e-mail, R-CD-ROM, floppy disk, or the like, without having a device local to the consumer.

It is noted that this system and method is usable for both real time media, such as television, radio and on-line telecommunication, as well as manually distributed periodicals, such as newspapers, magazines, CD-ROMs, diskettes, etc. Therefore, the system and method according to the present invention includes a set of related systems with varying details of implementation, with the underlying characteristic of optimization of variable material presentation at the recipient level rather than the publisher level.

The system and method according to the present invention preferably includes an accounting system which communicates information relating to receipt of commercial advertising information by a recipient to a central system for determination of actual receipt of information. This feedback system allows verification of receipt and reduces the possibility of fraud or demographic inaccuracies.

The accounting system, for example, may place value on the timeslot, associated content, the demographics of the user, user's associated valuation, competition for placement, past history (number of impressions made to same recipient) and exclusivity.

A preferred embodiment includes a subscription television system having a plurality of received channels. At least one of these channels is associated with codes to allow determination of content from variable segments. It is also possible to identify these variable segments without these codes, although the preferred system includes use of such codes. These codes also allow simple identification of the content for accounting purposes. Upon detection of a variable segment, a commercial advertisement is selected for presentation to the recipient. This variable segment is selected based on the characteristics of the recipient(s), the history of use of the device by the recipient(s), the context of use, the arrangements made by the commercial information provider(s) for presentation of information, and the availability of information for presentation. Other factors may include the above-mentioned accounting system factors. Typically, the local device will include a store of commercial information, downloaded or otherwise transmitted to the recipient (e.g., a CD-ROM or DVD with MPEG-2 compressed images). A telecommunication link may also be provided to control the process, provide parameters for the presentation or the information itself. This telecommunication link may be provided through the public telephone network, Internet, private network (real or virtual) cable network, or a wireless network, for example. Generally, the underlying work will have a gap of fixed length, so that the commercial information must be selected to fit in this gap. Where the gap is of variable length, such as might occur in live coverage, the commercial information is interrupted or the underlying work buffered and delayed to prevent loss. Thus, the presentation to the user is constructed from pieces, typically at the time of presentation, and may include invariable content, variable content, invariable messages, variable messages, targeted content and/or messages, and hypervariable content. Hypervariable content includes, for example, transition material selected based on the stream of information present, and other presentations which my optionally include useful information which are individualized for the particular recipient or situation.

According to another embodiment, a recording, such as on a videotape, is retained by a recipient which includes proprietary content. This may include a commercial broadcast, a private broadcast, or distributed media. In the case of a commercial broadcast, some or all of the commercial advertising or other time-sensitive information is old and/or stale. Therefore, in operation, this old or time sensitive information is eliminated and substituted with new and/or different information. Thus, the presentation system freshens the presentation, editing and substituting where necessary.

By such a method, content distributed even through private channels may include advertisements, and thus be subsidized by advertisers. The advertisements and other added content are generally more acceptable to the audience because they are appropriately targeted.

For example, where the broadcaster has a high degree of control over the initial broadcast, e.g., pay per view under license, or where the broadcaster may claim substantial continuing rights in the work after recording, the enforcement of a proprietary replay system may be accepted. For example, a work is broadcast as an encrypted digital data stream, with selective decryption at the recipient's receiver, under license from the broadcaster. In this case, a recording system is provided which retains the encryption characteristics, ensuring the integrity of the accounting process. During presentation of the recorded work, commercial information is appropriately presented to the recipient during existing or created gaps, or in an associated output separate from the content presentation. The recipient, as a result, receives the benefit of the original subsidy, or may receive a new subsidy.

Therefore, similar to the known DIVX system, an encrypted media may be mass distributed, which requires authorization for display. Instead, however, of requiring the recipient to pay for the initial and subsequent displays of the content, the player integrates advertising content into the output, which may vary based on the audience, time and past history, as well as other factors discussed herein. Given the interactive and variable nature of the presentation, the user or audience may even veto ("fast forward through") a particular commercial. In this case, the use may have to account for a fee, or other advertisers may tack up the slack. The veto provides information regarding the desires of the viewer, and may be used to help select future messages to the displayed or presented.

According to another embodiment, a radio transmission/ reception system is provided which broadcasts content, an overlay track and variable commercial information. The invariant works are preferably prerecorded music. The overlay track is preferably a "DJ", who provides information regarding the invariant works, commercial information or news. The commercial information in this instance therefore refers to prerecorded segments. In this instance, the goal is to allow the invariant works to be received by the recipient and presented with improved optimization of the commercial information content and other messages presented at the time of output. Further, this system allows optimization of the presentation of the invariant portions as well, i.e., the commercial information and the program content may be independently selected at the receiver, with appropriate accounting for commercial subsidy. In a mobile receiver, it is preferable to include as a factor in the selection of commercial information a location of the receiver, as might be obtained from a GPS system, cellular location system, intelligent highway system or the like. This would allow geographically appropriate selection of commercial information, and possibly overlay information as well, e.g., traffic reports.

Another embodiment according to the present invention provides a hypertext linked media or multimedia environment, such as HTML/World Wide Web, wherein information transmitted and/or displayed is adaptively selected based on the particular user or the user's receiving system. Thus, various elements may be dynamically substituted during use.

Therefore, it is an object according to the present invention to provide adaptive man-machine interfaces, especially computer graphic user interfaces, which are ergonomically improved to provide an optimized environment. Productivity of computer operators is limited by the time necessary to communicate a desired action through the user interface to the device. To reduce this limitation, most likely user actions are predicted and presented as easily available options. The technologies also extend beyond this core theme in many differing ways, depending on the particular application.

The system also provides an intelligent, adaptive pattern recognition function in order to provide the operator with a small number of high probability choices, which may be complex, without the need for explicit definition of each atomic instruction comprising the desired action. The interface system predicts a desired action based on the user input, a past history of use, and a context of use.

In yet another embodiment, a present mood of a user is determined, either explicitly or implicitly, and the device selects program material that assists in a desired mood transition. The operation of the device may additionally acquire data relating to an individual and the respective moods, desires and characteristics, altering the path provided to alter the mood based on the data relating to the individual. As stated above, in a group setting, a most acceptable path is presented rather than a most desirable path as presented for an individual.

In determining mood, a number of physiologic parameters may be detected. In a training circumstance, these set of parameters are correlated with a temporally associated preference. Thus, when a user inputs a preference into the system as feedback, mood data is also obtained. Invariant preferences may be separated, and analyzed globally, without regard for temporal variations, while varying preferences are linked with information regarding the surrounding circumstances and stored. For example, the preference data may be used to train a neural network, e.g., using back-propagation of errors or other known methods. The inputs to the neural network include available data about surrounding context, such as time, environmental brightness, and persons present; source program choices, which may be raw data, preprocessed data, and abstracted data; explicit user input: and, in this embodiment, mood parameters, which may be physiological or biometric data, voice pattern, or implicit inputs. An example of an implicit input is an observation of a man-machine interaction, such as a video game. The manner in which a person plays a video game or otherwise interacts with a machine may provide valuable data for determining a mood or preference.

According to one embodiment of the invention, the image is preprocessed to decompose the image into object-elements, with various object-elements undergoing separate further processing. For example, certain backgrounds may be aesthetically modeled using simple fractal equations. While, in such circumstances the results may be inaccurate in an absolute sense, they may be adequate in a performance sense. Faces, on the other hand, have common and variable elements. Therefore, a facial model may be based on parameters having distinguishing power, such as width between eyes, mouth, shape of ears, and other proportions and dimensions. Thus, along with color and other data, a facial image may be stored as a reference to a facial model with the distinguishing parameters for reconstruction. Such a data processing scheme may produce a superior reconstructed image and allow for later recognition of the face, based on the stored parameters in reference to the model. Likewise, many different elements of an image may be extracted and processed in accordance with specific models to produce differentiating parameters, wherein the data is stored as a reference to the particular model along with the particular data set derived from the image. Such a processing scheme allows efficient image storage along with ease of object recognition, i.e., distinction between objects of the same class. This preprocessing provides a highly asymmetric scheme, with a far greater processing complexity to initially process the image than to subsequently reconstruct or otherwise later employ the data.

By employing a model-based object extraction system, the available bandwidth may be efficiently used, so that objects which fall within the scope of an available model may be identified with a model identification and a series of parameters, and objects not within the scope of a model may be allocated a comparatively greater bandwidth for general image description, e.g., JPEG, MPEG-1/MPEG-2, wavelet, standard fractal image compression (FIC), or other image processing schemes. In a worst case, therefore, the bandwidth required will be only slightly greater than that required for a corresponding standard method, due only to the additional overhead to define data types, as necessary. However, by employing a model based-object decomposition processing system, recognized elements may be described using only a small amount of data and a greater proportion of data used to describe unrecognized elements. Further, the models available may be dynamically updated, so that, as between a communicating transmitted and receiver, retransmission of unrecognized elements will be eliminated as a model is constructed.

Where image processing systems may produce artifacts and errors, an error minimization function may also be provided which compares an original image with a decomposed-recomposed image and produces an error function which allows correction for these errors. This error function may be transmitted with the processed data to allow more faithful reproduction. In a pattern recognition context, the error function may provide useful data relating to the reliability of a pattern correlation, or may provide useful data outside of the model and associated parameters for pattern recognition.

Thus, in the case of an object-extraction model-based processing system, the resulting data stream may be appropriate for both viewing and recognition. Of course, acoustic data may be likewise processed using acoustic models with variable parameters. However, in such a system, information for pattern recognition may be filtered, such as eliminating the error function or noise data. Further, certain types of objects may be ignored, for example, under normal circumstances, clouds in the sky provide little information for pattern recognition and may be removed. In such a system, data intended for viewing or listening will likely contain all objects in the original data stream, with as much original detail as possible given data storage and bandwidth constraints.

An object extraction model based processing system also allows for increased noise rejection, such as over terrestrial broadcast channels. By transmitting a model, the receiving system may interpolate or extrapolate data to fill in for missing data. By extrapolate, it is meant that past data is processed to predict a subsequent condition. By interpolate, it is meant that data presentation is delayed, and missing data may therefore be predicted from both past and subsequent data transmission. Missing portions of images may also be reconstructed from existing portions. This reconstruction process is similar to that described in U.S. Pat. No. 5,247,363, to reconstruct MPEG images; except that where model data is corrupted, the corruption must be identified and the corrupt data eliminated and replaced with predicted data.

It is therefore an object according to the present invention to provide a programmable control, having a status, responsive to an user input and a signal received from a signal source, comprising a controller, for receiving the user input and the signal and producing a control output; a memory for storing data relating to an activity of the user; a data processing system for adaptively predicting a most probable intended action of the user based on the stored data relating to the activity of the user and derived weighing of at least a subset of possible choices, the derivation being based on a history of use, a context of a respective choice and the status of the control; and a user feedback data presenting system comprising an output device for presentation of a variable sequence of programming options to the user, including the most probable intended action of the user, in a plurality of output messages. the output messages differing in available programming options.

The programmable control may be employed for performing an action based on user input and an information content of a signal received from a signal source, wherein the output device includes a display device, further comprising a user controlled direct manipulation-type input device, associated with the display device, having a device output, the device output being the user input; a plant capable of performing the action, being responsive to an actuator signal; and the controller, being for receiving data from the device output of the input device and the signal, and displaying user feedback data on the display device, the logical sequence of the user feedback data including at least one sequence of options sufficient to define an operable control program, and a presentation of additional programming options if the control program is not operable.

The programmable control may further comprise a user input processing system for adaptively determining a viewer preference based on the user input received by the controller: a program material processing system for characterizing the program material based on its content: a correlator for correlating the characterized content of the program material with the determined viewer preference to produce a correlation index; and a processor, selectively processing the program material based on the correlation index, the data processing system receiving an input from the processor.

It is noted that a metadata stream associated with the content may be employed to characterize the content, relieving the receiver or client device from the need for characterizing the content. This metadata may be structured or unstructured. The metadata and data relating to the use or consumption of the content is then used to determine or update the user profile. It is noted that the content may be of any type, and therefore need no be video or multimedia. In the case of a structured metadata, the updating of the user profile may include a simple time-weighted decay (e.g., a simple infinite impulse response filter with exponential decay or diurnal variations, or other type) for correlation with future metadata records, or a more complex algorithm.

The programmable control may also comprise a plurality of stored profiles, a processor for characterizing the user input to produce a characterized user input; and means for comparing the characterized user input with at least one of the plurality of stored profiles to produce a comparison index, wherein the variable sequence of programming options is determined on the basis of the comparison index. The processor for characterizing may perform an algorithm on the signal comprising a transform selected from the group consisting of an Affine transformation, a Fourier transformation, a discrete cosine transformation and a wavelet transformation.

It is a further object according to the present invention to provide a programmable controller for controlling a recording device for recording an analog signal sequentially on a recording medium having a plurality of uniquely identifiable storage locations, further comprising a sequential recording device for recording the analog signal, and a memory for storing, in a directory location on the recording medium which is separate from the storage location of the analog signal, information relating to the signal, processed to selectively retain characterizing information, and an identifier of a storage location on the recording medium in which the analog signal is recorded.

It is another object according to the present invention to provide a control, wherein program material is encrypted, further comprising a decryption system for decrypting the program material if it is selected to produce unencrypted program material and optionally an associated decryption event; a memory for storing data relating to the occurrence of the decryption event; and a central database for storing data relating to the occurrence of the decryption event in association with data relating to the viewer.

It is still another object according to the present invention to provide a control wherein the user input processing system monitors a pattern of user activity and predicts a viewer preference; the program material processing system comprising a processor for preprocessing the program material to produce a reduced data flow information signal substantially retaining information relating to the abstract information content of the program material and selectively eliminating data not relating to the abstract information content of the program material and for characterizing the information signal based on the abstract information content; and a comparing system for determining if the correlation index is indicative of a probable high correlation between the characterization of the information signal and the viewer preference and causing the stored program material to be processed by the processing means based on the determination. The system according to this aspect of the present invention preferably comprises an image program material storage and retrieval system.

The present invention further provides a control further comprising a memory for storing a characterization of the program material; an input for receiving a feedback signal from the viewer indicating a degree of agreement with the correlation index determination, wherein the feedback signal and the stored characterization are used by the viewer preference predicting means to predict a new viewer preference.

According to another aspect of the invention, it is an object to provide an image information retrieval apparatus, comprising a memory for storing compressed data representing a plurality of images; a data storage system for retrieving compressed data representing at least one of the plurality of images and having an output; a memory for storing characterization data representing a plurality of image types, having an output; and an image processor, receiving as inputs the outputs from the data storage system and the characterization data memory, and producing a signal corresponding to a relation between at least one of the plurality of images of the compressed data and at least one of the image types of the characterization data.

It is a still further aspect of the present invention to provide a video interface device for a user comprising a data transmission system for simultaneously transmitting data representing a plurality of programs; a selector for selecting at least one of the plurality of programs, being responsive to an input; a program database containing information relating to the plurality of programs, having an output; a graphical user interface for defining commands, comprising (a) an image display device having at least two dimensions of display, being for providing visual image feedback; and (b) a multidimensional input device having at least two dimensions of operability, adapted to correspond to the two dimensions of the display device, and having an output, so that the user may cause the input device to produce a corresponding change in an image of the display device by translating an indicator segment of the display in the at least two dimensions of display, based on the visual feedback received from the display device, the indicator segment being moved to a translated location of the display device corresponding to a user command; and a controller for controlling the graphical user interface and for producing the input of the selector, receiving as a control the output of the multidimensional input device, the controller receiving the output of the program database and presenting information relating to at least one of the plurality of programs on the display device associated with a command, the command being interpreted by the control means as the user command to produce the input of the selector to select the at least one of the plurality of programs associated with the command.

Another object of the present invention is to provide an apparatus, receiving as an input from a human user having a user characteristic, comprising an input device, producing an input signal from the human user input; a display for displaying information relating to the input from the user and feedback on a current state of the apparatus, having an alterable image type; an input processor for extracting an input instruction relating to a desired change in a state of the apparatus from the input signal; a detector for detecting one or more temporal-spatial user characteristics of the input signal, independent of the input instruction, selected from the group consisting of a velocity component, an efficiency of input, an accuracy of input, an interruption of input and a high frequency component of input; a memory for storing data related to the user characteristics; and a controller for altering the image type based on the user characteristics. The controller may alter the image type based on an output of the detector and the stored data so that the display displays an image type that corresponds to the detected user characteristics. The controller may further be for controlling the causation of an action on the occurrence of an event, further comprising a control for receiving the input instruction and storing a program instruction associated with the input instruction, the control having a memory sufficient for storing program instructions to perform an action on the occurrence of an event; and a monitor for monitoring an environment of the apparatus to determine the occurrence of the event, and causing the performance of the action on the occurrence of the event. The controller may also alters the image type based on an output of the detector and the stored data so that the display means displays an image type which corresponds to the detected user characteristics.

It is another object of the present invention to provide an adaptive programmable apparatus having a plurality of states, being programmable by a programmer and operating in an environment in which a plurality of possible events occur, each of the events being associated with different data, comprising an data input for receiving data; an programmer input, producing an input signal from the programmer; a memory for storing data relating to the data input or the input signal; a feedback device for adaptively providing information relating to the input signal and a current status of the apparatus to the programmer, based on the data input or the programmer input, the stored data, and derived weighing of at least a subset of possible choices, the derived weighing being based on a history of use, a context of a respective choice and the current status of the apparatus; a memory for storing programming data associated with the input signal; and a processor, having a control output, for controlling the response of the apparatus relating to the detection of the input signal or the data in accordance with the stored programming data, the processor: (a) processing the at least one of the input signal or the data to reduce an amount of information while substantially retaining an abstract portion of the information; (b) storing a quantity of the abstracted information; (c) processing the abstract portion of the information in conjunction with the stored quantity of abstracted information; and (d) providing the control output based on the processed abstract portion of the information and the stored programming data. The apparatus may further comprise an input for receiving a programming preference from the programmer indicating a plurality of possible desired events; the processor further including a correlator for correlating the programming preference with the data based on an adaptive algorithm and for determining a likelihood of occurrence of at least one of the desired events, producing the control output. The apparatus may further comprise an input for receiving feedback from the programmer indicating a concurrence with the control output of the processor, and modifying the response control based on the received feedback to increase a likelihood of concurrence. The apparatus may still further verify the programming data to ensure that the programming data comprise a complete and consistent set of instructions; and include a feedback system for interactively modifying the programming data. The apparatus may also comprise a chronological database and an accessing system for accessing the chronological database on the basis of the programming data stored in the memory.

It is also an object according to the present invention to provide an apparatus comprising an input for receiving a programming preference from the programmer indicating a plurality of possible desired events; and a correlator for correlating the programming preference with the data based on an adaptive algorithm and for determining a likelihood of occurrence of at least one of the desired events, producing the output, the output being associated with the initiation of the response.

The present invention also provides as an object an apparatus comprising an input for receiving feedback from the programmer indicating a concurrence with the output of the correlator, and modifying the algorithm based on the received feedback, the feedback device comprising a display and the input device is remote from the display, and providing a direct manipulation of display information of the display.

According to an aspect of the present invention, a processor of the programmable apparatus verifies the program instructions to ensure that the program instructions are valid and executable by the processor; an output for providing an option, selectable by the programmer input for changing an instruction stored by the processor, such that the apparatus enters a state wherein a new instruction may be input to substitute for the instruction, wherein the processor verifies the instructions such that the instructions are valid; and wherein the feedback device further presents information requesting confirmation from the programmer of the instructions associated with the input signal. The apparatus may further comprise a chronological database and an accessing system for accessing the chronological database on the basis of the program instructions stored in the memory.

The processor of the programmable apparatus may receive information from the input signal and/or from the data input; and may further comprise an input signal memory for storing at least a portion of the input signal or the data, a profile generator for selectively generating a profile of the input signal or the data, and an input signal profile memory for storing the profile of the input signal or the data separately from the input signal or the data in the input signal memory. The programmable apparatus may further comprise a processor for comparing the input signal or the data with the stored profile of the input signal or the data to determine the occurrence of an event, and the data optionally comprises image data and the processor for comparing performs image analysis. The image data may comprise data having three associated dimensions obtained by a method selected from the group consisting of synthesizing a three dimensional representation based on a machine based model derived from two dimensional image data, synthesizing a three dimensional representation derived from a time series of pixel images, and synthesizing a three dimensional representation based on a image data representing a plurality of parallax views each having at least two dimensions.

A user feedback data presenting device according to the present invention may comprise a display having a plurality of display images, the display images differing in available programming options.

According to another aspect of the present invention, a program material processing system is provided comprising means for storing template data; means for storing the image data; means for generating a plurality of domains from the stored image data, each of the domains representing different portions of the image information; means for creating, from the stored image data, a plurality of addressable mapped ranges corresponding to different subsets of the stored image data, the creating means including means for executing, for each of the mapped ranges, a procedure upon the one of the subsets of the stored image data which corresponds to the mapped range; means for assigning identifiers to corresponding ones of the mapped ranges, each of the identifiers specifying for the corresponding mapped range an address of the corresponding subset of stored image data; means for selecting, for each of the domains, the one of the mapped ranges which most closely corresponds according to predetermined criteria; means for representing at least a portion of the image information as a set of the identifiers of the selected mapped ranges; and means for selecting, from the stored templates, a template which most closely corresponds to the set of identifiers representing the image information. The means for selecting may comprise means for selecting, for each domain, the mapped range which is the most similar, by a method selected from at least one of the group consisting of selecting a minimum Hausdorff distance from the domain, selecting the highest cross-correlation with the domain and selecting the lowest mean square error of the difference between the mapped range and the domain. The means for selecting may also comprise, for each domain, the mapped range with the minimum modified Hausdorff distance calculated as D[db,mrb]+D[1-db,1-mrb], where D is a distance calculated between a pair of sets of data each representative of an image, db is a domain, mrb is a mapped range, 1-db is the inverse of a domain, and 1-mrb is an inverse of a mapped range. The means for representing may further comprise means for determining a feature of interest of the image data, selecting a mapped range corresponding to the feature of interest, storing the identifiers of the selected mapped range, selecting a further mapped range corresponding to a portion of image data having a predetermined relationship to the feature of interest and storing the identifiers of the further mapped range.

According to an embodiment of the present invention, the image data comprises data having three associated dimensions obtained by a method selected from the group consisting of synthesizing a three dimensional representation based on a machine based prediction derived from two dimensional image data, synthesizing a three dimensional representation derived from a time series of pixel images, and synthesizing a three dimensional representation based on a image data representing a plurality of parallax views having at least two dimensions.

It is therefore an object of the present invention to provide a programmable apparatus for receiving instructions from a programmer and causing an action to occur on the happening of an event, comprising an input device, producing an input instruction signal; a control means for receiving the input instruction signal, and storing a program instruction associated with the input instruction signal, the control means storing sufficient program instructions to perform an action on the occurrence of an event, the control means monitoring a status of the apparatus to determine the occurrence of various events, comparing the determined events with the program instructions, and performing the action on the occurrence of the event; a display means for interactively displaying information related to the instructions to be received, and responsive thereto, controlled by the control means, so that the programmer is presented with feedback on a current state of the apparatus and the program instruction; wherein the control means further comprises means for detecting one or more characteristics of the input instruction signal independent of the program instruction selected from the group consisting of a velocity component, an efficiency of input, an accuracy of input, an interruption of input, a high frequency component of input and a past history of input by the programmer, whereby when the control means detects a characteristic indicating that the display means is displaying information in a suboptimal fashion, the control means controls the display means to display information in a more optimal fashion.

It is also an object of the present invention to provide a programmable apparatus for receiving instructions from a programmer and causing an action to occur on the happening of an event, comprising an input device, producing an input instruction signal; a control means for receiving the input instruction signal, and storing a program instruction associated with the input instruction signal, the control means storing sufficient program instructions to perform an action on the occurrence of an event, the control means monitoring a status of the apparatus to determine the occurrence of various events, comparing the determined events with the program instructions, and performing the action on the occurrence of the event; a display means for interactively displaying information related to the instructions to be received, and responsive thereto, controlled by the control means, so that the programmer is presented with feedback on a current state of the apparatus and the program instruction; wherein the control means further comprises means for detecting a need by the programmer for more detailed information displayed on the display means, by detecting one or more characteristics of the input instruction signal independent of the program instruction selected from the group consisting of a velocity component, an efficiency of input, an accuracy of input, an interruption of input, a high frequency component of input and a past history of input by the programmer, whereby when the control means detects a characteristic indicating that the display means is insufficiently detailed information, the control means controls the display means to display more detailed information.

It is a further object of the present invention to provide a programmable apparatus having a data input, the apparatus receiving instructions from a programmer and causing an action to occur on the receipt of data indicating an event, comprising an input device, producing an input instruction signal; a control means for receiving the input instruction signal, and storing a program instruction associated with the input instruction signal, the control means storing sufficient program instructions to perform an action on the receipt of data indicating an event, the control means monitoring the data input; a display means for interactively displaying information related to the instructions to be received, and responsive thereto, controlled by the control means, so that the programmer is presented with feedback on a current state of the apparatus and the program instruction; wherein the control means receives a programming preference indicating a desired event from the input device which does not unambiguously define the event, and the control means monitors the data and causes the occurrence of the action when a correlation between the programming preference and the monitored data is above a predetermined threshold, indicating a likely occurrence of the desired event. It is also object of the present invention to provide the programmable aforementioned apparatus, wherein the input device is remote from the display means, and provides a direct manipulation of display information of the display means, further comprising means for verifying the program instructions so that the program instructions are executable by the control means. The control means may further comprise a calendar or other chronological database.

Another object of the present invention provides a programmable information storage apparatus having a data input, for receiving data to be stored, the apparatus receiving instructions from a programmer and causing an action to occur on the receipt of data indicating an event, comprising means for storing data from the data input; an input device, producing an input instruction signal; a control means for receiving the input instruction signal, and storing a program instruction associated with the input instruction signal, the control means storing sufficient program instructions to perform an action on the receipt of data from the data input indicating an event, the control means monitoring the data input to determine the occurrence of various events, comparing the determined events with the program instructions, and performing for storing the data the action on the occurrence of the event; wherein the control means receives identifying data from at least one of the input device and the data input, the identifying data being stored separately from the input data on a storage medium. The programmable information storage apparatus may also include means for reading the identifying data stored separately on the storage medium, and may also receive as an input the identifying data.

It is also an object of the present invention to provide a programmable apparatus, wherein the control means provides an option, selectable by the input means in conjunction with the display means, for changing an input program instruction prior to execution by the control means, so that the apparatus enters a state wherein a new program instruction may be input to substitute for the changed input step, wherein the control means verifies the program instructions so that the program instructions are executable by the control means.

It is still another object of the present invention to provide a programmable apparatus, wherein the control means further causes the display means to display a confirmation screen after the program instructions are input, so that the programmer may confirm the program instructions.

Another object of the present invention is to provide a programmable information storage apparatus, wherein the control means further comprises means for recognizing character data present in a data stream of the input data, the identifying data comprising the recognized character data.

It is a still further object of the present invention to provide a video tape recording apparatus, comprising a video signal receiving device, a recording device for recording the video signal, wherein the control analyzes the video signal for the presence of a symbol, and recognizes the symbol as one of a group of recognized symbols, and the control stores the recognized symbol separately from the video signal.

Another object of the present invention is to provide a recording device for recording an analog signal sequentially on a recording medium, comprising means for characterizing the analog signal, wherein data representing the characterization and a location of the analog signal on the recording medium are stored in a directory location on the recording medium separately from the analog signal.

It is a further object of the present invention to provide an interface for a programmable control for input of a program for a controller to execute, which performs an action based on an external signal, comprising an input device, a controller for receiving data from the input device and from an external stimulus, a plant being controlled by the controller based on an input from the input device and the external stimulus, and a display device being controlled by the controller, for providing visual feedback to a user operating the input device, wherein a predetermined logical sequence of programming options is presented to the user on the display device, in a plurality of display screens, each of the display screens differing in available programming choices; the logical sequence including a correct sequence of choices to set an operable control program, so that no necessary steps are omitted; the external stimulus comprises a timing device, and the display comprises a display option for programming the plant to perform an action at a time which is input through the input device as a relative position on the display device, the relative position including a means for displaying an absolute time entry and means for displaying a relative time entry, the display also comprising a display option means for performing an action at a time; the control comprises means for presenting the user, on the display device, with a most probable action, which may be selected by the user through activation of the input device without entering data into the controller through the input device relating to both the action and the event; the display also comprising means for indicating completion of entry of a programming step, which means indicates to the user an indication that the programming step is not completed if information necessary for execution of the step is not available to the controller; and the controller being capable of controlling the display device to present information to the user relating to the use of the apparatus if necessary for use of the device by the user.

Another object of the present invention provides a system for presenting a program to a viewer, comprising a source of program material; means for determining a viewer preference, the viewer preference optionally being context sensitive; means for receiving the program material from the source; means for characterizing the program material based on its content; means for correlating the characterized content of the program material with the determined viewer preference to produce a correlation index; and means for presenting the program material to the viewer, if the correlation index indicates a probable high correlation between the characterization of the program material and the viewer preference.

Another object of the present invention is to provide a system for presenting a program to a viewer, comprising a source of program material; means for determining a viewer preference; means for receiving the program material from the source; means for storing the program material; means for preprocessing the program material to produce a reduced data flow information signal retaining information relating to a character of the program material and eliminating data not necessary to characterize the program material; means for characterizing the information signal based on its content; means for correlating the characterized content of the information signal with the determined viewer preference to produce a correlation index; and means for presenting the stored program material to the viewer, if the correlation index indicates a probable high correlation between the characterization of the information signal and the viewer preference. The system may also include a means for storing the information signal, wherein the characterizing means characterizes the stored information signal, and also a memory for storing the program material while the characterizing means produces characterized content and the correlating means produces the correlation index.

Still another object of the present invention is to provide a system. wherein the program material is encrypted, further comprising means for decrypting the program material to produce a decryption event; and means for charging an account of the viewer based on the occurrence of a decryption event. Thus, a decryption processor and an accounting database are provided for these purposes.

Another object of the present invention is to allow the means for characterizing the program material to operate without causing a decryption event. Thus, the data stream may include characterization data specifically suitable for processing by a characterizing system, or the decryption processor may be provided with multiple levels of functionality, or both. Further, the system may comprise a memory for storing the program material while the characterizing means produces characterized content and the correlating means produces the correlation index. The characterizing means may also characterize the program material stored in memory, and the program material stored in memory may be compressed.

Another object of the present invention is to provide a controller for controlling a plant, having a sensor for sensing an external event and producing a sensor signal, an actuator, responsive to an actuator signal, for influencing the external event, and a control means for receiving the sensor signal and producing an actuator signal, comprising means for inputting a program; means for storing the program; means for characterizing the sensor signal to produce a characterized signal; and means for comparing the characterized signal with a pattern stored in a memory to produce a comparison index, wherein the actuator signal is produced on the basis of the comparison index and the program, wherein the characterization comprises an Affine transformation of the sensor signal. The characterization may comprise one or more transformation selected from the group consisting of an Affine transformation, a Fourier transformation, a Gabor transformation, and a wavelet transformation.

It is another object of the present invention to provide a method for automatically recognizing digital image data consisting of image information, the method comprising the steps performed by a data processor of storing a plurality of templates; storing the image data in the data processor; generating a plurality of addressable domains from the stored image data, each of the domains representing a portion of the image information; creating, from the stored image data, a plurality of addressable mapped ranges corresponding to different subsets of the stored image data, the creating step including the substep of (a) executing, for each of the mapped ranges, a corresponding procedure upon the one of the subsets of the stored image data which corresponds to the mapped ranges; (b) assigning identifiers to corresponding ones of the mapped ranges, each of the identifiers specifying for the corresponding mapped range a procedure and a address of the corresponding subset of the stored image data; (c) optionally subjecting a domain to a transform selected from the group consisting of a predetermined rotation, an inversion, a predetermined scaling, and a predetermined preprocessing in the time, frequency, and/or wavelet domain; (d) selecting, for each of the domains or transformed domains, the one of the mapped ranges which most closely corresponds according to predetermined criteria; (e) representing the image information as a set of the identifiers of the selected mapped ranges; and (f) selecting, from the stored templates, a template which most closely corresponds to the set of identifiers representing the image information. The step of selecting the mapped ranges may also include the substep of selecting, for each domain, a most closely corresponding one of the mapped ranges.

It is another object of the present invention to provide a method wherein the step of selecting the most closely corresponding one of the mapped ranges includes the step of selecting, for each domain, the mapped range which is the most similar, by a method selected from one or more of the group consisting of selecting minimum Hausdorff distance from the domain, selecting the highest cross-correlation with the domain, selecting the highest fuzzy correlation with the domain and selecting the minimum mean square error with the domain.

Another object of the present invention provides a method wherein the step of selecting the most closely corresponding one of mapped ranges includes the step of selecting, for each domain, the mapped range with the minimum modified Hausdorff distance calculated as $D[db,mrb]+D[1-db,1-mrb]$, where D is a distance calculated between a pair of sets of data each representative of an image, db is a domain, mrb is a mapped range, 1-db is the inverse of a domain, and 1-mrb is an inverse of a mapped range.

Another object of the present invention provides a method wherein the digital image data consists of a plurality of pixels each having one of a plurality of associated color map values, further comprising the steps of optionally transforming the color map values of the pixels of each domain by a function including at least one scaling function for each axis of the color map, each of which may be the same or different, and selected to maximize the correspondence between the domains and ranges to which they are to be matched; selecting, for each of the domains, the one of the mapped ranges having color map pixel values which most closely correspond to the color map pixel values of the domain according to a predetermined criteria, wherein the step of representing the image color map information includes the substep of representing the image color map information as a set of values each including an identifier of the selected mapped range and the scaling functions; and selecting a most closely corresponding stored template, based on the identifier of the color map mapped range, the scaling functions and the set of identifiers representing the image information. The first criteria may comprise minimizing the Hausdorff distance between each domain and the selected range.

Another object of the present invention is to provide a method further comprising the steps of storing delayed image data, which represents an image of a moving object differing in time from the image data in the data processor; generating a plurality of addressable further domains from the stored delayed image data, each of the further domains representing a portion of the delayed image information, and corresponding to a domain; creating, from the stored delayed image data, a plurality of addressable mapped ranges corresponding to different subsets of the stored delayed image data; matching the further domain and the domain by subjecting a further domain to one or both of a corresponding transform selected from the group consisting of a null transform, a rotation, an inversion, a scaling, a translation and a frequency domain preprocessing, which corresponds to a transform applied to a corresponding domain, and a noncorresponding transform selected from the group consisting of a rotation, an inversion, a scaling, a translation and a frequency domain preprocessing, which does not correspond to a transform applied to a corresponding domain; computing a motion vector between one of the domain and the further domain, or the set of identifiers representing the image information and the set of identifiers representing the delayed image information, and storing the motion vector; compensating the further domain with the motion vector and computing a difference between the compensated further domain and the domain; selecting, for each of the delayed domains, the one of the mapped ranges which most closely corresponds according to predetermined criteria; representing the difference between the compensated further domain and the domain as a set of difference identifiers of a set of selected mapping ranges and an associated motion vector and representing the further domain as a set of identifiers of the selected mapping ranges; determining a complexity of the difference based on a density of representation; and when the difference has a complexity below a predetermined threshold, selecting, from the stored templates, a template which most closely corresponds to the set of identifiers of the image data and the set of identifiers of the delayed image data.

Another object of the present invention provides an apparatus for automatically recognizing digital image data consisting of image information, comprising means for storing template data; means for storing the image data; means for generating a plurality of addressable domains from the stored image data, each of the domains representing a different portion of the image information; means for creating, from the stored image data, a plurality of addressable mapped ranges corresponding to different subsets of the stored image data, the creating means including means for executing, for each of the mapped ranges, a procedure upon the one of the subsets of the stored image data which corresponds to the mapped range: means for assigning identifiers to corresponding ones of the mapped ranges, each of the identifiers specifying for the corresponding mapped range an address of the corresponding subset of stored image data; means for selecting, for each of the domains, the one of the mapped ranges which most closely corresponds according to predetermined criteria; means for representing the image information as a set of the identifiers of the selected mapped ranges; and means for selecting, from the stored templates, a template which most closely corresponds to the set of identifiers representing the image information.

It is also an object of the present invention to provide a method and system for processing broadcast material having a first portion and a second portion, wherein the first portion comprises an content segment and the second portion comprises a commercial segment, in order to allow alteration in the presentation of commercial segments, based on the recipient, commercial sponsor, and content provider, while providing means for accounting for the entire broadcast.

Another object of an embodiment of the present invention provides an apparatus comprising a user interface, receiving a control input and a user attribute from the user; a memory system, storing the control input and user attribute; an input for receiving content data; means for storing data describing elements of the content data; means for presenting information to the user relating to the content data, the information being for assisting the user in defining a control input, the information being based on the stored user attribute and the data describing elements of the content data; and means for processing elements of the content data in dependence on the control input, having an output. This apparatus according to this embodiment may be further defined as a terminal used by users of a television program delivery system for suggesting programs to users, wherein the user interface comprises means for gathering the user specific data to be used in selecting programs; the memory system comprises means, connected to the gathering means, for storing the user specific data; the input for receiving data describing elements of the content data comprises means for receiving the program control information containing the program description data; and the processing means comprises program selection means, operably connected to the storing means and the receiving means, for selecting one or more programs using a user's programming preferences and the program control information. In this case, the program selection means may comprise a processor, wherein the user programming preferences are generated from the user specific data; and means, operably connected to the program selection means, for suggesting the selected programs to the user. The apparatus processing means selectively may records the content data based on the output of the processing means. Further, the presenting means presents information to the user in a menu format. The presenting means may comprises means for matching the user attribute to content data.

The data describing elements of an associated data stream may, for example, comprise a program guide generated remotely from the apparatus and transmitted in electronically accessible form; data defined by a human input, and/or data defined by an automated analysis of the content data.

According to another embodiment, the present invention comprises a method, comprising the steps of receiving data describing an user attribute; receiving a content data stream, and extracting from the content data stream information describing a plurality of program options; and processing the data describing a user attribute and the information describing a plurality of program options to determine a likely user preference; selectively processing a program option based on the likely user preference. The method may be embodied in a terminal for a television program delivery system for suggesting programs to users for display on a television using program control information and user specific data. In that case, the step of receiving data describing an user attribute may comprise gathering user specific data to be used in selecting w programs, and storing the gathered user specific data; the step of receiving a content data stream, may comprise receiving both programs and program control information for selecting programs as the information describing a plurality of program options; the selectively processing step may comprise selecting one or more programs using a user's programming preferences and the received program control information, wherein the user programming preferences are generated from the user specific data; and the method further including the step of presenting the program or information describing a program option for the selected programs to the user.

The user attribute may comprise a semantic description of a preference, or some other type of description, for example a personal profile, a mood, a genre, an image representing or relating to a scene, a demographic profile, a past history of use by the user, a preference against certain types of media, or the like. In the case of a semantic preference, the data processing step may comprise determining a semantic relationship of the user preference to the information describing a plurality of program options. The program options may, for example, be transmitted as an electronic program guide, the information being in-band with the content (being transmitted on the same channel), on a separate channel or otherwise out of band, through a separate communications network, e.g., the Internet, dial-up network, or other streaming or packet based communications system, or by physical transfer of a computer-readable storage medium, such as a CD-ROM or floppy disk. The electronic program guide may include not only semantic or human-readable information, but also other types of metadata relating to or describing the program content.

In a further embodiment of the present invention, it is an object to provide a device for identifying a program in response to user preference data and program control information concerning available programs, comprising means for gathering the user preference data; means, connected to the gathering means, for storing the gathered user preference data; means for accessing the program control information; and means, connected to the storing means and accessing means, for identifying one or more programs based on a correspondence between a user's programming preferences and the program control information. For example, the identifying means identifies a plurality of programs, a sequence of identifications transmitted to the user being based on a degree of correspondence between a user's programming preferences and the respective program control information of the identified program. The device my selectively record or display the program, or identify the program for the user, who may then define the appropriate action by the device. Therefore, a user may, instead of defining "like" preferences, may define "dislike" preference, which are then used to avoid or filter certain content. Thus, this feature may be used for censoring or parental screening, or merely to avoid unwanted content. Thus, the device comprises a user interface adapted to allow interaction between the user and the device for response to one or more of the identified programs. The device also preferably comprises means for gathering the user specific data comprises means for monitoring a response of the user to identified programs.

It is a further object of the invention to provide a device which serves as a set top terminal used by users of a television program delivery system for suggesting programs to users using program control information containing scheduled program description data, wherein the means for gathering the user preference data comprising means for gathering program watched data; the means, connected to the gathering means, for storing the gathered user preference data comprising means, connected to the gathering means, for storing the program watched data; the means for accessing the program control information comprising means for receiving the program control information comprising the scheduled program description data: the means. connected to the storing means and accessing means, for identifying one or more programs based on a correspondence between a user's programming preferences and the program control information, being for selecting at least one program for suggestion to the viewer, comprising: means for transforming the program watched data into preferred program indicators, wherein a program indicator comprises a program category with each program category having a weighted value; means for comparing the preferred program indicators with the scheduled program description data, wherein each scheduled program is assigned a weighted value based on at least one associated program category; means for prioritizing the scheduled programs from highest weighted value programs to lowest weighted value programs; means for indicating one or more programs meeting a predetermined weight threshold, wherein all other programs are excluded from program suggestion; and means, operably connected to the program selection means, for displaying for suggestion the selected programs to the user.

It is a further aspect of the invention to provide device a device comprising: a data selector, for selecting a program from a data stream; an encoder, for encoding programs in a digitally compressed format; a mass storage system, for storing and retrieving encoded programs; a decoder, for decompressing the retrieved encoded programs; and an output, for outputting the decompressed programs.

Therefore, the present invention provides a system and method for making use of the available broadcast media forms for improving an efficiency of matching commercial information to the desires and interests of a recipient, improving a cost effectiveness for advertisers, improving a perceived quality of commercial information received by recipients and increasing profits and reducing required information transmittal by publishers and media distribution entities.

This improved advertising efficiency is accomplished by providing a system for collating a constant or underlying published content work with a varying, demographically or otherwise optimized commercial information content. This commercial information content therefore need not be predetermined or even known to the publisher of the underlying works, and in fact may be determined on an individual receiver basis. It is also possible to integrate the demographically optimized information within the content. For example, overlays in traditional media, and electronic substitutions or edits in new media, may allows seamless integration. The content alteration need not be only based on commercial information, and therefore the content may vary based on the user or recipient.

The technologies emphasize adaptive pattern recognition of both the user input and data, with possible use of advanced signal processing and neural networks. These systems may be shared between the interface and operational systems, and therefore a controller for a complex system may make use of the intrinsic processing power available, rather than requiring additional computing resources, although this unification is not required. In fact, while hardware efficiency dictates that near term commercial embodiments employ common hardware for the interface system and the operational system, future designs may successfully separate the interface system from the operational system, allowing portability and efficient application of a single interface system for a number of operational systems.

The adaptive nature of the technologies derive from an understanding that people learn most efficiently through the interactive experiences of doing, thinking, and knowing. Users change in both efficiency and strategy over time. To promote ease-of-use, efficiency, and lack of frustration of the user, the interface of the device is intuitive and self explanatory, providing perceptual feedback to assist the operator in communicating with the interface, which in turn allows the operational system to identify of a desired operation. Another important aspect of man-machine interaction is that there is a learning curve, which dictates that devices which are especially easy to master become frustratingly elemental after continued use, while devices which have complex functionality with many options are difficult to master and may be initially rejected, or used only at the simplest levels. The present technologies address these issues by determining the most likely instructions of the operator, and presenting these as easily available choices, by analyzing the past history data and by detecting the "sophistication" of the user in performing a function, based on all information available to it. The context of use is also a factor in many systems. The interface seeks to optimize the interface adaptively and immediately in order to balance and optimize both quantitative and qualitative factors. This functionality may greatly enhance the quality of interaction between man and machine, allowing a higher degree of overall system sophistication to be tolerated.

The interface system analyzes data from the user, which may be both the selections made by the user in context, as well as the efficiency by which the user achieves the selection. Thus, information concerning both the endpoints and path are considered and analyzed by the human user interface system.

The interface may be advantageously applied to an operational system that has a plurality of functions, certain of which are unnecessary or are rarely used in various contexts, while others are used with greater frequency. In such systems, the application of functionality may be predictable. Therefore, the present technologies provide an optimized interface system that, upon recognizing a context, dynamically reconfigures the availability or ease of availability of functions and allows various functional subsets to be used through "shortcuts". The interface presentation will therefore vary over time, use and the particular user.

The advantages to be gained by using an intelligent data analysis interface for facilitating user control and operation of the system are more than merely reducing the average number of selections or time to access a given function. Rather, advantages also accrue from providing a means for access and availability of functions not necessarily previously existing or known to the user, improving the capabilities and perceived quality of the product.

Further improvements over prior interfaces are also possible due to the availability of pattern recognition functionality as a part of the interface system. In those cases where the pattern recognition functions are applied to large amounts of data or complex data sets, in order to provide a sufficient advantage and acceptable response time, powerful computational resources, such as powerful RISC processors, advanced DSPs or neural network processors are made available to the interface system. On the other hand, where the data is simple or of limited scope, aspects of the technology may be easily implemented as added software-based functionality in existing products having limited computational resources.

The application of these technologies to multimedia data processing systems provides a new model for performing image pattern recognition and for the programming of applications including such data. The ability of the interface to perform abstractions and make decisions regarding a closeness of presented data to selection criteria makes the interface suitable for use in a programmable control, i.e., determining the existence of certain conditions and taking certain actions on the occurrence of detected events. Such advanced technologies might be especially valuable for disabled users.

In a multimedia environment, it may be desirable for a user to perform an operation on a multimedia data event. Past systems have required explicit indexing or identification of images and events. The present technologies, however, allow an image, diagrammatic, abstract or linguistic description of the desired event to be acquired by the interface system from the user and applied to identify or predict the multimedia event(s) desired, without requiring a separate manual indexing or classification effort. These technologies may also be applied to single media data.

The interface system analyzes data from many different sources for its operation. Data may be stored or present in a dynamic data stream. Thus, in a multimedia system, there may be a real-time video feed, a stored event database, as well as an exemplar or model database. Further, since the device is adaptive, information relating to past experience of the interface, both with respect to exposure to data streams and user interaction, is also stored.

This data analysis aspect of the interface system may be substantially processor intensive, especially where the data includes abstract or linguistic concepts or images to be analyzed. Interfaces that do not relate to the processing of such data may be implemented with simpler hardware. On the other hand, systems that handle complex data types may necessarily include sophisticated processors, adaptable for use by the interface system. A portion of the data analysis may also overlap the functional analysis of the data for the operational system.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

Embodiments of the present invention are shown in the figures in the drawings, in which.

DETAILED DESCRIPTION OF THE PREFERRED EMBODIMENTS

Figure 1:
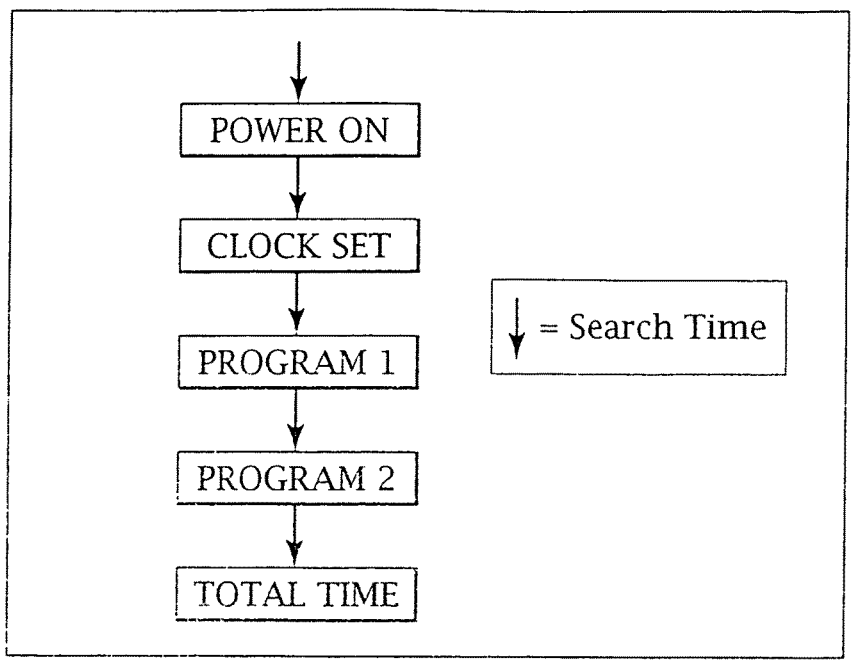
FIG. 1 is a flow chart of the steps required to set a VCR.
Figure 2:
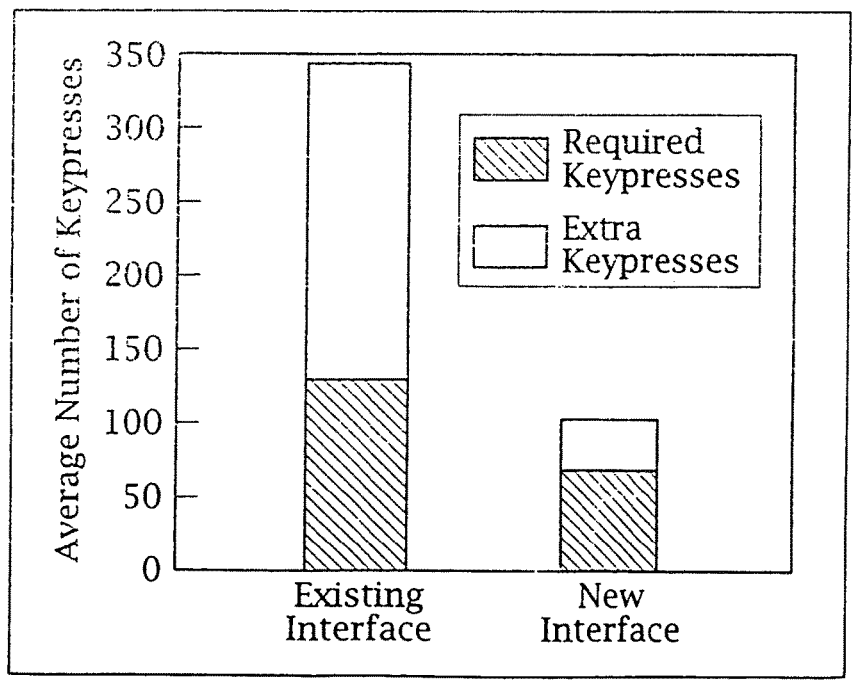
FIG. 2 shows a graphical comparison of required and extra keypresses for the prior art and the interface of the present invention.
Figure 3:
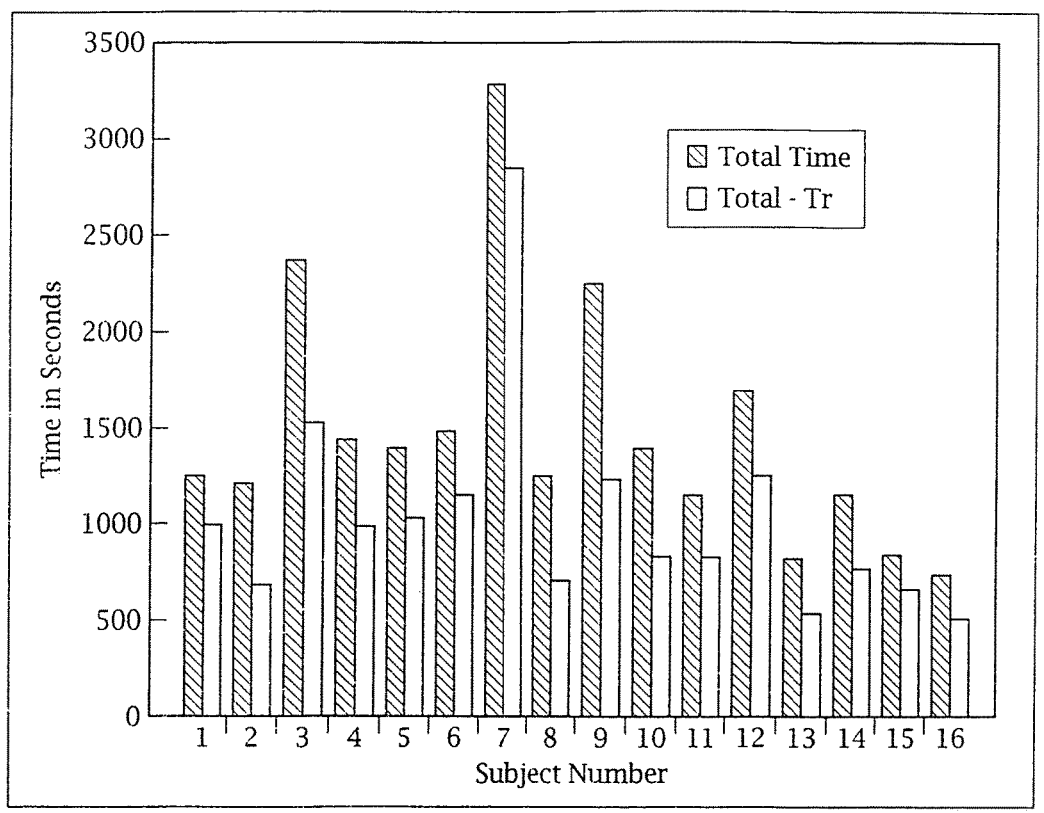
FIG. 3 graphically shows the differences in seconds between total time for the prior art for each user.
Figure 4:
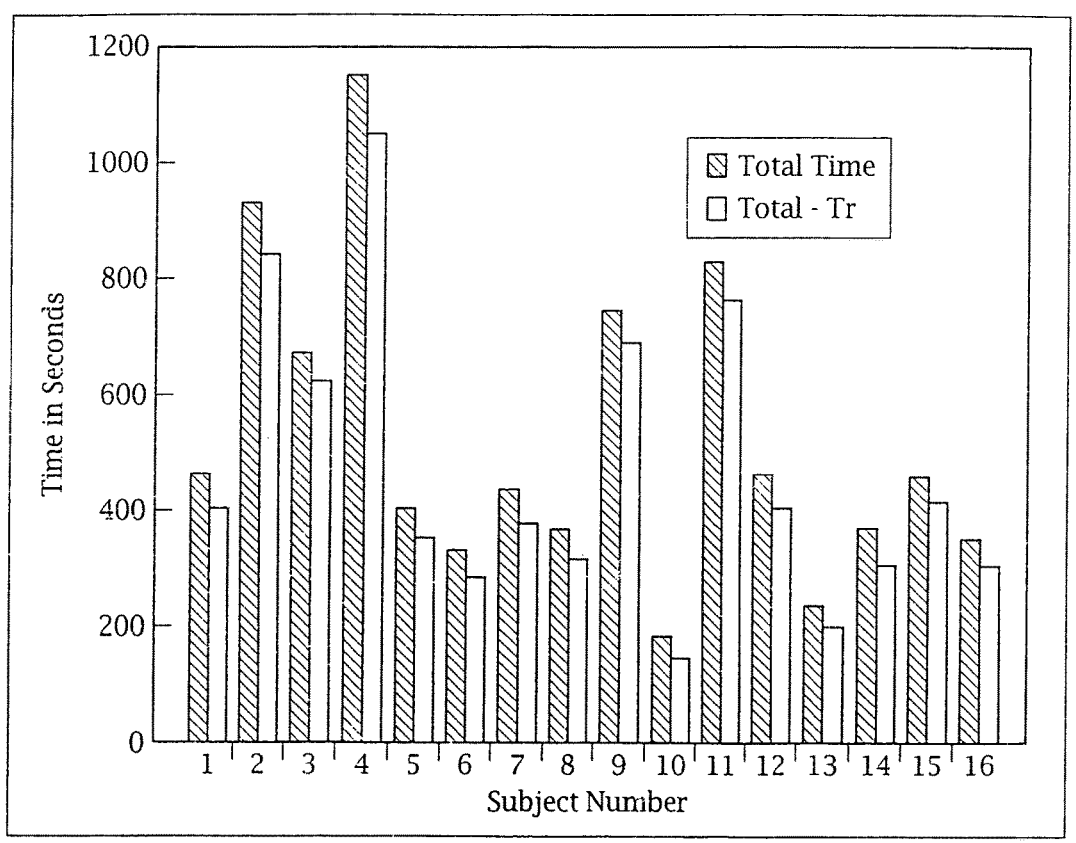
FIG. 4 graphically shows the differences in seconds between total time for the interface of the present invention for each user.
Figure 5:
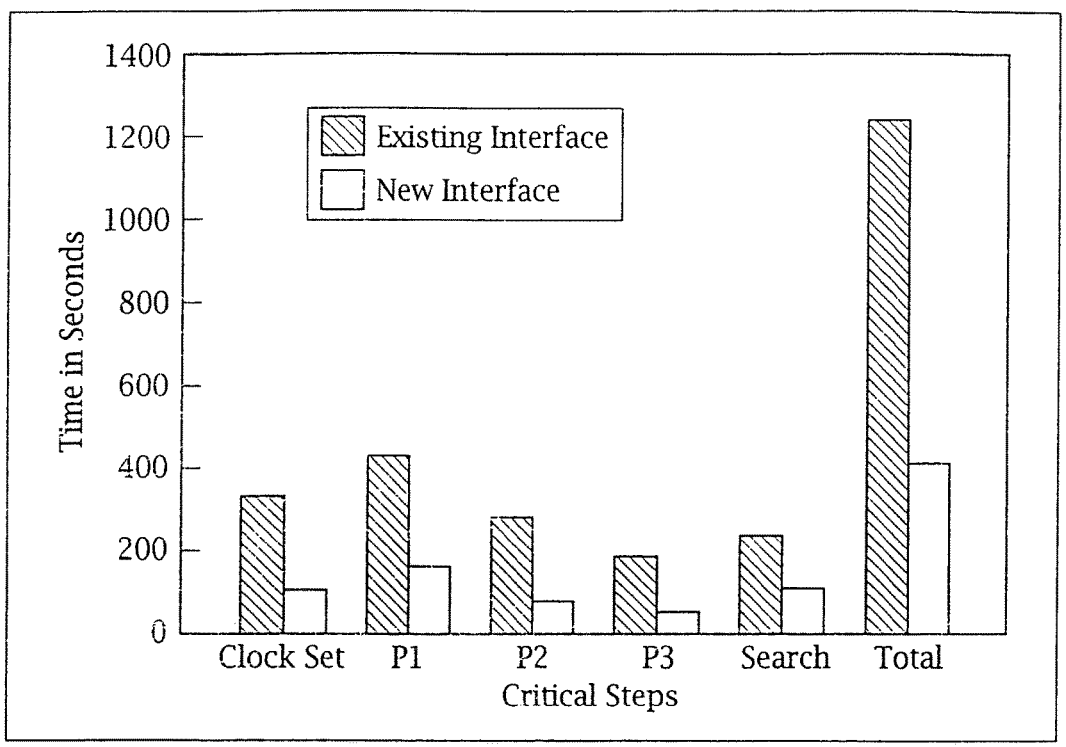
FIG. 5 graphically shows the programming steps for the comparison of the prior art and the interface of the present invention.
Figure 6:
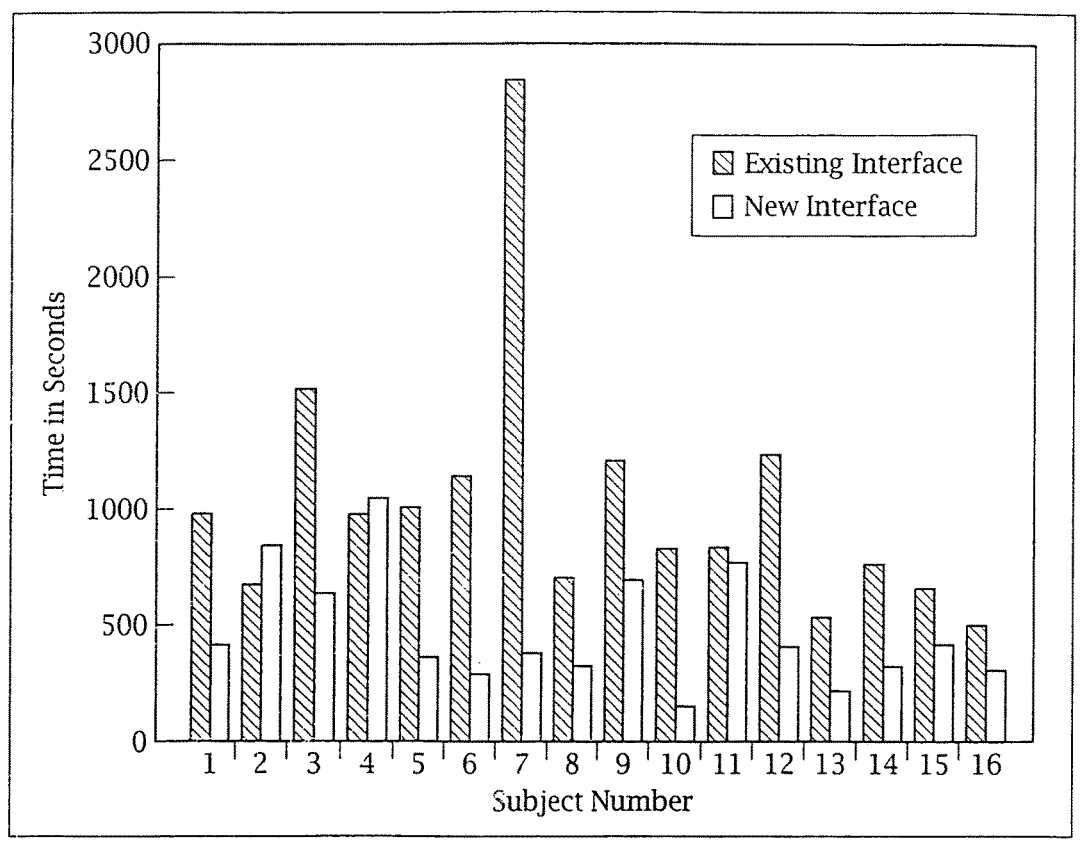
FIG. 6 graphically shows comparative statistics by user comparing the prior art and the interface of the present invention.
Figure 7:
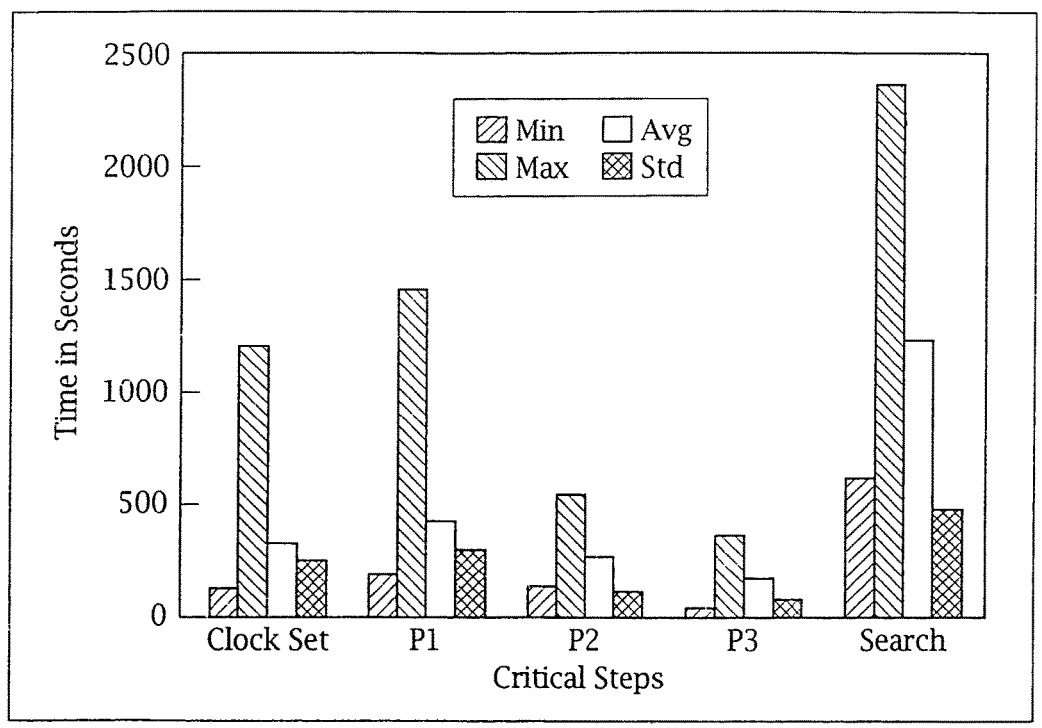
FIGS. 7 and 8 graphically show the critical steps in programming the prior art and the interface of the present invention.
Figure 8:
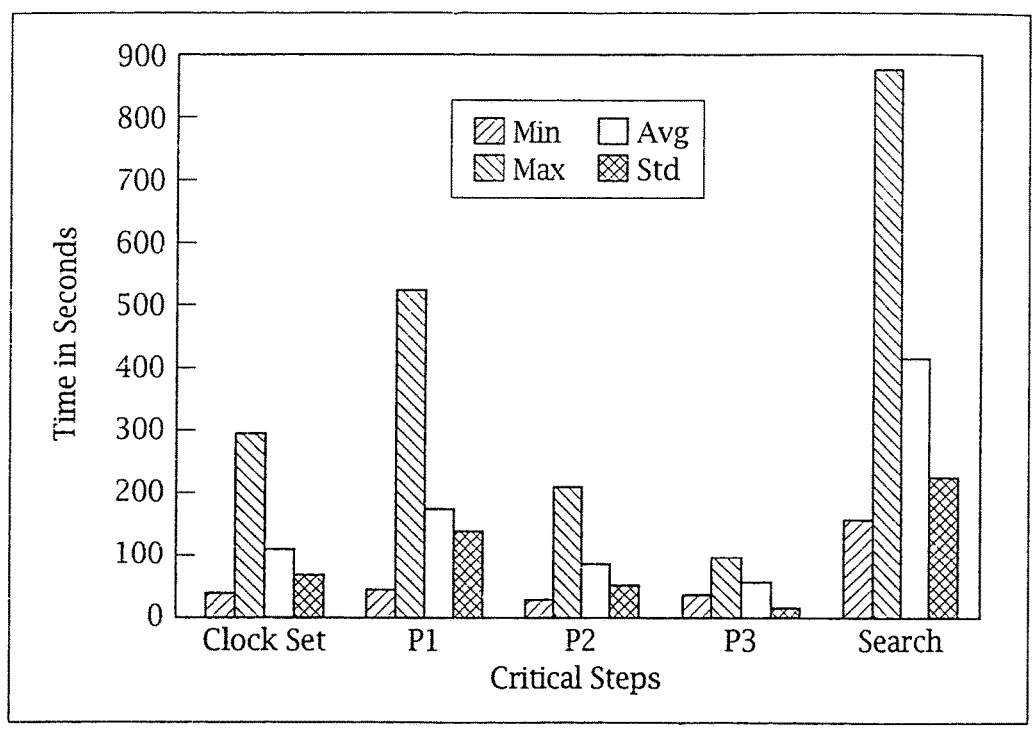
Figure 9:
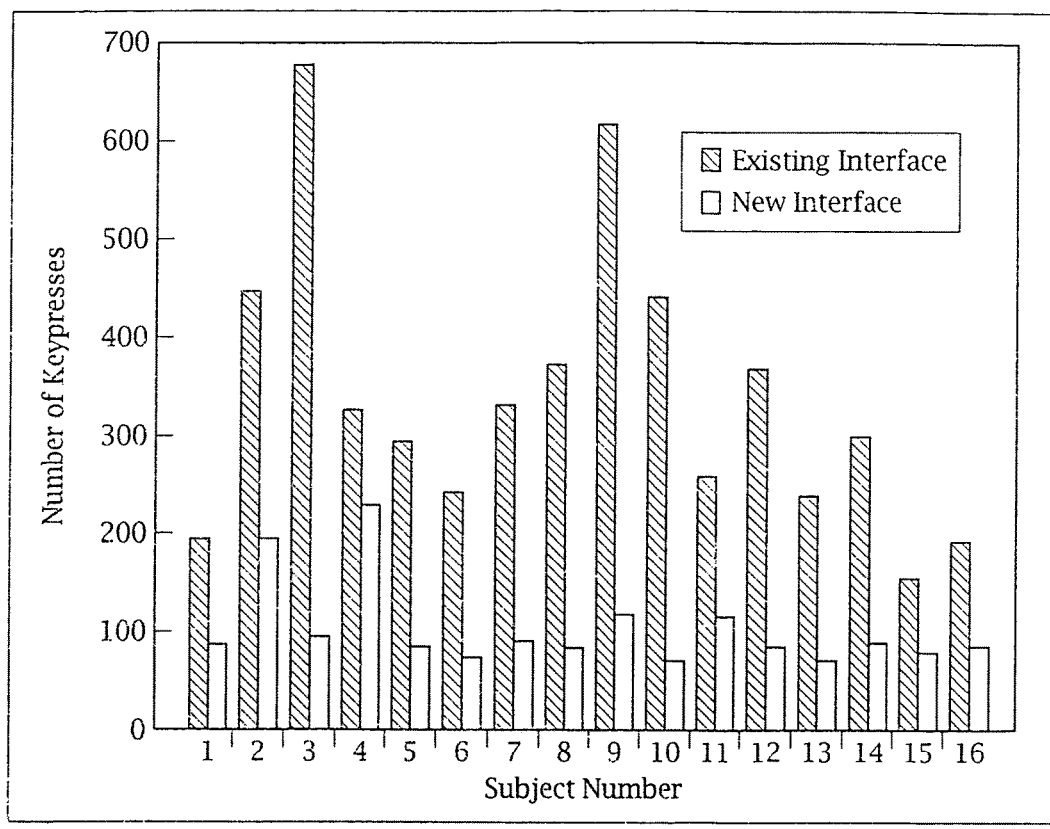
FIG. 9 graphically shows the number of keypresses made by test participants comparing the prior art and the interface of the present invention.
Figure 10:
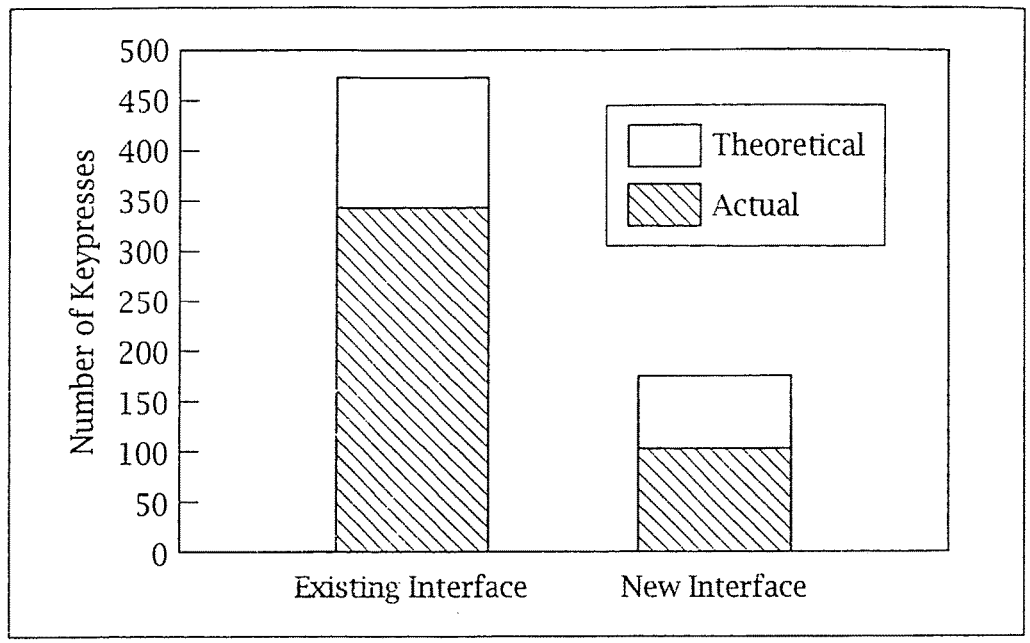
FIG. 10 graphically shows the comparison of the actual and theoretical number of keypresses necessary for programming the prior art and the interface of the present invention.
Figure 11:
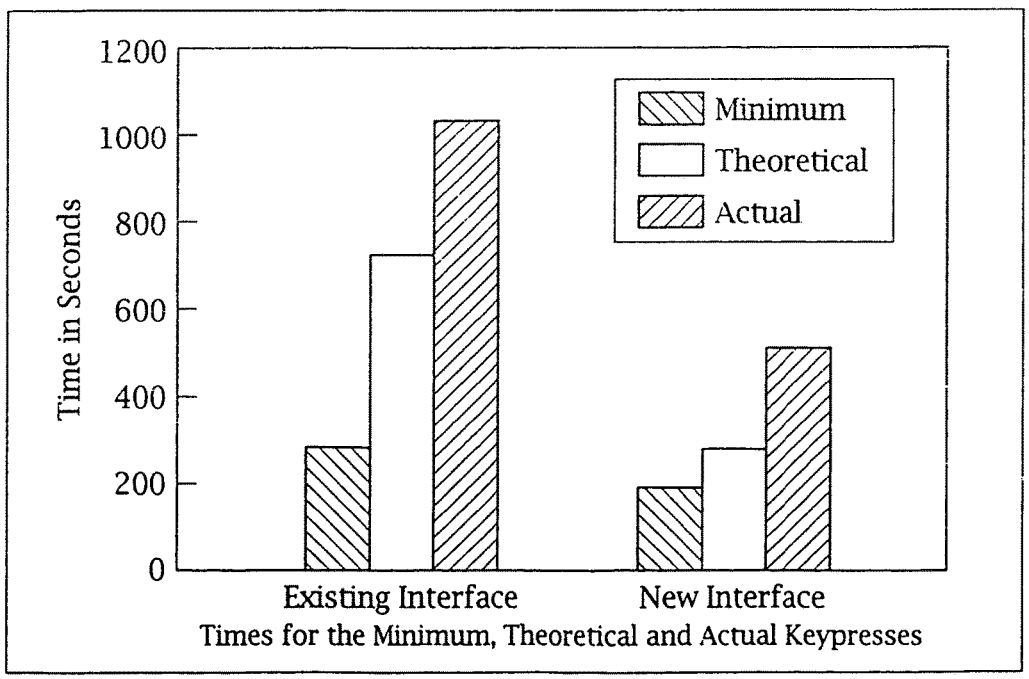
FIG. 11 graphically compares the actual and theoretical time necessary for programming the prior art and the interface of the present invention.
Figure 12A:
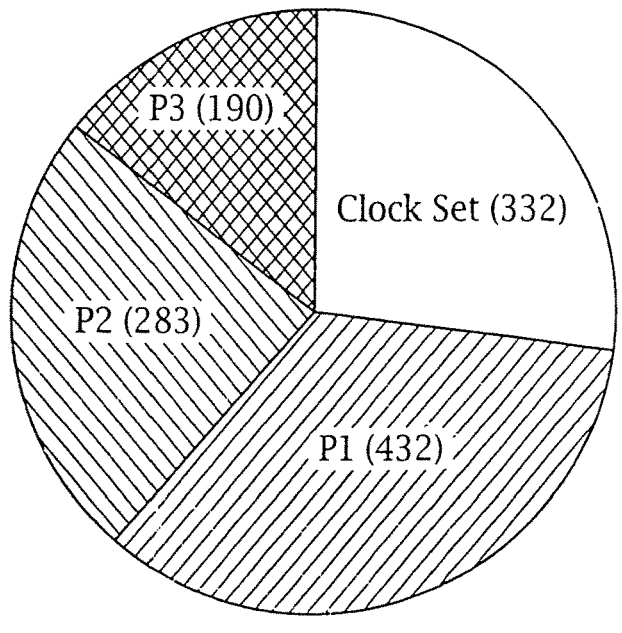
FIGS. 12a and 12b graphically compares the actual and theoretical time necessary for setting the programs in the prior art and the interface of the present invention.
Figure 12B:
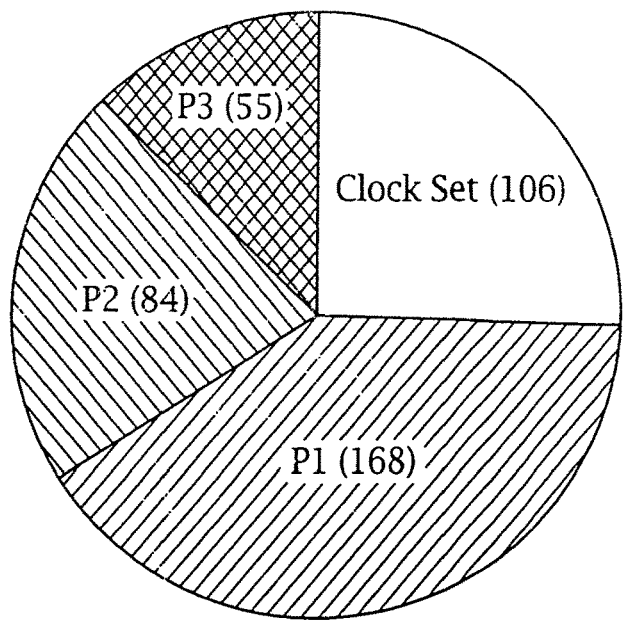
Figure 13:
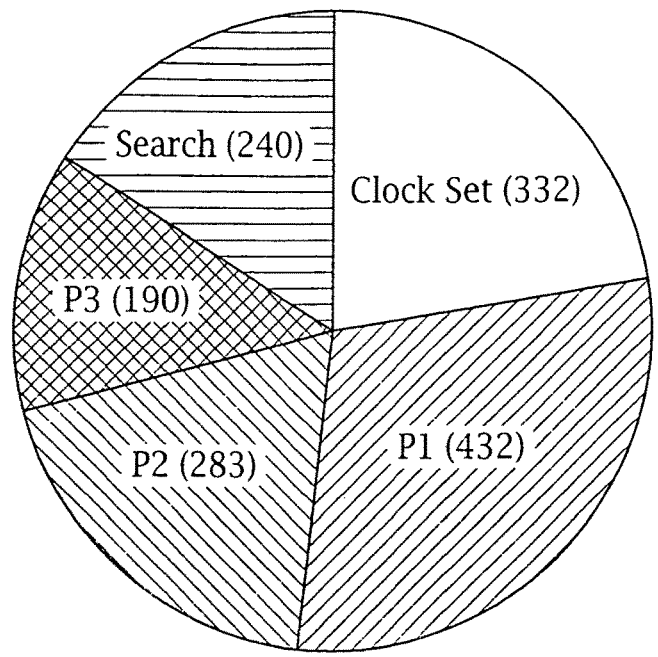
FIGS. 13 and 14 graphically show the percentage time for the critical steps in programming the prior art and the interface of the present invention.
Figure 14:
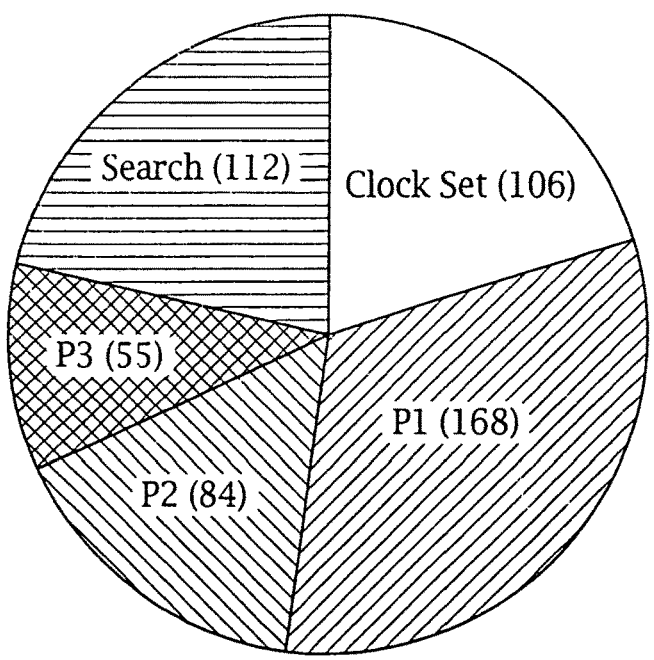

The preferred embodiments of the present invention will now be described with reference to the Figures. Identical elements in the various figures are designated with the same reference numerals.

Example 1

VCR Interface

A preferred embodiment of the interface of the present invention, described in the present example, provides automatic sequencing of steps, leading the user through the correct sequence of actions to set a program on the screen, so that no necessary steps are omitted, and no optional steps are accidentally or unintentionally omitted. These steps are shown diagrammatically in FIG. 15 of the present invention. In addition, such a system does not burden the user with the necessity of inputting superfluous information, nor overwhelm the user with the display of unnecessary data. See, Hoffberg, Linda I., "AN IMPROVED HUMAN FACTORED INTERFACE FOR PROGRAMMABLE DEVICES: A CASE STUDY OF THE VCR", Master's Thesis, Tufts University; Hoffberg, Linda I., "Designing User Interface Guidelines For Time-Shift Programming of a Video Cassette Recorder (VCR)", Proc. of the Human Factors Soc. 35th Ann. Mtg. pp. 501-504 (1991); and Hoffberg, Linda I., "Designing a Programmable Interface for a Video Cassette Recorder (VCR) to Meet a User's Needs", Interface 91 pp. 346-351 (1991). See also, U.S. patent application Ser. No. 07/812,805, incorporated herein by reference in its entirety, including appendices and incorporated references.

Many design considerations were found to be important in the improved interface of the present invention:

The interface should preferably employ only minimal amounts of abbreviations and the use of complete words is especially preferred, except where a standard abbreviation is available or where an "iconic" or symbolic figure or textual cue is appropriate. Thus, standard abbreviations and symbols are acceptable, and displayed character strings may be shortened or truncated in order to reduce the amount of information that is to be displayed, where necessary or desirable. An option may be provided to the user to allow full words, which may decrease the information which may be conveyed on each screen and increase the number of screens that must be displayed, or abbreviations and symbols, which may minimize the number of displayed screens of information, thus allowing the user to make the compromise. This aspect of the system may also be linked to the adaptive user level function of the present invention, wherein abstract symbols and abbreviations are presented to advanced users, while novices are presented with full words, based on an implicit indication of user level. These abstract symbols and abbreviations may be standard elements of the system, or user designated icons. Of course, the user could explicitly indicate his preference for the display type, thus deactivating the automatic adaptive user level function.

If multiple users use the device, then the device identifies the relevant users. This may be by explicit identification by keyboard, bar code, magnetic code, smart card (which may advantageously include a user profile for use with a number of devices), an RF-ID or IR-ID transponder, voice recognition, image recognition, or fingerprint identification. It is noted that smart cards or other intelligent or data-containing identifications systems may be used with different types of devices, for example video, audio, home appliances, HVAC and automobile systems.

Where a new user is identified to the system, an initial query may be made to determine an optimum initial user level. This allows further identification of the user and preference determination to occur more efficiently.

In applications in which a user must program an event on a certain date, at a certain time, a built-in calendar menu screen is preferably employed so that the user cannot set the device with a program step that relies on a non-existent date. Technology that will help eliminate the human problem of setting the wrong (yet existing) date may also be employed. Such technology might include accessing an on-line or other type of database containing media programming information, and prompting the user regarding the selected choice. In situations where it is applicable, the interface should indicate to the user the number of characters the interface is expecting, such as when entering the year.

Figure 16:
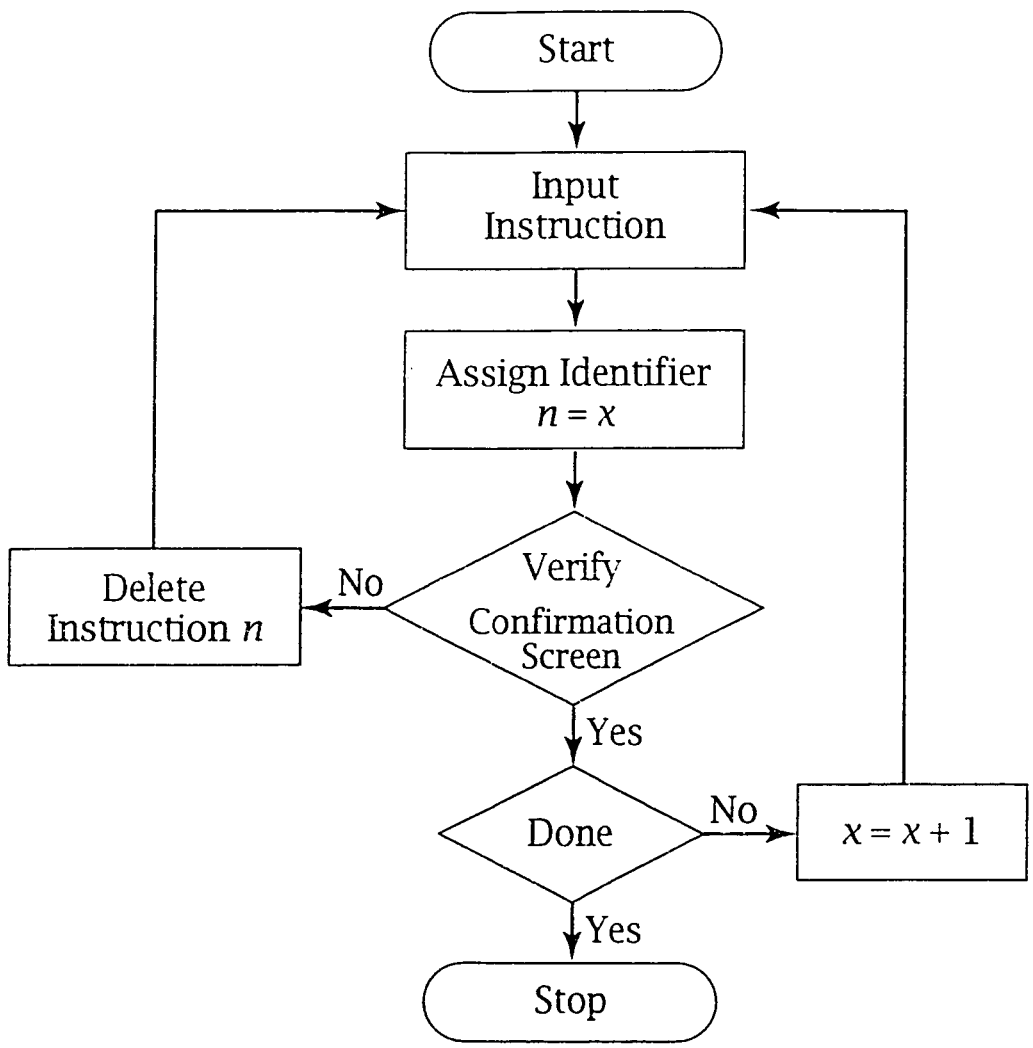
FIG. 16 is a flow diagram of the program input verification system of the present invention.

The interface system provides an easily accessible CHANGE, CANCEL or UNDO (single or multiple level) feature, which facilitates backtracking or reprogramming the immediately previously entered information rather than forcing the user to repeat all or a substantial portion of the programming steps. A method of the type described is shown in FIG. 16 of the present invention. User input is also facilitated by the provision of frequently used settings as explicit choices, such as, referring to the VCR example, "Record today," "Record tomorrow," "Noon," and "Midnight," so that the user does not have to specify a date in these cases. This will eliminate extra keypresses, and reduce the programming time. In addition, this could eliminate user errors. Frequently used choices for program selections are also provided to the user to reduce the number of programming steps necessary and provide the user with all the frequently used selections. The especially preferred choices are "Once On.", "Once a Week on.", "Monday-Friday at.", "Everyday at.". These redundant, complex instructions reduce the number of keystrokes required for data entry, and reduce the amount of programming time required.

The presently described interface system also provides, in the event that a color screen is available, conservatively used color coding, which allows the user to effectively and quickly acknowledge the function of each aspect of the screen. When programming, the preferred colors are royal blue for "help," red for mistakes, light blue for information previously entered, and yellow for current information being entered. Of course, other colors could be used, according to the user's or designer's preference, cultural differences, and display parameters.

When viewing, it is preferable that screen colors change to indicate status changes, such as viewed/unviewed, or to categorize the shows.

Figure 15:
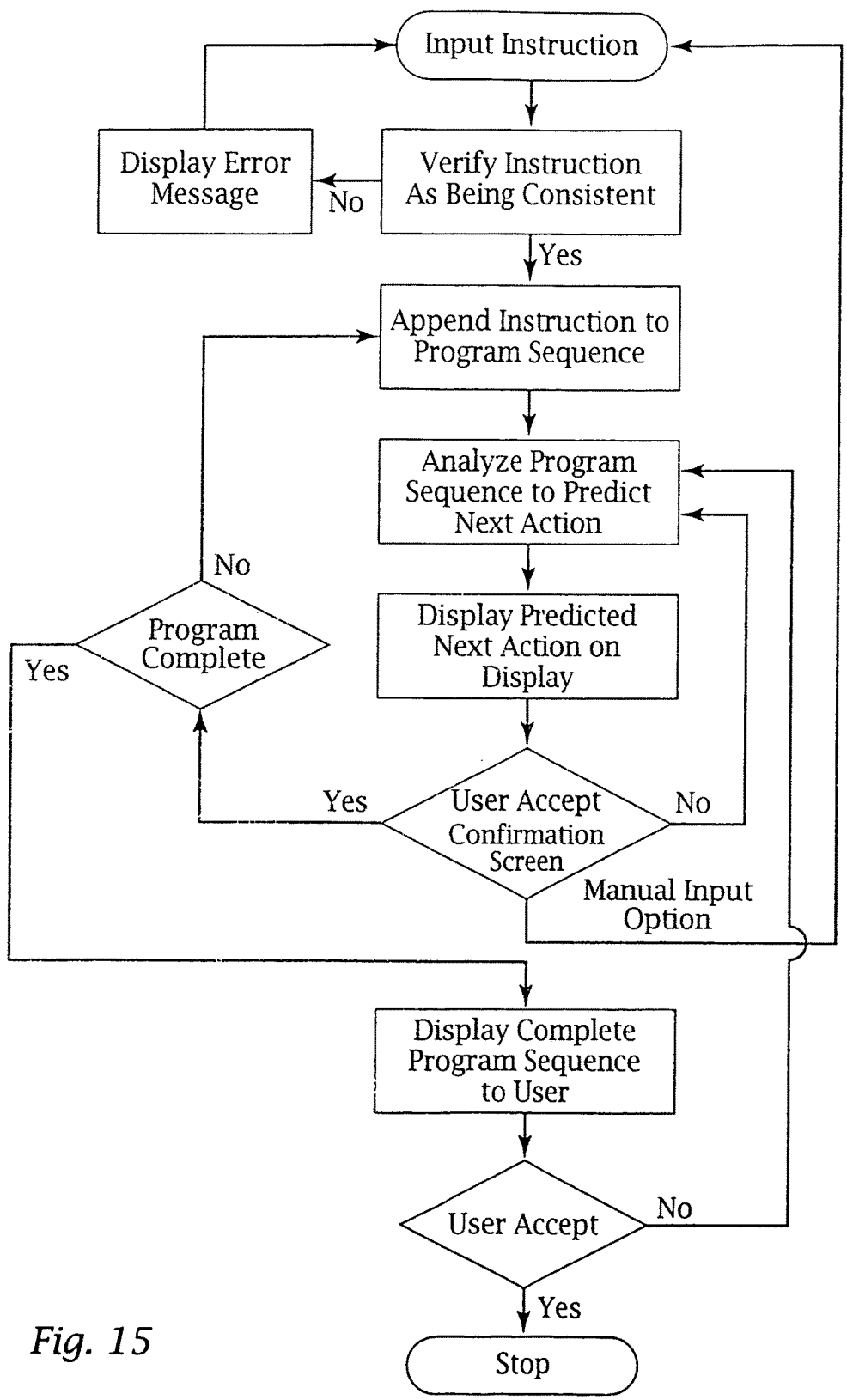
FIG. 15 is a flow diagram of a predictive user interface of the present invention.

The interface includes a confirmation screen which displays to the user all of the categories and selections previously explicitly entered or otherwise inferred, and should be easily understandable. This is shown in FIG. 15 of the present invention. All of the necessary information is displayed on this screen, in addition to the change and cancel options. if possible.

The entering of information on each screen is preferably consistent throughout the various interface options and levels. All of the screens preferably have similar layouts. "Buttons" or screen locations which are keyed to a particular function, which appear on multiple screens, should appear in approximately the same location on all screens. However, in certain cases, relatively more important information on a given screen may be displayed more prominently, and possibly in a different screen location, in order to reduce the search time. Further, when other factors dictate, each screen may be independently optimized for the prescribed function. For example, a representation of an analog clock dial may be used to set time information. However, even if the format does change, a standard scheme should be maintained, such as the use of a particular color to indicate that a particular program aspect has been changed.

The interface should display data consistent with standards and conventions familiar to users. For, e.g., when entering dates, users are most familiar with calendars. However, this type of presentation of choices does not eliminate the human problem of entering incorrect information, e.g., setting a wrong, but existing, date. The problem of ensuring the accuracy of user input may be addressed by an intelligent interface which stores data concerning programming, user preferences, and by means of some logical method, such as Boolean logic, fuzzy logic, neural network theory, or any other system which may be used to generate a prediction, to determine if an entry is likely in error, by comparing the prediction with the entry. Of course, these predictive systems would also provide an initial default entry, so that an a priori most probably action or actions may be initially presented to the user.

In addition to following conventions of information presentation to the user, the interface of the present invention may also provide emulations of other user interfaces of which a particular user may be familiar, even if these are not optimized according to the presently preferred embodiments of the present invention, or not otherwise well known. These emulations need not even be of the same type of device, so that a broad based standard for entry of information into a programmable controls, regardless of their type, may be implemented. By allowing emulation, the interface could provide compatibility with a standard or proprietary interface, with enhanced functionality provided by the features of the present interface.

These enhanced functional intelligent aspects of the controller may be implemented by means of software programming of a simple microcomputer, or by use of more specialized processors, such as a Fuzzy Set Processor (FSP) or Neural Network Processor to provide real-time responsiveness, eliminating delays associated with the implementation of complex calculations on general purpose computing devices.

In the various embodiments according to the present invention, various control strategies are employed. Depending on the application, fuzzy set processors (FSP's) may be preferred because they have the advantage of being easier to program through the use of presumptions or rules for making the fuzzy inferences, which may be derived by trial and error or the knowledge of experts, while Neural Networks are less easily explicitly programmed and their network weighing values are not easily understood in the abstract, but these systems may be applied to learn appropriate responses from test data. Thus, neural networks tend to require extensive "training", while Fuzzy Set Processors may be explicitly programmed without the need of duplicating or simulating actual operating conditions, but may require "fine tuning".

The most frequently used choices preferably should be displayed as the default setting. The screen cursor preferably appears at the "accept" screen button, when the screen is displayed. This default can either be set in advance, or acquired by the system. In the case of acquired defaults, these may be explicitly set by the user or adaptively acquired by the system through use. The interface of the present invention may be taught, in a "teach" mode, the preferences of the user, or may also acquire this information by analyzing the actual choices made by the user during operation of the interface and associated controller. This type of operation is shown schematically in FIG. 15 of the present invention. The options of "Midnight" (12:00 AM) and "Noon" (12:00 PM) should preferably be present, as some people often become confused when distinguishing between them. Icons, such as those indicative of the "sun" and the "moon", may also be used to facilitate data entry for AM and PM. The interface should preferably utilize an internal clock and calendar so that the user cannot set the time or program to record on a nonexistent date. Such a system could also compensate for daylight-savings time seasonal adjustments.

The cursor is preferably distinctive and readily distinguished from other parts of the screen. This may be by color, attribute (i.e. blinking), size, font change of underlying text, or by other means.

The user can preferably exit the programming sequence at any time by selecting a "Main Menu" button which may exist on the lower left-hand corner of every screen. The user is preferably provided with an adequate amount of feedback, and error messages should be directive in nature. Some form of an acknowledgement is preferably displayed after each entry. The user should preferably not be able to go to the next programming step until the current step has been completed. A message to convey why the user can not continue should appear when an attempt to prematurely continue is recognized.

The "help" function is available for when the user does not know what to do. The "help" screen(s) preferably explains the functions of each of the available buttons or functions, but may also be limited to those that are ambiguous. The "help" screen may also be used to indicate a current status of the interface and the controller. Further, the "help" function may also provide access to various other functions, such as advanced options and configurations, and thus need not be limited to merely providing information on the display. The help system may incorporate a hypertext-type system, wherein text or information relating to concepts that are conceptually linked may be easily accessed by indicating to the interface system that the related information is desired. To eliminate the possibility of the user trying to make selections on merely informative help screens, the cursor, in these cases, should be locked to a choice which returns the user to where they left off in the programming sequence, and this choice should be highlighted.

The "help" function may also comprise "balloon help" similar to the system adopted by Apple Computer, Inc. in Macintosh Operating System, e.g., 7.0, 7.1, 7.5, etc.

The interface preferably initiates the programming sequence where the user wants to be, so that the interface has so-called "smart screens". For example, when a VCR is first powered up or after an extended power failure, and the time and date are not stored in the machine, the "set date" and "set time" screens should appear. The sequence of screens may also vary depending on the system predicted requirements of the user and various aspects of the improved interface of the present invention. This is shown schematically in FIG. 17 of the present invention.

The preferable input device for the interface of the present invention provides as few buttons as possible to achieve the required functionality, thus reducing potential user intimidation, focusing the user's attention on the interactive display screen, where the available choices are minimized to that number necessary to efficiently allow the user to program the discrete task presented. Such a minimization of discrete inputs facilitates a voice recognition input, which may be used as an alternative to mechanical input devices. The preferred embodiment includes a direct-manipulation type interface, in which a physical act of the user causes a proportionate change in the associated interface characteristic, such as cursor position. A computer mouse, e.g. a two dimensional input device, with 1 to 3 buttons is the preferred input device, for use with a general purpose computer as a controller, while a trackball on a remote control device is especially preferred for limited purpose controllers because they do not require a flat surface for operation. Other stationary or movement sensitive input devices may, of course be used, such as joysticks, gyroscopes, sonic echolocation, magnetic or electrostatic location devices, RF phase location devices, Hallpots (joystick-like device with magnets that move with respect to Hall effect transducers), etc. The present interface minimizes the number of necessary keys present on an input device, while maintaining the functionality of the interface. It is noted that a strict minimization without consideration of functionality, might lead to inefficiency. For example, in a VCR device, if the user wants to record a program which airs Monday through Friday, he would have to set five separate programs, rather than one program if a "weeknights" choice is made available.

The interface preferably should be easy to learn and should not require that a user have prior knowledge of the interface in order to use it. An attempt has been made to minimize the learning curve, i.e., to minimize the time it takes to learn how to use the device.

Menu options are preferably displayed in logical order or in their expected frequencies. Research has shown that a menu-driven interface is best for applications involving new users and does not substantially hinder experienced users. Menu selection is preferably used for tasks which involve limited choices. They are most helpful for users with little or no training. Each menu should preferably allow only one selection at a time. Most of the information is preferably entered using a numeric keypad (entry method), rather than using up and down arrow keys (selection method). In addition, no leading zeros are required for entry. If there is more than one keystroke required, the user must then select an "OK" button to continue in the programming sequence. However, if the selection method is used, all of the choices are displayed on the screen at once. The number of steps required to complete the task through a sequence of menus should be minimized. The choice of words used to convey information should not be device specific, i.e., computer terms, but rather normal, everyday terms which are easy to understand. In addition, very few abbreviations should be used. All necessary information which the user needs should preferably be displayed at once. A user preferably should not have to rely on his memory or his previous experience, in order to find the correct choice, at least at the lower user levels. If all selections cannot be displayed at once, a hierarchical sequence is preferably used. A main menu should preferably provide a top level to which the user can always return and start over.

Searching and learning times should be kept to a minimum in order to obtain a subjectively better interface. The system's logic should reflect the users' expectations, offer visual clues and feedback, and stay within human memory limits. For example, the VCR should turn on not only with the "Power" button, but also when inserting a tape into the device. In addition, the sequence of steps for setting the machine to record, if the user does not indicate implicitly or explicitly that he knows how to use the device, should assume that the user is a novice, and fully prompt the user for elemental items of information. Nothing should be taken for granted. By developing an improved interface, an attempt is made to: reduce the searching time; reduce the learning time; simplify the entering of data; and, reduce the intimidation experienced by certain persons when using electronic devices.

Tests by an inventor hereof show that people do not program their VCRs often, and they often forget the sequence of steps between recording sessions. Thus, the present invention preferably incorporates an adaptive user level interface, wherein a novice user is presented with a simpler interface with fewer advanced features initially available, so that there is reduced searching for the basic functions. A more advanced user is presented with more advanced choices and functions available initially, as compared to a novice user.

Figure 17:
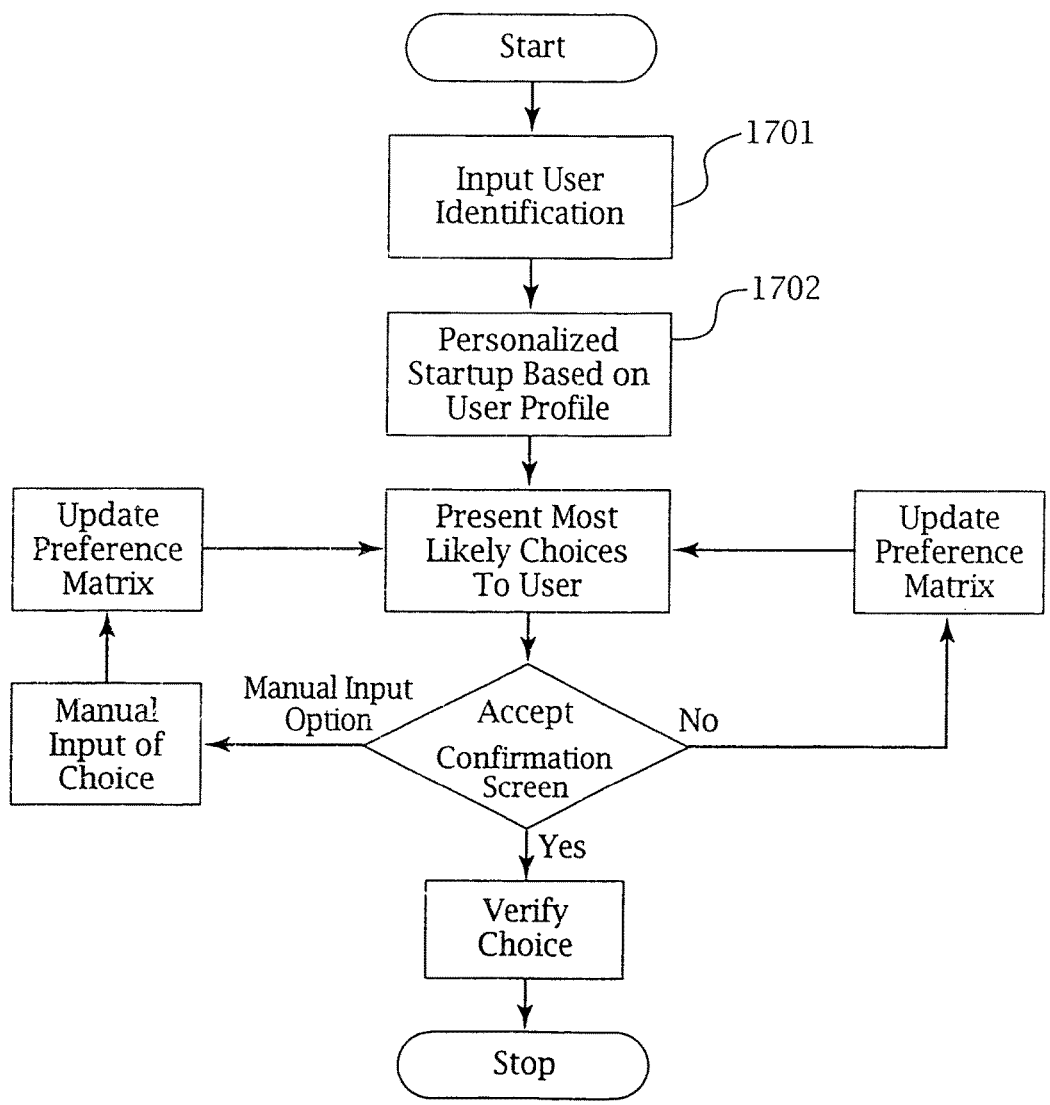
FIG. 17 is a flow diagram of a predictive user preference aware interface of the present invention.

Thus, as shown in FIG. 17, the user identifies himself to the controller in block 1701. The controller 1806 of FIG. 18 thereafter uses a stored profile of the identified user in controlling the interaction with the user, as shown in block 1702 of FIG. 17, from information stored in the database 1807 of FIG. 18 of the present invention. It has been found that in the case of novice users, a greater number of simple instructions may be more quickly and easily input rather than a potentially fewer number of a larger set of more complex instructions. It has further been found that, even if presented with a set of instructions which will allow a program to be entered with a fewer number of inputs, a novice user may choose to input the program using the simple instructions exclusively, thus employing an increased number of instructions and being delayed by an increased search time for those instructions that are used, from the larger set.

Other characteristics of this interface include color coding to help prompt the user as to which data must be entered. Red text signifies instructions or errors, yellow text represents data that must be entered or has not been changed, and blue text shows newly entered program data or status information. Blue buttons represent buttons that should normally be pressed during the programming sequence. Red buttons signify an erratic pattern in the data entry, such as the "cancel" and "return to main menu" buttons. Of course, these colors can be replaced by other display attributes, such as intensity, underline, reverse video, blinking and pixel dithering pattern, in addition to the use of various fonts. Such a situation would include a monochrome monitor or display.

The date may be entered in the form of a calendar rather than as numbers (i.e., "9/6/91"). This calendar method is advantageous because users may wish to input date data in one of three ways: day of the week, day relative to the present, and day of the month. The present method allows the current date to be highlighted, so that the calendar may be used to easily enter the absolute day, absolute date, and relative day. Further, the choices "today" and "tomorrow", the most frequently used relative recording times, are included in addition to a month-by-month calendar. This information is provided to avoid an unnecessary waste of time and user frustration. Thus, another aspect of the present invention is to provide a partially redundant interactive display input system which allows, according to the highest probability, the choices to be prominently displayed and easily available, in addition to allowing random access to all choices.

The present device allows common user mistakes to be recognized and possibly addressed, such as the confusion between 12:00 PM and 12:00 AM with midnight and noon, respectively. Therefore, the options of "noon" and "midnight" are provided in addition to a direct numeric clock input. When entering time information, leading zeros need not be entered, and such information may be entered in either fashion.

The criteria for system acceptance of input depends on how many keystrokes are required on the screen. If only one keystroke is required to complete input of the information, upon depressing the key, the programming sequence will continue. If more than one keypress is required, the user must depress the "OK" button to continue programming. This context sensitive information entry serves to avoid unnecessary input.

An on-line "help" system and on-line feedback is preferably provided to the user throughout various aspects of the interface. Other features include minimizing the number of keypresses required to program the device. These features, together with other aspects of the present invention allow the user to achieve a greater efficiency with the input device than with prior art devices.

The interface of the present invention applied to a VCR control preferably comprises a virtual keypad entry device (i.e. a representation of an array of choices), a directional input control for a cursor on a display screen, and selection buttons. The input device has an input corresponding to a direction of movement relative to the cursor position. Thus, since the present input device seeks to minimize the physical control elements of the human interface device, the display elements for a preferred embodiment of the present interface include:
  1. number keys 0-9.
  2. enter key.
  3. cancel key.
  4. status indicator.
  5. return to menu option button.
  6. program type indicator: program once, program once a week, program Monday-Friday, program everyday.
  7. Day indicators: 7 week days, today, tomorrow.
  8. Noon and midnight choices.
  9. Help button.
  10. Main menu options: Review, Enter new recording time, Set time, Set date.
  11. Timer button.
  12. Power button.
  13. AM/PM choices.
  14. 31 day calendar.
  15. 12 month Choices.
  16. 3 tape speed choices.

User dissatisfaction is generally proportionate to the length of "search time," the time necessary in order to locate and execute the next desired function or instruction. Search time may be minimized by the inclusion of up to a maximum of 4-8 choices per screen and by use of consistent wording and placement of items on the display.

The present invention proceeds from the understanding that there are a number of aspects of a programmable interface that are desirable:

First, users should be able to operate the system successfully, without wide disparities in time. It should take, e.g., a normal person interacting with a VCR interface, less than seven minutes to set the time and two programs. Searching time spent in setting the clock, programming, getting into the correct mode, and checking whether or not the VCR is set correctly should be kept to a minimum through the appropriate choices of menu layout and the presentation of available choices.

Second, programming should be a stand-alone process, and not require an instruction manual. A help system should be incorporated in the interface. Word choices should be understandable, with a reduction in the use of confusing word terminology. Error messages should be understandable. The system should provide the ability to cancel, change or exit from any step.

Third, the system should provide on-screen understandable information, with adequate visual feedback. The displays should be consistent. Color coding should be employed, where applicable, using, e.g. blue—new input; red—error condition; yellow—static, unchanged value.

Layouts should be logical, and follow a predictable pattern. There should be a maximum of 4-8 choices per screen to minimize searching time. Keys should be labeled with text rather than with ambiguous graphics. However, a combination of both may be preferable in some cases.

Fourth, steps required to complete tasks should be simple, require a short amount of time and not create user frustration. The system should guide the user along a decision path, providing automatic sequencing of steps. The most frequently used choices should be provided as defaults, and smart screens may be employed. The learning curve should be minimized through the use of easily understandable choices. As a user becomes more sophisticated, the interface may present more advanced choices.

Fifth, there should be a reminder to set the timer and to insert the tape once the programming information is entered. This reminder may also be automated, to eliminate the commonly forgotten step of setting the timer, so that the VCR automatically sets the timer as soon as the necessary information is entered and a tape is inserted. Once the program is set in memory, a message should appear if a tape is not inserted. If the VCR is part of a "jukebox" (automatic changer), the tape may be automatically loaded. The VCR should preferably turn on when a tape is inserted. In addition, users should also be able to control the VCR with a Power button.

Sixth, the VCR should be programmable from both the remote device and the control panel.

Seventh, each operation should require only one keypress, if possible, or otherwise reduce the number of keypresses required. There should be a 12 hour clock, not a 24 hour clock. There should be an on-screen keypad with entry keys, not "up" and "down" selector keys, allowing for the choice of specific day or time entry. There should be a "start" and a "stop" recording time, rather than "start" time and "length of program" or duration exclusively. The number of buttons on the remote control should be minimized so that as few buttons as are required are provided. The input device should provide for the direct manipulation of screen elements. A menu driven interface should be provided.

The interface of the present invention provides an automatic sequencing of steps which does not normally let the user think the previous step is complete. This is shown schematically in FIG. 16. In this manner, important steps will not be inadvertently omitted. Upon entering the programming sequence, if the current date or time is not set, the interface will prompt the user to enter this information. Thereafter, the interface will normally default to the main menu, the most frequently used first screen. Thus, the interface of the present invention is adaptive, in that its actions depend on the current state of the device, including prior programming or use of the device by the user. It can be appreciated that this adaptive behavior can be extended to include extended "intelligence". For example, if the device is similarly programmed on a number of occasions, then the default setup may be adapted to a new "normal" program mode. Further, the apparatus could provide multiple levels of user interface, e.g. beginner, intermediate, and advanced, which may differ for various functions, based on the behavior of the user. This user interface level determining feature extraction system is shown diagrammatically in FIG. 18. In contrast, prior art interfaces that have different user interface levels, allow the user to explicitly choose the interface level, which will then be used throughout the system until reset.

The present system allows discrete tasks to be conducted more quickly, more efficiently, with reduced search time and with fewer errors than prior art systems.

Example 2

Serial Recording Medium Index

Figure 19:
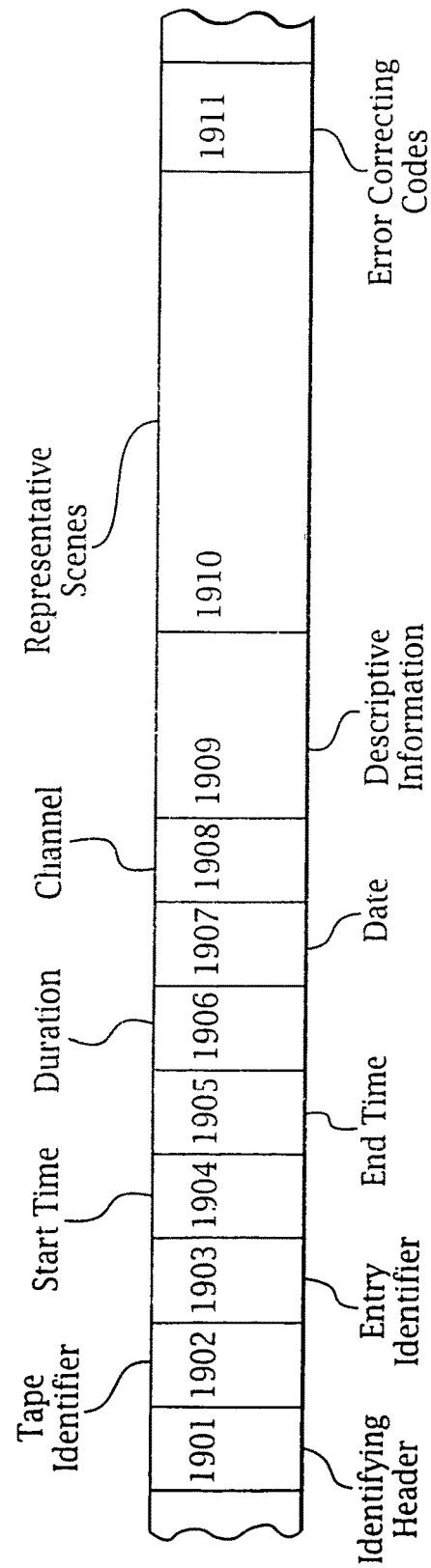
FIG. 19 is a diagram of a block of information for a catalog entry of the present invention.

In a preferred embodiment of the present invention, in a VCR, in order to track the content of the tape, a directory or a catalog is recorded, preferably digitally, containing the programming information, as well as additional information about the recorded programs, in a header, i.e., at the beginning of the tape, or at other locations on the tape. The device may also catalog the tape contents separately, and based on an identification of the tape, use a separately stored catalog. A preferred format for storing information is shown in FIG. 19.

Thus, if there are a number of selections on the tape, the entire contents of the tape could be accessible quickly, without the need for searching the entire tape. In a sequential access medium, the tape transport apparatus must still shuttle to the location of the desired material, but it may do so at increased speeds, because there is no need to read the tape once the location is determined; after the tape transport nears the desired spot, the tape may be slowed or precisely controlled to reach the exact location.

Figure 20:
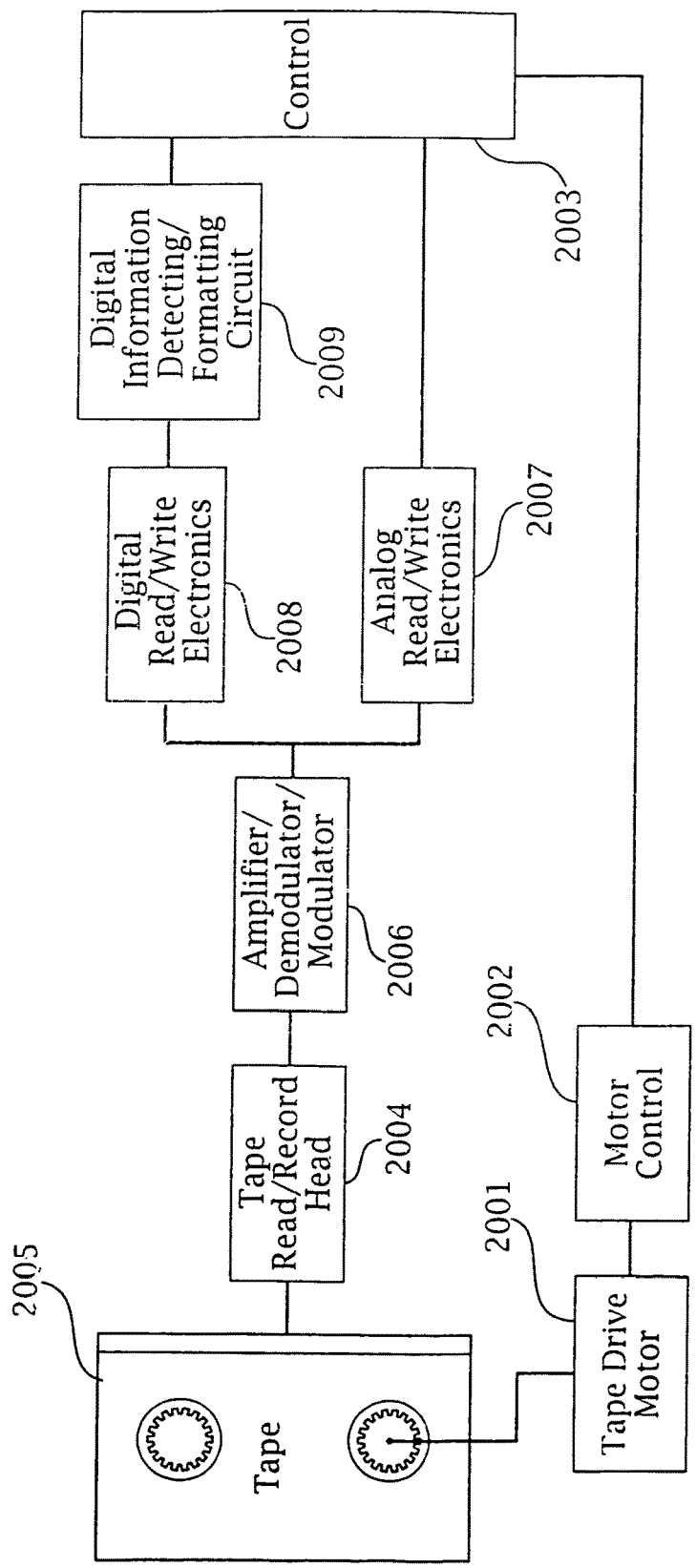
FIG. 20 is a block diagram of a digital information and analog signal reading/recording apparatus.

The tape read and drive system is shown schematically in FIG. 20. The algorithm used in the final stage of approach to the desired portion of the tape or other recording medium may incorporate a control employing Fuzzy logic, Neural Networks, mathematical formulae modeling the system (differential equations) in a Model-based system, a Proportional-Differential-Integral (PID) system, or a controller employing an algorithm of higher order, or other known control methods.

If a selection is to be recorded over, the start and stop locations would be automatically determined from the locations already indicated on the tape. Further, this information could be stored in memory device (which reads a catalog or index of the tape when a new tape is loaded) or non-volatile memory device (which stores information relating to known tapes within the device) or both types of memory in the VCR, so that an index function may be implemented in the VCR itself, without the need to read an entire tape. Optionally, a printer, such as a thermal label printer (available from, e.g. Seiko Instruments, Inc.), attached to the device, could be available to produce labels for the tapes, showing the index, so that the contents of a tape may be easily indicated. A label on the tape may also include a bar code or two-dimensional coding system to store content or characterization information. The stored identification and index information is thus stored in a human or machine readable form.

These contents, or a list of contents, need not necessarily be manually entered by the user or created by the apparatus, rather, these may be derived from published data or a database, data transmitted to the control, and/or data determined or synthesized by the control itself. For example, broadcast schedules are available in electronic or machine readable form, and this information may be used by the apparatus.

Example 3

Serial Data Medium Index

Another aspect of the present invention relates to the cataloging and indexing of the contents of a storage medium. While random access media normally incorporate a directory of entries on a disk, and devices such as optical juke boxes normally are used in conjunction with software that indexes the contents of the available disks, serial access mass storage devices, such as magnetic tape, do not usually employ an index; therefore, the entire tape must be searched in order to locate a specific selection.

In the present invention, an area of the tape, preferable at the beginning of the tape or at multiple locations therein, is encoded to hold information relating to the contents of the tape. This encoding is shown in FIG. 19, which shows a data format for the information. This format has an identifying header 1901, a unique tape identifier 1902, an entry identifier 1903, a start time 1904, an end time 1905 and/or a duration 1906, a date code 1907, a channel code 1908, descriptive information 1909 of the described entry, which may include recording parameters and actual recorded locations on the tape, as well as a title or episode identifying information, which may be a fixed or variable length entry, optionally representative scenes 1910, which may be analog, digital, compressed form, or in a form related to the abstract characterizations of the scenes formed in the operation of the device. Finally, there are error correcting codes 1911 for the catalog entry, which may also include advanced block encoding schemes to reduce the affect of non-Gaussian correlated errors which may occur on video tape, transmission media and the like. This information is preferably a modulated digital signal, recorded on, in the case of Hi-Fi VHS, one or more of the preexisting tracks on the tape, including the video, overscan area, Audio, Hi-Fi stereo audio, SAP or control tracks. It should be noted that an additional track could be added, in similar fashion to the overlay of Hi-Fi audio on the video tracks of Hi-Fi VHS. It is also noted that similar techniques could be used with Beta format, 8 mm, or other recording systems, to provide the necessary indexing functions.

Digital data may also be superimposed as pseudonoise in the image information, or as other information intermixed or merged with the video information.

The recording method is preferable a block encoding method with error correction within each block, block redundancy, and interleaving. Methods are known for reducing the error rate for digital signals recorded on unverified media, such as videotape, which are subject to burst errors and long term non-random errors. Such techniques reduce the effective error rate to acceptable levels. These are known to those skilled in the art and need not be discussed herein in detail. A standard reference related to this topic is *Digital Communications* by John G. Proakis. McGraw-Hill (1983). The digital data recording scheme is best determined according to the characteristics of the recording apparatus. Therefore, if an, e.g. Sony Corporation helical scan recording/reproducing apparatus was employed, one of ordinary skill in the art would initially reference methods of the Sony Corporation initially for an optimal error correcting recording scheme, which are available in the patent literature, in the U.S., Japan, and internationally, and the skilled artisan would also review the known methods used by other manufacturers of digital data recording equipment. Therefore, these methods need not be explained herein in detail.

The catalog of entries is also preferably stored in non-volatile memory, such as hard disk, associated with the VCR controller. This allows the random selection of a tape from a library, without need for manually scanning the contents of each tape. This also facilitates the random storage of recordings on tape, without the requirement of storing related entries in physical proximity with one another so that they may be easily located. This, in turn, allows more efficient use of tape, because of reduced empty space at the end of a tape. The apparatus is shown schematically in FIG. 20, in which a tape drive motor 2001, controlled by a transport control 2002, which in turn is controlled by the control 2003, moves a tape 2005 past a reading head 2004. The output of the reading head 2004 is processed by the amplifier/demodulator 2006, which produces a split output signal. One part of the output signal comprises the analog signal path 2007, which is described elsewhere. A digital reading circuit 2008 transmits the digital information to a digital information detecting circuit 2009, which in turn decodes the information and provides it to the control 2003.

In order to retrieve an entry, the user interacts with the same interface that is used for programming the recorder functions; however, the user selects different menu selections, which guide him to the available selections. This function, instead of focusing mainly on the particular user's history in order to predict a selection, would analyze the entire library, regardless of which user instituted the recording. Further, there would likely be a bias against performing identically the most recently executed function, and rather the predicted function would be an analogous function, based on a programmed or inferred user preference. This is because it is unlikely that a user will perform an identical action repeatedly, but a pattern may still be derived.

It is noted that the present library functions differ from the prior art VHS tape index function, because the present index is intelligent, and does not require the user to mark an index location and explicitly program the VCR to shuttle to that location. Rather, the index is content based. Another advantage of the present library function is that it can automatically switch media and recording format, providing an adaptive and/or multimode recording system. Such a system might be used, for example, if a user wishes to record, e.g., "The Tonight Show With Johnny Carson" in highly compressed form, e.g. MPEG-2 at 200:1 compression, except during the performance of a musical guest, at which time the recording should have a much lower loss, e.g., MPEG-2 at 20:1, or in analog format uncompressed. A normal VCR could hardly be used to implement such a function even manually, because the tape speed (the analogy of quality level) cannot generally be changed in mid recording. The present system could recognize the desired special segment, record it as desired, and indicate the specific parameters on the information directory. The recorded information may then be retrieved sequentially, as in a normal VCR, or the desired selection may be preferentially retrieved. If the interface of the present invention is set to automatically record such special requests, the catalog section would then be available for the user to indicate which selections were recorded based upon the implicit request of the user. Because the interface has the ability to characterize the input and record these characterizations in the index, the user may make an explicit request different from the recording criteria, after a selection has been recorded. The controller would then search the index for matching entries, which could then be retrieved based on the index, and without a manual search of the entire tape. Other advantages of the present system are obvious to those of ordinary skill in the art.

A library system is available from Open Eyes Video, called "Scene Locator", which implements a non-intelligent system for indexing the contents of a videotape. See New-Media, November/December 1991, p. 69.

It is noted that, if the standard audio tracks are used to record the indexing information, then standard audio frequency modems and recording/receiving methods are available, adapted to record or receive data in half-duplex mode.

These standard modems range in speed from 300 baud to about 64 kilobits per second, e.g. v.29, v.17, v.32, v.32bis, v.34, v.90, v.91, etc. While these systems are designed for dial-up telecommunications, and are therefore are designed for the limited data rates available from POTS. These are limited to a slower speed than necessary and incorporate features unnecessary for closed systems, they require a minimum of design effort and the same circuitry may be multiplexed and also be used for telecommunication with an on-line database, such as a database of broadcast listings, discussed above. It should be noted that a full-duplex modem should be operated in half duplex mode when reading or recording on a media, thus avoiding the generation of unnecessary handshaking signals. Alternatively, a full duplex receiver may be provided with the resulting audio recorded. A specially programmed receiver may extract the data from the recording. DTMF codes may also be employed to stored information.

The Videotext standard may also be used to record the catalog or indexing information on the tape. This method, however, if used while desired material is on the screen, makes it difficult (but not impossible) to change the information after it has been recorded, without re-recording entire frames, because the videotext uses the video channel, during non-visible scan periods thereof. The video recording system according to the present invention preferably faithfully records all transmitted information, including SAP, VAR, close caption and videotext information, which may be used to implement the various functions.

The use of on-line database listings may be used by the present interface to provide information to be downloaded and incorporated in the index entry of the library function, and may also be used as part of the intelligent determination of the content of a broadcast. This information may further be used for explicitly programming the interface by the user, in that the user may be explicitly presented with the available choices available from the database.

Example 4

Controlled Encryption and Accounting System

The present invention also allows for scrambling, encryption and locking of source material, and the receiving device selectively implements an inverse process or a partial inverse process for descrambling, decryption or unlocking of the material, much as the Videocipher series systems from General Instruments, and the fractal enciphering methods of Entertainment Made Convenient[2] Inc. (EMC[2], and related companies, e.g., EMC[3], and Iterated Systems, Inc.) The present invention, however, is not limited to broadcasts, and instead could implement a system for both broadcasts and prerecorded materials. In the case of copying from one tape to another, such a system could not only provide the herein mentioned library functions of the present invention according to Example 2, it could also be used to aid in copy protection, serial copy management, and a pay-per-view royalty collection system.

Figure 18:
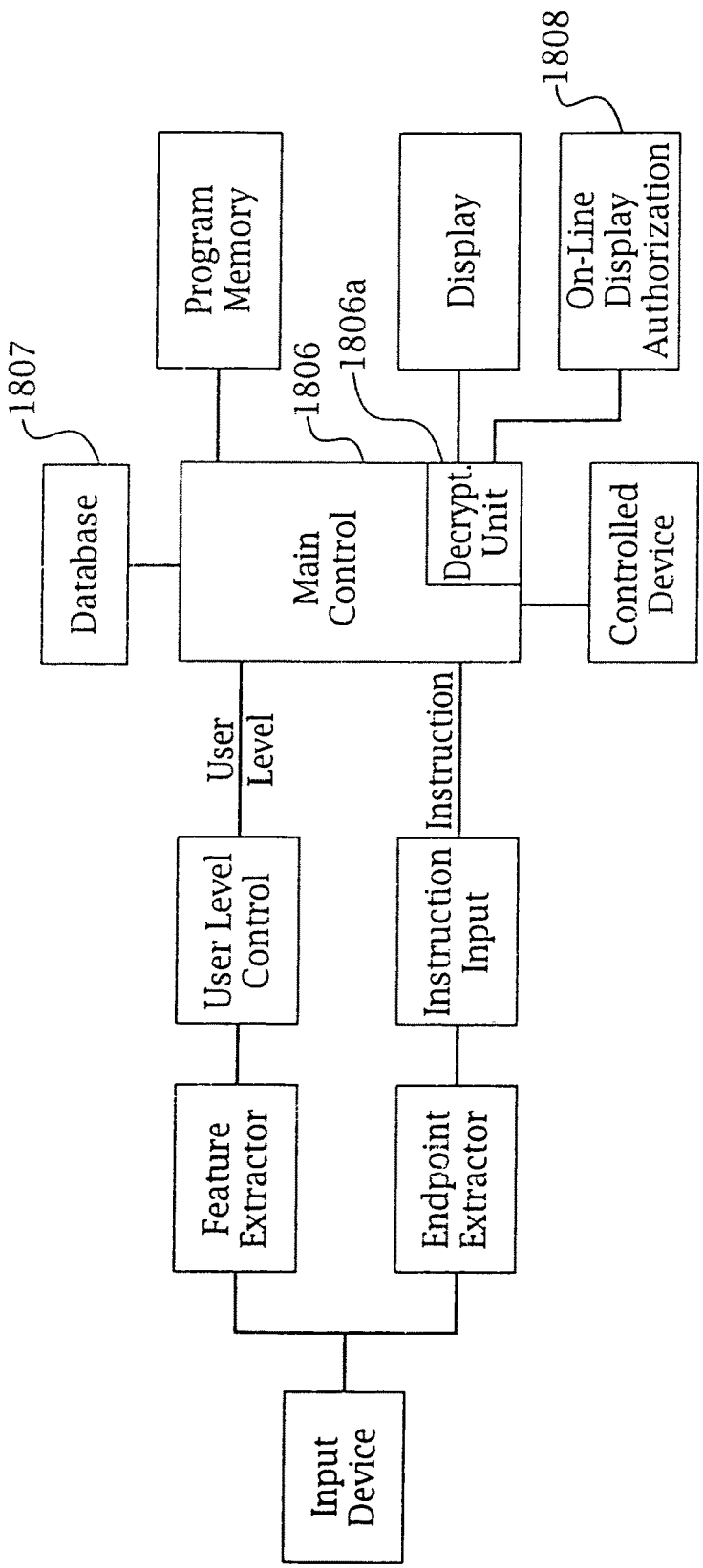
FIG. 18 is a block diagram of a non-program information feature extraction circuit of the present invention.

Such a system could be implemented by way of a telecommunication function incorporated in the device, shown as block 1808 of FIG. 18, or an electronic tag which records user activity relating to a tape or the like. Such tags might take the form of a smart card, PCMCIA device, or other type of storage device. A royalty fee, etc., could automatically be registered to the machine either by telecommunication or registry with the electronic tag, allowing new viewer options to be provided as compared with present VCR's.

Numerous digital data encryption and decryption systems are known. These include DES, "Clipper", elliptic key algorithms, public key/private key (RSA, etc.), PGP, and others. Digital encryption allows a sender to scramble a message so that, with an arbitrary degree of difficulty, the message cannot be determined without use of a decryption key.

An encrypted tape or other source material may be decrypted with a decryption key available by telecommunication with a communication center, remote from the user, in a decryption unit, shown schematically as the decrypt unit 1806*a* of FIG. 18. Such an encryption/decryption scheme requires special playback equipment, or at least equipment with decryption functionality, and thus any usage or decrypted data may be registered as a result of the requirement to receive a decryption key. The decryption unit may be part of an addressable remote unit for control of the unit remotely.

During acquisition of the electronic decryption key, a VCR device of an embodiment of the present invention would indicate its identity or electronic address, and an account is charged a fee for such use. The negotiation for the electronic key is also preferably encrypted. In addition, the decryption key may be specific for a particular decoder: Such a system could also be used for controlled access software, for example for a computer, wherein a remote account is charged for use of the software. Information communication may be through the Internet or through an on-line service such as America Online or Compuserve.

Such a system differs from the normal hardware "key" or "dongle" (device which attaches to standard hardware port for authentication and usage limitation) because it requires on-line or electronic access for an encryption key, which may offer different levels of use. It also differs from a call-in registration, because of the automatic nature of the telecommunication. This presently described system differs from normal pay-per-view techniques because it allows, in certain instances, the user to schedule the viewing. Finally, with an encryption function implemented in the VCR, the device allows a user to create and distribute custom "software" or program material. In addition, the present controller could then act as the "telecommunication center" and authorize decryption of the material.

If the source signal is in digital form, a serial copy management scheme system is preferably implemented.

The present invention is advantageous in this application because it provides an advanced user interface for creating a program (i.e. a sequence of instructions), and it assists the user in selecting from the available programs, without having presented the user with a detailed description of the programs, i.e., the user may select the choice based on characteristics rather than literal description.

In the case of encrypted program source material, it is particularly advantageous if the characterization of the program occurs without charging the account of the user for such characterization, and only charging the account if the program is viewed by the user. The user may make a viewing decision based on the recommendation of the interface system, or may review the decision based on the title or description of the program, or after a limited duration of viewing. Security of the system could then be ensured by a two level encryption system, wherein the initial decryption allows for significant processing, but not comfortable viewing, while the second level of decryption allows viewing, and is linked to the accounting system. Alternatively, the decryption may be performed so that certain information, less than the entirety, is available in a first decryption mode, while other information comprising the broadcast information is available in a second decryption mode.

The transmission encryption system may be of any type, but for sensitive material, i.e. where mere distortion of the material (e.g., loss of synchronization information and phase distortion) would be insufficient, an analog multiple subband transform, with spread spectrum band hopping and digital encryption of various control signals, would provide a system which would be particularly difficult for the user to view without authorization, and could be effectively implemented with conventionally available technology. The fractal compression and encryption of the $EMC^2$ and Iterated Systems, Inc. system is also possible, in instances where the broadcast may be precompressed prior to broadcast and the transmission system supports digital data. Of course, if a digital storage format is employed, a strict digital encryption system of known type may be used, such as those available from RSA. The implementation of these encryption systems is known to those skilled in the art. These may include the National Bureau of Standards (NBS), Verifiable Secret Sharing (VSS) and National Security Agency (NSA) encryption standards, as well as various proprietary standards.

Example 5

User Interface

In one embodiment of the present invention, the apparatus comprises a program entry device for a VCR or other type of media recording system. The human interface element has an infrared device to allow wireless communication between the human interface device and the VCR apparatus proper. The human interface device also includes a direct-manipulation type input device, such as a trackball or joystick. Of course it is understood that various known or to-be developed alternatives can be employed, as described above.

It is noted that many present devices, intended for use in computers having graphic interfaces, would advantageously make use of an input device which is accessible, without the necessity of moving the user's hands from the keyboard. Thus, for example, Electronic Engineering Times (EET), Oct. 28, 1991, p. 62, discloses a miniature joystick incorporated into the functional area of the keyboard. This technique is directed at a different aspect of user interaction with a programmable device than certain preferred embodiments of the present invention, in that the input device does not have a minimal number of keys. While the device disclosed in EET is intended for use in a full function keyboard, the preferred embodiment of the present invention is directed towards the minimization of the number of keys and avoidance of superfluous keys by provision of a pointing device. Of course, the present invention could be used with a full function input device, where appropriate, and the joystick of EET (Oct. 28, 1991, p. 62) would be suitable in this case.

The interface of the present invention studies the behavior and moods of the user, in context, during interactions to determine the expected user level of that user as well as the preferences of the user. These user characteristics may change over time and circumstances. This means that the system studies the interaction of the user to determine the skill of the user or his or her familiarity with the operation and functionality of the system. By determining the skill of the user, the system may provide a best compromise. The purpose of this feature is to provide a tailored interface adapted to the characteristics of the user, thus adaptively providing access to various features in a hierarchical manner such that a most likely feature to be used is more easily accessible than an unlikely feature, but that features can generally be accessed from all or most user levels. The user level analysis also allows the system to teach the user of the various functions available, particularly when it becomes apparent that the user is being inefficient in the use of the system to perform a given task. Therefore, the menu structure may also be adaptive to the particular task being performed by the user. When combined with the user level analysis feature, the user efficiency feature will provide a preferable interface, with reduced learning time and increased usability for a variety of users.

Thus, an important concept is that the system has at least one object having a plurality of functions, certain of which are unnecessary or are rarely used for various applications or in various contexts, while these are used with greater frequency in other contexts. Further, based upon predetermined protocols and learned patterns, it is possible to predict which functions will be used and which will not be used.

Therefore, the system, upon recognizing a context, will reconfigure the availability or ease of availability of functions and allow various subsets to be used through "shortcuts". Thus, to some extent, the interface structure may vary from time to time based upon the use of the system. The prior art apparently teaches away from this concept, because it is believed to prevent standardization, limits the "recordability" of macros and/or instruction sheets for casual users and limits the availability of technical support. Each of these can be addressed, to some extent by the availability of a default mode (so that users can access all information), and because the interface is self-simplifying in case of difficulty. However, forcing all users to always work in a default mode limits the improvements in productivity that may be gained by a data-sensitive processing system, and hence this standardization for its own sake is rejected by the present invention.

The improvements to be gained by using an intelligent data analysis interface for facilitating user control and operation of the system are more than merely reducing the average number of keystrokes or time to access a given function. Initial presentation of all available information to a new user might be too large an information load, leading to inefficiency, increased search time and errors. Rather, the improvements arise from providing a means for access of and availability to functions not necessarily known to the user, and to therefore improve the perceived quality of the product.

The system to determine the sophistication of the user includes a number of storage registers, for storing an analysis of each act for each user. A given act is represented in a plurality of the registers, and a weighting system to ensure that even though an act is represented in a number of registers, it is not given undue emphasis in the analysis. Thus, each act of the user may be characterized in a number of ways, and each characteristic stored in an appropriate register, along with a weighting representing an importance of the particular characteristic, in relation to other identified characteristics and in relation to the importance of the act as a whole. The act is considered in context, and therefore, the stored information relates to the act, the sequence of acts prior to the act, acts of the user occur after the act, the results of the sequence of acts which include the act, and characteristics of the user which are not "acts", but rather include timing, mouse path efficiency, and an interaction with other users.

Figure 21:
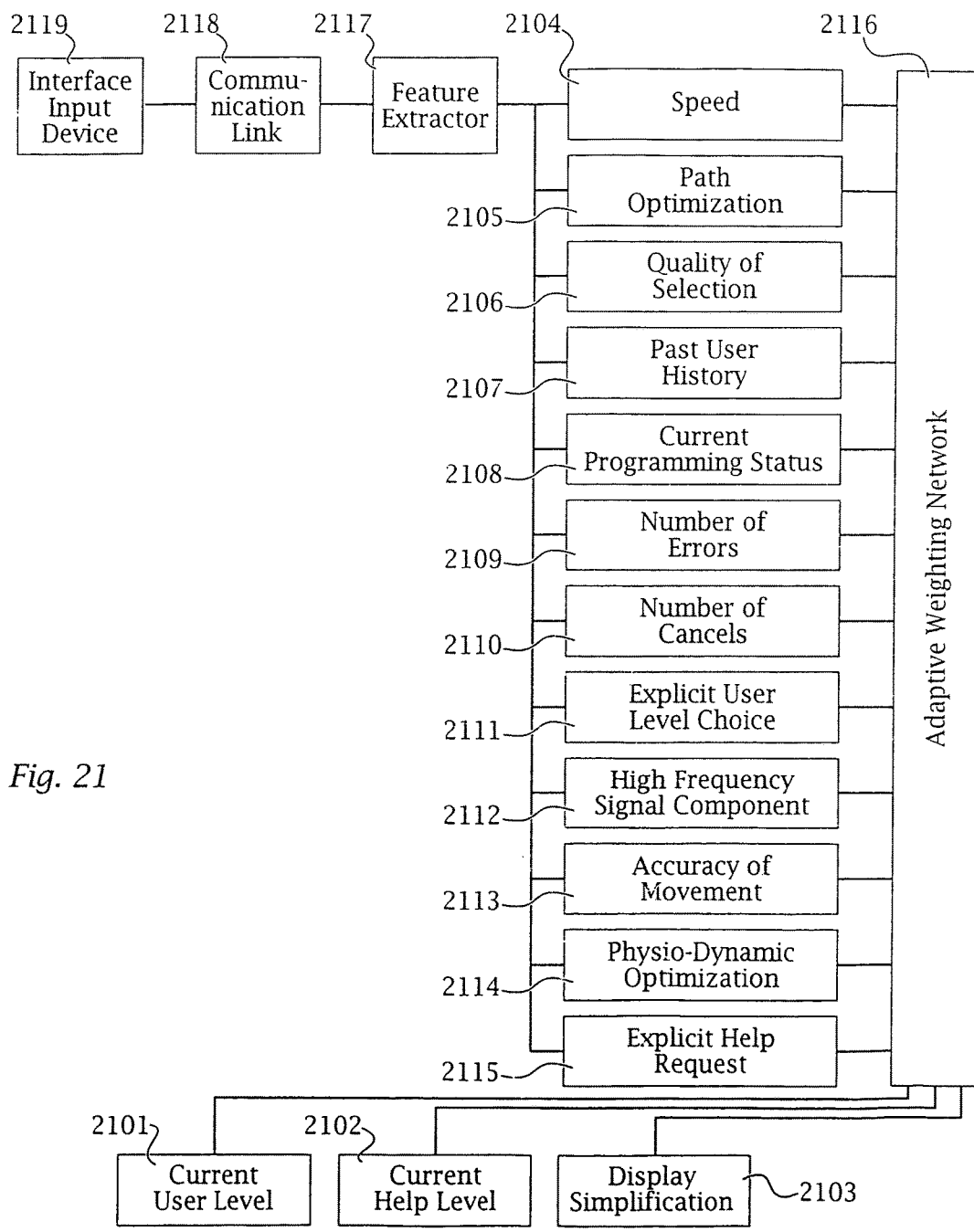
FIG. 21 is a block diagram of a user level determining system of the present invention.

An apparatus for performing a path information or efficiency determining function is shown schematically in FIG. 18, and in more detain in FIG. 21. Thus. for example, if a characteristic of the user is an unsteady hand while using the cursor control device, e.g. mouse, producing a high frequency or oscillating component, the existence of this characteristic is detected and quantified by the high frequency signal component detector 2112, and, depending on the amplitude, frequency and duration (e.g. path length), may also be detected by the path optimization detector 2105. Once this characteristic is detected and quantified, an adaptive filter may be applied by the main control 1806 to selectively remove the detected component from the signal, in order to improve the reliability of the detection of other characteristics and to determine the intended act of the user.

It should be noted that the various characteristic filters preferably act in "parallel" at each stage of the characteristic recognition, meaning that one characteristic is defined simultaneously with the detection of other characteristics, which assists in resolving ambiguities, allows for parallel processing by a plurality of processing elements which improves real-time recognition speed, and allows a probability-based analysis to proceed efficiently. Such a "parallel" computation system is included in a neural net computer, and a hardware-implementation of a neural net/fuzzy logic hybrid computer is a preferred embodiment, which allows fuzzy rules to be programmed to provide explicit control over the functioning of the system. It is preferred that a human programmer determine the basic rules of operation of the system, prior to allowing a back-propagation of errors learning algorithm to improve and adapt the operation of the system.

The adaptive system implemented according to the present invention, by detecting a user level, allows a novice user to productively interact with the system while not unnecessarily limiting the use of the adaptive interface by an advanced user, who, for example, wishes to move the cursor quickly without the limiting effects of a filter which slows cursor response.

Another example of the use of an adaptive user interface level is a user who repeatedly requests "help" or user instructions, through the explicit help request detector 2115, which causes an output from the current help level output 2102; such a user may benefit from an automatic context-sensitive help system, however such a system may interfere with an advanced user, and is unnecessary in that case and should be avoided. This adaptive user interface level concept is not limited to a particular embodiment of the present invention, such as a VCR, and in fact, may be broadly used wherever a system includes an interface that is intended for use by both experienced and inexperienced users. This differs from normal help systems which must be specifically requested, or "balloon help" (Apple Computer, Macintosh System 7.0, 7.1, 7.5) which is either engaged or disengaged, but not adaptive to the particular situation based on an implicit request or predicted need. In the case of a single user or group of users, the interface could maintain a history of feature usage for each user, as in the past user history block 2107, and provide a lower user interface level for those features which are rarely used, and therefore less familiar to the user, through the current user level output 2101.

It should be noted that the present system preferably detects an identity of a user, and therefore differentiates between different users by an explicit or implicit identification system. Therefore, the system may accumulate information regarding users without confusion or intermingling.

Example 6

VCR Programming Preference Prediction

The device according to the present invention is preferably intelligent. In the case of a VCR, the user could also input characteristics of the program material that are desired, and characteristics of that program material which is not desired. The device would then, over time, monitor various broadcast choices, and determine which most closely match the criteria, and thus be identified. For example, if the user prefers "talk-shows", and indicates a dislike for "situation comedies" ("sitcoms"), then the device could scan the various available choices for characteristics indicative of one or the other type of programming, and perform a correlation to determine the most appropriate choice(s). A sitcom, for example, usually has a "laugh track" during a pause in normal dialogue. The background of a sitcom is often a confined space (a "set"), from different perspectives, which has a large number of "props" which may be common or unique. This set and the props, however, may be enduring over the life of a show.

A talk-show, on the other hand, more often relies on actual audience reaction (possibly in response to an "applause" sign), and not prerecorded or synthesized sounds. The set is simple. and the broadcast often shows a head and neck, or full body shot with a bland background, likely with fewer enduring props. A signal processing computer, programmed for audio and/or video recognition, is provided to differentiate between at least the two types with some degree of efficiency, and with a possibly extended sampling time, have a recognition accuracy, such that, when this information is integrated with other available information. a reliable decision may be made. The required level of reliability, of course, will depend on the particular application and a cost-benefit analysis for the required system to implement the decision-making system.

Since the system according to the present invention need not display perfect accuracy, the preferred embodiment according to the present example applies general principles to new situations and receives user or other feedback as to the appropriateness of a given decision. Based on this feedback, subsequent encounters with the same or similar data sets will produce a result which is "closer" to an optimal decision. Therefore, with the aid of feedback, the search criterion would be improved. Thus, a user could teach the interface through trial and error to record the desired broadcast programs. Thus, the presently described recognition algorithms may be adaptive and learning, and need not apply a finite set of predetermined rules in operation. For such a learning task, a neural network processor may be implemented, as known in the art.

Figure 22:
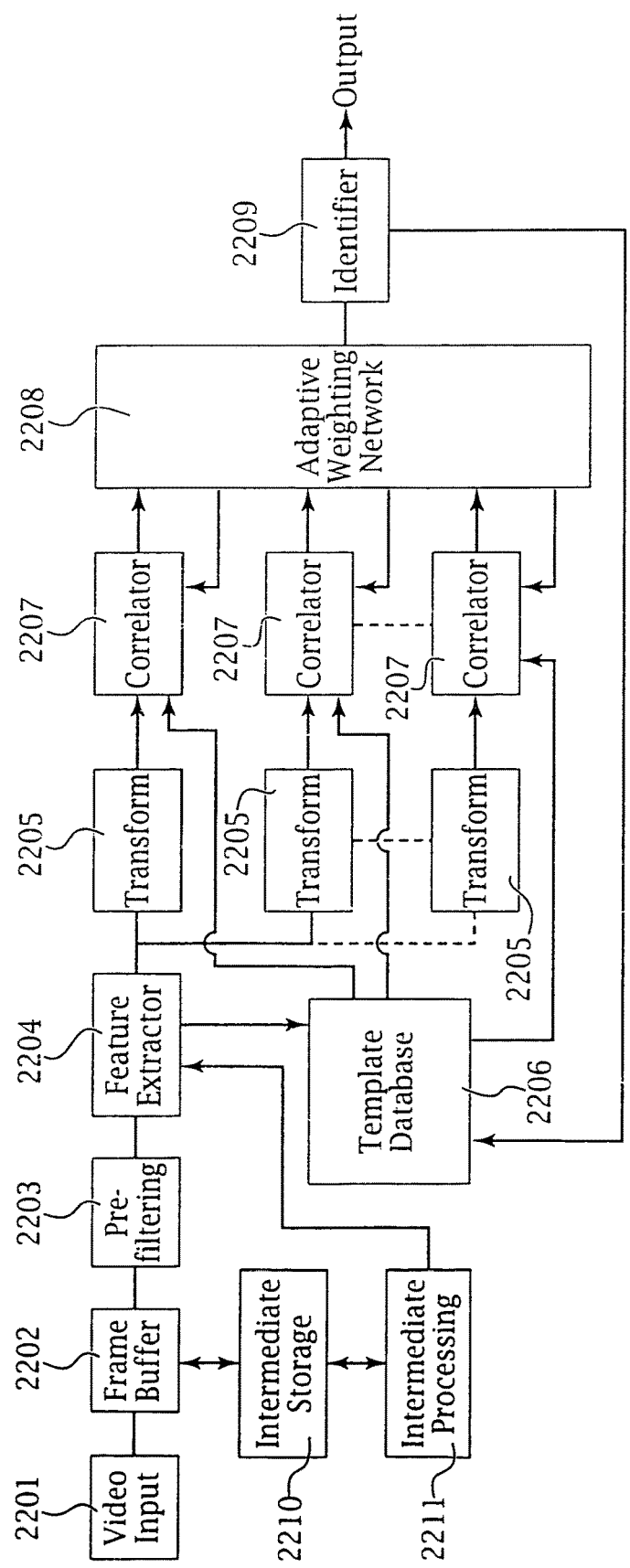
FIG. 22 is a block diagram of a template-based pattern recognition system of the present invention.

The feature extraction and correlation system according to the present invention is shown in FIG. 22. In this figure, the multimedia input, including the audio signal and all other available data, are input in the video input 2201. The video portion is transferred to a frame buffer 2202, which temporarily stores all of the information. All other information in the signal, including audio, VIR, videotext, close caption, SAP (second audio program), and overscan, is preferably stored in a memory, and analyzed as appropriate. The frame buffer 2202 may have an integral or separate prefiltering component 2203. The filtered signal(s) are then passed to a feature extractor 2204, which divides the video frame into a number of features, including movement, objects, foreground, background, etc. Further, sequences of video frames are analyzed in conjunction with the audio and other information, and features relating to the correlation of the video and other information, e.g., correlation of video and audio, are extracted. Other information is also analyzed and features extracted, e.g., audio and close caption. All extracted features relating to the multimedia input are then passed to a transform engine or multiple engines in parallel, 2205. These transform engines 2205 serve to match the extracted features with exemplars or standard form templates in the template database 2206.

It should be noted that even errors or lack of correlation between certain data may provide useful information. Therefore, a mismatch between audio and close caption or audio and SAP may be indicative of useful information. For non-video information, exemplars or templates are patterns which allow identification of an aspect of the signal by comparing the pattern of an unidentified signal with the stored pattern. Thus, the voice patterns of particular persons and audio patterns of particular songs or artists may be stored in a database and employed to identify a source signal.

The transformed extracted features and the templates are then correlated by a correlator or correlators 2207. The parallelization of implementation of the transforms and correlators serves to increase the recognition speed of the device. It should be understood that appropriate systems for parallelization are known in the art. For example, the TMS 320C80, also known as the TI MVP (Texas Instruments multimedia video processor) contains four DSP engines and a RISC processor with a floating point unit on a single die. A board including a TMS 320C80 is available from General Imaging Corp., Billerica Mass., the S/IP80, which may be programmed with ProtoPIPE. In addition, a board including a TMS 320C80 is also available from Wintriss Engineering Corp., San Diego, Calif. Multiple MVP processors may also be parallelized for additional computing power. The MVP may be used to analyze, in parallel, the multimedia input signal and correlate it with stored patterns in a database. In this context, correlation does not necessarily denote a strict mathematical correlation, but rather indicates a comparison to determine the "closeness" of an identified portion of information with an unidentified portion, preferably including a reliability indicator as well. For neural network-based processing, specific hardware accelerators also available, such as from Nestor, Inc. and Intel. Therefore, since there may be multiple recognizable aspects of the unidentified data, and various degrees or genericness of the characteristic recognized, it is preferred that at this initial stage of the recognition process that the output of the correlators 2207 be a data set, e.g. a matrix, series of pointers, or other arrangement, so that sufficient information is available for higher level processing to allow application of an appropriate decision process. Of course, if the characteristic to be detected is simple and well defined, and the decision-making process may be implemented with a simple correlation result, then a complex data set output is not required. In fact, the output of the correlator may have a number of different forms, based on the context of the recognition process.

If, for example, an exact match to an entire frame is sought, partial match information is not particularly useful, and is ignored in this process. (Of course, since the system is "self-learning", the processing results may be maintained and analyzed for other purposes). If the system, on the other hand, is analyzing novel data, a full analysis would likely be necessary including partial results and low correlation results.

The outputs of the correlators are input into an adaptive weighing network 2208, to produce a probability of a match between a given feature and a given template. The recognition is completed in an identifier 2209, which produces a signal identifying one or more objects in the video frame input. The identifier 2209 also has an output to the template database 2206, which reinforces the recognition by providing feedback; therefore, if the same object appears again, it will be more easily recognized. The template database 2206 therefore also has an input from the feature extractor 2204, which provides it with information regarding the features recognized. It is also noted that, in addition to allowing recognition, the parallel transform engines 2205, correlators 2207, and adaptive weighing network 2208 also allows the system to ignore features that, though complex, do not aid in recognition.

For example, during dialogue, the soundtrack voice may correlate with the mouth movements. Thus, the mouth movements aid little in recognition, and may be virtually ignored, except in the case where a particular person's mouth movements are distinctive, e.g., Jim Nabors ("Gomer Pyle"), and Tim Curry ("Rocky Horror Picture Show"). Thus, the complexity and parallelism in the intermediate recognition stages may actually simplify the later stages by allowing more abstract features to be emphasized in the analysis. Animation poses a special example where audio and image data may be separated, due to the generally non-physiologic relation between the image and soundtrack.

The pattern recognition function of the present invention could be used, in a VCR embodiment according to the present invention to, e.g., to edit commercials out of a broadcast, either by recognition of characteristics present in commercials, in general, or by pattern recognition of specific commercials in particular, which are often repeated numerous times at various times of the day, and on various broadcast channels. Therefore, the system may acquire an unidentified source signal, which may be, for example, a 30 second segment, and compare this with a database of characteristics of known signals. If the signal does not match any previously known or identified signals, it is then subject to a characterization which may be the same or different than the characterization of the identified signals. The characterizations of the unidentified signal are then compared to characteristics to be recognized. If the unidentified signal meets appropriate criteria, a presumptive generic characterization is made. This characterization is preferably confirmed by a user later, so that a positively identified signal is added to the database of identified signals; however, under certain circumstances no confirmation is required.

Certain media present a recognizable audio or video cue when a commercial break has ended. (E.g. often sports events, such as the Olympic Games, will have theme music or distinctive images). The present device need not respond immediately to such cues, and may incorporate a delay, which would store the information while a decision is being made. In the case of a video tape, the delay may be up to the time between the time of recording and the time of playback. Further, the temporary storage medium may be independent of the pattern recognition system. Thus, a system provided according to the present invention may actually include two independent or semi-independent data streams: the first serving as the desired signal to be stored, retaining visually important information, and the second providing information for storage relating to the pattern recognition system, which retains information important for the recognition process, and may discard this information after the pattern recognition procedure is complete.

A system which provides a plurality of parallel data streams representing the same source signal may be advantageous because is allows a broadcast quality temporary storage, which may be analog in nature, to be separate from the signal processing and pattern recognition stage, which may be of any type, including digital, optical, analog or other known types, which need only retain significant information for the pattern recognition, and therefore may be highly compressed (e.g. lossy compression), and devoid of various types of information which are irrelevant or of little importance to the pattern recognition functions. Further, the temporary storage may employ a different image compression algorithm, e.g. MPEG-4, MPEG-2 or MPEG-1, which is optimized for retention of visually important information, while the recognition system may use a compression system optimized for pattern recognition, which may retain information relevant to the recognition function which is lost in other compression systems, while discarding other information which would be visually important. Advantageously, however, the analysis and content transmission streams are closely related or consolidated, such as MPEG-7 and MPEG-4.

In a particularly advantageous arrangement, the compression algorithm is integral to the recognition function, preparing the data for the pattern matching and characterization, and therefore is optimized for high throughput. According to this embodiment, the initial compression may include redundant or uncompressed information, if necessary in order to achieve real-time or near real-time recognition, and, thus may actually result in a larger intermediate data storage requirement than the instantaneous data presented to the recognition system; however, the term "compression", in this case, applies to the long term or steady state status of the device, and in a real-time recognition function, the amount of data stored for use in recognition is preferably less than the cumulative amount of data presented, except during the very initial stages of data acquisition and possibly rare peaks.

In the case where a high quality (low loss, e.g. broadcast quality) intermediate storage is employed, after a decision is made as to whether the data should be stored permanently or otherwise further processed or distributed, the data may be transferred to the appropriate system or subsystem of the apparatus. Alternatively, the high quality intermediate storage is retained, and no further processing is performed. In either case, the purpose of this storage is to buffer the source data until the computational latency resolves any decisions that must be made.

According to one aspect of the present invention, the source image may be compressed using the so called "fractal transform", using the method of Barnsley and Sloan, which is implemented and available as a hardware accelerator in product form from Iterated Systems, Inc., Norcross, Ga., as the Fractal Transform Card (FTC) II, which incorporates eight fractal transform integrated circuit chips, 1 MByte of Random Access Memory (RAM), and an Intel i80960CA-25 □P, and operates in conjunction with P.OEM™ (Iterated Systems, Inc., Norcross, Ga.) software, which operates under MicroSoft-Disk Operating System (MS-DOS). FTC-II hardware compression requires approximately 1 second per frame, while software decompression on an Intel 80486-25 based MS-DOS computer, using "Fractal Formatter" software, can be performed at about 30 frames per second, which allows approximately real time viewing. The Fractal Video Pro 1.5 is a video codec for WIN, allowing software only playback at 15-30 fps, 70-150 Kbytes/sec. This is a non-symmetrical algorithm, requiring more processing to compress than to decompress the image. The FTC-IV Compression Accelerator Board is presently available.

This fractal compression method potentially allows data compression of upwards of 2000:1, while still maintaining an aesthetically acceptable decompressed image result. Further, since the method emphasizes structural aspects of the image, as opposed to the frequency decomposition used in DCT methods (JPEG, MPEG), elements of the fractal method could be used as a part of the image recognition system. Of course, it should be appreciated that other fractal processing methods are available and may be likewise employed.

Audio data is also compressible by means of fractal transforms. It is noted that the audio compression and image recognition functions cannot be performed on the FTC-II board, and therefore an alternate system must be employed in order to apply the pattern recognition aspects of the present invention. It should also be noted that an even more efficient compression-pattern recognition system could be constructed by using the fractal compression method in conjunction with other compression methods, which may be more efficient under certain circumstances, such as discrete cosine transform (DCT), e.g. JPEG or modified JPEG or wavelet techniques. Fractal compression systems are also available from other sources, e.g. the method of Greenwood et al., Netrologic Inc., San Diego, Calif. See also, Shepard, J. D., "Tapping the Potential of Data Compression", Military and Aerospace Electronics, May 17, 1993, pp. 25-27.

A preferred method for compressing audio information includes a model-based compression system. This system may retain stored samples, or derive these from the data stream. The system preferably also includes high-level models of the human vocal tract and vocalizations, as well as common musical instruments. This system therefore stores information in a manner which allows faithful reproduction of the audio content and also provides emphasis on the information-conveying structure of the audio signal. Thus, a preferred compression for audio signals retains, in readily available form, information important in a pattern recognition system to determine an abstract information content, as well as to allow pattern matching. Of course, a dual data stream approach may also be applied, and other known compression methods may be employed.

Because of the high complexity of describing a particular signal pattern or group of audio or image patterns, in general, the system will learn by example, with a simple identification of a desired or undesired pattern allowing analysis of the entire pattern, and extraction of characteristics thereof for use in preference determination.

Barnsley and Sloan's method for automatically processing digital image data consisting of image information, disclosed in U.S. Pat. Nos. 5,065,447 and 4,941,193, both expressly incorporated herein by reference, consists of the steps of storing the image data in the data processor, then generating a plurality of uniquely addressable domain blocks from the stored image data, each of the domain blocks representing a different portion of the image information such that all of the image information is contained in at least one of the domain blocks. A plurality of uniquely addressable mapped range blocks corresponding to different subsets of the stored image data are created, from the stored image data, with each of the subsets having a unique address. This step includes the substep of executing, for each of the mapped range blocks, a corresponding procedure upon the one of the subsets of the stored image data that corresponds to the mapped range block. Unique identifiers are then assigned to corresponding ones of the mapped range blocks, each of the identifiers specifying for the corresponding mapped range block a procedure and a address of the corresponding subset of the stored image data. For each of the domain blocks, the one of the mapped range blocks that most closely corresponds according to predetermined criteria is selected. Finally, the image information is represented as a set of the identifiers of the selected mapped range blocks. This method allows a fractal compression of image data. In particular, Drs. Barnsley and Sloan have optimized the match of the domain blocks with the mapping region by minimizing the Hausdorff distance. A decompression of the data precedes analogously in reverse order starting with the identifiers and the mapping regions to produce a facsimile of the original image. This system is highly asymmetric, and requires significantly more processing to compress than to decompress. Barnsley and Sloan do not suggest a method for using the fractal compression to facilitate image recognition, which is a part of the present invention.

Basically, the fractal method proceeds from an understanding that real images are made up of a plurality of like subcomponents, varying in size, orientation, etc. Thus, a complex block of data may be described by reference to the subcomponent, the size, orientation, etc. of the block. The entire image may thus be described as the composite of the sub-images. This is what is meant by iterative function systems, where first a largest block is identified, and the pattern mapping is repetitively performed to describe the entire image.

The Iterated Systems, Inc. FTC-II or FTC-IV board, if applied as a part of a system according to the present invention, is preferably used in conjunction with a framegrabber board, such as Matrox, Quebec, Canada, Image-LC board, or a Data Translation DT1451, DT2651, DT2862, DT2867, DT2861 or DT2871, which may perform additional functions, such as preprocessing of the image signal, and may be further used in conjunction with an image processing system, such as the Data Translation DT2878. Of course, it should be understood that any suitable hardware, for capturing, processing and storing the input signals, up to and including the state of the art, may be incorporated in a system according to the present invention without exceeding the scope hereof, as the present invention is not dependent on any particular subsystem, and may make use of the latest advances. For example, many modern systems provide appropriate functionality for digital video capture, either uncompressed, mildly compressed, or with a high degree of compression, e.g., MPEG-2.

The Texas Instruments TMS320C80 provides a substantial amount of computing power and is a preferred processor for certain computationally intensive operations involving digital signal processing algorithms. A system employing a parallel TMS 320C40 processors may also be used. The Intel Pentium series (or related processors from AMD, National Semiconductor, or other companies), DEC/Compaq Alpha, SPARC, or other processors intended for desktop computing may, either individually or in multiprocessor configurations, be used to process signals.

A pattern recognition database system is available from Excalibur Technologies, San Diego, Calif. Further, IBM has had pattern recognition functionality available for its DB/2 database system, and has licensed Excalibur's XRS image retriever recognition software for DB/2. See, Lu, C., "Publish It Electronically", Byte, September 1993, pp. 94-109. Apple Computer has included search by sketch and search by example functions in PhotoFlash 2.0. See also, Cohen, R., "FullPixelSearch Helps Users Locate Graphics", MacWeek, Aug. 23, 1993, p. 77.

Image processing hardware and systems are also available from Alacron, Nashua N.H.; Coreco, St. Laurent, Quebec; Analogic, and others.

A fractal-based system for real-time video compression, satellite broadcasting and decompression is also known from Iterated Systems, Inc. and Entertainment Made Convenient[2], Inc. ($EMC^2$). In such a system, since the compressed signal is transmitted, the remote receiving system need not necessarily complete decompression prior to the intelligent pattern recognition function of the present invention. This system also incorporates anti-copy encryption and royalty and accounting documentation systems. It is noted that the $EMC^2$ system does not incorporate the intelligent features of the present invention.

A preferred fractal-based system according to the present information provides the source data preprocessed to allow easy and efficient extraction of information. While much precharacterization information may be provided explicitly, the preferred system allows other, unindexed information to also be extracted from the signal. Further, the preferred system provides for an accounting system that facilitates pay-per-view functions. Thus, the interface of the present invention could interact with the standard accounting system to allow royalty-based recording or viewing, and possibly implement a serial-copy recording prevention system. Prior art systems also require a user to explicitly select a program, rather than allow an intelligent system to assist in selection and programming of the device. The $EMC^2$ system is described in "$EMC^2$ Pushes Video Rental By Satellite", Electronic Engineering Times, Dec. 2, 1991, p. 1, p. 98. See also, Yoshida, J., "The Video-on-demand Demand", Electronic Engineering Times, Mar. 15, 1993, pp. 1, 72.

Fractal techniques may be used to store images on a writable mass storage medium, e.g. CD-ROM compatible. The present system may thus be used to selectively access data on the CD-ROM by analyzing the images, without requiring full decompression of the image data.

Wavelets hold promise for efficiently describing images (i.e., compressing the data) while describing morphological features of the image. However, in contrast to wavelet transforms that are not intended to specifically retain morphological information, the selection of the particular wavelet and the organization of the algorithm will likely differ. In this case, the transform will likely be more computationally complex and therefore slower, while the actual compression ratios achieved may be greater.

Thus, one embodiment of the device according to the present invention may incorporate a memory for storing a program, before being transferred to a permanent storage facility, such as tape. Such a memory may include a hard disk drive, magnetic tape loop, a rewritable optical disk drive, or semiconductor memories, including such devices as wafer scale memory devices. This is shown diagrammatically as the intermediate storage 2210 of FIG. 22. The capacity of such a device may be effectively increased through the use of image data compression, which may be proprietary or a standard format, i.e. MPEG-1, MPEG-2 (Motion Picture Experts Group standard employing DCT encoding of frames and interframe coding), MPEG-4 (Motion Picture Experts Group standard employing DCT encoding of frames and interframe coding, as well as model-based encoding methods) JPEG (Joint Photographic Experts Group standard employing DCT encoding of frames), Px64 (Comite Consultatif International des Telegraph et telephone (International telegraph and telephone consultative committee) (CCITT) standard H.261, videoconferencing transmission standard), DVI (Digital Video Interactive), CDI (Compact Disk Interactive), etc.

Standard devices are available for processing such signals, available from 8×8, Inc., C-Cube, Royal Philips Electronics (TriMedia), and other companies. Image processing algorithms may also be executed on general purpose microprocessor devices.

Older designs include the Integrated Information Technology, Inc. (IIT, now 8×8, Inc.) Vision Processor (VP) chip, Integrated Information Technology Inc., Santa Clara, Calif., the C-Cube CL550B (JPEG) and CL950 (MPEG decoding), SGS-Thompson STI3220, STV3200, STV3208 (JPEG, MPEG, Px64), LSI Logic L64735, L64745 and L64765 (JPEG) and Px64 chip sets, and the Intel Corp. i750B DVI processor sets (82750PB, 82750DB). Various alternative image processing chips have been available as single chips and chip sets; in board level products, Tho such as the Super Motion Compression and Super Still-Frame Compression by New Media Graphics of Billerica, Mass., for the Personal Computer-Advanced technology (PC-AT, an IBM created computer standard) bus; Optibase, Canoga Park, Calif. (Motorola Digital Signal Processor (DSP) with dedicated processor for MPEG); NuVista+ from Truevision (Macintosh video capture and output); New Video Corp. (Venice, Calif.) EyeQ Delivery board for Macintosh NuBus systems (DVI); Intel Corp. ActionMedia II boards for Microsoft Windows and IBM OS/2 in Industry Standard Adapter (ISA, the IBM-PC bus standard for 8 (PC) or 16 bit (PC-AT) slots); Micro Channel Architecture (MCA) (e.g., Digital Video Interactive (DVI), Presentation Level Video (PLV) 2.0, Real Time Video (RTV) 2.0) based machines; and as complete products, such as MediaStation by VideoLogic.

Programmable devices, including the Texas Instruments TMS320C80 MVP (multimedia video processor) may be used to process information according to standard methods, and further provide the advantage of customizability of the methods employed. Various available DSP chips, exemplary board level signal processing products and available software are described in more detail in "32-bit Floating-Point DSP Processors", EDN, Nov. 7, 1991, pp. 127-146. The TMS320C80 includes four DSP elements and a RISC processor with a floating point unit.

It is noted that the present interface does not depend on a particular compression format or storage medium, so that any suitable format may be used. The following references describe various video compression hardware: Kim. Y., "Chips Deliver Multimedia", Byte, December 1991, pp. 163-173; and Donovan, J., "Intel/IBM's Audio-Video Kernel", Byte, December, 1991, pp. 177-202.

It should also be noted that the data compression algorithm applied for storage of the received data may be lossless or lossy, depending on the application. Various different methods and paradigms may be used. For example, DCT (discrete cosine transform) based methods, wavelets, fractals, and other known methods may be used. These may be implemented by various known means. A compressed image may also be advantageously used in conjunction with the image recognition system of the present invention, as described above. In such a case, the compression system would retain the information most important in the recognition function, and truncate the unimportant information.

A further method of performing pattern recognition, especially of two dimensional patterns, is optical pattern recognition, where an image is correlated with a set of known image patterns represented on a hologram, and the product is a pattern according to a correlation between the input pattern and the provided known patterns. Because this is an optical technique, it is performed nearly instantaneously, and the output information can be reentered into an electronic digital computer through optical transducers known in the art. Such a system is described in Casasent, D., Photonics Spectra, November 1991, pp. 134-140. See also references cited therein.

These optical recognition systems are best suited to applications where an uncharacterized input signal frame is to be compared to a finite number of visually different comparison frames (i.e., at least one, with an upper limit generally defined by the physical limitations of the optical storage media and the system for interfacing to the storage media), and where an optical correlation will provide useful information. Thus, if a user wished to detect one of, e.g., "David Letterman", "Jay Leno", or "David Koppel", a number of different planar views, or holograms in differing poses, of these persons would be formed as a holographic correlation matrix, which could be superimposed as a multiple exposure, stacked in the width dimension, or placed in a planar matrix, side by side. The detection system produces, from the uncharacterized input image and the holographic matrix, a wavefront pattern that is detectable by photonic sensors.

It is preferred that if multiple holographic images of a particular characterization are employed, that they each produce a more similar resulting wavefront pattern than the holographic images of other characterizations, in order to enhance detection efficiency. The optical pattern recognition method is limited in that a holographic image must be prepared of the desired pattern to be detected, and that optically similar images might actually be of a different image, if the differences are subtle. However, this method may be used in conjunction with electronic digital pattern recognition methods, to obtain the advantages of both. Methods are also known to electronically write an image to a holographic storage medium, thereby facilitating its use in a general-purpose image recognition system. Of course, the system may also be used to identify talk show guests, such as "Richard Gere" or "Cindy Crawford", or these same individuals in other contexts. The system may also be used for censoring, for example, to prevent minors from viewing adult-oriented material. This system may allow partial censoring, based on the actual viewed or spoken content, rather than the entire show.

If image compression is used, once an image is compressed, it need not be decompressed and returned to pixel, NTSC or other standard transmission or format for storage on tape, and thus the compressed image information may be stored in the same format as is present in the temporary storage medium. Thus, the block labeled intermediate processing 2211 of FIG. 22 shows that the intermediate storage need not retain the information as received from the frame buffer 2202, and in fact, may prepare it for the feature extractor 2204. In addition, the storage medium itself need not be normal videotape (S-VHS, VHS, Beta, 8 mm, Hi-8) and may be an adapted analog storage technique or a digital storage technique. Various magneto-optical recording techniques are known, which can store between 128 MB (3½") and around 5 GB (11"), uncompressed, which might be suitable for storing compressed digital or analog information. Multilayer CD-ROM and short wavelength (e.g., blue) laser systems allow storage densities of about 3.5 to 10 Gbytes per disk, allowing storage of over two hours of MPEG-2 encoded video.

It is also noted that the present technology could also be applied to any sort of mass storage, such as for a personal computer. In such a case, a characteristic of the computer file, which is analogous to the broadcast program in temporary storage of a VCR, is classified according to some criteria, which may be explicit, such as an explicit header or identifying information, or implicit, such as a document in letter format, or a memorandum, as well as by words and word proximity. In particular, such a recognition system could differentiate various clients or authors based on the content of the document, and these could be stored in different manners. The text analysis system of a text-based computer storage system is analogous to the program classification system of the VCR embodiment of the present invention. However, there is a further analogy, in that the VCR could incorporate optical character recognition of text displayed in the program material, employ voice recognition, or directly receive text information as a part of a closed caption or videotext system. Thus, the VCR device according to the present invention could recognize and classify programs based on textual cues, and make decisions based on these cues. This might also provide a simple method of discriminating program material, for example, if a commercial does not include close caption or Second Audio Program (SAP), while the desired program does, or vice versa, then a commercial could be discriminated from a program with very little computational expenditure.

Example 7

VCR Interface

A particular VCR interface system according to one aspect of the present invention includes an internal clock, four program memory, and the capability to display a graphical color interface. By providing the user with the aforementioned features, this design is a unique implementation for an instrument to be used for programming an event driven controller via an interactive display. All information that the user needs is displayed on the screen to avoid or minimize the unnecessary searching for information. This information includes the current date and current time.

A simulation of the AKAI Inc. VCR VS303U (on-screen programming) and the interface of the present invention, were tested to evaluate users' performances. The AKAI interface of the prior art, hereinafter referred to as the prior art interface, was chosen because users made the fewest errors while using this machine, and no user quit while programming, as compared to three other VCRs tested, a Panasonic (made by Matsushita, Inc.) PV4962 (Bar Coder), an RCA brand (formerly Radio Corporation of America, Inc.) VKP950 (on-screen programming), Panasonic brand (made by Matsushita Inc.) PV4700 (Display Panel).

The present embodiment was constructed and tested using HyperPAD™, a rapid prototyping package for an IBM-PC Compatible Computer. It is, of course obvious that the present embodiment could be incorporated in a commercial VCR machine by those skilled in the art, or be implemented on many types of general purpose computers with output screens which allow on-screen feedback for the programming operation. Further, the system of the present embodiment can include a remote-control device which communicates with a VCR through an infrared beam or beams, and can thus exert control over an infrared remote controlled VCR, or translate the programming information and communicate through an infrared remote control, using the standard type infrared transmitter.

An IBM PC-AT compatible (MS-DOS, Intel 80286-10 MHz) computer was used to test the two simulations. In order to simulate the use of a remote control device in programming the VCR, an infrared device made by NView™ was attached to the computer. This device came with a keyboard that was used to "teach" a Memorex™ Universal Remote so that the desired actions could be obtained. By using a universal remote, the computer could be controlled by using a remote control.

The present embodiment incorporates a mouse input device. It is understood that a small trackball with a button for selection, mounted on a remote control may also be employed, and may be preferable in certain circumstances. However, a computer mouse is easily available, and the mouse and trackball data are essentially similar for the type of task implemented by the user, with trackball performance being slightly faster. For daily use on a VCR however, a trackball would be a more preferable input device because it does not require a hard, flat surface, which is not always available to a user when programming a VCR, such as in the situation where a person is watching television while sitting in a chair or sofa.

A Genius™ Mouse was used as the input device in the prototype of the interface of the present invention. With the mouse, the user could view all of the choices at once on the display screen, and then make a selection from the items on the screen by moving the cursor and then pressing the left mouse button.

The interface of the present example focuses on attending to the user's needs, and the interface must be modified for each application. By reducing the searching, learning times, and entry times, the mental load is also minimized. Some tradeoffs are necessary as a result of subjective and objective data. Because of the difficulty in optimizing a single interface design for all levels of users, a menu system was used in an attempt to satisfy all these user types.

The interface of the present example reduced the number of incorrect recordings by 50%. The severity of the errors is unimportant here because one wrong entry will cause an irretrievable mistake and the user will not record the intended program. One study reported that faulty inputs, which lead to missing the program, can be reported by almost every present day owner of a VCR.

Example 8

Programmable Device Interface

It is also noted that the interface of the present invention need not be limited to audio-visual and multimedia applications, as similar issues arise in various programmable controller environments. Such issues are disclosed in Carlson, Mark A., "Design Goals for an Effective User Interface", Electro/82 Proceedings, 3/1/1-3/1/4; Kreifeldt, John. "Human Factors Approach to Medical Instrument Design", Electro/82 Proceedings, 3/3/1-3/3/6; Wilke, William, "Easy Operation of Instruments by Both Man and Machine", Electro/82 Proceedings, 3/2/1-3/2/4; Green, Lee, "Thermo Tech: Here's a common sense guide to the new thinking thermostats", Popular Mechanics, October 1985, 155-159; Moore, T. G. and Dartnall, "Human Factors of a Microelectronic Product: The Central Heating Timer/Programmer", Applied Ergonomics, 1983, Vol. 13, No. 1, 15-23; and "The Smart House: Human Factors in Home Automation", Human Factors in Practice, December 1990, 1-36.

Figure 23:
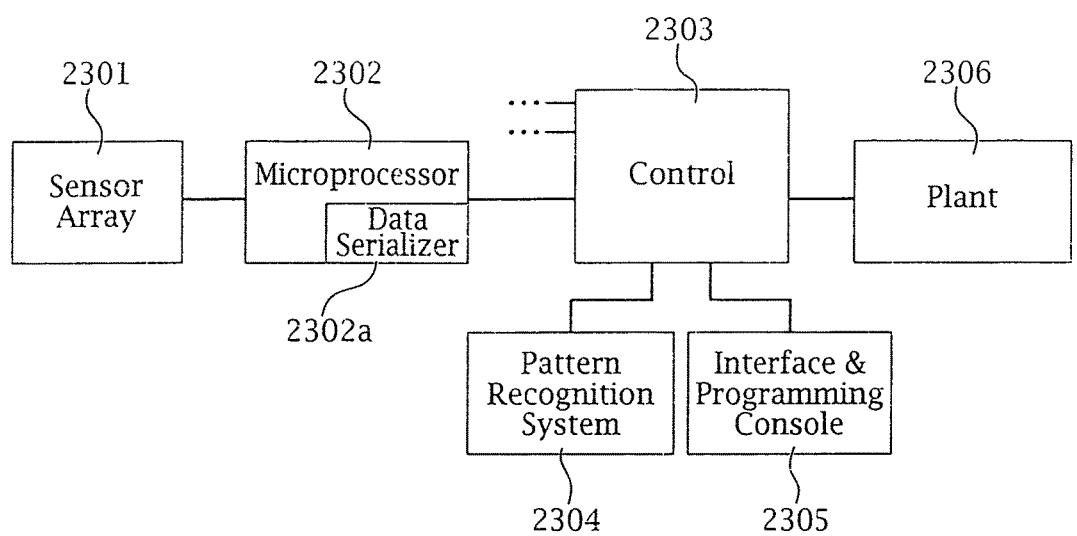
FIG. 23 is a block diagram of a control system of the present invention incorporating a pattern recognition element and an interface.

This generalized system is shown in FIG. 23, in which the sensor array 2301 interfaces with a microprocessor 2302 with a serial data port 2302a, which transmits sensor data to a control 2303. The control 2303 further interfaces or includes a data pattern recognition system 2304 and an interface and programming console 2305 according to the present invention, using the aforementioned intelligent features and adaptive pattern recognition techniques. The control 2203 controls the plant 2306, which includes all the controlled actuators. etc.

Example 9

Adaptive Graphic Interface

A "smart screen" aspect according to the present invention is further explored in the present example. This aspect of the present invention allows the interface to anticipate or predict the intent of the user, to provide, as a default user choice, the most likely action to be taken by the user of the programmable device as a default, which may be either accepted or rejected by the user, without inordinate delay to the user. The intelligent selection feature may also automatically choose an option and execute the selected option, without further intervention, in cases where little or no harm will result. Examples of such harm include a loss of data, a substantial waste of the user's time and an inappropriate unauthorized allocation of computational resources.

When a user regularly applies the VCR device, for example, to record a particular television show which appears weekly on a given television channel, at a given time, on a given channel, such an action could be immediately presented to the user as a first option, without forcing him to explicitly program the entire sequence. Likewise, if the user has already entered such a command, the presented choices could include a second most likely selection, as well as the possibility of canceling the previously entered command.

Further, if an entire television programming guide for a week or month is available as a database, the interface could actively determine whether the desired show is preempted, a repeat (e.g., one which has been previously recorded by the system), changed in time or programming slot, etc. Thus, the interface could present information to the user, of which he might not be aware, and/or predict an action based on that information. Such a device could, if set in a mode of operation that allows such, automatically execute a sequence of instructions based on a predicted course of action. Thus, if a user is to be absent for a period, he could set the machine to automatically record a show, even if the recording parameters are not known with precision at the time of setting by the user. Of course, this particular embodiment depends on the availability of a database of current broadcast schedules, however, such a database may generally be available, e.g., in an on-line database or broadcast data stream.

Such an on-line database system of known type may be used and need not be described in detail herein. Alternately, a printed schedule of broadcasts may be scanned into a computer and the printed information deciphered (e.g., OCR) to gain access to a database. Other methods may also be used to access scheduling information, e.g. Internet database, access channels on cable systems, dial-up services, as well as other broadcast information identifying future and imminent programming. Together, these methods allow semiautonomous operation, guided by programming preferences rather than explicit programs, where such explicit instruction is absent. For example, Gemstar broadcasts video program guides during the video blanking interval of certain broadcasts, e.g., NBC affiliates. TiVo and Replay Networks each rely on a dial-up database to transmit electronic program guide information. Gemstar has proposed use of a 900 MHz paging network to deliver electronic program guide information, as well as low bandwidth uplink information.

The smart screens according to the present invention may be implemented as follows. The controller may be, for example, a Microsoft Windows 95/98/ME/NT/2000 operating system personal computer, for example having a 600 MHz Intel Pentium III or AMD Athlon processor. The display screen interface as described above, according to the present invention, may be generated using Visual Basic™ 6 or JAVA (executing under the Java Virtual Machine). Video information is preferably stored in MPEG 2 format, due to the existing hardware and software codec support for this standard. However, alternative video compression formats may be employed, for example using wavelet, "fractal", or other techniques. The user input device is, for example, a USM port mouse or trackball device, as is well known. The display is, for example, an VESA standard video graphics display adapter which supports hardware or software MPEG 2 display, on for example a 20" color monitor. Presently, such hardware is typical for home computers and frequently found in office computers.

The various parameters concerning the use of the interface are stored in the computer's memory, and a non-volatile mass storage device, such as a hard disk drive. Alternately, Electrically Erasable Programmable read Only Memory (EEPROM) or Erasable Programmable Read Only Memory (EPROM), as well as battery backed Random Access Memory (RAM) could also be used. Advantageously, the hard disk supports apparent simultaneous reads and writes, meaning, with the available buffer, and at MPEG 2 data rates, the system is able to provide real time performance for simultaneous read and write tasks. According to various embodiments, three or more simultaneous tasks may be supported, although these may typically be split between multiple physical drives.

While Pentium III and Athlon processors may be able to support software encoding and decoding of MPEG 2 streams, for example using the MGI Pure DIVA software package, the system preferably employs a hardware codec, such as is available from C-Cube and others. The use of a hardware codec provides potentially increased quality and reliability, while relieving the host processor from burdensome tasks, allowing it to fulfill other functions according to the present invention, such as use profiling, content analysis, digital communications (e.g., IP protocol communications on the Internet, web browsing), presentation of advertisements and sponsored content, and the like.

Alternatively, Apple Power PC, G3 or G4, or IBM Power PC implementation (e.g., RS6000) may be used. Further, the device may be an "embedded" design, employing an Intel standard-type environment (e.g., National Semiconductor Geode™ running Windows CE, LINUX or BeOS), other embedded processor, such as Intel ARM, embedded Power PC from IBM and Motorola. See, for example, TiVo Inc./ Philips Personal TV design and Replay Networks Replay TV designs.

According to the present invention, especially where automated content analysis is required, parallel processors and dedicated digital signal processors, such as the TI 320C6000 series, may be employed.

According to the present invention, the interface may perform comparatively simple tasks, such as standard graphic user interface implementation with optimized presentation of screen options, or include more complex functionality, such as pattern recognition, pattern matching and complex user preference correlations. Therefore, hardware requirements will range from basic Pentium III (or other sixth generation or later Intel-derived designs), Power PC-based designs, MIPS, SPARC, ARM, Alpha, or other micro-processors that are used to perform visual or audio interface functions, to special purpose processors for implementation of complex algorithms, including mathematical, neural network, fuzzy logic, and iterated function systems (fractals).

It should be noted that, while many aspects of the intelligent interface according to the present invention do not require extremely high levels of processing power, and therefore may be provided with inexpensive and commonly available computing hardware, other aspects involve complex pattern recognition and advantageously employ powerful processors to achieve a short processing latency. Both simple and complex interface systems, however, are included within the scope of the present invention. Processing may be distributed in different fashions, so that complex functionality may be implemented with relatively simple local hardware, with a substantial amount of required processing for a high level of functionality performed centrally, and for a large number of users.

From the stored information regarding the prior use of the interface by the user, including N prior sessions and the immediate session, and a current state of the machine (including a received data stream and information relating to the data stream previously stored), a predicted course of action or operation may be realized. This predicted operation is, in the context of the current user interface state, the most probable next action to be taken by the user.

The predicted operation is based on: the identity of the user. if more than one user operates the interface and machine, the information already entered into the interface during the present programming session, the presently available choices for data entry, settings for the use of the machine, which may be present as a result of a "setup" operation, settings saved during a prior session, and a database of programming choices. In the case of an interface applet script, another program may be called that has access to the necessary data in the memory, as well as access to any remote database that may be necessary for implementation of the function. Using a predictive technology, such as Boolean logic, fuzzy logic, neural network logic, or other type of artificial intelligence, a most probable choice may be presented to the user for his approval, or another alternative choice may be selected. Further, a number of most probable choices may be presented simultaneously or in sequence, in order to improve the probability that the user will be immediately or quickly presented with an acceptable choice. If multiple choices are presented, and there is limited room on the display, two (or more) similar choices may be merged into a single menu selection, which may be resolved in a secondary menu screen. e.g. a submenu or dialog box.

Figure 24:
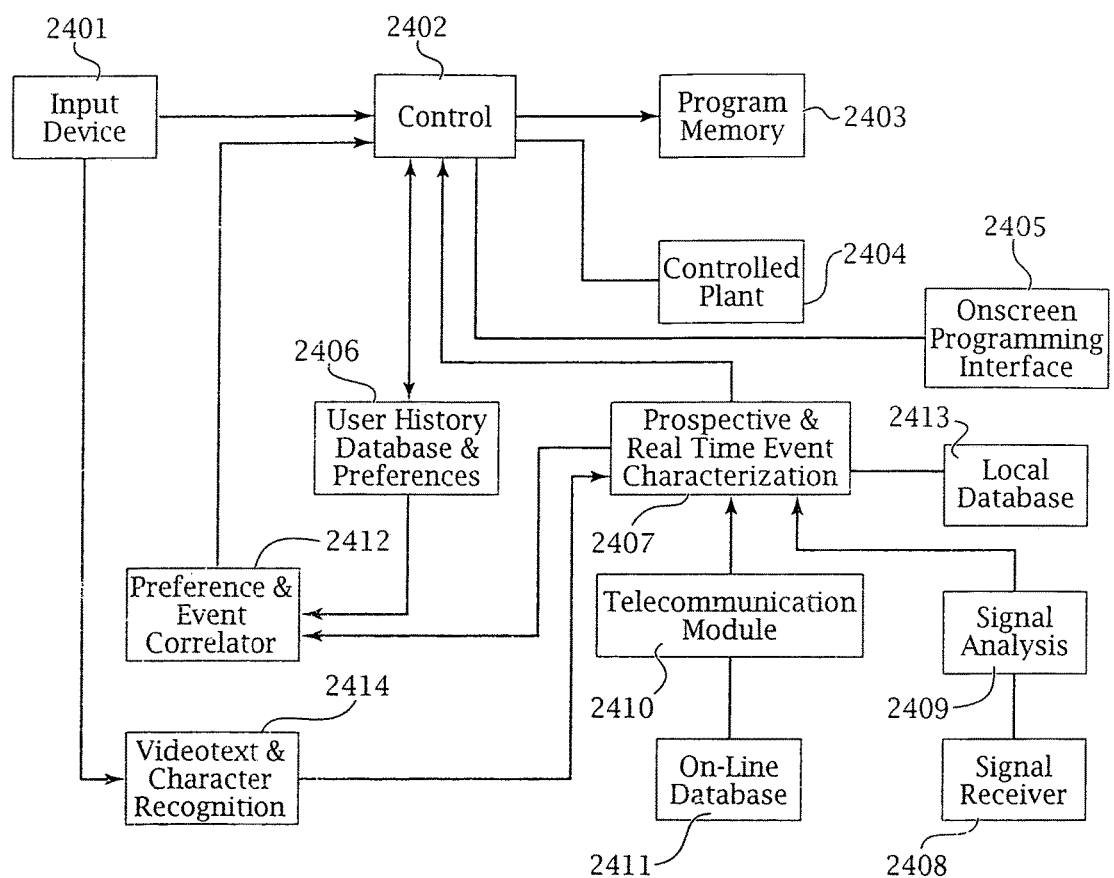
FIG. 24 is a block diagram of a control system for characterizing and correlating a signal pattern with a stored user preference of the present invention.
Figure 25:
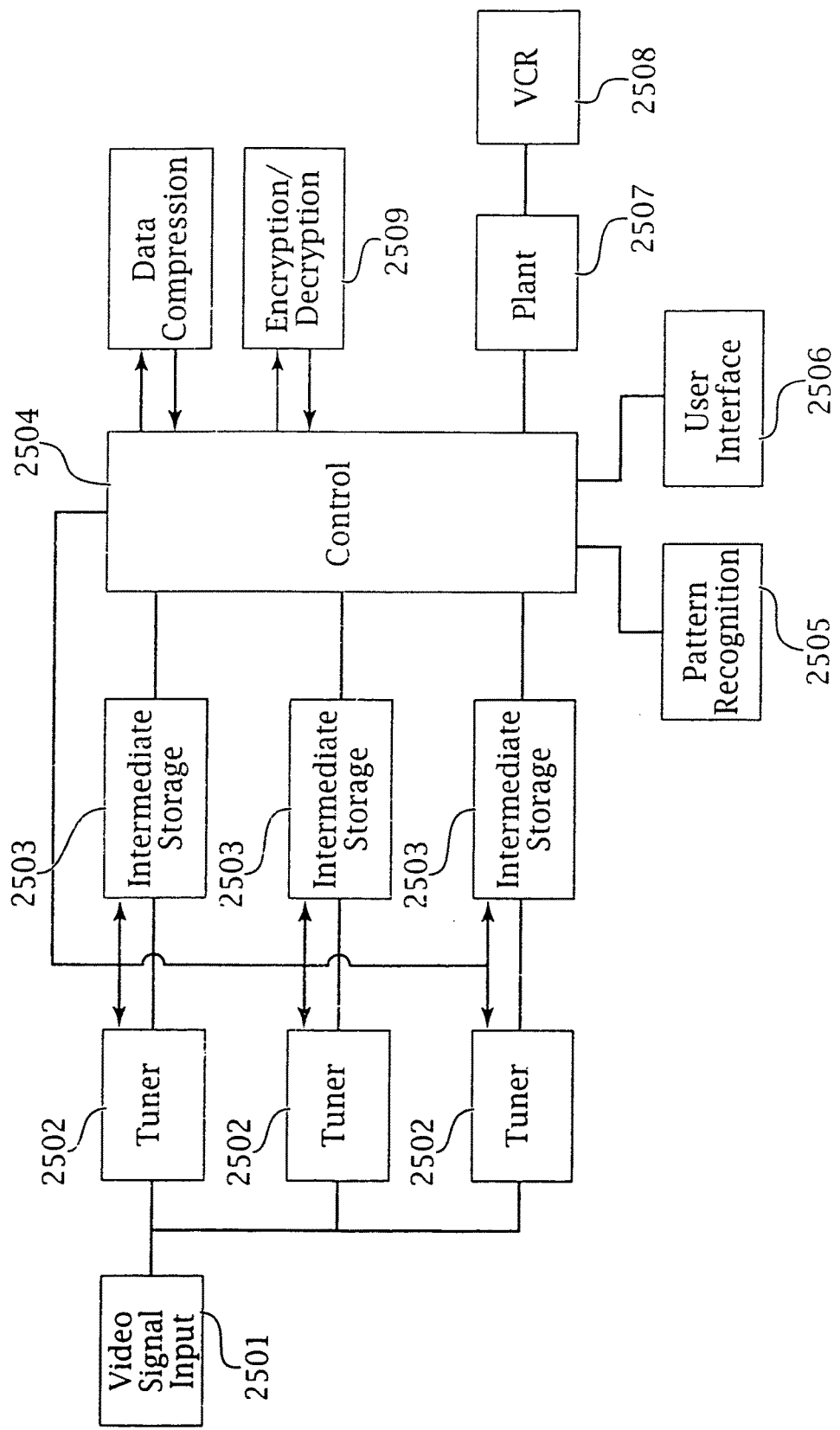
FIG. 25 is a block diagram of a multiple video signal input apparatus, with pattern recognition, data compression, data encryption, and a user interface of the present invention.

FIG. 24 shows a system for correlating a user's preferences with a prospective or real-time occurrence of an event. The input device 2401, which is a remote control with a pointing device, such as a trackball, provides the user's input to the control 2402. The program is stored in a program memory 2403, after it is entered. The control 2402 controls a plant 2404, which is a VCR. The control also controls an on-screen programming interface 2405, through which the user interactively enters the program information. Each program entry of the user is submitted to the user history database and preferences module 2406, which may also receive explicit preference information, input by the user through the input device 2401. The prospective and real time event characterization unit 2407 uses any and/or all relevant information available in order to determine the character of a signal input, which is a video signal, from the signal receiver 2408. A signal analyzer 2409 provides a preliminary analysis and characterization of the signal, which is input to the prospective and real time event characterization unit 2407. The prospective and real time event characterization unit 2407 also interacts and receives an input from a telecommunication module 2410, which in turn interacts and receives information from an on-line database 2411. A user preference and event correlator 2412 produces an output relating to a relatedness of an event or prospective event and a user preference. In the event of a high correlation or relatedness, the control 2402 determines that the event or prospective event is a likely or most likely predicted action. The prospective event discussed above refers to a scheduled event, which is likely to occur in the future. The characterization unit also has a local database 2413 for storing schedule information and the like.

In the particular context of a videotape, one consideration of the user is the amount of time remaining on the tape. Generally, users wish to optimally fill a tape without splitting a program, although the optimization and non-splitting parameters may vary between users. Therefore, the length of the tape and the amount and character of other items on the tape are also factors to be employed in determining a most desired result. With respect to this issue, the interface may maintain a library function that allows the identification of a partially filled tape for recording under given circumstances. The interface may also optimize a playback by selecting a tape containing a desired sequence of materials.

The intelligent interface may also be used as a part of an educational system, due to its ability to adapt to the level of the user and dynamically alter an information presentation based on the "user level", i.e. the training status of the user, and its ability to determine areas of high and low performance. Likewise, the intelligent interface according to the present invention may also be used in a business environment for use by trained individuals who require relatively static software interface design for consistence and "touch typing" with memorized keystroke or mouse click sequences. In this case, the intelligent functionality is segregated into a separate user interface structure, such as an additional "pull down menu" or other available screen location. While the interface always monitors user performance, the impact of the analysis of the user is selectively applied. User analysis may also be used for performance evaluation according to an objective criteria, based on continuous monitoring. In a network environment, user profile and evaluation may be made portable, stored so as to be accessible from any networked device the user may interact with, from office computers to thermostats to photocopying machines to coffee machines.

Example 10

Intelligent Adaptive VCR Interface

In this example, a user interacting with the device intends to record a particular program, "Married With Children" (Fox, Sunday, 9:00 p.m., etc.) on each occurrence, and initially explicitly programs the device accordingly, in the manner of a typical programmable recording device. For example, the user may define the program by timeslot and recurrence, by use of an electronic program guide, by a keyword search of a program database, or a selective filter for the video stream. The system analyzes this intended function, and alters the execution to implement a procedure for providing a full library of episodes, and not to duplicate episodes. During first-run shows, this execution will unlikely differ from the simple explicit program defined by the user. During reruns and off-season, however, the system will filter the content to limit redundancy. Of course, if the user does not retain a personal archive, there will not be redundancy, and the rerun episodes will in that case also be recorded.

On the other hand, the program may also be subject to the occurrence of reruns, syndicated distribution, multiple available network affiliates, time shifting of performance, and the like. In that case, assuming the user seeks to create a complete archive, unique episodes of the same show will also be recorded from other sources.

Where the system is operating in a content analysis mode, the system may contingently record extraneous information, for example, preview scenes and advertisements. Further, various actors appearing in the particular program also appear in other capacities and roles on television. Using context information, or available databases, these extraneous segments may be purged.

Thus, the system provides an increased intelligence over explicitly programmed devices, potentially making the device easier to use by intelligently analyzing exceptions and extensions for the user. Preferably, the "translated" instructions are presented to the user for confirmation, for example by a simple accept/reject indication. If rejected, the system may present alternate execution algorithms for review by the user, or execute the user's explicit programming definition unmodified.

Therefore, after the user's intent is elucidated, the interface may scan available directories of programming to determine when "Married With Children" will be broadcast. In addition, to the extent possible, all channels may be monitored, in the event that the directories or erroneous or incomplete.

The human user interface system according to the present invention is not limited for application video recording devices, and may be quite effective if it is used for a number of distinct applications, such as television, radio, desktop computer, and even kitchen appliances and heating ventilation air conditioning (HVAC) systems.

Further, with a degree of portability, the same interface, including user profile characteristics, may be used for multiple devices. For example, preferences for processing of MTV channel or other music video information may be directly relevant to processing of radio or other music reproduction devices, and vice versa. Even more abstract issues, such as screen organization, number of presented choices, color selections, alarm indications, and the like, may be common across may different devices.

At some point in the process, preferably prior to substantive programming input, the system performs a self-diagnostic check to determine whether the apparatus is set up and operating correctly. This would include, for many applications, a determination of whether the clock has been set and thereafter operating continuously. Of course. the clock could have, in practice, a battery to minimize the occurrence of problems relating to clock function. The interface would then, if the clock is not properly set, and if there is no telecommunication or other external means for automatically determining the exact time, present the user with a menu selection to set the proper time. Of course, if the correct time is available to the apparatus in some form, this could be automatically obtained, and the internal clock updated, without intervention. These same sources may be used to verify the accuracy of an internal clock. Further, if a reliable external clock system is available, an internal clock may be dispensed with or ignored. Time may also be inferred based on the regular schedules of broadcasts, e.g., the 11:00 p.m. news begins at 11:00 p.m. If the user does not have access to a source of the exact time, the step of correcting the time may be deferred, although at some point the user should be reminded to verify the clock information. The user may thus be able to override a machine-generated request or attempt to correct the time data.

If the machine has access to an external source of the exact time, it would then preferably access this source first. Such sources of exact time include a telephone connection to a voice line that repeats the time. The computer would then perform a speech recognition algorithm that would be used to determine the time. Such a speech recognition algorithm could also be used as a part of the user interface for other purposes, i.e. a speech recognition system is not supplied solely for obtaining time information. Alternatively, a modem or communication device could be used to obtain the time in digitally coded form over a network, which would alleviate the need for speech recognition capabilities for this function.

A further method for obtaining accurate time information is to access a video signal that contains the desired time information. For example, many cable broadcasting systems have a channel that continuously broadcasts the time in image form. The interface tunes this channel. and acquires a representation of the screen image, thereafter performing a character recognition algorithm to capture the time information. This character recognition algorithm could also be used to obtain or capture information regarding programming schedules, stock prices, and other text information that may appear on certain cable broadcast channels.

In the case of a video-recording device, the system could also verify the currency of an electronic program guide. If this is not current, or for example it appears corrupted, an on-line connection could also be used in order to obtain information concerning television scheduling. Preferably, the program guide data is obtained in an out-of band signal (including separate channel, VBI transmission, cable modem, satellite data link, etc.) through the same medium as used to transmit the video programs. However, use of a distinct communications system, such as Internet through a separate physical transport layer, may be used.

Thus, the interface, in obtaining necessary information, employs such available data source access methods as speech recognition, character recognition, digital telecommunication means, radio wave reception and interpretation, and links to other devices.

In a typical interaction session, with the apparatus, the user first identifies himself/herself to the machine, which can occur in a number of ways. This step may be dispensed with, or at least trivialized, if only one user regularly interacts with the apparatus. Otherwise, such identification may be important in order to maintain the integrity of the user profiles and predictive aspects of the interface. A radio frequency transponder (RF-ID), infrared transponder (IR-ID) system may automatically determine the user based on a devices, which may be concealed in a piece of jewelry or wristwatch. The user may also be identified by voice pattern recognition, speaker independent voice recognition, video pattern recognition, fingerprint, retinal scan, or other biometric evaluation. An explicit entry of the user identity may also be employed, wherein the user types his/her name on a keyboard or selects the name or unique identifier from a "pick-list". The identity of the user may also be inferred from the time and/or activity performed by the user.

In another embodiment, a normal user of the system need not identify himself; rather, the system develops composite profiles of the set of regular users, and infers necessary personalization parameters from the nature of the interaction. This scheme, however, may allow some inefficiencies to persist until a preferred mode of operation may be determined.

The interface, upon identifying the user, retrieves information regarding the user, which may include past history of use, user preferences, user sophistication, patterns of variation of user, which may be based on, e.g., time, mood, weather, lighting, biometric factor or other factors. If the user is not uniquely identified, then the initial interaction with the system is used to determine a preferred or optimal mode of interaction.

It is noted that, since in one embodiment of the invention, the system has two discrete asynchronous functions; that of programming and using the system, and that of manipulating the media stream, such temporally sensitive variables as user "mood" may have little influence on the manipulation of the media stream, since the user interaction with the manipulated media stream may occur at an unknown time thereafter. On the other hand, such temporally sensitive variables may have a profound influence on the human user interface of the system.

Thus, after completing system diagnostics, including the time-check function referred to above, the system next determines or predicts the desired function of the user. In this regard, if more than one user has access to the system, the user is explicitly or implicitly identified to the interface, in a user identification step 1701 or an analogous action, which may be a coded entry, or a selection from the menu. If the interface has voice recognition capability, then the user may be recognized by his voice pattern, or merely by stating his name. The interface then accesses the memory for a profile of the past use of the machine by the user, which may include the entire prior history, relevant abstracts of the history, or derived user preferences, as shown in the personalized startup based on user profile step 1702, which information is also stored and used in the past user history determining element 2107. These choices differ in the amount of storage necessary in order to retain the desired information.

Thus, if the user has only used the VCR to record, e.g., the National Broadcasting Company (NBC) 11 o'clock news, i.e., record all days from 11:00 p.m. to 11:30 p.m. on NBC, in the past, the most likely current predicted choice would be the NBC 11 o'clock news. If the interface were to present a number of choices, having lower probability, then it interprets the recording history to be "news" based on a database of broadcast information. This characterization of the broadcast as "news" may be made in a number of ways; by an explicit identification by the user, by extracting the characteristics of the program from an electronic program guide, by a content-based analysis of the media stream, or by a correlation of characteristics of the past-selected programs with available media streams (without necessarily analyzing or determining the content). Therefore, a prediction of lower probability would be American Broadcasting Company (ABC) or Central Broadcasting Company (CBS) news at, e.g., 11:00 p.m., and the NBC news at, e.g., 5:00 p.m. In a cable television system, there may be a number of NBC affiliated news alternatives, so that these alternatives may be investigated first before other networks or the like are presented as likely choices. In addition, where a video feed is unavailable, a text feed from the Internet or an on-line service may be acquired as a probable alternative.

In addition, the system may define an interest profile of the user, based on explicit or implicit selections. Preferably, implicit selections are derived from a semantic analysis of verbal media voluntarily reviewed by the user. From this analysis, a set of preferences is derived. These preferences are then used to define a filter, operating at a contextual segment level, for various media streams, including news feeds, articles, Internet web searches (using standard type search technology), broadcasts, and the like. Some broadcasts are divided into published segments, so that the beginning and end of a segment may be determined based on a temporal scheme. On the other hand, content-based analysis may be required for other broadcasts, which may entail analysis of closed-caption text signals, transmitted data or metadata signals, for example during the VBI, audio analysis of the broadcast, video analysis of the broadcast, and/or a combination thereof.

For most news or current events broadcasts, the audio and/or semantic information of the broadcast may be sufficient for content analysis, and therefore the analysis is simplified as compared to a content-based image recognition scheme. On the other hand, for entertainment filtering, the image content may be more reliable than semantic communications. For example, police drama and action entertainment often display guns, explosions, or other visual themes which may be reliably characterized using well developed algorithms. Thus, for example, algorithms similar to those used in X-ray security devices to detected firearms in luggage may be applied to video data to detect firearms displayed on screen. The audio track of a firearm or explosion is also distinctive. By contingently recording a broadcast while monitoring the content, it is possible to detect certain characteristics of the broadcast as a whole, and make a decision regarding retention after the capture and analysis is complete. Where storage space or recording capabilities are limited, a prefiltering algorithm is employed in order to determine likely broadcasts which contain the desired characteristics or meet the desired profile, and only the most likely programs are recorded.

Thus, a number of likely choices, based on intelligently determined alternatives, as well as adaptation based on determined user preferences, are initially presented to the user, along with a menu selection to allow rejection of these predicted choices. In this case, the user selects the "reject" selection, and the system presents the user with a next predicted desired menu choice. Since the user history, in this case, does not provide for another choice of particularly high probability, the user is prompted to explicitly choose the program sequence by day, time, channel, and duration. The user then enters the starting time for recording according to the methods described above. The interface then searches its databases regarding the user and broadcast listings to present a most likely choice given that parameter, as well as all available alternatives. In this case, the user history is of little help, and is not useful for making a prediction. In other cases, the system uses its intelligence to "fill in the blanks", which could, of course, be rejected by the user if these are inaccurate or inappropriate. The most likely choices are then those programs that begin at the selected time. If the user had input the channel or network, instead of starting time, then the presented choices would be the broadcast schedule of the channel, e.g. channel 5 or Fox, for the selected day.

The user then selects one of the available choices, which completes the programming sequence. If no database of broadcasts is available, then the user explicitly defines all parameters of the broadcast. When the programming is completed, the interface then updates its user database, prompts the user to set the VCR to record, by, e.g., inserting a blank or recordable tape.

Of course, in the case of a digital video recording device which stored the program on a magnetic hard disk or an optical disk, there might be no need to insert a removable storage medium. However, through consistent use, the available storage medium is likely to be filled to capacity. Therefore, an important part of the operation of the device will be archival management. This entails purging certain recorded programs and/or transferring certain programs to secondary storage.

In a preferred embodiment, the secondary storage is a VHS videocassette. In this case, the controller of the system produces an output suitable for recording on a standard video cassette recorder. This includes either an NTSC type analog video signal, or a digital signal modulated within the NTSC signal space. In the case of a digital signal, preferably multiple forms of error detection and correction codes, including interleaving, forward error correction, and redundancy, are employed. Further, preferably an index is defined and recorded on the the tape. The index includes a description of content and tape offset, and possibly other information, such as content metadata. Preferably, this index is a digital file or set of files, although an analog signal may be provided, for example with key frames (extracted in known manner) with computer readable codes presented in the analog video signal. For example, tape offset may be defined as a text signal in the vide frame, computer readable by an optical character recognition scheme. A modulated signal may also be provided on the audio tracks. An analog index, for example, may be human readable, and therefore not require the controlled for playback. Preferably, the controller is linked to the secondary storage VCR by standard video and audio cables, with an infrared transmitter provided from the controller to the VCR to control VCR operation.

The secondary storage system may also be of another type, for example a magnetic or optical disk drive or array.

The controller typically determines not only a preferred recording patter of the user, but also a preferred "consumption" or viewing pattern of the user. When it is unlikely that the user will view a recorded program, for example due to staleness, disinterest, or low priority, it may be backed up to secondary storage, or purged. For example, in a daily serial program, if a recorded segment is not viewed within one week it may be deleted. In the case of news broadcasts, the retention may be 25-100 hours. If, on the other hand, the user seeks to archive a program or series without viewing, this may be managed in due course, with only slight delays. Thus, if the user seeks a "Honeymooners" archive, without necessarily watching the episodes regularly, these may be stored directly to secondary media, without requiring the primary storage media resources for more than a short time, if at all.

Likewise, in the case of a video library application, such as recording of movies, recording may also be directly to a secondary storage medium, with the primary storage medium resources not expended for an extended period.

On the other hand, there is considerable volume of media consumption that is expected to occur, if at all, within a relatively short time-period from the recording. For these media, recording on a fast, convenient, random access media is preferred. For example, a 40 Gbyte hard disk drive, such as the Quantum QuickView drive or Seagate Technology Inc. A/V drive, with dual access capabilities for typical MPEG 2 data may be appropriate. In this case, the primary storage device provides a number of trick play advantages, such as real-time pause, rewind and fast-forward, variable speed playback, variable quality settings, and the like. Further, content analysis of video streams is preferably conducted from streams stored in the primary storage system.

Another application of the primary store is for storage of the controller operating system and application software, required data such as user preference profiles, and user storage, allowing the device to perform many of the functions of a typical personal computer, even if in an appliance form factor. On the other hand, where the controller system is based on a standard computer operating system, such as Microsoft Windows, the primary media storage system is preferably a physically distinct device from the primary drive used by the operating system. Thus, the data rates and storage characteristics typical of a computer operating system drive will differ from those primarily used by an audio/visual recording device. On the other hand, where the main processor performs content analysis of the recorded media, preferably this data is available to the operating system. In this case, therefore, the content may be redundantly recorded to both storage media, with the data stored for content analysis purged immediately after processing. It is also noted that the analysis may occur after completion of recording, from the audio-visual storage.

If the predicted desire of the user is of no help, or the user seeks to explicitly program the system, a manual program entry system is available. Where there is no useful prediction of the user, the interface may request a training session, which may be a general inquiry, or specifically directed to immediately forthcoming broadcasts, or both.

Thus, the system seeks to determine a reliability of a preference determination. Where the determined reliability is sufficiently high, then the device may proceed according to the inferred user intent and execute accordingly. On the other hand, where the reliability of the prediction is low, the system may prompt the user for feedback to ensure that the operation corresponds to that desired by the user. In some instances, an ambiguity may be present in a user instruction or interaction. In some cases, for example where the possibilities are inconsistent, the system must resolve the ambiguity by further interaction with the user. In other instances, the system may execute all not-inconsistent interpretations, for later resolution by the user.

The reliability of the inference may be determined by examining the population of the choice space with actual instances of user input and user feedback. Where the choice space has a high population density, and the predictions made by the system are generally accepted as accurate by the user, then the system is deemed to have a high reliability for this portion of the choice space. On the other hand, where instances in the portion of the choice space are sparse, or where the user to some degree disagrees with the predictions made by the system in the portion of the choice space, then the reliability may be determined to be low. In the case of low reliability, the system first typically seeks to resolve the direct issue, i.e., interpretation of the user instruction. If the user is willing, a further set of interactions may then commence to try to more fully populate the choice space or define rules or features for the system to apply in the future.

The choice space may be defined by adaptive criteria, for example in the manner of a self-organizing neural network, or by predetermined criteria. Preferably, if an electronic program guide is available, many criteria are derived either directly or by computation from the types of information available in the electronic program guide. An MARS type system or other known technique may also be employed. See, "Exploring MARS: An Alternative to Neural Networks", PC AI, January/February 2000, pp 21-24.

In this case, after a failure to predict a desired program, the user then proceeds to explicitly program the VCR interface to record "Married with Children" on Fox at 9:00 p.m. on Sunday evening. If a database is available, it might also show that "Married with Children" is also syndicated in re-runs, and therefore various episodes may be available on other channels at other times. Thus, during the subsequent session, both the premier showing and re-run of "Married With Children" would be available predicted choices, along with the 11 o'clock News on NBC.

In a preferred embodiment, the system then seeks to generalize the selection and programming entered by the user to extract pertinent characteristics for future predictions by the system. Thus, the user having demonstrated a preference for "Married with Children", the interface then characterizes the selected program. This includes, for example, a characterization of the soundtrack, closed-caption text, the background, foreground, actors and actresses present, visual objects, credits, etc. Of course, an electronic program guide listing for this program is also analyzed. The interface then attempts to correlate the features present in the reference selection with other available selections, i.e., either contingently stored media or upcoming broadcasts.

This comparison may be with a preformed database, providing immediate results, or prospectively, after entry of the reference selection. Of course, a number of correlation functions may proceed simultaneously, and various choices may be merged to form a compound reference selection, any ambiguity in which to be later resolved. Further, as various "episodes" of the reference selection occur, the system appends and integrates the most recent occurrence with the stored reference information, thus updating the reference database. Thus, it is seen that the characteristics extracted representing the user selection need not be limited to a single predefined program, but in fact may represent a group of programs having one or more common characteristics.

After the reference profile is identified for a preferred type of media, this may be used to autonomously operate the system. Thus, when an occurrence corresponding to a user preference is identified, it is immediately buffered, until such time as the particular episode may be compared against previously stored episodes. If two identical broadcasts occur simultaneously, one may be selected, i.e., the one with the best reception. When the episode is identified, if it is new, the buffered broadcast information is permanently stored; if it is previously stored, the buffer is flushed and the occurrence is further ignored as a "hit". Since the apparatus is now not responding to a direct request, it may then perform various housekeeping functions, including updating databases of broadcasts and the like. This is because, although the apparatus includes default profiles when manufactured, a large number of new broadcasts are always being created and presented, so that the apparatus must constantly maintain its "awareness" of data types and trends, as well as update its predicted preferences of the user(s).

The default characteristics may be derived from collaborative filtering, expert programming, or other known technique.

For example, based on input from the user, other programming, including the same actors and/or actresses may be processed, e.g., recorded. For example, Katey Segal periodically appears on "Jay Leno" as a musical guest, and therefore may be recorded in these appearances.

The system according to this example, while requiring certain hardware to be present, may be implemented as a software program within a relatively standard personal computer (e.g., Pentium III 600 MHz or better) system with MPEG 2 video support and video tuning, input and output. Preferably, however, the system includes a hardware MPEG 2 codec and an audio/visual hard drive separate from than normally used by the operating system.

Example 11

Intelligent Adaptive VCR Interface

Another example of the use of the present programming system allows a hybrid request which does not correspond to any single broadcast schedule entry. In this case, if the user instead wishes to record weather reports on all channels, the interface may be of further help. The interface controls a plurality of tuner elements 2502 of a video signal reception device 2501, so that a plurality of broadcasts may be simultaneously received. Using the mass storage and possibly image data compression described above, a plurality of broadcasts may also be recorded simultaneously in the intermediate storage 2503. The mass storage may be multiple VCRs, optical storage, magnetooptical storage, magnetic storage including disk (e.g. single disks, multimedia compatible disks, RAID, etc.) tape (QIC, 8 mm, 4 mm, etc.). Preferably, the archival recording medium is recordable DVD or possibly recordable CD-ROM.

The optical recording tape produced by ICI, Inc., or other card or tape optical storage medium might also be a useful storage medium for large volumes of data, as might be generated by recording multiple video signals. The known implementations of the ICI product system best suited for commercial or industrial use and not for individual consumer use.

In any case, the interface 2506 accesses its associated database 2413 to determine, at a given time, which channels are broadcasting "news". The interface system might also randomly or systematically monitor or scan all or a portion of the available broadcasts for "special reports". The interface system then monitors these channels for indicia of a "weather" information content broadcast. For example, the newscaster who appears to report the weather on a given show is usually the same, so that a pattern recognition system 2505 of the video frame could indicate the presence of that newscaster. In addition, the satellite photographs, weather radar, computer generated weather forecast screens, etc. are often similar for each broadcast. Finally, news segments, such as "weather" often appear at the same relative time in the broadcast. Using this information, the interface system selects certain broadcast segments for retention.

This retention begins at a beginning of a news segment, such as "weather", stop recording during commercials, and continues after return from break, on all selected channels. In order to assist in making accurate decisions, the monitored broadcasts may be stored in a temporary storage medium until a decision is made, and thereafter transfer the recording to a more permanent storage medium if that be appropriate. It is noted that the system of the present invention is intelligent, and may therefore "learn" either explicitly, or through training by example. Therefore, if the system made an error during the process, the user may define the error of the system, e.g., a substitute newscaster or rearrangement of news segments, so that the interface system has a reduced likelihood of making the same error again. Thus, while such a system is inherently complex, it poses significant user advantages. Further, while the interface system itself is sophisticated, it provides simplicity, with inductive reasoning and deductive reasoning for the user.

Thus, a minimum of user interaction is required even for complex tasks, and nearly full automation is possible, as long as the user and apparatus are able to communicate to convey a preference. As a further embodiment according to the present invention, the interface system will stored transmitted data, and subsequently review that data, extracting pertinent information. The stored data may then be deleted from the storage medium. In this regard, the system may be self learning.

It is noted that various algorithms and formulae for pattern recognition, correlation, data compression, transforms, etc., are known to those skilled in the art, and are available in compendiums, such as Netravali, Arun N., and Haskell, Barry G., "Digital Pictures Representation and Compression", Plenum Press, New York (1988): Baxes, Gregory A., "Digital Signal Processing, A Practical Primer", Prentice-Hall, Englewood Cliffs, N.J. (1984); Gonzalez, Rafael C., "Digital Image Processing", Addison-Wesley, Reading, Mass. (1987), and, of a more general nature, Press, William H. et al, "Numerical Recipes in C The Art of Scientific Computing", Cambridge University Press, 1988.

Example 12

Intelligent Adaptive VCR Interface

A further example of the use of the advanced intelligent features of the present invention is the use of the system to record, e.g., "live" musical performances. These occur on many "talk" shows, such as "Tonight Show" (NBC, 11:30 p.m. to 12:30 p.m., weeknights), "Saturday Night Live" (NBC 11:30 p.m. to 1:00 a.m. Saturday-Sunday), and other shows or "specials" such as the "Grammy Awards". The interface, if requested by the user to record such performances, then seeks to determine their occurrence by, e.g., analyzing a broadcast schedule; interacting with the on-line database 2411; and by reference to the local database 2413. When the interface determines with high probability that a broadcast will occur, it then monitors the channel(s) at the indicated time(s), through the plurality of tuners 2502. The system may also autonomously scan broadcasts for unexpected occurrences.

In the case of pay-per-view systems and the like, which incorporate encrypted signals, an encryption/decryption unit 2509 is provided for decrypting the transmitted signal for analysis and viewing. This unit also preferably allows encryption of material in other modes of operation, although known decryption systems without this feature may also be employed with the present system. During the monitoring, the interface system acquires the audio and video information being broadcast, through the signal receiver 2408, and correlates this information with a known profile of a "live musical performance", in the preference and event correlator 2412. This must be distinguished from music as a part of, e.g., a soundtrack, as well as "musicals" which are part of movies and recorded operas, if these are not desired by the user. Further, music videos may also be undesirable. When the correlation is high between the broadcast and a reference profile of a "live musical performance", the system selects the broadcast for retention. In this case, the information in the intermediate storage 2503 is transferred to the plant 2507, which includes a permanent storage device 2508. The intermediate storage 2503 medium is used to record a "buffer" segment, so that none of the broadcast is lost while the system determines the nature of the broadcast. This, of course, allows an extended period for the determination of the type of broadcast, so that, while real-time recognition is preferred, it is not absolutely necessary in order to gain the advantages of the present invention. The buffer storage data, if not deleted, also allows a user to select a portion for retention that the interface system has rejected.

Thus, while it is preferable to make a determination in real time, or at least maintain real time throughput with a processing latency, it is possible to make an ex post facto determination of the nature of the broadcast program. By using an available delay. e.g., about 5 to about 300 seconds, or longer, the reliability of the determination can be greatly increased as compared to an analysis of a few frames of video data, e.g., about 15 to about 300 mS. An intermediate reliability will be obtained with a delay of between about 300 to about 5000 mS. As stated above, the storage system for this determination need not be uncompressed nor lossless, so long as features necessary to determine the character of the broadcast are present. However, it is preferred that for broadcast recording intended for later viewing, the storage be as accurate as possible, so that if a compression algorithm is implemented, it be as lossless as reasonable given the various constraints. The MPEG-2 standard would be applicable for this purpose, though other video compression systems are available.

In a preferred situation, approximately 5 minutes of broadcast material is analyzed in order to make a determination of the content. This broadcast material is stored in two media. First, it is stored in a format acceptable for viewing, such as videotape in a videotape recorder, or in digital video format, e.g., compressed in MPEG-2 format. Second, it is received in parallel by the computer control, where the data is subject to a number of recognition and characterization processes. These are performed in parallel and in series, to produce a stored extracted feature matrix. This matrix may contain any type of information related to the broadcast material, including an uncompressed signal, a compressed signal, a highly processed signal relating to information contained in particular frames and abstract features, spatially and temporally dissociated from the broadcast signal, yet including features included in the broadcast which relate to the content of the broadcast.

One possible method incorporates one or more digital signal processor based coprocessor elements, which may be present on, e.g., PCI cards in a standard type Intel personal computer or Apple Macintosh platform. These elements may be TI TMS320C600X processors, or other known devices. In fact, native signal processing support of Intel Pentium III processors is sufficient such that one or more parallel processors or parallel networked computers, operating under a standard operating system such as Microsoft Windows NT 4.0/2000 or Linux (or other UNIX derived-platform) may provide sufficient processing power to analyze the content. The advantage of using a general-purpose host is the volume pricing and ubiquity of such systems.

A known board containing a DSP is the MacDSP3210 by Spectral Innovations Inc., containing an AT&T digital signal processor and an MC68020 CISC processor, and which uses the Apple Real-time Operating System Executive (A/ROSE) and Visible Cache Operating System (VCOS). It is preferred that the processors employed be optimized for image processing, because of their higher throughput in the present image processing applications, to process the video signals, and more other signal processors to analyze the audio signals. Of course, general purpose processors may be used to perform all calculations. An array processor, which may be interfaced with a Macintosh is the Superserver-C available from Pacific Parallel Research Inc., incorporating parallel Inmos Transputers. Such an array processor may be suitable for parallel analysis of the image segment and classification of its attributes.

Pattern recognition processing, especially after preprocessing of the data signal by digital signal processors and image compression engines, may also be assisted by logical inference engines, such as FUTURE (Fuzzy Information Processing Turbo Engine) by The Laboratory for International Fuzzy Engineering (LIFE), which incorporates multiple Fuzzy Set Processors (FSP), which are single-instruction, multiple data path (SIMD) processors. Using a fuzzy logic paradigm, the processing system may provide a best fit output to a set of inputs more efficiently than standard computational techniques, and since the presently desired result requires a "best guess", rather than a very accurate determination, the present interface is an appropriate application of this technology.

As noted above, these processors may also serve other functions such as voice recognition for the interface, or extracting text from video transmissions and interpreting it. The continued development of optical computers may also dramatically reduce the cost of implementing this aspect of the present invention; however, the present state of the art allows the basic functions to be performed. See attached appendix of references, incorporated herein by reference, detailing various optical computing designs.

A real time operating system may be employed, of which there are a number of available examples. Real Time JAVA, real timeWindows CE, RTMX, Micro Digital SMX™, real time Linux (see, www.rtlinux.org), RTX, QNX, HyperKernel, INTime, VxWorks, pSOSystem, see, http://www.faqs.org/faqs/realtime-computing/faq/, are all examples of operating systems which have, to some extent, real-time characteristics. Some older examples include SPDX DSP operating system, IBM's Mwave operating system and AT&T's VCOS operating system. These operating systems, and possibly others, are to be supported by Microsoft Inc.'s Windows 95 operating system Resource Manager function.

It is noted that various methods are available for determining a relatedness of two sets of data, such as an image or a representation of an image. These include the determination of Hausdorff distance, fuzzy correlation, arithmetic correlation, mean square error, neural network "energy" minimization, covariance, cross correlation, and other known methods, which may be applied to the raw data or after a transformation process, such as an Affine transformation, a Fourier transformation, a wavelet transformation, a Gabor transformation, a warping transformation, a color map transformation, and the like. Further, it is emphasized that, in image or pattern recognition systems, there is no need that the entire image be correlated or even analyzed, nor that any correlation be based on the entirety of that image analyzed. Further, it is advantageous to allow redundancy, so that it is not necessary to have unique designations for the various aspects of the data to be recognized, nor the patterns to be identified as matching the uncharacterized input data. The NDS1000 Development System from Nestor, Inc., provides image recognition software which runs on a PC compatible computer and a Data Translation DT2878.

It is noted that many functions of a video recorder might also be facilitated by the use of powerful processors. It is also noted that these image recognition functions need not necessarily all be executed local to the user, and may in fact be centralized with resultant processed data, or portions thereof, transmitted to the remote user. This would be advantageous for two reasons: first, the user need not have an entire system of hardware localized in the client device, and second, many of the operations which must be performed are common to a number of users, so that there is a net efficiency to be gained. In the case of remote execution, non-mainstream PC processors and operating systems which provide faster or more complete processing and additional features may be desirable.

Example 13

Intelligent Adaptive VCR Interface

The interface of the present invention incorporates an intelligent user interface level determination. This function analyzes the quality of the user input, rather than its content. Thus, this differs from the normal interface user level determination that requires an explicit entry of the desired user level, which is maintained throughout the interface until explicitly changed. The present interface may incorporate the "smart screen" feature discussed above, which may, through its analysis of the past user interaction with the interface predict the most likely predicted user input function. Thus, the predictive aspects of the present invention may be considered a related concept to the intelligent user level interface of the present invention. However, the following better serves to define this aspect of the invention.

The input device, in addition to defining a desired command, also provides certain information about the user which has heretofore been generally ignored or intentionally removed. With respect to a two-dimensional input device, such as a mouse, trackball. joystick, etc., this information includes a velocity component, an efficiency of input, an accuracy of input, an interruption of input, and a high frequency component of input. This system is shown schematically in FIG. 21, which has a speed detector 2104, a path optimization detector 2105, a selection quality detector 2106, a current programming status 2108, an error counter 2109, a cancel counter 2110, a high frequency signal component detector 2112, an accuracy detector 2113 and a physio-dynamic optimization detector 2114. In addition, FIG. 21 also shows that the interface also uses a past user history 2107, an explicit user level choice 2111 and an explicit help request 2115.

This list is not exclusive, and is somewhat dependent on the characteristics of the specific input device. For a mouse, trackball, or other like device, the velocity or speed component refers to the speed of movement of the sensing element, i.e. the rotating ball. This may also be direction sensitive, i.e., velocity vector. It is inferred that, all other things being equal, the higher the velocity, the more likely that the user "knows" what he is doing.

The efficiency of input refers to two aspects of the user interface. First, it refers to the selection of that choice which most simply leads to the selection of the desired selection. For example, if "noon" is an available choice along with direct entry of numbers, then the selection of "noon" instead of "12:00 p.m." would be more efficient. The second aspect of efficiency has to do with the path taken by the user in moving a graphic user interface cursor or input device from a current position to a desired position. For example, a random curve or swiggle between locations is less efficient than a straight line. This effect is limited, and must be analyzed in conjunction with the amount of time it takes to move from one location of a cursor on the screen to another; if the speed of movement is very rapid, i.e. less than about 400 mS for a full screen length movement, or less than about 300 mS for small movements, then an inefficiency in path is likely due to the momentum of the mouse and hand, momentum of the rolling ball, or a physiological arc of a joint. This aspect is detected by the physio-dynamic optimization detector 2114. Thus, only if the movement is slow, deliberate, and inefficient, should this factor weigh heavily. It is noted that arcs of movement, as well as uncritical damping of movement around the terminal position may be more efficient, and a straight path actually inefficient, so that the interface may therefore calculate efficiency based on a complex determination, and act accordingly where indicated.

Thus, an "efficient" movement would indicate a user who may work at a high level, and conversely, an inefficient movement would indicate a user who should be presented with simpler choices. The efficiency of movement is distinguished from gestures and path dependent inputs, such as drawing and painting. These may be distinguished based on machine status or context. Further, the interface may recognize gestures in may contexts. Therefore, gestures or gesticulations must be distinguished from direct command inputs before further processing. Gestures or gesticulations, like path efficiency, may also be analyzed separately from the basic command input, and therefore may be provided as a separate input stream on an interface level rather than an application level, thus allowing cross application operation.

Likewise, if a movement is abrupt or interrupted, yet follows an efficient path, this would indicate a probable need for a lower user interface level. This would be detected in a number of elements shown in FIG. 21, the speed detector 2104, a high frequency signal component detector 2112, an accuracy detector 2113 and a physio-dynamic optimization detector 2114. In addition, FIG. 21 also shows the use of a past user history 2107, an explicit user level choice 2111 and an explicit help request 2115.

While the interface may incorporate screen buttons that are smart, i.e. those that intelligently resolve ambiguous end locations, the accuracy of the endpoint is another factor in determining the probable level of the user. Thus, for example, if a 14" color monitor screen is used, having a resolution of 640 by 480 pixels, an accurate endpoint location might be considered within a central area of a displayed screen button of size about 0.3" by about 1.0", for example within an area of about 0.25" by about 0.75". A cursor location outside this location, but inside the screen button confines would indicate an average user, while a cursor location outside the screen button may be inferred to indicate the button, with an indication that the user is less experienced in using the pointing device. These are not necessary conclusions, for example a skilled user may efficiently point to an edge of an active area on the screen, while a novice user may slowly and deliberately point to a precise center location; therefore, evaluation of a number of characteristics may be helpful in inferring user skill level or other types of characteristics.

Finally, in addition to the efficiency of the path of the cursor pointing device, a high frequency component may be extracted from the pointer signal by the high frequency signal component detector 2112, which would indicate a physical infirmity of the user (tremor), a distraction in using the interface, indecision in use, or environmental disturbance such as vibration. In this case, the presence of a large amount of high frequency signal indicates that, at least, the cursor movement is likely to be inaccurate, and possibly that the user desires a lower user level. While this is ambiguous based on the high frequency signal content alone, in conjunction with the other indicia, it may be interpreted. If, for example, the jitter is due to environmental vibrations, and the user is actually a high level user, then the response of the user level adjust system would be to provide a screen display with a lowered required accuracy of cursor placement, without necessarily qualitatively reducing the implied user level of the presented choices, thus, it would have an impact on the display simplification 2103, with only the necessary changes in the current user level 2101.

Alternatively, the user may input a gesture, i.e., a stylized input having no other command input meaning, which may be detected by analyzing the input. The input may be a manual input, voice input, image (e.g., sketch, video image capture, image exemplar) or the like. A number of different gestures may be recognized. These gestures are generally explicit inputs, which allow a voluntary action to be interpreted as input information to the interface.

Example 14

Intelligent Telephone Device Interface

Likewise, the present interface could be used to control complex telecommunications functions of advanced telephone and telecommunications equipment. In such a case, the user display interface would be a video display, or a flat panel display, such as an LCD display. The interface would hierarchically present the available choices to the user, based on a probability of selection by the user. The input device would be, for example, a small track ball near the keypad. Thus, simple telephone dialing would not be substantially impeded, while complex functions, such as call diversion, automated teledictation control, complex conferencing, caller identification-database interaction, and videotel systems, could easily be performed.

The present invention allows complete integration of telephony operations, including voice over IP (VOIP), video conferencing, call center functions, telephone answering/voice mail/automated attendant functions, and the like. The controller may also provide such functions as least-cost routing calculations and the like.

Preferably, the interface according to the present invention provides an adaptive interface for use of the system, which customizes the information presented to the user and the information elicited from the user based on a user characterization of profile, the context of use, and possibly the past history of use by that user or a group of users. The use of past history is optional, since salient user characteristics are present in the user profile, also based on past history, but generally at a higher level of abstraction. It is also possible to employ the past history alone, without abstracting the information to generate a user profile. In some cases, the relevant information for a user profile will be largely distinguished from the relevant information for a user past history of use, since the user profile is intended to be largely generalizable characteristics, while the past history may be intended to be largely specific examples of use.

Example 15

Audio Recording Management System

The present invention is also suitable for use as a system, method and/or user interface for audio files, for example in a jukebox or background music arrangement. The audio filed maybe provided by wireless communications (e.g., FM radio, satellite, cellular techniques, TV band subcariers, etc.), wired communications (e.g., telephone, Internet, DSL, T1, etc.), physical storage media (e.g., musical compact disks), etc. The preferred system provides a user preference based "filter", allowing the user to personalize the listening experience. In the event o a background music application, instead of a personal preference, a collaborative filtering technique is applied, to determine a group preference. The technology may encompasses a number of different methods of filtering, including musical style, artist, popularity, semantic content, play history, or the like. See, Music, Mind, Machine, Computational Modeling of Temporal Structure in Musical Knowledge and Music Cognition, [Unpublished manuscript, August 1995, Peter Desain & Henkjan Honing], http://www.douglas.bc.ca/-landonb/360/DH-95-C.HTML, expressly incorporated herein by reference.

The basis for characterizing the audio may include in band signals and content analysis, out of band signals, electronic program guides and associated data records, and explicit user characterization. A preferred system employs a standard North American FM broadcast system in which a metadata stream is encoded within the audio channel, similar to the Secure Digital Music Initiative (SDMI) technique, for example employing the audio watermarking technology of Verance Corp (Aris Corp. and Solana Corp.), or Arbitron. This metadata provides a digital data stream which provides identification and preferably characteristics of the song. This information is decoded at the receiver, and an intelligent decision may then be made concerning the associated content, for example, record, play live, or purge/ignore. Preferably, a mass storage system is provided to buffer content, at least until a decision is made, and preferably for long term storage. Thus, the broadcaster need not redundantly broadcast content, as it can be repeated from local storage. On the other hand, such a system may scan multiple channels, to define a custom play list.

The content may also be derived from an on-line source, for example an MP3 (MPEG Audio Level 3 encoding) file, and downloaded and stored in this format. In the case of an Internet download, the metadata need not be encoded within the audio signal, and may be provided as a separate data file, or even from a separate source entirely In a broadcast system, each broadcast "segment" is preferably encoded with an identifier, which can then be interpreted using a local database at the receiver. Preferably, the broadcast is encoded with a full set of characteristics, so that a complete local database is not required, thus preserving storage capability for content rather than metadata.

In a preferred embodiment, as an integral part of the design, means are provided for respecting the interests of broadcasters, commercial sponsors, and copyright holders. In other words, a general or specific accounting is made for use o media. In theory, the costs to the consumer need not be greater than at present, and, in fact, with efficiencies, may actually reduce costs. Thus, where listener presently has no costs for use of broadcast radio, costs with the present system will likely also be without direct user cost. Instead, an accounting system is provided for distributing costs and revenues among the broadcaster, sponsor, and service provider. Media stored in a receiving device may be encrypted, to assure compliance with licensor-imposed restrictions. In order to promote user compliance with the system, incentives may be provided to the user to cooperate with data gathering. Such incentives can, but need not be monetary. The system may also provide demographically targeted advertising. Thus, instead of directly playing commercials inserted by a broadcaster, a set of commercials or advertisements may be presented to the user aligned with the user's tastes, preferences, and value to sponsors. A user may also eliminate or defer all advertisements, at some cost. Therefore, the accounting system seeks to attribute costs and revenues based on source, recipient and contracted sponsorship. According to this model, each targeted listener is presumably more valuable to a sponsor than an unselected listener. Thus, a listener may be burdened with fewer commercials. Due to time-shifting, broadcasters will be able to achieve higher valuation for off-hours broadcasts. Sponsors which appropriately target advertisements will see lower advertising costs and higher response rates.

The preferred design takes the form of an audiophile, automotive or personal radio device, likely integrated with an MP3 codec and large hard disk drive, for example 20-40 Gbytes.

The service provider may be compensated by the user, in the form of a fixed of variable service charge, the broadcasters or the sponsors. Typically, the user will have a relationship with the provider, due to privacy concerns. Thus, the provider also serves as an aggregator and portal, filtering user identity from the broadcasters and sponsors. Some premium broadcasts may be encrypted, with users accounting for a fee for decryption, which may have any appropriate rules, such as complete decryption, play once, play for a limited period, copy once, etc.

As stated above, commercials may be stored on the user's local system and played back. These commercials may be subject to personalized filtering as well, and therefore the per-impression ad rates may exceed the normal ad rates. This will lead to increased advertising revenues for the broadcasters, which may be shared with the licensors. Using, for example, using the Internet as an uplink channel, auditing and verification techniques may be employed. In this case, the device preferably has an internal modem or USB port. For audiophile or integrated video-audio devices, an IEEE-1393 port may be preferred. Depending on the implemented privacy policy, which may vary between users, marketable personal profile and demographic information may be generated and exploited.

An intelligent radio system provides substantial advantages over simple Internet downloads of MP3 files, which are quite popular. The technology is fundamentally a "push" or broadcast technology, using relatively cheap bandwidth. Real-time delivery is assured. Using a combination of time shifting and multiple broadcast channels, a wide variety of source material will be available periodically, negating the need for large local memory at the client system.

Example 16

Character Recognition of Video

The present invention may incorporate character recognition from the video broadcast for automatic entry of this information. This is shown schematically in FIG. 24, with the inclusion of the videotext and character recognition module 2414. This information is shown to be transmitted to the event characterization unit 2407, where the detected information is correlated with the other available information. This information may also be returned to the control 2402. Examples of the types of information that would be recognized are titles of shows, cast and crew from programming material, broadcast special alerts, time (from digital display on special access channels), stock prices from "ticker tape" on special access channels. etc. Thus, this technology adds functionality to the interface. In addition, subtitled presentations could be recognized and presented through a voice synthesizer, to avoid the necessity of reading the subtitle. Further, foreign language subtitles could be translated into, e.g., English, and presented. In a particular embodiment, certain game shows, such as "Wheel of Fortune" have alphanumeric data presented as a part of the programming. This alphanumeric text may be extracted from the image. In a preferred embodiment, the character recognition is performed in known manner on a buffer memory containing a frame of video, from a device such as a Data Translation DT2851, DT2853, DT2855, DT2867, DT2861, DT2862 and DT2871. A contrast algorithm, run on, for example, a Data Translation DT2858, DT2868, or DT2878, first removes the background, leaving the characters. This works especially well where the characters are of a single color, e.g. white, so that all other colors are masked. After the "layer" containing the information to be recognized is masked, an algorithm similar to that used for optical character recognition (OCR) is employed. See, U.S. Pat. No. 5,262,860, incorporated herein by reference. These methods are well known in the art. This may be specially tuned to the resolution of the video device, e.g. NTSC, Super Video Home System (S-VHS), High Definition Television and/or Advanced Television System Committee (HDTV/ATSC-various included formats), Improved definition television (IDTV), Enhanced Definition Television (EDTV), Multiple Sideband Encoding (MUSE), Phase Alternate Line (PAL), Sequential Coleur à Memoire (SECAM), MPEG-2 digital video, or other analog or digital transmission and/or storage formats, etc. In addition, since the text normally lasts for a period in excess of one frame, a spatial-temporal image enhancement algorithm may be employed to improve the quality of the information to be recognized, if it is indistinct in a single frame.

Example 17

Smart House Interface

The present invention may also be incorporated into other types of programmable controls, for example those necessary or otherwise used in the control of a smart house. See, "The Smart House: Human Factors in Home Automation", Human Factors in Practice, December 1990, 1-36. The user interface in such a system is very important, because it must present the relevant data to the user for programming the control to perform the desired function. A smart house would likely have many rarely used functions, so that both the data and the available program options must be presented in the simplest manner consistent with the goal of allowing the user to make the desired program choice. For example, a smart house system with appropriate sensors might be used to execute the program: "start dishwasher, if more than half full, at 9:00 p.m." This program might also include a program to load soap into the dishwasher or to check if soap is already loaded. A user who wishes to delay starting until 11:00 p.m. would be initially presented with the defaults, including start time as an option, which would be simply modified by correcting the starting time. The next time the same user wishes to program the device, an algorithm might change the predicted starting time to, e.g. 10:00 p.m., which is a compromise between the historical choices. Alternatively, the new predicted start time might be 11:00 p.m., the last actually programmed sequence. Finally, the next predicted start time might remain at 9:00 p.m. The resolution of these choices would depend on a number of factors: a preprogrammed expert system; any other prior history of the user, even with respect to other appliances or in other situations; the context, meaning any other contemporaneously programmed sequences; and an explicit input from the user as to how the inputs should be evaluated for predictive purposes.

The expert system may balance many factors, including disturbing noise from the dishwasher, which might be objectionable while persons are near the dishwasher, people are sleeping, or during formal entertainment nearby. On the other hand, if the dishwasher is full, or its cleaned contents are needed, the dishwasher should run with higher priority. Some persons prefer to reshelve dishes in the evening, before sleep, so in those cases, the dishwasher should complete its cycle before bedtime. The dishwasher, on a hot water cycle, should not run during showers or baths, and preferably should not compete with a clothes washer for hot water. This may be sensed by direct communication with other systems, or by sensing pressure or vibration in the water feed lines. The dishwasher preferably does not run during peak electrical demand times, especially if electrical rates are higher. Water conserving cycles should be selected, especially during droughts or water emergencies. If dishes remain in the dishwasher for an extended period, e.g., overnight, a moistening cycle may be employed to help loosen dirt and to help prevent drying. On the other hand, a fast cycle may also be provided where desired. Thus, the expert system is preprogrammed for a number of high-level considerations that might be common to a large number of users of the system, thus shortening the required training time of the system to learn the preferences of the user. Such a sophisticated system may eliminate the need entirely for adaptive responses, based on weighing of considerations provided by the user. Of course, other considerations may also be included for the operation or delay of operation of the dishwasher. Further, these considerations are exemplary of the types of considerations which might be employed in an expert system in a smart house.

The prior history of the user provides an excellent source of information regarding the preferences of the user, although this is sometimes not the most efficient means, and may often include contradictory data. This historical use data is therefore analyzed in a broad context in order to extract trends, which over a number of uses may be further extracted as "rules". Often, the user history data will be applied at a high level, and will interact with preexisting rules of the expert system, rather than to create new rules. In this case, the expert system preferably includes a large number of "extra rules", i.e., those with an a priori low probability or low weighing, providing a template for future pattern matching. The past history may be evaluated in a number of ways. First, an expert system may be used to analyze the past usage pattern. Second, a neural network may be trained using the historical data along with any corrective feedback. Third, the historical data may be used to alter fuzzy logic rules or classifications, either by expert system, neural network, or by other known means. Thus, as stated above, the user profile, while potentially related to history of use, may include distinct information, such as explicit entry of user preferences and path dependent characteristics normally filtered from a stored past history.

The context of use may also be used to determine a desired or predicted action. Therefore, if on a single occasion, a number of changes are made, for example during a large house party, the standard predictions would not be altered, and thus a normal program would remain in effect. Of course, a new "house party" sequence would then be recognized and included as a new type of sequence for future evaluation. For example, a house party sequence might encompass a number of house systems. Thus, the delay of dishwasher until 11:00 p.m. allows all dishes from the party to be placed in the dishwasher before starting. An alarm system would be generally deactivated, although various zones may be provided with different protection; e.g., a master suite may be off-limits, with an alarm transmitting a signal to a user's beeper, rather than a call to police or alarm service company. During the summer, the air conditioner might run even if doors and windows are open, even if the normal program prompts for door closings before the air conditioner is turned on. Likewise, exterior lighting would be turned on at dusk, with bug lights turned on during the entire party. The user might individually make such decisions, which would be recognized as a group due to their proximity in time, or delineate the actions as a group. Thereafter, where some of these choices are made, and the profile of choices matches a "party" style, the remainder of the choices may be presented as a most likely or predicted choice. The group of choices together might also be selected from a menu of choices. Appropriate sensors may be provided for each system, or for the house as a whole, to detect the relevant conditions. Preferably, sets of conditions may be determined based on a population statistic, i.e., collected from a variety of sources, and stored centrally in a library. The system may then communicate with the library, for example through the Internet, to search for a resource in the library which matches detected or anticipated conditions. If such a resource is identified, it is identified, and processed according to local variations, which may include local hardware configurations, user preferences, and the like, and then checked for consistency. If consistent, this modified resource may then be executed, providing an adaptive control methodology. If inconsistent, another resource may be selected, or the user may be involved in correcting the issues identified.

Context also relates to sensor data, which might include sensors in particular appliances or unrelated sensors. For example, video, audio, ultrasonic, radar, lidar, and/or infrared motion detectors may be used to estimate the number of persons present in a house. Likewise, heavy use of a bathroom, as detected by plumbing sensors, flushes, frequent light transitions or door openings, might also be useful as data to estimate a crowd size. Temperature sensors, video imaging sensors, perimeter sensors, electrical sensors relating to the status of appliances and machinery, and other types of sensors may provide data for context determination.

Of course, explicit inputs must also be accommodated, which may be atomic instructions or complex combinations of instructions which may control a single house system or a number of house systems simultaneously. The explicit input preferably comes by way of the adaptive interface described throughout the present application, or an interface incorporating particular aspects thereof.

The smart house system also controls the climate control system. Thus, it could coordinate temperatures, air flow and other factors, based on learned complex behaviors, such as individual movement within the dwelling. Since the goal of the programming of the smart house is not based on the storage of discrete information, but rather the execution of control sequences at various times and under certain circumstances, the control would differ in various ways from that of a consumer entertainment management device. However, the user interface system, adaptive user level, help system, and the like might share substantial similarities.

It is noted that a common user interface system may be provided for multiple systems, for example communicating through a network, which may be wired, wireless or communicate through power lines or light waves, thus allowing for the consumer entertainment management device and other devices within a smart house to share hardware and software resources, even if these devices have different essential control systems, so that the common elements are not redundant. Therefore, by applying a single control to many tasks, a common user interface is used, and the cost is reduced.

Example 18

Programmable Environmental Controller

The present Example relates to a programmable environmental controller application. In this case, a sensor or sensor array is arranged to detect a change in the environment that is related to a climatic condition, such as an open door. On the occurrence of the door opening, the system would apply a pattern recognition analysis to recognize this particular sensor pattern, i.e. a mass of air at a different temperature entering the environment from a single location, or a loss of climate controlled air to a single location. These sensor patterns must be distinguished from other events, such as the action of appliances, movement of individuals in the vicinity of the sensor, a shower and other such events. It is noted that in this instance, a neural network based adaptive controller may be more efficient than a standard fuzzy logic system, because the installation and design of such a system is custom, and therefore it would be difficult to program fuzzy set associations a priori. In this case, a learning system, such as a neural network, may be more efficient in operation and produce a better result than other adaptive methods. The training procedure may be fully automated, (with manual feedback provided where necessary to adjust the control parameters) so long as sufficient sensors are provided for controlling the system, and also that an initial presumption of the control strategy is workable during the training period. In the case of an HVAC system, the initial strategy incorporated is the prior art "bang-bang" controller, which operates as a simple thermostat, or multi-zone thermostat. As a better starting point, a fuzzy logic temperature controller may be modeled and employed. Other known strategies that are not often used in environmental control include the proportional-integral-differential controller (PID). The present control is preferably model based or MARS, applying direct knowledge of the control task and characteristics of the system to the control issue. Likewise, in HVAC systems, cost and operational efficiency are often a paramount concerns, and the control preferably is responsive to sensors for energy consumption and/or efficiency.

It is noted that the HVAC system may also be of a type that is inoperable with standard type controllers; for example, the system may be such as to produce temperature oscillations, or significant temperature or pressure gradients. In this case, the default control system must be provided to compensate the system, allowing more subtle corrections and adjustments to be made based on preferences. Thus, an expert system is provided, which is updated based on user input, and which receives context information, including sensor data and other inputs. Explicit user preferences and programming are also input, preferably with an interface in accordance with the present invention or incorporating aspects thereof.

In this example, which may be described with reference to FIG. 23, sufficient sensors in a sensor array 2301 are provided, being light, temperature, humidity, pressure, air flow and possibly a sensor for determining an event proximate to the sensor, such as door opening. While a single sensor array 2301 may provide input, a plurality of sensor arrays are preferably employed in complex installations. The sensors, with the possible exceptions of the flow sensor and event sensor, may be housed in a single sensor head. Further, the temperature and pressure sensors may be combined in a single integrated circuit by known means. The light and temperature sensors are known to those skilled in the art, and need not be described herein. The pressure sensor may be a Sensym strain gage pressure transducer, a Motorola pressure transducer device, or the like, which are known in the art. Alternatively, other types of sensors may be used, for example a micromachined silicon force balance pressure transducer, similar in electrical design to the Analog Devices monolithic accelerometers, ADXL-50 or ADXL-05.

The humidity sensor is preferably an electronic type, producing an electrical signal output. It need not be internally compensated for the other measured environmental factors, as the constellation of sensors may compensate each other. The air flow sensor may be based on pressure differentials, using the electronic pressure sensor described above, or may be a mechanical vane type, which is based on flows. In most applications, a single flow axis will be sufficient, however, in some circumstances, a two or greater axis sensor will be required. Further, in the case of large volume areas, complex turbulent flow patterns may be relevant, for which known sensors exist. Laser based air flow sensors may be employed, if desired. LIDAR sensors may be used to determine flow rate, direction, and turbulence.

The event sensor may be of any type, and depends particularly on the event being measured. In the present case, where a door opening is to be detected, it is preferred that the environmental control be interfaced with a perimeter intrusion alarm system, which, for example, provides a magnet embedded in the door and a magnetic reed switch in the door frame. Individual sensors are normally wired to the alarm control panel, thus providing central access to many or all of the desired event detection sensors while minimizing the added cost. The event detector may also be an ultrasonic, infrared, microwave-Doppler, mechanical, or other type of sensor. Wireless sensors may also be used, communicating via infrared beams, acoustic, radio frequency, e.g., 46-49 MHz, 900 MHz, 2.4 GHz, 5.2-5.8 GHz, or other bands, using analog, digital or multilevel quantized digital AM, FM, PSK, QAM, or other modulation scheme, and/or spread spectrum techniques (frequency hopping and/or direct sequence spread spectrum) or a combination thereof. Spread spectrum devices may be employed, as well as time, code or frequency multiplexing or a combination thereof. Various failsafe mechanisms are preferably included, including those identifying transmitter or receiver failure, communication interference or message collision, and other conditions. A reverse communication channel may also be included, either symmetric in band, or asymmetric in band or out of band, for communication with the sensor or apparatus associated with the sensor, and as part of the failsafe system. A forward error correction protocol is preferably effected, which may detect errors and include error correcting codes for digital transmissions. Digital data may be encrypted, and the transmission modulation scheme may also include an encrypted sequence of frequency, phase, convolution, noise, or other modulation parameter.

While wireless data transmission as described above may be used, the preferred method of receiving sensor information is through a serial digital or analog (i.e., 4-20 mA transmitter) data transmission which may be multiplexed and/or part of a local area network scheme, with minimal local processing of the sensor data by the microprocessor 2302 with the serial link 2302a in the sensor head. Such serial digital protocols and physical transport layers include Echelon LON-works, BSR X-10, CEBUS, RS-232, RS-423, Apple ADB, Appletalk, Ethernet (10 base T, 10 Base 2, 10 base 5, 100 Base T, 100 base VG), ATM, USB, IEEE-1394, Homerun (Intel/Tut), etc. This system allows the central control 2303 to incorporate the desired processing, e.g., by the pattern recognition system 2304, etc., while minimizing the installation expense. A simple microprocessor device 2302 in the sensor head interfaces the sensing elements, and may provide analog-to-digital conversion, or other conversion which may be necessary, of the sensor signal. In the case of a serial digital data transmission, the local microprocessor formats the sensor data, including a code indicating the sensor serial number and type, the sensor status (i.e., operative, defective, in need of maintenance or calibration, etc.), the sensor data, and an error correcting code. In the case that the data is transmitted on a local area network, the microprocessor also arbitrates for bus usage and the messaging protocol.

The control, it must be understood, has a number of available operative systems at its disposal, comprising the plant 2306. In this case, the system is a forced air heating and cooling system. This system has a heating unit, a humidifier, blowers, a cooling unit (which also dehumidifies), ducts, dampers, and possible control over various elements, such as automated door openers.

As described above, the system is installed with a complete array of sensors, some of which may be shared with, or a part of, other control systems in the environment, and begins operation with a basic acceptable initial control protocol. The system then receives data from the sensors, and correlates data from the various sensors, including the event sensors, with the operation of the systems being controlled. In such a case, a "door open" event may be correlated with a change in other measured variables. The system then correlates the control status with the effect on the interrelation of the measured variables. Thus, the system would detect that if the blower is operating while the door is open, then there is a high correlation that air will flow out of the door, unless a blower operates to recirculate air from a return near the door. Thus, the system will learn to operate the proximate return device while the door is open and the blower is on. Once this correlation is defined, the system may further interrelate the variables, such as a wind speed and direction outside the door, effects of other events such as other open doors, the absolute and relative speeds of the blowers and the return device, the effect of various damper devices, etc. It is further noted that, under some circumstances, an exchange of air through an open door is desired, and in such instance, the system may operate to facilitate the flow through such an open door. Finally, the system must be able to "learn" that conditions may exist which produce similar sensor patterns which should be handled differently. An example is a broken, defective or inoperative sensor. In such a case, the system must be able to distinguish the type of condition, and not execute an aggressive control algorithm in an attempt to compensate for an erroneous reading or otherwise normal event. For this purpose the intelligent control of the present invention is advantageous. In order to distinguish various events, sensors that provide overlapping or redundant information, as well as providing a full contextual overview, should be provided as a part of the system.

It is further noted that energy efficiency is a critical issue in climate control systems, and an absolute and continuous control over the internal environment may be very inefficient. Thus, the starting of large electrical motors may cause a large power draw, and simultaneous starting of such equipment may increase the peak power draw of a facility, causing a possible increase in the utility rates. Further, some facilities may operate on emergency or private power generation (co-generation) which may have different characteristics and efficiency criteria. These factors may all be considered in the intelligent control. It is also noted that a higher efficiency may also be achieved, in certain circumstances, by employing auxiliary elements of the climate control system which have a lower capacity and lower operating costs than the main elements. Thus, for example, if one side of a building is heated by the sun, it may be more efficient to employ an auxiliary device which suitably affects, i.e. compensates, only a part of the building. If such equipment is installed, the aggregate efficiency of the system may be improved, even if the individual efficiency of an element is lower. Likewise, it may be preferable to run a 2½ ton air conditioning unit continuously, rather than a 5 ton air conditioning unit intermittently. The present intelligent control allows a fine degree of control, making use of all available control elements, in an adaptive and intelligent manner.

Returning to the situation of a door opening event, the system would take appropriate action, including: interruption of normal climate control until after the disturbance has subsided and normal conditions are achieved; based on the actual climatic conditions or predicted climatic conditions begin a climate compensation control, designed to maximize efficiency and also maintain climatic conditions during the disturbance, as well as return to normal after the disturbance; optionally, during the door opening disturbance, the system would control a pressure or flow of air to counterbalance a flow through the door, by using a fan, blower or other device, or halting such a device, if necessary. It is also noted that the climatic control system could also be outfitted with actuators for opening and closing doors and windows, or an interface with such other system, so that it could take direct action to correct the disturbance, e.g., by closing the door. The climate between the internal and external ambients may differ in temperature, humidity, pollutants, or the like, and appropriate sensors may be employed.

It is thus realized that the concepts of using all available resources to control an event, as well as using a predictive algorithm in order to determine a best course of action and a desired correction are a part of the present invention.

Example 19

Remote Control Hardware

A remote control of the present invention may be constructed from, for example, a Micromint (Vernon, Conn.) RTC-LCD, RTC-V25 or RTC-HC11 or RTC180 or RTC31/52, and RTC-SIR, in conjunction with an infrared transmitter and receiver, input keys and a compatible trackball, which may provide raw encoder signals, or may employ a serial encoder and have a serial interface to the processor module. A power supply, such as a battery, is used. The use, interfacing and programming of such devices is known to those skilled in the art, and such information is generally available from the manufacturer of the boards and the individual circuit elements of the boards. The function of such a remote control is to receive inputs from the trackball and keys and to transmit an infrared signal to the controller.

The processor and display, if present, may provide added functionality by providing a local screen, which would be useful for programming feedback and remote control status, as well as compressing the data stream from the trackball into a more efficient form. In this case, certain of the extracted information may be relevant to the determination of the user level, so that information related to the user level would be analyzed and transmitted separately to the controller by the infrared transmitter. If the local LCD screen is used in the programming process, then the main controller would transmit relevant information to the remote display, by a reverse-channel infrared link. These components are known in the art, and many other types may also be used in known manner.

In known manner, available personal digital assistants ("PDAs"), available from 3Com (Palm Pilot III, Vx, VII), Microsoft Windows CE-based devices, BeOS, etc. may also be employed as a human interface device.

Example 20

Medical Device Interface

The interface and intelligent control of the present invention are applicable to control applications in medicine or surgery. This system may also be described with reference to the generic system drawings of FIGS. 23 and 24. In this case, an operator identifies himself and enters information regarding the patient, through the interface 2305. The interface 2305 automatically loads the profile 2406 of both the operator and the patient, if the device is used for more than one at a time, and is connected to a database containing such information, such as a hospital central records bureau. The interface may be connected to various sensors, of the input device 2401, such as ambient conditions (temperature, humidity, etc.), as well as data from the patient, such as electrocardiogram (EKG or ECG), electromyograph (EMG), electroencephalogram (EEG), Evoked Potentials, respirator, anesthesia, temperature, catheter status, arterial blood gas monitor, transcutaneous blood gas monitor, urinary output, intravenous (IV), intraperitoneal (IP), Intramuscular (IM), subcutaneous (SC), intragastric or other types of solutions, pharmaceutical and chemotherapy administration data, mental status, movement, pacemaker, etc. as well as sensors and data sources separate from the patient such as lab results, radiology and medical scanner data, radiotherapy data and renal status, etc. Based on the available information, the interface 2405, using the simple input device and the display screen described above, presents the most important information to the operator, along with a most probable course of action. The user then may either review more parameters, investigate further treatment options, input new data, or accept the presented option(s). The system described has a large memory in the signal analysis module 2409 for recording available patient data from the signal receiver 2408, and thus assists in medical record keeping and data analysis, as well as diagnosis. While various systems are available for assisting in both controlling medical devices and for applying artificial intelligence to assist in diagnosis, the present system allows for individualization based on both the service provider and the patient. Further, the present invention provides the improved interface for interaction with the system.

It is further noted that, analogously to the library function discussed above, medical events may be characterized in the characterization unit 2407 and recorded by the plant 2404, so that a recording of the data need not be reviewed in its entirety in order to locate a particular significant event, and the nature of this event need not be determined in advance. It is also noted that the compression feature of the recorder of the present invention could be advantageously employed with the large volume of medical data that is often generated. Medical data image data may be compressed as known in the art, by standard image compression techniques, and/or image compression techniques optimized for radiology, nuclear medicine and ultrasonography data. Other types of data may be compressed using lossless algorithms, or by various vector quantization, linear excited models, or fractal compression methods. It is finally noted that, because of its ability to store and correlate various types of medical data in the characterization unit 2407, the system could be used by the operator to create notes and discharge summaries for patients, using the database stored in the local database 2413, as well as the user history and preferences 2406. Thus, in addition to saving time and effort during the use of the device, it would also perform an additional function, that of synthesizing the data, based on medical significance.

In addition to providing the aforementioned intelligence and ease of use, the present example also comprises a control 2402, and may interface with any of the sensors and devices, performing standard control and alarm functions. However, because the present control 2402 is intelligent and has pattern recognition capability, in addition to full data integration from all available data sources, it may execute advanced control functions. For example, if the present control 2402 is interfaced to a controlled infusion pump for, e.g., morphine solution, in e.g., a terminally ill patient, then certain parameters must be maintained, while others may be flexible. For example, a maximum flow rate is established as a matter of practice as a safety measure: too high a flow rate could result in patient death. However, a patient may not need a continuous infusion of a constant dose of narcotic. Further, as the patient's status changes, the level of infusion may be advantageously altered. In particular, if the renal status of the patient were to change, the excretion of the drug may be impaired. Therefore, by providing the controller with a urinary output monitor, it could immediately suppress the morphine infusion as soon as the renal output is recognized as being decreased, and further indicate an alarm condition. Further, it may be advantageous to provide a diurnal variation in the infusion rate, to provide a "sleep" period and a period of heightened consciousness with correspondingly lower levels of narcosis. Where various tests, procedures or interviews are scheduled, an appropriate level of narcosis and/or analgesia may also be anticipatorily provided at an appropriate time.

As another example of the use of the present device as a medical controller, the control 2402 could be interfaced with a cardiac catheter monitor, as a part of the signal receiver 2408. In such a case, normally, alarms are set based on outer ranges of each sensor measurement, and possibly a simple formula relating two sensor measurements, to provide a useful clinical index. However, by incorporating the advanced interface and pattern recognition function of the present invention, as well as its ability to interface with a variety of unrelated sensors, the present device, including the present control, may be more easily programmed to execute control and alarm functions, may provide a centralized source of patient information, including storage and retrieval, if diverse sources of such information are linked, and may execute advanced, adaptive control functions. The present control 2402 is equipped to recognize trends in the sensor data from the signal receiver 2408, which would allow earlier recognition and correction of various abnormal conditions, as well as recognizing improvements in conditions, which could allow a reduction in the treatment necessary. Further, by allowing a fine degree of control, parameters may be maintained within optimal limits for a greater percentage of the time. In addition, by monitoring various sensors, various false alarms may be avoided or reduced. In particular, false alarms may occur in prior art devices even when sensors do not indicate a dangerous condition, merely as a safety precaution when a particular parameter is out of a specified range. In such a case, if a cause of such abnormal condition may be identified, such as patient movement or the normal activities of the patient's caretakers, then such condition may be safely ignored, without indicating an alarm. Further, even if a sensor parameter does in and of itself indicate a dangerous condition, if a cause, other than a health risk, may be identified, then the alarm may be ignored, or at least signaled with a different level of priority. By providing an intelligent and active filter for false alarm events, the system may be designed to have a higher level of sensitivity and specificity to real health risks, and further to provide a finer level of control based on the sensor readings, with fewer false positive readings.

Example 21

Securities Trading Terminal Interface

The present invention is also of use in automated securities, debt, variable yield and currency trading systems, where many complex functions are available, yet often a particular user under particular circumstances will use a small subset of the functionality available at a given time. Such a situation would benefit from the present interface, which provides adaptive user levels, prioritized screen information presentation, and pattern recognition and intelligent control. A securities trading system is disclosed in U.S. Pat. No. 5,034,916, for a mouse driven Fast Contact Conversational Video System, incorporated herein by reference. The present system relates primarily to the user terminal, wherein the user must rapidly respond to external events, in order to be successful. In such a case, the advantages of the application of an interface according to the present invention are clear and discussed above, and need not be detailed at this point. However, the pattern recognition functions of the present invention may be applied to correspond to the desired actions of the trader, unlike in prior intelligent trading systems, where the terminal is not individually and adaptively responsive to the particular user. Thus, the system exploits the particular strengths of the user, facilitating his actions, including: providing the desired background information and trading histories, in the sequence most preferred by the user; following the various securities to determine when a user would execute a particular transaction, and notifying the user that such a condition exists; monitoring the success of the user's strategy, and providing suggestions for optimization to achieve greater gains, lower risk, or other parameters which may be defined by the user. Such a system, rather than attempting to provide a "level playing field" to all users of like terminals, allows a user to use his own strategy, providing intelligent assistance. By enhancing the interface, a user becomes more productive with fewer errors and faster training.

Example 22

Fractal Theory Pattern Recognition

Affine transforms are typically mathematical manipulations of data in two dimensions, wherein the manipulation comprises a rotation, scaling and a displacement for each of the two coordinates. Schroeder, M., Fractals, Chaos, Power Laws, W.H. Freeman & Co., New York (1991). Of course, Affine transforms of higher dimensionality may also be employed. In describing an image using Affine transforms, the degree of matching between an image and the mathematical description of that image may be related by a number of iterations, and the fewer the iterations, the less data used to describe the image. Of particular importance in the field of graphics is the speed of "convergence", i.e., that a relatively few iterations are necessary in order to describe an image with sufficient precision to be visually useful.

Therefore, the Affine transform mathematical specifications may be far more compact than the raw image data, and these specifications compare favorably to other types of image compression, such discrete cosine transformation (DCT) compression schemes, including JPEG, depending on a number of factors.

Affine transforms may be used to produce a compact visual description of an image, therefore, among other reasons, the present invention may apply this type of transform to a pattern matching system for analyzing image contents. The related wavelet transforms, all under the general schema of multiresolution image analysis, may also be employed.

Pattern recognition, in this case, may proceed on an image basis, to match similar images, or on an object basis, in which portions of images are matched. It is preferred that the pattern matching system be robust, i.e., tolerant of various alterations of an image, artifacts, interference and configurational changes, while specific enough to allow object differentiation.

In the case of video images, therefore, it is preferred that various two-dimensional projections of three-dimensional objects, in various "poses", be classified the same. This therefore requires that, in analyzing a two-dimensional image, the object be extracted from a background image and separated from other objects. Further, degrees of freedom may be determined, such as through analysis of a sequence of frames to reveal relative motion or change of portions of the object with respect to other portions. Finally, the object in the image is be compared to three (or higher) dimensional models or exemplars, through various projections.

In the case of two dimensional image analysis, the image should be analyzed according to a robust starting criteria, so that the similarity of images may be determined by comparison of normalized Affine transformation coefficients.

Fractal analysis, the study of self-similarity, and a superset of Affine transformation analysis, allows a compact representation of an image or an object in an image, and due to its encompassing of various spatial relationships of object parts, may permit normalized transforms to be compared. In other words, assuming that the object is extracted from a background scene, and various degrees of freedom are identified, an Affine transformation may be applied, which will yield a similar result for an image of the same object in a different "pose", i.e., with different exercise of its degrees of freedom. It is noted that this Affine transform is generally not optimized for highest global compression ratio, although to achieve a match, a transform with the lowest Hausdorf distance from the original, for particular portions of the image, may be compared.

While in general, Affine transformations are described with respect to two-dimensional images, these may also be applied to three dimensional images. Thus, if a triangular polygon is rotated, scaled and displaced in a two dimensional image, a tetrahedron is rotated, scaled and displaced in a three dimensional system. Further, analogies may also be drawn to the time dimension (although geometric forms which are rotated, scaled and displaced over time are not given trivial geometric names). Because, in a contractive Affine transformation (one in which the scaling factor of successive iterations is less than 1), continued iterations are generally less significant, objects described with varying level of detail may be compared. Even images that are not normalized may still be compared, because at every level of the transform, slight changes in rotation, scale and displacement are accounted for.

According to the present invention, nonlinear self-similarity may also be used. Further, in objects having more than two dimensions, linear scaling other than rotation, scaling and displacement may be described.

It is noted that many types of optical computers, especially those including holographic elements, employ transformations similar to Affine transformations. Therefore, techniques of the present invention may be implemented using optical computers or hybrid optical-electronic computers.

Thus, according to the present invention, the fractal method employing Affine transforms may be used to recognize images. This method proceeds as follows. A plurality of templates are stored in a memory device, which represent the images to be recognized. These templates may be preprocessed, or processed in parallel with the remainder of the procedure, in a corresponding manner. Image data, which may be high contrast line image, greyscale, or having a full color map, the greyscale being a unidimensional color map, is stored in the data processor, provided for performing the recognition function.

The image is preprocessed to extract various objects from the background, and to separate objects. This preprocessing may be performed in standard manner. The method of U.S. Pat. No. 5,136,659, incorporated herein by reference, may also be used. As a part of this preprocessing, a temporal analysis of the object through a series of image frames, is performed to provide four dimensional data (space plus time) about the object, i.e., the two dimensions from the image, a third image imputed from differing perspective views of the object, and time. Certain objects may be immediately recognized or classified, without further processing. Further, certain objects, without full classification or identification, may be "ignored" or subjected to a lesser level of final processing. During the classification processing, various objects may be selected for different types of processing, for example, people, automobiles, buildings, plants, etc. See, e.g., U.S. Pat. No. 5,970,173, expressly incorporated herein by reference.

After classification, and temporal analysis, an object for further processing is analyzed for degrees of freedom, i.e., joints of a person, moving parts of an object, etc. These degrees of freedom may then be corrected, e.g., the object itself altered, to change the image into a standard format, or the degree of freedom information processed with the object to allow mathematical normalization without actual change of the image.

The information describing the object image is stored. A plurality of addressable domains are generated from the stored image data, each of the domains representing a portion of the image information. As noted above, the entire image need not be represented, and therefore various objects separately analyzed. Further, only those parts of the image or object necessary for the recognition, need be analyzed. While it may be unknown which image components are unnecessary, sometimes this may be determined.

From the stored image data, a plurality of addressable mapped ranges are created, corresponding to different subsets of the stored image data. Creating these addressable mapped ranges, which should be uniquely addressable, also entails the step of executing, for each of the mapped ranges, a corresponding procedure upon the one of the subsets of the stored image data which corresponds to the mapped ranges. Identifiers are then assigned to corresponding ones of the mapped ranges, each of the identifiers specifying, for the corresponding mapped range, a procedure and a address of the corresponding subset of the stored image data.

To ensure comparability, the processing treatment of the template and the image data are analogous. Of course, template data may be stored in preprocessed form, so that the image data need only be processed according to the same rules. The domains are optionally each subjected to a transform, which may be a predetermined rotation, an inversion, a predetermined scaling, and a displacement. Because of the nature of these linear superposable transforms, the earliest iterations will include data about gross morphology, later iterations will include data about configuration, and latest iterations will include data about texture.

In addition, nonlinear alterations, and frequency, Gabor or wavelet transform preprocessing may be applied. A warping or other kind of transform may also be applied. These types of transforms are generally not included in Affine transform analysis, yet judiciously applied, may produce more rapid convergence, greater data storage efficiency, computational advantages or pattern matching advantages.

This transform is used to optimize the procedure, and also to conform the presentation of the image data with the template, or vice versa. Each of the domains need not be transformed the same way, and in fact it is the transform coefficients which are stored to describe the transformed object, so that differences in coefficients relate to differences in objects.

For each of the domains or transformed domains, as may be the case, the one of the mapped ranges which most closely corresponds according to predetermined criteria (which may include both local and global considerations), is selected. The image is then represented as a set of the identifiers of the selected mapped ranges.

Finally, from the stored templates, a template is selected which best corresponds to the set of identifiers representing the image information. This matching process is optimized for the data type, which is a string of iterative transform coefficients, of a contractive transform.

It is preferred that, for each domain, a best corresponding one of the mapped ranges be selected. By performing analogous operations on a template and an unrecognized object in an image, a correspondence between the two may be determined. Thus, libraries of template image portions may be provided, with associated transform information, which may increase the computational efficiency of the system.

In selecting the most closely corresponding one of the mapped ranges, for each domain, the mapped range is selected which is the most similar, by a method which is appropriate, and may be, for example, selecting minimum Hausdorff distance from the domain, selecting the highest cross-correlation with the domain, the minimum mean square error with the domain and selecting the highest fuzzy correlation with the domain, based on rules which may be predetermined. Neural network energy minimization may also yield the best fit, and other techniques may also be appropriate.

In particular, the step of selecting the most closely corresponding one of mapped ranges according to the minimum modified Hausdorff distance includes the step of selecting, for each domain, the mapped range with the minimum modified Hausdorff distance calculated as D[db,mrb]+D[1-db,1-mrb], where D is a distance calculated between a pair of sets of data each representative of an image, db is a domain, mrb is a mapped range, 1-db is the inverse of a domain, and 1-mrb is an inverse of a mapped range.

It is important that the selection criteria be tolerant to variations of the type seen in image data, e.g., video, so that like objects have similar transforms. Thus, the selection criteria is not particularly directed to optimal data compression, although the two criteria may coincide for some types of data.

In the case where the digital image data consists of a plurality of pixels, each having one of a plurality of associated color map values, the method includes a matching of the color map, which as stated above, encompasses a simple grey scale, natural color representation, and other color types. In such a case, the method is modified to optionally transform the color map values of the pixels of each domain by a function including at least one scaling function, for each axis of the color map, each of which may be the same or different, and selected to maximize the correspondence between the domains and ranges to which they are to be matched. For each of the domains, the one of the mapped ranges having color map pixel values is selected which most closely corresponds to the color map pixel values of the domain according to a predetermined criteria, wherein the step of representing the image color map information includes the substep of representing the image color map information as a set of values each including an identifier of the selected mapped range and the scaling functions. The correspondence method may be of any sort and, because of the added degree of complexity, may be a different method than that chosen for non-color images. The method of optimizing the correspondence may be minimizing the Hausdorff distance or other "relatedness" measurement between each domain and the selected range. The recognition method concludes by selecting a most closely corresponding stored template, based on the identifier of the color map mapped range and the scaling functions, which is the recognized image.

Color information may have less relevance to pattern recognition than, for example, edge information, and therefore may be subjected to a lesser degree of analysis. The color information may also be analyzed separately, using a different technique.

Example 24

Image Analysis

Alternatively to the object extraction, the image as a whole may be analyzed. In the case of moving images, the aforementioned method is further modified to accommodate time varying images. These images usually vary by small amounts between frames, and this allows a statistical improvement of the recognition function by compensating for a movement vector, as well as any other transformation of the image. This also allows a minimization of the processing necessary because redundant information between successive frames is not subject to the full degree of processing. Of course, if the image is substantially changed, then the statistical processing ceases, and a new recognition function may be begun, "flushing" the system of the old values. The basic method is thus modified by storing delayed image data information, i.e., a subsequent frame of a moving image. This represents an image of a moving object differing in time from the image data in the data processor.

A plurality of addressable further domains are generated from the stored delayed image data, each of the further domains representing a portion of the delayed image information, and corresponding to a domain. Thus, an analogous transform is conducted so that the further domains each are corresponding to a domain. A plurality of addressable mapped ranges corresponding to different subsets of the stored delayed image data are created from the stored delayed image data. The further domain and the domain are optionally matched by subjecting a further domain to a corresponding transform selected from the group consisting of a rotation, an inversion, a scaling, and a displacement, which corresponds to a transform applied to a corresponding domain, and a noncorresponding transform selected from the group consisting of a rotation, an inversion, a scaling, a translation which does not correspond to a transform applied to a corresponding domain. For each of the further domains or transformed further domains, the one of the mapped ranges is selected which corresponds best according to predetermined criteria or rules. As stated above, these domains may also be subjected to corresponding and non-corresponding frequency domain processing transforms, Gabor transforms, and wavelet transforms.

A motion vector is then computed between one of the domain and the further domain, or the set of identifiers representing the image information and the set of identifiers representing the delayed image information, and the motion vector is stored. The further domain is compensated with the motion vector and a difference between the compensated further domain and the domain is computed. For each of the delayed domains, the one of the mapped ranges is selected which most closely corresponds according to predetermined criteria. The difference between the compensated further domain and the domain is represented as a set of difference identifiers of the selected mapping ranges and an associated motion vector.

Figure 27:
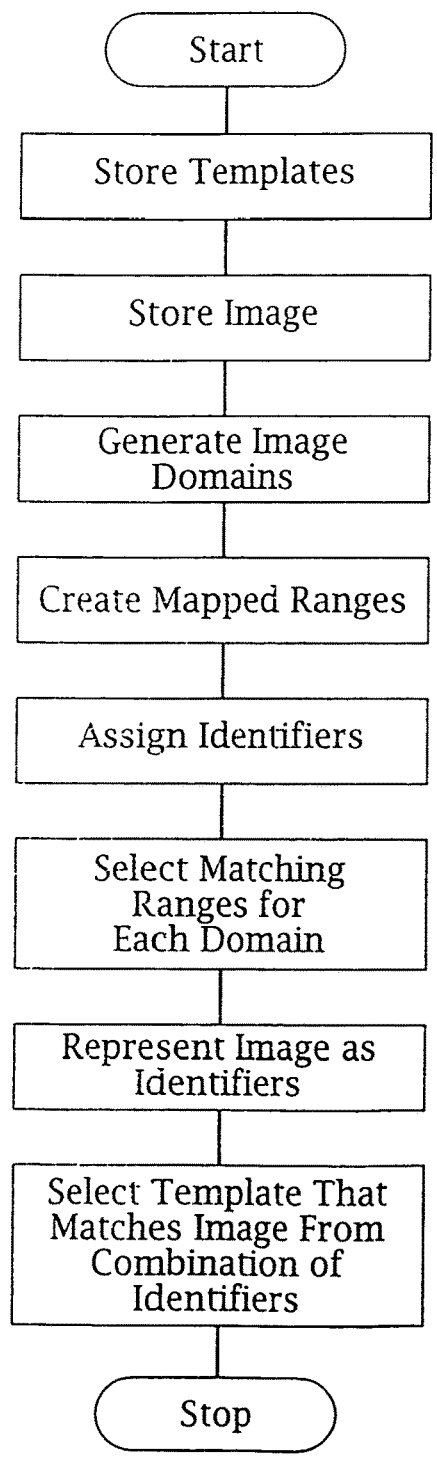
FIGS. 27, 28 and 29 are flow diagrams of an iterated function system method for recognizing a pattern according to the present invention.
Figure 28:
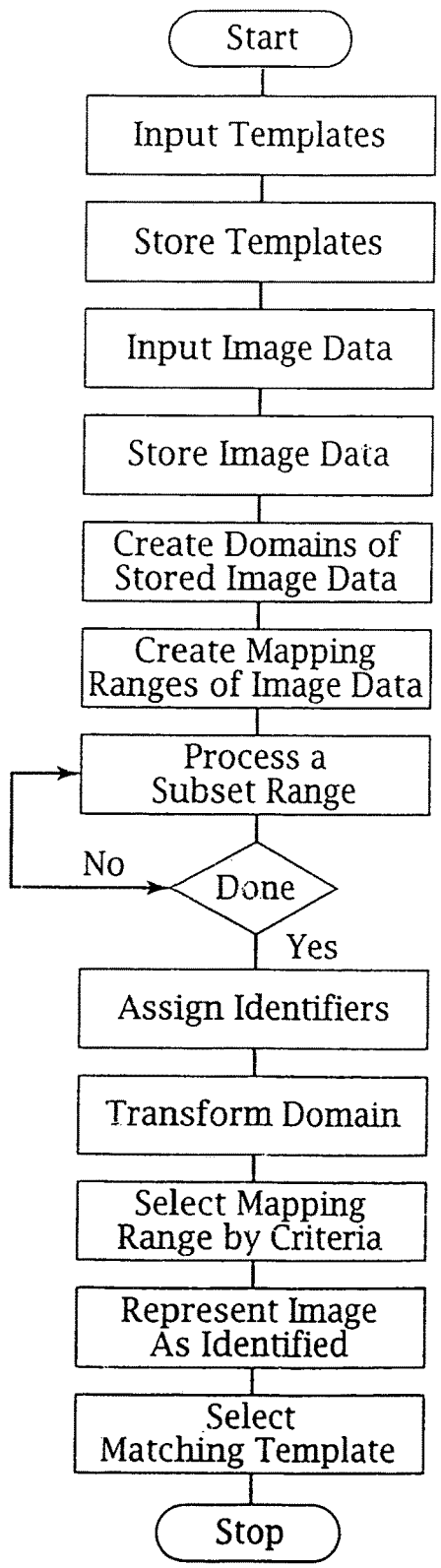
Figure 29:
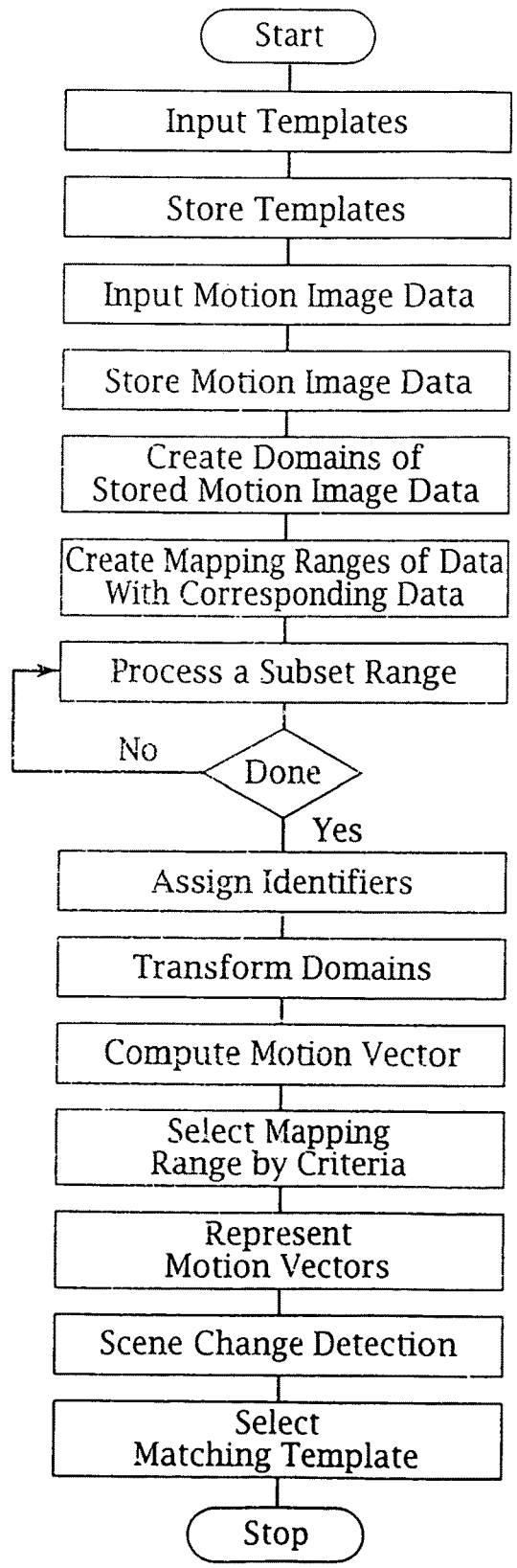

This method is described with respect to FIGS. 27, 28 and 29. FIG. 27 is a basic flow diagram of the recognition system of the present invention. FIG. 28 provides a more detailed description, including substeps, which are included in the major steps shown in FIG. 27. Basically, the image, or a part thereof, is decomposed into a compressed coded version of the scene, by a modified fractal-based compression method. In particular, this differs from the prior compression algorithms in that only a part, preferably that part containing objects of interest, need be fully processed. Thus, if a background is known (identified) or uninteresting, it may be ignored. Further, the emphasis is on matching the available templates to produce an image recognition, not achieving a high degree of compression. Therefore, the image, or domains thereof, may be transformed as required in order to facilitate the matching of the templates. As with respect to single images, the templates are represented in analogous form, having been processed similarly, so that a comparison of the relatedness of an object in an image and the templates may be performed. In particular, if an oblique view of an object is presented, then either the object may be transformed to achieve a predicted front view, or the template transformed or specially selected to correspond to the oblique view. Further, once a recognition has taken place with a high degree of certainty, the system need only ensure that the scene has not changed, and need not continually fully process the data. This has implications where multiple recognition processes are occurring simultaneously, either in a single scene or in different images, wherein the throughput of the recognition apparatus need not meet that required for de novo real time recognition of all aspects of all the objects or images.

In order to limit processing of portions of images, exclusionary criteria may be applied which allow truncation of processing when it is determined that an option is precluded or there exists a significantly higher probability alternative. The processing system may use primarily exclusionary criteria to select the best predictions, or after preselection, employ a highest probability selection system on the remaining choices.

Figure 30:
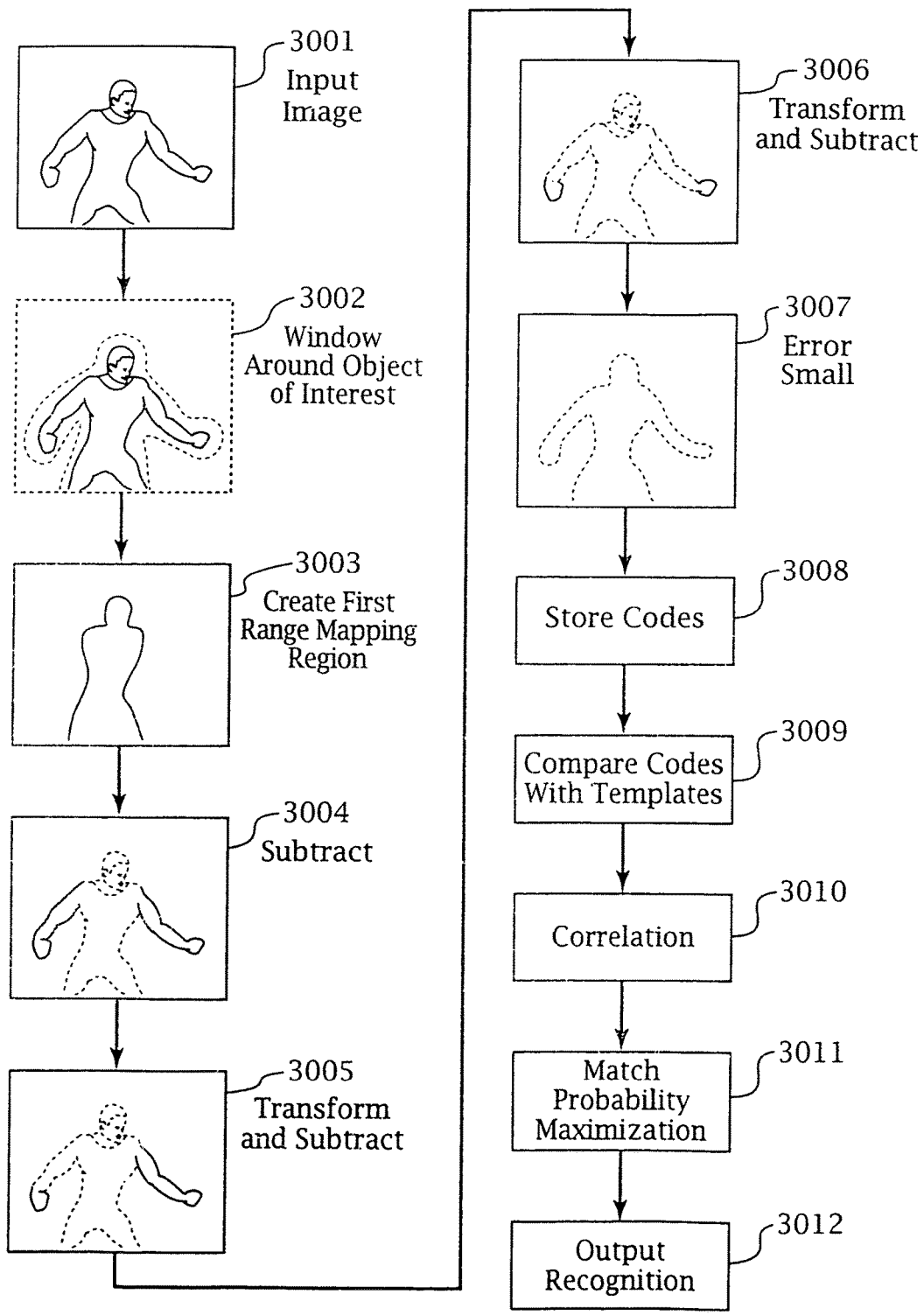
FIG. 30 is a semi-cartoon flow diagram of the object decomposition and recognition method of the present invention.
Figure 31:
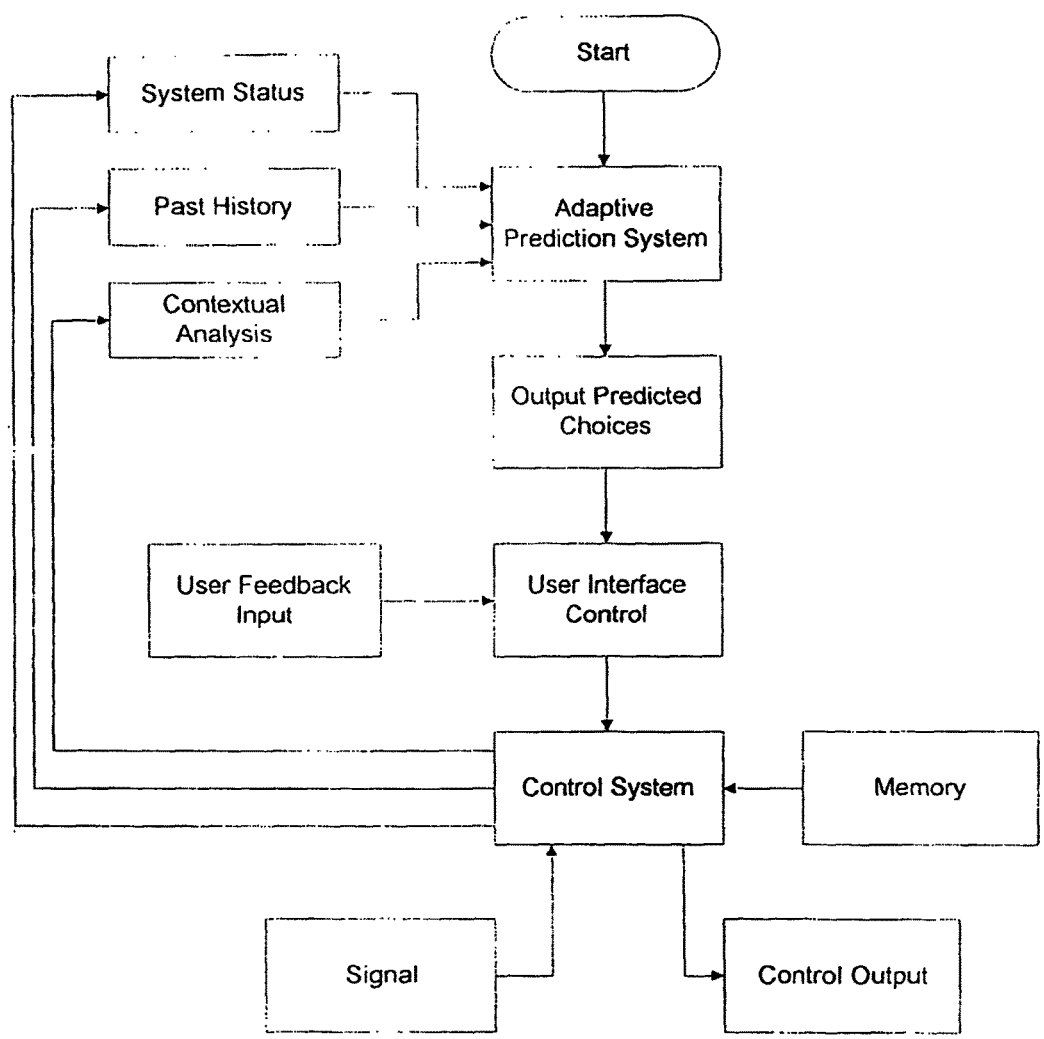
FIG. 31 is a block diagram of an adaptive interface system according to the present invention.

FIG. 30 shows a flow diagram of a cartoon-like representation of an image recognition method of the present invention. It shows initially, an input image 3001, having a degree of complexity. A windowing function 3002 isolates the object from the background. A first order approximation of the image is generated 3003, here called a mapping region. The first order approximation is then subtracted from the initial image to produce a difference 3004. The first order error is then subjected, iteratively, to successive transform and subtract operations 3005 and 3006, until the error is acceptably small, at which point the input image is characterized by a series of codes, representing the first order approximation and the successive transforms, which are stored 3008. These codes are then compared with stored templates 3009. The comparisons are then analyzed to determine which template produces the highest correlation 3010, and the match probability is maximized 3011. The recognized image is then indicated as an output 3012.

Figure 26:
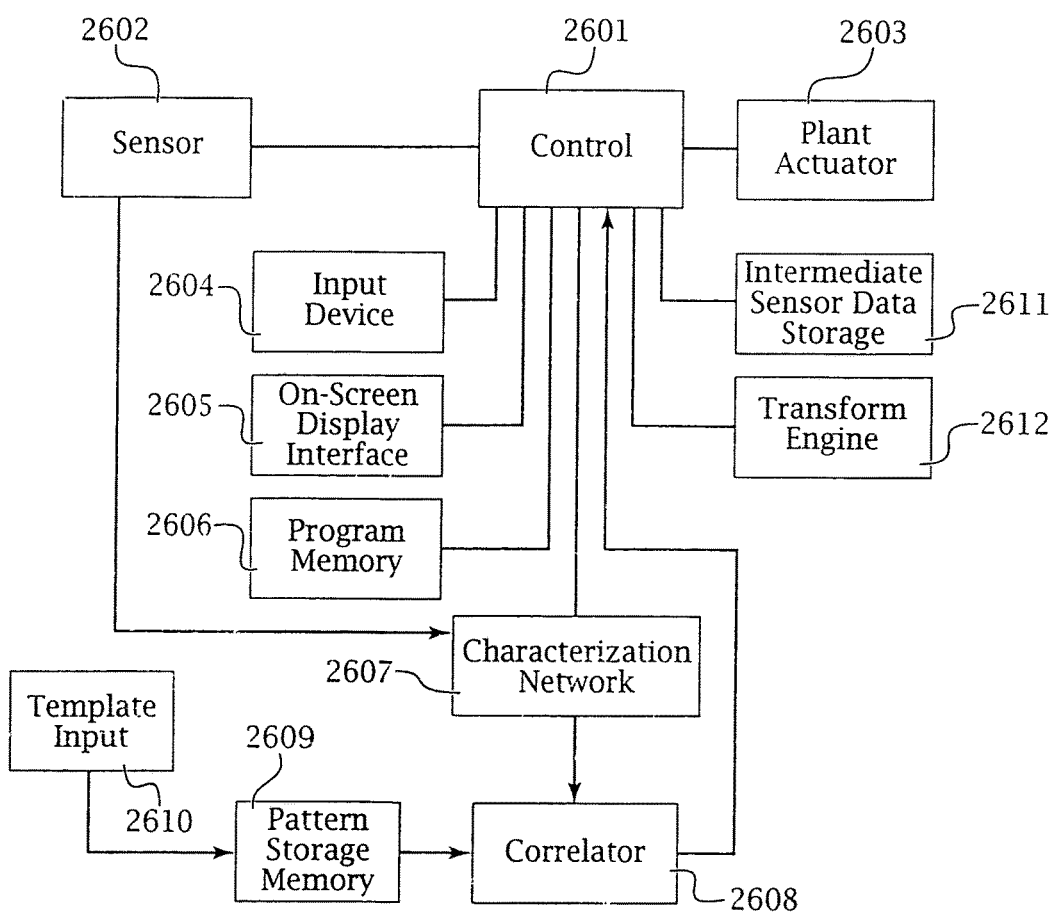
FIG. 26 is a block diagram of a control system for matching a template with a sensor input, of the present invention.

This system is shown in FIG. 26, wherein a sensor 2602 provides data, which may be image data, to a control 2601. The control 2601 serves to control the plant 2603, which has an actuator. The plant 2603 may be a VCR or the like. The control 2601 has associated with it an intermediate sensor data storage unit 2611, which may be, for example a frame buffer or the like. The control 2601 also has associated with it a transform engine 2612, which may perform a reversible or irreversible transform on the data or stored data.

The system also has a template input 2610, which may receive data from the sensor 2602, if accompanied by identifying information. Thus, the pattern storage memory 2609 stores a pattern, such as an image pattern, along with an identifier.

The control 2601 also has an input device 2604, an on-screen display interface 2605, and a program memory 2606, for inputting instructions from a user, providing feedback to the user, and recording the result of the user interaction, respectively. Finally, a characterization network 2607 characterizes the sensor 2602 data, which may be provided directly from the sensor 2602 or preprocessing circuitry, or through the control 2601. A correlator 2608 correlates the output of the characterization network with the stored patterns, representing the templates from the template input 2610. The system therefore operates to recognize sensor patterns, based on the correlator 2608 output to the control 2601.

When analyzing objects in a sequence of images, a determination is made of the complexity of the difference based on a density of representation. In other words, the error between the movement and transform compensated delayed image and the image is quantified, to determine if the compensation is valid, or whether the scene is significantly changed. When the difference has a complexity below a predetermined or adaptive threshold, a template is selected, from the stored templates, which most closely corresponds or correlates with both the set of identifiers of the image data and the set of identifiers of the delayed image data, thus improving recognition accuracy, by allowing a statistical correlation or other technique. The threshold may be set based on an error analysis of the system to determine statistical significance or using other criteria. The threshold may also be adaptively determined based on the history of use of the machine and feedback. For example, if the two images both have a high correlation with one template, while a first of the images has a slightly higher correlation with another template, while the second image has a much lower correlation with that other template, then the system would score the first template as a better match to the first image, based on this differentiation. Thus, templates may be particularly selected to best differentiate similar images of objects.

Example 25

Pattern Recognition System

The present system allows for the use of a pattern recognition subsystem for a controller which acts in accordance with a detected pattern. In image, audio and multimedia applications, different types of image processing may take place. First, various processing algorithms may take place in parallel, with an optimum result selected from the results of the various algorithms. Further, various processing schemes may be applied in sequence, with differing sequences applied to different data streams. These processing schemes may be commutative, i.e. yield approximately the same result regardless of the processing order, or may be highly order dependent, in which case a processed data stream must include information relating to the sequence of processing for interpretation.

Various exemplars may reside in a fragment library, for comparison with unidentified data. In the case of processing path dependent systems, an exemplar may be found in multiple forms based on the processing procedure, or in a small subset of corresponding libraries. In general, both lossless compression methods and lossy compression methods employed using high fidelity parameters to minimize loss may be processed to produce a relatively or almost unique result for each unknown data set, while lossy compression or processing methods will be particularly procedure sensitive, especially if differing strategies are employed. These differing strategies may be used to emphasize different features of the unknown data set in order to facilitate comparison. This technique is especially useful when the processing procedures are run in parallel, so that the latency penalty for redundant processing is minimized. Techniques available for this processing include vectorization, fractal processing, iterated function systems, spatial frequency processing (DCT-JPEG, MPEG, etc.), wavelet processing, Gabor transforms, neural nets (static or sequence of images), and other known techniques.

In a preferred embodiment, a spatial frequency or wavelet processing step is performed first, on static image data or a sequence of images, with a fractal domain processing step performed thereafter. This allows high frequency noise to be initially filtered; with subsequent fractal-based correlated noise detection and subtraction, therefore allowing cleanup without loss of high frequency detail. Preferably, before the fractal-based processing, which may be performed by a digital computer or optical processing apparatus, standard edge detection/object separation, e.g., high frequency filtering, contour mapping, artificial intelligence, etc. may be performed. A fractal transform is then performed on the image or a portion thereof, starting in a standardized manner, e.g. at a point of lowest complexity, or the epicenter of the largest feature for beginning a contractive transform. The processed image may then be matched with one or more databases to identify all or a portion of the image. Optionally, after a match has been found and/or confirmed by an operator, using the human interface system, the method is then optimized to minimize the errors and increase the efficiency of later matches. This may be performed by modifying the database record, or related records, as well as modifying the preprocessing algorithm. In a preferred embodiment, the image is processed piecemeal, on an object-by-object basis. Therefore, after an object has been processed, it is extracted from the image so that the remaining information may be processed. Of course, multiple objects may be processed in parallel. The exemplar database is preferably adaptive, so that new objects may be added as they are identified.

The present technology may also be used with a model-based exemplar database, wherein an image object is matched, based on a two dimensional projection, or analysis of a sequence of images, with a multidimensional model of an object. For example, the model may include volume, as well as multiple degrees of freedom of movement. Further, objects may also include "morphing" characteristics, which identify expected changes in an appearance of an object. Other types of characteristics may be included in conjunction with the exemplar in the database.

In a preferred embodiment, a model contained in a database includes a three or more dimensional representation of an object. These models include information processed by a fractal-based method to encode repetitive, transformed patterns in a plane, space, time, etc., as well as to include additional degrees of freedom, to compensate for changes in morphology of the object, to allow continuous object identification and tracking. Thus, once an object is identified, an expected change in that object will not necessitate a reidentification of the object. According to one embodiment, a fractal-like processing process is executed by optical elements of an optical or optical hybrid computer. Further, in order to temporarily store an optical image, optically active biological molecules, such as bacteriorhodopsins, etc. may be used. Liquid crystals or other electrophotorefractive active materials may also used. These imagers may be simple two dimensional images, holograms, or other optical storage methods. A preferred holographic storage method is a volume phase hologram, which will transform an impressed image, based on hologram to image correlation. Thus, these models would be somewhat linear transform independent, and would likely show some (planar) transform relationship. Thus, an optical computer may be advantageous because of its high computational speed as compared to digital computers for image analysis, due to inherent parallelism and high inherent speed.

Because of the present limitations in speed of writing an image to optical recording media, especially holographic images, the preferred system includes a plurality of image storage elements, which are operated in parallel. It is noted that absolute accuracy of object identification is not required for "consumer" applications, and therefore partial match results may be considered useful. A plurality of partial results, when taken together, may also increase identification reliability. Critical applications generally differ in quantitative aspects rather than qualitatively, and therefore many aspects of the present invention may be applied to mission critical and other high reliability applications.

A preferred object identification method proceeds by first classifying an object in an image, e.g., "car", "person", "house", etc. Then, based on the classification and object separation, an optimized preprocessing scheme is implemented, based on the classification. This classification preprocessing operates on the raw image data relating only to the object, separated from the background. Then, after the optimized preprocessing, a parallel recognition system would operate to extract unique features and to identify common features to be excluded from the comparison. This step could also identify variable features upon which identification should not be made because the distinctions are useless for the purpose. Thus, the object image at this point loses its relationship to the entire image, and the data reduction might be substantial, providing a compact data representation. The preferred algorithm has a tree structure, wherein the identification need only differentiate a few possibilities, and pass the result to another branch of the tree for further analysis, if necessary. Since the intermediate calculations may help in later computations, these should preferably be retained, in order to avoid duplicative analysis. Further, the order of analysis should be predetermined, even if arbitrary, so that once a useful intermediate calculation is identified, it may be passed in a regular, predictable manner to the next stage processing. Of course, one should not ignore that objects in the entire image may be correlated with one another, i.e. if one object is present, it would increase or decrease the likelihood of another object also being present. Further, temporal correlations should also be noted. Thus, the object identification need not proceed upon each object independently.

Based on time sequences of two-dimensional images, a three dimensional image representation may be constructed. Alternatively, based on various presumptions about extractable "objects" in a single or small group of two dimensional images, a hypothetical three dimensional object may be modeled, which may be later modified to reflect the actual image when an actual view of hidden surfaces is shown. Therefore, by one means or another a three dimensional model is created, having both volume and surface characteristics. Of course, since inner structure may never be seen, the model normally emphasizes the surface structure, and is thus a so-called two-and-a-half dimensional surface model. Other non-integral dimension representations may also be useful, and fractal models may efficiently represent the information content of an image model.

When the source signal is an MPEG 2 encoded datastream, it is advantageous to provide an exemplar database that does not require complete expansion of the encoded signal. Thus, the motion vector analysis performed by the MPEG 2 encoder may form a part of the pattern recognition system. Of course, image sequence description formats other than MPEG 2 may be better suited to pattern analysis and recognition tasks. For example, a system may transmit an interframe, by any suitable description method, as well as an object decomposed image in, e.g., fractal transform codes. The transmitted source material, other than interframes, is then transmitted as changes only, e.g. new objects, transforms of existing objects, translations of existing objects, etc.

Color coding may use even more extensive use of fractal compression technology with high compression ratios, because absolute accuracy is not necessary; rather photorealism and texture are paramount, and need not be authentic. Therefore, backgrounds with significant detail, which would require substantial data in a DCT type system, could be simply coded and decoded without loss of significant useful information. Important to the use of this method is to discriminate between background textures and foreground objects, and to encode each separately, optimizing the processing based on the type of object being processed.

Example 26

Data Context Sensitive Computer Interface

The present example relates to a context sensitive computer interface in which a characteristic of the interface is modified based on a linguistic or informational content of a data object upon which the interface is operating. For example, a number of alternate feature sets may be made available based on the type of data which is being operated on by the user. For example, differing feature sets would be optimal for each scientific discipline, each type of financial or economic field, marketing, retail, distribution, manufacturing, administration, human resources, etc. Such an interface will make it possible to provide an extended and extensible suite of application modules customized for the user in general, and further adaptive to the particular use to which the user may be making of the apparatus. Thus, complex options particularly suited for the data at hand may be made available without inefficient interface searching, while inappropriate options are not presented. It is noted that this interface is responsive to the data, rather than the programming. Further, the data is analyzed for its meaning, rather than its type.

In a word processing environment, a document or section of a document is analyzed for the presence of particular words or phrases, or for the presence of concepts, interpretable by linguistic concepts. This context-sensitive functionality does not require an explicit definition by the user, but rather will be present even during an incidental occurrence of a recognized context. In accordance with other aspects of the present invention, each context related function may have various user levels, which are selected based on an imputed user level of the user. Thus, the interface program must actually interpret the text or context of the user document in order to select the most likely options for use.

Thus, if a user were to embed a table in a document, the available options would change to table-type options when the "active" portion of the document is at the table, i.e. within the viewable area, etc. Further, and more specifically, if the text and context of the table indicate that this is a financial table, financial options would be initially provided, and standard financial calculation functions immediately made available or performed, in contemplation of their prospective use. Similarly, if the data appears to be scientific, a different set of options would be initially available, and the standard scientific-type calculation functions be made available or performed. If the table relates to chemical or mechanical-type data, chemical or mechanical options might be made available, respectively. Embedded graphics, likewise, would be associated with graphics functions appropriate to the type of graphic. It is noted that, due to the analysis of the content of the document, software having generic functionality may present as special purpose software, based on its actual use.

Thus, in a like manner, the system could determine the "style" of the document and automatically format the data in a predetermined manner to conform with general standards of presentations relating to the desired style. This is similar to style sheets of many programs, but they are self applying, and will, within the same document, be adaptive as the data changes context. Further, since the "styles" would be applied automatically, it would be relatively easy to alter them, requiring only a small amount of manual effort. This is so because the "keys" by which the system determines style could be stored, thus allowing redeterminations to be easily made. This context sensitivity could also assist in spelling and grammar checking, where different rules may apply, depending on the context.

The data object includes information, which might be text, arrays of numbers, arrays of formulas, graphics, or other data types. The system relates parts of the object to each other by "proximity" which could be linear, in the case of a text document, or otherwise, such as in the case of a hypertext document or spreadsheet. Those parts or elements of the object closest to each other, by whatever criteria, are presumed to be topically related, regardless of data type.

Thus, if a paragraph of text is proximate to a table for numbers, then the type of numbers presumed to occupy the table would relate to the content of the proximate text. If the text relates to finance, i.e. uses financial-related terms, or series of words that often occur in financial contexts, the table would be presumed to be a financial table.

Once the context of the part of the object is determined, the system then acts based upon this context. The major act is the presentation of tailored menus. This means that if the context is financial, the menus available for use with the numeric table relate to financial tables or spreadsheets. Further, the proximate text would be subject to financial oriented spellcheck and financial oriented grammar or style check. If a graphics-option is selected proximate to the text and table, the menu options would presume a financial graph and present appropriate choices. Of course, the options need not be limited to a few types, and may be hybrid and/or adaptive to the style of the user. However, it is noted that the adaptive menus could be linked to a "corporate style". Thus, communication styles could be dictated by a set of global rules for an organization. Of course, these a priori choices could be overridden.

An advantage of this system is that it allows a software system to include a wide range of functionality which remains "buried", or relatively inaccessible, based on the context of usage. Thus, feature rich software would be considered more usable, and software could be provided in modular fashion. Since the system might allow a user to have potential access to many software modules, the system could also be linked to a license manager and per use billing system for rarely used modules, while allowing these to remain available on, e.g., a CD ROM. Thus, for example, a full integrated package could employ a single, "standard" interface which would not require task-switching programs, while avoiding presentation of the full range of features to the user at each, juncture.

This system provides advantages over traditional systems by providing a non-standardized interface with a variable feature set which attains usability by adapting a subset of the available functionality based on the context of the data.

Example 27

Group Aware Adaptive Computer Interface

The adaptive interface according to the present invention may be used in group computing applications. In such a case, the predictive functionality is applied to allow the interface to apply rules from one group member to a project, even when that group member has not contributed personally to a particular aspect. This is thus a type of intelligent agent technology, which, according to the present invention includes the characteristics of abstraction and extrapolation, rather than rule based analysis which would fail based on divergent circumstances. This differs from standard rule-based expert system because the intelligence applied is not necessarily "expert", and may be applied in a relative fashion. Further, extracted user characteristics need not completely define a solution to a problem, and indeed, the use of such a technology in group situations presupposes that a contribution of a number of users is desirable, and therefore that the expertise of any given user is limited.

In order to ensure data integrity after the application or contingent application of user characteristics to a datastream, it is desirable to trace the evolution of data structures. This also allows for assistance in the organization and distribution of workgroup responsibilities. Thus, in a workgroup situation, the goal is not optimization of individual productivity, but rather optimization of the group result, including all levels of review after an initial phase is complete.

Thus, while an individual user may seek various shortcuts to achieve various results, the group would benefit by having available all information relating to the path taken to achieve that result. Further, the desired result may be modified according to the presumed actions of the group, so that the final product is pre-optimized for the group, rather than the individual. Thus, a group member may have his "rules" extracted from his actions. i.e. by neural net backpropagation of errors programming or fuzzy rule definition, to be presented for consideration by another group member. This strategy will allow "better" drafts by considering the predicted input of a member prior to review by that member. A user may further tailor the rules for a given project, and "distilled wisdom" from non-group members may also be employed, as in normal expert (AI) systems. This group analysis is also known as collaborative filtering, and the tenets of that filed may be fully applied herein.

This rule-extraction technology as applied to workgroups is enhanced by the context sensitivity of the software, where the input of each group member may be weighted by considering the context. Again, this technique may be used to increase the efficiency of the primary author of a section of a project, as well as better defining the scope of responsibility of each member, while still respecting the input of other group members.

According to this workgroup rule extraction technology, points of conflict between group members are highlighted for resolution. As an adjunct to this resolution phase of a project, videoconferencing may be employed. Further, where a conflict of a similar type had occurred in the past, data relating to the resolution of that conflict, including recorded videoconference, may be retrieved and presented to one or more members of the workgroup. In this way, such conflicts may be resolved before it becomes adversarial. Thus, each group member may efficiently proceed independently, with only major issues requiring meetings and the like to resolve.

If a workgroup member disagrees with an imputed rule, either explicitly, by review of the rules, or implicitly, by a review of the results, the system will allow a review of all decisions influenced by that faulty rule, as well as a proposed correction. This may be addressed by any member of the group, but usually by the author of the section or the source of the rule will be the relevant reviewing individual. Rules may also be created by the group, rather than from a single individual. Such rules are more often explicitly defined, rather than derived from observation. Such group rules may also be subjected to adaptive forces, especially when overridden frequently.

Example 28

Adaptive Interface Vehicular Control System

It is noted that, the adaptive user level interface is of use in uncontrolled environments, such as in a moving vehicle, especially for use by a driver. An intelligent system of the present invention would allow the driver of such a vehicle to execute control sequences, which may compensate for the limited ability to interact with an interface while driving. Thus, the driver need not explicitly control all individual elements, because the driver is assisted by an intelligent interface. Thus, for example, if it begins raining, the interface would predict the windshield wipers should be actuated, the windows and any roof opening closed, and the headlights activated. Thus, the driver could immediately assent to these actions, without individually actuating each control. In such a case, the screen interface, which may be a heads-up display, would provide a small number of choices, which may be simply selected. Further, under such conditions, there would likely be a large amount of mechanical jitter from the input device, which would be filtered to ease menu selection. Further, this jitter might indicate an unstable environment condition, which would cause the interface to present an appropriate display. A voice input may also be used.

Example 29

Adaptive Interface Vehicular Control System

An integrated electronics system for an automobile is provided having control over engine, transmission, traction control, braking, suspension, collision avoidance, climate control, and audio systems. Steering and throttle may also be controlled. Based on driver preference and action patterns, the system may optimize the vehicle systems. For example, the vehicle may anticipate voluntary or road conditions based on implicit inputs of the user, thus readying vehicular systems prior to the actual encounter with certain conditions. Further, a user interface may be simplified, based on probable required functionality, thus limiting required attention by the driver in order to activate a particular control. By providing such an interface, controls normally inaccessible may be made accessible, without increasing mechanical complexity, e.g., functions normally controlled by computer may be accessed through a common user interface. rather than through dedicated manual controls.

The automobile control system may also include collision avoidance systems, which may include imaging sensors and radar or LIDAR ranging and velocity measurement. According to the present invention, a heads-up display or simplified graphic user interface in the dashboard or near the steering wheel presents predicted options to the driver. An auxiliary interface may also make certain options available for passengers.

According to another aspect of the present invention, an automobile positioning system is provided, which may be extraterrestrial, e.g., GPS, or terrestrial, e.g., cellular base station. LORAN, etc. Such a system is described in U.S. Pat. No. 5,390,125, incorporated herein by reference; see references cited therein. A controller in the automobile is provided with an itinerary for the vehicle travel. Based on position and itinerary, the vehicle may communicate with various services, such as food, fuel and lodging providers, to "negotiate" for business. The driver may be provided with customized "billboards", directed to his demographics. Reservations and discounts may all be arranged while en-route. Communication between the automobile and the services is preferably provided by CDPD services, which is a cellular based 832 MHz band digital data transmission system. Therefore, an existing cell phone system or CDPD modem system may be employed for telecommunication. Preferably, a simple display is provided for presentation of commercial messages to the driver or passenger and for interacting with the service.

As a matter of practice, the service may be subsidized by the service providers, thus reducing the cost to the consumer. The extent of the subsidy may be determined by the amount of data transmitted or by the eventual consummation of the transaction negotiated.

Because of the positioning system, any variance from the itinerary may be transmitted to the service providers, so that reservations may be cancelled, or substitute services provided in a different location or at a different time.

The telecommunication system may also be used as an emergency system, to contact emergency services and/or police in the event of accident or distress. The transponder system may also be part of an antitheft system. The transponder may also be part of a vehicular maintenance and diagnostic system to ensure proper servicing and to help determine the nature of problems. Raw or processed data may be transmitted to a centralized station for full analysis and diagnosis. Because the vehicle need not be at the repair shop for diagnosis, problems may be analyzed earlier and based on extensive, objective sensor data.

Example 30

Intelligent Internet Appliance

A further application of the present technologies is in a so-called "Internet appliance". These devices typically are electronic devices which have a concrete function (i.e., do more than merely act as a generic server) and typically employ at least as a secondary interface, a web browser. In addition, these devices provide a TCP/IP network connection and act as a web server, usually for a limited type of data. Therefore, in addition to any real human interface on the device, a web browser may be used as a virtual interface.

According to the present invention, such an Internet Appliance is provided according to the present invention with advanced features, for example adaptivity to the user, to the environment, or intelligent algorithms which learn. In fact, a preferred embodiment provides a rather generic device which serves as a bridge between the Internet. a public packet switched network which employs TCP/IP, and a local area network, for example in a residential, industrial or office environment. The device may further abstract the interface functions for a variety of other devices as nodes on either the Internet or local area network, to provide a common control system and interface.

A preferred embodiment also encompasses certain other features which may be used as resources for the networked devices or as usable features of the device.

The Internet, or other wide area network, may be connected in any known manner, for example, X.25/ISDN D-channel, dial-up over POTS (e.g., v.34, v.90. v.91), ISDN, xDSL, ADSL. cable modem, frame relay, TI line, ATM, or other communications system. Typically, a system is provided with either a commonly used access method, such as v.90 or ISDN, or a replaceable communications module with a generic interface. Such systems are well known.

The local area network is also well known, and may include, for example, as a physical layer, 10 Base T, 100 Base T, HomeRun (Cat. 3 twisted pair/telephone twisted pair/power line transmission, from Intel Corp., e.g., Intel 21145 device/Tut systems), Universal Serial Bus (USB), Firewire (IEEE-1394), optical fiber, or other known computer network. The protocol may be, for example, TCP/IP, IPX, ATM, USB, IEEE-1394, or other known or proprietary appropriate communications protocol.

While not required, a particular aspect of a preferred embodiment according to the present invention is the ability to interface "dumb" devices as nodes on the LAN with an intelligent device, while allowing the user to interact primarily with the intelligent device. This scheme therefore reduces redundancy and increases functionality.

Therefore, in an exemplary embodiment, an intelligent home is established, with most or all electrical appliances and electronic devices interfaced with the system, for example through the aforementioned Homerun system, using any of the supported physical layers. Each device is provided as a relatively simple control, for example, remotely controllable (or where applicable, dimmable) lights, control over normal use and peak electrical demand of heavy appliances, as well as inter-device communications for consumer electronics. Therefore, the intelligent device acts as an external communications and control node for the entire network, and may, for example, control telephony functions in addition.

Exemplary devices to be controlled in a home include household appliances, HVAC, alarm systems, consumer electronics, and the like, and/or provide for communications purposes. An alarm system embodiment, for example, may employ a video camera input for capture and analysis of images, as well as motion or irregularity detection. The intelligent device may, for example, employ neural networks or other intelligent analysis technology for analyzing data patterns indicative of particular states. An alarm output may be produced, for example, through standard alarms, as well as through a telephone interface of the system.

The system may therefore set/control/monitor the status of any home-based device—oven, stove, alarm, washing machine, dryer, iron, lights. computer. oil/gas burner, thermostat, location of automobiles, camera, pump (pool, sump), sprinkler, stereo/video systems, home surveillance system. This may be especially important if the user is away from home for an extended period of time, or if he or she wants to change the schedule of something, or travel plans change. For a home surveillance system, pattern recognition may be employed to monitor all sensors, including cameras, to detect abnormal patterns or changes in condition.

Thus, since the intelligent device incorporates a web server, the physical proximity of the user is not critical for interaction with the device, and all devices on the LAN may be controlled remotely, automatically, and in synchrony.

In one embodiment, the intelligent device includes a videoconferencing/video capture system, including any or all known features for such systems. for example as described in the background of the invention. Therefore, in addition to a base level of functionality, such an embodiment would also likely include (a) telephony interface, (b) video capture, (c) video codec, (d) audio capture, (e) audio codec, (f) full duplex speakerphone, (g) video output, and (h) audio output.

In another embodiment, a speech interface is provided for interpreting human speech as an input and/or producing synthesized speech as an output. Therefore, such a device would include speech recognition and/or synthesis technologies, as well as a semantic data processor.

Preferable, the device allows use of a simplified web browser interface, such as which may be supported by personal digital assistants (PDAs) and enhanced digital data cellular telephones, e.g., handheld device markup language (HDML). This, for example, allows a remote user to communicate through wireless networks or the like, and therefore avoids the need for a full personal computer as a human interface.

Advantageously, the device may be interfaced with a telephone communication system, allowing use as a voice and/or video message recorder, and allowing remote access to the stored information, either through a dialup connection and/or through the network. In this case, the intelligent device may act as a computer telephony interface, and all communications devices logically under this device act as "net phones", i.e., voice communications devices which communicate over data networks. Therefore, all telephony control and computer telephony functions may be integrated into the device, for example, voice mail, auto-attendant, call center. and the like. Further, the Internet interface allows remote messaging and control over the telephony system. as well as virtual networking, Internet telephony, paging functions, and voice and data integration.

The intelligent device may also interface with various media electronics devices. and for example, may act as a "rights server" or other aspect of a copyright protection and royalty collection/enforcement system. Typically, these functions entail e-commerce functions. and may require X.22 and/or XML communications and translations. In addition. such functions also typically involve encryption/decryption, as well as key management, which are also preferably supported by the device. Such support may be in hardware or software.

Another aspect of the invention provides an index and/or catalog database for media information or media metadata information. Thus, data relating to a VCR tape or other recorded media may be subjected to search criteria without requiring access or contemporaneous analysis of the media content itself. Therefore, a preferred embodiment of the intelligent device includes mass storage and retrieval capability, for example, magnetic disk, RW-CD, or RW-DVD. This mass storage and retrieval capability may be used, not only for databases, but also for computer software, media and content storage and retrieval. Thus, the device may also serve as a video data recorder, capturing video data and storing it digitally, for example, employing the aforementioned video and audio codecs. In this case, it is preferable that the intelligent device also include a direct media access port, for example a broadcast TV tuner, ATSC/HDTV tuner, cable tuner, DVD reader, CD reader, satellite video decoder, NTSC composite/S-VHS. and/or other type of media content information input. With such storage, the intelligent device may also assume the standard functions of computer network servers, for example, file serving, print serving, fax serving, application serving, client/server application support, as well as traditional networking functions, such as bridging, routing, switching, virtual private network, voice-over-IP, firewall functions, remote access serving, and the like. It should also be apparent that the intelligent device may also serve as a personal computer itself, and thus does not require additional systems for basic functionality.

In a media recording system embodiment, the system preferably notifies the user if the "program", i.e., instructions, are incomplete, ambiguous, or impossible to complete. For example, if a single channel selector is provided, no more than one channel may be monitored at a time. Further, where irreversible actions are necessary, the user is preferably informed and allowed to make a choice, for example, if lack of storage space forces a choice to be made between new and archival material. A conflict management system is provided which arbitrates between the conflicting demands, for example if a second user is programming the same device (for example, the VCR) to record a show at the same time.

Thus, it is apparent that the intelligent device according to this embodiment of the present invention may incorporate many different functions, some of which are defined purely by software and processing availability, and others by particular hardware devices for performing specific functions.

Another aspect of the invention defines a special training mode of the intelligent device, which allows the user to improve the functionality of the system by ensuring that any intelligence algorithms will correctly operate in an anticipated and/or desired manner. In this mode, responses of the user are provoked which indicate user preferences, preferably in a manner which resolves ambiguities encountered with prior data sets. Thus, where the system identifies a situation where a decision is difficult, e.g., where the data analysis does not output any selected actions which will likely correspond to the user desires or preferences, or where ex post facto the user indicates that an inappropriate choice was made, the particular data structures may be stored and abstracted for later presentation to the user. In this case, such structures are presented by the system to the user, during a training session, to train the system relating to the desired response to particular data environments. In this way, the user is not necessarily burdened with training tasks during normal use of the device, and opportunities for such training are not lost. Where the system is untrained, and an "intelligent" response or mode of operation cannot be resolved, a default mode of operation may be defined. Further, such a default mode is preferably always available, at the request of the user, thus allowing use where an adaptive system is undesired or difficult to employ.

In a television application, the Internet appliance preferably has access to an electronic program guide (EPG). Such EPG systems are known, and typically provide an efficient staring point for user programming. These EPG may be provided as an embedded signal in a broadcast stream, through a dial-up network, through the internet, or on distribution media, such as CD-ROM, OCR scanning of TV-Guide (or the like) or other known means. EPGs contain a concise semantic description of program content, which typically is both sufficient for user evaluation, and brief enough for rapid evaluation. The system may therefore analyze user preferences in this semantic space and provide adaptive presentation of elements of the EPG to the user. Of course. a media data stream analysis embodiment of the invention, as disclosed above, may be used in conjunction with or in lieu of the EPG system. See, U.S. Pat. No. 5,867,226, expressly incorporated herein by reference.

The system preferably maintains an updated index of available data. Thus, newly acquired data is added to the index, and deleted data is purged from the index. The system preferably compares new data to previously encountered data, to avoid redundant processing. For example, the system preferably recognizes events/programs that have previously been recorded, and checks to determine whether they are still in the index. In this context, the user is preferably provided with low-level file maintenance tools, for example to manually control the addition or deletion of data, which is then correctly represented in the index.

Because the Internet appliance is connected to the Internet, so-called multicasts may be monitored for correspondence with user preferences. Therefore, it is understood that the operation of the present invention is not limited to traditional television broadcasts, and that streaming video and audio, as well as stored images, sound files (e.g., MIDI, MP3, A2B, RealAudio), text, and multimedia streams may be analyzed based on the adaptive principles presented herein.

The system may also integrate Internet data with other types of data, for example providing access to stored or static data corresponding to a data stream. The retrieval and storage of such data may also be adaptively controlled in accordance with the present invention. Thus, it is expressly understood that the intelligent device may act as a "VCR" (albeit not necessarily employing a known type of video-cassette tape), to record media.

The Internet appliance may also operate autonomously, capturing data which corresponds to user preferences and profiles, thus reducing latency for the user, and potentially shifting data transfers to off-peak periods. Such a system operates in this mode as a so-called "agent" system. Likewise, the device may also be linked to other intelligent devices, to provide an intelligent interaction therebetween.

The preferred user interface maintains user levels constant over long periods, i.e., not rapidly adaptive, to allow for quick accessing over a low bandwidth connection, such as a telephone, or using succinct displays, such as might be found on a personal digital assistant. Thus, the user can rely on memory of the interface functionality and layout to reduce data transmissions and reduce search time. In one embodiment, the interface may be "forced" to a particular type, as either a permanent interface, or as a starting point for adaptivity. Thus, the user may be provided with an interface design mode of operation.

The user interaction with each "device", which may be real or virtual (implemented as a software construct in a relatively general purpose computer), is preferably carefully designed for each device. A common user interface paradigm is preferably provided for corresponding functions, while the user interface is preferably optimized for dealing with the specific functions of each particular device. Thus, a similar user interface and screen layout is employed for functions that are the same across a variety of devices. In this regard, it is an aspect of an embodiment of the invention to translate user interface systems, even in a high level state, to other forms. Thus, in a multi-brand environment, related components may have native interfaces that are both well developed and distinctly different. Therefore, the present invention allows for a translation or remapping of the functionality into a common paradigm. Where aspects cannot be adequately translated, the native interface may be presented to the user.

Example 31

Set Top Box with Electronic Commerce Capability

Known systems for accounting and payment for on-line transactions include credit and debit card transactions, direct deposit and wire transfer, Micro Payment Transfer Protocol (MPTP) (www.w3.org), Millicent (Compaq Computer Corp.), and a number of other systems. Typically, these seek to be secure, i.e., to ensure to some degree of reliability against the risk of non-payment. The following U.S. Patents, expressly incorporated herein by reference, define aspects of micropayment and on-line payment systems: U.S. Pat. Nos. 5,930,777; 5,857,023; 5,815,657; 5,793,868; 5,717,757; 5,666,416; 5,677,955; 5,839,119; 5,915,093; 5,937,394; 5,933,498; and 5,903,880. See also, Rivest and Shamir. "Pay Word and MicroMint: Two Simple Micropayment Schemes" (May 7, 1996), expressly incorporated herein by reference: Micro PAYMENT transfer Protocol (MPTP) Version 0.1 (22 Nov. 95) et seq, http://www.w3.org/pub/WWW/TR/WD-mptp: Common Markup for web Micropayment Systems, http://www.w3.org/TR/WD-Micropayment-Markup (9 Jun. 99).

Advantageously, a micropayment scheme is implemented to credit or debit accounts of advertisers, users, service providers, and content owners, for example. By facilitating small monetary transfers, such as between about $0.05 to $5.00, the relatively small dollar values and large audience sizes may be accommodated. This. in turn, will likely make the set top box-delivered entertainment industry content efficient, and potentially allows for the close-knit integration of e-commerce. For example, instead of being linked to an Internet web site operated by a commercial provider by integration of the Internet and streaming broadband media, a complete commercial transaction may be completed. For authentication of the user, typical means may be employed, such as passwords and the like, or more sophisticated techniques such as facial recognition, which may employ common systems as video pattern recognition systems within the device and video-conferencing hardware. Thus, making an impulse purchase based on an advertisement may be as simple as pushing a single button on a remote control.

With transactions having a higher economic value, further safeguards may be implemented, and for example a written contract or receipt could be generated, executed, and returned to the vendor, all using a simple set-top box system with attached printer and scanner (or use of a video camera as image input device).

The payment or micropayment scheme may be integrated with a content management/digital watermarking/copy protection scheme, for example where the transaction purchases a limited license in an electronic audio-visual work. The system typically automatically triggers a monetary transaction to compensate the proprietary rights holder, although under certain circumstances the delivery of the work and the compensation for viewing may be decoupled. For example, as explained elsewhere herein, the content may be stored in a privileged storage medium. Thus, the accounting for use occurs upon substantial viewing, and not upon mere downloading to a "buffer". Alternately, the privileged store is encrypted, and the decryption key is provided only upon payment. Thus, in the case, the payment transaction may be relatively simple, and not require a complete download of a massive audio-visual work.

Typically, a pay-per-view work will be downloaded in a push process to multiple set top boxes using a common encryption key. Once received by an individual addressable box, the work will be re-encrypted based on the identity or identifier of the hardware, using a public key-private key system. Thus, using the public key of the identified hardware, a private key transmitted for decrypting the work and accounting transaction may be performed to compensate the content provider. This system may also work to subsidize the viewing of content. If a viewer is willing to receive certain commercials (which may be stored in mass storage on the hardware or streamed using broadband or packet technology), a payment in favor of the viewer may be received. If the hardware has viewer sensing technology, the compensation may be based on the individuals watching the commercial. If the commercial is time shifted, compensation may be arranged depending on the time of viewing and a formula, which for example may account for staleness of the commercial.

The value may also depend on the correspondence of the commercial to one or more user preference profiles of the respective viewers. Typically, the compensation model will not be the simple aggregate sum of the values for each user. This is because typically, the purchases of the group are not uncorrelated, and therefore the aggregate sum of the values would tend to overestimate the commercial potential of the group. Likewise, the values for any one individual would tend to underestimate the potential of the group. Therefore, a more sophisticated demographic and group (typically family or communal group) analysis should be employed.

In order to register the viewers present, a number of methods may be employed, for example video observation, voice verification, fingerprint or retinal scan technologies, voluntary identification, or the like. Preferably, little additional hardware is employed and the registration process employs hardware otherwise provided for other purposes; however, fingerprint scanners and retinal scanners are useful, even if they incur an additional hardware cost.

The types of content delivered may include images, video, multimedia clips, music, text content, templates, software and applets, and any other sort of information.

The micropayment and rights accounting system may be provided by the system operator, i.e., a broadband cable system operator, or by a third party. Thus, a communications system outside the cable (or satellite) network may be provided. The hardware system according to the present invention may, for example, be integrated with a known cable modem or DSL system, or employ a separate analog POTS modem. By providing such an open communication system, it is possible to maximize the flexibility and the value of communications, essentially allowing completely customized communications. With an intelligent set top box, having a video storage facility, it is possible to create customized presentations by directly addressing the box with a preformed communication, directing a common presentation to the box which is then customized by an individually addressed customization, or by allowing the box to automatically customize based on stored data, which need never leave the box. The system therefore supports various levels of user privacy. In order to support some functions, user information might be required to be transmitted to a cable operator, information aggregator or commercial vendor, for other functions, a fully customized presentation may be generated without any outside transmission of data. The accounting system may also accommodate various levels of privacy. At one end of the spectrum, a commercial vendor has a complete identification of the viewer, at the other, neither the commercial vendor nor the transmission system operator has information as to the viewer or any activities thereof.

In practice, some waiver of anonymity may be required for effective auditing. However, the Nielsen and Arbitron rating systems are built on a user reporting or observation platform, and thus user acceptance is not likely to be difficult. On the other hand, direct advertiser feedback of viewer information, except by voluntary action, such as direct contact, contest entry, purchase, and the like, is likely to be strongly resisted. Thus, an effective proxy filter is preferred to separate accounting issues from advertiser feedback.

Example 32

User Input of Preferences

The system according to the present invention accommodates at least two different means of user definition of preferences. In a first mode, a user specifically or explicitly makes choices, much as in a questionnaire, to define explicit preferences. Alternately, a demographic profile may be obtained, which is then correlated with likely user preference based on collaborative filtering principles. These principles may, in turn, be explicitly defined as a set of rules or fuzzy rules, or derived from observation of persons with like demographic profiles. Typically, the questionnaire will be presented as a series of one or more screens, which may be part of a graphic user interface or character mode on screen display interface. The data will typically be stored locally in the hardware, and not transmitted, in order to preserve user privacy, but in certain circumstances transmission to a server may be acceptable. In order to avoid transmitting the user information to the server, the client appliance (e.g., set top box) must filter and select available content that meets the user criteria or corresponds to the user preference profile.

The user preference profile may also be derived implicitly by monitoring of the user's activities. These may include not only the selected content, but also the time of viewing, other persons with whom viewed, explicit feedback from the user, e.g., a binary like/dislike or a more fine-grained or multivariate evaluation.

Where the system employs content-based analysis of a media stream, it is also possible to rate temporal portions of the media stream, much as political analysts rate politician's performance during long speeches or debates. Therefore, rather than an analysis of the whole, user preference may be applied to particular scenes of a movie, for example. This, in turn, may be used to adaptively edit content. Thus, typical movies are edited for a showing time of 1.5 to 2 hours. Often, longer versions are available with additional scenes deemed non-critical for the performance, but otherwise meritorious. Therefore, a longer version of a movie may be streamed to a plurality of viewers or potential viewers, along with a scene list and description, which may be automatically or manually generated. The client device may then correlate the user preferences with individual scenes, potentially selecting longer or shorter sequences, or editing out portions entirely.

Similar technology allows interactive or immersive presentations, in which the user input controls the presentation in the manner of an immersive story video game.

The user profile(s) may also be provided using both explicit and implicit data. Further, extrinsic data may be submitted to the system, such as information contained in typical credit reports and other private mass archives of person information. This may include income and spending data, geographical demographic data, credit card and usage information, and the like.

Example 33

Electronic Program Guide and Content Analysis System

In seeking to best make decisions relating to the content of a media stream, an electronic program guide or EPG is generally useful as a source of human editorial information relating to a media stream. This information is generally accurate, and properly parsed into standardized fields, making it easily searchable. On the other hand, such EPGs typically define the content of a "program" as a whole, and must be prepared in advance of the transmission, and thus have little detail relating to live or near live broadcasts, such as sports, television news, talk shows, news feeds, and the like. On the other hand, automated content analysis. while available for real time or near real time media streams, are limited by the reliability of the algorithms employed, which are typically substantially less than 100%. Content analysis algorithms also provide the ability to characterize individual scenes or even frames of a media stream, which may represent totally distinct concepts than those indicated in an EPG describing the program as a whole. Therefore, the present invention also provides a system that employs both EPGs and content analysis of media streams seeking to best characterize a media stream for action thereon. In such as system, the EPG is mostly relied upon for defining candidate programs, while the content analysis subsystem is relied upon for filtering the programs. The criteria used by each system may differ markedly, or be defined by a unified user preference profile or artificial agent scheme.

For example, in a business setting, an intelligent agent may be provided to screen broadcasts for news reports relating to certain stocks or companies. In this case, the EPG first defines news reports being broadcast. After determining which broadcasts are news. the content filter then analyses the content, for example by OCR of screen alphanumeric characters, speech recognition, and monitoring of closed caption text, if available. News stories that meet the desired characteristics are then stored for later viewing or immediately presented, for example. After defining stories of potential interest, the content may then be analyzed for significant core concepts, which may then be used to filter other stories that might be related. Thus, an intelligent and iterative process may be defined to filter and present information which meets certain criteria, which may be explicitly defined, such as by stock ticker symbol, or implicitly defined, such as by an indication of "track similar stories" by the user.

It should be understood that the preferred embodiments and examples described herein are for illustrative purposes only and are not to be construed as limiting the scope of the present invention, which is properly delineated only in the appended claims.

REFERENCES

"32-bit Floating-Point DSP Processors". EDN, Nov. 7, 1991, pp. 127-146.
"A New Class of Markov Processes for Image Encoding", School of Mathematics, Georgia Inst. of Technology (1988), pp. 14-32.
"A show and tell of the QBIC technology—Query By Image Content (QBIC)". IBM QBIC Almaden web site, pp. 1-4.
"ABI WRAP, Web Hypertext Applications Processor," http://alphabase.com/abi3/whapinfo.html#profiling. (1996, July 11).
"AdForce Feature Set". http://www.imgis.com/index.html/core/p2-2html (1997, April 11).
"Bar Code Programs VCR", Design News, Feb. 1, 1988, 26.
"C-Cube CL550 JPEG Image Compression Processor", Preliminary Data Book. August 1991, and addendum dated Nov. 20, 1991.
"Chaos & Non-Linear Models in Economics".
"Chaos Theory in the Financial Markets. Applying Fractals, Fuzzy Logic, Genetic Algorithms".
"Construction of Fractal Objects with Iterated Function Systems", Siggraph '85 Proceedings, 19(3):271-278 (1985).
"Data Compression: Pntng by Numbrs", The Economist, May 21, 1988.
"$EMC^2$ Pushes Video Rental By Satellite", Electronic Engineering Times, December 2, P. 1991, p. 1, p. 98.
"Evolutionary Economics & Chaos Theory".
"Finger Painting", Information Display 12, p. 18, 1981.
"Four Eyes", MIT Media Lab web site; pp. 1-2.
"Fractal Geometry-Understanding Chaos", Georgia Tech Alumni Magazine, p. 16 (Spring 1986).
"Fractal Modelling of Biological Structures", Perspectives in Biological Dynamics and Theoretical Medicine, Koslow, Mandell, Shlesinger, eds., Annals of New York Academy of Sciences, vol. 504, 179-194 (date unknown).
"Fractal Modelling of Real World Images, Lecture Notes for Fractals: Introduction, Basics and Perspectives", Siggraph (1987).
"Fractals Yield High Compression"; Electronic Engineering Times: Sep. 30, 1991; p. 39.
"Fractals-A Geometry of Nature", Georgia Institute of Technology Research Horizons; p. 9 (Spring 1986).
"Frequently asked questions about visual information retrieval", Virage Incorporated web site; pp. 1-3.

"How to find the best value in VCRs", Consumer Reports, March 1988, 135-141. "IBM Ultimedia Manager 1.1 and Clinet Search", IBM software web site, pp. 1-4.

"Image Compression Using Fractals and Wavelets", Final Report for the Phase II Contract Sponsored by the Office of Naval Research, Contract No. N00014-91-C-0117, Netrologic Inc., San Diego. Calif. (Jun. 2, 1993).

"Image Detection and Registration", Digital Image Processing. Pratt, Wiley, New York, 1991.

"IPRO," http://www.ipro.com/, Internet profiles Corporation Home and other Web Pages (1996 Jul. 11).

"Jacob Methodology" @ http://WWCSAI.diepa.unipa.it/research/projects/jacob/jacob-method.html.

"Low-Cost VCRs: More For Less", Consumer Reports, March 1990, 168-172.

"Machine Now Reads, enters Information 25 Times Faster Than Human Keyboard Operators", Information Display 9, p. 18 (1981).

"Market Analysis. Applying Chaos Theory to Investment & Economics".

"Media Planning is Redefined in a New Era of Online Advertising." PR Newswire, (1996 Feb. 5).

"MPEG: A Video Compression Standard for Multimedia Applications", Le Gall, Communications of the ACM. vol. 34, No. 4, April 1991. pp. 47-58.

"My Yahoo! news summary for My Yahoo! Quotes", http://my.yahoo.com, (1997 Jan. 27).

"NetGravity Announces Adserver 2.1", http://www.netgravity.com/news/pressrel/launch21.html (1997 Apr. 11).

"Netscape & NetGravity: Any Questions?", http://www.netgravity.com/, (1996 Jul. 11).

"Network Site Main", http://www.doubleclick.net/frames/general/nets2set.htm (1997 Apr. 11).

"New Beetle Cursor Director Escapes All Surface Constraints", Information Display 10, p. 12, 1984.

"Nielsen Views VCRs", Television Digest, Jun. 23, 1988, 15.

"Photobook", MIT Media Lab web site; Aug. 7, 1996; pp. 1-2.

"Profiting from Chaos. Using Chaos Theory for Market Timing, Stock Selection & Option".

"Real Media," http://www.realmedia.com/index.html, (1996 Jul. 11).

"Scanner Converts Materials to Electronic Files for PCs", IEEE CG&A, December 1984, p. 76.

"Shape Analysis", Digital Image Processing, Pratt, Wiley, New York, 1991.

"The Front Page", http://live.excite.com/?aBb (1997 Jan. 27) and (1997 Apr. 11).

"The Highs and Lows of Nielsen Homevideo Index", Marketing & Media Decisions, November 1985, 84-86+.

"The Pointcast Network," http:/www.pointcast.com/, (1996, Spring).

"The Power of PenPoint", Can et al., 1991, p. 39, Chapter 13. pp. 258-260.

"The QBIC Project", IBM QBIC Almaden web site, home page.

"The Quest for 'User Friendly'", U.S. News & World Report, Jun. 13, 1988, 54-56.

"The Smart House: Human Factors in Home Automation", Human Factors in Practice, December 1990, 1-36.

"VCR, Camcorder Trends", Television Digest, Vol. 29, Mar. 20, 1989, 16.

"VCR's: A Look At The Top Of The Line", Consumer Reports, March 1989, 167-170.

"VHS Videocassette Recorders", Consumer Guide, 1990, 17-20.

"Virage—Visual Information Retrieval", Virage Incorporated, home page.

"Virage Products", Virage Incorporated web site; pp. 1-2.

"Visual Information Retrieval: A Virage Perspective Revision 3", Virage Incorporated web site: 1995; pp. 1-13.

"Visual Pattern Recognition by Moment Invariants", IRE Trans. Inform. Theory, vol. 8, February 1962, pp. 179-187.

"Voice Recognition and Speech Processing", Elektor Electronics, September 1985, pp. 56-57.

"Welcome to Lycos," http://www.lycos.com, (1997 Jan. 27).

"Workshop Report: NSF—ARPA Workshop on Visual Information Management Systems", Virage Incorporated web. site; pp. 1-15.

"WWW.amazon.com".

"WWW.firefly.com".

Abadi, M., et al, "Authentication and Delegation with Smart-cards", Oct. 22, 1990, revised Jul. 30, 1992 Report 67, Systems Research Center, Digital Equipment Corp., Palo Alto, Calif.

Abatemarco, Fred, "From the Editor", Popular Science, September 1992, p. 4

Abe, S., Y. Tonomura, Systems and Computers in Japan, vol. 24, No. 7, "Scene Retrieval Method Using Temporal Condition Changes", pp. 92-101, 1993.

Abedini, Kamran, "An Ergonomically-improved Remote Control Unit Design", Interface '87 Proceedings, 375-380.

Abedini, Kamran, and Hadad, George, "Guidelines For Designing Better VCRs", Report No. IME 462, Feb. 4, 1987.

Advertisement for "TV Decision," CableVision, Aug. 4, 1986.

Aleksander, I., "Guide to Pattern Recognition Using Random-Access Memories", Computers and Digital Techniques, 2(1):29-40 (February 1979).

American National Standard, "Financial Institution Retail Message Authentication", ANSI X9.19 1986.

American National Standard, "Interchange Message Specification for Debit and Credit Card Message Exchange Among Financial Institutions", ANSI X9.2-1988.

Anderson, F., W. Christiansen, B. Kortegaard, "Real Time, Video Image Centroid Tracker", Apr. 16-20, 1990.

Anderson, Ross J., "UEPS—A Second Generation Electronic Wallet", Proc. of the Second European Symposium on Research in Computer Security (ESORICS), Toulouse, France, pp. 411-418, Toulouse, France.

Anderson, Ross, "Why Cryptosystems Fail", Proc. 1st Conf. Computer and Comm. Security, pp. 215-227, November 1993.

Anson, L., "Fractal Image Compression", Byte, October 1993, pp. 195-202; "Fractal Compression Goes On-Line", Byte, September 1993.

Anson, L., M. Barnsley; "Graphics Compression Technology"; SunWorld; pp. 43-52 (October 1991).

Antonofs, M., "Stay Tuned for Smart TV," Popular Science, November 1990, pp. 62-65.

Appriou, A., "Interet des theories de l'incertain en fusion de donnees", Colloque International sur le Radar Paris, 24-28 avril 1989.

Appriou, A., "Procedure d'aide a la decision multi-informateurs. Applications a la classification multi-capteurs de cibles", Symposium de l'Avionics Panel (AGARD) Turquie, 25-29 avril 1988.

Arman et al., "Feature Management for Large Video Databases", 1993. (Abstract Only).

Arman et al., "Image Processing on Compressed Data for Large Video Databases", Proc. of First ACM Int. Conf. on Multimedia, Anaheim, Calif., 1-6 Aug. 1993, pp. 267-272.

Arman et al., "Image Processing on Encoded Video Sequences", ACM Multimedia Systems Journal, to appear 1994.

Arndt. T., "A Survey of Recent Research in Image Database Management", IEEE Publication No. TH0330-1/90/0000/0092. pp. 92-97, 1990.

Arrow. K. J., "Social choice and individual valves", John Wiley and Sons Inc. (1963).

Arrowsmith, D K & C M Place: "An Introduction to Dynamical Systems", Cambridge University Press, Cambridge, 1990.

Asian Technology Information Program (ATIP) Report: ATIP95.65: Human Computer Interface International, 7/95 Yokohama.

Astrom, K. J., and B. Wittenmark, "Adaptive Control", Addison-Wesley Publishing Company (1989) pp. 105-215.

Astrom. K. J., T. Hagglund. "Automatic Tuning of PID Controllers", Instrument Society of America, Research Triangle Park, N.C. (1988) pp. 105-132.

Atkinson, Terry, "VCR Programming: Making Life Easier Using Bar Codes".

Bach, J. R., C. Fuller, A. Gupta, A. Hampapur, B. Horowitz, R. Humphrey, R. C. Jain, and C. Shu. Virage image search engine: an open framework for image management. In Symposium on Electronic Imaging: Science and Technology—Storage & Retrieval for Image and Video Databases IV, pages 76-87. IS&T/SPIE, 1996.

Bagley. H. & Sloan, J., "Optical Processing: Ready For Machine Vision?", Photonics Spectra, August 1993, pp. 101-106.

Bains, S., "Trained Neural Network Recognizes Faces", Laser Focus World, June, 1993, pp. 26-28.

Baker, Gregory L., & Jerry P Gollub: "Chaotic Dynamics: An Introduction", Cambridge University Press, Cambridge, 1990.

Baldwin, William, "Just the Bare Facts, Please", Forbes Magazine, Dec. 12, 1988.

Ballard, D. H., and Brown, C. M., Computer Vision, Prentice Hall, Englewood Cliffs, N. J (1982); Optical Engineering 28:5 (May 1988)(Special Issue on product inspection).

Barber et al. "Ultimedia Manager: Query by Image Content and it's Applications" IEE, 1994, pp. 424-429, January 1994.

Barnsley et al., "A Better Way to Compress Images", Byte, January 1988, pp. 213-225.

Barnsley et al., "Chaotic Compression", Computer Graphics World, November 1987.

Barnsley et al., "Harnessing Chaos For Images Systhesis", Computer Graphics, 22(4):131-140 (August, 1988).

Barnsley et al., "Hidden Variable Fractal Interpolation Functions", School of Mathematics, Georgia Institute of Technology, Atlanta, Ga. 30332, July, 1986.

Barnsley, M., L. Anson, "Graphics Compression Technology, SunWorld, October 1991, pp. 42-52.

Barnsley, M. F., A. Jacquin, F. Malassenet, L. Reuter & A. D. Sloan, 'Harnessing chaos for image synthesis'. Computer Graphics, vol 22 no 4 pp 131-140, (August, 1988).

Barnsley. M. F., A. E. Jacquin, 'Application of recurrent iterated function systems to images', Visual Comm. and Image Processing, vol SPIE-1001, 1988.

Barnsley. M. F., "Fractals Everywhere", Academic Press, Boston, Mass., 1988.

Barnsley, M. F., and Demko, S., "Iterated Function Systems and The Global Construction of Fractals", Proc. R. Soc. Lond., A399:243-275 (1985).

Barnsley, M. F., Ervin, V., Hardin, D., Lancaster, J., "Solution of an Inverse Problem for Fractals and Other Sets", Proc. Natl. Acad. Sci. U.S.A., 83:1975-1977 (April 1986).

Barros, et al. "Indexing Multispectral Images for Content-Based Retrieval", Proc. 23rd AIPR Workshop on Image and Information Retrieval, Proc. 23rd Workshop, Washington, D.C., October 1994, pp. 25-36.

Batchelor, B. G., "Pattern Recognition, Ideas in Practice", Plenum Press, London and New York, (1978).

Batchelor, B. G., "Practical Approach to Pattern Classification", Plenum Press, London and New York, (1974).

Baxes, Gregory A., "Digital Signal Processing, A Practical Primer", Prentice-Hall, Englewood Cliffs, N.J. (1984).

Beaumont J M, "Image data compression using fractal techniques", British Telecom Technological Journal 9(4): 93-108 (1991).

Belkin, N.J., Croft, W. B., "Information Filtering And Information Retrieval: Two Sides of the Same Coin?", Communications of the ACM, December 1992, vol. 35, No. 12, pp. 29-38.

Bellman, R. E., L. A. Zadeh, "Decision making in a fuzzy environment", Management Science, 17(4) (December 1970).

Bender, M., "EFTS: Electronic Funds Transfer Systems", Kennikat Press, Port Washington, N.Y., pp. 43-46 1975.

Bensch, U., "VPV—VIDEOTEXT PROGRAMS VIDEORECORDER", IEEE Transactions on Consumer Electronics, Vol. 34, No. 3, 788-792 (1988).

Berger, Ivan, "Secrets of the Universals", Video, February 1989, 45-47+.

Beringer, D. B., "A Comparative Evaluation of Calculator Watch Data Entry Technologies: Keyboards to Chalkboards", Applied Ergonomics, December 1985, 275-278.

Berniker, M., "Nielsen plans Internet Service," Broadcasting & Cable, 125(30):34 (1995 Jul. 24).

Berry, Deanne, et al. In an Apr. 10, 1990 news release, Symantec announced a new version of MORE™.

Berry, Jonathan, "A Potent New Tool for Selling Database Marketing", Business Week, Sep. 5, 1994, pp. 34-40.

Berry, M V, I C Persival & N O Weiss: "Dynamical Chaos", The Royal Society, London, 1987, Proceedings of a Royal Society Discussion Meeting held on 4 & 5 Feb. 1987.

Bestler, Caitlin: Flexible Data Structures and Interface Rituals For Rapid Development of OSD Applications; 93 NCTA Tech. Papers; Jun. 6, 1993; pp. 223-236.

Betts, M., "Sentry cuts access to naughty bits," Computers and Security, vol. 14, No. 7, p. 615 (1995).

Bhatnagar, R. K., L. N. Kamal, "Handling uncertain information: a review of numeric and non-numeric methods", Uncertainty in Artificial Intelligence, L. N. Kamal and J. F. Lemmer, Eds. (1986).

Bier, E. A. et al. "MMM: A User Interface Architecture for Shared Editors on a Single Screen," Proceedings of the ACM Symposium on User Interface Software and Technology, Nov. 11-13, 1991, p. 79.

Bimbo et al., "Sequence Retrieval by Contents through Spatio Temporal Indexing", IEEE on CD-ROM, pp. 88-92, Aug. 24, 1993.

Bimbo, A. D., et al, "3-D Visual Query Language for Image Databases", Journal Of Visual Languages & Computing, 1992, pp. 257-271.

Binaghi, E., et al, "Indexing and Fuzzy Logic Based Retrieval of Color Images", Visual Database Systems, II, 1992, pp. 79-92.

Binaghi, E., et al., "A Knowledge-Based Environment for Assessment of Color Similarity", Proc. 2nd Annual Conference on Topics for A1, pp. 268-285 (1990).

Bishop, Edward W., and Guinness, G. Victor Jr., "Human Factors Interaction with Industrial Design", Human Factors, 8(4):279-289 (August 1966).

Blair, D., R. Pollack, "La logique du choix collectif" Pour la Science (1983).

Bolot, J.; Turletti, T. & Wakeman, I.; "Scalable Feedback Control for Multicast Video Distribution In the Internet", Computer Communication Review, vol. 24, No. 4 Oct. 1994, Proceedings of SIGCOMM 94, pp. 58-67.

Bos et al., "SmartCash: a Practical Electronic Payment System", pp. 1-8; August 1990.

Boy, Guy A., Intelligent Assistant Systems, Harcourt Brace Jovanovich, 1991, uses the term "Intelligent Assistant Systems".

Bristol, E. H., & T. W. Kraus, "Life with Pattern Adaptation", Proceedings 1984 American Control Conference, pp. 888-892, San Diego, Calif. (1984).

Brown, Edward, "Human Factors Concepts For Management", Proceedings of the Human Factors Society, 1973, 372-375.

Brown, Robert: "Statistical Forecasting for Inventory Control", McGraw-Hill Book Co., New York, 1958.

Bruce, J W, & P J Giblin: "Curves and Singularities", Cambridge University Press, Cambridge, 1992.

Brugliera, Vito, "Digital On-Screen Display—A New Technology for the Consumer Interface", Symposium Record Cable Sessions. Jun. 11, 1993, pp. 571-586.

Bulkeley, Debra, "The Smartest House in America", Design News, Oct. 19, 1987, 56-61.

Burk et al, "Value Exchange Systems Enabling Security and Unobservability", Computers & Security, 9 1990, pp. 715-721.

Burr, D. J., "A Neural Network Digit Recognizer", Proceedings of the 1986 IEEE International Conference of Systems, Man and Cybernetics, Atlanta, Ga., pp. 1621-1625.

Bursky, D., "Improved DSP ICs Eye New Horizons", Electronic Design, Nov. 11, 1993, pp. 69-82.

Bussey, H. E., et al., "Service Architecture, Prototype Description, and Network Implications of a Personalized Information Grazing Service," IEEE Multiple Facets of Integration Conference Proceedings, vol. 3, No. Conf. 9, Jun. 3, 1990, pp. 1046-1053. Byte Magazine, January 1988.

Caffery, B., "Fractal Compression Breakthrough for Multimedia Applications", Inside, Oct. 9, 1991.

Card, Stuart K., "A Method for Calculating Performance times for Users of Interactive Computing Systems", IEEE, 1979, 653-658.

Carlson, Mark A., "Design Goals for an Effective User Interface", Human Interfacing with Instruments, Electro/82 Proceedings, 3/1/1-3/1/4.

Carpenter, G. A., S. Grossberg, "The Art of Adaptive Pattern Recognition by a Self-Organizing Neural Network", IEEE Computer, March 1988, pp. 77-88.

Carroll, Paul B., "High Tech Gear Draws Cries of "Uncle", Wall Street Journal, Apr. 27, 1988, 29.

Casasent, D., and Tescher, A., Eds., "Hybrid Image and Signal Processing II", Proc. SPIE Technical Symposium, April 1990, Orlando Fla. 1297 (1990).

Casasent, D., et al., "General I and Q Data Processing on a Multichannel AO System", Applied Optics, 25(18):3217-24 (Sep. 15, 1986).

Casasent, D., Photonics Spectra, November 1991, pp. 134-140.

Casdagli, Martin, & Stephen Eubank: "Nonlinear Modelling and Forecasting", Addison-Wesley Publishing Co., Redwood City, 1992.

Case Study: The CIRRUS Banking Network, Comm. ACM 8, 28 pp. 7970-8078, August 1985.

Caudill, M., "Neural Networks Primer-Part III", AI Expert, June 1988, pp. 53-59.

Cawkell, A. E., "Current Activities in Image Processing Part III: Indexing Image Collections", CRITique, vol. 4, No. 8, May 1992, pp. 1-11, ALSIB, London.

Chalmers, M., Chitson, P., "Bead: Explorations In Information Visualization", 15th Ann. Int'l SIGIR 92/Denmark June 1992, pp. 330-337.

Chang et al., "Image Information Systems: Where Do We Go From Here?", IEEE Transactions on Knowledge and Data Engineering, vol. 4, No. 5, October 1992, pp. 431-442.

Chang et al., "Intelligent Database Retrieval by Visual Reasoning", PROC Fourteenth Annual International Computer Software and Application Conference, 31 Oct.-1 Nov. 1990, pp. 459-464.

Chang, C., "Retrieving the Most Similar Symbolic Pictures from Pictorial Databases", Information Processing & Management, vol. 28, No. 5, 1992.

Chang, C., et al, "Retrieval of Similar Pictures on Pictorial Databases", Pattern Recognition, vol. 24, No. 7, 1991, pp. 675-680.

Chang, N. S., et al., "Picture Query Languages for Pictorial Data-Base Systems", Computer vol. 14, No. 11, pp. 23-33 (November 1981).

Chang, N. S., et al., "Query-by-Pictorial Example", IEEE Transactions on Software Engineering, vol. SE-6, No. 6, pp. 519-524 (November 1980).

Chang, S., et al, "An Intelligent Image Database System", IEEE Transactions On Software Engineering, vol. 14, No. 5, May 1988, pp. 681-688.

Chang, S.-F, Compressed-domain techniques for image/video indexing and manipulation. In Proceedings, I.E.E.E. International Conference on Image Processing, Washington, D.C., October 1995. invited paper to the special session on Digital Library and Video on Demand.

Chang, S.-K., Principles of Pictorial Information Systems Design. Prentice Hall, 1989.

Chang, S.-K., Q. Y. Shi, and C. Y. Yan. "Iconic indexing by 2-D strings". IEEE Trans. On Pattern Analysis And Machine Intelligence, vol. 9, No. 3, May 1987, pp. 413-428.

Chang, Yuh-Lin, Zeng, Wenjun, Kamel, Ibrahim, Alonso, Rafael, "Integrated Image and Speech Analysis for Content-Based Video Indexing".

Chao, J. J., E. Drakopoulos, C. C. Lee, "An evidential reasoning approach to distributed multiple hypothesis detection", Proceedings of the 20th Conference on decision and control, Los Angeles, Calif., December 1987.

Chao, T.-H.; Hegblom, E.; Lau, B.; Stoner, W. W.; Miceli, W. J., "Optoelectronically implemented neural network with a wavelet preprocessor", *Proceedings of the SPIE—The International Society for Optical Engineering*, 2026: 472-82(1993).

Chapra, Steven C, & Raymond P Canale: "Numerical Methods for Engineers", McGraw-Hill Book Co., New York, 1988.

Charles, S., et al, "Using Depictive Queries to Search Pictorial Databases", Human Computer Interaction, 1990, pp. 493-498.

Chassery, J. M., et al., "An Interactive Segmentation Method Based on Contextual Color and Shape Criterion", IEEE Transactions on Pattern Analysis and Machine Intelligence, vol. PAMI-6, No. 6, (November 1984).

Chaum et al, "Untraceable Electronic Cash", Advances in Cryptology, 1988, pp. 319-327.

Chaum et al; "Achieving Electronic Privacy", Scientific American, pp. 319-327; 1988.

Chaum, D. "Security without Identification: Card Computers to Make Big Brother Obsolete", Communications of the ACM, 28(10), October 1985, pp. 1030-1044.

Chaum, D. "Untraceable Electronic Mail, Return Addresses, and Digital Pseudonyms", Communications of the ACM, vol. 24, No. 2, February, 1981.

Chaum, D., "Achieving Electronic Privacy", Scientific American, August 1992, pp. 96-101.

Chaum, D. L. et al.; "Implementing Capability-Based Protection Using Encryption"; Electronics Research Laboratory, College of Engineering, University of California, Berkeley, Calif.; Jul. 17, 1978.

Chen et al., "Adaptive Coding of Monochrome and Color Images", November 1977, pp. 1285-1292.

Chen, Z., et al, "Computer Vision for Robust 3D Aircraft Recognition with Fast Library Search", Pattern Recognition, vol. 24, No. 5, pp. 375-390, 1991, printed in Great Britain.

Cheong, C. K.; Aizawa, K.; Saito, T.; Hatori, M., "Adaptive edge detection with fractal dimension", *Transactions of the Institute of Electronics, Information and Communication Engineers D-II*, J76D-II(11):2459-63 (1993).

Child, Jeff, "H.324 Paves Road For Mainstream Video Telephony", Computer Design, January 1997, pp. 107-110.

Chua, T.-S., S.-K. Lim, and H.-K. Pung. Content-based retrieval of segmented images. In Proc. ACM Intern. Conf. Multimedia, October 1994.

Cobb, Nathan, "I don't get it", Boston Sunday Globe Magazine, Mar. 25, 1990, 23-29.

Cohen, Danny; "Computerized Commerce"; ISI Reprint Series ISI/RS-89/243; October, 1989; Reprinted from Information Processing 89, Proceedings of the IFIP World Computer Congress, held Aug. 28-Sep. 1, 1989.

Cohen, Danny; "Electronic Commerce"; University of Southern California, Information Sciences Institute, Research Report ISI/RR-89-244; October, 1989.

Cohen, R., "FullPixelSearch Helps Users Locate Graphics", MacWeek, Aug. 23, 1993, p. 77.

Commaford, C., "User-Resonsive Software Must Anticipate Our Needs", PC Week, May 24, 1993.

Common European Newsletter, Multimedia Content manipulation and Management, http://ww.esat.kuleuven.ac.be/-konij in/ . . . .

CompuServe Information Service Users Guide, CompuServe International, 1986, pp. 109-114.

Computer Shopper, November 1994, "Internet for Profit", pp. 180-182, 187, 190-192, 522-528, 532, 534.

Computer Visions, Graphics, and Image Processing 1987, 37:54-115.

Computer, Vol. 28(9), September 1995.

Computers and Biomedical Research 5, 388-410 (1972).

Compuvid Sales Manual (date unknown).

Consumer Digest advertisement: Xpand Your TV's Capability: Fall/Winter 1992; p. 215.

Cooper, L. N., "A Possible Organization of Animal Memory and Learning", Nobel 24, (1973), Collective Properties of Physical Systems, pp. 252-264.

Corporate Overview, Virage Incorporated web site; pp. 1-4.

Corripio, A. B., "Tuning of Industrial Control Systems", Instrument Society of America, Research Triangle Park, N.C. (1990) pp. 65-81.

Cox, Ingemar J., et al., "PicHunter: Bayesian Relevance Feedback for Image Retrieval," Proc. of the ICPR '96, IEEE, pp. 361-369.

Crawford et al., "Adaptive Pattern Recognition Applied To An Expert System For Fault Diagnosis In Telecommunications Equipment", pp. 10/1-8 (Inspec. Abstract No. 86C010699, Inspec IEE (London) & IEE Coll. on "Adaptive Filters", Digest No. 76, Oct. 10, 1985).

Cutting, D. R.; Karger, D. R.; Pedersen, J. O. & Tukey, J. W. "Scatter/Gather: A Cluster-based Approach to Browsing Large Document Collections", 15 Ann. Int'l SIGIR '92, ACM, 1992, pp. 318-329.

Cvitanovic, Predrag: "Universality in Chaos", Adam Hilger, Bristol, 1989.

Daly, Donal: "Expert Systems Introduced", Chartwell-Bratt, Lund, 1988.

Damashek, M., Gauging Similarity via N-Grams: Language-Independent Sorting, Categorization, and Retrieval of Text, pp. 1-11, Jan. 24, 1995.

Danielsson, Erik, et al.; "Computer Architectures for Pictorial Inf. Systems"; IEEE Computer, November, 1981; pp. 53-67.

Data Partner 1.0 Simplifies DB Query Routines, PC Week, Sep. 14, 1992, pp. 55 & 58.

Davis, Andrew W., "Hi Grandma!: Is It Time for TV Set POTS Videoconferencing?", *Advanced Imaging*, pp. 45-49 (March 1997).

Davis, Andrew W., "The Video Answering Machine: Intel ProShare's Next Step", *Advanced Imaging*, pp. 28-30 (March 1997).

Davis, Fred, "The Great Look-and-Feel Debate", A+, 5:9-11 (July 1987).

Deering, S.; Estrin, D.; Farinacci, D.; Jacobson, V.; Liu, C.; Wei, L; "An Architecture for Wide-Area Multicast Routing", Computer Communication Review, vol. 24, No. 4, October 1994, Proceedings of SIGCOMM 94, pp. 126-135.

Dehning, Waltraud, Essig Heidrun, and Maass, Susanne, The Adaptation of Virtual Man-Computer Interfaces to User Requirements in Dialogs, Germany: Springer-Verlag, 1981.

Dempster, A. P., "A generalization of Bayesian inference", Journal of the Royal Statistical Society, Vol. 30, Series B (1968).

Dempster, A. P., "Upper and lower probabilities induced by a multivalued mapping", Annals of mathematical Statistics, no. 38 (1967).

Denker; 1984 International Test Conf., October 1984, Philadelphia, Pa.; pp. 558-563.

Derra, Skip, "Researchers Use Fractal Geometry,", Research and Development Magazine, March 1988.

Diggle, Peter J: "Time Series: A Biostatistical Introduction", Clarendon Press, Oxford, 1990.

DivX standard.

Donnelley, J. E., "WWW media distribution via Hopewise Reliabe Multicast," Computer Networks and ISDN Systems, vol. 27, No. 6, pp. 81-788 (April, 1995).

Donovan, J., "Intel/IBM's Audio-Video Kernel", Byte, December, 1991, pp. 177-202.

Drazin, P G: "Nonlinear System". Cambridge University Press, Cambridge, 1992.

Dubois, D., "Modeles mathematiques de l'imprecis et de l'incertain en vue d'applications aux techniques d'aide a la decision", Doctoral Thesis, University of Grenoble (1983).

Dubois, D., N. Prade, "Combination of uncertainty with belief functions: a reexamination", Proceedings 9th International Joint Conference on Artificial Intelligence, Los Angeles (1985).

Dubois, D., N. Prade, "Fuzzy sets and systems-Theory and applications", Academic Press, New York (1980).

Dubois, D., N. Prade, "Theorie des possibilites: application a la representation des connaissances en informatique", Masson, Paris (1985).

Dubois, D.; "Modeles mathematiques de l'imprecis et de l'incertain en vue d'applications aux techniques d'aide a la decision"; Doctoral Thesis, University of Grenoble (1983).

Duda, R. O., P. E. Hart, M. J. Nilsson, "Subjective Bayesian methods for rule-based inference systems", Technical Note 124-Artificial Intelligence Center-SRI International.

Dukach, Semyon, "SNPP: A Simple Network Payment Protocol", MIT Laboratory for Computer Science, Cambridge, Mass., 1993.

Dukach, Seymon; Prototype Implementation of the SNPP Protocol; allspic.lcs.mit.edu; 1992.

Dunning, B. B., "Self-Learning Data-Base For Automated Fault Localization", IEEE, 1979, pp. 155-157.

EDN, May 11, 1995, pp. 40-106.

Edwards, John R., "Q&A: Integrated Software with Macros and an Intelligent Assistant", Byte Magazine, January 1986, vol. 11, Issue 1, pp. 120-122, critiques the Intelligent Assistant by Symantec Corporation.

Ehrenreich, S. L., "Computer Abbreviations—Evidence and Synthesis", Human Factors, 27(2):143-155 (April 1985).

Ekeland, Ivar: "Mathematics and the Unexpected", The University of Chicago Press, Chicago, 1988Falconer, Kenneth: "Fractal Geometry", John Wiley & Sons, Chichester, 1990.

Electronic Engineering Times (EET), Oct. 28, 1991, p. 62.

Electronic Engineering Times, Oct. 28, 1991, p. 62, "IBM Points a New Way".

Elliott, "Watch-Grab-Arrange-See: Thinking with Motion Images via Streams and Collages", Ph.D. Thesis, MIT, February 1993.

Elofson, G. and Konsynski, B., "Delegation Technologies: Environmental Scanning with Intelligent Agents", Journal of Management Information Systems, Summer 1991, vol. 8, Issue 1, pp. 37-62.

Elton, J., "An Ergodic Theorem for Iterated Maps", Journal of Ergodic Theory and Dynamical Systems, 7 (1987).

Even et al; "Electronic Wallet", pp. 383-386; 1983.

Faloutsos, C., et al, "Efficient and Effective Querying by Image Content", Journal of Intelligent Information Systems:Integrating Artificial Intelligence and Database Technologies, vol. 3-4, No. 3, July 1994, pp. 231-262.

Farrelle, Paul M. and Jain, Anil K., "Recursive Block Coding-A New Approach to Transform Coding", IEEE Transactions on Communications, Corn. 34(2) (February 1986).

Fassihi, Theresa & Bishop, Nancy, "Cable Guide Courting National Advertisers," Adweek, Aug. 8, 1988.

Fisher Y, "Fractal image compression", Siggraph 92.

Fitzpatrick, J. M., J. J. Grefenstette, D. Van Gucht, "Image Registration by Genetic Search", Conf. Proc., IEEE Southeastcon 1984, pp. 460-464.

Flickner, et al. "Query by Image and Video Content, the QBIC System", IEEE Computer 28(9); 23-32, 1995.

Foley, J. D., Wallace, V. L., Chan, P., "The Human Factor of Computer Graphics Interaction Techniques", IEEE CG&A, November 1984, pp. 13-48.

Foltz, P. W., Dumais, S. T., "Personalized Information Delivery: An Analysis Of Information Filtering Methods", Communications of the ACM, December 1992, vol. 35, No. 12, pp. 51-60.

Fractal Image Compression Michael F. Barnsley and Lyman P. Hurd ISBN 0-86720-457-5, ca. 250 pp.

Fractal Image Compression: Theory and Application, Yuval Fisher (ed.), Springer Verlag, New York, 1995. ISBN number 0-387-94211-4.

Fractal Modelling of Biological Structures, School of Mathematics, Georgia Institute of Technology (date unknown).

Franklin, Gene F, J David Powell & Abbas Emami-Naeini: "Feedback Control of Dynamic Systems", Addison-Wesley Publishing Co. Reading, 1994.

Freeman, W. T., et al, "The Design and Use of Steerable Filters", IEEE Transactions on Pattern Analysis and Machine Intelligence, vol. 15, No. 9, September 1991, pp. 891-906.

Friedman, M. B., "An Eye Gaze Controlled Keyboard", Proceedings of the 2nd International Conference on Rehabilitation Engineering, 1984, 446-447.

Fu, *Sequential Methods in Pattern Recognition and Machine Learning*, Academic, NY, N.Y. 1968.

Fua, P. V., "Using probability density functions in the framework of evidential reasoning Uncertainty in knowledge based systems", B. Bouchon, R. R. Yager, Eds. Springer Verlag (1987).

Garretson, R., "IBM Adds 'Drawing Assistant' Design Tool to Graphics Series", PC Week, Aug. 13, 1985, vol. 2, Issue 32, p. 8.

Gautama, S., D'Haeyer, J., "Learning Relational Models of Shape: A Study of the Hypergraph Formalism".

Gautama, S., D'Haeyer, J. P. F., "Context Driven Matching in Structural Pattern Recognition".

Gellert, W, H Kustner, M Hellwich & H Kastner: "The VNR Concise Encyclopedia of Mathematics", Van Nostrand Reinhols Co., New York, 1975.

Gelman, A. D., et al.: A Store-And-Forward Architecture For Video-On-Demand Service; ICC 91 Conf.; June 1991; pp. 842-846.

George E P Box & Gwilym M Jenkins: "Time Series Analysis: Forecasting and Control", Holden Day, San Francisco, 1976.

Gessler, S. and Kotulla A., "PDAs as mobile WWW browsers," Computer Networks and ISDN Systems, vol. 28, No. 1-2, pp. 53-59 (December 1995).

Gevers, T., et al, "Enigma: An Image Retrieval System", IEEE 11th IAPR International Conference On Pattern Recognition, 1992, pp. 697-700.

Gevers, T., et al, "Indexing of Images by Pictorial Information", Visual Database Systems, II, 1992 IFIP, pp. 93-101.

Gifford, D., "Notes on Community Information Systems", MIT LCS™-419, December 1989.

Gifford, David K.; "Cryptographic Sealing for Information Secrecy and Authentication"; Stanford University and Xerox Palo Alto Research Center; Communication of the ACM; vol. 25, No. 4; April, 1982.

Gifford, David K.; "Digital Active Advertising"; U.S. patent application Ser. No. 08/168,519; filed Dec. 16, 1993.

Gilfoil, D., and Mauro, C. L., "Integrating Human Factors and Design: Matching Human Factors Methods up to Product Development", C. L. Mauro Assoc., Inc., 1-7.

Gleick, James, "Chaos—Making a New Science", Heinemann, London, 1988.

Gligor, Virgil D. et al.; "Object Migration and Authentication"; IEEE Transactions on Software Engineering; vol. SE-5, No. 6; November, 1979.

Glinert-Stevens, Susan, "Microsoft Publisher: Desktop Wizardry", PC Sources, February, 1992, vol. 3, Issue 2, p. 357.

Goble, C., et al, "The Manchester Multimedia Information System", Proceedings of IEEE Conference, Eurographics Workshop, April, 1991, pp. 244-268.

Gogoussis et al., Proc. SPIE Intl. Soc. Opt. Eng., November 1984, Cambridge, Mass., pp. 121-127.

Goldberg, Cheryl, "IBM Drawing Assistant: Graphics for the EGA". PC Magazine, Dec. 24, 1985, vol. 4, Issue 26, p. 255.

Gong et al, "An Image Database System with Content Capturing and Fast Image Indexing Abilities", PROC of the International Conference on Multimedia Computing and Systems, pp. 121-130 May 19, 1994.

Gong et al. "An Image Database System with Content Capturing and Fast Image Indexing Abilities" IEEE, 1994, pp. 121-130, May 1994.

Gonzalez et al., *Digital Image Processing*, Addison-Wesley, Reading, M A, 1977.

Gonzalez, Rafael C., "Digital Image Processing", Addison-Wesley, Reading, Mass. (1987).

Gonzalez, Rafael C., "Digital Image Processing", Addison-Wesley, Reading, Mass. (1987).

Gould, John D., Boies, Stephen J., Meluson, Antonia, Rasammy, Marwan, and Vosburgh, Ann Marie, "Entry and Selection Methods For Specifying Dates". Human Factors, 32(2):199-214 (April 1989).

Graf S, "Barnsley's Scheme for the Fractal Encoding of Images", Journal Of Complexity, V8, 72-78 (1992).

Great Presentations advertisement: Remote, Remote; 1987; p. 32H.

Green, Lee, "Thermo Tech: Here's a common sense guide to the new thinking thermostats", Popular Mechanics, October 1985, 155-159.

Grosky, W., et al, "A Pictorial Index Mechanism for Model-based Matching", Data 7 Knowledge Engineering 8, 1992, pp. 309-327.

Grosky, W., et al, "Index-based Object Recognition in Pictorial Data Management", Computer Vision, 1990, pp. 416-436.

Grossberg, S., G. Carpenter, "A Massively Parallel Architecture for a Self-Organizing Neural Pattern Recognition Machine," Computer Vision, Graphics, and Image Processing (1987, 37, 54-115), pp. 252-315.

Grudin, Jonathan, "The Case Against User Interface Consistency", MCC Technical Report Number ACA-HI-002-89, January 1989.

Gudivada, V. N., and V. V. Raghavan. Design and evaluation of algorithms for image retrieval by spatial similarity. ACM Trans. on Information Systems, 13(2), April 1995.

Gudivada, V., et al, "A Spatial Similarity Measure for Image Database Applications", Technical Report 91-1, Department of Computer Science, Jackson, Miss., 39217, 1990-1991.

Guenther, O., and A. Buchmann. Research issues in spatial databases. In ACM SIGMOD Record, volume 19, December 1990.

Gullichsen E., E. Chang, "Pattern Classification by Neural Network: An Experiment System for Icon Recognition," ICNN Proceeding on Neural Networks, March 1987, pp. IV-725-32.

Gupta, Amarnath; Weymount, Terry & Jain, Ramesh, "Semantic Queries With Pictures: The VIMSYS Model", Proceedings of the 17th International Conference on Very Large Data Bases, pp. 69-79, Barcelona, September, 1991.

Hafner, J., H. S. Sawhney, W. Equitz, M. Flickner, and W. Niblack. Efficient color histogram indexing for quadratic form distance functions. IEEE Trans. Pattern Anal. Machine Intell., July 1995.

Haines, R. W., "HVAC Systems Design Handbook", TAB Professional and Reference Books, Blue Ridge Summit, Pa. (1988) pp. 170-177.

Harris, C. J., & S. A. Billings, "Self-Tuning and Adaptive Control: Theory and Applications", Peter *Peregrinus* LTD (1981) pp. 20-33.

Harty et al., "Case Study: The VISA Transaction Processing System," 1988.

Haruki, K. et al., "Pattern Recognition of Handwritten Phonetic Japanese Alphabet Characters", International Joint Conference on Neural Networks, Washington, D.C., January 1990, pp. 11-515 to 11-518.

Harvey, Michael G., and Rothe, James T., "VideoCassette Recorders: Their Impact on Viewers and Advertisers", Journal of Advertising, 25:19-29 (December/January 1985).

Hasegawa, J., et al, "Intelligent Retrieval of Chest X-Ray Image Database Using Sketches", System And Computers In Japan, 1989, pp. 29-42.

Hawkins, William J., "Super Remotes", Popular Science, February 1989, 76-77.

Hayashi, Y., et al., "Alphanumeric Character Recognition Using a Connectionist Model with the Pocket Algorithm", Proceedings of the International Joint Conference on Neural Networks, Washington, D.C. June 18-22, 1989, vol. 2, pp. 606-613.

Hayes, H. I.; Solka, J. L.; Priebe, C. E.; "Parallel computation of fractal dimension", *Proceedings of the SPIE—The International Society for Optical Engineering*, 1962:219-30 (1993).

Hendrix, Gary G. and Walter, Brett A., "The Intelligent Assistant: Technical Considerations Involved in Designing Q&A's Natural-language Interface", Byte Magazine, December 1987, vol. 12, Issue 14, p. 251.

Henke, Lucy L., and Donohue, Thomas R., "Functional Displacement of Traditional TV Viewing by VCR Owners", Journal of Advertising Research, 29:18-24 (April-May 1989).

Hinton et al., "Boltzmann Machines: Constraint Satisfaction Networks that Learn", Tech. Report CMU-CS-85-119, Carnegie-Mellon Univ, 5/84.

Hirata, et al. "Query by Visual Example, Content Based Image Retrieval" Advance in Database Technology-EDBT '92, Springer-Verlag, Berlin 1992, pp. 56-71

Hirata, K., et al, "Query by Visual Example Content Based Image Retrieval", Advances In Database Technology, March, 1992, pp. 57-71.

Hirzalla et al., "A Multimedia Query User Interface", IEEE on CD-ROM, pp. 590-593, Sep. 5, 1995.

Hirzinger, G., Landzettel, K., "Sensory Feedback Structures for Robots with Supervised Learning", IEEE Conf. on Robotics and Automation, St. Louis, March 1985.

Hoare, F.; de Jager, G., "Neural networks for extracting features of objects in images as a pre-processing stage to pattern classification", Proceedings of the 1992 South African Symposium on Communications and Signal Processing. COMSIG '92 (Cat. No. 92TH0482-0). Inggs, M. (Ed.), p. 239-42 (1992).

Hoban, Phoebe, "Stacking the Decks", New York, Feb. 16, 1987, 20:14.

Hoffberg, Linda I, "AN IMPROVED HUMAN FACTORED INTERFACE FOR PROGRAMMABLE DEVICES: A CASE STUDY OF THE VCR" Master's Thesis, Tufts University (Master of Sciences in Engineering Design, November, 1990).

Hoffberg, Linda I., "Designing a Programmable Interface for a Video Cassette Recorder (VCR) to Meet a User's Needs", Interface 91 pp. 346-351 (1991).

Hoffberg, Linda I., "Designing User Interface Guidelines For Time-Shift Programming of a Video Cassette Recorder (VCR)", Proc. of the Human Factors Soc. 35th Ann. Mtg. pp. 501-504 (1991).

Hoffman, D. L. et al., "A New Marketing Paradigm for Electronic Commerce," (1996 Feb. 19), http://www2000.ogsm.vanderbilt.edu novak/new.marketing.paradigm.html.

Hollatz, S. A., "Digital image compression with two-dimensional affine fractal interpolation functions", Department of Mathematics and Statistics, University of Minnesota-Duluth, Technical Report 91-2.

Hong Kong Enterprise advertisement: Two Innovative New Consumer Products From SVI; November 1988; p. 379.

Hongjiang, et al., Digital Libraries, "A Video Database System for Digital Libraries", pp. 253-264, May 1994.

Hooge, Charles, "Fuzzy logic Extends Pattern Recognition Beyond Neural Networks", Vision Systems Design, January 1998, pp. 32-37.

Hopfield et al., "Computing with Neural Circuits: A Model", Science, 233:625-633 (8 Aug. 1986).

Hopfield, "Neural Networks and Physical Systems with Emergent Collective Computational Abilities", Proc. Natl. Acad. Sci. USA, 79:2554-2558 (April 1982).

Hopfield, "Neurons with graded response have collective computational properties like those of two-state neurons", Proc. Natl. Acad. Sci. USA, 81:3088-3092 (May 1984).

Hopfield; "Neural Networks and Physical Systems with Emergent Collective Computational Abilities"; Proc. Natl. Acad. Sci. USA; 79:2554-2558 (April 1982).

Horgan, H., "Medical Electronics", IEEE Spectrum, January 1984, pp. 90-93.

Hou et al., "Medical Image Retrieval by Spatial Features", IEEE on CD-ROM, pp. 1364-1369, Oct. 18, 1992.

Howard, Bill, "Point and Shoot Devices", PC Magazine, 6:95-97 (August 1987).

Hsu et al., "Pattern Recognition Experiments in the Mandala/Cosine Domain", IEEE Transactions on Pattern Analysis and Machine Intelligence, vol. PAMI-5, No. 5, September 1983, pp. 512-520.

Hu et al., "Pattern Recognition by Moment Invariants", Proc. IRE, vol. 49, 1961, p. 1428.

Hunter, Jane, "The Application of Metadata Standards to Video Indexing" http://www.dtsc.edu.au/RDU/staff/jane-hunter/EuroDL/final.html (<12/24/98).

Hurtgen, B.; Buttgen, P., "Fractal approach to low rate video coding", *Proceedings of the SPIE—The International Society for Optical Engineering,* 2094(pt.1):120-31 (1993).

Hutheesing, H., "Interactivity for the passive", Forbes magazine Dec. 6, 1993 (@ Forbes Inc. 1993) (2 pages).

IEEE Communications Magazine; vol. 32, No. 5, May 1994 New York, N.Y., US, pp. 68-80, XP 000451097 Chang et al "An Open Systems Approach to Video on Demand".

IEEE-1394.

Iino et al., "An Object-Oriented Model for Spatio-Temporal Synchronization of Multimedia Information", May, 1994.

Information describing BroadVision One-to-One Application System: "Overview," p. 1; Further Resources on One-To-One Marketing, p. 1; BroadVision Unleashes the Power of the Internet with Personalized Marketing and Selling, pp. 1-3; Frequently Asked Questions, pp. 1-3; Products, p. 1; BroadVision One-To-One™, pp. 1-2; Dynamic Command Center, p. 1; Architecture that Scales, pp. 1-2; Technology, pp. 1; Creating a New Medium for Marketing and Selling BroadVision One-To-One and the World Wide Web a White Paper, pp. 1-15; http://www.broadvision.com (1996, January-March).

Information Network Institute, Carnegie Mellon University, Internet Billing Server, Prototype Scope Document, Oct. 14, 1993.

Information Processing 71, North-Holland Publishing Company (1972) pp. 1530-1533.

Ingemar J. Cox et al., "Target Testing and the Pic Hunter Bayesian Multimedia Retrieval System," Proc. of the 3d Forum on Research and Technology Advances in Digital Libraries, ADL '96, IEEE, pp. 66-75.

Intel Corporation, iPower Technology, Marketing Brochure, date unknown.

Intuit Corp. Quicken User's Guide, "Paying Bills Electronically", pp. 171-192; undated.

Ioka, M., "A Method of Defining the Similarity of Images on the Basis of Color Information", Bulletin Of The National Museum Of Ethnology Special Issue, pp. 229-244, No. 17, November 1992.

Irven, Judith H., et al., "Multi-Media Information Services: A Laboratory Study", IEEE Communications Magazine, vol. 26, No. 6, June, 1988, pp. 24-44.

Ishizuka, M., "Inference methods based on extended Dempster and Shafer's theory for problems with uncertainty/fuzziness", New Generation Computing, 1:159-168 (1983), Ohmsha, Ltd, and Springer Verlag.

Ishizuka, M., "Inference methods based on extended Dempster and Shafer's theory for problems with uncertainty/fuzziness", New Generation Computing, 1:159-168 (1983), Ohmsha, Ltd., and Springer Verlag.

ISO/IEC JTC1/SC29/WG11 N1733, MPEG97, July 1997, "MPEG-7 Context and Objectives (v.4—Stockholm)".

ISO/IEC JTC1/SC29/WG11 N1735, MPEG97, July 1997—Stockholm, "MPEG-7 Applications Document".

ISO/IEC JTC1/SC29/WG11 N1920, MPEG97, October 1997 "MPEG-7 Context and Objectives (v.5—Fribourg)".

ISO/IEC JTC1/SC29/WG11 N2460, MPEG98, October 1998 "MPEG-7 Context and Objectives (v.10—Atlantic City)".

ISO/IEC JTC1/SC29/WG11 N2461, MPEG98, October 1998—Atlantic City, "MPEG-7 Requirements".

ISO/IEC JTC1/SC29/WG11 N2462, MPEG98, October 1998—Atlantic City, "MPEG-7 Applications".

ISO/IEC JTC1/SC29/WG11 N2467, MPEG98, October 1998—Atlantic City, "MPEG-7 Content Set".

Iyengar et al., "Codes Designs for Image Browsing", 1994.

Jackel, L. D., H. P. Graf, J. S. Denker, D. Henderson and I. Guyon, "An Application of Neural Net Chips: Handwritten Digit Recognition," ICNN Proceeding, 1988, pp. II-107-15.

Jacobs, Charles E., Finkelstein, Adam, Salesin, David H., "Fast Multiresolution Image Querying", Department of Computer Science, University of Washington, Seattle Wash.

Jacobs, E. W., Y. Fisher and R. D. Boss. "Image Compression: A study of the Iterated Transform Method." *Signal Processing* 29, (1992) 25-263.

Jacquin, A., "Image Coding Based on a Fractal Theory of Iterated Contractive Image Transformations" p.18, January 1992 (Vol 1 Issue 1) of IEEE Trans on Image Processing.

Jacquin, A., "A Fractal Theory of Iterated Markov Operators with Applications to Digital Image Coding", PhD Thesis, Georgia Tech, 1989.

Jacquin, A., 'Fractal image coding based on a theory of iterated contractive image transformations', Proc. SPIE Visual Communications and Image Processing, 1990, pages 227-239.

Jacquin, A. E., 'A novel fractal block-coding technique for digital images', Proc. ICASSP 1990.

Jane Pauley Special, NBC TV News Transcript, Jul. 17, 1990, 10:00 PM.

Jean, J. S. N., et al., "Input Representation and Output Voting Considerations for Handwritten Numeral Recognition with Backpropagation", International Joint Conference on Neural Networks, Washington, D.C., January 1990, pp. 1-408 to 1-411.

Jeffrey, R. J., "The logic of decision", The University of Chicago Press, Ltd., London (1983) (2nd Ed.).

Jim Binkley & Leslie Young, Rama: An Architecture for Internet Information Filtering, Journal of Intelligent Information Systems: Integrating Artificial Intelligence and Database Technologies, vol. 5, No. 2, September 1995, pp. 81-99.

Jones, R., "Digital's World-Wide Web server: A case study," Computer Networks and ISDN Systems, vol. 27, No. 2, pp. 297-306 (November 1994).

JPL New Technology Report NPO-20213, Nasa Tech Brief Vol. 22, No. 4, Item #156 (April 1998).

Kato, T., "A Sketch Retrieval Method for Full Color Image Database-Query by Visual Example", IEEE, Publication No. 0-8186-2910-X/92, 1992, pp. 530-533.

Kato, T., "Intelligent Visual Interaction with Image Database Systems Toward the Multimedia Personal Interface", Journal Of Information Processing, vol. 14, No. 2, 1991, pp. 134-143.

Kato, T., et al, "A Cognitive Approach Interaction", International Conference Of Multimedia Information Systems, January, 1991, pp. 109-119.

Kato, T., et al, "Trademark: Multimedia Database with Abstracted Representation on Knowledge Base", Proceedings Of The Second International Symposium On Interoperable Information Systems, pp. 245-252, November 1988.

Kato, T., et al, "Trademark: Multimedia Image Database System with Intelligent Human Interface", System And Computers In Japan, 1990, pp. 33-46.

Kaufmann, A., "Introduction a la theorie des sous-ensembles flous", Vol. 1, 2 et 3-Masson-Paris (1975).

Kaye, Brian H: "A Random Walk Through Fractal Dimensions", VCH Verlagsgesellschaft, Weinheim, 1989.

Keeney, R. L., B. Raiffa, "Decisions with multiple objectives: Preferences and value tradeoffs", John Wiley and Sons, New York (1976).

Kellman, P., "Time Integrating Optical Signal Processing", Ph. D. Dissertation, Stanford University, 1979, pp. 51-55.

Kelly et al. "Efficiency Issues Related to Probability Density Function Comparison", SPIE vol. 2670, pp. 42-49 January 1996.

Kelly, P. M., et al. "Candid Comparison Algorithm for Navigating Digital Image Databases", Proceedings 7th International Working Conference on Scientific and Statistical Database Management, pp. 252-258, 1994.

Kim, D. H.; Caulfield, H. J.; Jannson, T.; Kostrzewski, A.; Savant, G, "Optical fractal image processor for noise-embedded targets detection", *Proceedings of the SPIE—The L International Society for Optical Engineering*, Vol: 2026 p. 144-9 (1993) (SPIE Conf: Photonics for Processors, Neural Networks, and Memories 12-15 Jul. 1993, San Diego, Calif., USA).

Kim, Y., "Chips Deliver Multimedia", Byte, December 1991, pp. 163-173.

Knowlton, K., "Virtual Pushbuttons as a Means of Person-Machine Interaction", Proc of Conf. Computer Graphics, Pattern Recognition and Data Structure, Beverly Hills, Calif., May 1975, pp. 350-352.

Koch, H., "Ergonomische Betrachtung von Schreibtastaturen", Humane Production, 1, pp. 12-15 (1985).

Kohonen, "Self-Organization & Memory", Second Ed., 1988, Springer-Verlag, pp. 199-209.

Kolson, Ann, "Computer wimps drown in a raging sea of technology", The Hartford Courant, May 24, 1989, B1.

Kortegaard, B. L., "PAC-MAN, a Precision Alignment Control System for Multiple Laser Beams Self-Adaptive Through the Use of Noise", Los Alamos National Laboratory, date unknown.

Kortegaard, B. L., "Superfine Laser Position Control Using Statistically Enhanced Resolution in Real Time", Los Alamos National Laboratory, SPIE-Los Angeles Technical Symposium, January 23-25, 1985.

Kraiss, K. F., "Alternative Input Devices For Human Computer Interaction", Forschunginstitut Für Anthropotecahnik, Werthhoven, F. R. Germany.

Kraiss, K. F., "Neuere Methoden der Interaktion an der Schnittstelle Mensch-Maschine", Z. F. Arbeitswissenschaft, 2, pp. 65-70, 1978.

Krajewski, M. et al, "Applicability of Smart Cards to Network User Authentication", Computing Systems, vol. 7, No. 1, 1994.

Krajewski, M., "Concept for a Smart Card Kerberos", 15th National Computer Security Conference, October 1992.

Krajewski, M., "Smart Card Augmentation of Kerberos, Privacy and Security Research Group Workshop on Network and Distributed System Security", February 1993.

Kraus, T. W., T. J. Myron, "Self-Tuning PID Controller Uses Pattern Recognition Approach", Control Engineering, pp. 106-111, June 1984.

Kreifeldt, J. G., "A Methodology For Consumer Product Safety Analysis", The 3rd National Symposium on Human Factors in Industrial Design in Consumer Products, August 1982, 175-184.

Kreifeldt, John, "Human Factors Approach to Medical Instrument Design", Electro/82 Proceedings, 3/3/1-3/3/6.

Ksienski et al., "Low Frequency Approach to Target Identification", Proc. of the IEEE, 63(12):1651-1660 (December 1975).

Kuo, C.-C. J. (ed), "Multimedia Storage and Archiving Systems", SPIE Proc. Vol. 2916 (Nov. 18-Nov. 22, 1996).

Kuocheng, Andy Poing, and Ellingstad, Vernon S., "Touch Tablet and Touch Input", Interface '87, 327.

Kurokawa, M., "An Approach to Retrieving Images by Using their Pictorial Features", IBM Research, Japan, September 1989.

Kyburg, H. E., "Bayesian and non Bayesian evidential updating", Artificial Intelligence 31:271-293 (1987).

Lampson, Butler; Abadi, Martin; Burrows, Michael; and Wobber, Edward; "Authentication in Distributed Systems: Theory and Practice"; ACM Transactions on Computer Systems; vol. 10, No. 4: November, 1992; pp. 265-310.

Landis, Sean, "Content-Based Image Retrieval Systems for Interior Design", http://www.tc.cornell.eduNisualization/Education/cs718/fal11995/landis/index.html.

Langton C G (ed): Artificial Life; Proceedings of the first international conference on Artificial life, Redwood City: Addison-Wessley (1989).

Lauwerier, Hans: "Fractals—Images of Chaos", Penguin Books, London, 1991.

LeCun, Y. et al., "Handwritten Digit Recognition: Applications of Neural.", IEEE Comm. Magazine, November 1989, pp. 41-46.

LeCun, Y., "Connectionism in Perspective", in R. Pfeifer, Z. Schreter, F. Fogelman, L. Steels (Eds.), 1989, "Generalization and Network Design Strategies", pp. 143-155.

Ledgard, Henry, Singer, Andrew, and Whiteside, John, Directions in Human Factors for Interactive Systems, New York, Springer-Verlag, 1981.

Lee et al., "Video Indexing—An Approach based on Moving Object and Track", Proceedings of Storage and Retrieval for Image and Video Databases, pp. 25-36. February 1993.

Lee, Denis, et al., "Query by Image Content Using Multiple Objects and Multiple Features: User Interface Issues," 1994 Int'l Conf. on Image Processing, IEEE, pp. 76-80.

Lee, E., "Similarity Retrieval Techniques", Pictorial Information Systems, Springer Verlag, 1980 pp. 128-176.

Lee, Eric, and MacGregor, James, "Minimizing User Search Time Menu Retrieval Systems", Human Factors, 27(2): 157-162 (April 1986).

Lee, S., et al, "2D C-string: A New Spatial Knowledge Representation for Image Database Systems", Pattern Recognition, vol. 23, 1990, pp. 1077-1087.

Lee, S., et al, "Similarity Retrieval of Iconic Image Database", Pattern Recognition. vol. 22, No. 6 1989, pp. 675-682.

Lee, S., et al, "Spatial Reasoning and Similarity Retrieval of Images Using 2D C-string Knowledge Representation", Pattern Recognition, 1992, pp. 305-318.

Lendaris, G. G., and Stanely, G. L., "Diffraction Pattern Sampling for Automatic Target Recognition", Proc. IEEE 58:198-205 (1979).

Leon, Carol Boyd, "Selling Through the VCR", American Demographics, December 1987, 40-43.

Li, H. Y., Y. Qiao and D. Psaltis, Applied Optics (April, 1993).

Liepins, G. E., M. R. Hilliard, "Genetic Algorithms: Foundations & Applications". Annals of Operations Research; 21:31-58 (1989).

Lin, H. K., et al., "Real-Time Screen-Aided Multiple-Image Optical Holographic Matched-Filter Correlator", Applied Optics, 21(18):3278-3286 (Sep. 15, 1982).

Liou, "Overview of the px64 kbit/s Video Coding Standard", Communications of the ACM, vol. 34, No. 4, April 1991, pp. 60-63.

Lippmann, R. P., "An Introduction to Computing with Neural Nets", IEEE ASSP Magazine, 4(2):4-22 (April 1987).

Liu, Y., "Extensions of fractal theory", *Proceedings of the SPIE—The International Society for Optical Engineering,* 1966:255-68(1993).

Liu, Y., "Pattern recognition using Hilbert space", *Proceedings of the SPIE—The International Society for Optical Engineering,* 1825:63-77 (1992).

Ljung, Lennart, & Torsten Soderstrom: "Theory and Practice of Recursive Identification", The MIT Press, Cambridge, Mass., 1983.

Ljung, Lennart: "System Identification; Theory for the User", Prentice-Hall Englewood Cliffs, N.J., 1987.

Lloyd, Sheldon G., & Gerald D Anderson: "Industrial Process Control", Fisher Controls Co., Marshalltown, 1971.

Loeb, S., "Architecting Personalized Delivery of Multimedia Information", Communications of the ACM, December 1992, vol. 35, No. 12, pp. 39-50.

Long, John, "The Effect of Display Format on the Direct Entry of Numerical Information by Pointing", Human Factors, 26(1):3-17 (February 1984).

Lu, C., "Computer Pointing Devices: Living With Mice", High Technology, January 1984, pp. 61-65.

Lu, C., "Publish It Electronically", Byte, September 1993, pp. 94-109.

Mackay et al., "Virtual Video Editing in Interactive Multimedia Applications", 1989.

Mahalanobis, A., et al., "Minimum Average Correlation Energy Filters", Applied Optics, 26(17):3633-40 (Sep. 1, 1987).

Makridakis, Spyros, & Steven Wheelwright: "The Handbook of Forecasting", John Wiley, New York, 1982.

Mandelbrot, Benoit: "Fractal Geometry of Nature", W H Freeman and Co., New York. 1983 (orig ed 1977).

Mandelbrot, Benoit: "Fractals—Form, Chance and Dimensions", W H Freeman and Co., San Francisco, 1977.

Manners, George, "Smart Screens: Development of Personal Navigation Systems for TV Viewers," Video Magazine, December 1993.

Marines, G., "Smart Screens", Video Magazine, December 1993) (2 Pages).

Mantei, Marilyn M., and Teorey, Toby J., "Cost/Benefit Analysis for Incorporating Human Factors in the Software Lifecycle", Association for Computing Machinery. 1988.

Maragos, P., "Tutorial Advances in Morphological Image Processing" Optical Engineering 26:7:623-632 (1987).

Mardia, K V, J T Kent & J M Bibby: "Multivariate Analysis", Academic Press, London, 1979.

Martin, G. L. et al., "Recognizing Hand-Printed Letters and Digits Using Backpropagation Learning", Technical Report of the MCC, Human Interface Laboratory, Austin, Tex., January 1990, pp. 1-9.

Martinez et al. "Imagenet: A Global Distribution Database for Color Image Storage and Retrieval in Medical Imaging Systems" IEEE, 1992, 710-719, May 1992.

Masahiro Morita & Yoichi Shinoda, Information Filtering Based on User Behavior Analysis and Best Match Text Retrieval. Proceedings of the Seventeenth Annual International ACM-SIGIR Conference on Research and Development in Information Retrieval, Dublin, Jul. 3-6, 1994, Pages Title Page (272)-281.

Mazel, D. S., "Fractal Modeling of Time-Series Data", PhD Thesis, Georgia Tech, 1991. (One dimensional, not pictures).

McAulay, A. D., J. C. Oh, "Image Learning Classifier System Using Genetic Algorithms", IEEE Proc. of the National Aerospace & Electronics Conference, 2:705-710 (1989).

McCauley, Joseph L.: "Chaos. Dymanics, and Fractals", Cambridge University Press, Cambridge, 1993.

McFadden, M., "The Web and the Cookie Monster," Digital Age, (1996, August).

Meads, Jon A., "Friendly or Frivolous", Datamation, Apr. 1, 1988, 98-100.

Medvinsy et al, "NetCash: A Design for Practical Electronic Currency on the Internet", Proc. 1st ACM Conf. on Comp. and Comm. Security, November 1993.

Medvinsy et al., "Electronic Currency for the Internet", Electronic Markets, pp. 30-31, September 1993.

Mehrotra, R., et al, "Shape Matching Utilizing Indexed Hypotheses Generation and Testing", IEEE Transactions On Robotics, vol. 5, No. 1, February 1989, pp. 70-77.

Meyer, J. A., Roitblat, H. L., Wilson, W. (eds.): From Animals to Animats. Proceedings of the Second International Conference on Simulation of Adaptive Behaviour. Cambridge, Mass.: MIT Press. (1991).

Middleton, G. V. ed., 1991, Nonlinear Dynamics, Chaos and Fractals, with Applications to Geological Systems. Geol. Assoc. Canada Short Course Notes Vol. 9 (available from the GAC at Memorial University of Newfoundland, St. John's NF AlB 3×5).

Miller et al., "News On-Demand for Multimedia Networks", ACM International Conference on Multimedia, Anaheim, Calif., 1-6, August 1993. pp. 383-392.

Miller, R. K., Neural Networks ((c) 1989: Fairmont Press, Lilburn, Ga.), pp. 2-12 and Chapter 4, "Implementation of Neural Networks", pp. 4-1 to 4-26.

Mills et al., "A Magnifier Tool for Video Data". Proceedings of ACM Computer Human Interface (CHI), May 3-7, 1992, pp. 93-98.

Mills, "Media Composition for Casual Users". 1992.

Minka, T., "An Image Database Browser that Learns from User Interaction", Masters Thesis, Massachusetts Institute of Technology; 1996; also appears as MIT Media Laboratory Technical Report 365.

Minneman et al., "Where Were We: making and using near-synchronous, pre-narrative video", Multimedia '93, pp. 1-11. December 1993.

Motley. P., "Implementing the Difference-Squared Error Algorithm Using An Acousto-Optic Processor", SPIE, 1098:232-239, (1989).

Motley, P., et al., "A High Dynamic Range Acousto-Optic Image Correlator for Real-Time Pattern Recognition", SPIE. 938:55-65 (1988).

Moloney, Daniel M.: Digital Compression in Todays Addressable Enviroment: 1993 NCTA Technical Papers; Jun. 6, 1993; pp. 308-316.

Monro D M and Dudbridge F, "Fractal block coding of images", Electronics Letters 28(11):1053-1054 (1992).

Monro D. M. & Dudbridge F. 'Fractal approximation of image blocks', Proc ICASSP 92, pp. III: 485-488.

Monro D. M. 'A hybrid fractal transform', Proc ICASSP 93, pp. V: 169-72.

Monro D. M., Wilson D., Nicholls J. A. 'High speed image coding with the Bath Fractal Transform', IEEE International Symposium on Multimedia Technologies Southampton. April 1993.

Moore, T. G. and Dartnall, "Human Factors of a Microelectronic Product: The Central Heating Timer/Programmer", Applied Ergonomics, 1983, 13(1):15-23.

Mori, "Towards the construction of a large-scale neural network", Electronics Information Communications Association Bulletin PRU 88-59, pp. 87-94.

Nadoli, Gajanana and Biegel, John, "Intelligent Agents in the Simulation of Manufacturing Systems", Proceedings of the SCS Multiconference on AI and Simulation, 1989.

Nagasaka et al., "Automatic Video Indexing and Full-Video Search for Object Appearances", Proceedings of the IFIP TC2/WG2.6 Second Working Conference on Visual Database Systems, North Holland, (Knuth et al., eds.), Sep. 30-Oct. 3, 1991, pp. 113-127, January 1992.

Naik et al., "High Performance Speaker Verification.", ICASSP 86, Tokyo, CH2243-4/86/0000-0881, IEEE 1986, pp. 881-884.

National Westminster Bank Group Brochure; pp. 1-29; undated.

Needham, Roger M. and Schroeder, Michael D.; "Using Encryption for Authentication in Large Networks of Computers": Communications of the ACM; vol. 21, No. 12; December, 1978; pp. 993-999.

Needham, Roger M.; "Adding Capability Access to Conventional File Servers"; Xerox Palo Alto Research Center; Palo Alto, Calif.

Negandaripour, S., et al "Challenges in Computer Vision: Future Research Direction", IEEE Transactions On Systems, Man And Cybernetics, pp. 189-199, 1992, at Conference on Computer Vision and Pattern Recognition.

Netravali, Arun N., and Haskell, Barry G., "Digital Pictures Representation and Compression", Plenum Press, New York (1988).

Newman, B. C., "Proxy-Based Authorization and Accounting for Distributed Systems", Proc. 13th Int. Conf. on Dist. Comp. Sys., May 1993.

NewMedia, November/December 1991, p. 69.

Ney. H., et al., "A Data Driven Organization of the Dynamic Programming Beam Search for Continuous Speech Recognition", Proc. ICASSP 87, pp. 833-836, 1987.

Niblack, W. et al., "The QBIC Project: Querying Images by Content Using Color, Texture, and Shape", IBM Computer Science Research Report, pp. 1-20 (Feb. 1, 1993).

Niblack, W., et al, "Find me the Pictures that Look Like This: IBM'S Image Query Project", Advanced Imaging, April 1993, pp. 32-35.

Niblack, W., R. Barber, W. Equitz, M. Flickner, E. Glasman, D. Petkovic, P. Yanker, and C. Faloutsos. The QBIC project: Querying images by content using color, texture. and shape. In Storage and Retrieval for Image and Video Databases, volume SPIE Vol. 1908, February 1993.

Nilsson, B. A., "Microsoft Publisher is an Honorable Start for DTP Beginners", Computer Shopper, February 1992, vol. 12, Issue 2, p. 426, evaluates Microsoft Publisher and Page Wizard.

Nilsson, N. J., The Mathematical Foundations of Learning Machines ((c) 1990: Morgan Kaufmann Publishers, San Mateo, Calif.) and particularly section 2.6 "The Threshold Logic Unit (TLU)", pp. 21-23 and Chapter 6, "Layered Machines" pp. 95-114.

Norman, D. A., Fisher, D., "Why Alphabetic Keyboards Are Not Easy To Use: Keyboard Layout Doesn't Much Matter", Human Factors 24(5), pp. 509-519 (1982).

Norman, Donald A., "Infuriating By Design", Psychology Today, 22(3):52-56 (March 1988).

Norman, Donald A., The Psychology of Everyday Things, New York, Basic Book, Inc. 1988.

Novak et al., "Anatomy of a Color Histogram", Proceeding of Computer Vision and Pattern Recognition, Champaign, Ill., June 1992, pp. 599-605.

Nussbaumer et al., "Multimedia Delivery on Demand: Capacity Analysis and Implications", Proc 19th Conference on Local Computer Networks, 2-5 Oct. 1994, pp. 380-386.

O'Connor, Rory J., "Apple Banking on Newton's Brain", San Jose Mercury News, Wednesday, Apr. 22, 1992.

O'Docherty, M. H., et al, "Multimedia Information System—The Management and Semantic Retrieval of all Electronic Data Types", The Computer Journal, vol. 34, No. 3, 1991.

Ohsawa, I. and Yonezawa, A., "A Computational Model of an Intelligent Agent Who Talks with a Person", Research Reports on Information Sciences, Series C, April 1989, No. 92, pp. 1-18.

Ohsuga et al, "Entrainment of Two Coupled van der Pol Oscillators by an External Oscillation", Biological Cybernetics, 51:225-239 (1985).

Oien, G. E., S. Lepsoy & T. A. Ramstad, 'An inner product space approach to image coding by contractive transformations', Proc. ICASSP 1991, pp 2773-2776.

Okada, Y., et al., "An Image Storage and Retrieval System for Textile Pattern Adaptable to Color Sensation of the Individual", Trans. Inst. Elec. Inf. Comm., vol. J70D, No. 12, pp. 2563-2574, December 1987 (Japanese w/English Abstract).

Okamoto et al; "Universal Electronic Cash", pp. 324-337; 1991.

Omata et al. "Holonic Model of Motion Perception", IEICE Technical Reports. Mar. 26, 1988, pp. 339-346.

O'Neal et al., "Coding Isotropic Images", November 1977, pp. 697-707.

Ono, Atsushi, et al., "A Flexible Content-Based Image Retrieval System with Combined Scene Description Keyword," Proc. of Multimedia '96, IEEE, pp. 201-208.

Optical Engineering 28:5 (May 1988)(Special Issue on product inspection).

Page, G F, J B Gomm & D Williams: "Application of Neural Networks to Modelling and Control", Chapman & Hall, London, 1993.

Pandit, S. M., & S. M. Wu, "Timer Series & System Analysis with Applications", John Wiley & Sons, Inc., NY (1983) pp. 200-205.

Pawlicki. T. F., D. S. Lee, J. J. Hull and S. N. Srihari, "Neural Network Models and their Application to Handwritten Digit Recognition," ICNN Proceeding, 1988, pp. 11-63-70.

Pazzani, M. et al., "Learning from hotlists and coldlists: Towards a WWW Information Filtering and Seeking Agent," Proceedings International Conference on Tools with Artificial Intelligence, January 1995, pp. 492-495.

Pecar, Branko: "Business Forecasting for Management", McGraw-Hill Book Co., London, 1994.

Peitgen, Heinz-Otto, & Deitmar Saupe: "The Science of Fractal Images". Springer-Verlag, New York, 1988.

Peitgen, Heinz-Otto, Hartmut Jurgens & Deitmar Saupe: "Fractals for the Classroom", Springer-Verlag, 1992.

Perry et al., "Auto-Indexing Storage Device", IBM Tech. Disc. Bulletin, 12(8):1219 (January 1970).

Perspectives: High Technology 2, 1985.

Peters: "Chaos and Order in the Capital Markets", Wiley, 1991. Gershenfeld & Weigend: "The Future of Time Series", Addison-Wesley, 1993.

Peterson, Ivars, "Packing It In-Fractals.", Science News, 131(18):283-285 (May 2, 1987).

Peterson, Ivars: "The Mathematical Tourist", W H Freeman, New York, 1988.

Petrakis, E. G. M., and C. Faloutsos. Similarity searching in large image databases. Technical Report 3388, Department of Computer Science, University of Maryland, 1995.

Pettit, Frank: "Fourier Transforms in Action", Chartwell-Bratt, Lund, 1985.

Pfitzmann et al; "How to Break and Repair a Provably Secure Untraceable Payment System"; pp. 338-350; 1991.

Phillips, "MediaView: a general multimedia digital publication system", Comm. of the ACM, v. 34, n. 7, pp. 75-83. July 1991.

Picard et al. "Finding Similar Patterns in Large Image Databases", IEEE, 1993, pp. 161-164, April 1993.

Picard, R. W., et al, "finding Similar Patterns in Large Image Databases", IEEE ICASSP, Minneapolis, Minn., vol. V, pp. 161-164, April 1993: also appears in MIT Media Laboratory Technical Report No. 205.

Pickover, Cliff, Visions of the Future: Art, Technology, and Computing in the 21st Century (St. Martin's Press).

Pickover, Cliff, Chaos in Wonderland: Visual Adventures in a Fractal World (St. Martin's Press).

Pickover, Cliff. Computers and the Imagination (St. Martin's Press).

Pickover, Cliff, Computers, Pattern, Chaos, and Beauty (St. Martin's Press).

Pickover, Cliff, Frontiers of Scientific Visualization (Wiley).

Pickover, Cliff, Mazes for the Mind: Computers and the Unexpected (St. Martin's Press).

Pickover, Cliff, Spiral Symmetry (World Scientific).

Pizano, A., et al, "Communicating with Pictorial Databases", Human-Machine Interactive Systems, pp. 61-87, Computer Science Dept, UCLA. 1991.

Platte, Hans-Joachim, Oberjatzas, Gunter, and Voessing, Walter. "A New Intelligent Remote Control Unit for Consumer Electronic Device", IEEE Transactions on Consumer Electronics, Vol. CE-31(1):59-68 (February 1985).

Poor, Alfred, "Microsoft Publisher", PC Magazine, Nov. 26, 1991. vol. 10, Issue 20, p. 40, evaluates Microsoft Publisher.

Port, Otis, "Wonder Chips-How They'll Make Computing Power Ultrafast and Ultracheap", Business Week, Jul. 4, 1994, pp. 86-92.

Press, William H. et al, "Numerical Recipes in C The Art of Scientific Computing", Cambridge University Press, 1988.

Price, R., et al., "Applying Relevance Feedback to a Photo Archival System", Journal of Information Science 18, pp. 203-215 (1992).

Priebe, C. E.; Solka, J. L.; Rogers, G. W., "Discriminant analysis in aerial images using fractal based features", *Proceedings of the SPIE—The International Society for Optical Engineering,* 1962:196-208(1993).

PRNewswire, information concerning the PointCast Network (PCN) (1996 Feb. 13) p. 213.

Proakis, John G., Digital Communications, McGraw-Hill (1983).

Proceedings of the IEEE, vol. 82, No. 4, April 1994 New York, N.Y., US, pp. 585-589, XP 000451419 Miller "A Scenario for the Deployment of Interactive Multimedia Cable Television Systems in the United States in the 1990's".

Proceedings, 6th International Conference on Pattern Recognition 1982, pp. 152-136.

Psaltis, D., "Incoherent Electro-Optic Image Correlator", Optical Engineering, 23(1):12-15 (January/February 1984).

Psaltis, D., "Two-Dimensional Optical Processing Using One-Dimensional Input Devices", Proceedings of the IEEE, 72(7):962-974 (July 1984).

Quinell, Richard A., "Web Servers in embedded systems enhance user interaction", EDN, Apr. 10, 1997, pp. 61-68.

Raggett, D., "A review of the HTML+document format," Computer Networks and ISDN Systems, vol. 27, No. 2, pp. 35-145 (November 1994).

Rahmati, M.; Hassebrook, L. G., "Intensity- and distortion-invariant pattern recognition with complex linear morphology", *Pattern Recognition,* 27 (4):549-68(1994).

Rampe, Dan, et al. In a Jan. 9, 1989 news release, Claris Corporation announced two products, SmartForm Designer and SmartForm Assistant, which provide "Intelligent Assistance", such as custom help messages, choice lists, and data-entry validation and formatting.

Rangan et al., "A Window-based Editor for Digital Video and Audio". January 1992.

Rao et al., *Discrete Cosine Transform—Algorithms, Advantages, Applications*, Academic Press. Inc., 1990.

Ratcliffe, Mitch and Gore, Andrew, "Intelligent Agents take U.S. Bows.", MacWeek, Mar. 2, 1992, vol. 6, No. 9, p. 1.

Ravichandran, G. and Casasent, D., "Noise and Discrimination Performance of the MINACE Optical Correlation Filter", Proc. SPIE Technical Symposium, April 1990. Orlando Fla., 1471 (1990).

Reimer, "Memories in my Pocket", Byte, pp. 251-258, February 1991.

Reiss, "The Revised Fundamental Theorem of Moment Invariants", IEEE Transactions on Pattern Analysis and Machine Intelligence, vol. 13, No. 8. August 1991, pp. 830-834.

Reitman, Edward: "Exploring the Geometry of Nature", Windcrest Books, Blue Ridge Summit, 1989.

Reusens. E., "Sequence coding based on the fractal theory of iterated transformations systems", *Proceedings of the SPIE—The International Society for Optical Engineering*, 2094(pt.1):132-40(1993).

Rhodes. W., "Acousto-Optic Signal Processing: Convolution and Correlation", Proc. of the IEEE, 69(1):65-79 (January 1981).

Richards et al., "The Interactive Island". IEE Rev ies, July/August 1991 pp. 259-263.

Richards J., and Casasent, D., "Real Time Hough Transform for Industrial Inspection" Proc. SPIE Technical Symposium, Boston 1989 1192:2-21 (1989).

Rivest. R.; "The MD5 Message-Digest Algorithm"; MIT Laboratory for Computer Science and RSA Data Security, Inc.; April, 1992.

Rivest. R. L. et al., "A Method for Obtaining Digital Signatures and Public-Key Cryptosystems," Laboratory for Computer Science, Massachusetts Institute of Technology. Cambridge, Mass.

Rivest; Shamir, "PayWord and MicroMint: Two Simple Micropayment Schemes" (May 7, 1996).

Rivest, R. L.; Shamir, A. & Adleman, L.; "A Method for Obtaining Digital Signatures and Public-Key Cryptosystems", Communications of the ACM, February 1978, vol. 21, No. 2, pp. 120-126.

Robinson, G., and Loveless, W., "Touch-Tone' Teletext—A Combined Teletext-Viewdata System," IEEE Transactions on Consumer Electronics, vol. CE-25, No. 3, July 1979, pp. 298-303.

Rogus, John G. and Armstrong, Richard, "Use of Human Engineering Standards in Design", Human Factors, 19(1): 15-23 (February 1977).

Rohrer, C., & Clay Nesler, "Self-Tuning Using a Pattern Recognition Approach", Johnson Controls, Inc., Research Brief 228 (Jun. 13, 1986).

Roizen, Joseph, "Teletext in the USA," SMPTE Journal, July 1981, pp. 602-610.

Rosch, Winn L., "Voice Recognition: Understanding the Master's Voice", PC Magazine. Oct. 27, 1987, 261-308.

Rose, D. E.; Mander, R.; Oren, T.; Ponceleon, D. B.; Salomon, G. & Wong, Y. Y. "Content Awareness in a File System Interface Implementing the 'Pile' Metaphor for Organizing Information", 16 Ann. Int'l SIGIR '93, ACM, pp. 260-269.

Rosenfeld, Azriel and Avinash C. Kak, Digital Picture Processing, Second Edition, Volume 2, Academic Press, 1982.

Roy, B., "Classements et choix en presence de points de vue multiples", R.I.R.O.-2eme annee-no. 8, pp. 57-75 (1968).

Roy, B., "Electre III: un algorithme de classements fonde sur une representation floue des preferences en presence de criteres multiples", Cahiers du CERO, 20(1):3-24 (1978).

Rui, Yong, Huang, Thomas S., Chang, Shih-Fu, "Image Retrieval: Past Present and Future".

Rui. Yong. Huang, Thomas S., Mehotra, Sharad, "Browsing and retrieving Video Content in a Unified Framework".

Rui, Yong, Huang, Thomas S., Ortega, Michael, Mehotra, Sharad, "Relevance Feedback: A Power Tool for Interactive Content-Based Image Retrieval".

Rumelhart, D. E., & James L McClelland, Parallel Distributed Processing, Explorations in Microstructure of Cognition, vol. 1, (1986: MIT Press, Cambridge, Mass.). and specifically Chapter 8 thereof, "Learning Internal Representations by Error Propagation", pp. 318-362.

Rutherford, H. G., F. Taub and B. Williams, "Object Identification and Measurement from Images with Access to the Database to Select Specific Subpopulations of Special Interest", May 1986.

Rutter et al., "The Timed Lattice-A New Approach To Fast Converging Equalizer Design", pp. VIII/1-5 (Inspec. Abstract No. 84C044315, lnspec IEE (London) & IEE Saraga Colloquium on Electronic Filters, May 21, 1984).

Sadjadi, F., "Experiments in the use of fractal in computer pattern recognition", *Proceedings of the SPIE—The International Society for Optical Engineering*, 1960:214-22 (1993).

Sakoe, H., "A Generalization of Dynamic Programming Based Pattern Matching Algorithm Stack DP-Matching", Transactions of the Committee on Speech Research, The Acoustic Society of Japan, p. S83-23, 1983.

Sakoe, H., "A Generalized Two-Level DP-Matching Algorithm for Continuous Speech Recognition", Transactions of the IECE of Japan, E65(11):649-656 (November 1982).

Salomon et al, "Using Guides to Explore Multimedia Databases", PROC of the Twenty-Second Annual Hawaii International Conference on System Sciences. vol. IV, 3-6 Jan. 1989, pp. 3-12 vol. 4. Jan. 6, 1989.

Salton, G., "Developments in Automatic Text Retrieval", Science, vol. 253, pp. 974-980, Aug. 30, 1991.

Samet, H., The quadtree and related hierarchical data structures. ACM Computing Surveys, 16(2):187-260, 1984.

Sarver, Carleton, "A Perfect Friendship", High Fidelity, 39:42-49 (May 1989).

Schamuller-Bichl, I., "IC-Cards in High-Security Applications", in Selected Papers from the Smart Card 2000 Conference, Springer Verlag, 1991, pp. 177-199.

Scharlic, A., "Decider sur plusieurs criteres. Panorama de l'aide a la decision multicritere" Presses Polytechniques Romandes (1985).

Schied, Francis,"Shaum's Outline Series-Theory & Problems of Numerical Analysis", McGraw-Hill Book Co., NY (1968) pp. 236, 237, 243, 244, 261.

Schmitt, Lee, "Let's Discuss Programmable Controllers", Modern Machine Shop. May 1987, 90-99.

Schniederman, Ben, Designing the User Interface: Strategies for Effective Human-Computer Interaction, Reading, Mass., Addison-Wesley, 1987.

Schroeder, M., *Fractals, Chaos, Power Laws*, W.H. Freeman & Co., New York (1991).

Schurmann, J., "Zur Zeichen and Worterkennung beim Automatischen Anschriftenlesen", Wissenschaftlichl, Berichte, 52(1/2) (1979).

Scientific American; "Not Just a Pretty Face"; March 1990, pp. 77-78.

Seborg, D. E., T. F. Edgar, & D. A. Mellichamp, "Process Dynamics and Control", John Wiley & Sons, NY (1989) pp. 294-307, 538-541.

Shafer, G., "A mathematical theory of evidence", Princeton University Press, Princeton. N.J. (1976).

Shann et al. "Detection of Circular Arcs for Content-Based Retrieval from an Image Database" IEE Proc.-Vis. Image Signal Process, vol. 141, No. 1. February 1994, pp. 49-55.

Shardanand, Upendra, "Social Information Filtering for Music Recommendation" September 1994, pp. 1-93, Massachusetts Institute of Technology, Thesis.

Sharif Heger, A. and Koen, B. V., "KNOWBOT: an Adaptive Data Base Interface", Nuclear Science and Engineering, February 1991, vol. 107, No. 2, pp. 142-157.

Sharpless, "Subscription teletext for value added services", August 1985.

Shepard, J. D., "Tapping the Potential of Data Compression", Military and Aerospace Electronics, May 17, 1993, pp. 25-27.

Sheth et al., "Evolving Agents for Personalized Information Filtering". 1-5 Mar. 1993, pp. 345-352.

Sheth, B. & Maes, P. "Evolving Agents For Personalized Information Filtering", Proc. 9th IEEE Conference, 1993 pp. 345-352.

Shimizu et al, "Principle of Holonic Computer and Holovision", Journal of the Institute of Electronics. Information and Communication, 70(9):921-930 (1987).

Shinan et al., "The Effects of Voice Disguise.", ICASSP 86. Tokyo, CH2243-4/86/0000-0885, IEEE 1986, pp. 885-888.

Silverston et al., "Spectral Feature Classification and Spatial Pattern Rec.", SPIE 201:17-26, Optical Pattern Recognition (1979).

Simpson, W. R., C. S. Dowling, "WRAPLE: The Weighted Repair Assistance Program Learning Extension", IEEE Design & Test, 2:66-73 (April 1986).

Sincoskie, W. D. & Cotton C. J. "Extended Bridge Algorithms for Large Networks", IEEE Network, January 1988-vol. 2, No. 1, pp. 16-24.

Sirbu, Marvin A.; Internet Billing Service Design And Prototype Implementation; pp. 1-19; An Internet Billing Server.

Smith et al., "A New Family of Algorithms for Manipulating Compressed Images", IEEE Computer Graphics and Applications, 1993.

Smith, J. et al., "Quad-Tree Segmentation for Texture-Based Image Query" Proceeding ACM Multimedia 94, pp. 1-15, San Francisco, 1994.

Smith, J. R., and S.-F. Chang. Querying by color regions using the VisualSEEk content-based visual query system. In M. T. Maybury, editor, Intelligent Multimedia Information Retrieval. IJCAI, 1996.

Smith, J. R., and S.-F. Chang. Tools and techniques for color image retrieval. In Symposium on Electronic Imaging: Science and Technology—Storage & Retrieval for Image and Video Databases IV, volume 2670, San Jose, Calif., February 1996. IS&T/SPIE.

Smith, Sidney J., and Mosier, Jane N., Guidelines for Designing User Interface Software. Bedford, Mass., MITRE, 1986.

Smoliar, S. et al., "Content-Based Video Indexing and Retrieval", IEEE Multimedia, pp. 62-72 (Summer 1994).

Society for Worldwide Interbank Financial Telecommunications S.C., "A.S.W.I.F.T. Overview", undated.

Soffer, A., and H. Samet. Retrieveal by content in symbolic-image databases. In Symposium on Electronic Imaging: Science and Technology—Storage & Retrieval for Image and Video Databases IV, pages 144-155. IS&T/SPIE, 1996.

Soviero, Marcelle M., "Your World According to Newton". Popular Science, September 1992, pp. 45-49.

Specht, IEEE Internatl. Conf. Neural Networks, 1:1525-1532 (July 1988), San Diego, Calif.

Sperling, Barbara Bied, Tullis Thomas S., "Are You a Better 'Mouser' or "Trackballer"? A Comparison of Cursor—Positioning Performance", An Interactive/Poster Session at the CHI+GI'87 Graphics Interface and Human Factors in Computing Systems Conference.

Sprageu, R. A., "A Review of Acousto-Optic Signal Correlators", Optical Engineering, 16(5):467-74 (September/October 1977).

Sprinzak, J.; Werman, M., "Affine point matching". Pattern Recognition Letters, 15(4):337-9(1994).

Stanchev, P., et al, "An Approach to Image Indexing of Documents". Visual Database Systems, II, 1992, pp. 63-77.

Stanley R. Sternberg, "Biomedical Image Processing", IEEE Computer, 1983, pp. 22-34.

Stark, J., "Iterated function systems as neural networks", Neural Networks, Vol 4, pp 679-690, Pergamon Press, 1991.

Stevens, "Next Generation Network and Operating System Requirements for Continuous Time Media", in Herrtwich (Ed.), Network and Operating System Support for Digital Audio and Video, pp. 197-208, November 1991.

Stewart, R. M., "Expert Systems For Mechanical Fault Diagnosis", IEEE, 1985, pp. 295-300.

Streeter, L. A., Ackroff, J. M., and Taylor, G. A. "On Abbreviating Command Names", The Bell System Technical Journal, 62(6):1807-1826 (July/August 1983).

Stricker, M., and A. Dimai. Color indexing with weak spatial constraints. In Symposium on Electronic Imaging: Science and Technology—Storage & Retrieval for Image and Video Databases IV, pages 29-41. IS&T/SPIE, 1996.

Stricker, M., and M. Orengo. Similarity of color images. In Storage and Retrieval for Image and Video Databases III, volume SPIE Vol. 2420, February 1995.

Sugeno, M., "Theory of fuzzy integrals and its applications", Tokyo Institute of Technology (1974).

Svetkoff et al.; Hybrid Circuits (GB), No. 13, May 1987: pp. 5-8.

Swain et al., "Color Indexing", International Journal of Computer Vision, vol. 7. No. 1, 1991, pp. 11-32.

Swanson, David, and Klopfenstein, Bruce, "How to Forecast VCR Penetration", American Demographic, December 1987, 44-45.

Tak W. Yan & Hector Garcia-Molina, SIFT-A Tool for Wide-Area Information Dissemination, 1995 USENIX Technical Conference, New Orleans, La., January 16-20, pp. 177-186.

Tamura, H., et al, "Image Database Systems: A Survey", Pattern Recognition, vol. 17. No. 1, 1984, pp. 29-34.

Tamura, H., et al., "Textural Features Corresponding to Visual Perception," IEEE Transactions on System, Man, and Cyb., vol. SMC-8, No. 6. pp. 460-473 (1978).

Tanaka, S., et al, "Retrieval Method for an Image Database based on Topological Structure", SPIE, vol. 1153, 1989, pp. 318-327.

Tanton, N. E., "UK Teletext—Evolution and Potential," IEEE Transactions on Consumer Electronics, vol. CE-25, No. 3, July 1979, pp. 246-250.

TCC Tech Facts, Vols. I-4, (www.wgbh.org, rev. 9/95).

Television Decoder Circuitry Act of 1990. and Section 305 of the Telecommunications Act of 1996, and FCC regulations.

Tello, Ernest R., "Between Man And Machine", Byte, September 1988, 288-293.

Tenenbaum, Jay M. and Schiffman, Allan M.: "Development of Network Infrastructure and Services for Rapid Acquisition"; adapted from a white paper submitted to DARPA by MCC in collaboration with EIT and ISI.

Thomas, John, C., and Schneider, Michael L., Human Factors in Computer Systems, New Jersey, Ablex Publ. Co., 1984.

Thomas, William L., "Electronic Program Guide Applications—The Basics of System Design", 1994 NCTA Technical Papers, pp. 15-20.

Tonomura et al., "Content Oriented Visual Interface Using Video Icons for Visual Database Systems", Journal of Visual Languages and Computing (1990) 1, pp. 183-198.

Tonomura et al., "VideoMAP and VideoSpaceIcon: Tools for Anatomizing Video Content", Inter CHI'93 Conference Proceedings, Amsterdam, The Netherlands, 24-29 Apr. 1993. pp. 131-136.

Tortora, G., et al, "Pyramidal Algorithms", Computer Vision, Graphics and Images Processing, 1990, pp. 26-56.

Trachtenberg, Jeffrey A., "How do we confuse thee? Let us count the ways", Forbes. Mar. 21, 1988, 159-160.

Training Computers To Note Images, New York Times, Apr. 15, 1992.

Turcotte, Donald L., 1992, Fractals and Chaos in Geology and Geophysics. Cambridge U.P.

TV Communications Advertisement for MSI Datacasting Systems, January 1973.

Tyldesley, D. A., "Employing Usability Engineering in the Development of Office Products", The Computer Journal", 31(5):431-436 (1988).

Udagawa, K., et al, "A Parallel Two-Stage Decision Method for Statistical Character Recognition.", Electronics and Communications in Japan (1965).

Ueda et al., "Automatic Structure Visualization for Video Editing", InterCHI'93 Conference Proceedings, Amsterdam, The Netherlands, 24-29 Apr. 1993, pp. 137-141.

Ueda et al., "Impact: An Interactive Natural-Motion-Picture Dedicated Multimedia Authoring System", Proceedings of Human Factors in Computing Systems (CHI 91), New Orleans, La., Apr. 27-May 2, 1991, pp. 343-350.

van den Boom, Henrie: An Interactive Videotex System for Two-Way CATV Networks; AEU, Band 40; 1986; pp. 397-401.

Vander Lugt, A., "Practical Considerations for the Use of Spatial Carrier-Frequency Filters", Applied Optics, 5(11): 1760-1765 (November 1966).

Vander Lugt, A., "Signal Detection By Complex Spatial Filtering", IEEE Transactions On Information Theory, IT-10, 2:139-145 (April 1964).

Vander Lugt, A., et al.; "The Use of Film Nonlinearites in Optical Spatial Filtering"; Applied Optics; 9(1):215-222 (January 1970).

Vannicola et al, "Applications of Knowledge based Systems to Surveillance", Proceedings of the 1988 IEEE National Radar Conference. 20-21 Apr. 1988, pp. 157-164.

Varela, F. J., and P. Bourgine (eds.): Proceedings of the first European Conference on Artificial Life. Cambridge, Mass.: MIT Press. (1991).

Verplank, William L., "Graphics in Human-Computer Communication: Principles of Graphical User-Interface Design", Xerox Office Systems.

Vitols, "Hologram Memory for Storing Digital Data", IBM Tech. Disc. Bulletin 8(11):1581-1583 (April 1966).

Vittal, J., "Active Message Processing: Message as Messengers", pp. 175-195: 1981.

Voydock, Victor et al.: "Security Mechanisms in High-Level Network Protocols": Computing Surveys; vol. 15, No. 2; June 1981.

Voyt, Carlton F., "PLC's Learn New Languages", Design News, Jan. 2, 1989, 78.

Vrscay, Edward R. "Iterated Function Systems: Theory, Applications, and the Inverse Problem." *Fractal Geometry and Analysis*, J. Belair and S. Dubuc (eds.) Kluwer Academic, 1991, 405-468.

Wachman, J., "A Video Browser that Learns by Example", Masters Thesis, Massachusetts Institute of Technology; 1996; also appears as MIT Media Laboratory Technical Report No. 383.

Wakimoto, K., et al, "An Intelligent User Interface to an Image Database using a Figure interpretation Method", IEEE Publication No. CH2898-5/90/0000/0516, 1990, pp. 516-520.

Wald; Sequential Analysis; Dover Publications Inc., 1947; pp. 34-43.

Wallace, "The JPEG Still Picture Compression Standard", Communications of the ACM, vol. 34, No. 4, April 1991, pp. 31-44.

Wasserman, Philip D., "Neural Computing-Theory & Practice", 1989, pp. 128-129.

Weber et al., "Marquee: A Tool for Real-Time Video Logging", CHI '94. April 1994.

Weber, Thomas E., "Software Lets Marketers Target Web Ads," The Wall Street Journal, Apr. 21, 1997

Weiman, Liza and Moran, Tom, "A Step toward the Future". Macworld, August 1992, pp. 129-131.

Weshsler, H. Ed., "Neural Nets For Human and Machine Perception", Academic Press, New York (1991).

Whitefield, A. "Human Factors Aspects of Pointing as an Input Technique in Interactive Computer Systems", Applied Ergonomics, June 1986, 97-104.

Wiedenbeck, Susan, Lambert, Robin, and Scholtz, Jean, "Using Protocol Analysis to Study the User Interface", Bulletin of the American Society for Information Science, June/July 1989, 25-26.

Wilf, Itzhak, "Computer, Retrieve For Me the Video Clip of the Winning Goal", Advanced Imaging, August 1998, pp. 53-55.

Wilke, William, "Easy Operation of Instruments by Both Man and Machine". Electro/82 Proceedings, 3/2/1-3/2/4.

Willett, P., "Recent Trends in Hierarchic Document Clustering: A Critical Review", Information Processing & Management, vol. 24, No. 5, pp. 557-597, 1988

Willshaw et al., "Non-Holographic Associative Memory", Nature, 222:960-962 (Jun. 7, 1969).

Woolsey, K., "Multimedia Scouting", IEEE Computer Graphics And Applications, July 1991 pp. 26-38.

Yager, R. R., "Entropy and specificity in a mathematical theory of Evidence". hit. J. General Systems; 9:249-260 (1983).

Yamada et. al., "Character recognition system using a neural network", Electronics Information Communications Association Bulletin PRU 88-58, pp. 79-86.

Yamamoto, A., et al, "Extraction of Object Features from Image and its Application to Image Retrieval", IEEE 9th International Conference On Pattern Recognition. vol. 2, 1988, 988-991.

Yamamoto, A., et al, "Image Retrieval System Based on Object Features". IEEE. Publication No. CH2518-9/87/0000-0132, 1987, pp. 132-134.

Yamamoto, A., et al., "Extraction of Object Features and Its Application to Image Retrieval", Trans. of IEICE, vol. E72, No. 6, 771-781 (June 1989).

Yamane et al., "An Image Data Compression Method Using Two-Dimensional Extrapolative Prediction-Discrete Sine Transform", Oct. 29-31, 1986, pp. 311-316.

Yan et al., "Index Structures for Information Filtering Under the Vector Space Model", PROC the 10th International Conference on Data Engineering, pp. 14-18 of DRD203RW User's Manual relating to the DSS Digital System.

Yan, T. W. and Garcia-Molina, H., "SIFT-A Tool for Wide-Area Information Dissemination," Paper presented at the USENIX Technical Conference, New Orleans, La. (1995, January), pp. 177-186.

Yoder, Stephen Kreider, "U.S. Inventors Thrive at Electronics Show", The Wall Street Journal, Jan. 10, 1990, B1.

Yoshida, J., "The Video-on-demand Demand", Electronic Engineering Times, Mar. 15, 1993, pp. 1, 72.

Yoshida, Y., et al, "Description of Weather Maps and Its Application to Implementation of Weather Map Database", IEEE 7th International Conference On Pattern Recognition, 1984, pp. 730-733.

Zadeh, L. A., "Fuzzy sets as a basis for a theory of possibility", Fuzzy sets and Systems 1:3-28 (1978).

Zadeh, L. A., "Fuzzy sets", Information and Control, 8:338-353 (1965).

Zadeh, L. A., "Probability measures of fuzzy events", Journal of Mathematical Analysis and Applications, 23:421-427 (1968).

Zeisel, Gunter, Tomas, Philippe, Tomaszewski, Peter, "An Interactive Menu-Driven Remote Control Unit for TV-Receivers and VC-Recorders", IEEE Transactions on Consumer Electronics, 34(3):814-818.

Zenith Starsight Telecast brochure, (1994).

Zhang et al., "Developing Power Tools for Video Indexing and Retrieval". Proceedings of SPIE Conference on Storage and Retrieval for Image and Video Databases. San Jose, Calif., 1994.

Zhang, X., et al, "Design of a Relational Image Database Management System: IMDAT", IEEE Publication No. TH0166-9/87/0000-0310, 1987, pp. 310-314.

Zhi-Yan Xie; Brady, M., "Fractal dimension image for texture segmentation", ICARCV '92. Second International Conference on Automation, Robotics and Computer Vision, p. CV-4.3/1-5 vol. 1, (1992).

Zhu, X., et al., "Feature Detector and Application to Handwritten Character Recognition", International Joint Conference on Neural Networks, Washington. D.C., January 1990. pp. 11-457 to 11-460.

Zhuang, Yueting, Rui, Yong, Huang, Thomas S., Mehotra, Sharad, "Applying Semantic Association to Support Content-Based Video Retrieval".

Akoulchina, Irina. and Jean-Gabriel Ganascia (1997) SATELIT-Agent: An Adaptive Interface Based on Learning Interface Agents Technology. In Proceedings of the Sixth International Conference on User Modeling. http://www.cs.mu.oz.au/agentlab/VL/ps/Akoulchinal.ps Ambrosini, Leonardo., Vincenzo Cirillo, and Alessandro Micarelli (1997). A Hybrid Architecture for User-Adapted Information Filtering on the World Wide Web. In Proceedings of the Sixth International Conference on User Modeling. http://www.cs.mu.oz.au/agentlab/VL/ps/AmbrosiniL.ps Arocena, Gustavo O., Alberto O. Mendelzon, George A. Mihaila (1996). Applications of a Web query language. In Hyper Proceeding of the Sixth International World Wide Web Conference. http://www.cs.mu.oz.au/agentlab/VL/html/PAPER267.html.

Benaki, Eftihia., Vangelis A. Karkaletsis, and Constantine D. Spyropoulos (1997) Integrating User Modeling Into Information Extraction: The UMIE Prototype. In Proceedings of the Sixth International Conference on User Modeling. http://www.cs.mu.oz.au/agentlab/VL/ps/BenakiE.ps Jeffrey M. Bradshaw, Peter D. Holm, John H. Boose, Douglas Skuce, Timothy C. Lethbridge (1992) Sharable Ontologies as a Basis for Communication and Collaboration in Conceptual Modeling. In Proceedings of the Seventh Knowledge Acquisition for Knowledge-Based Systems Workshop, Banff. http://www.cs.mu.oz.au/agentlab/VL/html/KAW92SharableOntologies.html Jeffrey M. Bradshaw, Kenneth M. Ford, Jack R. Adams-Webber, John H. Boose (1993) Beyond the Repertory Grid: New Approaches to Constructivist Knowledge Acquisition Tool Development. In K. M. Ford & J. M. Bradshaw (Ed.) Knowledge Acquisition as Modeling. Wiley. http://www.cs.mu.oz.au/agentlab/VL/html/BeyondtheRepGrid.html.

Bradshaw, Jeffrey M.; John H. Boose (1991) Mediating Representations for Knowledge Acquisition. In Proceedings of the AAAI '92 Knowledge Acquisition: From Science to Techniques to Tools Workshop Anaheim, Calif., July, 1991. http://www.cs.mu.oz.au/agentlab/VL/html/MediatingRepsforKA.html Boose, John H.; Brian R. Gaines (1989) Knowledge Acquisition for Knowledge-Based Systems: Notes on the State-of-the-Art. In Machine Learning Journal, 4, pp. 377-394. http://www.cs.mu.oz.au/agentlabNL/html/MLJEditorialNotes.html.

Boose, John H. (1990) Knowledge Acquisition Tools, Methods, and Mediating Representations. In John H. Boose. In Motoda, H., Mizoguchi, R., Boose, J. H., and Gaines, B. R. (Eds.) Knowledge Acquisition Tools, Methods, and Mediating Representations (1990). Proceedings of the First Japanese Knowledge Acquisition for Knowledge-Based Systems Workshop: JKAW-90, Ohmsha, Ltd: Japan http://www.cs.mu.oz.au/agentlab/VL/html/JKAW90KATechsMedReps.html Chekuri, Chandra, Michael H. Goldwasser, Prabhakar Raghaven &: Eli Upfal (1996) Web search using automatic classification. In Report to Computer Science Department, Stanford University. http://www.cs.mu.o-z.au/agentlab/VL/html/WebSearch.html De Carolis, Berardina & Sebastiano Pizzutilo (1997) From Discourse Plans to User-Adapted Hypermedia. In Proceedings of the Sixth International Conference on User Modeling. http://www.cs.mu.oz.au/agentlabNL/ps/DeCarolisB.ps Fink, Josef, Alfred Kobsa, and Andreas Nill (1997) Adaptable and Adaptive Information Access for All Users, Including the Disabled and the Elderly. In Proceedings of the Sixth International Conference on User Modeling. http://www.cs.mu.oz.au/agentlabNL/ps/FinkJ.ps Gaines, Brian R.; Mildred L G Shaw (1992) Integrated Knowledge Acquisition Architectures. In Journal for Intelligent Information Systems 1(1) 9-34, 1992. http://www.cs.mu.oz.au/agentlabNL/ps/IntegArchKA.ps Gaines, Brian R.; Mildred L G Shaw (1993) Eliciting Knowledge and Transferring it Effectively to a Knowledge-Based System. In IEEE Transactions on Knowledge and Data Engineering 5(1) 4-14, 1993. http://www.cs.mu.oz.au/agentlabNL/ps/KSSO.ps Gaines, Brian R.; Mildred L G Shaw (1993) Knowledge Acquisition Tools based on Personal Construct Psychology. In Knowledge Engineering Review, 8(1) 49-85, 1993. http://www.cs.mu.oz.au/agentlabNL/ps/KER93.ps Gaines, Brian R.; Mildred L G Shaw (1995) Concept Maps as Hypermedia Components. if In International Journal of Human-Computer Studies, 1995. http://www.cs.mu.oz.au/agentlab/VL/ps/ConceptMaps.ps Gaines, Brian R. (1991) An Interactive Visual Language for Term Subsumption Languages. In IJCAI91: Proceedings of the Twelfth International Joint Conference on Artificial Intelligence. pp. 817-823 San Mateo, Calif.: Morgan Kaufmann, 1991. http://www.cs.mu.oz.au/agentlabNL/ps/IJCAI91.ps Gaines, Brian R. (1994) The Collective Stance in Modeling Expertise in Individuals and Organizations. In (short version in—International Journal of Expert Systems 7(1) 21-51, 1994). http://www.cs.mu.oz.au/agentlab/VL/ps/Collective.ps Gaines, Brian R. Between Neuron, Culture and Logic: Explicating the Cognitive Nexus. In ICO: Intelligence Artificielle et Sciences Cognitives au Quebec, 3(2) 47-61, 1991. http://www.cs.mu.oz.au/agentlab/VL/ps/ICO91.ps Gori, Marco., Marco Maggini, and Enrico Martinelli (1997) Web-Browser Access Through Voice Input and Page Interest Prediction. In Proceedings of the Sixth International Conference on User Modeling. http://www.cs.mu.oz.au/agentlabNL/ps/GoriM.ps Guarino, Nicola (1994) The Ontological Level. In R. Casati, B. Smith; G. White (eds.) Philosophy and the Cognitive Sciences, Vienna: Hulder-Pichler-Tempsky.

Harmelen van, Frank, Ramon Lopez de Mantaras, Jacek Malec, Jan Treur (1993) Comparing Formal Specification Languages for Complex Reasoning Systems. In Jackson, Peter (1990) Introduction to expert systems—2nd ed. Wokingham: Addison-Wesley.

Maglio, Paul P. and Rob Barrett (1997) How to Build Modeling Agents to Support Web Searchers. In Proceedings of the Sixth International Conference on User Modeling. http://www.cs.mu.oz.au/agentlabNL/ps/MaglioP.ps Marchiori, Massimo (1996) The quest for correct information on the Web: hyper search engines. In Hyper Proceeding of the Sixth International World Wide Web Conference. http://www.cs.mu.oz.au/agentlabNL/html/PAPER222.html Mills, Timothy, Ken Moody, Kerry Rodin (1997) Cobra: A new approach to IR system design. In Proceedings of RIAO '97, pp425-449. http://www.cs.mu.oz.au/agentlabNL/ps/Cobra-riao.ps Mukherjea, Sougata, Kyoji Hirata; Yoshinori Hara (1996) Towards a multimedia world-wide web information retrieval engine. In Hyper Proceeding of the Sixth International World Wide Web Conference. http://www.cs.mu.oz.au/agentlabNL/html/PAPER3.html Newell, A. (1982) The Knowledge Level. In Artificial Intelligence, vol. 18, no. 1, pp. 87-127.

Prerau, David S. (1990) Developing and managing expert systems: proven techniques for business and industry. Mass: Addison-Wesley.

Ramscar, Michael., Helen Pain, and John Lee (1997) Do We Know What the User Knows, and Does It Matter? The Epistemics of User Modelling. In Proceedings of the Sixth International Conference on User Modeling. http://www.cs.mu.oz.au/agentlab/VL/ps/RamscarM.ps Saracevic, Tefko., Amanda Spink, and Mei-Mei Wu (1997) Users and Intermediaries in Information Retrieval: What Are They Talking About? In Proceedings of the Sixth International Conference on User Modeling. http://www-.cs.mu.oz.au/agentlabNL/ps/SaracevicT.ps Seta, Kazuhisa., Mitsuru Ikeda, Osamu Kakusho, and Riichiro Mizoguchi (1997) Capturing a Conceptual Model for End-User Programming: Task Ontology as a Static User Model. In Proceedings of the Sixth International Conference on User Modeling. http://www.cs.mu.oz.au/agentlabNL/ps/SetaK.ps Shakes, Jonathan, Mark Langheinrich; Oren Etzioni (1996) Dynamic reference shifting: a case study in the homepage domain. In Hyper Proceeding of the Sixth International World Wide Web Conference. http://www.cs.mu.oz.au/agentlab/VL/html/PAPER39.html Shaw, Mildred L. G.; Brian R Gaines (1992) Kelly's Geometry of Psychological Space and its Significance for Cognitive Modeling. In The New Psychologist, October 1992, 23-31. http://www.cs.mu.oz.au/agentlabNL/ps/NewPsych92.ps Shaw, Mildred L. G.; Brian R Gaines (1995) Comparing Constructions through the Web. In Proceedings of CSCL95: Computer Supported Cooperative Learning. Bloomington, October, 1995. http://www.cs.mu.oz.au/agentlab/VL/ps/CSCL95WG.ps Simons, Joel (1997) Using a Semantic User Model to Filter the World Wide Web Proactively. In Proceedings of the Sixth International Conference on User Modeling. http://www.cs.mu.oz.au/agentlabNL/ps/SimonsJ.ps Spertus, Ellen (1996) ParaSite: mining the structural information on the Web. In Hyper Proceeding of the Sixth International World Wide Web Conference. http://www-.cs.mu.oz.au/agentlabNL/html/PAPER206.html Staff, Christopher (1997) HyperContext: A Model for Adaptive Hypertext. In Proceedings of the Sixth International Conference on User Modeling. http://www.cs.mu.oz.au/agentlabNL/ps/StaffC.ps Stefik, Mark (1995) Introduction to Knowledge Systems. San Francisco: Morgan Kaufmann.

Vassileva, Julita (1997) A New View of Interactive Human-Computer Environments. In Proceedings of the Sixth International Conference on User Modeling. http://www-.cs.mu.oz.au/agentlabNL/psNassilevalps Weber, Gerhard.; Marcus Specht (1997) User Modeling and Adaptive Navigation Support in WWW-Based Tutoring Systems. In Proceedings of the Sixth International Conference on User Modeling. http://www.cs.mu.oz.au/agentlabNL/ps/WeberG.ps

What is claimed is:

1. A method for selecting electronically deliverable media comprising at least one of semantic, audio and video content, comprising:
receiving a user identification;
identifying, to a computerized interface, a user associated with the user identification;
storing data describing available electronically deliverable media in at least one memory;
persistently storing data representing a plurality of electronically deliverable media which were previously selected by the user in the at least one memory;

automatically performing a search of the stored data describing the available electronically deliverable media, to determine a correspondence of the respective available electronically deliverable media to data representing automatically generated content characteristics comprising automatically extracted at least one of semantic, audio and video content of the electronically deliverable media previously selected by the user, with at least one automated processor;

automatically issuing a notification comprising a list, dependent on a degree of correspondence of characteristics of the available electronically deliverable media, to the data representing automatically generated content characteristics comprising automatically extracted at least one of semantic, audio and video content of the electronically deliverable media previously selected by the user, based on at least the automatically performed search, with the at least one automated processor;

accessing, from a storage device, a user profile based on the user identification;

initiating a personalized startup of the computerized interface based on the user profile;

presenting, through the computerized interface, one or more configuration choices to the user based on a user preference matrix associated with the user profile;

determining, using a confirmation screen, whether an acceptance of the one or more configuration choices is received from the user;

in response to determining that the acceptance of the one or more configuration choices is received, verifying the one or more configuration choices; and in response to determining that the acceptance of the one or more configuration choices is not received, updating the user preference matrix.

2. The method of claim 1, further comprising receiving, by a voice recognition logic section, a voice pattern of the user, wherein identifying includes recognizing, by the voice recognition logic section, the voice pattern of the user.

3. The method of claim 1, wherein the identified user profile includes information regarding past use of the computerized interface by the user, the method further comprising determining, by a past user history determining element, a past user history of the user.

4. The method of claim 3, wherein the past user history of the user includes derived user preferences, and the user preference matrix is based at least in part on the derived user preferences, the method further comprising presenting the one or more configuration choices to the user based on the derived user preferences.

5. The method of claim 1, further comprising:
determining predicted requirements of the user based at least on the identified user profile; and
presenting, via the computerized interface, a series of screens to the user dependent on the predicted requirements.

6. The method of claim 1, further comprising:
detecting a physical act of the user; and
causing a change in a characteristic of the computerized interface that is proportional to the physical act of the user.

7. The method of claim 6, wherein detecting the physical act of the user further comprises detecting, by at least one of a computer mouse, a two dimensional input device, a trackball, or a remote control device, the physical act of the user.

8. The method of claim 6, wherein detecting the physical act of the user further comprises detecting, by at least one of a joystick, a gyroscope, or a sonic echo-location device, the physical act of the user.

9. The method of claim 6, wherein detecting the physical act of the user further comprises detecting, by at least one of a magnetic location detection device, an electrostatic location detection device, an RF phase location detection device, or a Hallpots device, the physical act of the user.

10. The method of claim 1, further comprising:
detecting, by a voice recognition logic section, a voice input of the user; and
causing a change in a characteristic of the computerized interface in response to the voice input of the user.

11. The method of claim 1, further comprising:
in an absence of the user indicating implicitly or explicitly a knowledge about how to use the computerized interface, inferring that the user is a novice, and prompting the user for only essential items of information with fewer advanced features.

12. The method of claim 1, further comprising:
in response to the user indicating implicitly or explicitly a knowledge about how to use the computerized interface, inferring that the user is an advanced user, and prompting the user with advanced choices and features.

13. The method of claim 1, further comprising color coding the one or more configuration choices, thereby helping to prompt the user as to which data to select or enter.

14. The method of claim 13, further comprising:
color coding instructions or errors with a first color;
color coding data to be entered or that has not been changed with a second color; and
color coding newly entered program data or status information with a third color.

15. The method of claim 1, further comprising:
predicting, based on the identified user profile, the one or more configuration choices;
storing the one or more configuration choices as one or more predicted choices; and
providing, via the computerized interface, a menu selection to allow rejection, by the user, of the one or more predicted choices.

16. The method of claim 15, further comprising:
in response to the user rejecting the one or more predicted choices, presenting next one or more predicted choices to the user.

17. The method of claim 15, further comprising:
in response to the user rejecting the one or more predicted choices, presenting all available choices to the user.

18. The method of claim 1, further comprising:
receiving, from the user, a selection from among the one or more configuration choices; and
updating the identified user profile, stored on the storage device, based on the selection.

19. The method of claim 1, further comprising:
in response to determining that the acceptance of the one or more configuration choices is not received:
receiving a manual input of a configuration choice from the user; and
updating the user preference matrix based on the manual input.

20. The method of claim 1, further comprising filtering a plurality of media streams based on the identified user profile.

\* \* \* \* \*